US005220500A

United States Patent [19]

Baird et al.

[11] Patent Number: 5,220,500

[45] Date of Patent: Jun. 15, 1993

[54] FINANCIAL MANAGEMENT SYSTEM

[75] Inventors: Andrew V. Baird, Malden; William E. Boyer, Boston; Shakunthala S. Pithavadian, Cambridge, all of Mass.

[73] Assignee: Batterymarch Investment System, Boston, Mass.

[21] Appl. No.: 409,650

[22] Filed: Sep. 19, 1989

[51] Int. Cl.[5] .................. G06F 15/20; G06F 15/38

[52] U.S. Cl. .................................... 364/408; 364/419

[58] Field of Search ................ 364/408, 406, 401, 419

[56] References Cited

U.S. PATENT DOCUMENTS

| | | | |
|---|---|---|---|
| 4,903,201 | 2/1990 | Wagner | 364/408 |
| 4,989,141 | 1/1991 | Lyons et al. | 364/408 |

OTHER PUBLICATIONS

Hypercard User's Guide, Apple Computer, Inc., 1988, pp. 15-17.

Aho et al. (Chapters 4 and 5 of *Compilers: Principles, Techniques, and Tools*, Addison-Wesley, Reading, Mass. 1986).

*Primary Examiner*—Roy N. Envall, Jr.
*Assistant Examiner*—Frantzy Poinvil
*Attorney, Agent, or Firm*—Fish & Richardson

[57] ABSTRACT

A method for enabling a user to interactively create and modify a model of an investment strategy to be applied to data pertaining to a set of possible investment entities. A graphical representation of a sequence of statements which describe data manipulations corresponding to the investment strategy is provided; the result of the sequence of statements, when applied to the data, is a selection of a subset of entities from the set of possible entities. The user is enabled to interactively enter and manipulate the statements and the sequence of statements via the graphical interface to alter the investment strategy. The user may "run" the strategy via the graphical interface, using the data to derive the subset of entities.

16 Claims, 25 Drawing Sheets

FIG 6

SUMMARY OF OPTIMIZER RUN
01/09/90
PORTFOLIO BFM001
[MANAGER——————JDB]
[ASSISTANT MANANGER——JKG]

OPTIMIZER GUIDELINES

| PRIMARY CONSTRAINTS | CURRENT LEVEL |
|---|---|
| 7.00 < Meas. of Val. < 16.00 | 7.59 |
| 0.00 < Spec. Risk < 16.00 | 7.74 |
| 0.80 < R-Squared < 0.85 | 0.83 |
| 0.99 < Beta < 1.05 | 1.00 |

| MKTCAP CONSTRAINTS | CURRENT LEVEL |
|---|---|
| 30% < 2725mm (+) < 100% | 34.0% |
| 0% < 1000/2725mm < 100% | 35.0% |
| 0% < 375/1000mm < 100% | 8.3% |
| 0% < 1/375mm < 30% | 22.7% |

CURRENT YIELD 3.551%

| SECTOR CONSTRAINTS | RESULTS |
|---|---|
| 0% < CONS. STABLE < 100% | 8.0% |
| 15% < TECHNOLOGY < 100% | 21.3% |
| 0% < INDUSTRIAL < 100% | 9.0% |
| 0% < UTILITIES < 5% | 3.3% |
| 10% < ENERGY < 100% | 11.3% |
| 0% < CONS. DURABLE < 100% | 5.3% |
| 0% < FOOD < 100% | 1.0% |
| 20% < FINANCE < 100% | 28.3% |
| 0% < RETAIL < 100% | 3.7% |
| 0% < METAL/WOOD < 100% | 1.7% |
| 0% < TRANSPORT < 100% | 0.7% |
| 0% < OTHER < 100% | 6.3% |
| 0% < CASH < 0% | 0.0% |

TEN OF THE LARGEST SUGGESTED TRADES

SELLS RANKED BY % CHANGE IN PORTFOLIO

| SECURITY | MEAS. OF VAL. | OPTIMAL HOLDINGS | %CHANGE |
|---|---|---|---|
| WOOLWORTH | 2.42 | 0.0m | -3.50% |
| MEAD CORPORATION | 2.06 | 0.0m | -3.46% |
| EATON CORPORATION | 2.72 | 0.0m | -2.58% |
| QUANTUM CHEMICAL | 3.91 | 0.0m | -2.58% |
| HUFFY CORPORATION | 0.25 | 0.0m | -2.49% |

BUYS RANKED BY % CHANGE IN PORTFOLIO

| SECURITY | MEAS. OF VAL. | OPTIMAL HOLDINGS | %CHANGE |
|---|---|---|---|
| OCCIDENTAL PET | 8.24 | 261.4m | +2.95% |
| UNITED TECHNOL | 8.23 | 261.4m | +2.95% |
| ROCKWELL INTL | 7.26 | 261.4m | +2.95% |
| UNION CARBIDE | 8.14 | 261.4m | +2.95% |
| AETNA LIFE & C | 6.43 | 261.4m | +2.95% |

| | |
|---|---|
| FROM BIS | |
| TRADE AUTHORIZATION NUMBER | REF: 001103 |
| ACCOUNT NUMBER | ABC123 |
| ACCOUNT NAME | XYZ CORPORATION |
| TYPE OF TRANSACTION | SELL |
| NUMBER OF SHARES | 50,000.000 |
| SECURITY DESCRIPTION | UNITED BISCUITS |
| SECURITY NUMBER | 091412 |
| TRADE SETTLES IN | BRITISH POUNDS |
| PRICE/SHARE (A$) | 5.440 |
| NET CURRENCY AMOUNT (A$) | 272,000,000 |
| TRADE DATE | 011390 |
| SETTLEMENT DATE | 012790 |
| ************************** | |
| BROKER INFORMATION | LONDON BROKERS, LTD. |
| Any questions, please call | Mr. Jonathan Mayall |
| TELEPHONE NUMBER | 01-374-120888 |
| TELEX NUMBER | 226745 |
| BROKERS DELIVERY ADDRESS | |
| London Brokers, LTD. | |
| 35 Threadneedle Street | |
| London, E.C. 2 | |

FIG 9

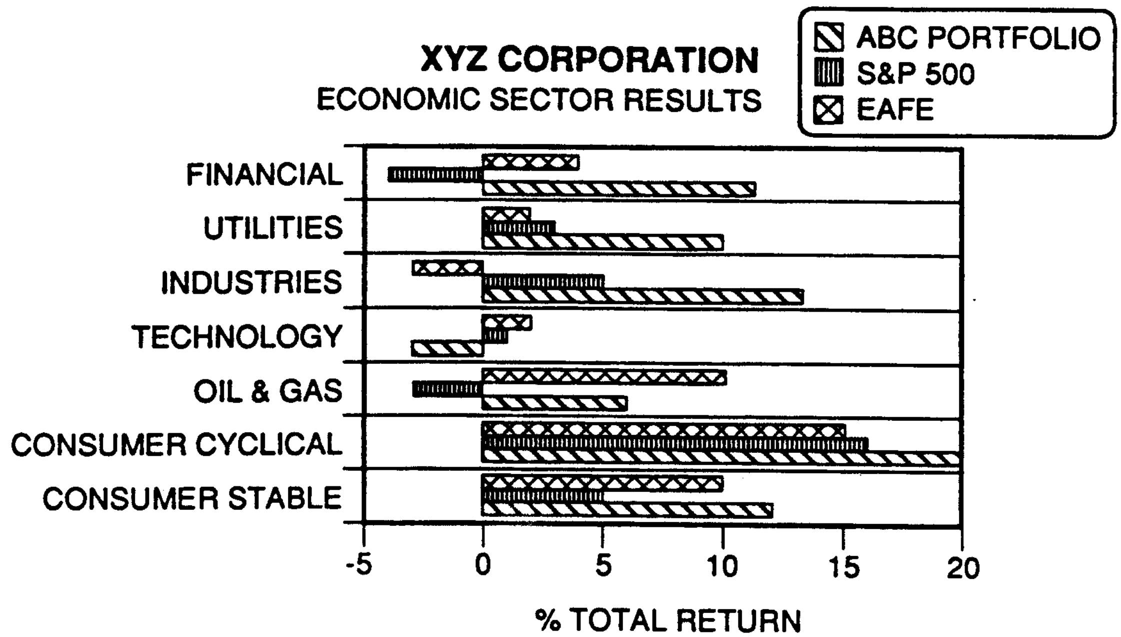
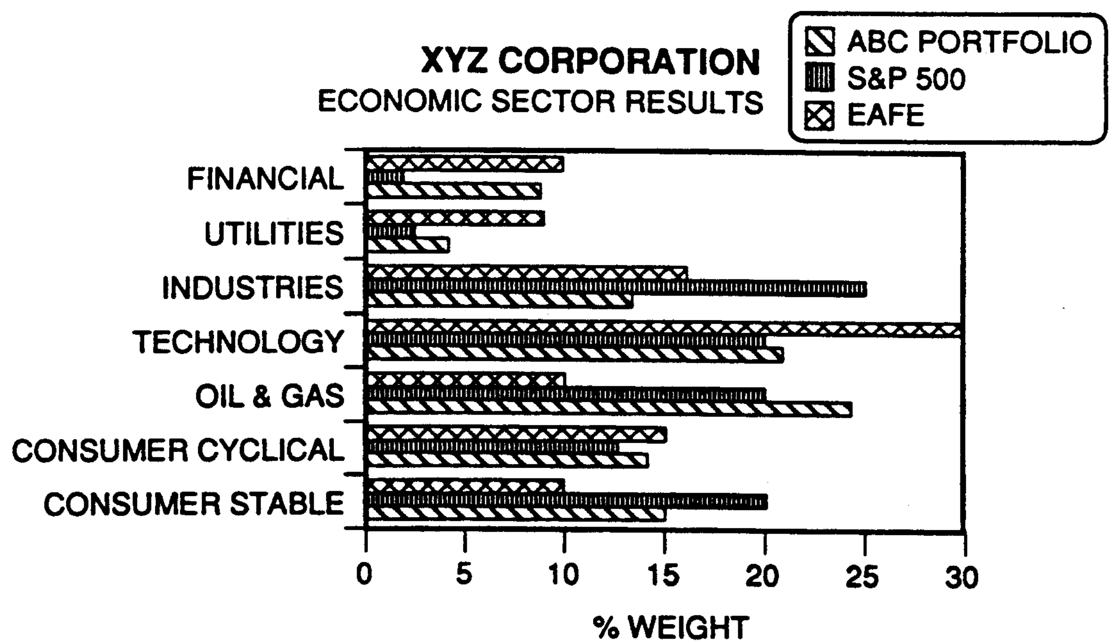
FIG 10

Karen: Some thoughts using "pure players" an approach to -
A MARKET SHARE CALCULATION 2/20/89

SIC - Hamburgers

| Name | Sales '85 | % | '86 | % | '86 as a % of '85 | Mkt Value | MktVal per $1 Sales |
|---|---|---|---|---|---|---|---|
| Mickey's (pure) | 800 | 53 | 1000 | 59 | 111 | 1000 | $1.00 |
| Ham Heav. (pure) | 100 | 7 | 100 | 6 | 86 | 80 | $0.80 |
| Berg's (not pure) | 500 | 33 | 400 | 23 | 70 | - | - |
| Yum's (not pure) | 100 | 7 | 200 | 12 | 171 | - | - |
| Total SIC | 1500 | 100 | 1700 | 100 | | | |

Therefore: Since -

Mickey's with 111% of '85 Sales in '86 sells for $1.00 per dollar of Sales, and Ham Heaven with 86% of '85 Sales sells for $0.80 per dollar of Sales, then we can express the relationshiop in a regression analysis (admittedly rough, but better than nothing) that will enable us to calculate that:

Berg's, with 70% of '85 Sales in '86 should sell for approximately $0.60 per dollar of Sales, and Yum's, with 171% of '85 Sales in '86 should sell for approximately $1.50 per dollar of Sales.

Result:

Berg's Theoretical Value: $240 (400 x 0.60)

Yum's Theoretical Value: $300 (200 x 1.50)

FIG 27

FINANCIAL MANAGEMENT SYSTEM

BACKGROUND OF THE INVENTION

The invention relates to developing and implementing financial management strategies.

A variety of financial management strategies have been applied to the problem of analyzing a universe of possible investments (for example, common stocks) and selecting particular investments for inclusion in a portfolio. The strategies typically accommodate assumptions and theories about economic performance as well as the goals to be achieved by the portfolio such as high return, appreciation, or low risk. The strategies may be applied based on facts about the various possible investments, such as historical market performance, balance sheet information, and earnings.

Financial analysts frequently change and fine-tune their investment strategies and may formulate entirely new strategies.

SUMMARY OF THE INVENTION

In general, the invention features a method for enabling a user to interactively create and modify a model of an investment strategy to be applied to data pertaining to a set of possible investment entities. A graphical representation is provided of a sequence of statements which describe manipulations using the data and correspond to the investment strategy; the result of the sequence of statements, when applied to the data, is a selection of a subset of entities from the set of possible entities. The user is enabled to interactively enter and manipulate the statements and the sequence of statements via the graphical interface to alter the investment strategy. The user may "run" the strategy via the graphical interface using the data to derive the subset of entities.

Preferred embodiments include the following features. In the graphical interface, the statements are organized in groups with each group being represented by a portion of a display. Each group of statements relates to a functional sub-portion of the strategy. The portions of the display representing different groups of statements are displayed in an overlaid manner and in a predefined order. When the user manipulates the statements and sequence of statements, the interpreter interprets each statement immediately after it is entered or modified by the user. The interpreter maintains a tree of nodes representing the present sequence of statements, and when the user runs the strategy, the tree of nodes is traversed.

The statements include user defined symbols which identify elements of the data corresponding to some or all of the entities. The user may review the values of the data elements which underlie a symbol of a statement by invoking the symbol via the graphical representation. For each symbol of each statement, a stored set of data is maintained for entities corresponding to the symbol. The stored set of data is cached in the main memory of a computer.

A statement may refer to a class of entities, and data elements invoked by symbols in the statement and subsequent statements in the sequence are restricted to data elements that pertain to that class of entities. Similarly, a group of statements may refer to a class of entities, and data elements invoked by symbols in the statements of the group are restricted to data elements that pertain to that class of entities. The entities may include financial investment instruments including stocks and the like, and the classes include industries and geographical areas.

As a result the system provides an easy mechanism for a user to develop and analyze the value of investment strategies.

Other advantages and features will become apparent from the following description of the preferred embodiment and from the claims.

DESCRIPTION OF THE PREFERRED EMBODIMENT

We first briefly describe the drawings.

FIG. 6B illustrates an entity and group table establishing groupings of entities, and FIG. 6C illustrates a link table establishing the links of FIG. 2B.

FIGS. 8A through 8E illustrate the graphic interface to the research system editor.

FIGS. 9A through 9J illustrate the menus of the research system editor.

OVERVIEW

Figure 1A:
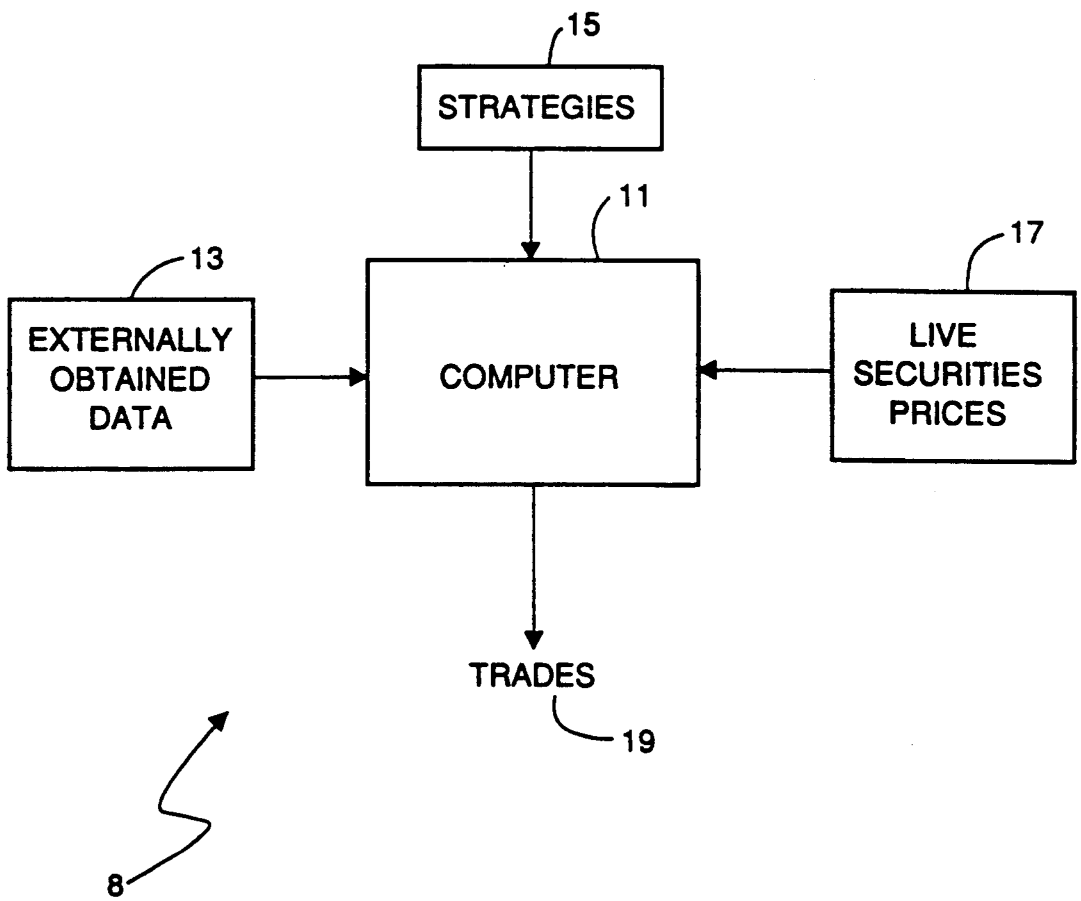
FIG. 1 is a block diagram of a research system for modeling financial management strategies, coupled to a portfolio optimization and trade execution system.
Figure 1B:
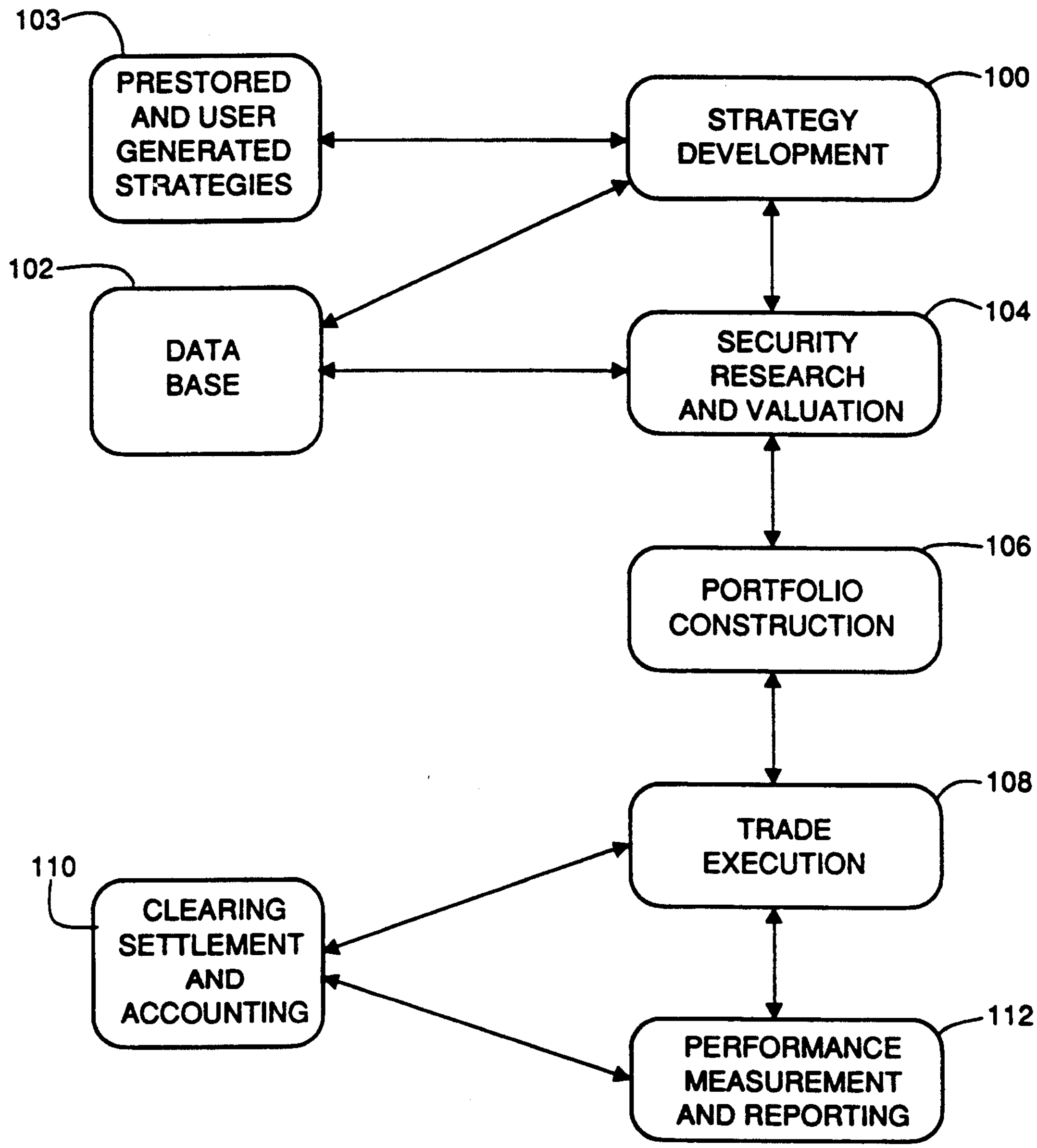
Figure 1D:
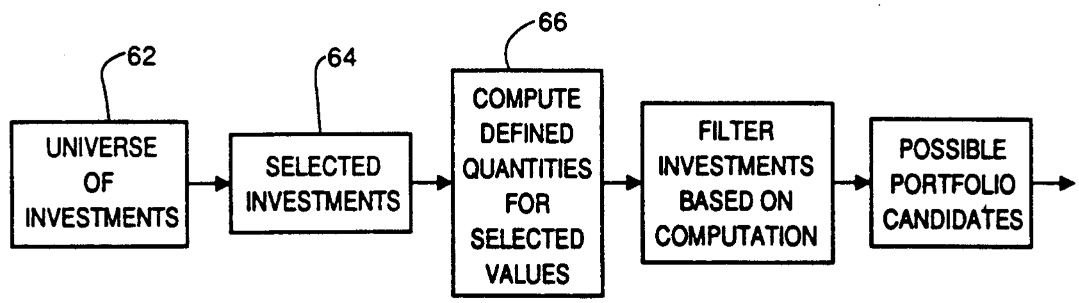
Figure 1C:
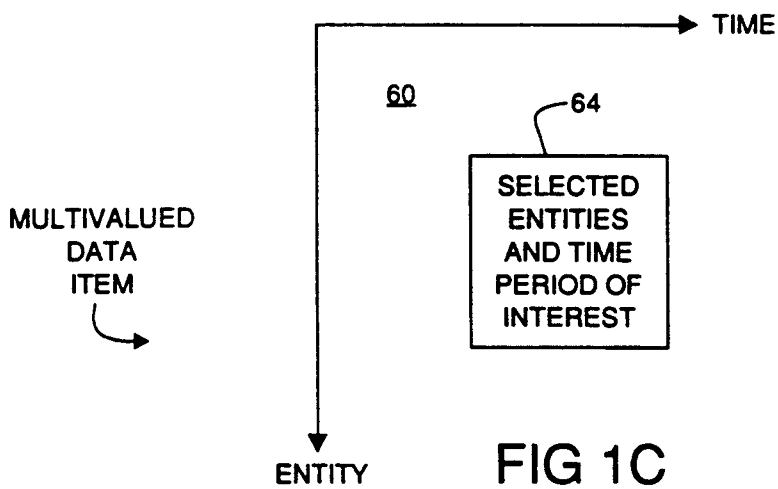

Referring to FIG. 1, the research system 100 is a software program that runs on workstation hardware. Using the research system 100, portfolio managers may construct investment models 120 to examine financial data on investment opportunities stored (in external mass storage) by a database 110. At the core of the research system 100 is an application known as VRL 105, an abbreviation for "Visual Research Language." With VRL 105, a research system user 107 may construct investment models 120 ranging from the very simple to the very sophisticated. VRL 105 is an interactive application relying heavily on the graphic powers of the workstation to simplify research and aid in the presentation of data. It is fully integrated with the overall design of the workstation hardware and will cooperate fully with all other applications.

The VRL language is specifically adapted to allow an analyst to express the database operations and mathematical manipulations that make up his or her investment strategy. The language allows database items such as "NetSales" or "DailyClosePrice" to be referenced by name and included in arithmetic or statistical calculations to form new, user-defined items. After retrieving the necessary data items and performing any desired calculations, the user may screen the database to select companies or securities with a particular set of characteristics. Finally, the user may examine the values of data items in an ad hoc manner on the workstation display and/or generate more formal multi-column reports listing any number of items of interest.

In addition to calculation and screening capabilities, VRL offers several features designed to facilitate more complex types of analysis. To facilitate truly global investment comparisons, VRL includes built-in support for the calculation of "country-relative" statistics; companies or securities can easily be characterized in relation to others from the same country or geographic region. Several other pre-defined "groups", including economic sectors, major industries, and 4-digit SIC industries, are also recognized by the system. These features allow security and corporate data to be aggregated and summarized in many different ways.

VRL is also designed to simplify calculations that involve historical data. Financial data from distinct time periods is not treated as distinct items, rather, VRL and the database allow all financial data items to be viewed as time series of values. The user may retrieve data for any arbitrary range of time using a single item name and may apply statistical functions along the time dimension; it is thus a simple matter to compute, for instance, a company's 5-year rate of sales growth or a security's average price over the last six months. Even for a cross-sectional analysis involving only a single time period of data, the dating scheme employed by the database and VRL frees the user from rigid calendar or fiscal year boundaries; a request for the item "NetSales" always generates the most recent year's worth of data, but the boundaries of this year gradually roll forward over time as more companies report their sales and the database is updated. The user is thus always assured of getting the most recent data available while not "throwing away" data that is less than totally new while still current enough to be meaningful.

Perhaps most important, VRL's features are accessible through a very high-level, English-like language that works according to a concise, easily-learned set of principles. The research system's use of icons and menus minimizes the need for memorization of file and database names, and its graphical user interface provides an attractive focal point for discussion and demonstration of investment strategies. Even models of substantial complexity can be developed, documented, executed, and demonstrated without the support of a professional programming staff and without the need for specialized knowledge of computers. And because the database integrates fundamental and security data from a variety of sources with truly global coverage, the user may apply the same analytical techniques to any or all countries or other subsets of the database, regardless of the origin or internal machine representation of the data involved.

In one application shown in FIG. 1, the research system 100 is used in a fully automated and integrated global investment portfolio management system. In this application, the research system 100 evaluates investment data stored in the database 110 in accordance with the user-defined model 120, and produces a report 125 giving scores to investment opportunities in accordance with criteria from the model 120. The information in the report 125 may then be entered into a portfolio optimizer program 140, which uses the scores and other information from the database 110 to select an ideal investment portfolio 145. The ideal portfolio 145 is then compared to the existing portfolio 150, and the trades 160 which are necessary to bring the existing portfolio 150 into conformance with the optimum portfolio 145 are computed.

In this application, the research system significantly reduces the human effort required to fully analyze and manage a large investment portfolio. This reduction in human effort will ultimately result in greater efficiency and thus higher investment returns.

GENERAL DESCRIPTION

Database

Figure 2:
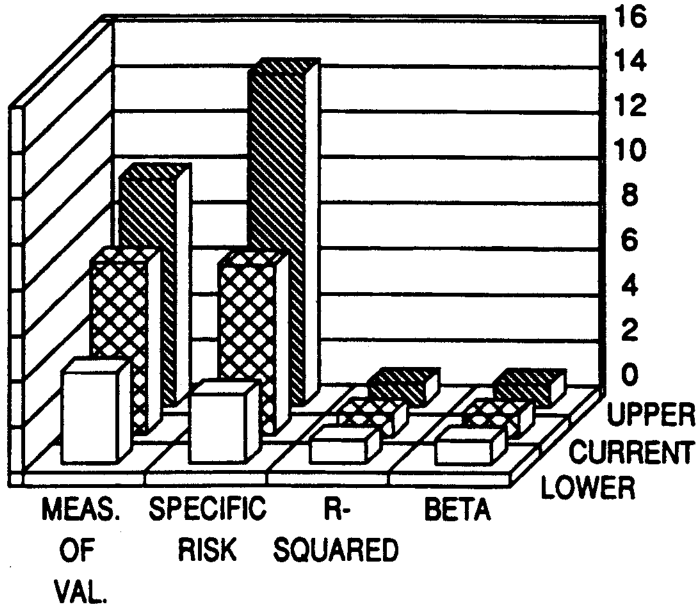
FIG. 2A illustrates the organization of the database of FIG. 1.
FIG. 2B is a diagram of the hierarchical links in the database of FIG. 2A.

Referring to FIG. 2A, the structure of the database 110 appears to the user as a three-dimensional grid of values.

Locations along the first axis 170 of the grid select the entity of interest. Entities of interest may include particular companies 171 such as "USSteel", "IBM", and "BurgerKing", major industries 172 such as "Automobiles", "Food", and "Computers", countries 173 such as "USA" and "Japan", and market sectors 174 such as "Industrial" and "Banking". As will be seen later, to facilitate the computation of complex financial information, the grouping shown on axis 170 is implemented in the research system.

Locations along the second axis 180 of the grid select the item of interest. An item is a piece of financial information about an entity. For example, the item "name" indicates the entity's name, and the item "NetSales" indicates the entity's net sales. All items on axis 180 do not apply to all entities. For example, the item "TotalAssets" (total corporate assets) applies only to entities in the "company" group. Similarly, the item "GNP" (country gross national product) would apply only to entities in the "country" group. However, the item "name" applies to all groups of entities, as every entity has a name.

Locations along the third axis 190 of the grid select particular times. The times in the database range from an arbitrarily chosen, early time (a time before which no relevant financial information exists, such as a time in the 1920's) to the present day.

Thus information may be accessed from the database by simply specifying the entity, item, and time of interest. However, it should be noted that the specific times of, and periodicity between, item values varies depending upon the source of the values. Therefore, requests for information from the database implicitly specify a time range, for example, a range including all times up to 1 year prior to the present time.

The above has discussed the concepts of entities, and their related items and the times of interest. However, the interrelations between these entities has only been briefly discussed. The interrelations of greatest interest are those that relate an entity in one group to an entity in another group. For example, "IBM" is a company entity that is a United States corporation, and thus is related to the country entity "USA". In addition, "IBM" is a computer company, and is thus related to the major industry entity "computers". These relationships are of interest because they are inherent to the financial market, and can be used in the formation of a financial strategy.

As discussed above, it is often advantageous to perform calculations on entities in a "country-relative" or "industry-relative" fashion. To accomplish this, the company entities which reside within a particular country or are members of a particular industry must be linked to their common company or industry. Other useful entity linkages might relate a company to the various securities it issues, or the various business segments it conducts, so that the relative success of these securities or segments can be determined.

Referring to FIG. 2B, in one embodiment, the entity categories relate to corporate structure, market structure, and geographic structure. The largest categories of entities divide the earth into geographic regions 201 (e.g., North America, Europe, etc.), and the earth's market into economic sectors 202 (e.g., finance, transportation, etc.). Next, entities representing major industries 203 (e.g., automobiles, food, etc.) further subdivide the earth's market, where each major industry 203 (e.g., automobiles) is a portion of an economic sector (e.g., transportation). Entities representing countries 204 (e.g., USA) further subdivide the geographic regions. Entities representing industries 205 (about 1700 at the 4-digit Standard Industrial Classification "SIC" code level) also further subdivide the major industries.

Because they are the fundamental financial enterprise, entities representing individual companies 210 (sometimes called members of the "corporate fundamental" group) are cross-referenced to geographic groupings as well as economic groupings. Thus a company may be considered in terms of its geographic location as well as its economic placement.

In addition to the geographic and industrial groups, there are two other contexts which are frequently used to evaluate companies. These contexts correspond to securities 211 and market segments 212. The former refers to marketable securities issued by an individual corporation. The latter refers to divisions of a corporation, to the extent that these divisions operate in different market segments.

A more detailed listing of data item names, entity names, and description of the above groupings in one embodiment of the invention is provided as Appendix A.

All data items may have their context specified by a prefix reflecting the item's group identity. The prefix is often used where the value for the data item is to be retrieved for a group other than that specified by the plate context. The prefix is attached to the descriptor of the data item with an underscore, "13" (to alleviate confusion, the underscore character may only be used to append prefixes to data item names). The standard prefixes which are recognized by VRL are:

"Reg_" (Region)
"Cty_" (Country)
"Sctr_" (Economic Sector)
"MajInd_" (Industry)
"Ind_" (SIC Code)
"Co_" (Company)
"Seg_" (Business Segment)
"Sec_" (Securities)

Plates

The principal functions of VRL are provided via so-called plates displayed on the workstation monitor. The plates display the equations which implement an investment strategy and allow the user to modify, extend, and create investment strategies interactively. A given strategy (or model 120, FIG. 1) can include a series of plates which have a simple ordering beginning with a first plate and ending with a final plate (see discussion of FIG. 4F, below). The strategy may consist of a number of sub-strategies and each sub-strategy may be represented on its own plate. The user may easily jump to look at any sub-strategy by invoking the appropriate plate. When properly organized, the plates are displayed in an overlaid fashion and in their predetermined order. Thus, if there are three plates, the top plate is plate 1, the next underlying plate is plate 2 and the plate at the bottom of the stack is plate 3.

Every plate has a context, that is, one of the above groups of entities to which its instructions apply. This context is indicated by a FOR statement at the beginning of the plate. Once the context of the plate is thus established, all data items must be consistent within that context. However, the context of the plate does not affect the operations which may be performed. As illustrated in the discussion of FIGS. 4A through 4E below, conditional, declarative and process statements are valid for any plate context.

While it is necessary that a consistent context be given to a plate, there should be mechanisms for traversing the group hierarchy. This mechanism is provided by the prefixes discussed above. To obtain the value for a data item at a different hierarchical level than the plate context, a prefix is simply appended to the data item name. This operation involved in this "context switching" will differ depending upon whether one is climbing up the hierarchy of FIG. 2B (i.e., aggregating values from the perspective of a higher level) or climbing down the hierarchy of FIG. 2B (i.e., propagating a representative value from a lower level).

Models

Figure 3:
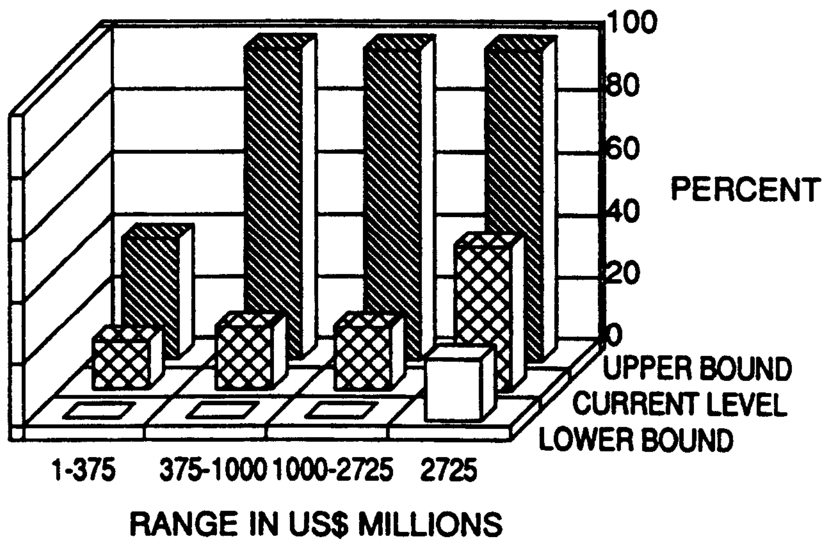
FIG. 3A is a memo outlining a financial model.
FIG. 3B is a printout of the expression of this model in VRL.

Reprinted in FIG. 3A is a memo describing an investment model which uses industry "pure players" (i.e., those companies which only have one business segment, and thus only do business in one industry) to appraise the potential market share growth of members of those industries. The particular industry discussed in the memo is the fast food industry. However, the strategy of this memo can be used as an outline for a general VRL model which analyzes all industries in the same fashion. One implementation of this model is shown in textual form in FIG. 3B. Described below are the various steps required to turn the memo strategy into the model, along with a description of the graphic display of this model. This discussion will describe the VRL syntax only to the extent necessary to understand the model. For reference, a complete discussion of the VRL syntax is provided in the Detailed Description under the heading "VRL Syntax and Interface".

Figure 4:
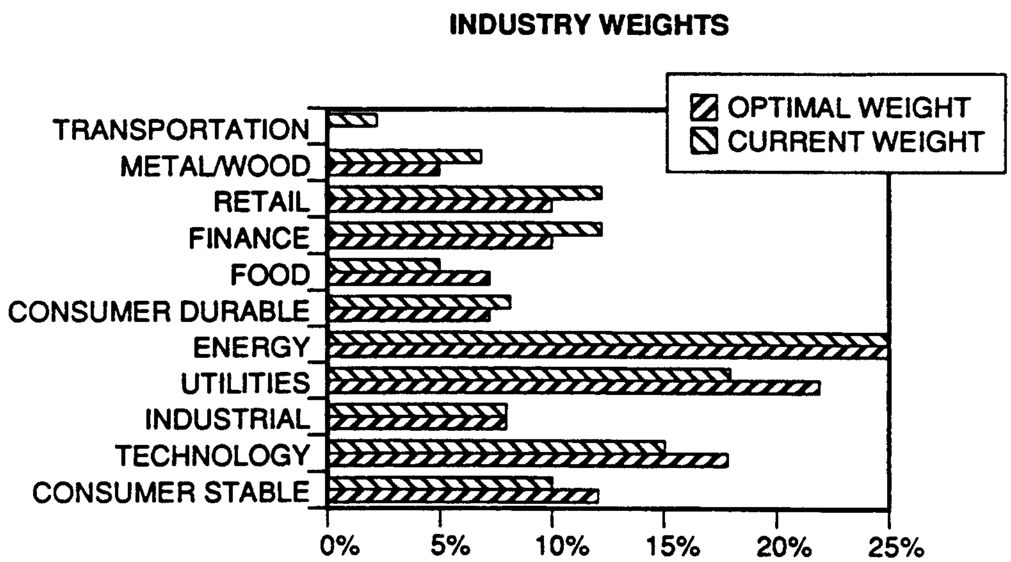
FIGS. 4A through 4F illustrate the graphic representation of VRL plates capturing the model of FIGS. 3A and 3B.

To begin, two variables are needed at the corporate fundamental level, which are calculated as shown in Plate 1, FIG. 4A. Note that the plate context is set by the statement "FOR companies".

The first variable to be calculated, "NumberSeg", is the number of segments within each company. This variable is important because the memo's strategy makes a distinction between single segment companies (i.e., "pure players") and multi-segment companies. The "NumberSeg" count is implemented by the statement

```
SET NumberSeg=Count[seg13NetSales]
```

The use of the prefix "seg_" shifts the context of the "NetSales" data item to the corporate segment level. The "Count" function then counts how many "NetSales" data items exist at the corporate segment level. Note that a value for "NumberSeg" is generated for every company; this is indicated by the FOR . . . NEXT pair which surround the SET statement. This is an important aspect of VRL: the statements on a plate operate on every member of the current group (or "universe") of entities. The size of this universe is determined by the group names or conditions (e.g., "FOR companies" or "WHERE Score>1.500") set forth by FOR and WHERE statements on the plate.

The second term calculated by plate 1, "Capital", provides a measure of a company's total financial worth. Note that this is the sum of the company's equity (which is stored in positive currency) added to its long term debt (which is stored in negative currency).

The next step in implementing the model of FIG. 3B is to compute total sales by industry for the last two years, as shown in Plate 2, FIG. 4B. This is computed by adding, for every company in the industry, the net sales of all company segments. This computation is easily indicated by the single statement

```
SET TotalSales=Total[seg_NetSales]
```

Note again that the "FOR industries . . . NEXT" statement causes the calculation to be implemented for every industry. The modifier {stepOver:2years} indicates that the computation should be done for the most recent two years, rather than just the most recent year. The use of the "seg_" prefix shifts the context of the "NetSales" data item to the corporate segment level, and the Total[. . . ] function adds these NetSales values to obtain an estimate of the net sales for the entire industry.

Referring to Plate 3, FIG. 4C, the next step in the model is to compute, for each company's business segments, that segment's share of its industry's total market. Since the computation is done for all segments, the context of the plate is "FOR segments". (Again, the two most recent years are required, and thus the {stepOver:-2years} modifier is included.) Once the context is appropriately set, the market share can simply be calculated as the net sales "ind_" prefix is used to set the appropriate context for the TotalSales data item.

Now comes the intricate part of implementing the model. Referring to plate 4, FIG. 4D, first a segment's growth in market share must be determined. This is done by dividing each segment's market share for the current year ("MktShare") by its market share for the previous year ("MktShare{offset:-1year"). The market share calculations in previous plates were performed for two years so that this growth computation was possible.

Next, the market value of sales, which is the ratio of the corporate capital to its net sales, must be computed. However, this calculation is only meaningful for the "pure players" which do not have corporate capital which relates to more than one segment. Therefore, the computation is only conducted where a company possesses a single business segment (i.e., "WHERE co_NumberSeg=1").Note again that the "co_" prefix is used to shift the context of data item references.

The next step is to perform the regression. To accomplish this, for each industry identified by a unique SIC code, the average ratio of corporate segment market share growth "Growth" to corporate segment market value of sales "MktValue" is determined. To properly represent the industry, this computation should only involve the "pure players". However, no conditional statements are required because only single segment companies have been given a data item "MktValue". The remaining companies will have "not available" or "null" values for "MktValue", and are skipped in the analysis. The main computation is performed by the "Regress[. . . ]" function, which calculates an average ratio of its arguments. The modifier to the Regress[. . . ] function, "within:ind_SIC", indicates the groupings within which the average ratio is to be calculated. In this case, the ratio should be calculated for segments within a common SIC industry.

The final statement on plate 4 employs the results of the regression to estimate the value of all corporate segments in the database as their growth times the average growth/market value ratio of the "pure players".

Referring to Plate 5, FIG. 4E, once the calculations are complete, the final step is to return to the corporate level and examine the results. First, the estimated worth of a company is computed by summing the estimated worth of its individual segments. Next, a score is derived by dividing this estimate by the company's current market value. This scored companies are then screened by a WHERE statement, which removes all companies whose score is less than 1.500. Finally, a report of the remaining companies is generated. This report is created by the MAKE REPORT statement. The report will be placed in the file "MarketShareGrowth", and will list the names and scores of the high-scoring companies. Once the report is generated, the model terminates.

FIG. 4F shows the VRL editor window, including the five plates which have been generated as discussed above.

DETAILED DESCRIPTION

Software Organization

Figure 5:
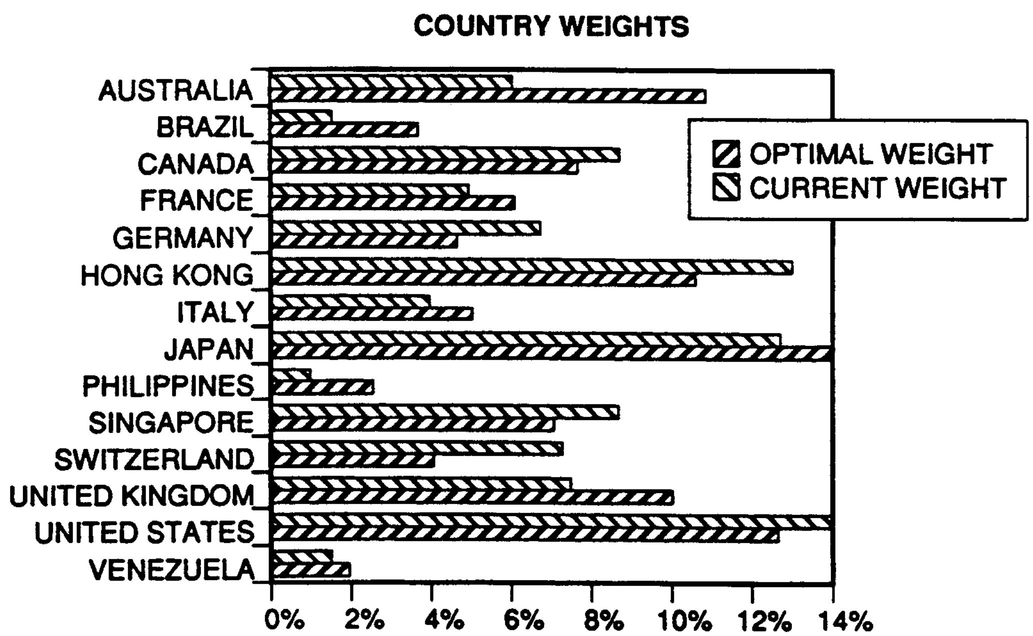
FIG. 5A is a diagram of a specific implementation of the research system of FIG. 1.
FIG. 5B illustrates the structure of the parse trees of FIG. 5A.

Referring to FIG. 5A, in one embodiment, the research system (100, FIG. 1) is implemented as an object-oriented program written in the Objective-C language (and compiled using an Objective-C compiler version 3.3 available from StepStone Corp., Sandy Hook, Conn. 06482). The hardware of the research system includes a Hewlett-Packard Series 9000 model 360 computer with 16 megabytes of random access memory running under the UX operating system version 6.5. The computer is connected to two 304 MB H-P disk drives and a 67 MB H-P cartridge tape drive. A 16-inch high resolution H-P monitor provides color graphics capabilities. A H-P LaserJet II printer, H-P-HIL mouse, and high speed modem are also included in the hardware (all H-P hardware, and the UX operating system, are available from Hewlett-Packard, Palo Alto, Calif. 943041181). The database 110 (FIG. 1) is stored on the disk drives together with the prestored and user-generated strategies and reports.

The software of the system includes several utility software packages 300, 355, 370, 375, 380, and Objective-C objects which are instances of several different classes. For a complete review of the function of these object classes and an Objective-C source code implementation, see Appendices B and C.

Referring to FIG. 5A, the database is stored in a collection of data tables 305, and is organized in accordance with, and managed by, a database manager utility (e.g., Ingres Version 5.0, available from Relational Technology, Inc., Alameda, Calif. 94501). Accordingly, a query 315 to the database manager 300 specifies the entity, item, time, and data table of interest. The queries are created by query language routines in data item objects 310, and are made in accordance with an appropriate query language (e.g., EQUEL, supported by the RTI Ingres product referenced above).

The data item objects 310 which generate the queries are instances of object classes which are optimized for retrieving particular items from the database. Therefore, each data item object 310 manages the data type of the raw data in the data tables 305 and can properly interpret the data. Also, the data item objects 310 can translate the data item names used by the user to the raw integer identifiers used for storing the data items in the data tables 305. To facilitate distributing the database among multiple data tables 305, each data item object 310 is associated with a data table map object 320, which stores information used by the data item object to reference the appropriate data table.

Similarly, the hierarchy and grouping of the entities is stored by data entity objects 390. These objects are instances of a general data entity class that may store linkages to other objects. One data entity class instance is created for each entity in the database, and stores the entity's group, as well as its superior and subordinate entities.

Central dispatching of data requests in VRL statements is performed by a database server object 330 (a single instance of a database server class). The user may also use VRL assignment statements to enter new data items into the database via the database server 330. New data 325 about investments (e.g., current stock prices and quarterly reports) is added to the database by converting it to the common format, and loading it via Ingres 300 into the data tables.

During operation, the database server receives data requests 361 from parse tree node objects 360. Each parse tree node object 360 represents one element (e.g., statement or argument) in the current VRL model. Together, the parse tree node objects 360 form a tree 362 whose structure mirrors the structure of the current VRL model. During execution of the model, sequential nodes in the tree 362 are invoked, causing database accesses or function calculations. The resulting data is stored by the parse tree node objects 360, and may be retrieved by the user (in table or graphical form) after the calculation.

The data retrieval functions of the database server 330 are complemented by calculation functions provided by a function server 340. The function server 340 receives function requests (such as requests for arithmetic, statistical, or logical operations) from parse tree nodes 360 and dispatches the requests to the appropriate function object 325. Each function object 325 is an instance of a special class optimized for the calculation of a particular function. As discussed in detail in the VRL syntax section below, function requests may relate to statistical calculations (e.g., the Regress[. . .] function discussed above), arithmetic calculations (e.g., +, −, *, /), or logical operations (e.g., AND, OR, NOT).

The structure of the parse tree 362 is managed by a VRL interpreter object 350 (a single instance of a VRL interpreter class, also written in Objective-C). When new node objects 360 are to be added to the parse tree 362 in response to user commands (such as a text string typed at the keyboard), the user command is parsed and converted to parse tree node objects 360, which are then spliced into the tree 362. This parsing operation is performed by parser routines within the VRL interpreter 350. The parser routines are generated by the UX YACC parser-generator utility 355 (available from Hewlett-Packard), in response to a grammar file 356 (which relates text strings to the related object instances) and a lexical analysis file 357 (which describes VRL's lexical structure—i.e., the kinds of symbols it employs, such as alphabetic strings, numeric constants, and arithmetic operators.).

The VRL interpreter 350 communicates with the user via a graphical, event driven user interface that incorporates a display, keyboard, and mouse. The lowest level of display control is provided by the UX X-Windows operating system utility 380 (avaliable from Hewlett-Packard). X-Windows provides multi-tasking of the H-P hardware, and supports a low-level graphical window interface with event dispatching. The research system communicates with the user via a single X-window 375, whose interior is managed by low-level Objective-C language routines that provide for the creation of custom screen displays, windows, and icons as desired by the programmer. The details of the research system interface are managed by a large number of display objects 365, each of which manages small or large visual regions on the screen (for a fuller description of the display characteristics, see the System Operation section below). The display objects 365 are instances of several custom classes which are optimized for particular display functions. For example, some classes manage the menus and icons displayed on the screen, other classes display the statement names or phrases in a VRL program.

One important set of the display objects 365 form a tree 366 which is responsible for displaying the statements or phrases of the current VRL model. As the displayed model must match the internal model, the structure of the display tree 366 necessarily parallels that of the parse tree 362. The two trees are created and managed simultaneously by the parser routines in the VRL interpreter 350. However, objects 365 in the display parse tree 366 are responsible for the display of, rather than the meaning of, the various VRL statements or phrases.

Communication between the two trees is necessary for certain functionality. As discussed above, the user may click on a statement (or a statement's pop-up menu) to request the data which resulted from that statement's computations. This information is stored by the node objects 360 in parse tree 362. Therefore, when the click event is dispatched to the selected display object 365, a request must be relayed to the appropriate internal parse tree node object 360, and the desired information retrieved. Another situation which requires communications occurs during model computation. As statements are invoked during computation, the current statement in the computation is highlighted on the screen. The communication for such interaction is provided by linkages 367, which allow pairs of related objects to communicate.

Another important display function, generation of charts 381 and reports 382, is provided by report or chart objects 365. The data for the chart or report is accumulated by instances of chart or report classes (see Appendices B and C), and these instances then cause the data to be displayed on the screen. The report objects cause the report 382 to be generated via internal routines, whereas the chart objects use interface routines to interface with the C-Chart utility 370, (available from Visual Engineering Co., San Jose, Calif. 95134) which creates the chart 381. The graphic image 381 is stored by the chart object as a bit-map to facilitate displaying the chart in a window on the screen or dumping it to, for example, a PCL printer.

Referring to FIG. 5B, the detailed structure of a parse tree 362 is closely related to the sequence of VRL statements 400 from which it is generated. For the sake of example, a very simple VRL program 400 with a single plate is shown at the top of the Figure. For convenience, the reference numerals for the phrases of the program (400 . . . ) and their parse tree objects (360 . . ) are in correspondence.

All VRL programs start with a BEGIN statement 400B and end with an END statement 400D. Each plate starts with a FOR statement 400E, and ends with a NEXT statement 400G. The plate context (such as "companies") is set by a group name 400H in the FOR statement, and may be further modified by WHERE statements (see FIG. 4E). The plate contains one or more statements, which may perform arithmetic, logical, or statistical operations on user data items or database information.

The VRL program of FIG. 5B includes a single SET statement 400I, which defines a new user data item "HalfSales" 400J as equal to the database item "Sales" 400L divided (400K) by 2 400M.

The VRL program is represented by a sequence of parse tree nodes, one for each portion of the program. The entire program is represented by a Program class object 360A. The VRL Interpreter 350 (FIG. 5A) maintains a pointer to the current program object for use in tree manipulation. The program object 360A has three subsidiary objects: an object 360B for the BEGIN statement, an object 360D for the END statement, and an object 360C for the single plate in the program. If multiple plates were used, the plate object 360C would be replaced by a plate list object. The plate list object would have two subsidiary objects, one which was a plate, and one which was a plate list or a plate. In this way, the plates are stored as a sequence of plate and plate list objects.

A plate object 360C has three subsidiary objects: an object 360E for the FOR statement, and object 360G for the NEXT statement, and an object 360F for the statement list. The FOR statement 360E has a single subsidiary object 360H for the database group identifier that sets the plate context.

As with a plate list, a statement list object 360F can have two subsidiary objects, a statement, and a statement list or a statement. In this way, the statements are stored as a sequence of statements and statement list objects. In the example of FIG. 5B, there is a single SET statement, represented by an object 360I. The SET statement has two subsidiary objects, a first 360J for the new user identifier "HalfSales", and a second 360K for the expression which is assigned to it. In the example, this expression is an arithmetic expression, and thus the object 360K is an Arithmetic Expression class object. (Other expressions may be, e.g., logical expressions or constants.)

The arithmetic expression object 360K (which corresponds to the "/" operator 400K in the VRL program) has two subsidiary objects, one for the dividend 400L and one for the divisor 400M. The dividend is a database item, and thus is represented by a Primary class object 360L (primary class objects represent fundamental data, such as data from the database). The divisor is a constant (2), and is thus represented by a Currency Constant class object 360M.

Similar classes of objects are used in the display tree to display the various VRL program components to the user. See Appendix B for a full discussion of these classes.

During model execution, each object 360 in the tree 362 invokes the operations of its subsidiary objects 360. The execution of the model is initiated by a command from the VRL interpreter to the Program object 360A.

Database Data Structures

Data Table

Figure 6A:
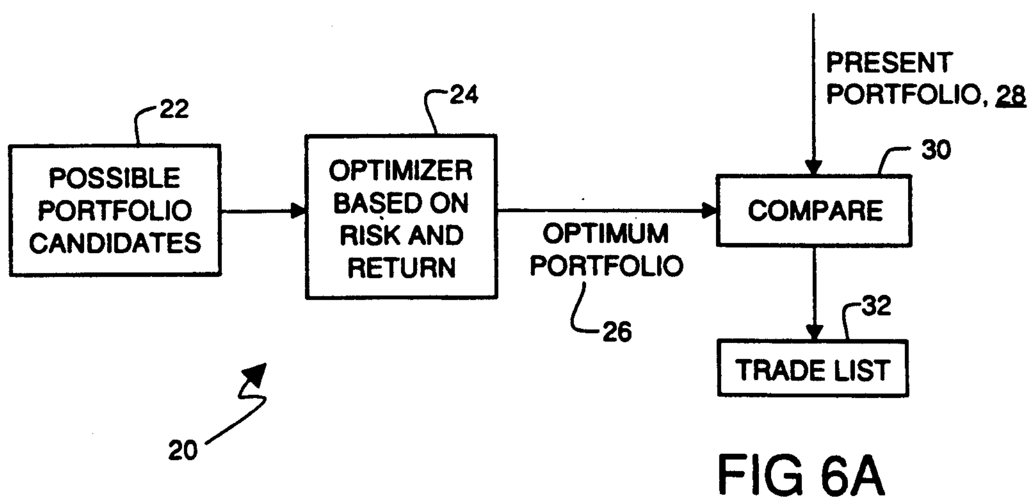
FIG. 6A illustrates the structure of the data tables of FIG. 5A.

The data is stored in the database as a collection of data tables 305 (FIG. 5A). Referring to FIG. 6, the format of one embodiment of a data table 305 includes a sequence of records 420. Each record identifies: an entity, whose identity is indicated by an ID number 430; a time, which is represented by an integer 435; an item, whose identity is indicated by a ID number 440, and a value 445, which is a string or number, represented in one of many formats.

Thus each record stores the coordinates of, and value for, one particular point in the illustration of FIG. 2A. For example, an illustrated record 420 has the coordinates of: entity IBM (which has an ID number of 130), time 1986 (integer=756), and item "LongTermDebt" (ID number=35). The corresponding data value if $40,000,000 (in one embodiment, "LongTermDebt" would be stored in millions; in this case the data value would be $40). In English, this record says that IBM's long term debt in 1986 was $40 million.

To save space, the coordinates of data values in a data table are represented by ID numbers (e.g., 130) and integers (e.g., 756, 35), rather than the text names (e.g., "IBM", "1986", "LongTermDebt") used in VRL to refer to these coordinates. No information on how to interpret the ID numbers and integers is stored in the table. The data values themselves may be strings (such as in "Name" data item values) or numbers (such as $40 million), depending upon the item. Thus when a database reference is made, the database server and its data item objects must convert the coordinates of the desired data values to integers and ID numbers, and when the value is returned, the meaning of the returned values must be interpreted by the database server and the data item objects.

As discussed above, to implement this conversion and interpretation, the research system provides many different data item object classes, and multiple instances 310 (FIG. A) of these classes, each instance 310 customized for obtaining a particular data item for the user. Thus the instance 310 responsible for retrieving the item "LongTermDebt" knows in advance that the ID number for the item "LongTermDebt" is 35. Also, the "LongTermDebt" also knows in advance whether the values for "LongTermDebt" are represented in millions.

For simplicity, the format of the time coordinate of the database is uniform for all records. In one embodiment, the time coordinate is an integer number of months after a predetermined early time, before which no records are of interest (such as a time in the 1920's).

The correlation of the entity ID numbers to the entity names which are displayed to the user is implicitly stored by the database. As discussed above, every entity has a "Name" item, which stores its name. Therefore, to determine the name of all entities in the database, the "Name" item for every entity is retrieved (and cross-referenced to its ID number).

Entity and Group Tables

As discussed above in conjunction with FIG. 2B, every entity is a member of a group, such as companies, segments, or countries. The members of one group relate to members of another group in a hierarchical fashion. That is, some companies belong to one country, some to another.

These group relationships are not stored in the data tables. Rather, referring to FIG. 6B, the grouping of the entities is stored by an entity table 449. Like the data table 305, the entity table has a sequence of records 450. Each of these records 450 identifies a group 460 (identified by an identification number) and an entity 465 (identified by an identification number) which is a member of that group. For example, one illustrated record indicates that group 7 (companies) includes a member with the identifier 130 (IBM).

One important way in which groups may be used is to reduce the size of the entity identifier fields. To do this, an entity is identified by its group and identifier. In this way, the identifiers for entities need only be unique within a particular group. Identifiers may be re-used across groups. To alleviate confusion, the data tables 305 split the information in the database along group lines. That is, each data table stores records for entities of only one group. When a data value is sought, the data table for the appropriate group (or part of a group, where it is convenient to further sub-divide the groups) is found, and then the value is found in this table. The names of the data tables are referenced to the group ID numbers by the data table map objects 320 (FIG. 5A).

Although the entity table groups the entities, it does not provide the text group names (such as "companies") that are seen by the user in a VRL program. These names are stored separately in a group table 466. The records in the group table identify a group 467 (indicated by the identifier), and that group's name 468 (a text string). For example, an illustrated record indicates that group 7 has the name "companies".

The above tables store the raw database information and the grouping of the entities, but do not store the linkages of entities such as shown in FIG. 2B. Referring to FIG. 6C, these linkages are stored by the entity link table 471. Like the data table 305, the entity link table has a sequence of records 470. Each of these records 470 identifies the group 475 (by an ID number) and identity 480 (by an ID number) of a superior entity, and the group 485 (by an ID number) and identity 490 (by an ID number) of a subordinate entity. For example, one illustrated record indicates that group 3 (countries), member 15 (USA) is superior to group 7 (companies) member 130 (IBM).

To provide fast, convenient access to the entity groupings and entity linkages in the database, the information in the entity table and the link table is extracted from disk into memory during system initialization. The information is stored in data entity class objects 390 (FIG. 5A). The data entity objects are general objects that may store linkages to other objects. One data entity class instance is created for each entity in the database, and stores the entity's group, as well as its superior and subordinate entities. Linkage data of this type may then be quickly retrieved from the data entity objects.

One important function of the entity groups and linkages is to set a context for the data values in the data table. For example, the values for "LongTermDebt" (or other currency items) for a company may be stored in that company's local currency. In order to interpret the stored value, therefore, the retrieving data item object must determine the home country of the company. To obtain this information, it may simply reference the appropriate data entity object. The group of an entity may also be used to interpret a data value. For example, an item named "Sales" may be represented in millions for companies, but in hundreds of thousands for business segments.

VRL Syntax and Interface

This section describes the functions associated with the various VRL constructs.

Statements:

The following statements are supported by VRL.

FOR: Defines the context of a plate; specifies the type of entity that will appear in any universe used by the plate (e.g., companies, securities, industries, countries, etc.), and thus the type of entity for which data will be retrieved and stored anywhere on the plate. Example:

```
FOR companies
```

WHERE: Modifies the current universe as initially defined by the For statement; acts as a filter allowing only those entities for which a given expression is true to pass, resulting in a new, smaller universe. Example:

```
WHERE DailyClosePrice<100
```

SET: The basic assignment statement; assigns a set of values to a new user-defined data item. The new data item is stored in system memory (but not in the database) for later reference. The expression on the right-hand side must be "conformable" with the current universe—that is, it must include one value for every member of the current universe. Example:

```
SET
  EarningsPerShare=NetIncome/LatestSharesOut
```

INSTALL: Makes a user-defined variable a permanent part of the database. Requires the same conformability as the SET statement (defined above). Example:

```
INSTALL
  Yield=CommonDividend/LatestMktValue
```

TEMP: Performs an assignment operation without requiring conformability between the right-hand side and the current universe. Useful in situations where the values being assigned simply do not correspond one-to-one with the entities in the current universe. Example:

```
TEMP
  Assets=Profile[Receivables,Cash&Equiv,Inventory,OtherAssets]
```

DELETE: Deletes any user-defined item. Example:

```
DELETE MyVariable
```

MAKE REPORT: Generates a report containing data item values for all entities in the current universe; the report will include columns for each item specified. Example:

```
MAKE REPORT Message (file:"MyReport")

Enclose (Sedol, Name, Cty_Name)
```

Operators:

The following operators are supported by VRL.

| | |
|---|---|
| + | add |
| − | subtract |
| * | multiply |
| / | divide |
| | exponentiate |
| = | equals |
| > | greater than |
| < | less than |
| <> | not equal to |
| <= | less than or equal to |
| >= | greater than or equal to |
| AND | logical AND |
| OR | logical OR |
| NOT | logical NOT |

Modifiers

The following three modifiers may appear in a database item reference. They modify the time range or "window" for which the item's values are retrieved. These modifiers may also appear in the FOR statement of any plate; when they do, they apply globally to every database retrieval and assignment performed on that plate. By default, the time window used in retrieving a data item has an ending point equal to the latest date for which data for that item is available, and extends backwards in time for one "period", where the length of a period is determined by the periodicity of the item. (For example, a window of one year is used for annual items, a window of one day for daily items).

date: Alters the ending point of the time window used in database retrieval; allows the user to specify an absolute date as the new ending point. Example:

```
SET MySales=NetSales {date:"31-Dec-86"}
```

offset: Alters the ending point of the time window used in database retrieval; allows the user to specify a new ending point relatively to the default ending point. Example:

```
SET MySales=NetSales {offset:2years}
```

over: Alters the size of the time window used in database retrieval. Example:

```
SET MySales=NetSales {over:5years}
```

The following two modifiers may appear in the FOR statement of any plate. They both enable a plate to be executed iteratively.

stepOver: Specifies that a plate is to be run several times, each time with a different ending date. The ending point is stepped back in time beginning with the current period. Example:

```
FOR companies {stepOver:5years}
```

toPass: Specifies that a plate is to be run several times. The system will define and increment the variable "Pass" automatically as the plate is iterated. Example:

```
FOR companies {toPass:5}
```

The following two modifiers may appear in the argument list passed to a statistical function (see Functions below).

within: Groups a data set into several sub-samples before it is operated on by a statistical function. Example:

```
SET D=Decile [within:cty_Name, NetSales]
```

(computes "within-country" deciles)

weights: Applies a given set of weights to the elements of a data set before it is operated on by a statistical function. Example:

```
SET A=Average [weights:LatestMktValue,EPS].
```

(computes a "cap-weighted" average)

The following two modifiers may appear in the Message clause of a Make Report statement. They give the report writer miscellaneous instructions as to how the report should be created and stored.

file: Specifies the file name under which the generated report will be stored. Note that this modifier is required. Example:

```
MAKE REPORT Message (file:"Scores")

Enclose (Name,MyScore)
```

template: Specifies a report template (created using the Template Editor) that contains formatting information to be used for the generated report. This modifier is optional; if no template is specified, a default format will be used. Example:

```
MAKE REPORT Message
  (file:"Scores",template:"ScoresFormat")

Enclose (Name,MyScore)
```

Functions

Arithmetical Functions: In addition to those invoked by the operators listed above, VRL provides the following "arithmetical" functions, whose distinguishing characteristic is that they operate on sets of values for individual entities in isolation from those of all other entities, and produce the same number of distinct values as output as they are given as input. (Compare this behavior with that of the Statistical Functions below).

The Abs[. . .] function substitutes positive values for all expressions which evaluate to a negative. The positive value which is substituted equals the negative value multiplied by "−1". This function is useful whenever it is necessary to compute a deviation from a norm and the direction of the deviation does not matter.

The Exp[. . .] function computes the exponential of its argument. This calculation is in base-e (i.e., the natural exponential is computed).

The Log[. . .] function computes the natural logarithm of its argument. This calculation is the inverse of that performed by the Exp[. . .] function.

The Minimum[. . . , . . .] function selects the lowest value from a set of expressions. In this sense, it is a multiple argument function. Arguments are separated by commas; the actual item chosen will be the one with the lowest value.

The Maximum[. . . , . . .] function selects the highest value from a set of expressions. Otherwise, it obeys all the rules set for the Minimum[. . . , . . .] function.

The Null[. . .] function checks for null or missing values; a missing value results in a true value and valid data results in a false value.

Statistical Functions: The following functions are classified as "statistical functions" in the sense that the results they produce depend on the entire set of values (or "sample set") they are given as input. Functions such as Average and Total produce only a single value as output regardless how many values appear in the sample set they operate on, while functions such as Percentile and Normalize produce the same number of values as they are given as input.

The Average[. . .] function computes a the mean of all the values in a given sample set.

The StdDeviation[. . .] function computes the standard deviation among all values in a given sample set.

The Total[. . .] function computes the sum of all the values contained in a sample set.

The Count[. . .] function computes the number of values contained in a sample set.

The Cumulate[. . .] function computes a running total of the values in a sample set; a new set is produced in which each value is the sum of the corresponding value in the original set and all the values before it.

The Percentile[. . .] function sorts the elements in a sample set in ascending order and assigns each element the percentile group value (i.e., a number from 1 to 100) into which it falls.

The Decile[. . .] function sorts the elements in a sample set in ascending order and assigns each element the decile group value (i.e., a number from 1 to 10) into which it falls.

The Quartile[. . .] function sorts the elements in a sample set in ascending order and assigns each element the quartile group value (i.e., a number from 1 to 4) into which it falls.

The Rank[. . .] function sorts the elements in a sample set in ascending order and assigns each element the integer value corresponding to its absolute rank within the set.

The HighRange[. . .] function computes the maximum value present in a sample set.

The LowRange[. . .] function computes the minimum value present in a data set.

The Normalize[. . .] function calculates the number of standard deviations each element is away from the average value of a sample set. The calculation is done in ascending order so that positive standard deviations represent values above the mean and negative standard deviations represent values below.

The Proportion[. . .] function will compute each element's weight relative to the entire sample set of which it is a part.

System Operation

Figure 7:
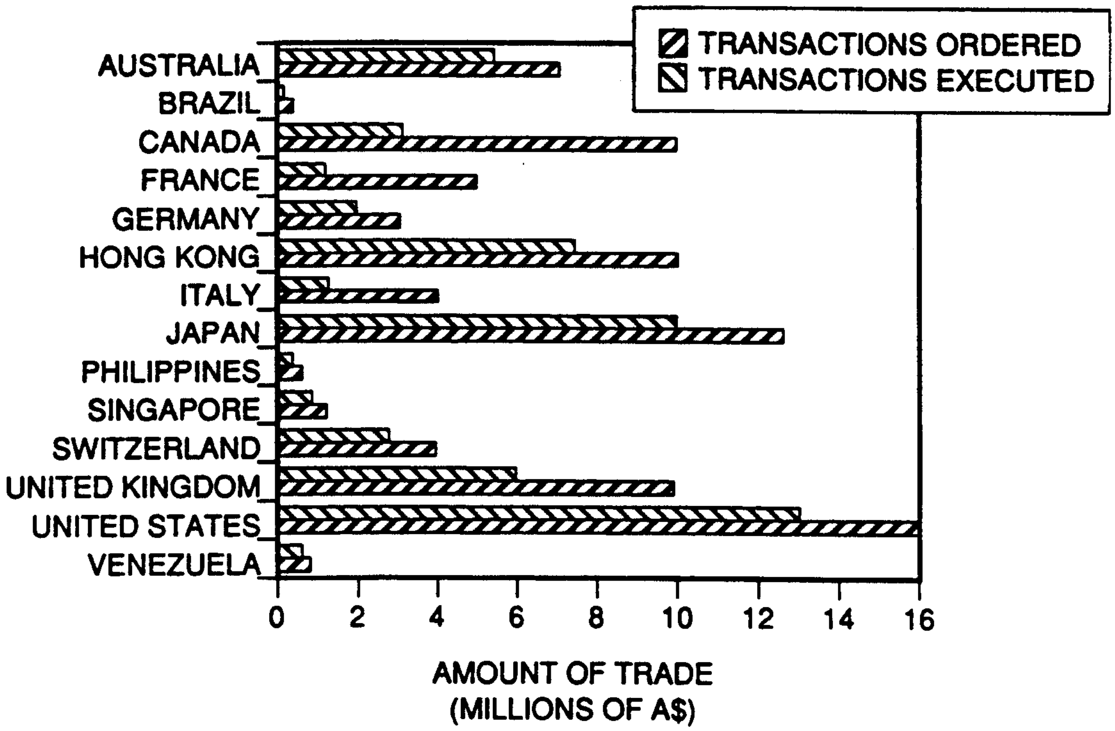
FIGS. 7A through 7H illustrate the windows, menus, and icons of the user interface to the system of FIG. 5A.

A brief discussion on of the research system user interface and operation is provided below System Window The main window 505 of the research system is illustrated in FIG. 7A. The window 505 shows the files and folders (directories) in the research system disk storage.

Each file or folder in the research system is represented by an icon 500. There are six main types of icons.

Referring to FIG. 7B, the model icon 510 contains a compass and protractor. It represents a strategic model that a user has created in the research system.

The template icon 515 has a page with four arrows. It represents a template that describes a particular format for a model-generated report. (For a further discussion of templates see Appendix B.)

The report icon 520 has a page with dashed lines. It indicates a model-generated report.

The chart icon 525 has a graph. It represents a chart that was generated at some point in a model by the user.

Referring to FIG. 7C, the trash icon 530 has a folder. Moving a file onto the trash icon will delete it.

The folder icon 535 has a folder. It represents a subdirectory of the current directory. A double-click on a folder will create a window to the contents of the folder. Such a window is illustrated by FIG. 7D.

Referring to FIG. 7E, in addition to the icons, the system window has an imbedded control menu at its upper left corner. This menu is selected by a mouse drag from the button 540. The menu allows the user to reduce the window to an icon (minimize), restore the window from iconic size, re-size the window, move the window, maximize the window size, move the window to the back of the screen, and close the window (exit the research system). Referring to FIG. 7F, the minimize and maximize functions may also be invoked by pushbuttons at the upper left of the window.

The main system window menu is invoked by holding down the right Mouse key when the Cursor is on an empty portion of the System Window. When the mouse is dragged, the options in the window may be selected. Options for creating new folders, emptying the trash (i.e., purging the deleted files), redisplaying the window (for clean-up), and logging out may be chosen. The applications option has an arrow to the right, indicating a secondary menu of research system applications which may be invoked.

Referring to FIG. 7H, one such application is the bulletin board. This is a small window that displays messages describing some of the Research System's activities as the application runs.

A second application is the template editor, with which the user can construct custom formats for model-generated reports.

The research model editor is the primary application of the research system. This editor is the work space which is used to experiment with and create models. When the research model editor is invoked, it opens a new, smaller window within the research system window. (Operations may still be performed in the research system window.)

Research Model Editor

Figure 8A:
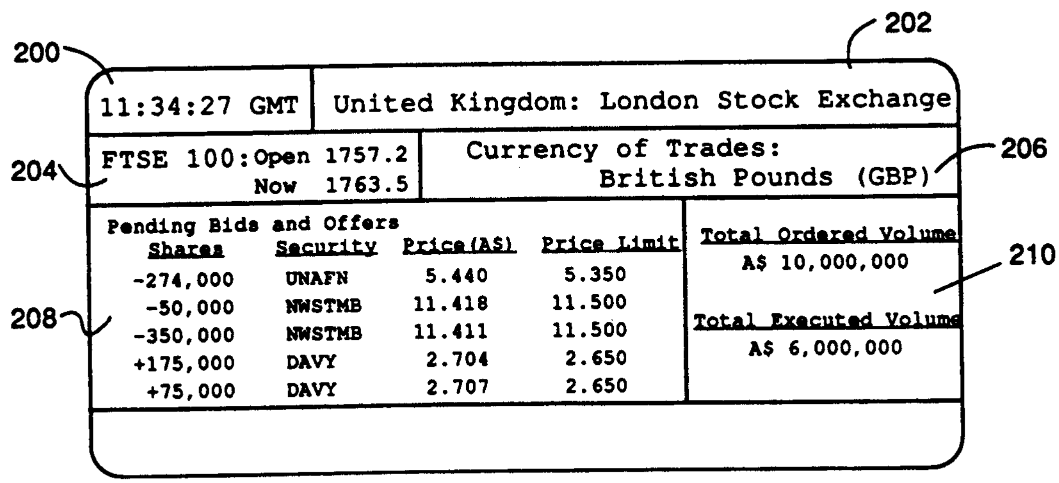

Referring to FIG. 8A, the main window of the research model editor is the work space for constructing VRL models. As discussed above, a VRL model consists of a series of one or more statements grouped onto one or more plates. The plates are displayed in the model area 550. The model of FIG. 8A is empty; it currently contains one plate with only a FOR and a NEXT statement, which serve as delimiters for the plate. Developing a VRL model involves constructing new statements and placing them onto a plate. Between the two lines of menu titles is the edit line 560. The edit line is where VRL statements are created or modified. Completed VRL statements are then placed onto a plate.

Sample Model Construction

The title bar 570 in FIG. 8A reads "Untitled" since the current model has not yet been saved and named. Below the title bar 570 are seven pull-down menus 571-577. Pull down menus are those where only the menu title appears. The options will appear when the menu title is clicked with the left Mouse button. The upper seven menus are "edit menus", which are used to create or modify VRL statements. The line of five menus 581-585 below are the command menus which will manipulate the current VRL model.

For the sake of example, assume that the user wished to devise a Return on Equity (RoE) strategy which found a short list of companies with low RoEs. To calculate RoE, the user would need to divide the company's cash flow by its equity. Cash flow can be defined as the company's pre-tax income plus depreciation minus half of its capital spending.

To enter the first statement in this model, the user would click the mouse in the edit line 560, which would change its color to white and move the text cursor to a thin vertical line (the Insertion Point) on the right side of the edit line. The type of statement being created appears in the box to the left of the Edit Line. The statement type SET is being created in FIG. 8A. The statement type may be changed by selecting a different one from the Statement Type menu with the left Mouse button (a full explanation of all the menus and options follows).

In a RoE model, the first step will be to create a cash flow variable. This requires a SET statement. As discussed above, the format for this statement is the keyword SET followed by the new data item's name (names currently used for the database data items, as shown in the Data Items menu, are reserved and may not be used) followed by an equal sign which is followed by an expression that defines the new data item:.

SET <new data item> = <expression>

Data item names can contain any number of alphanumeric characters. The case of the letters does not matter ("abc" is viewed as identical to "ABC," "Abc," aBC," etc . . . ) but the name must be one word. For this example, the new cash flow data item will be called "CashFlow."

Next, the appropriate data items which make up the cash flow must be entered into the right side of the statement. The data items menu 576 contains a complete list of all the data items in the database (a listing of all items with full definitions can be found in Appendix A).

To create the data item reference, the user pulls down the data items menu 576. Due to the large number of data items in the database, not all the data items fit on the screen. However, the user may scroll up or down the list by dragging the mouse cursor to the top or bottom of the list. Items scroll by ten at a time until the mouse cursor is moved away from the white line or until the top or bottom is reached. The data items which are selected in this way are: "PretaxIncome," "Deprec-&Amort," and "CapitalExpend."

There are three ways to put data items into the edit line 560: (1) Type it in with the keyboard; (2) Select it from the menu by releasing the Mouse button when it is highlighted—it will then be inserted following the Insertion Point (Operators, Modifiers, Functions, and Contexts also may be entered in either of the above two fashions); (3) Type in enough of the data item's name so that the only one data item in the list could complete what has been typed—hitting the Tab key will then fill in the rest of the data item.

If a mistake is made, the back space key will delete one character to the left of the Insertion Point. The → and ← keys will move the Insertion Point one space in either direction. Holding down the control and U keys (referred to as Ctrl-U) will erase the entire Edit Line.

On a plate, statements such as FOR and NEXT have a box around them. One statement's box is highlighted by being shaded in grey. The grey box is the Insertion Point for the plate. The Insertion Point may be moved to any statement by clicking the statement type box once with the left Mouse key. Clicking an already highlighted statement will bring it up to the Edit Line, allowing the user to modify it.

Figure 8B:
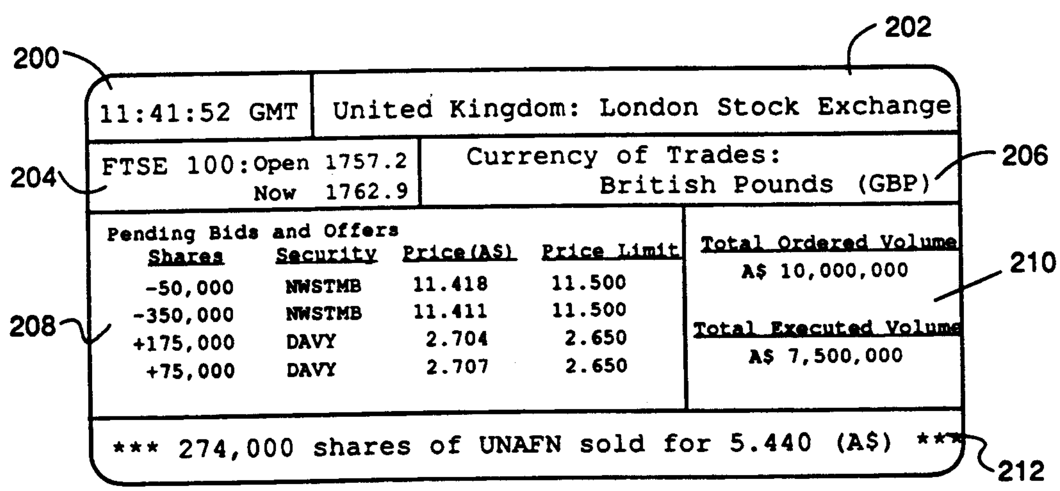
Figure 10A:
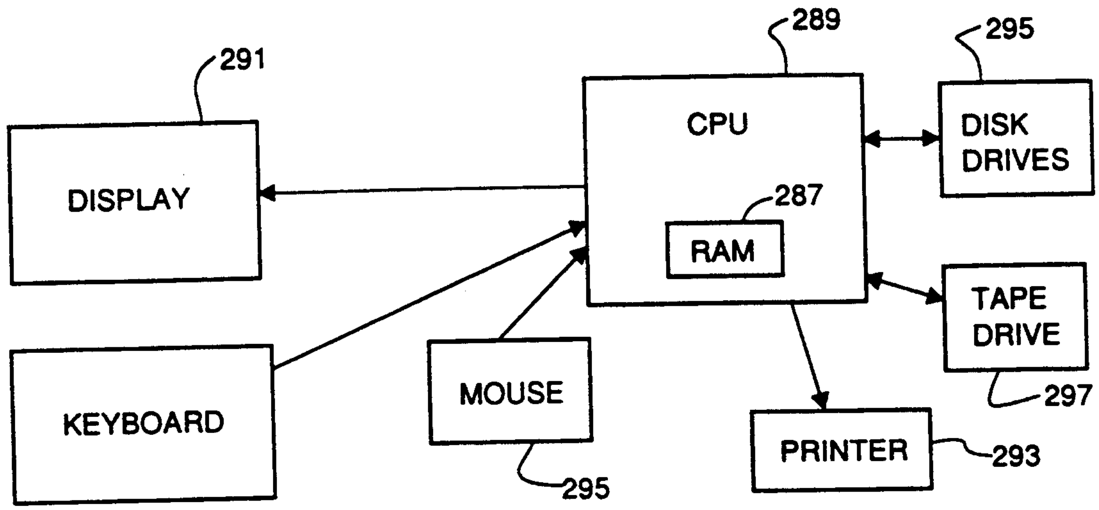
Figure 10B:
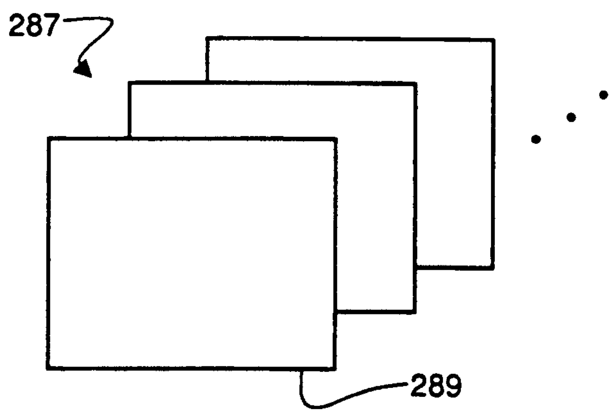
Figure 10C:
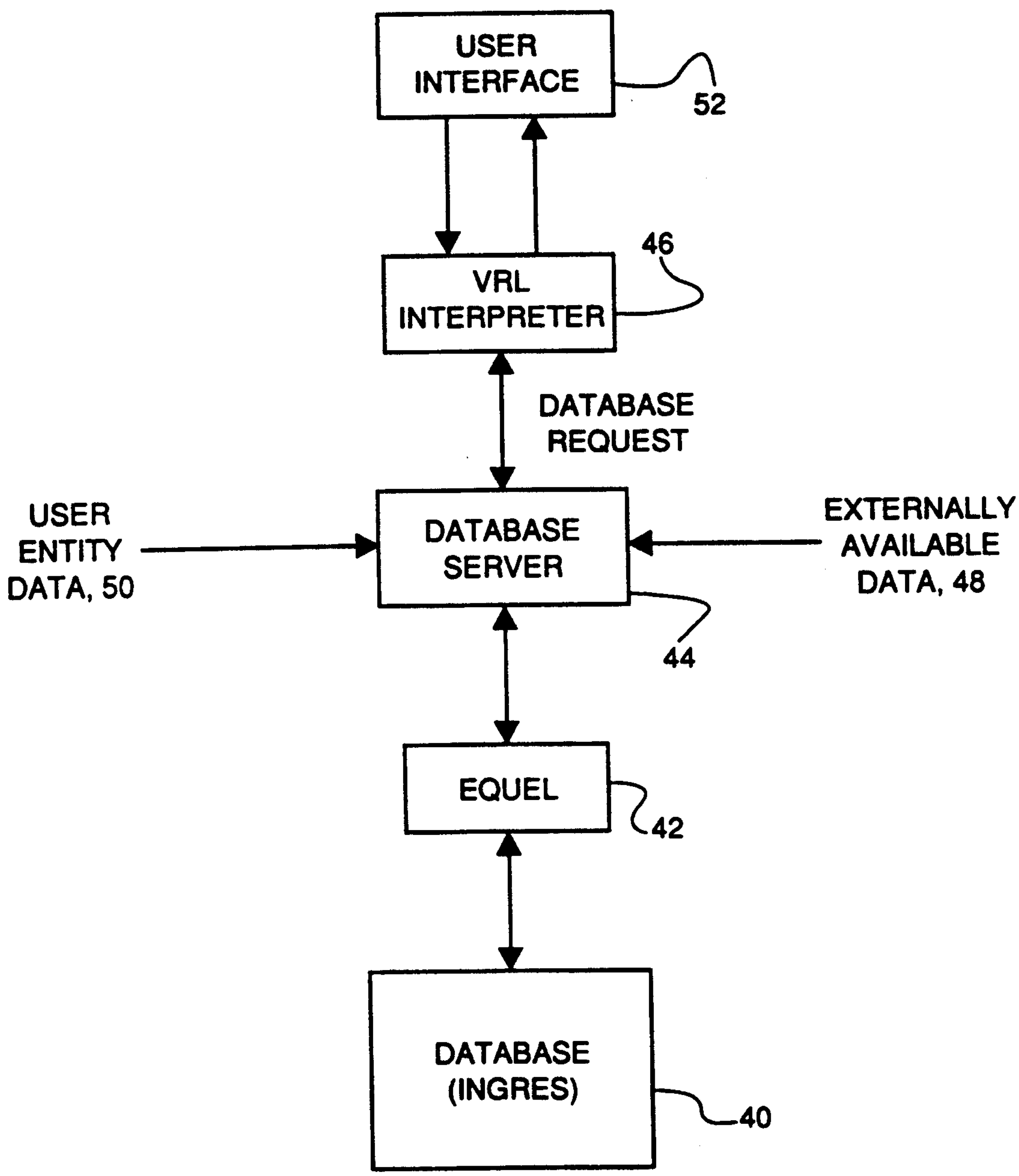
Figure 11:
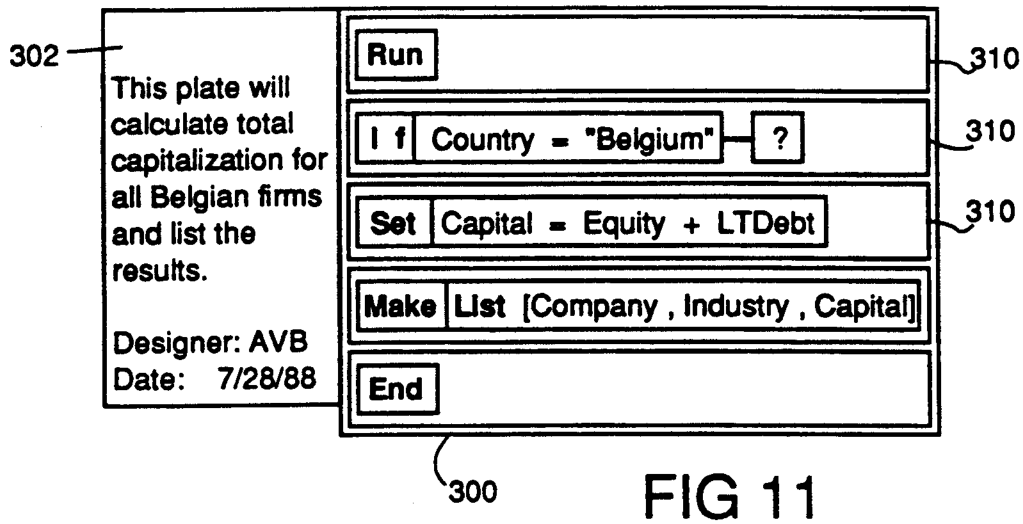
Figure 12:
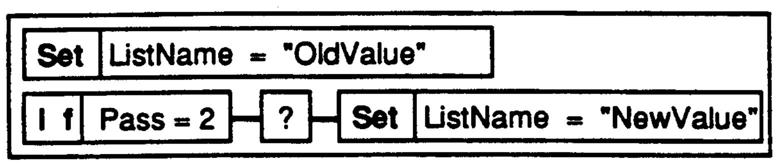
Figure 13:
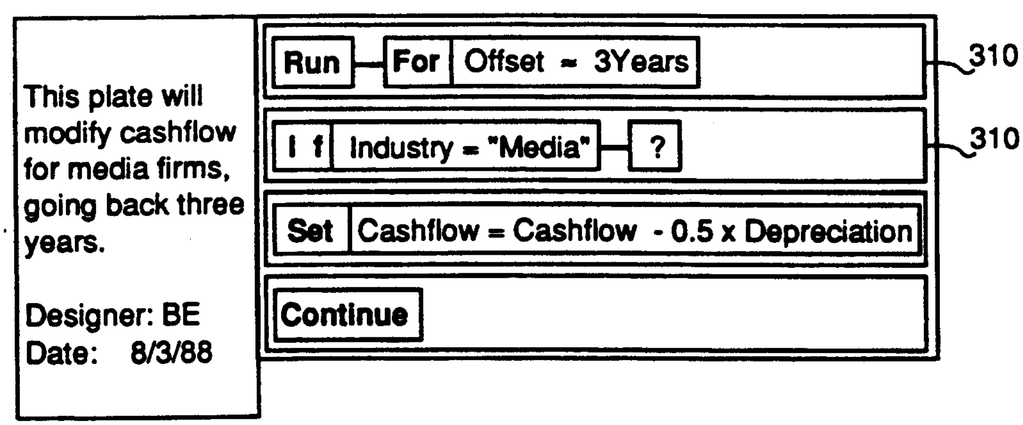
Figure 14A:
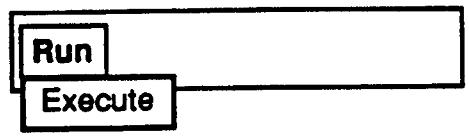
Figure 14B:
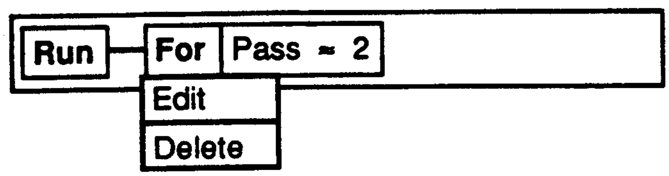
Figure 15A:
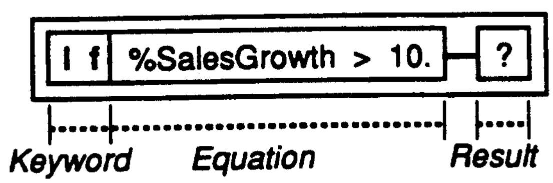
Figure 15B:
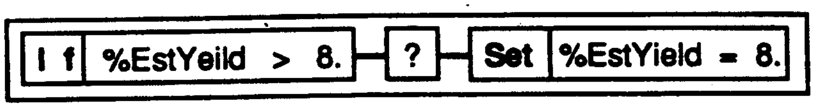
Figure 16A:
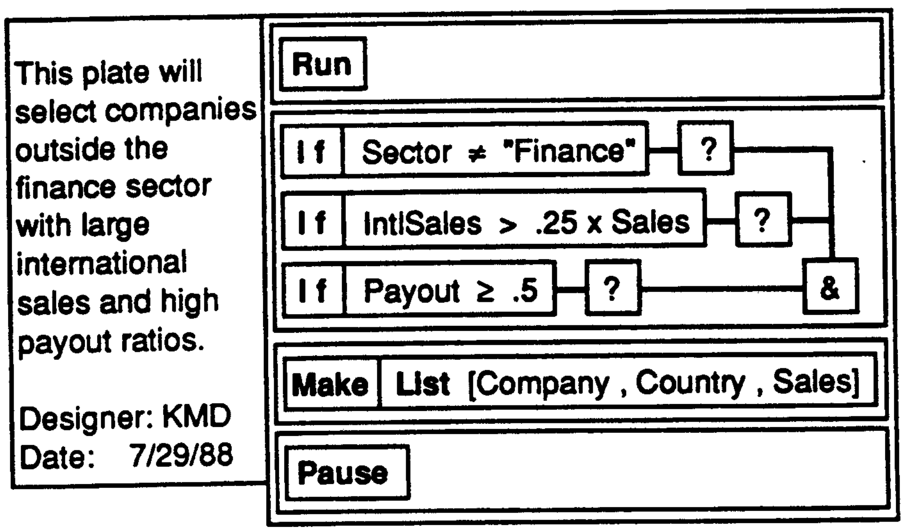
Figure 16B:
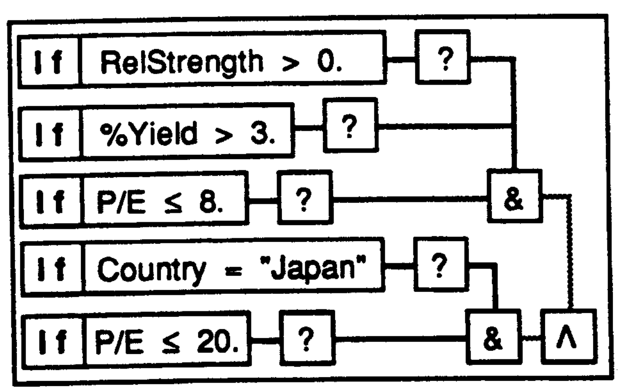
Figure 17:
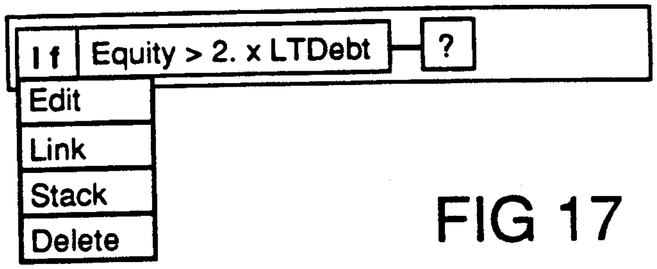
Figure 18:
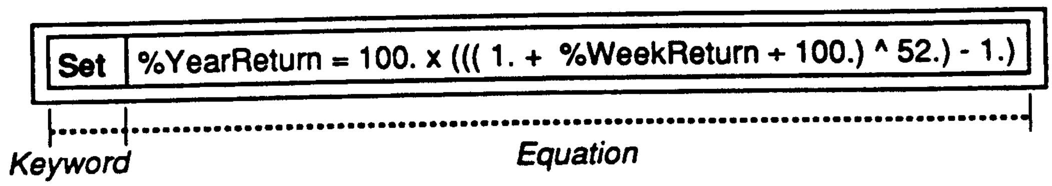
Figure 19:
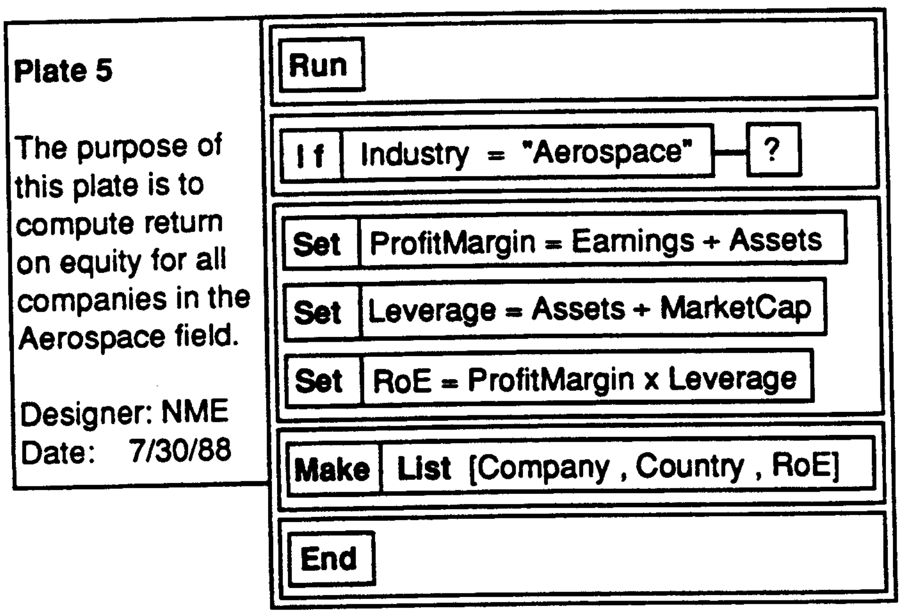
Figure 20:
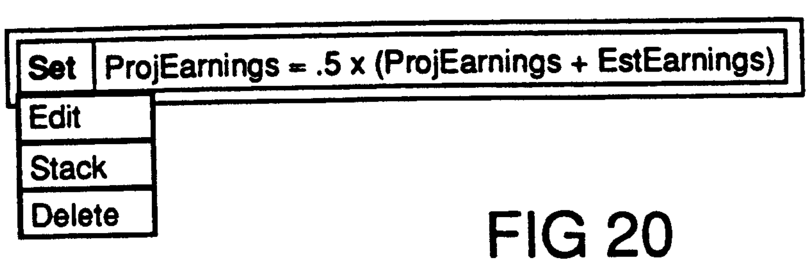
Figure 21:
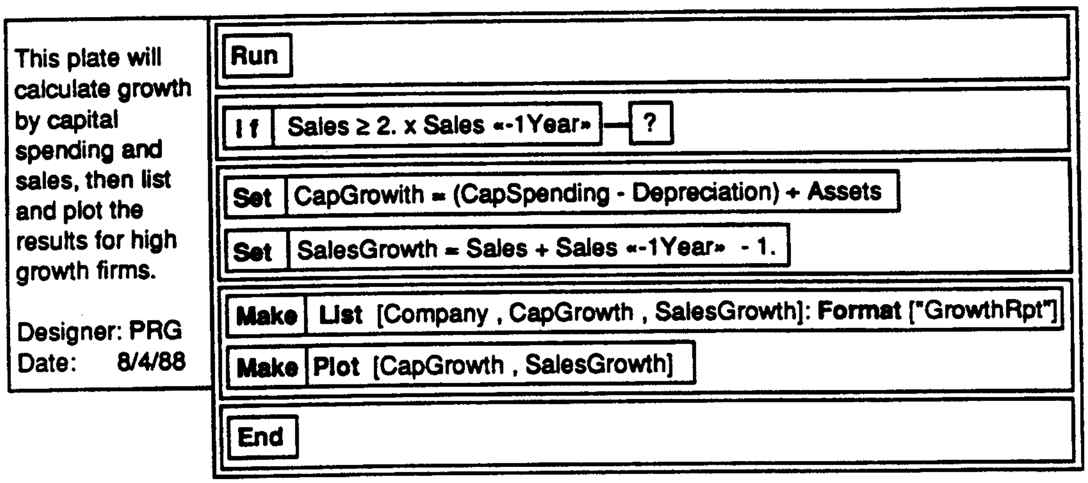
Figure 22:
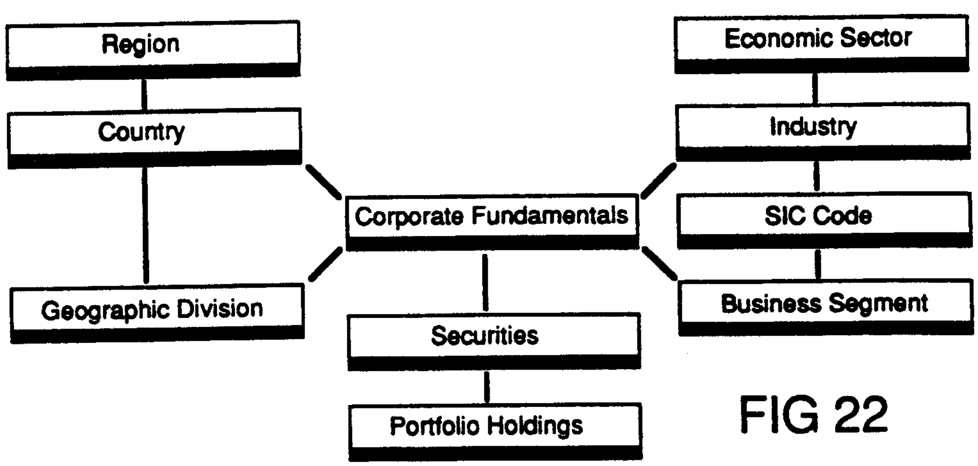
Figure 23:
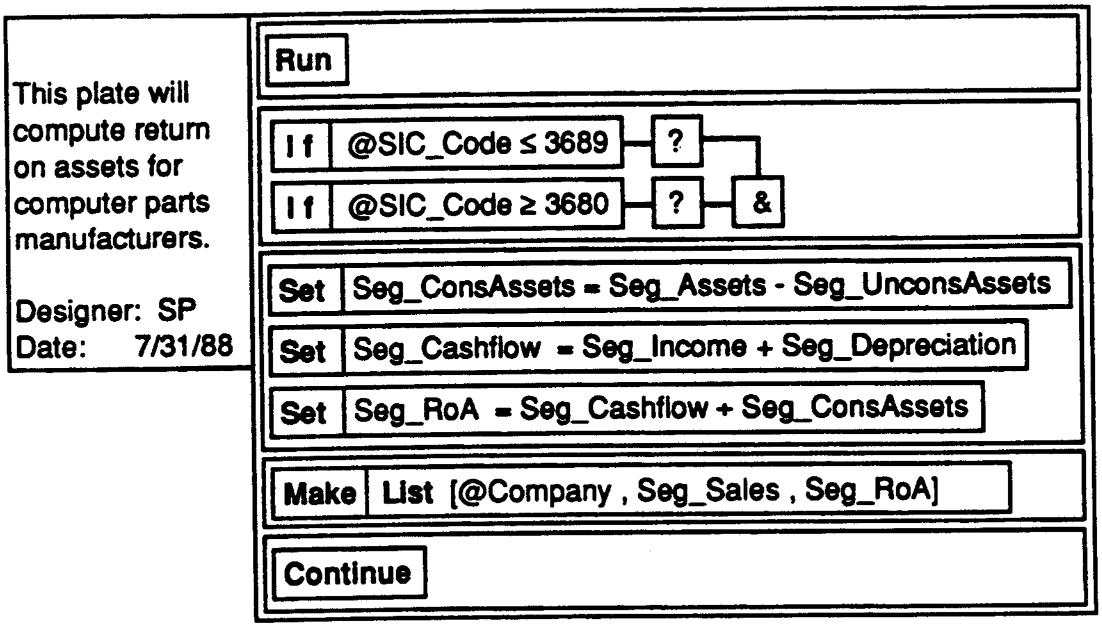
Figure 24:
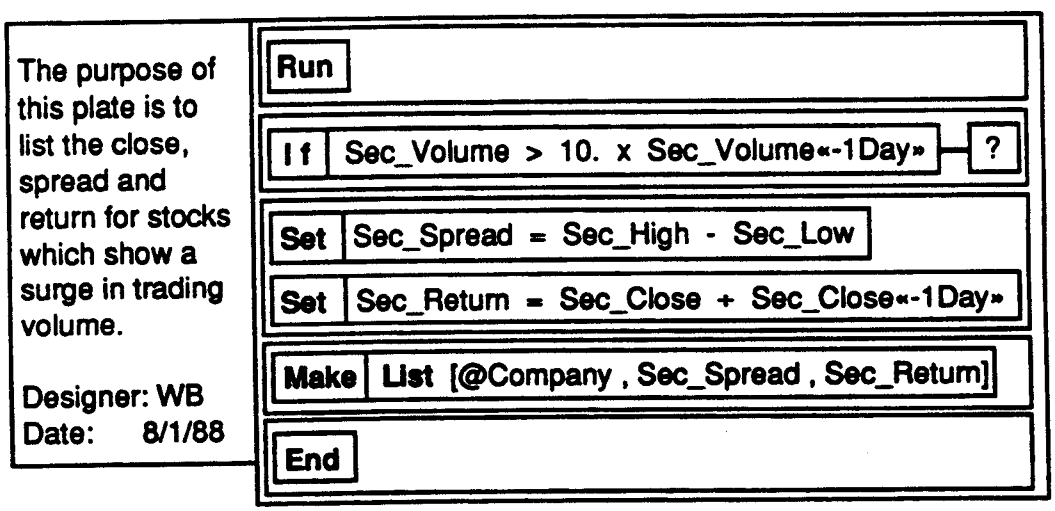
Figure 25:
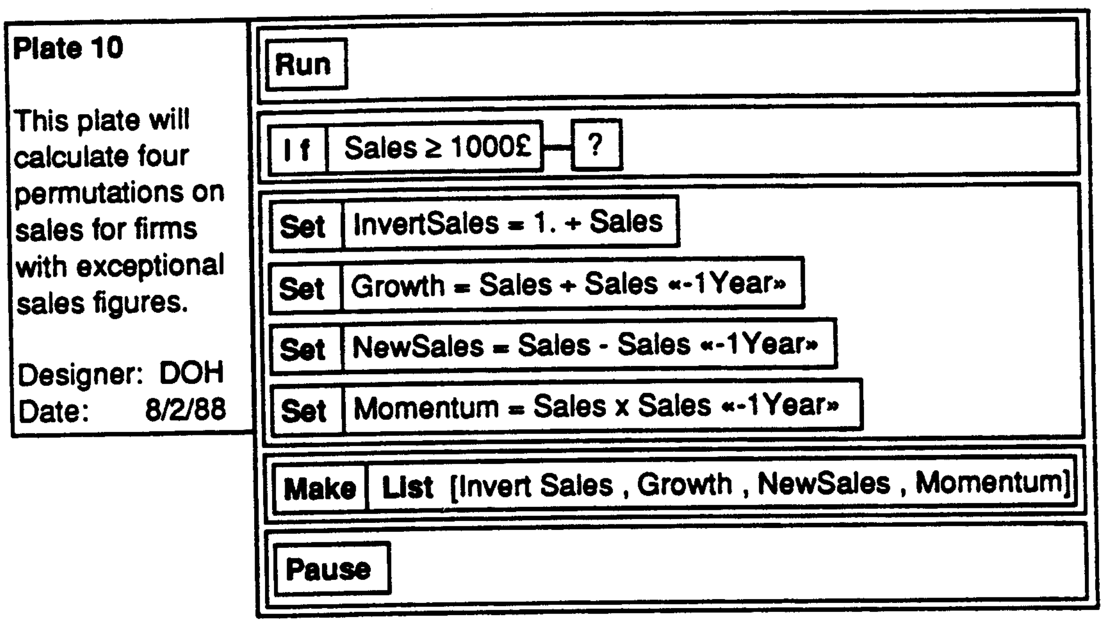
Figure 26A:
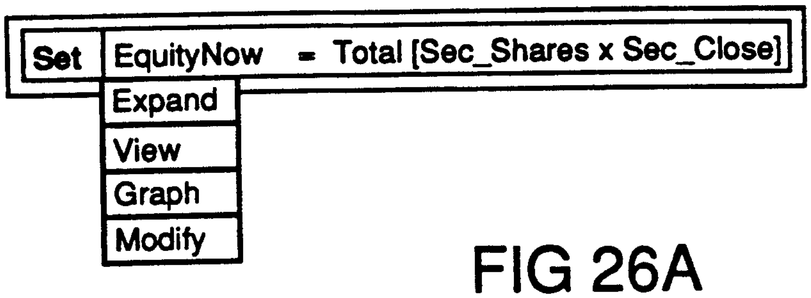
Figure 26B:
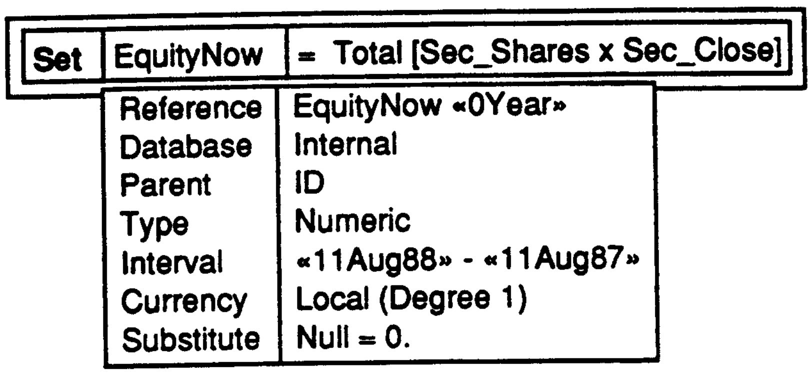
Figure 26C:
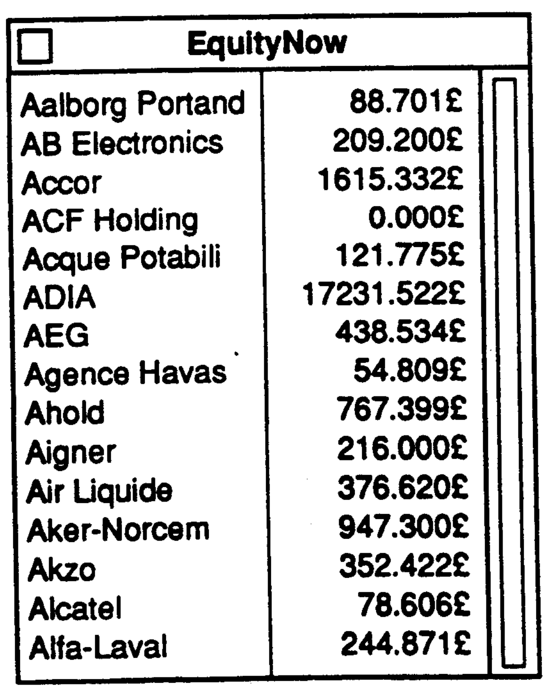
Figure 26D:
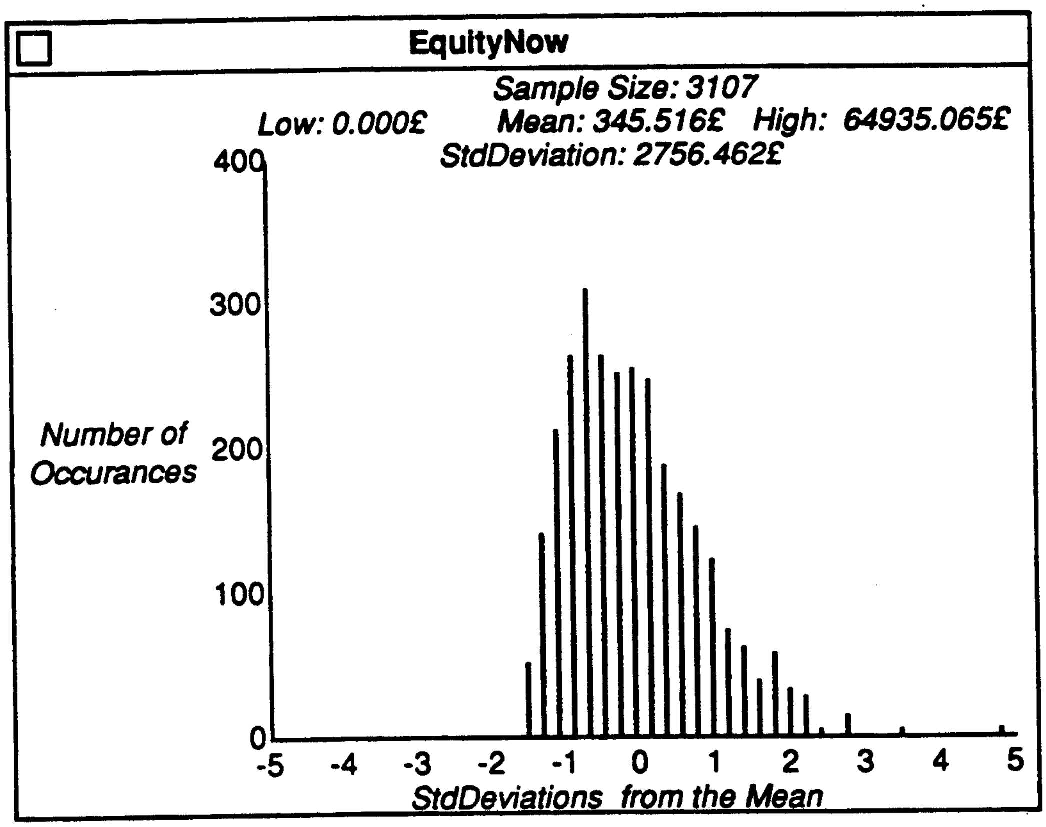
Figure 28A:
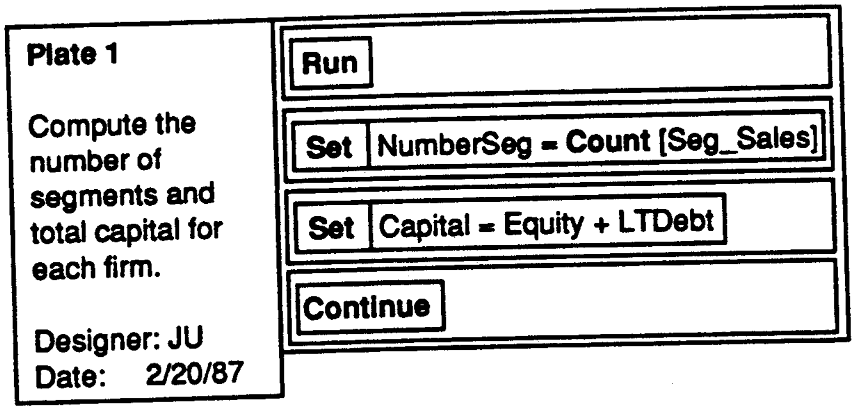
Figure 28B:
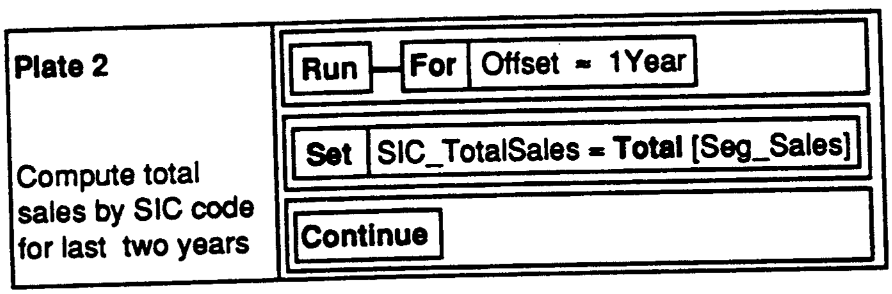
Figure 28C:
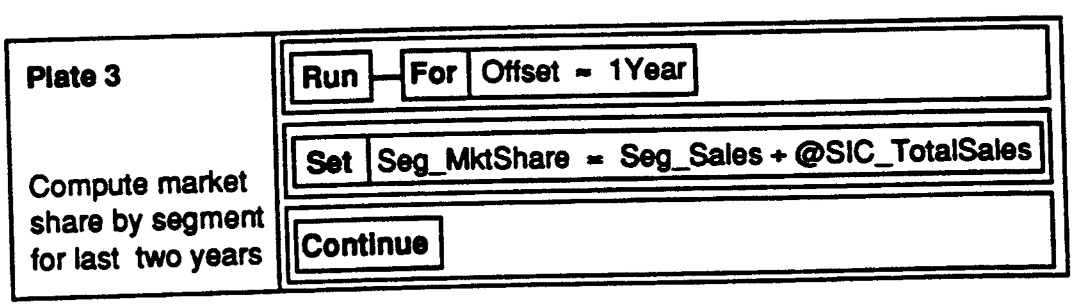
Figure 28D:
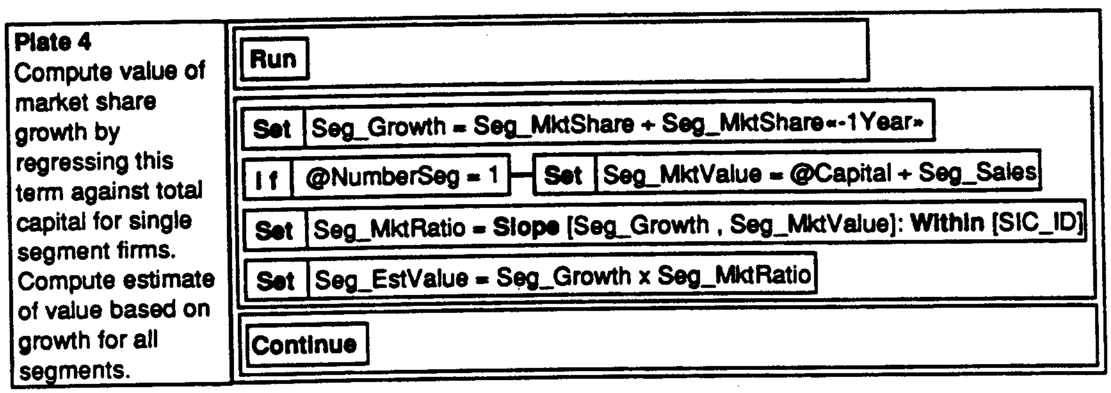
Figure 28E:
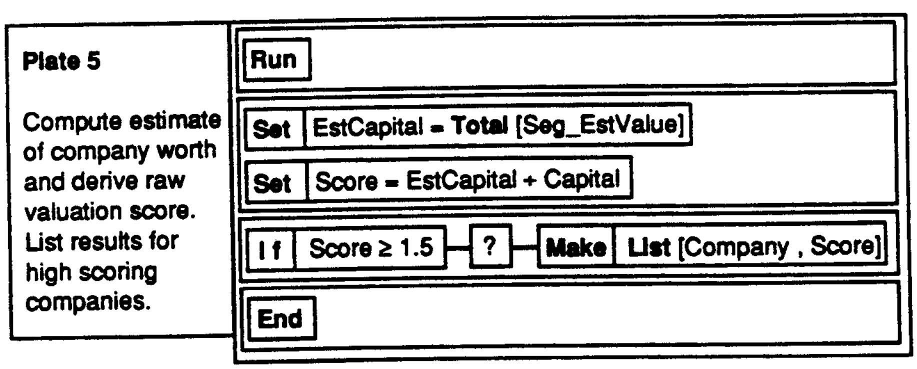

The completed SET statement for the RoE model is illustrated in FIG. 8B. When the statement is completed, it is entered onto the plate by opening the statement command menu 585 (FIG. 8A). In this menu, the user selects the InsertAfter option, which enters the Set statement into the plate after the FOR statement. Hitting the Return key will also perform an InsertAfter.

To finish the calculation of RoE, the user adds another statement:

SET RoE=CashFlow/CommonEquity

The complete RoE model is illustrated in FIG. 8C.

Next, data is retrieved for the model by clicking the run command 581 (there is no menu for this command, merely clicking it activates it).

While the research system is accessing the data for the model, each operation it is performing is indicated by item names being highlighted. When a data item to the right of the equal sign is highlighted, VRL is retrieving data. When the data item to the left of the equal sign is highlighted, VRL is calculating the new values. When the model run finishes, The message "Execution complete" appears (it will disappear when either Mouse button is clicked).

After the model has run, VRL will allow the user to examine the results of the model. To examine the models universe, the user moves the mouse cursor to the "For" keyword 551 in the FOR statement and holds down the right mouse button. The FOR keyword creates a menu with one option, current universe. Selecting this option will cause a message box to appear, which informs the user how many entities are in the initial universe for the model. In the example model, the "entities" are companies since that is the context specified by the FOR statement. The message box will disappear when either mouse button is clicked.

Next, to examine the data items created by the model, the cursor may be moved to "CashFlow". Holding hold down the right Mouse button will produce another menu, as illustrated in FIG. 8D. This menu will appear for any data item in a model once the model has been run. The options in the menu are List, Histogram, Line Plot, Column Plot, and Pie Plot. These options allow the user to examine the values associated with any data items referred to in the current model.

If the user selects List, a window 600 appears (FIG. 8E) that lists of all the current universe's entities and their respective values for the data item "CashFlow." To view a different page of the listing, the user may pull down the View menu 601 and choose either Next Page, First Page, Last Page, Previous Page or Go To Page. The list may also be scrolled by using a scroll bar 610 that appears at the bottom of the window.

The user may also pull down the Report menu 602 to generate a format report from the list. The format of the header, footer and data sections of the list and report can be configured by pulling down the Header 603, Footer 605, or Data 604 menus.

Lists created from data items in a model are temporary objects. Their minimized icons appear at the bottom of the research system window and cannot be moved. When the research system is closed and then reopened, these temporary items are deleted. If the user wishes to keep a list, it must be explicitly saved. The user can then move the list into a folder. Lists can be minimized into icons if the research system window becomes too cluttered.

As the purpose of the example model is to create a list of low-RoE companies, the user will need to add a WHERE statement to the program to filter the company names. However, the user need to know what the range of values for RoE is before deciding what a "low" RoE is.

Referring to FIG. 8C, this can be done by moving the mouse cursor to the "RoE" item, holding down the right Mouse button, and selecting Histogram from the menu (see FIG. 8D for the menu which will appear). The result is a new window with a chart that details the range and distribution of values for "RoE." The chart includes a counter called "sample size" that reveals the number of entities that have a value for "RoE." By noting the "Low," "Mean," "High," and "Std. Dev." (standard deviation) values reported, the user can decide where the target values lie. These numbers will vary from day to day as the database is updated and augmented. The chart may be saved or printed on the laser printer or the pen plotter by choosing the appropriate options from the chart menu. (The chart menu appears when the left mouse button is depressed in the chart window.)

During each revision of the model, it may be re-run by clicking on the Run button 581. When each run has finished, the mouse cursor may be moved through the statements, creating windows with reports or charts for analyzing the VRL operations. For example, the user may move to the "Where" in his new WHERE statement, hold down the right Mouse key, and select a Current Universe option. VRL then announces how many companies have RoEs within the specified range. If this list is too large or too short, the WHERE statement may be modified by bringing the statement up to the edit line (by highlighting it and then either choosing Edit from the Statement Command Menu 585 or by clicking the grey box around the "Where" keyword).

When the model is satisfactory, the user may create a report showing the name of each selected company, what its RoE was, and perhaps a few of the RoE components. This may be done with a MAKE REPORT statement.

If a MAKE REPORT statement is included in the model, VRL will automatically create a window in which the user may view the report. The report window is similar to the window for statement listings. Reports are sorted by default on the first column in ascending order. Other sorting styles may be selected from menus in the report window. Also, other parameters, such as the title of the report, may be changed. Any text or sorting changes may be saved from the report menus. Also, the report may be printed.

The entire VRL model may be saved by choosing Save from the model menu 583. The saved version of the model is stored in a file much as shown in FIG. 3B.

Editor Menus

Referring to FIG. 9A, the Statement Type menu 572 is used to change the type of the statement on the edit line 560. The statements available from the menu include FOR statements (this option will create a new plate), WHERE statements, SET statements, INSTALL statements, TEMP statements, DELETE statements, and MAKE REPORT statements. Embodiments which implement charts may also include a MAKE CHART statement.

Referring to FIG. 9B, the Operators menu 571 is used to add an operator to the edit line 560. Arithmetic and logical operators are supported.

Referring to FIG. 9C, the Modifiers menu 572 is used to add a modifier to the edit line 560. The modifiers discussed above are included.

Referring to FIG. 9D, the Functions menu 573 is used to add function calls to the edit line 560. Complex arithmetic and statistical functions are included.

Referring to FIG. 9E, the Contexts menu 574 is used to change the context specified by a FOR statement, a WHERE statement, or a data item. The contexts discussed in FIG. 2B are included.

A full list of the available data items can be obtained from the Data Items menu 576.

Any data items created by the user will appear in a list obtained from the User Data Items menu 577.

Referring to FIG. 9F, the Run item 581 is actually just a button; clicking on it begins execution of the current model.

Referring to FIG. 9G, the Options menu 582 provides the user with two toggle-type options.

Perform Auto Currency Conversion: When this option is activated (as shown by an asterisk to the left of the menu item), currency-denominated values will be converted to US dollars as they are retrieved from the database. When this option is not activated, all values will be reported in local currency.

Keep Expression Values: When this option is activated (as shown by an asterisk to the left of the menu item), all values retrieved from the database, as well as values assigned to new user-defined items, will be saved in memory. This means that, after a model has been executed, the user may go back and examine these values individually by creating ad hoc reports and graphs.

Referring to FIG. 9H, the Model menu 583 provides the following options:

Save: Saves the current model under a file name supplied by the user.

Print: Prints a listing of the current model on the laser printer.

Referring to FIG. 9I, the Plate menu 584 provides the following options:

InsertAfter: Inserts a new, empty plate after the current plate.

InsertBefore: Inserts a new, empty plate before the current plate.

Delete: Deletes the current plate.

Replace: Replaces the current plate with a new, empty plate.

Restack: Repositions plates to their initial, "cascading" order (see FIG. 4F) after they have been moved around by the user.

Referring to FIG. 9J, the Statement menu 585 provides functions which are performed on the statement in the edit line and the current statement in the model area 550. They are used to edit the current model.

InsertAfter: Inserts the statement in the Edit Line after the Current Statement. (Clicking with the left mouse button on the keyword of the statement in the edit line will also execute this function, as will pressing the [RETURN] key while the text cursor is on the edit line.)

InsertBefore: Inserts the statement in the edit line before the Current Statement.

Delete: Deletes the current statement.

Replace: Replaces the current statement with the statement in the edit line.

Edit: Places the current statement into the edit line so that it can be edited. (Clicking with the left mouse button on the keyword of the current statement will also execute this function.)

Note that the menu items which do not apply to the current statement or plate are crossed out and can not be selected. For example, in FIG. 9J, the InsertBefore and Delete options are crossed out because there is no current statement on the plate that may be deleted or inserted before.

Other Embodiments

Other embodiments are within the scope of the claims which follow the appendices. For example, the research system may be used to screen entities from the current universe using simple conditions on their data items. This "screening" application would thus not use VRL formalisms to calculate scores for the entities. In these embodiments, a fully graphical interface could replace the display of VRL statements. The conditions for screening the entities would be selected from menus, and the system would display a meter-graph that dynamically indicates the number of entities in the current universe, and show the change in this number as the screening conditions operate upon the universe of entities.

Copyright Notice

A portion of the disclosure of this patent document contains material which is subject to copyright protection (for example, the microfiche Appendix B). The copyright owner has no objection to the facsimile reproduction by anyone of the patent document or patent disclosure, as it appears in the Patent and Trademark Office patent file or records, but otherwise reserves all copyright rights whatsoever.

APPENDIX A: Database Reference

This appendix documents the contents of the database, listing the economic entities for which it may hold data and the predefined data items (or variables) that serve as the basis for investment strategies.

ECONOMIC ENTITIES

The database associates data with entities, each of which correspond to real-world economic entities of one type or another. Countries, industries, companies, and securities are all examples of entities recognized by the database. Moreover, the database also recognizes the relationships that exist in the real world among entities of different types. It knows, for instance, that the company "IBM" is associated with the country "United States" and with the industry "Computers". The treatment of countries, industries, and companies as linked database entities in this manner is what allows the VRL user to perform aggregation and "country-relative" or "industry-relative" analyses.

The database entities recognized by the database are listed below by type.

| | | |
|---|---|---|
| Regions: | | |
| Africa | Asia | Europe |
| North America | Oceania | South America |
| Countries: | | |

-continued

| | | |
|---|---|---|
| United States | Japan | United Kingdom |
| Canada | France | West Germany |
| Australia | South Africa | Netherlands |
| Italy | Sweden | Hong Kong |
| Switzerland | Belgium | Spain |
| Denmark | Malaysia | Singapore |
| Norway | New Zealand | South Korea |
| Finland | Austria | |
| Sectors: | | |
| Consumer stable | Technology | Industrial |
| Utilities | Energy | Consumer Durable |
| Food | Finance | Retail |
| Metal/Wood | Transport | Other |
| Major Industries: | | |
| Aluminum | Iron & Steel | Gold |
| Metals | Coal & Uranium | |
| International Oil | Domestic Oil Reserves | |
| Foreign Oil Reserves | Oil Refining/Distribution | |
| Oil Services | Forest Products | |
| Paper | Agriculture/Food | |
| Beverages | Liquor | |
| Tobacco | Construction | |
| Chemicals | Tires | |
| Containers | Producer Goods | |
| Pollution Control | Electronics | |
| Aerospace | Computers | |
| Soap/Housewares | Cosmetics | |
| Apparel/Textiles | Photo/Optical | |
| Consumer Durable | Auto/Motor Vehicle | |
| Leisure/Luxury | Health/Non Drug | |
| Drugs/Medicine | Publishing | |
| Media | Hotel/Restaurant | |
| Trucking/Freights | Railroads/Transit | |
| Air Transport | Water Transport | |
| Retail (Food) | Retail (Non Food) | |
| Telecommunications | Electric Utilities | |
| Gas Utilities | Banks | |
| Savings & Loans | Finance | |
| Life Insurance | Insurance | |
| Real Estate | Mortgage Finance | |
| Services | Miscellaneous | |

Industries

Roughly 1700 industry divisions at the 4-digit SIC code level.

Companies

Roughly 5000 companies representing the following Countries:

| Country | Number of Companies |
|---|---|
| United States | 2471 |
| Japan | 564 |
| United Kingdom | 318 |
| Canada | 189 |
| France | 169 |
| West Germany | 120 |
| Australia | 86 |
| South Africa | 77 |
| Netherlands | 76 |
| Italy | 59 |
| Sweden | 58 |
| Hong Kong | 46 |
| Switzerland | 42 |
| Belgium | 40 |
| Spain | 37 |
| Denmark | 37 |
| Malaysia | 34 |
| Singapore | 29 |
| Norway | 29 |
| New Zealand | 25 |
| South Korea | 24 |
| Finland | 24 |
| Austria | 15 |
| Mexico | 14 |
| Portugal | 0 |

Securities

Roughly 5000 securities, with the same Country breakdown as shown above for Companies.

ITEM DEFINITIONS

The following is a list of the names of and contents of the items in the database.

AcctsPayable

Accounts Payable; represents obligations to be met within one year or within the normal operating cycle of a corporation. This item includes:

Accounts payable

Trade acceptance

Brokerage house accounts payable to brokers

AccumDeprec

Accumulated Depreciation; represents the decline in the useful economic value of an asset due to use and obsolescence. The accumulated amount of depreciation represents the expense relating to the fixed assets still carried on the books. This item includes:

Accumulated depreciation

Accumulated depletion

Accumulated amortization

Excess depreciation (for non-US corporations)

Book

Book Value Per Share; represents the value of a corporation determined by dividing the number of outstanding shares into a corporation's net assets.

CapitalExpend

Capital Expenditures; represents the acquisition of a long-term asset such as land, plant or machinery.

Cash&Equiv

Cash & Equivalents; represents the sum of cash and short-term investments. It includes money and other instruments normally accepted by the banks for deposit and immediate credit to a customer's account. This item includes:

Cash on hand

Bank drafts

Demand certificates of deposits

Letters of credit

Money orders

Time certificates of deposits

Eurodollar bank time deposits

This item excludes:

Commercial paper

Promissory notes

Marketable securities

CommonDividend

Common Dividends; represents the total cash dividends paid on a corporation's common stock during the fiscal year, including special dividends.

CommonEquity

Common Equity; represents common shareholders' investment in a corporation. This item includes:

Common stock

Capital surplus

Retained earnings

Cumulative gain or loss of foreign currency translation.

This item excludes:

Common treasury stock

Accumulated unpaid preferred dividends

CommonShares

Common Shares; represents the total number of common shares outstanding plus the common shares held in the corporation's treasury.

CostGoodsSold

Cost of Goods Sold; represents all costs directly allocated by a corporation to the production of goods, such as material, labor, overhead, etc. The total operating costs for non-manufacturing corporations are considered as Cost of Goods Sold if a breakdown is not available. This item includes:

Direct labor

Amortization of deferred costs

Heat, light, and power

Licenses

Operating expenses

Maintenance and repairs

This item excludes:

Foreign exchange adjustments

Idle plant expense

Miscellaneous expenses

CurLiabilities

Total Current Liabilities; represents the sum of all debt or other obligations that a corporation expects to satisfy within one year. This item includes:

Current debt

Accounts payable

All accrued expenses

Current portion of long term debt

Negative inventories (non-US companies)

Obligations expected to be satisfied within four years (West German companies)

CurrentAssets

Total Current Assets; represents cash and other assets that are expected to be realized in cash or used in the production of revenue within the next 12 months. It is the sum of cash & equivalents, accounts receivables, inventories, and other current assets.

CurrentDebt

Current Debt; represents liabilities due within one year, including the current portion of long-term debt. This item includes:

Notes payable

Contracts payable

Current portion of advance payments

Cusip

CUSIP; a CUSIP number is assigned to uniquely identify US securities, and consists of a six-digit "issuer" number followed by a two character suffix identifying the issue among multiple issues from the same issuer.

DailyClosePrice

Daily Closing Price; represents the closing price of a security as reported by the listed exchange. This is a daily series. The database includes daily prices from the following services (all are currently unadjusted for corporate actions):

Telstat via Prose (US securities)

Telstat via the CPrice files and DO'H (Canadian securities)

IDC international transmission (other non-US securities)

BFM IPrice files (history)

I. P. Sharp (history)

DailyExchRate

Daily Exchange Rate; the rate at which a currency is exchanged for another currency. This is a daily series. The research system uses these rates internally to convert currency-denominated values into US dollars whenever the user so desires. These rates are collected from the following services:

IDC international transmission (25 countries)

DeferredTaxes

Deferred Taxes; represents the accumulated tax deferrals due to timing differences between the reporting of revenues and expenses for financial statements and tax forms.

Deprec&Amort

Depreciation & Amortization; represents non-cash charges for obsolescence of and wear-and-tear on property, allocation of the current portion of capitalized expenditures, and depletion charges. This item includes:

Amortization of patents, trademarks, and other intangibles

Amortization of capitalized leases

Amortization of leasehold improvements

Depletion charges

EPS

Earnings Per Share; equals a corporation's earnings divided by the number of its shares outstanding. The earnings figure used does not include extraordinary items.

ExtraOrdItems

Extraordinary Items & Discontinued; represents items of income designated by a corporation as nonrecurring or unusual. For non-US companies, this category includes anything that is classified as extraordinary, even if it does not satisfy the US definition of "extraordinary". Any item that could be classified as an extraordinary item can also be shown before taxes and would be included in Special Items.

FiscalYrEnd

Fiscal Year End Month; represents a corporation's most current year-end month (it is a number in the range 1-12). This item is used in assigning dates to all fundamental data values in the database; a fundamental value is assigned a date equal to the corporation's reporting date, including the calendar year in which that reporting date falls. Any arbitrary year assignments made by data vendors (e.g., WorldScope) are undone.

GrossMargin

Gross Margin; represents the difference between sales and cost of goods sold.

GrossProperty

Gross Property, Plant & Equipment; represents the cost of tangible assets with an expected useful life of over one year which are expected to be used to produce goods for sale or in the production of revenues. This item includes:

Land

Buildings

Machinery

Work in progress

Furniture and fixtures

Broadcasting rights

This item excludes:

Computer software

Idle land

Goodwill

IncomeTaxes

Income Taxes; represents all income taxes imposed by the federal, state and foreign governments on the income of a corporation. This item includes:

Federal income taxes

State income taxes

Foreign income taxes

Deferred income taxes

Charges in lieu of income taxes (for non-US companies, this item is net of any tax credits due to previous years' losses)

InterestExp

Interest Expense; represents the service charge for the use of capital. This item includes:

Interest expense on short term debt

Interest expense on long term debt and capitalized lease obligations

Amortization expense associated with the issuance of debt

Financing charges

Inventories

Inventories; represents items bought for resale and materials & supplies purchased for use in production of revenue. This item includes:

Finished goods

Work in process

Raw materials and supplies

Advances and deposits to subcontractors

Office supplies

This item excludes:

Supplies and prepaid expenses for companies that lump these items together

Unbilled costs on contracts and costs in excess of related billing

LatestSharesOut

Latest Shares Outstanding; represents the number of shares of a security currently outstanding.

LongTermDebt

Long Term Debt; represents all interest-bearing financial obligations, excluding amounts due within one year. This item includes:

Mortgages

Bonds

Debentures

Convertible debt

Long term notes

Medium term notes

MinInterestBal

Minority Interest (balance sheet); represents the portion of the net worth (at par) of a subsidiary pertaining to shares not owned by the controlling corporation or its consolidated subsidiaries. This item includes:

Dividends in arrears on subsidiary preferred stock not owned by the parent corporation MinInterestInc Minority Interest (income statement); represents the portion of earnings/losses of a subsidiary applicable to common stock not owned by the parent corporation. A negative number increases net income and a positive number decreases net income.

MktValue

Market Value; represents the historical price times the outstanding total number of common shares.

MnthEndClosePrice

Month-end Closing Price; represents the closing price of a security as reported by the listed exchange. This is a monthly series. Monthly prices are collected from the following services:

WorldScope

Telstat via the CPrice files and DO'H (Canadian securities)

BFM IPrice files

Compustat PDE

I. P. Sharp

MnthEndExchRate

Month-end Exchange Rate; the rate at which a currency is exchanged for another currency. This is a monthly series. The research system uses these rates internally to convert currency-denominated values into US dollars whenever the user so desires. Rates are collected from the following services:

I. P. Sharp

BFM IPrice files

WorldScope

Name

Name; an alpha-numeric string that identifies a database entity. Note that this item is available for all entities in the database, including companies (e.g., "Ford Motor Corp."), countries (e.g., "United States"), sectors (e.g., "Consumer Durables"), etc.

NetIncome

Net Income; represents income after all operating and non-operating income and expenses, reserves, minority interest and extraordinary items.

NetProp&Other

Net Property, Plant & Equipment; represents Gross Property, Plant & Equipment less accumulated reserves for depreciation, depletion, and amortization. This item includes:

Land (net)

Buildings (net)

Machinery (net)

Work in progress

Furniture and fixtures

Broadcasting rights

NetSales

Net Sales; represents gross sales and other operating revenue less discounts, returns and allowances. For non-US companies, this item includes only sales from principal activities; income from miscellaneous operations is included only when the corporation includes it. This item includes:

Revenue from any permanent source

Installment sales

Franchise sales

Consulting fees

Service income

Contracts in progress

Income from equipment leases

This item excludes:

Non-operating income

Interest income

Dividend income

Sale of land or natural resources

NonoperatingExpense

Nonoperating Income/Expense; represents any income or expense items resulting from secondary business-related activities, excluding those considered part of normal operations of the business. Nonoperating income and expenses will be reported as a net figure with nonoperating income treated as a positive number and nonoperating expense treated as a negative number. This item includes:

Income:

Dividend income

Franchise income

Rental income

Equity in earnings of a non-consolidated subsidiary

Royalty income

Interest income

Other income

Expenses:

Amortization of deferred credit

Amortization of negative intangibles

Foreign exchange adjustments

Idle plant expense

Miscellaneous expenses

Other expenses

OtherAssets

Other Assets; represents long term assets not included in property, plant and equipment, investments, intangibles, or deferred charges.

OtherCurAssets

Other Current Assets; represents accounts other than cash and equivalents, receivables and inventories that may be converted into cash within one year. This item includes:

Prepaid insurance expense

Deferred expenses

Prepaid property taxes

Prepaid rent

Deposits and advances to others

OtherCurLiab

Other Current Liabilities; represents those current liabilities besides debt, trade accounts payable, and income taxes that are due in 12 months or less. This item includes:

Accounts payable due to parents and consolidated subsidiaries

Accrued expenses

Advances

Contracts payable

Dividends declared

Other accounts payable

OtherOperExp

Other Operating Income/Expense; represents any other source of income or expense not included in funds from the normal operations of a company. This item includes;

Disposal of fixed assets

Proceeds from stock options and issuance of debt

Sale of stock

Idle plant time

OtherLTLiabOther

Other Long Term Liabilities; represents all other long-term debt not fitting into one of the other classifications.

PrefDividends

Preferred Dividends; the total cash dividends paid on a company's preferred stock during the year.

PrefEquity

Preferred Equity; represents the portion of a corporation's equity on which preferred shareholders have a claim (prior to that of common shareholders) in the event of liquidation. For US corporations, its value is shown at the total involuntary liquidation value of the number of preferred shares outstanding at year end. For Non-US corporations, the stated value of the preferred stock is shown and it includes all preferred stock related accounts.

PretaxIncome

Pretax Income; represents operating and nonoperating income before provisions for income taxes, minority interest and extraordinary items.

R&DExpense

Research and Development Expense; represents all direct and indirect costs related to the creation and development of new processes, techniques, applications and products with commercial possibilities.

Receivables

Accounts Receivable; represents claims against other collectibles owed to the corporation resulting from the sale of goods and services on credit. These assets should be collected within one year of the balance sheet date. This item includes:

Trade accounts
Accrued interest
Dividends receivables
Trade notes and receivables
Receivables of discontinued operations
Medium-term and long-term trade receivables (for non-US companies)
Amounts due from unconsolidated subsidiaries Sedol SEDOL (Stock Exchange Daily Official List); The SEDOL numbering system was developed by the London Stock Exchange (LSE) for use with securities traded in the U.K. The LSE maintains a database of international securities and is responsible for allocating SEDOL numbers at the request of Extel, Reuters, and members of the LSE. SEDOLs are significant to 6 digits.

SG&AExpense

Selling, General, & Administrative Expenses; represents expenses not directly attributable to the production process but relates to selling, general and administrative functions. For non-US corporations it includes provisions for doubtful accounts. This item includes:

Marketing expenses
Pension costs and other employee benefits
Parent corporation charges for administrative services
Payroll taxes
Social Security taxes
Research and development costs
Related expenses for software development

SIC 4-digit SIC Code; identifies the principal line of business into which a corporation is classified, as determined by the principal product and/or service it provides. For non-US companies, the database currently maps WorldScope industry-classification data back to the US SIC system.

SpecialItems

Special Items; represents unusual or nonrecurring items presented before taxes by the corporation. This item includes:

Adjustments applicable to prior years (not including income tax adjustments)
Discontinued operations and operations to be discontinued
Flood, fire and other natural disaster losses
Nonrecurring profit or loss on the sale of assets, investment & securities
Write-downs or write-offs of receivables, intangible, etc.

Ticker

Ticker; The stock's trading symbol, used to identify the corporation on the stock exchange on which it is listed.

TotalAssets

Total Assets; represents the sum of current assets, net property, plant, and equipment, and all other non-current assets.

TotalLiab

Total Liabilities; represents all short and long term obligations expected to be satisfied by the corporation. It includes current liabilities plus long term debt plus other non-current liabilities.

TotalShares

Total Shares; represents the total of common and preferred shares issued.

TotLiab&Worth

Total Liabilities & Net Worth; represents total liabilities plus shareholders equity.

APPENDIX B: Object Classes

This appendix describes the functions of the various object classes which are defined in the Objective-C source code files in the Appendix C. The objects are collected into various categories for ease of reference.

Substrate

"Substrate" category includes general purpose objects which support standard data structures.

BM_Dictionry.m

Objects of the data dictionary class (a sub-class of the Stepstone Dictionary class, defined in the file BM_Dictionry.m) provide a lookup facility between string names and their corresponding objects. One use of this facility is the dictionary used by the Database Server to keep track of data items and their names.

BM_NetNode.m
BM_DataEnt.m

Objects of the network node class (defined in the BM_NetNode.m file) have pointers to parent and child objects. Objects of the data entity class (a subclass of the network node class, defined in the BM_DataEnt.m file) have parents and children, and can also store data. The Database Server creates a large network of data entity instances to model all the entities for which data exists in the database.

BM_DoubleArr.m
BM_SparseArr.m
BM_NumercArr.m
BM_Matrix.m

Objects of the double-precision array class (a sub-class of the Stepstone Array class, defined in the file BM_DoubleArr.m) store arrays of double-precision numbers. The sparse-array sub-class (defined in the file BM_SparseArr.m) also may contain "null" flags to indicate missing data (such as missing financial data items). Objects of the numeric array sub- class (defined in the file BM_NumercArr.m) additionally provide computational procedures for implementing mathematical operators such as +, −, *, and /. Finally, objects of the matrix sub-class (defined in the file BM_Matrix.m) provide a two-dimensional, row-and-column view on their data.

BM_StrMatrix.m

Objects of the string matrix class (defined in the file BM_StrMatrix.m, and a sub-class of the StepStone identifier array class, which has elements which are pointers to other objects) may store string, rather than numeric, data.

BM_CICharStr.m

To complement the Stepstone String data class, a case- insensitive string data class is defined (in the file BM_CICharStr.m).

BMAlloc.m
BM_Select.m
BMString.m
BM_Misc.m
BMUtility.m

General, non-object routines for memory allocation and management (in the file BMAlloc.m), waiting for events (in the file BM_Select.m), string manipulation (in the file BMString.m), access to X Windows routines (in the file BM_Misc.m), and system crash recovery (in the file BMUtility.m) are also provided.

Database Server

BM_DBServer.m

The Database Server is an instance of the database server class (defined in the file BM_DBServer.m), and is called by VRL parse-tree nodes when a database access is needed. The information in the database is referenced by its item name (a string), and the time period (a string) and universe of interest (i.e., a specific list of companies, countries, etc.). The item name and time period may be explicitly passed as arguments to the Database Server, whereas the list of entities in the universe of interest is equal to the list of entities in the current universe, maintained by the VRL interpreter.

BM_Universe.m

BM_EntList.m

The current universe is maintained by an instance of the universe class (defined in the file BM_Universe.m). This class is a sub-class of the StepStone ordered collection class. Generally, a universe class object stores a list of objects, and is able to reduce or "screen" this list in response to a list of boolean values. This latter function may be used, for example, to screen the current universe with a VRL WHERE statement. User-defined entity lists, created by the SAVE LIST statement, are stored by instances of the entity list class (defined in the file BM_EntList.m), which is a sub-class of the universe class that contains additional storage for the list name. User-defined lists can be later referenced by name in a FOR statement.

BM_CSItem.m

BM_PermCSItm.m

BM_DataItem.m

The objects which access the database are instances of the cross-sectional item class (defined in the file BM_CSItem.m). One instance of the cross-sectional item class exists for every item name in the database. When a request for database information is received by the Database Server object, it is routed to the appropriate cross-sectional item instance. The cross-sectional item instance contains procedures which know the periodicity of the entries in the database, and can specify the appropriate time, entity, and table name for INGRES to access. As the same information is often accessed twice in one strategy session, to speed the access of information, the cross-sectional item instances store a cache of the most recently retrieved information in a two dimensional table, with time and entities along the two axes. This cache is updated with any new information that is retrieved from the database. If the user wishes a new data item to be permanently entered into the database (through the use of an INSTALL statement), an instance of the permanent cross-sectional item class (defined in file BM_PermCSItm.m) is created for the new item name. The permanent cross-sectional item instance stores the item directly into the database. The cross-sectional item class is a sub-class of the data item class (defined in the file BM_DataItem.m), which has general purpose caching intelligence, and can deal with a data buffer.

When the Database Server is called, it must parse its item argument and determine which cross-sectional item instance should be invoked, and what arguments are to be sent. The item name string parsing is accomplished by an instance of a dictionary class which cross-references the item name strings to the instances of the cross-sectional item class. In addition, another instance of the dictionary class cross-references the instances of the entity list class to the names of the lists. Using these dictionaries, the Database Server can call the appropriate objects for processing a database request.

BM_TimeList.m

DateSequence.c

In addition, the input time string must also be parsed by the Database Sever. Within the database itself, integers (date sequence numbers) are used to indicate times. The integers sequentially number the months from a suitably early an initial time (for example, from the 1920's). The C code in the SataSequence.m file converts an input date string to a date sequence number. An instance of the time list class (defined in the file BM_TimeList.m), which contains the DateSequence code, is called by the Database Server to convert the date string to a date sequence number.

BM_TableMap.m

After being asked to retrieve data, a cross-sectional item instance must involve an INGRES database access. To accomplish this, the cross-sectional item instance must determine which data table stores the needed information. An instance of the table map class (a sub-class of the matrix class, defined in the file BM_TableMap.m) stores a table which cross references the desired item and entity-groups to the data table of interest. This table map allows the data tales to be split (along periodicity and group lines) into several tables while keeping the cross-sectional item instances independent of the tabling.

BMDBInterf.qc

BMDBIterf.m

The actual code for the QUEL language interface to the INGRES database server is stored in the BMDBInterf.qc file. This code is read by the INGRES preprocessor and turned into a BMDBInterf.m file which is compiled and linked to the remainder of the system.

BM_IdentItem.m

Finally, a special object class named identity item (defined in the file BM_IdentItem.m) is used internally by the Database Server in response to data linkage queries (such as created by a WITHIN statement). To handle such a request, the Database Server asks an instance of identity item to return the "identity items" (cross-reference numbers) of, for example, the countries which are associated with a list of companies.

Charts and Reports

A few general object classes serve as super-classes for the object classes which implement charts (graphic displays of data) and reports (textual displays of data). In general, a chart or report uses template-type objects to store the format of the data, layer-type objects to display the data to the user, and storage-type objects to maintain the data itself.

Template.m

The format for a particular chart or report is maintained by an instance of one of the template classes, which are all subclasses of the Template (defined in Template.m). Storing format information in a separate object allows the user to specify a report or chart format which can then be used repeatedly for specific reports and charts.

DataArea.m

TextAtt.m

TextUnit.m

Format information for the "data area" of a report or chart (the area displaying the actual data values as opposed to headers, footers, etc.) is maintained by instances of subclasses of the data area class (defined in the file DataArea.m). The format of other components of the report or chart, such as its header and footer, is stored by other chart-specific or report-specific classes, discussed below. One element of a document's format is the attributes(e.g., font and justification) of its text, and these attributes are stored in instances of the text attribute class object (defined in the file TextAtt.m). Where convenient, the text string itself may also be stored by a text unit class object (defined in the file TextUnit.m).

DocLayer.m

The actual display of a chart or report on the screen is performed by layer-type objects. These layer objects are instances of sub-classes of the document layer class of objects (defined in the file DocLayer.m).

DataCltn.m

The actual data displayed by a chart or report is maintained by data collection class objects (defined in the file DataCltn.m). This class is a sub-class of the Stepstone ordered collection class of objects, and allows access to a single virtual array consisting of both string and numeric data.

Reports
Report.m
RepLayer.m
RepEdit.m
ReportWin.m

Reports, which are tabular, textual listings of string and numeric data, are managed by instances of the report class (defined in the file Report.m). The actual screen display of a report is generally managed by an instance of the report layer or report edit classes (defined in the files RepLayer.m and RepEdit.m, respectively). Report layer class objects manage the display of reports whose content and format cannot be changed by the user, whereas report edit class objects manage the display of reports whose format may be modified. The frame which outlines the report layer is managed by an instance of the report window class (defined in the file ReportWin.m).

RepDataArea.m
RSDataArea.m

The template for a report's data area is managed by an instance of the report data area class (a subclass of the DataArea class defined in the file RepDataArea.m). If the template includes references to the database from which the report's contents are derived, an instance of the report-specification data area class (a subclass of RepDataArea defined in the file RSDataArea.m that additionally has the ability to store database specifications) maintains the template.

RepDALayer.m
RepDAEdit.m
RSpeoCDAEdit.m
Header.m
HeadLayer.m
HeadEdit.m
Footer.m
FootLayer.m
FootEdit.m The display of the data area of a report can be managed by an instance of the report data area layer class (for static data areas) or the report data area edit class (for data areas whose format may be modified). However, if the data area includes references to the database (i.e. if the data area template is managed by a RSDataArea class object), the display of the data area is managed by an instance of the report-specification data area edit class (defined in the file RSpecsDAEdit.m). The display of the report header is managed by an instance of the header layer class (for static headers) or the header edit class (for headers which may change), which are defined in the files HeadLayer.m and HeadEdit.m, respectively. The display of the report footer is managed by an instance of the footer layer class (for static footers) or the footer edit class (for footers which may change), which are defined in the files FootLayer.m and FootEdit.m, respectively.

RTemplate.m
RSTemplate.m
TempEdit.m
RSpecsEdit.m
TemplateWin.m

A pre-defined user template for reports is generally maintained by an instance of the report template class (a subclass of the Template class, defined in the file RTemplate.m). However, if the pre-defined template includes references to the database, the template is maintained by an instance of the report-specification template class (defined in the file RSTemplate.m). The pre-defined template is usually displayed by an instance of the template edit class (a subclass of the RepLayer class defined in the file TempEdit.m). However, if the pre-defined template includes references to the database (i.e. if the template is maintained by a report-specification template class object), the display of the template is managed by an instance of the report-specification edit class (a sub-class of the template edit class defined in the file RSpecsEdit.m). The frame of the pre- defined template is displayed by an instance of the template window class (defined in the file TemplateWin.m).

BM_ListBox.m

In addition to standard reports, simple, list-box type reports are created by instances of the list box class (defined in the file BM_ListBox.m). Instances of this class essentially form one-column reports. As such, list boxes are displayed by instances of the report layer class.

Charts
Chart.m
ChartLayer.m
ChartEdit.m
ChartWin.m

Charts, which are graphical displays of data such as pie charts and XY plots, are managed by instances of the chart class (defined in the file Chart.m). The display of a chart is generally managed by an instance of the chart layer or chart edit classes (defined in the files ChartLayer.m and ChartEdit.m, respectively). Chart layer class objects manage the display of charts whose format may not be changed by the user, whereas chart edit class objects manage the display of charts whose format may be modified. The frame which outlines the chart layer is managed by an instance of the chart window class (defined in the file ChartWin.m).

ChtDataArea.m
CSDataArea.m

The template describing the format of a chart is managed by an instance of the chart data area class (a subclass of the data area class defined in the file ChtDataArea.m). If the template includes references to the database from which the chart's contents are derived, an instance of the chart-specification data area class (a subclass of the report data area class, defined in the file CSDataArea.m, that additionally has the ability to store database specifications) maintains the template.

BM_VECLayer.m
ChtDALayer.m

ChtDAEdit.m

CSpecsDAEdit.m

The actual screen display of a chart is managed by sub-classes of the VEC layer class (defined in the file BM_VECLayer.m). The VEC layer class contains routines for displaying the body of chart by interfacing to the CChart software from Visual Engineering Corporation. The sub-classes of the VEC layer class which manage the display of the data area are the chart data area layer class (for static data areas) or the chart data area edit class (for data areas whose format may be modified), which are defined in the files ChtDALayer.m and ChtDAEdit.m, respectively. However, if the data area includes references to the database (i.e. if the data area template is managed by a chart-specification data area class object), the display of the data area is managed by an instance of the chart-specification data area edit class (which is a sub-class of the chart data area edit class defined in the file CSpecsDAEdit.m). Unlike reports, charts have only data areas, and do not have headers or footers.

CTemplate.m

CSTemplate.m

CSpecsEdit.m

A pre-defined user template for charts is generally maintained by an instance of the chart template class (a subclass of the template class defined in the file CTemplate.m). In the present embodiment, this chart template simply specifies the type of the chart (e.g., pie or XY). In other embodiments, the chart template could also specify other information, such as the axis scaling and tick-mark increments. If the pre-defined chart template includes references to the database, the chart template is maintained by an instance of the chart-specification template class (defined in the file CSTemplate.m). The pre-defined template is displayed by an instance of the chart-specification edit class (a class defined in the file CSpecsEdit.m that supports display of references to the database). The frame of the pre- defined template is displayed by an instance of the template window class.

VRL

Statements in a VRL model are stored internally as an assemblage of parse-tree node objects. The statements are displayed on the screen by a corresponding assemblage of parse-tree node display objects. When a VRL model is run, each of the parse-tree node objects is sequentially activated by its predecessor in the tree, causing computations and database accesses to occur, and corresponding displays to be highlighted as a visual indication of the model's activity.

BM_Interp.m

The VRL Interpreter is the central managing agent for translating and executing VRL models. The Interpreter controls the execution of the statements in a model (and the operations of the parse-tree nodes), and manages the structure of the parse-tree itself. The Interpreter is an instance of the VRL Interpreter class (defined in the file BM_Interp.m).

BM_PtreeNode.m

BM_BpTnode.m

BM_UpTree.m

The parent class for all parse-tree node objects is the parse-tree node class (defined in the file BM_PtreeNode.m), instances of which can have an arbitrary number of child node objects. Two important subclasses are the binary parse-tree node class (defined in the file BpTnode.m), instances of which have exactly two child node objects, and the unary parse-tree node class (defined in the file UpTree.m), instances of which have exactly one child node object.

BS_PtreeNode.m

The global class for the parse-tree node display objects is the parse-tree node display class (defined in the file BS_PtreeNode.m).

BM_Program.m

BS_Program.m

VRL programs (generally, a program is a BEGIN statement followed by a plate list followed by an END statement) are represented by instances of the program class (defined in the file BM_Program.m). These instances are displayed by instances of the program display class (defined in the file BS_Program.m).

BM_PlateList.m

BS_Platelist.m

The set of plates that comprises a VRL program is managed by an instance of the plate list class (defined in the file BM_PlateList.m). The display of the plates is managed by an instance of the plate list display class (defined in the file BS_PlateList.m).

BM_Plate.m

BS_Plate.m

Instances of the plate class (defined in the file BM_Plate.m) manage a VRL plate that is displayed to the user. Each plate instance is responsible for the creation and management of the statements on the plate. The display of the plate is controlled by instances of the plate display class (defined in the file BS_Plate.m).

BM_StmList.m

BS_StmList.m

Statement lists are represented by instances of the statement list class (defined in the file BM_StmtList.m). These instances are displayed by instances of the statement list display class (defined in the file BS_StmtList.m).

BS_Statement.m

Statements in VRL, such as listed below, are represented in the parse-tree by an instances of special terminal classes and associated display classes. As these statements have similar pop-up menus, their display classes are sub-classes of the general statement display class defined in the file BS_Statement.m. This general statement display class places the box around the statement name and manages the statement text string.

| | |
|---|---|
| BM_Pause.m<br>BS_Pause.m | PAUSE Statement |
| BM_Continue.m<br>BS_Continue.m | CONTINUE Statement |
| BM_Begin.m<br>BS_Begin.m | BEGIN Statement |
| BM_End.m<br>BS_End.m | END Statement |
| BM_For.m<br>BS_For.m | FOR Statement |
| BM_Next.m<br>BS_Next.m | NEXT Statement |
| BM_Where.m<br>BS_Where.m | WHERE Statement |
| BM_Delete.m<br>BS_Delete.m | DELETE Statement |
| BM_SaveList.m<br>BS_SaveList.m | SAVE LIST Statement |
| BM_Memo.m<br>BS_Memo.m | MEMO Statement |
| BM_NullStmt.m<br>BS_NullStmt.m | NULL Statement |
| BM_Set.m | SET Statement |
| BM_Temp.m | TEMP Statement |
| BM_Install.m | INSTALL Statement |

-continued

| | |
|---|---|
| BS_Assign.m | SET, TEMP, or INSTALL |

Instances of the above statement classes (BM_ . . . ) are placed in the parse-tree to manage the functions of the indicated statements. In addition, these classes support the statement pop-up menus. The statement display classes (BS_ . . . ) are responsible for displaying the statements and pop-up menus. The SET, INSTALL, and TEMP statements have different functions, and are thus supported by different parse-tree classes. However, the display needs of the three statements are identical, therefore, all are displayed by a common display class (defined in the file BS_Assign.m)

BM_Primary.m

BS_Primary.m

BM_Nonary.m

Those parse-tree nodes which are atomic, that is, they have only single following nodes, inherit from the primary node class (defined in the file BM_Primary.m). These classes are displayed by display classes which inherit from the primary node display class (defined in the file BS_Primary.m, and a sibling of the binary parse-tree class). Those nodes which have no following nodes (such as BEGIN, END, and NEXT nodes) inherit from the nonary node class (defined in the file BM_Nonary.m).

BS_ArithLog.m

BM_BiFunc.m

The display classes defined in the arithmetic and logical display classes (BS_. . . files) discussed below are sub- classes of the general arithmetic/logical operator display class defined in the file BS_ArithLog.m. In addition, all arithmetic functions are sub-classes of the binary function class (defined in the file BM_BiFunc.m). Instances of this class are those which are represented by a binary (i.e. two-argument) operator between two operands (such as in the string "x+y").

| | |
|---|---|
| BM_LogicAND.m<br>BS_LogicAND.m | AND |
| BM_LogicEQ.m<br>BS_LogicEQ.m | = |
| BM_LogicGE.m<br>BS_LogicGE.m | >= |
| BM_LogicGT.m<br>BS_LogicGT.m | > |
| BM_LogicLE.m<br>BS_LogicLE.m | <= |
| BM_LogicLT.m<br>BS_LogicLT.m | < |
| BM_LogicNE.m<br>BS_LogicNE.m | <> |
| BM_LogicNOT.m<br>BS_LogicNOT.m | NOT |
| BM_LogicOR.m<br>BS_LogicOR.m | OR |

A first important category of parse-tree objects are the logical operators, such as AND, =, and OR. Each of the objects are instances of specialized classes (defined in the files BM_ . . . ) which contain code for evaluating the associated logical expression, and supporting the pop-up menus available from the operators. These classes are tabulated along with their function symbols listed above. As each of these logical operators is indicated by a special symbol in VRL, each logical operator is associated with an instance of a specialized class of display object (defined in the files BS_ . . . ) which displays the special symbol and the pop-up menus.

| | |
|---|---|
| BM_ArithDIV.m<br>BS_ArithDIV.m | / |
| BM_ArithMIN.m<br>BS_ArithMIN.m | – |
| BM_ArithPLS.m<br>BS_ArithPLS.m | + |
| BM_ArithPOW.m<br>BS_ArithPOW.m | |
| BM_ArithTMS.m<br>BS_ArithTMS.m | * |

A second important category of parse-tree objects are the arithmetic operators such as /, −, and +. Each of these objects are instances of specialized classes (defined in the files BM_ . . . ) which contain code for evaluating the associated arithmetic operation, and supporting the pop-up menus available from the operators. The classes are tabulated along with their function symbols above. As each of these arithmetic functions is indicated by a special symbol in VRL, each arithmetic function is associated with an instance of a specialized class of display object (defined in the files BS_ . . . ) which displays the special symbol and the pop-up menus.

BS_Terminal.m

Terminal symbols in VRL, such as currency constants and item names, are represented in the parse-tree by instances of special terminal classes and associated display classes. As these terminal expressions have similar pop-up menus, their display classes are sub-classes of the general terminal display class defined in the file BS_Terminal.m.

BS_ListNode.m

Parse-tree nodes which indicate subsequent lists are displayed by special display classes. However, these nodes have similar pop-up menus, and thus they are sub-classes of the general list node display class defined in the file BS_ListNode.m.

BM_KWfield.m

BS_KWfield.m

Key word fields (e.g., "date: 29 Jan. 89") are represented by instances of the key word class (defined in the file BM_KWfield.m). These instances are displayed by instances of the key word display class (defined in the file BS_KWfield.m).

BM_KWexpr.m

BS_KWexpr.m

Keyword expressions (e.g., "offset:<time range>", a key word field with a date offset specification), are represented by instances of the keyword expression class (defined in the file BM_KWexpr.m). These instances are displayed by instances of the keyword display class (defined in the file BS_KWexpr.m).

BM_AexList.m

BS_AexList.m

Arithmetic expression lists (a sequence of arithmetic expressions separated by commas) are represented by instances of the arithmetic expression list class (defined in the file BM_AexList.m). These instances are displayed by instances of the arithmetic expression list display class (defined in the file BS_AexList.m).

BM_AunMIN.m

BS_AunMIN.m

The arithmetic unary MINUS function (which takes a single argument, an arithmetic expression list) is represented by an instance of the arithmetic unary MIN class (defined in the file BM_AunMIN.m). This instance is displayed by an instance of the arithmetic unary MINUS display class (defined in the file BS_AunMIN.m).

BM_Qident.m

BS_Qident.m

Qualified identifiers (item names preceded by a context abbreviation) are represented by instances of the qualified-identifier class (defined in the file BM_Qident.m). These instances are displayed by instances of the qualified-identifier display class (defined in the file BS_Qident.m).

BM_CurCon.m

BS_CurCon.m

Currency constants are represented by instances of the currency constant class (defined in the file BM_CurCon.m). These instances are displayed by instances of the currency constant display class (defined in the file BS_CurCon.m).

BM_AbsDcon.m

BS_AbsDcon.m

Absolute date constants (e.g., "31-May- 1988") are represented by instances of the absolute date constant class (defined in the file BM_AbsDcon.m). These instances are displayed by instances of the absolute date constant display class (defined in the file BS_AbsDcon.m).

BM_NaExprLi.m

BS_NaExprLi.m

Named expression lists (such as a sequence of identifiers) are represented by instances of the named-expression list class (defined in the file BM_NaExprLi.m). These instances are displayed by instances of the named-expression list display class (defined in the file BS_NaExprLi.m).

BM_Ident.m

BS_Ident.m

User-defined identifiers for items are represented by instances of the user identifier class (defined in the file BM_Ident.m). These instances are displayed by instances of the user identifier display class (defined in the file BS_Ident.m).

BM_StrLit.m

BS_StrLit.m

String literals are represented by instances of the string literal class (defined in the file BM_StrLit.m). These instances are displayed by instances of the string literal display class (defined in the file $BS_{13}$ StrLit.m).

BM_NaStr.m

BS_NaStr.m

Named string lists are represented by instances of the named-string list class (defined in the file BM_NaStr.m). These instances are displayed by instances of the named-string list display class (defined in the file BS_CurCon.m).

BM_DoffCon.m

BS_Doffcon.m

Date offset constants are represented by instances of the date offset constant class (defined in the file BM_DoffCon.m). These instances are displayed by instances of the date offset constant display class (defined in the file BS_DoffCon.m).

BM_Error.m

An instance of the BM_Error class (defined in the file BM_Error.m) is placed in the parse-tree if a parsing error has occurred.

BM_FunServer.m

When a parse tree node requires a function call to perform a computation, the call is passed to the Function Server, which is the central location for servicing function calls. The Function Server dispatches the function call to the appropriate function object, which performs the computation. The Function Server is an instance of the Function Server class, which is defined in the BM_FunServer.m file.

BM_FuncCall.m

BS_FuncCall.m

VRL function invocations which are not represented by special symbols (and thus do not have special parse-tree objects defined above) are represented by instances of a general function call class of parse-tree nodes (defined in the file BM_FuncCall.m). These parse-tree nodes know the particular function they represent, and support the pop-up menus available from the node. The display of these function call constructs and the pop-up menus is handled by instances of a general function call display parse-tree node (defined in the file BS_FuncCall.m).

BM_Function.m

The function object classes are sub-classes of the general function object class, which is defined in the file BM_Function.m.

BM_StatFn.m

| | |
|---|---|
| BM_Fnctn_AVG.m | Average |
| BM_Fnctn_CNT.m | Count |
| BM_Fnctn_CUM.m | Cumulate |
| BM_Fnctn_DEC.m | Decile |
| BM_Fnctn_HI.m | High Range |
| BM_Fnctn_LOW.m | Low Range |
| BM_Fnctn_NRM.m | Normalize |
| BM_Fnctn_PRC.m | Percentile |
| BM_Fnctn_PRP.m | Proportion |
| BM_Fnctn_QRT.m | Quartile |
| BM_Fnctn_RNK.m | Rank |
| BM_Fnctn_STD.m | Standard Deviation |
| BM_Fnctn_TOT.m | Total |
| BM_Fnctn_REG.m | regress |
| BM_Fnctn_REV.m | reverse |
| BM_Fnctn_RNG.m | range |

The preceding function classes (BM_Fnctn_ . . . ) are sub- classes of the statistical function class (defined in the file BM_StatFn.m), which is itself a sub-class of the general function class. These statistical functions are grouped together because they act upon all entities of the universe at one time.

BM_ArithFn.m

| | |
|---|---|
| BM_Fnctn_ABS.m | Absolute Value |
| BM_Fnctn_EXP.m | Exponentiate (i.e. x) |
| BM_Fnctn_LOG.m | Logarithm (i.e. ln(x)) |
| BM_Fnctn_MAX.m | Maximum |
| BM_Fnctn_MIN.m | Minimum |
| BM_Fnctn_NUL.m | Null |
| BM_Fnctn_ADD.m | Add |
| BM_Fnctn_DIV.m | Divide |
| BM_Fnctn_MLT.m | Multiply |
| BM_Fnctn_NEG.m | Negation |
| BM_Fnctn_POW.m | Power |
| BM_Fnctn_SUB.m | Subtract |
| BM_Fnctn_AND.m | And |
| BM_Fnctn_EQ.m | Equal |
| BM_Fnctn_GE.m | Greater Than or Equal |
| BM_Fnctn_GT.m | Greater Than |
| BM_Fnctn_LE.m | Less Than or Equal |
| BM_Fnctn_LT.m | Less Than |
| BM_Fnctn_NE.m | Not Equal |
| BM_Fnctn_NOT.m | Not |

-continued

| | |
|---|---|
| BM_Fnctn_OR.m | Or |

The preceding function classes (BM_Fnctn_ . . . ) are sub- classes of the arithmetic function class (defined in the file BM_ArithFn.m), which is itself a sub-class of the general function class. These arithmetic functions do not act upon the entire universe, rather, only portions of the universe are involved in an operation.

BM_PrgStBlk.m

An instance of the program-status-block class (defined in the file BM_PrgStBlk.m) is used by the VRL Interpreter to store global and status information as it steps through the parse-tree.

BM_StrmStr.m

An instance of the stream string object class (defined in the file BM_StrmStr.m) is used to store VRL code that are sent to the parser. Stream-string class objects allow the parser to retrieve characters from the string, and also to push characters back onto the string, where necessary. The Stepstone character string class cannot push characters back.

grammar.y
grammar.m
tokens.h
lexer.l
lexer.m

The input to the UX YACC utility which builds the parser is the file grammar.y. The output is the file grammar.m, which is a C-code parser file which may be compiled and linked with the rest of the code. This parser views VRL code as a series of tokens, which are defined in the file tokens.h. When an input string is parsed, the string representation is first converted to the corresponding sequence of tokens by a lexical analyzer. This lexical analyzer is created by the UX utility LEX (available from Hewlett-Packard), which uses the lexer.l file to build a the C-code file lexer.m, which can then be compiled and linked to the remainder of the C-code.

Top Level and Desktop

BM_Main.m

An instance of the main object class (defined in the file BM_Main.m) is called when the system is first executed. This object initializes the system, creates an instance of the Stepstone base layer for display processing, and initiates event processing.

DeskTop.m

The research system desktop icons and their associated files are managed by an instance of the desktop class (defined in the file DeskTop.m).

BM_TrashCan.m
KL_Folder.m

The desktop has a few standard icons. The trash can icon (for deleting files) is managed by an instance of the trash can class (defined in the file BM_TrashCan.m). The folder icons are managed by instances of the folder class (defined in the file KL_Folder.m).

VRLDevelopment
VRLDevWin.m
VRLStmtEdit.m
StatementLyr.m
VRLPlateEdit.m

The main layer for the VRL development editor is managed by an instance of the development window class (defined in the file VRLDevWin.m). The statement-editor area on top of the layer is managed by an instance of the statement editor class (defined in the file VRLStmtEdit.m). The layer which displays the current statement in the editing area is managed by an instance of the statement layer class (defined in the file StatementLyr.m). The plate area below the editing area is managed by an instance of the plate editor class (defined in the file VRLPlateEdit.m).

User Interface

The user interface to the research system uses several standard classes to create menus, icons, and layers.

WindowLayer.m
ApplicWin.m

Layers which correspond to application windows (as opposed to auxiliary windows such as dialog boxes) are instances of sub-classes of the window layer class (defined in the file WindowLayer.m), which is a general layer object with a frame. One such sub-class is the application window class (defined in the file ApplicWin.m), which adds file intelligence to the window layer capabilities.

MenuBar.m
TitleBar.m
CloseBar.m
ViewBar.m
BM_Monitor.m
RollBar.m
BM_FlowLayer.m

The menu bar of the research system layer is managed by an instance of the menu bar class (defined in the file MenuBar.m). The title of the research system layer is managed by an instance of the title bar class (defined in the file TitleBar.m). The upper right hand "close" box (which makes the layer an icon) is managed by an instance of the close bar class (defined in the file CloseBar.m). The upper right hand "view" box (which makes the layer full size) is managed by an instance of the view bar class (defined in the file ViewBar.m). The status monitor section of the research system layer is managed by an instance of the monitor class (defined in the file BM_Monitor.m). The roll bar and flow sections of the status monitor which iconically depict activities in the research system are managed by an instance of the roll bar class (defined in the file RollBar.m) and an instance of the flow layer class (defined in the file BM_FlowLayer.m).

InnerWindow.m

The inner window for the research system layer is managed by an instance of the inner window class (defined in the file InnerWindow.m), which gives the window border a 3D look.

LeftFrame.m
RightFrame.m
TopFrame.m
BottomFrame.m

The frame which forms the border of a WindowLayer is managed by instances of the left frame, right frame, top frame, and bottom frame classes (defined, respectively, in LeftFrame.m, RightFrame.m, TopFrame.m, and BottomFrame.m).

TLCorner1.m
TLCorner2.m
TRCorner1.m
TRCorner2.m
BLCorner1.m
BLCorner2.m
BRCorner1.m
BRCorner2.m Each of the 3D-effect corners for a WindowLayer is managed by two objects. Therefore, instances of eight classes, defined in the files TLCorner1.m, TLCorner2.m, TRCorner1.m, TRCorner2.m, BLCorner1.m, BLCorner2.m, BRCorner1.m, and BRCorner2.m, manage the top left, top right, bottom left, and bottom right corners, respectively.

BM_ScrollBar.m

BM_ScrollLyr.m

Scroll bars for the research system are provided by instances of the scroll bar class (defined in the file BM_ScrollBar.m). The scroll bar object communicates with an instance of the scroll layer class (defined in the file BM_ScrollLyr.m) that underlies all of the objects to be scrolled, and may scroll these objects.

InsetLayer.m

RidgeLayer.m

BM_3D Layer.m

Other 3D-border effects for research system layers are created by instances of the inset (shadow graphics) and ridge (pop-out graphics), and 3D layer (black shadows) classes (defined, respectively, in the files InsetLayer.m, RidgeLayer.m, and BM_3DLayer).

LogoLayer.m

The user's logo is drawn by an instance of the logo layer class (defined in the file LogoLayer.m).

ControlPanel.m

The control panel for the research system (which sets the screen colors and fonts) is managed by an instance of the control panel class (defined in the file ControlPanel.m).

BM_MenuItem.m

Scrolling menus are implemented by instances of the scrolling menu item class (defined in the file BM_MenuItem.m), which is a sub-class of the StepStone menu item class.

BM_Menu.m

BM_SRMenu.m

BM_BarMenu.m

BM_TogMenu.m

BM_SRItem.m

Menu classes provide for: sharing of menus (defined in the file BM_Menu.m); slide-right hierarchical menus (defined in the file BM_SRMenu.m); Horizontal bar menus (defined in the file BM_BarMenu.m); and toggle entry, check-mark menus (defined in the file BM_TogMenu.m). Slide right menu items are instance of the slide right item class (defined in the file BM_SRItem.m).

Confirmer.m

Prompter.m

The Stepstone confirmation (OK/Cancel) and prompting (String Entry) modal dialog classes are replaced by new classes defined in the files Confirmer.m and Prompter.m, to add 3D graphics.

AboutBox.m

BM_PromptBox.m

BM_ChoiceDB.m

BM_AskDlgBox.m

BM_DialogBox.m

SDialogbox.m

PermDlgBox.m

A general class for implementing 3D modal dialog boxes is defined in the file DialogBox.m. Sub-classes of this global class are configured to: provide "about" information (defined in the file AboutBox.m); prompt the user with a string and provide OK/Cancel options (defined in the file BM_PromptBox.m); provide the user with choices (e.g. send output to the printer or plotter, defined in the file BM_ChoiceDB.m); ask the user for a string entry (defined in the file BM_AskDlgBox.m); allow multiple string entries (defined in the file SDialogBox.m); and remain memory resident to avoid computation (defined in the file PermDlgBox.m).

String3DLyr.m

Border3DLyr.m

Button3D.m 3D effects on strings, string borders, and buttons are created by instances of the 3D string, 3D border, and 3D button classes (defined, respectively, in the files String3DLyr.m, Border3DLyr.m, and Button3D.m), which are subclasses of the StepStone string layer, border layer, and button classes, respectively.

CSMore.m

BM_LabelVal.m

BM_StringTbl.m

BM_StringEdt.m

Integer-to-string conversions may be done by instances of the character string+more class (defined in the file CSMore.m). Labeled strings are instances of the labelled value class (defined in the file BM_LabelVal.m). Other string conversions are supported by instances of the string table class (defined in the file BM_StringTbl.m). Fields used in dialog boxes, etc. for obtaining strings from the keyboard are instances of the string edit class (defined in the file BM_StringEdt.m).

| | |
|---|---|
| PushButton.m | push button class |
| BM_TogButton.m | toggle button class |
| LabelButton.m | labeled button class |
| RadioButton.m | radio push-button class |
| RadioBGroup.m | radio push-button group class |
| ButtonGroup.m | general button group class |

Push-buttons (which only stay on while pressed), toggle buttons (which stay on or off after pressed), labeled buttons (which have string labels), radio push-buttons (only one of which may be selected out of a group), radio push-button groups, and general button groups (the parent class for the push-button radio groups), are managed by instances of the above classes, and defined in the indicated files.

BM_Printer.m

BM_PCLPrintr.m

SmartFont.m

The general class of printer driver objects is defined in the file BM_Printer.m. A sub-class for driving HPLaserJet PCL language printers is defined in the file BM_PCLPrintr.m. For the purpose of screen printing, the smart font class (a parent class for all text fonts defined in the file SmartFont.m) allows text font instances to determine their type (e.g. Helvetica) and point size (e.g. 10 point) from the UX X-Windows font that is used for display.

BMGFXInterf.c

BM_GFXLayer.m

The C-code which forms the interface to the CChart graphics package is in the BMGFXInterf.c file. After they are first drawn, to avoid redrawing the graphs during screen refresh, the graphs are bit-mapped by an instance of the graphics layer class (the parent class of the VEC Layer class, defined in the file BM_GFXLayer.m).

BM_SolidColr.m

Solid colors are represented by a specialized solid color class (a sub-class of the StepStone solid color class, defined in the file BM_SolidColr.m) that is responsive to color names (such as "orange") instead of RGB values. KL_IconH.m The code which links screen icons to their underlying files is in the file KL_IconH.m.

BM_ExtEBox.m

Layers which may be resized by a mouse drag on their corners use instances of the extended echo-box class, defined in the file BM_ExtEBox.m.

Screening:

ScreeningWin.m

EditorWin.m

CritLayer.m

GraphULayer.m

ResultsLayer.m

CompULayer.m

A "screening' application for the research system is provided by a set of specialized object classes. The outermost screening window is an instance of the screening window class (defined in the file ScreeningWin.m). The screening editor and list boxes are managed by an instance of the editor window class (defined in the file EditorWin.m). The layer which displays the criteria to be used for screening is managed by an instance of the criteria class (defined in the file CritLayer.m). The graphic display of the shrinking universe size is managed by an instance of the graph universe class (defined in the file GraphULayer.m). The display of the number of entities in the universe is managed by an instance of the results class (defined in the file ResultsLayer.m). The comparison functions, including the support for weighting the entities, are managed by an instance of the comparison universe class (defined in the file CompULayer.m).

Research:

Screening, and other fully graphical research applications for the research system use additional standard classes.

| | |
|---|---|
| DateLayer.m | date anchor point |
| EditLayer.m | edit VRL statements |
| RangeLayer.m | time range |
| CurrLayer.m | currency |
| UnivLayer.m | universe |
| HelpLayer.m | on-line help |

The windows and buttons which graphically prompt the user for date anchor points, VRL statement editing, time ranges, currencies, universe selection, and on-line help are managed by the above classes, and defined in the associated files.

UniverseDB.m

DateDB.m

Dialog boxes which prompt the user for the name of an entity list are instances of the universe dialog box class (defined in the file UniverseDB.m). Dialog boxes which prompt the user for dates are instances of the data dialog box class (defined in the file DateDB.m).

ModelEditor.m

The graphical VRL editor which uses list boxes within the Edit Layer to edit and add VRL statements is an instance of the model editor class (defined in the file ModelEditor.m).

MYBaseLayer.m

For applications which have a clock-type procedure, the Stepstone base layer is replaced with an instance of the MyBaseLayer class (defined in the file MyBaseLayer.m). This base layer instance suitably modifies the event processing to allow procedures to by sent a "wake-up" message at regular intervals.

ResearchWin.m

InputWindow.m

VRLOutputWin.m

VRLWin.m,

The main window for point-and-click type research applications is an instance of the research window class (defined in the file ResearchWin.m). The input and output sub-windows for point-and-click research are managed by instance of the VRL input and output window sub-classes (defined in the files InputWindow.m and VRLOutputWin.m, respectively). The frame for the application is provided by the VRL window subclass (defined in the file VRLWin.m).

ChtSpecsWin.m

RepSpecsWin.m

The window which allows chart- and report-specifications to be defined in the point-and-click research applications is managed by the chart-specification and report-specification classes (defined in the files ChtSpecsWin.m and RepSpecsWin.m, respectively).

APPENDIX C: Code

A paper copy of the Objective-C source code is attached to this specification.

```
/*==================== DO NOT REM   OR EDIT ============================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "@(#)BMAlloc.m work in progress by bmw";

/*==================== DO NOT REMOVE OR EDIT ===========================*/


#include <stdio.h>      /* @retain */
#include "objc.h"
#include "vectors.h"    /* @retain */
#include "cls.h"        /* @retain */
```

```
// Error Messages
static char
        _errAllocSize[] = "alloc: preposterous size (%u)",
        _errNoMem[] = "alloc: failed -- out of memory(%s, %d)",
        _errAllocNil[] = "alloc: allocating nil object",
        _errReAllocNil[] = "realloc: reallocating nil object",
        _errReAllocFreed[] = "realloc: reallocating freed object",
        _errReAllocTooSmall[] = "realloc: (%s, %u) requested size too small",
        _errReAllocNoMem[] = "realloc(%s, %u) failed: out of memory";

        static char
        birthFmt[] = "%x:%s + %d\n",
        deathFmt[] = "%x:%s -\n",
        stringFmt[] = "%x:%s=%s\n";
#define NoteBirth(obj) newObjects++; if (topObject < obj) topObject = obj; \
        if(allocFlag)fprintf(allocIOD,birthFmt,obj,NAMEOF(obj), nBytes)
#define NoteDeath(obj) freedObjects++; \
        if(allocFlag)fprintf(allocIOD,deathFmt,obj,NAMEOF(obj))
#define NoteStr(obj) newObjects++; if (topObject < obj) topObject = obj; \
        if(allocFlag)fprintf(allocIOD,stringFmt,obj,NAMEOF(obj),IV(obj))
#define NoteReIncarnation(old,new) if(topObject <new) topObject = new; \
        if(allocFlag){ STR _s = NAMEOF(new);\
                fprintf(allocIOD,deathFmt,old,_s); \
                fprintf(allocIOD,birthFmt,new,_s, nBytes); }

= (Primitive)

IOD allocIOD = stdout;  // IOD for allocation traces
BOOL allocFlag = NO;    // Enable allocation tracing
id topObject = nil;     // Topmost address allocated by __alloc()
int newObjects = 0,     // count calls to __alloc()
freedObjects = 0;       // count calls to __dealloc()

extern STR malloc(), realloc();

#include <malloc.h>

void PrintMemoryStatistics ()
   {
    struct mallinfo m;
    m = mallinfo (0);

    printf ("MEMORY: %d + %d in use, %d + %d free\n",m.uordblks,
                                        m.usmblks,m.fordblks,m.fsmblks);

    printf ("OBJECTS: %d allocated, %d freed\n", newObjects, freedObjects);
   }

// Allocate new instance of aClass with nBytes bytes of indexed vars
static id __alloc(aClass, nBytes)
SHR aClass;
unsigned int nBytes;
{
        id obj;
        register unsigned siz;

        if (aClass == Nil)
                return (*_error)(aClass, _errAllocNil);
        siz = aClass->clsSizInstance + nBytes;

        // size argument is type unsigned, as with malloc.  This
        // check is to see if 'siz' has wrapped around, which
        // probably means someone asked for negative additional bytes.
```

```
        if (siz < nBytes || siz < aClass->clsSizInstance)
                return [aClass error:_errAllocSize, nBytes];
        if (obj = (id)malloc(siz)) {
                register STR p = (STR)obj;
                while(siz-- > 0)
                        *p++ = 0; // zero all instance variables
                obj->isa = aClass;
                NoteBirth(obj);
                return obj;
        } else
            {
             /* No error!! Just return nil!!
                return [aClass error:_errNoMem, aClass->clsName, nBytes]; */

            printf ("OUT OF MEMORY!!!\n");

            PrintMemoryStatistics ();

            return nil;
            }
}


// Reallocate an object to a new (larger) size
// zeroing additional space is caller's job.
static id __realloc(anObject,nBytes)
id anObject;
unsigned int nBytes;
{
        id newObject;
        SHR tmp;
        if (anObject == nil)
                return (*_error)(nil, _errReAllocNil,0);
        if (anObject->isa == Nil)
                return (*_error)(anObject,
                        _errReAllocFreed,0);
        if (nBytes < anObject->isa->clsSizInstance)
                return [anObject
                        error:_errReAllocTooSmall, NAMEOF(anObject), nBytes];
        // Make sure not to modify space that has been declared free
        tmp = anObject->isa;
        anObject->isa = Nil;
        newObject = (id)realloc ((STR)anObject, nBytes);
        if (newObject) {
                newObject->isa = tmp;
                NoteReIncarnation(anObject,newObject);
                return newObject;
        }
        else
            {
             /* No error!! Just return nil!!
                return [anObject error:_errReAllocNoMem , NAMEOF(anObject), nBytes];
             */
            printf ("OUT OF MEMORY!!!\n");

            PrintMemoryStatistics ();

            return nil;
            }
}
```

```
// Deallocate anObject
static id __dealloc(anObject)
id anObject;
{
        if (anObject==nil) return nil;
        NoteDeath(anObject);
        anObject->isa = Nil;
        free((STR)anObject);
        return nil;
}

// Basic shallow object copy
// This could be made much more efficient if we could
// poke at the malloc-maintained information to see how
// big the object really is.
static id __copy(anObject, nBytes)
id anObject;
unsigned nBytes; {
        id obj;
        register unsigned siz;
        register STR p, q;

        if (anObject == nil)
                return nil; // OK, we'll play your silly game

        obj = (*_alloc)(anObject->isa, nBytes);

        if (obj == nil)
           return nil;

        siz = anObject->isa->clsSizInstance + nBytes;
        p = (STR)obj;
        q = (STR)anObject;
        while (siz-- > 0)
                *p++ = *q++;
        return obj;
}

// Initialize dispatch vectors
// This comes at the end because some compilers refuse to
// allow "extern" declarations to bind to static definitions
        id (*_dealloc)() = __dealloc;
        id (*_realloc)() = __realloc;
        id (*_copy)() = __copy;
        id (*_alloc)() = __alloc;

/*==================== DO NOT REMOV    EDIT ============================

        This comment and the following sccsId declaration are managed
        by SCCS for you. Do not edit or remove either.

        Source file:    /users/bmw/Alpha/Substrate/SCCS/s.BMString.m
        Latest version: 1.3
        Last mod time:  06/27/89 at 14:29:13

=====================================================================*/

static char *sccsId = "@(#)BMString.m rev 1.3 created on 06/27/89 at 14:29:13";

/*==================== DO NOT REMOVE OR EDIT ==========================*/
```

```
#include <stdio.h>

#include "objc.h"
#include "uil.h"


=(BM_WorkstationMsgs, UIMESSAGES)


/* Case-insensitive string hash function: */

#define EOS     '\0'
#define TST() if (*s == EOS) break;
#define SHFT(N) (toupper(*s++) << ((N)*8))

unsigned _CIstrhash(s)
register unsigned char *s;
{
        register unsigned int hash = 0;

        // unroll the loop
        for (; ; ) {
                TST();
                hash ^= toupper(*s++);
                TST();
                hash ^= SHFT(1);
                TST();
                hash ^= SHFT(2);
                TST();
                hash ^= SHFT(3);
        }
        return hash;
}

int _strmatchn (str1, str2, n)

char *str1, *str2;
     int n;
{
        register int count;

        for (count = 0; (*str1 != 0) && (*str2 != 0) && (count < n) &&
                     (toupper(*str1++) == toupper(*str2++)); count++);

        if ((*str1 == 0) && (*str2 == 0))
           return -1;
        else
           return count;
}

int _strrpt (destSTR, sourceSTR, repeatCount)

char *destSTR, *sourceSTR;
int  repeatCount;

{
 if (repeatCount > 0)
    strcpy (destSTR, sourceSTR);

 for (; repeatCount > 0; repeatCount--)
    strcat (destSTR, sourceSTR);

 return destSTR;
}
```

```
/*==================== DO NOT REMOVI    EDIT ===========================

      This comment and the following sccsId declaration are managed
      by SCCS for you. Do not edit or remove either.

      Source file:     /users/bmw/Alpha/Substrate/SCCS/s.BMUtility.m
      Latest version:  1.8
      Last mod time:   09/10/89 at 20:42:57

=========================================================================*/

static char *sccsId = "@(#)BMUtility.m rev 1.8 created on 09/10/89 at 20:42:57";

/*==================== DO NOT REMOVE OR EDIT ==========================*/


#include <stdio.h>
#include <signal.h>
#include "objc.h"
#include "uil.h"
#include "cls.h"
#include "vectors.h"
#include "time.h"
#include "math.h"


=(BM_WorkstationMsgs, UIMESSAGES)


void ClearConsole()
{
  extern id currentDisplay;
  WINDOW windowId = [currentDisplay windowId];

  gp_free(windowId);
}


void WriteConsoleErrorMessage()
{
  FILE *cons;

#ifdef HP
  ClearConsole();
  cons = fopen ("/dev/console", "a");
  fprintf (cons, "\nThe workstation has encountered a fatal internal error.");
  fprintf (cons, "\nPlease contact BIS client support.\n\n");
  fclose (cons);
#endif
}


IOD OpenErrorLog()
{
    long t;
    IOD errorFile;

    t = time ();
    errorFile = fopen ("system/BMERR_LOG","a");
    fprintf  (errorFile, "%s\n", ctime(&t));
    return errorFile;
}
```

```
id HANDLE_STEPSTONE_ERROR (self, fmt, ap)
id  self;
STR fmt,
    *ap;

  {
   IOD errorFile;

   WriteConsoleErrorMessage();
   errorFile = OpenErrorLog();

   fflush   (stdout);
   fprintf  (errorFile, "===[%s@0x%x error:] ", NAMEOF(self), self);
   vfprintf (errorFile, fmt, ap);
   fprintf  (errorFile, "===\n");
   prnStack (errorFile);
   fprintf  (errorFile, "\n\n");
   fclose   (errorFile);

   bye(1);
  }


HandleFatalSignal(sig)
    int sig;
{
  IOD errorFile = OpenErrorLog();

  fprintf(errorFile, "HandleFatalSignal: ");
  switch(sig)
   {
   case SIGHUP:
     fprintf(errorFile, "SIGHUP (hangup) ");
     break;
   case SIGINT:
     fprintf(errorFile, "SIGINT (interrupt) ");
     break;
   case SIGQUIT:
     fprintf(errorFile, "SIGQUIT (quit) ");
     break;
   case SIGILL:
     fprintf(errorFile, "SIGILL (illegal instruction) ");
     break;
   case SIGTRAP:
     fprintf(errorFile, "SIGTRAP (trace trap) ");
     break;
   case SIGIOT:
     fprintf(errorFile, "SIGIOT (IOT instruction) ");
     break;
   case SIGEMT:
     fprintf(errorFile, "SIGEMT (EMT instruction) ");
     break;
   case SIGFPE:
     fprintf(errorFile, "SIGFPE (floating point exception) ");
     break;
   case SIGBUS:
     fprintf(errorFile, "SIGBUS (bus error) ");
     break;
   case SIGSEGV:
     fprintf(errorFile, "SIGSEGV (segmentation violation) ");
     break;
```

```
    case SIGSYS:
      fprintf(errorFile, "SIGSYS (bad argument to system call) ");
      break;
    case SIGPIPE:
      fprintf(errorFile, "SIGPIPE (write on a pipe with no one to read it) ");
      break;
    case SIGALRM:
      fprintf(errorFile, "SIGALRM (alarm clock) ");
      break;
    case SIGTERM:
      fprintf(errorFile, "SIGTERM (software termination signal from kill) ");
      break;
    case SIGUSR1:
      fprintf(errorFile, "SIGUSR1 (user defined signal 1) ");
      break;
    case SIGUSR2:
      fprintf(errorFile, "SIGUSR2 (user defined signal 2) ");
      break;
    case SIGVTALRM:
      fprintf(errorFile, "SIGVTALRM (virtual time alarm) ");
      break;
    case SIGPROF:
      fprintf(errorFile, "SIGPROF (profiling time alarm) ");
      break;
    default:
      fprintf(errorFile, "Unknown signal %d ", sig);
      break;
    }
  fprintf(errorFile, "recieved, exiting...\n\n\n");
  fclose(errorFile);

  /*
   * Instead of doing a [baseLayer free], just reset the console
   * because who knows what corruption has taken place in our
   * data structures....
   */
  WriteConsoleErrorMessage();
  bye(1);
}


int matherr(x)
     struct exception *x;
{
  IOD errorFile = OpenErrorLog();

  fprintf(errorFile, "Math library error (see matherr(3m) for explanation:\n");
  fprintf(errorFile, "\tfunction: %s, type: ", x->name);
  switch(x->type)
    {
    case DOMAIN: fprintf(errorFile, "DOMAIN "); break;
    case SING: fprintf(errorFile, "SING "); break;
    case OVERFLOW: fprintf(errorFile, "OVERFLOW "); break;
    case UNDERFLOW: fprintf(errorFile, "UNDERFLOW "); break;
    case TLOSS: fprintf(errorFile, "TLOSS "); break;
    case PLOSS: fprintf(errorFile, "PLOSS "); break;
    default: fprintf(errorFile, "unknown(%d) ", x->type); break;
    }
  fprintf(errorFile, "arg1=%f, arg2=%f, retval=%f\n\n\n",
        x->arg1, x->arg2, x->retval);
  fclose(errorFile);
  return(1);
}
```

```
INITIALIZE_VECTORS ()

  {
   _error = HANDLE_STEPSTONE_ERROR;

   freopen ("system/stdout", "w", stdout);
   freopen ("system/stderr", "w", stderr);
   /* install signal handlers */
   signal(SIGPROF, HandleFatalSignal);
   signal(SIGVTALRM, HandleFatalSignal);
   signal(SIGUSR2, HandleFatalSignal);
   signal(SIGUSR1, HandleFatalSignal);
   signal(SIGTERM, HandleFatalSignal);
   signal(SIGALRM, HandleFatalSignal);
   signal(SIGPIPE, HandleFatalSignal);
   signal(SIGSYS, HandleFatalSignal);
   signal(SIGSEGV, HandleFatalSignal);
   signal(SIGBUS, HandleFatalSignal);
   signal(SIGFPE, HandleFatalSignal);
   signal(SIGEMT, HandleFatalSignal);
   signal(SIGIOT, HandleFatalSignal);
   signal(SIGTRAP, HandleFatalSignal);
   signal(SIGILL, HandleFatalSignal);
   signal(SIGQUIT, HandleFatalSignal);
   signal(SIGINT, HandleFatalSignal);
   signal(SIGHUP, HandleFatalSignal);

   /* install ingres error handler
    *
    *  Since it's in a subprocess, it can handle it's
    *  own errors. If this process dies, then it's easy
    *  for the shell to kill the orphaned process.
    */

   /* install VEC error handler */

   /* install math error handler
    *
    *  This is done by defining the function matherr above.
    */
  }

/*===================== DO NOT REMOV'    EDIT ============================

       This comment and the following sccsId declaration are managed
       by SCCS for you. Do not edit or remove either.

       Source file:     /users/bmw/Alpha/Substrate/SCCS/s.BM_CICharStr.m
       Latest version:  1.3
       Last mod time:   08/01/89 at 15:43:19

=========================================================================*/

static char *sccsId = "@(#)BM_CICharStr.m rev 1.3 created on 08/01/89 at 15:43:19";

/*==================== DO NOT REMOVE OR EDIT ==========================*/


#include "objc.h"
#include "uil.h"

#include "BMWGlobal.h"
```

```
= BM_CICharString: CharString (BM_WorkstationMsgs, UserInterface,
                                                  Collection, Primitive)

  {
  }

  -(BOOL)isEqualSTR:(STR)aString
   {
    return (_dictcmp([self str],aString) == 0);
   }

  -(unsigned)hash
   {
    return _CIstrhash ([self str]);
   }

=:

/*===================== DO NOT REMOV     EDIT ============================

       This comment and the following sccsId declaration are managed
       by SCCS for you. Do not edit or remove either.

       Source file:     /users/bmw/Alpha/Substrate/SCCS/s.BM_Dictionry.m
       Latest version:  1.2
       Last mod time:   06/28/89 at 19:11:58

=====================================================================*/

static char *sccsId = "@(#)BM_Dictionry.m rev 1.2 created on 06/28/89 at 19:11:58";

/*===================== DO NOT REMOVE OR EDIT ===========================*/


#include "objc.h"
#include "uil.h"

#include "BMWGlobal.h"

@requires CharString;


= BM_Dictionary: Dictionary (BM_WorkstationMsgs, UserInterface,
                                                  Collection, Primitive)

  {
  }

  -(BOOL)key:aKey matchesSTR:(STR)aStr considerN:(int)considerN
    {
     int result;

     return (((result=_strmatchn([aKey str], aStr, considerN))==considerN)||
             (result == -1));
    }


  -completionForSTR:(STR)target
    {
     unsigned count,
              size,
              bestMatchLength = 0,
              compareLength,
              newMatchLength,
              nonUniqueLength;
```

```
id      bestMatch = nil,
        match,
        sequence,
        newMatch;

 .

sequence = [self eachElementInPlace];
size     = [sequence size];

for (count = 0; count < size; count++)
   if (((match = [sequence next]) != nil) &&
       ([self key:match matchesSTR:target
                       considerN:strlen(target)]))
      {
       if (bestMatch == nil)
         {
          bestMatch = match;
          bestMatchLength = strlen ([bestMatch str]);

          }
        else
          {
           newMatch = match;
           newMatchLength = strlen([newMatch str]);

           compareLength=(bestMatchLength<newMatchLength)?bestMatchLength:
                                                          newMatchLength;

           nonUniqueLength = _strmatchn ([bestMatch str],[newMatch str],
                                         compareLength);

           if (nonUniqueLength >= 0)
              bestMatchLength = nonUniqueLength;
           else
              bestMatchLength = compareLength;
          }
      }

 [sequence free];

 if (bestMatch != nil)
    {
     id result = [CharString str:[bestMatch str]];
     [result charAt:bestMatchLength put:0];
     return result;
    }
 else
    return nil;
}


=:

/*==================== DO NOT REMOVF    EDIT ============================

      This comment and the following sccsId declaration are managed
      by SCCS for you. Do not edit or remove either.

      Source file:    /users/bmw/Alpha/Substrate/SCCS/s.BM_DoubleArr.m
      Latest version: 1.3
      Last mod time:  03/05/89 at 20:37:05
```

```
==========================================================================*/

static char *sccsId = "@(#)BM_DoubleArr.m rev 1.3 created on 03/05/89 at 20:37:05";

/*===================== DO NOT REMOVE OR EDIT ============================*/

#include "objc.h"
#include "vectors.h"
#include <varargs.h>

#define FIRST ((double *)IV(self))

= BM_DoubleArray: Array (BM_WorkstationMsgs, Primitive)
  {
  }

  +(unsigned)ndxVarSize
    {
     return sizeof(double);
    }

  + (STR) ndxVarType
    {
     return "d";
    }

  -(STR)describe
    {
     return "d";
    }

  + new:(unsigned) nElements
    {
     self = (*_alloc)(self, nElements*sizeof(double));

     if (self != nil)
        {
        capacity = nElements;
        [self initialize];
        }

     return self;
    }

  +new: (unsigned)nElements  fillWith: (float)aNumber
    {
     self = (*_alloc)(self, nElements*sizeof(double));

     if (self != nil)
        {
        unsigned index;

        capacity = nElements;
        [self initialize];

        for (index = 0; index < nElements; index++)
           *(FIRST + index) = (double)aNumber;

        }

     return self;
    }
```

```
/*
  +copyOfArray:anArray
    {
     self = [self new:[anArray size]];

     if (self != nil)
       {
        unsigned index;

        for (index = [self size]; index != 0; index--)
           *(FIRST + index - 1) = (double) [anArray numberAt:index - 1];
       }

     return self;
    }
*/

  +new: (unsigned)nElements  rand: (float)seed
    {
     self = [self new:nElements];

     if (self != nil)
       {
        unsigned index;

        srand48 ((long) seed);

        for (index = 0; index < nElements; index++)
           *(FIRST + index) = (double) drand48();
       }

     return self;
    }

  -initialize
    {
     return self;
    }

  - (double)doubleAt:(unsigned)anOffset
    {
     if (anOffset >= capacity)
        return (double) ((int)[self boundsViolation:anOffset]);
     else
        return *(FIRST + anOffset);
    }

  - (double)doubleAt:(unsigned)anOffset put:(double)aDouble
    {
     double *member = FIRST + anOffset;
     if (anOffset >= capacity)
        return (double) ((int)[self boundsViolation:anOffset]);
     else
       {
        double tmp = *member;
        *member = aDouble;
        return tmp;
       }
    }

  - copy
```

```
  {
  return (*_copy)(self, capacity*sizeof(double));
  }

- shallowCopy
  {
  return [self copy];
  }

- deepCopy
  {
  return [self copy];
  }

- capacity:(unsigned)nSlots
  {
  register double * unused;
  register unsigned n = nSlots - capacity;

  self = (*_realloc)(self, isa->clsSizInstance + nSlots*sizeof(double));

  if (self != nil)
     {
     unused = FIRST + capacity;
     if (nSlots > capacity) // zero out the end of the expanded array
          for (n = nSlots - capacity; n--;)
                *unused++ = 0.0;
     capacity = nSlots;
     }

  return self;
  }

- (double)doubleAt:(unsigned)anOffset add:(double)aDouble
  {
  if (anOffset >= capacity)
     return (double) ((int) [self boundsViolation:anOffset]);
  else
     {
     *(FIRST + anOffset) += aDouble;
     return FIRST[anOffset];
     }
  }

- (double)doubleAt:(unsigned)anOffset insert:(double)aDouble
  {
  if (anOffset < capacity-1)
     {
     register int i = capacity-1;
     register double *member = FIRST;

     for (; i > anOffset; i--)
        member[i] = member[i-1];
     return member[i] = aDouble;
     }
  else
     return (double) ((int) [self error:"%s cannot expand", NAMEOF(self)]);
  }

- printContentsOn:(IOD)anIOD
  {
  register double* member = FIRST;
```

```
register unsigned n = capacity, notFirst = 0;
while (n--)
  {
   if (notFirst++)
      fprintf(anIOD, ", ");
   fprintf(anIOD, "%f", *member++);
  }
return self;
}


#define toDOUBLE(x)     *((float*)(x))

static int cmp(a, b) STR a, b;
  {
   if ((toDOUBLE (a)) == (toDOUBLE (b)))
      return 0;
   else
      return (-1 + 2*(toDOUBLE (a) > toDOUBLE (b)));
  }


 - sort
  {
   qsort(IV(self), capacity, sizeof(double), cmp);
   return self;
  }

 - (BOOL)isEqual:anObject
  {
   register unsigned n = capacity;
   register double *member, *otherMember;

   if (![anObject isKindOf:BM_DoubleArray] || anObject->capacity != capacity)
      return NO;

   member = FIRST;
   otherMember = (double*)IV(anObject);
   while (n--)
      if (*member++ != *otherMember++)
         return NO;
   return YES;
  }

 - (BOOL)isCopyOf:anObject
   {
    register unsigned n = capacity;
    register double *member, *otherMember;

    if (![super isCopyOf:anObject] || ![anObject capacity] == capacity)
       return NO;
    member = FIRST;
    otherMember = (double*)IV(anObject);

    while (n--)
       if (*member++ != *otherMember++)
          return NO;
    return YES;
   }

 -(double *) asArrayPointer: (unsigned) offset
   {
    return (FIRST + offset);
   }
```

```
-(unsigned) numberSize
   {
    return [self ndxVarSize];
   }

-(double) numberAt: (unsigned)anOffset
   {
    return [self doubleAt:anOffset];
   }

-(double) numberAt: (unsigned)anOffset  put: (double)aNumber
   {
    return [self doubleAt:anOffset put:aNumber];
   }

-(double) numberAt: (unsigned)anOffset insert: (double)aNumber
   {
    return [self doubleAt:anOffset insert:aNumber];
   }

-(double) numberAt: (unsigned)anOffset add: (double)aNumber
   {
    return [self doubleAt:anOffset add:aNumber];
   }




=:

/*===================== DO NOT REMOVΓ    EDIT ==============================

       This comment and the following sccsId declaration are managed
       by SCCS for you. Do not edit or remove either.

       Source file:     /users/bmw/Alpha/Substrate/SCCS/s.BM_FlowLayer.m
       Latest version:  1.1
       Last mod time:   07/19/89 at 10:18:08

==========================================================================*/

static char *sccsId = "@(#)BM_FlowLayer.m rev 1.1 created on 07/19/89 at 10:18:08";

/*===================== DO NOT REMOVE OR EDIT ============================*/

#include "objc.h"
#include "uil.h"

#include "BMWGlobal.h"

#define IMAGESIZE 45
#define PIPESIZE 10

@requires ImageLayer,BitMap,RollBar;

= BM_FlowLayer : BorderLayer (BM_WorkstationMsgs, UIMESSAGES)
   {
   id dataIcon,calculationIcon,outputIcon,memoryIcon;
   id dataImage,calculationImage,outputImage,memoryImage;

   id barL,barT,barR,barB,barC;
   }
```

```
- onStandby
{
[barL onStandby];
[barT onStandby];
[barR onStandby];
[barB onStandby];
[barC onStandby];

return self;
}


- normalStatus
{
[self onStandby];
[barC onActive];

return self;
}


- ingres
{
[self onStandby];
[barT onActive];

return self;
}


- graphics
{


[self onStandby];
[barR onActive];

return self;
}


- traversal
{
[self onStandby];
[barB onActive];

return self;
}


- initialization
{
[self onStandby];
[barB onActive];

return self;
}


- formatting
{
[self onStandby];
[barB onActive];
```

```
return self;
}


- freeing
{
[self onStandby];
[barL onActive];

return self;
}


- addFixtures
{
dataIcon = [BitMap readFrom:"./icons/data.icon"];
dataImage = [ImageLayer createInterfaceFor:dataIcon];
[dataImage borderWidth:0];
[dataImage attachTo:self at:pt(IMAGESIZE+(short)(2.7*INNERSPACING),
    INNERSPACING)];

barT = [[RollBar attachTo:self]
    origin:pt([dataImage centerX]-(PIPESIZE/2),[dataImage adjacentBottom])];
[barT extent:pt(PIPESIZE,(short)(1.5*INNERSPACING))];
[barT onStandby];

barC = [[RollBar attachTo:self]
    extent:pt(PIPESIZE,PIPESIZE)];
[barC center:pt([barT centerX],[barT adjacentBottom])];
[barC onStandby];

barB = [[RollBar attachTo:self]
   origin:pt([barT left],[barC adjacentBottom])];
[barB extent:pt(PIPESIZE,(short)(1.5*INNERSPACING))];
[barB onStandby];

calculationIcon = [BitMap readFrom:"./icons/calculation.icon"];
calculationImage = [ImageLayer createInterfaceFor:calculationIcon];
[calculationImage borderWidth:0];
[[calculationImage attachTo:self]
    origin:pt([dataImage left],[barB adjacentBottom])];

barL = [[RollBar attachTo:self] extent:pt(3*INNERSPACING,PIPESIZE)];
[[barL right:[barC adjacentLeft]] centerY:[barC centerY]];
[barL onStandby];

memoryIcon = [BitMap readFrom:"./icons/memory.icon"];
memoryImage = [ImageLayer createInterfaceFor:memoryIcon];
[memoryImage borderWidth:0];
[[[memoryImage attachTo:self]
    right:[barL left]] centerY:[barC centerY]];

barR = [[RollBar attachTo:self]
    extent:pt(3*INNERSPACING,PIPESIZE)];
[[barR left:[barC adjacentRight]] centerY:[barC centerY]];
[barR onStandby];

outputIcon = [BitMap readFrom:"./icons/output.icon"];
outputImage = [ImageLayer createInterfaceFor:outputIcon];
[outputImage borderWidth:0];
[[[outputImage attachTo:self]
    left:[barR adjacentRight]] centerY:[barR centerY]];
```

```
return self;
}


- initialize
{
[super initialize];
[self borderWidth:0];
[self insideColor:BM_colors.Frame];
[self addFixtures];

return self;
}


=:

/*==================== DO NOT REMOVI    EDIT ============================

       This comment and the following sccsId declaratjon are managed
       by SCCS for you. Do not edit or remove either.

       Source file:     /users/bmw/Alpha/Substrate/SCCS/s.BM_Matrix.m
       Latest version:  1.25
       Last mod time:   09/13/89 at 12:33:24

=========================================================================*/

static char *sccsId = "@(#)BM_Matrix.m rev 1.25 created on 09/13/89 at 12:33:24";

/*==================== DO NOT REMOVE OR EDIT ===========================*/

#include <stdio.h>
#include <string.h>

#include "objc.h"
#include "uil.h"

#include "BMWGlobal.h"


@requires CharString, ShortArray, OrdCltn;


= BM_Matrix: BM_NumericArray (BM_WorkstationMsgs, Primitive)
   {
    unsigned nRows,
             nColumns;
    id       name;
    id       description;
   }


  +nRows:(unsigned)rows nColumns:(unsigned)columns  fillWith:(NUMBER)aScalar
     {
      self = [super new:(rows * columns) fillWith:aScalar];

      if (self != nil)
        {
         nRows    = rows;
         nColumns = columns;
        }
```

```
  return self;
 }


+nRows:(unsigned)rows nColumns:(unsigned)columns
 {
  self = [super new:(rows * columns)];

  if (self != nil)
    {
     nRows    = rows;
     nColumns = columns;
    }

  return self;
 }


-(NUMBER)numberAtRow:(unsigned)aRow Col:(unsigned)aColumn
 {

  return [self numberAt:[self offsetFromRow:aRow Col:aColumn]];
 }


-(NUMBER)numberAtRow:(unsigned)aRow Col:(unsigned)aColumn put:(NUMBER)aNumber
 {
  return[self numberAt:[self offsetFromRow:aRow Col:aColumn] put:aNumber];
 }


-(BOOL)flagValueAtRow:(unsigned)aRow Col:(unsigned)aColumn
 {
  return [self getFlagValue:[self offsetFromRow:aRow Col:aColumn]];
 }

-copy
 {
  id newMatrix = [super copy];

  /* the copy got my name and description; I'll make copies of them that
     I can keep! */

  if (newMatrix != nil)
    {
     if (name != nil)
        name = [CharString str:[name str]];

     if (description != nil)
        description = [CharString str:[description str]];
    }

  return newMatrix;
 }


-initialize
 {
  [super initialize];

  name = nil;
  description = nil;

  return self;
 }
```

```
-(unsigned) nColumns
  {
   return nColumns;
  }


-(unsigned) nRows
  {
   return nRows;
  }


-(unsigned)size
  {
   return nRows*nColumns;
  }


-reDimensionRows:(unsigned)newNumberOfRows
        Columns:(unsigned)newNumberOfColumns

  {
   nRows    = newNumberOfRows;
   nColumns = newNumberOfColumns;

   if ([self capacity] < nRows*nColumns)
      return [self capacity:nRows*nColumns*2];
   else
      return self;
  }


-nameSTR:(STR)newName
  {
   return [self name:[CharString str:newName]];
  }


-(STR)nameSTR
  {
   return [name str];
  }


-(STR)descriptionSTR
  {
   return [description str];
  }


-name:newName
  {
   if (name != nil)
      [name free];

   name = newName;

   return self;
  }


-description:newDescription
  {
```

```
    if (description != nil)
       [description free];

    description = newDescription;

    return self;
   }



-(unsigned)offsetFromRow:(unsigned)row  Col:(unsigned)col
   {
    return (nColumns*row + col);
   }


-transpose
   {
    NUMBER *ptrToOldValues,
           *ptrToNewValues;

    unsigned row,
             column;

    id newMatrix = [self copy];

    if (newMatrix != nil)
       {
        [newMatrix reDimensionRows:nColumns Columns:nRows];
        [newMatrix setAllFlags];

        ptrToOldValues = [self      asArrayPointer:0];
        ptrToNewValues = [newMatrix asArrayPointer:0];

        for (row = nRows; row != 0; row--)
           for (column = nColumns; column != 0; column--)
              if ([self getFlagValue:nColumns*(row - 1) + (column - 1)])
                 *(ptrToNewValues + nRows*(column - 1) + (row - 1)) =
                      *(ptrToOldValues + nColumns*(row - 1) + (column - 1));
              else
                 [newMatrix setFlagValue:nRows*(column - 1) + (row - 1) to:NO];
        [self free];
       }
    return newMatrix;
   }


-flip
   {
    unsigned row;

    id temp = [BM_Matrix nRows:1 nColumns:nColumns];

    if (temp != nil)
       {
        for (row = 0; row < nRows / 2; row++)
           {
            [self copyFrom:[self offsetFromRow:row Col:0]
                        To:[self offsetFromRow:row Col:nColumns-1]
                      into:temp
                        at:0];
```

```
        [self copyFrom:[self offsetFromRow:(nRows-row-1) Col:0]
                    To:[self offsetFromRow:(nRows-row-1) Col:nColumns-1]
                  into:self
                    at:[self offsetFromRow:row Col:0]];

        [temp copyFrom:[temp offsetFromRow:0 Col:0]
                    To:[temp offsetFromRow:0 Col:nColumns-1]
                  into:self
                    at:[self offsetFromRow:(nRows-row-1) Col:0]];
       }

     [temp free];

     return self;
   }
 return nil;
}



-sortUsing:aSortTable
 {
  unsigned index, sourceIndex;
  id result = [self copy];

  if (result != nil)
    {
     for (index = [aSortTable size]; index > 0; index--)
       {
        sourceIndex = (unsigned)[aSortTable numberAt:index-1];

        [self copyFrom:[self offsetFromRow:sourceIndex Col:0]
                    To:[self offsetFromRow:sourceIndex Col:nColumns-1]
                  into:result
                    at:[result offsetFromRow:index-1 Col:0]];
       }

     [self free];
    }

  return result;
 }


-unSortUsing:aSortTable
 {
  unsigned index, sourceIndex;
  id result = [self copy];

  if (result != nil)
    {
     for (index = [aSortTable size]; index > 0; index--)
       {
        sourceIndex = (unsigned)[aSortTable numberAt:index-1];

        [self copyFrom:[self offsetFromRow:index-1 Col:0]
                    To:[self offsetFromRow:index-1 Col:nColumns-1]
                  into:result
                    at:[result offsetFromRow:sourceIndex Col:0]];
       }

     [self free];
    }
```

```
 return result;
}


-extractRowsFrom:(unsigned)firstRow To:(unsigned)lastRow
{
 id newMatrix = [BM_Matrix nRows:lastRow-firstRow+1 nColumns:nColumns];

 if (newMatrix != nil)
    [self copyFrom:[self offsetFromRow:firstRow Col:0]
                To:[self offsetFromRow:lastRow  Col:nColumns-1]
              into:newMatrix
                at:0];

 return newMatrix;
}.


-concatenateWith:aMatrix
{
 unsigned oldnRows = nRows;

 if (aMatrix == nil)
    return self;

 if (nColumns == [aMatrix nColumns])
    {
     self = [self reDimensionRows:oldnRows + [aMatrix nRows]
                          Columns:nColumns];

     if (self != nil)
        [aMatrix copyFrom:[aMatrix offsetFromRow:0 Col:0]
                       To:[aMatrix offsetFromRow:[aMatrix nRows] - 1
                                            Col:nColumns-1]
                     into:self
                       at:[self offsetFromRow:oldnRows Col:0]];
     [aMatrix free];

     return self;
    }
 return nil;
}


-concatenateNumber:(NUMBER)aNumber
{
 if (nColumns == 1)
    {
     self = [self reDimensionRows:nRows+1 Columns:nColumns];

     if (self != nil)
        [self numberAt:[self nRows]-1 put:aNumber];

     return self;
    }
 return nil;
}

-concatenateFrom:aMatrix firstRow:(unsigned)firstRow
                          lastRow:(unsigned)lastRow
{
 unsigned oldnRows = nRows;
```

```
    if (aMatrix == nil)
       return self;

    if (nColumns == [aMatrix nColumns])
       {
        self = [self reDimensionRows:oldnRows + lastRow - firstRow + 1
                             Columns:nColumns];
        if (self != nil)
           [aMatrix copyFrom:[aMatrix offsetFromRow:firstRow Col:0]
                          To:[aMatrix offsetFromRow:lastRow
                                                Col:nColumns-1]
                        into:self
                          at:[self offsetFromRow:oldnRows Col:0]];
        return self;
       }
    return nil;
   }


-(unsigned)equalBlock:(unsigned)row
   {
    while ((row + 1 < nRows) &&
          ([self getFlagValue:[self offsetFromRow:row Col:0]]) &&
          ([self numberAt:[self offsetFromRow:row+1 Col:0]] ==
                          [self numberAt:[self offsetFromRow:row Col:0]]))
       row += 1;

    return row;
   }


-replicateUsing:aMatrix
   {

    unsigned myRowNum = 0,
             rowNum1  = 0,
             rowNum2  = 0;

    id result = nil;

    while (rowNum1 < [aMatrix size])
       {
        rowNum2 = [aMatrix equalBlock:rowNum1];

        while (rowNum1++ <= rowNum2)
           if (result == nil)
              result = [self extractRowsFrom:myRowNum To:myRowNum];
           else
              result = [result concatenateWith:
                               [self extractRowsFrom:myRowNum To:myRowNum]];
        if (nRows > 1)
           myRowNum += 1;
       }

    [self free];

    return result;
   }


-takeApartUsing:aMatrix
   {
    unsigned rowNum1 = 0,
             rowNum2 = 0;
```

```
    id result = [OrdCltn new:1];

    while (rowNum1 < [aMatrix nRows])
      {
       rowNum2 = [aMatrix equalBlock:rowNum1];

       result = [result add:[self extractRowsFrom:rowNum1 To:rowNum2]];

       rowNum1 = rowNum2 + 1;
      }

    return result;
   }



 -terminate$
   {
    if (name != nil)
       [name free];

    if (description != nil)
       [description free];

    return [super terminate$];
   }

=:

/*===================== DO NOT REMOV     EDIT ==============================

      This comment and the following sccsId declaration are managed
      by SCCS for you. Do not edit or remove either.

      Source file:     /users/bmw/Alpha/Substrate/SCCS/s.BM_Misc.m
      Latest version:  1.5
      Last mod time:   08/27/89 at 16:55:08

==========================================================================*/

static char *sccsId = "@(#)BM_Misc.m rev 1.5 created on 08/27/89 at 16:55:08";

/*===================== DO NOT REMOVE OR EDIT ===========================*/


#include <stdio.h>
#include <errno.h>
#include <string.h>
#include <math.h>


/*
   These X functions are here because it's hard to include both uil.h and
   Xgp.h
*/

#ifdef XWIN
#include "Xgp.h"

extern Display *openDisplay;
```

```
Atom BM_XInternAtom (atomName)
char *atomName;
   {
    return XInternAtom (openDisplay, atomName, 1);
   }

char *BM_XGetAtomName (anAtom)
Atom anAtom;
   {
    return XGetAtomName (openDisplay, anAtom);
   }

char *BM_XQueryFont (aFont)
FONT aFont;
   {
    return (char *)XQueryFont (openDisplay, aFont->xfont);
   }

BM_XFreeFontInfo (aFontStruct)
XFontStruct *aFontStruct;
   {
    return XFreeFontInfo ((char **)0, aFontStruct, 1);
   }

unsigned long BM_XGetFontProperty (fontStruct, atom)
XFontStruct *fontStruct;
Atom        atom;
   {
    unsigned long returnValue;

    if (XGetFontProperty (fontStruct, atom, &returnValue))
       return returnValue;
    else

       return 0;
   }

BM_XSetWindowName (windowId, windowName)
WINDOW windowId;
char  *windowName;
   {
    return XStoreName (openDisplay, windowId->xwindow, windowName);
   }

BM_XDisplayHeight ()
   {
    return XDisplayHeight (openDisplay, 0);
   }

BM_XDisplayWidth ()
   {
    return XDisplayWidth (openDisplay, 0);
   }

BM_XDisplayHeightMM ()
   {
    return XDisplayHeightMM (openDisplay, 0);
   }

BM_XDisplayWidthMM ()
   {
    return XDisplayWidthMM (openDisplay, 0);
```

```
   }


#endif


COPY_BYTES (dest, source, count)

char *dest,
     *source;
int  count;

   {
    memcpy (dest, source, count);
   }


ZAP_TRAILING_SPACES (str)

char *str;

   {
    int index;

    for (index = strlen(str)-1; index >= 0; index--)
       if (str [index] == ' ')
          str [index] = 0;
       else
          index = -1;
   }



CAPITALIZE_DATE (str)

char *str;

   {
    char *firstDash = strchr (str, )

    if ((firstDash != NULL) && (strlen(++firstDash) > 2))
       {
        firstDash[0] = toupper(firstDash[0]);
        firstDash[1] = tolower(firstDash[1]);
        firstDash[2] = tolower(firstDash[2]);
       }
   }



int SeqNoIntervalWidth (firstSeqNo, lastSeqNo, seqNosPerColumn)

unsigned firstSeqNo, lastSeqNo, seqNosPerColumn;

     {
      return (int) ceil ((double) (lastSeqNo - firstSeqNo) / seqNosPerColumn);
     }



/* these routines are part of the SlaveDB setup
```

```
#include "BMDBProtocol.h"

int SendData(addr,size)
     char *addr;
     int size;
{
  while(write(outputFD, addr, size) == -1)
    {
      if (errno != EINTR)
        {
          perror("SendData");
#ifdef SLAVE_DB
          exit(1);
#else
          WriteConsoleErrorMessage();
          bye(1);
#endif
        }
    }
}

int RecvData(addr, size)
     char *addr;
     int size;
{
  while(read(inputFD, addr, size) == -1)
    {
      if (errno != EINTR)
        {
          perror("SendData");
#ifdef SLAVE_DB
          exit(1);
#else
          WriteConsoleErrorMessage();
          bye(1);
#endif
        }
    }
}

*/

/*===================== DO NOT REMO'   ? EDIT ============================

        This comment and the following sccsId declaration are managed
        by SCCS for you. Do not edit or remove either.

        Source file:     /users/bmw/Alpha/Substrate/SCCS/s.BM_Monitor.m
        Latest version:  1.7
        Last mod time:   09/13/89 at 14:59:03

========================================================================*/

static char *sccsId = "@(#)BM_Monitor.m rev 1.7 created on 09/13/89 at 14:59:03";

/*===================== DO NOT REMOVE OR EDIT ===========================*/

#include "objc.h"
#include "uil.h"

#include "BMWGlobal.h"

@requires StringLayer,BorderLayer,BM_FlowLayer;
```

```
= BM_Monitor : BorderLayer (BM_WorkstationMsgs, UIMESSAGES)
  {
  id myString;
  id myFlowChart;
  }

/* pull strings from string table */

  -normalStatus
    {
     [myFlowChart normalStatus];
     [myString assignSTR:"Ready"];
     return self;
    }

  -ingres
    {
     [myFlowChart ingres];
     [myString assignSTR:"Ingres"];
     return self;
    }

  -graphics
    {
     [myFlowChart graphics];
     [myString assignSTR:"CChart/GKS"];
     return self;
    }

  -traversal
    {
     [myFlowChart traversal];
     [myString assignSTR:"Traversal"];
     return self;
    }

  -initialization
    {
     [myFlowChart initialization];
     [myString assignSTR:"Initialization"];
     return self;
    }

  -formatting
    {
     [myFlowChart formatting];
     [myString assignSTR:"Formatting"];
     return self;
    }

  -freeing
    {
     [myFlowChart freeing];
     [myString assignSTR:"Freeing Memory"];
     return self;
    }


  -(PT)defaultExtent
    {
    return (pt(213,220));
    }
```

```
-extent:(PT)aPoint
   {
    [super extent:aPoint];
    [myFlowChart height:[self height]-[myString height]];
    [myFlowChart width:[self width]];
    [myString width:[self width]];
    [myString origin:pt([self left],[myFlowChart adjacentBottom])];
    return self;
   }


-initialize
   {
    [super initialize];
    [self borderWidth:0];

    myString = [[StringLayer str:""] attachTo:self];
    [myString borderWidth:0];
    if ([myString height]<20)
       [myString height:20];

    myFlowChart = [BM_FlowLayer attachTo:self at:pt(0,0)];
    [self normalStatus];

    return self;
   }

-terminate$
   {
    statusMonitor = nil;

    return [super terminate$];
   }
=:

/*===================== DO NOT REMO\   ' EDIT =============================

       This comment and the following sccsId declaration are managed
       by SCCS for you. Do not edit or remove either.

       Source file:    %F%
       Latest version: %I%
       Last mod time:  %H% at %U%

========================================================================*/

static char *sccsId = "%Z%%M% rev %I% created on %H% at %U%";

/*===================== DO NOT REMOVE OR EDIT ===========================*/


#include "objc.h"
#include "uil.h"



#include "BMWGlobal.h"

#include <stdio.h>


@requires OrdCltn;
```

```
= BM_NetworkNode : Object (BM_WorkstationMsgs, Collection, Primitive)
  {
   id parents;
   id children;
  }


+ collectionClass
  {
   return OrdCltn;
  }


+ new
  {
   self = [super new];

   parents  = nil;
   children = nil;

   return self;
  }


- addParent:aNetworkNode
  {
   if (parents == nil)
      parents = [[[self class] collectionClass] new:1];

   parents = [parents add:aNetworkNode];

   return self;
  }


- addChild:aNetworkNode
  {
   if (children == nil)
      children = [[[self class] collectionClass] new:1];

   children = [children add:aNetworkNode];

   return self;
  }


- deleteParent:aNetworkNode
  {
   id deletedNode;

   if ((parents == nil) ||
       ((deletedNode = [parents remove:aNetworkNode]) == nil))
      [self error:"illegal network node deletion!"];

   return self;
  }


- deleteChild:aNetworkNode
  {
   id deletedNode;
```

```
  if ((children == nil) ||
      ((deletedNode = [children remove:aNetworkNode]) == nil))
     [self error:"illegal network node deletion!"];

  return self;
 }


- terminate$
 {
  [parents  elementsPerform:@selector(deleteChild:) with:self];
  [children elementsPerform:@selector(deleteParent:) with:self];

  parents  = [parents free];
  children = [children free];

  return [super terminate$];
 }

/*==================== DO NOT REMO'   ` EDIT ============================

      This comment and the following sccsId declaration are managed
      by SCCS for you. Do not edit or remove either.

      Source file:     /users/bmw/Alpha/Substrate/SCCS/s.BM_NumercArr.m
      Latest version:  1.12
      Last mod time:   09/13/89 at 12:33:52

=========================================================================*/

static char *sccsId = "@(#)BM_NumercArr.m rev 1.12 created on 09/13/89 at 12:33:52";

/*==================== DO NOT REMOVE OR EDIT ==========================*/

#include <math.h>

#include "objc.h"
#include "uil.h"

#include "BMWGlobal.h"


#define ROUND(f) (fmod(f,1.0)>0.5? ceil(f*100000000.0)/100000000.0: \
                                   floor(f*100000000.0)/100000000.0)


= BM_NumericArray: BM_SparseArray (BM_WorkstationMsgs, Primitive)
  {
   unsigned denomination;
   unsigned degree;
  }

  -initialize
    {
     [super initialize];

     denomination = 0;
     degree = 0;

     return self;
    }
```

```
-(unsigned)denomination
  {
   return denomination;
  }

-(unsigned)degree
  {
   return degree;
  }

-multiplyByScalar: (NUMBER)aScalar
  {
   int index;
   NUMBER *ptrToValues;

   ptrToValues = [self asArrayPointer:0];

   for (index = [self size] - 1; index >= 0; index--)
      *(ptrToValues + index) *= aScalar;

   return self;
  }

-multiplyElementWise: aNumericArray
  {
   int index;
   NUMBER *ptrToValues1, *ptrToValues2;

   if ([self size] == [aNumericArray size])
      {
       ptrToValues1 = [self          asArrayPointer:0];
       ptrToValues2 = [aNumericArray asArrayPointer:0];

       for (index = [self size] - 1; index >= 0; index--)
          if ([aNumericArray getFlagValue:index] == YES)
             *(ptrToValues1 + index) *= *(ptrToValues2 + index);
          else
             [self clearFlag:index];
      }
   else
      return nil;

   return self;
  }

-exponentiateElementWise: aNumericArray
  {
   int index;
   NUMBER *ptrToValues1, *ptrToValues2;

   if ([self size] == [aNumericArray size])
      {
       ptrToValues1 = [self          asArrayPointer:0];
       ptrToValues2 = [aNumericArray asArrayPointer:0];

       for (index = [self size] - 1; index >= 0; index--)
          if (([aNumericArray getFlagValue:index] == YES) &&
               ((*(ptrToValues1 + index) != 0) ||
                (*(ptrToValues2 + index) > 0)))
             *(ptrToValues1 + index) = pow (*(ptrToValues1 + index),
                                            *(ptrToValues2 + index));
          else
             [self clearFlag:index];
```

```
   }
 else
   return nil;

 return self;
}

-divideElementWise: aNumericArray
 {
 int index;
 NUMBER *ptrToValues1, *ptrToValues2;

 if ([self size] == [aNumericArray size])
   {
    ptrToValues1 = [self         asArrayPointer:0];
    ptrToValues2 = [aNumericArray asArrayPointer:0];

    for (index = [self size] - 1; index >= 0; index--)
       if (([aNumericArray getFlagValue:index] == YES) &&
           (*(ptrToValues2 + index) != 0))
          *(ptrToValues1 + index) /= *(ptrToValues2 + index);
       else
          [self clearFlag:index];
   }
 else
   return nil;

 return self;
}

-(NUMBER)innerProduct: aNumericArray
 {
 int index;
 NUMBER result = 0,
        *ptrToValues1, *ptrToValues2;

 if ([self size] == [aNumericArray size])
   {
    ptrToValues1 = [self         asArrayPointer:0];
    ptrToValues2 = [aNumericArray asArrayPointer:0];

    for (index = [self size] - 1; index >= 0; index--)
       if (([aNumericArray getFlagValue:index] == YES) &&
           ([self getFlagValue:index] == YES))
          result += *(ptrToValues1+index) * *(ptrToValues2+index);
       else
          return 0.0;
   }
 else
   return 0.0;

 return result;
}

-addScalar: (NUMBER)aScalar
 {
 int index;
 NUMBER *ptrToValues;

 ptrToValues = [self asArrayPointer:0];

 for (index = [self size] - 1; index >= 0; index--)
   *(ptrToValues + index) += aScalar;
```

```
  return self;
 }

-addElementWise: aNumericArray
 {
  int index;
  NUMBER *ptrToValues1, *ptrToValues2;

  if ([self size] == [aNumericArray size])
    {
     ptrToValues1 = [self         asArrayPointer:0];
     ptrToValues2 = [aNumericArray asArrayPointer:0];

     for (index = [self size] - 1; index >= 0; index--)
        if ([aNumericArray getFlagValue:index] == YES)
           *(ptrToValues1 + index) += *(ptrToValues2 + index);
        else
           [self clearFlag:index];
    }
  else
     return nil;

  return self;
 }

-logicalAND: aNumericArray
 {
  int index;
  NUMBER *ptrToValues1, *ptrToValues2;

  if ([self size] == [aNumericArray size])
    {
     ptrToValues1 = [self         asArrayPointer:0];
     ptrToValues2 = [aNumericArray asArrayPointer:0];

     for (index = [self size] - 1; index >= 0; index--)
        if ([aNumericArray getFlagValue:index] == YES)
           *(ptrToValues1 + index) = *(ptrToValues2 + index) ?
                                          *(ptrToValues1 + index):0.0;

        else
           [self clearFlag:index];
    }
  else
     return nil;

  return self;
 }


-logicalOR: aNumericArray
 {
  int index;
  NUMBER *ptrToValues1, *ptrToValues2;

  if ([self size] == [aNumericArray size])
    {
     ptrToValues1 = [self         asArrayPointer:0];
     ptrToValues2 = [aNumericArray asArrayPointer:0];

     for (index = [self size] - 1; index >= 0; index--)
        if ([aNumericArray getFlagValue:index] == YES)
           *(ptrToValues1 + index) = *(ptrToValues2 + index) ?
                                          1.0:*(ptrToValues1 + index);
```

```
        else
           [self clearFlag:index];
      }
   else
      return nil;

   return self;
  }


-logicalNOT
  {
   int index;
   NUMBER *ptrToValues = [self asArrayPointer:0];

   for (index = [self size] - 1; index >= 0; index--)
      *(ptrToValues + index) = *(ptrToValues + index)?0.0:1.0;

   return self;
  }


-absoluteValue
  {
   int index;
   NUMBER *ptrToValues;

   ptrToValues = [self asArrayPointer:0];

   for (index = [self size] - 1; index >= 0; index--)
      *(ptrToValues + index) = abs (*(ptrToValues + index));
   return self;
  }

-naturalLog
  {
   int index;
   NUMBER *ptrToValues;

   ptrToValues = [self asArrayPointer:0];

   for (index = [self size] - 1; index >= 0; index--)
      if (*(ptrToValues + index) > 0)
         *(ptrToValues + index) = log (*(ptrToValues + index));
      else
         [self clearFlag:index];

   return self;
  }

-exponential
  {
   int index;
   NUMBER *ptrToValues;

   ptrToValues = [self asArrayPointer:0];

   for (index = [self size] - 1; index >= 0; index--)
      *(ptrToValues + index) = exp (*(ptrToValues + index));

   return self;
  }
```

```
-cumulate
  {
   int index;
   NUMBER *ptrToValues;

   ptrToValues = [self asArrayPointer:0];

   for (index = 0; index < [self size]; index++)
      if (index != 0)
         *(ptrToValues + index) += *(ptrToValues + index - 1);

   return self;
  }

-compareElementWise:lowArray:highArray  testEquality:(BOOL)testEquality
  {
   int index;

   if (((lowArray == nil) ||
       ([self size] == [lowArray size])) &&
      ((highArray == nil) ||
       ([self size] == [highArray size])))
      for (index = [self size] - 1; index >= 0; index--)
        {
         [self numberAt:index put:
              (((lowArray == nil) ||
                (([self getFlagValue:index]) &&
                 ([lowArray getFlagValue:index]) &&
                 ((ROUND([self numberAt:index])>
                                 ROUND([lowArray numberAt:index])) ||
                  (testEquality &&
                   ROUND([self numberAt:index])==
                                ROUND([lowArray numberAt:index])))))&&
                ((highArray == nil) ||
                 (([self getFlagValue:index]) &&
                  ([highArray getFlagValue:index]) &&
                  ((ROUND([self numberAt:index]) <
                                 ROUND([highArray numberAt:index])) ||
                   (testEquality &&
                    ROUND([self numberAt:index])==
                                ROUND([highArray numberAt:index]))))))
                                                     ?1.0:0.0];
        }
   else
      return nil;

   return self;
  }

-maximum:anArray
  {
   int index;
   NUMBER *ptrToMyValues, *ptrToOtherValues,
          *ptrToMyValue,  *ptrToOtherValue;

   if ([self size] == [anArray size])
     {
      ptrToMyValues     = [self    asArrayPointer:0];
      ptrToOtherValues  = [anArray asArrayPointer:0];

      for (index = [self size] - 1; index >= 0; index--)
        {
         ptrToMyValue    = ptrToMyValues    + index;
         ptrToOtherValue = ptrToOtherValues + index;
```

```
        *ptrToMyValue = (*ptrToMyValue >= *ptrToOtherValue) ?
                                      *ptrToMyValue:*ptrToOtherValue;
        }
      }
    else
      return nil;

    return self;
  }

-minimum:anArray
  {
   int index;
   NUMBER *ptrToMyValues, *ptrToOtherValues,
          *ptrToMyValue,  *ptrToOtherValue;

   if ([self size] == [anArray size])
      {
       ptrToMyValues    = [self    asArrayPointer:0];
       ptrToOtherValues = [anArray asArrayPointer:0];

       for (index = [self size] - 1; index >= 0; index--)
         {
          ptrToMyValue    = ptrToMyValues    + index;
          ptrToOtherValue = ptrToOtherValues + index;

          *ptrToMyValue = (*ptrToMyValue <= *ptrToOtherValue) ?
                                      *ptrToMyValue:*ptrToOtherValue;
         }
      }
   else
      return nil;

   return self;

  }

-(NUMBER) minimumStatistic
  {
   int index;
   NUMBER minimum = 999999999999.99,
          *ptrToValues;

   if (![self isNotEmpty])
      return BOGUS_VALUE;

   ptrToValues = [self asArrayPointer:0];

   for (index = [self size] - 1; index >= 0; index--)
      if (([self getFlagValue:index] == YES) &&
          ((*(ptrToValues + index)) < minimum))
         minimum = *(ptrToValues + index);

   return minimum;
  }

-(NUMBER) maximumStatistic
  {
   int index;
   NUMBER maximum = -999999999999.99,
          *ptrToValues;

   if (![self isNotEmpty])
      return BOGUS_VALUE;
```

```
    ptrToValues = [self asArrayPointer:0];

    for (index = [self size] - 1; index >= 0; index--)
       if (([self getFlagValue:index] == YES) &&
          ((*(ptrToValues + index)) > maximum))
         maximum = *(ptrToValues + index);

    return maximum;
   }



static id  _arrayBeingSorted;

static int _compareNumbersDescending (Number1, Number2)

NUMBER *Number1,
       *Number2;

{
 int index1 = (int) *Number1,
     index2 = (int) *Number2;

 if ((![_arrayBeingSorted getFlagValue:index1]) &&
     (![_arrayBeingSorted getFlagValue:index2]))
    return 0;
 else
    if ((![_arrayBeingSorted getFlagValue:index1]) ||
        (([_arrayBeingSorted getFlagValue:index2]) &&
         ([_arrayBeingSorted numberAt:index1] <
                                          [_arrayBeingSorted numberAt:index2])))
       return 1;
    else
       if ((![_arrayBeingSorted getFlagValue:index2]) ||
           (([_arrayBeingSorted getFlagValue:index1]) &&
            ([_arrayBeingSorted numberAt:index1] >
                                          [_arrayBeingSorted numberAt:index2])))
          return -1;
       else
          return 0;
}


static int _compareNumbersAscending (Number1, Number2)

NUMBER *Number1,
       *Number2;

{
 int index1 = (int) *Number1,
     index2 = (int) *Number2;

 if ((![_arrayBeingSorted getFlagValue:index1]) &&
     (![_arrayBeingSorted getFlagValue:index2]))
    return 0;
 else
    if ((![_arrayBeingSorted getFlagValue:index2]) ||
        (([_arrayBeingSorted getFlagValue:index1]) &&
         ([_arrayBeingSorted numberAt:index1] <
                                          [_arrayBeingSorted numberAt:index2])))
       return -1;
    else
```

```
    if ((![_arrayBeingSorted getFlagValue:index1]) ||
        (([_arrayBeingSorted getFlagValue:index2]) &&
         ([_arrayBeingSorted numberAt:index1] >
                                  [_arrayBeingSorted numberAt:index2])))
       return 1;
    else
       return 0;
}


-sortTable:(int *())comparisonFunction
  {
   id table = [BM_NumericArray new:[self size] fillWith:(NUMBER)1.0];

   if (table != nil)
      {
       [[table cumulate] addScalar:(NUMBER)-1.0];

       _arrayBeingSorted = self;

       qsort (IV(table),(int)[table size],
                       (int)[[table class]ndxVarSize],comparisonFunction);
      }

   return table;
  }

-ascendingSortTable
  {
   return [self sortTable:_compareNumbersAscending];
  }

-descendingSortTable
  {
   return [self sortTable:_compareNumbersDescending];
  }


-sortUsing:aSortTable

  {
   unsigned index, sourceIndex;
   id result = [self copy];

   if ((result != nil) && ([self size] == [aSortTable size]))
      {
       for (index = [aSortTable size]; index > 0; index--)
          {
           sourceIndex = (unsigned)[aSortTable numberAt:index-1];

           if ([self getFlagValue:sourceIndex])
              [result numberAt:index-1
                      put:(NUMBER)[self numberAt:sourceIndex]];
           else
              [result clearFlag:index-1];
          }

       [self free];
      }

   return result;
  }
```

```
-unSortUsing:aSortTable
  {
   unsigned index, sourceIndex;
   id result = [self copy];

   if ((result != nil) && ([self size] == [aSortTable size]))
      {
       for (index = [aSortTable size]; index > 0; index--)
          {
           sourceIndex = (unsigned)[aSortTable numberAt:index-1];

           if ([self getFlagValue:index-1])
              [result numberAt:sourceIndex
                          put:(NUMBER)[self numberAt:index-1]];
           else
              [result clearFlag:sourceIndex];
          }

       [self free];
      }

   return result;
  }



-(NUMBER)sumOfPowers:(unsigned)whichPower weights:weights
  {
   int index;
   NUMBER sum = 0,
          *ptrToValues,
          *ptrToWeights;

   if (![self isNotEmpty])
      return BOGUS_VALUE;

   ptrToValues = [self asArrayPointer:0];

   if (weights == nil)
      {
       for (index = [self size] - 1; index >= 0; index--)
          if ([self getFlagValue:index] == YES)
          sum += pow (*(ptrToValues + index), (double) whichPower);
   }
 else
   {
    [weights maskFlagsUsing:self];

    ptrToWeights = [weights asArrayPointer:0];

    for (index = [self size] - 1; index >= 0; index--)
       if ([weights getFlagValue:index] == YES)
          sum += pow (*(ptrToValues + index), (double) whichPower) *
                                            *(ptrToWeights + index);
   }

 return sum;
}
```

```
-(NUMBER)total:weights
  {
   NUMBER result = [self sumOfPowers:1 weights:weights];
   [weights free];
   return result;
  }

-(NUMBER)sampleMoment:(unsigned)whichMoment
              around:(NUMBER)aScalar
             weights:weights
  {
   NUMBER divisor;
   id     copy = [self copy];

   if (copy != nil)
     {
      NUMBER sum, divisor;

      sum = [[copy addScalar:-aScalar] sumOfPowers:whichMoment
                                           weights:weights];

      /* sumOfPowers modifies weights's flags! */

      if (weights == nil)
         divisor = (NUMBER)[self nFlagsSet];
      else
         divisor = [weights total:nil];

      [copy free];
      [weights free];

      if ((divisor != 0.0) && (divisor != BOGUS_VALUE))
         return (sum / divisor);
     }

    return BOGUS_VALUE;
   }

 -(NUMBER)mean:weights
   {
    return [self sampleMoment:1 around:0.0 weights:weights];
   }

 -(NUMBER)stddev:weights
   {
    NUMBER variance;

    if ((variance = [self sampleMoment:2 around:(NUMBER)[self mean:nil]
                                    weights:weights]) >= 0)

       return sqrt(variance);
    else
       return BOGUS_VALUE;
   }

  -quantile:(NUMBER)percentageQuantileWidth weights:weights
    {
     unsigned index, resultIndex;
     NUMBER quantileWidth;
     id sortTable = [self descendingSortTable];
     id result    = [self copy];
```

```
if (weights == nil)
   weights = [BM_NumericArray new:[self size] fillWith:(NUMBER)1.0];

[weights maskFlagsUsing:self];

if (percentageQuantileWidth != 0.0)
   quantileWidth = percentageQuantileWidth * [weights total:nil];
else
   quantileWidth = 1.0;

if ((sortTable != nil) && (result != nil) && (weights != nil))
   {
    NUMBER accumulator = 0.0;

    for (index = 0; index < [self size]; index++)
      {
       resultIndex = (unsigned)[sortTable numberAt:index];
       if ([weights getFlagValue:resultIndex])
         {
          accumulator += [weights numberAt:resultIndex];
          [result numberAt:resultIndex
                     put:(NUMBER)ceil((double)accumulator/
                                                 quantileWidth)];
         }
       else
          [result clearFlag:resultIndex];
      }

    [sortTable free];
    [weights free];
    [self free];
    return result;
   }

 return nil;
}


-proportion:(NUMBER)aScalar
 {
 unsigned index;

 for (index = 0; index < [self size]; index++)
    if ([self getFlagValue:index])
       [self numberAt:index put:(NUMBER)[self numberAt:index]/aScalar];

 return self;
}


=:

/*===================== DO NOT REMOVI    EDIT ============================

       This comment and the following sccsId declaration are managed
       by SCCS for you. Do not edit or remove either.

       Source file:     /users/bmw/Alpha/Substrate/SCCS/s.BM_Select.m
       Latest version:  1.2
       Last mod time:   04/22/89 at 18:07:17

=========================================================================*/
```

```
static char *sccsId = "@(#)BM_Select.m rev 1.2 created on 04/22/89 at 18:07:17";

/*==================== DO NOT REMOVE OR EDIT ===========================*/


#ifdef HP

#include "HPgp.h"
int BMSelect()
{
  extern GP_DISPLAY *gp_display;
  int inputMask = (1 << gp_display->kbdFile) | (1 << gp_display->mouseFile);
  int numberOfFDs = max (gp_display->mouseFile, gp_display->kbdFile) + 1;

#endif /*HP*/

#ifdef SUN

#include <sunwindow/window_hs.h>
#include "SUNgp.h"
#include "objc.h"

=(UserInterface)

int BMSelect()
{
  extern id currentDisplay;
  WINDOW windowId = [currentDisplay windowId];
  int inputMask = (1 << (windowId->windowfd));
  int numberOfFDs = windowId->windowfd + 1;

#endif /*SUN*/

#ifdef XWIN

#include <X11/Xlib.h>

int BMSelect()
{
  extern Display *openDisplay;

  int fileDescriptor = ConnectionNumber(openDisplay);
  int inputMask  =  (1 << fileDescriptor);
  int numberOfFDs = fileDescriptor + 1;

#endif /*XWIN*/

  int outputMask = 0;
  int exceptMask = 0;

  return(select(numberOfFDs, &inputMask, &outputMask, &exceptMask, 0));
}

/*==================== DO NOT REMOVI    EDIT ============================

        This comment and the following sccsId declaration are managed
        by SCCS for you. Do not edit or remove either.

        Source file:    /users/bmw/Alpha/Substrate/SCCS/s.BM_SparseArr.m
        Latest version: 1.6
        Last mod time:  03/26/89 at 20:41:51

======================================================================*/
```

```
static char *sccsId = "@(#)BM_SparseArr.m rev 1.6 created on 03/26/89 at 20:41:51";

/*==================== DO NOT REMOVE OR EDIT ==========================*/


#include "objc.h"
#include "uil.h"

#include "BMWGlobal.h"

#include <stdio.h>


@requires ShortArray;


= BM_SparseArray: BM_DoubleArray (BM_WorkstationMsgs, UserInterface, Primitive)
  {
   id arrayOfFlags;
  }

  -copyFrom:(unsigned)offset1
        To:(unsigned)offset2 into:aSparseArray at:(unsigned)offset3
    {
     COPY_BYTES (((NUMBER *)IV(aSparseArray))+offset3,
                 ((NUMBER *)IV(self))+offset1,
                 (offset2 - offset1 + 1)*sizeof(NUMBER));
     COPY_BYTES (((short *)IV([aSparseArray getFlags]))+offset3,
                 ((short *)IV(arrayOfFlags))+offset1,
                 (offset2 - offset1 + 1)*[ShortArray ndxVarSize]);
     return self;
    }


  -setFlags:anArrayOfFlags
    {
     if (arrayOfFlags != nil)
        [arrayOfFlags free];

     arrayOfFlags = anArrayOfFlags;

     return self;
    }

  -getFlags
    {
     return arrayOfFlags;
    }

  -(BOOL)setFlagValue:(unsigned)anOffset  to:(BOOL)aValue
    {
     if (anOffset < [self size])
       {
        [arrayOfFlags shortAt:anOffset put:(short)aValue];
        return YES;
       }
     return NO;
    }

  -(BOOL) getFlagValue:(unsigned)anOffset
    {
     return (BOOL) [arrayOfFlags shortAt:anOffset];
    }
```

```
-(BOOL) setFlag:(unsigned)anOffset
  {
   return [self setFlagValue:anOffset to:YES];
  }

-(BOOL) clearFlag:(unsigned)anOffset
  {
   return [self setFlagValue:anOffset to:NO];
  }

-(unsigned)nFlagsSet
  {
   int index,
       count = 0;

   for (index = [self size] - 1; index >= 0; index--)
      if ([arrayOfFlags shortAt:index])
         count += 1;

   return count;
  }

-setAllFlags
  {
   int index;

   for (index = [arrayOfFlags size] - 1; index >= 0; index--)
      [arrayOfFlags shortAt:index put:(short)YES];

   return self;
  }

-substituteForNull:(NUMBER)aScalar
  {
   int index;

   for (index = [self size] - 1; index >= 0; index--)
      if (![self getFlagValue:index])
        [self numberAt:index put:aScalar];

   return self;
  }

-maskFlagsUsing:aSparseArray
  {
   int index;

   for (index = [self size] - 1; index >= 0; index--)
      if (![aSparseArray getFlagValue:index])
         [self clearFlag:index];

   return self;
  }

-(BOOL)isNotEmpty
  {
   int index;

   for (index = [self size] - 1; index >= 0; index--)
      if ([self getFlagValue:index])
         return YES;
```

```
  return NO;
 }

-capacity:(unsigned)newCapacity
 {
  self = [super capacity:newCapacity];

  if (self != nil)
     arrayOfFlags = [arrayOfFlags capacity:newCapacity];

  return self;
 }


+new:(unsigned)nElements fillWith:(NUMBER)aNumber
 {
  self = [super new:nElements fillWith:aNumber];

  if (self != nil)
     arrayOfFlags = [ShortArray new:nElements];

  [self setAllFlags];

  return self;
 }



+new:(unsigned)nElements
 {
  self = [super new:nElements fillWith:0.0];

  if (self != nil)
     arrayOfFlags = [ShortArray new:nElements];

  return self;
 }



-(NUMBER)numberAt:(unsigned)anOffset  put:(NUMBER)aValue
 {
  [self setFlag:anOffset];
  return [super numberAt:anOffset put:aValue];
 }

-copy
 {
  id newArray = [super copy];

  /* the copy now has my flags; I'll make a copy of them that I can
     keep! */

  if (newArray != nil)
     arrayOfFlags = [arrayOfFlags copy];

  return newArray;
 }

-terminate$
```

```
  {
   if (arrayOfFlags != nil)
      [arrayOfFlags free];

   return [super terminate$];
  }
=:


/*==================== DO NOT REMOV    EDIT ============================

       This comment and the following sccsId declaration are managed
       by SCCS for you. Do not edit or remove either.

       Source file:     /users/bmw/Alpha/Substrate/SCCS/s.BM_StrMatrix.m
       Latest version:  1.25
       Last mod time:   09/13/89 at 12:33:37

======================================================================*/

static char *sccsId = "@(#)BM_StrMatrix.m rev 1.25 created on 09/13/89 at 12:33:37";

/*==================== DO NOT REMOVE OR EDIT ==========================*/

#include "objc.h"
#include "uil.h"

#include "BMDBInterf.h"

#include "BMWGlobal.h"


@requires CharString, OrdCltn, BM_Matrix, BM_NumericArray;


= BM_StringMatrix: IdArray (BM_WorkstationMsgs, Primitive)
  {
   unsigned nRows,
            nColumns;
   id name;
   id description;
  }

  -copyFrom:(unsigned)offset1
         To:(unsigned)offset2 into:aStrMatrix at:(unsigned)offset3
    {
     int index;
     id  str;

     for (index = offset1; index <= offset2; index++)
        if ((str = [self at:index]) != nil)
           [aStrMatrix at:offset3+index-offset1 put:[str shared$]];
     else
           [aStrMatrix at:offset3+index-offset1 put:nil];

     return self;
    }

  -(unsigned)size
    {
     return nRows*nColumns;
    }
```

```
-(unsigned)nRows
  {
   return nRows;
  }

-(unsigned)nColumns
  {
   return nColumns;
  }

-(unsigned)offsetFromRow:(unsigned)aRow  Col:(unsigned)aColumn
  {
   return (aRow*nColumns + aColumn
  }

-atRow:(unsigned)aRow Col:(unsigned)aColumn
  {
   return [self at:[self offsetFromRow:aRow Col:aColumn]];
  }

-atRow:(unsigned)aRow Col:(unsigned)aColumn put:anObject
  {
   return [self at:[self offsetFromRow:aRow Col:aColumn] put:anObject];
  }

+nRows:(unsigned)rows nColumns:(unsigned)columns
  {
   self = [super new:(rows * columns)];

   if (self != nil)
     {
      nRows    = rows;
      nColumns = columns;
     }

   return self;
  }

+nRows:(unsigned)rows nColumns:(unsigned)columns fillWithSTR:(STR)str
  {
   int index;
   id  charString = nil;

   self = [BM_StringMatrix nRows:rows nColumns:columns];

   if (self != nil)
      for (index = [self offsetFromRow:rows-1 Col:columns-1];
           index >= 0;
           index--)
         if (charString == nil)
            [self at:index put:charString=[CharString str:str]];
         else
            [self at:index put:[charString shared$]];

   return self;
  }


-reDimensionRows:(unsigned)newNumberOfRows
        Columns:(unsigned)newNumberOfColumns
  {
   nRows    = newNumberOfRows;
   nColumns = newNumberOfColumns;
```

```
    if ([self capacity] < nRows*nColumns)
      return [self capacity:nRows*nColumns*2];
    else
      return self;
  }

-copy
  {
    int index;
    id  str, newMatrix = [super copy];

    if (newMatrix != nil)
      {
       for (index = [newMatrix offsetFromRow:nRows-1 Col:nColumns-1];

            index >= 0;
            index--)
          if ((str = [self at:index]) != nil)
             [newMatrix at:index put:[str shared$]];
          else
             [newMatrix at:index put:nil];

       if (name != nil)
          name = [CharString str:[name str]];

       if (description != nil)
          description = [CharString str:[description str]];
      }

    return newMatrix;
  }


-nameSTR:(STR)newName
  {
    [self name:[CharString str:newName]];
    return self;
  }


-(STR)nameSTR
  {
    return [name str];
  }


-(STR)descriptionSTR
  {
    return [description str];
  }


-name:newName
  {
    if (name != nil)
      [name free];

    name = newName;

    return self;
  }
```

```
-description:newDescription
  {
   if (description != nil)
     [description free];

   description = newDescription;

   return self;
  }


-transpose
  {
   unsigned row,
            column;

   id newMatrix = [BM_StringMatrix nRows:nRows nColumns:nColumns];
   if (newMatrix != nil)
     {
      [newMatrix reDimensionRows:nColumns Columns:nRows];

      for (row = nRows - 1; row >= 0; row--)
        for (column = nColumns - 1; column >= 0; column--)
          [newMatrix at:[newMatrix offsetFromRow:column Col:row] put:
               [[self at:[self offsetFromRow:row Col:column]] shared$]];
      [self free];
     }

   return newMatrix;
  }

-flip
  {
   unsigned row;

   id temp = [BM_StringMatrix nRows:1 nColumns:nColumns];

   if (temp != nil)
     {
      for (row = 0; row < nRows / 2; row++)
        {
         [self copyFrom:[self offsetFromRow:row Col:0]
                     To:[self offsetFromRow:row Col:nColumns-1]
                   into:temp
                     at:0];

         [self copyFrom:[self offsetFromRow:(nRows-row-1) Col:0]
                     To:[self offsetFromRow:(nRows-row-1) Col:nColumns-1]
                   into:self
                     at:[self offsetFromRow:row Col:0]];

         [temp copyFrom:[temp offsetFromRow:0 Col:0]
                     To:[temp offsetFromRow:0 Col:nColumns-1]
                   into:self
                     at:[self offsetFromRow:(nRows-row-1) Col:0]];
        }
      [temp free];

      return self;
     }
   return nil;
  }
```

```
-extractRowsFrom:(unsigned)firstRow To:(unsigned)lastRow
  {
   id newMatrix = [BM_StringMatrix nRows:lastRow-firstRow+1
                             nColumns:nColumns];

   if (newMatrix != nil)
    [self copyFrom:[self offsetFromRow:firstRow Col:0]
              To:[self offsetFromRow:lastRow  Col:nColumns-1]
            into:newMatrix
              at:0];

   return newMatrix;
  }

-concatenateWith:aMatrix
  {
   unsigned index,
           oldSize  = [self size],
           oldnRows = nRows;

   if (aMatrix == nil)
      return self;

   if (nColumns == [aMatrix nColumns])
      {
       self = [self reDimensionRows:oldnRows + [aMatrix nRows]
                          Columns:nColumns];

       if (self != nil)
          [aMatrix copyFrom:[aMatrix offsetFromRow:0 Col:0]
                        To:[aMatrix offsetFromRow:[aMatrix nRows] - 1
                                              Col:nColumns-1]
                      into:self
                        at:[self offsetFromRow:oldnRows Col:0]];
       [aMatrix free];

       return self;
      }
    return nil;
   }


-concatenateFrom:aMatrix  firstRow:(unsigned)firstRow
                          lastRow:(unsigned)lastRow
  {
   unsigned index,
           oldSize  = [self size],
           oldnRows = nRows;

   if (aMatrix == nil)
      return self;

   if (nColumns == [aMatrix nColumns])
      {
       self = [self reDimensionRows:oldnRows + lastRow - firstRow + 1
                          Columns:nColumns];

       if (self != nil)
          [aMatrix copyFrom:[aMatrix offsetFromRow:firstRow Col:0]
                        To:[aMatrix offsetFromRow:lastRow
                                              Col:nColumns-1]
                      into:self
                        at:[self offsetFromRow:oldnRows Col:0]];
```

```
      return self;
     }
   return nil;
  }


-(unsigned)equalBlock:(unsigned)row
  {
   id str1, str2;

   while ((row + 1 < nRows) &&
         ((str1 = [self at:[self offsetFromRow:row Col:0]]) != nil) &&
         ((str2 = [self at:[self offsetFromRow:row+1 Col:0]]) != nil) &&
         ([str1 isEqual:str2]))
      row += 1;

   return row;
  }


-replicateUsing:aMatrix
  {
   unsigned myRowNum = 0,
            rowNum1  = 0,
            rowNum2  = 0;

   id result = nil;

   while (rowNum1 < [aMatrix size])
     {
      rowNum2 = [aMatrix equalBlock:rowNum1];

      while (rowNum1++ <= rowNum2)
         if (result == nil)
            result = [self extractRowsFrom:myRowNum To:myRowNum];
         else
            result = [result concatenateWith:
                               [self extractRowsFrom:myRowNum To:myRowNum]];
      if (nRows > 1)
         myRowNum += 1;
     }

   return result;
  }


-takeApartUsing:aMatrix
  { id p;
   unsigned rowNum1 = 0,
            rowNum2 = 0;

   id result = [OrdCltn new:1];

   while (rowNum1 < [aMatrix nRows])
     {
      rowNum2 = [aMatrix equalBlock:rowNum1];

      result = [result add:[self extractRowsFrom:rowNum1 To:rowNum2]];

      rowNum1 = rowNum2 + 1;
     }
```

```
    return result;
   }


-addElementWise:aStringArray
   {
    int index;
    id  charString, saveString;

    if ([self size] == [aStringArray size])
       for (index = [self size] - 1; index >= 0; index--)
          {
           if (charString = [self at:index])
              saveString = [CharString str:[charString str]];
           else
              saveString = nil;

           [[self at:index] free];

           [self at:index put:[saveString concat:[aStringArray at:index]]];
          }
    else
       return nil;

    return self;
   }

static BOOL _doRegularExpressions;
static char *pattern = (char *)0;
static id lastStringMatched = nil;
static id _arrayBeingSorted;

static int _compareNumbersAscending (Number1, Number2)

NUMBER *Number1,
       *Number2;

{
 int index1 = (int) *Number1,
     index2 = (int) *Number2;

 return _compareStringsAscending([_arrayBeingSorted at:index1],
                                 [_arrayBeingSorted at:index2]);
}


static int _compareNumbersDescending (Number1, Number2)

NUMBER *Number1,
       *Number2;

{
 int index1 = (int) *Number1,
     index2 = (int) *Number2;

 return _compareStringsDescending([_arrayBeingSorted at:index1],
                                  [_arrayBeingSorted at:index2]);
}


extern char *regcmp(),*regex(), *__loc1;
```

```
static BOOL _matchRegExp (string1, string2)

id string1,
   string2;

{
 BOOL success = NO;
 char *subject = [string1 str];

 if ((lastStringMatched == nil) ||
     (strcmp([lastStringMatched str],[string2 str])))
    {
     [lastStringMatched free];
     lastStringMatched = [CharString str:[string2 str]];
     if (pattern)
        free (pattern);
     pattern = regcmp([string2 str], (char *)0);
    }

 if (pattern)
    if ((regex(pattern,subject) == subject+strlen(subject)) &&
        (__loc1 == subject))
       success = YES;

 return success;
}

static int _compareStringsAscending (string1, string2)

id string1,
   string2;

{
 int strcmpResult = 99;


 if ((_doRegularExpressions) &&
     (string1 != nil) && (string2 != nil) &&
     (_matchRegExp (string1, string2)))
    return 0;

 if ((string1 == nil) && (string2 == nil))
    return 0;
 else
    if ((string2 == nil) ||
        ((string1 != nil) &&
         (strcmpResult = strcmp([string1 str], [string2 str]) < 0)))
       return -1;
    else
       if ((string1 == nil) ||
           ((string2 != nil) &&
            (((strcmpResult != 99) && (strcmpResult > 0)) ||
             (strcmp([string1 str], [string2 str]) > 0))))
          return 1;
       else
          return 0;
}


static int _compareStringsDescending (string1, string2)

id string1,
   string2;
```

```
{
 int strcmpResult = 99;


 if ((_doRegularExpressions) &&
     (string1 != nil) && (string2 != nil) &&
     (_matchRegExp (string1, string2)))
    return 0;

 if ((string1 == nil) && (string2 == nil))
    return 0;
 else
    if ((string1 == nil) ||
        ((string2 != nil) &&
        `(strcmpResult = strcmp([string1 str], [string2 str]) < 0)))
       return 1;
    else
       if ((string2 == nil) ||
           ((string1 != nil) &&
            (((strcmpResult != 99) && (strcmpResult > 0)) ||
             (strcmp([string1 str], [string2 str]) > 0))))
          return -1;
       else
          return 0;
}

-sortTable:(int *())comparisonFunction
   {
    id table = [BM_NumericArray new:[self size] fillWith:(NUMBER)1.0];

    if (table != nil)
       {
        [[table cumulate] addScalar:(NUMBER)-1.0];

        _arrayBeingSorted     = self;
        _doRegularExpressions = NO;

        qsort (IV(table),(int)[table size],
                        (int)[[table class]ndxVarSize],comparisonFunction);
       }

    return table;
   }

-ascendingSortTable
   {
    return [self sortTable:_compareNumbersAscending];
   }

-descendingSortTable
   {
    return [self sortTable:_compareNumbersDescending];
   }



-sortUsing:aSortTable
   {
    unsigned index, sourceIndex;
    id result = [BM_StringMatrix nRows:nRows nColumns:nColumns];
```

```
  if ((result != nil) && ([self size] == [aSortTable size]))
    {
     for (index = [aSortTable size]; index > 0; index--)
       {
        sourceIndex = (unsigned)[aSortTable numberAt:index-1];

        [self copyFrom:[self offsetFromRow:sourceIndex Col:0]
                    To:[self offsetFromRow:sourceIndex Col:nColumns-1]
                  into:result
                    at:[result offsetFromRow:index-1 Col:0]];
       }

     [self free];
    }

  return result;
  }


-unSortUsing:aSortTable
  {
  unsigned index, sourceIndex;
  id result = [BM_StringMatrix nRows:nRows nColumns:nColumns];

  if ((result != nil) && ([self size] == [aSortTable size]))
    {
     for (index = [aSortTable size]; index > 0; index--)
       {
        sourceIndex = (unsigned)[aSortTable numberAt:index-1];

        [self copyFrom:[self offsetFromRow:index-1 Col:0]
                    To:[self offsetFromRow:index-1 Col:nColumns-1]
                  into:result
                    at:[result offsetFromRow:sourceIndex Col:0]];
       }

     [self free];
    }

  return result;
  }


-sort
  {
  id sortTable = [self ascendingSortTable];
  self = [self sortUsing:sortTable];
  [sortTable free];
  return self;
  }


-(BOOL)atRow:(unsigned)row Col:(unsigned)column matchesSTR:(STR)aStr
  considerN:(int)considerN sortTable:aSortTable
  {
  id  string;
  int result;

  if (aSortTable)
     return (((string = [self atRow:(unsigned)[aSortTable doubleAt:row]
                                Col:column]) != nil) &&
          ((result=_strmatchn([string str],aStr,considerN))==considerN)||
          (result == -1));
```

```
    else
       return (((string = [self atRow:row Col:column]) != nil) &&
            ((result=_strmatchn([string str],aStr,considerN))==considerN)||
            (result == -1));
  }


-(unsigned)find:(STR)target beginningAtRow:(unsigned)beginningRow
           Col:(unsigned)column sortTable:aSortTable
  {
   unsigned count,
            row;

   row = beginningRow;

   for (count = 1; count <= [self nRows]; count++)
      {
       row = (beginningRow + count) % [self nRows];

       if ([self atRow:row Col:column matchesSTR:target
             considerN:strlen(target) sortTable:aSortTable])
          return row;
      }

   return beginningRow;
  }


-compareElementWise:lowArray:highArray testEquality:(BOOL)testEquality
  {
   int index;
   int comp;
   id  result = [BM_Matrix nRows:nRows nColumns:nColumns],
   l, s, h;

_doRegularExpressions = NO;//=((lowArray == highArray)&&(testEquality));

if (_doRegularExpressions)
   lastStringMatched = [lastStringMatched free];

if (result != nil)
   if (((lowArray == nil) ||
        ((nRows == [lowArray nRows]) &&
         (nColumns == [lowArray nColumns]))) &&
       ((highArray == nil) ||
        ((nRows == [highArray nRows]) &&
         (nColumns == [highArray nColumns]))))
     {
      for (index = [self offsetFromRow:nRows-1 Col:nColumns-1];
           index >= 0;
           index--)
        {
         s = [self at:index];
         h = [highArray at:index];
         l = [lowArray at:index];

         if (_doRegularExpressions)
            [result numberAt:index
                      put:((s != nil) &&
                           (_compareStringsDescending(s,h)
                                          == 0))?1.0:0.0];
```

```
            else
               [result numberAt:index put:((s != nil) &&
                (((lowArray == nil) ||
                  (((comp=_compareStringsDescending(l,s)) > 0)||
                   (testEquality && comp == 0))) &&
                 ((highArray == nil) ||
                  (((comp=_compareStringsDescending(h,s)) < 0)||
                   (testEquality && comp == 0)))))?1.0:0.0];
           }
        }
      else
         return nil;
   else
      return nil;

   [self free];

   return result;
  }


-terminate$
  {
   int index;

   for (index = [self size] - 1; index >= 0; index--)
      [[self at:(unsigned)index] free];

   if (name != nil)
      [name free];

   if (description != nil)
      [description free];

   return [super terminate$];
  }


-(BOOL) getFlagValue:(unsigned)anOffset
  {
   return ([self at:anOffset] != nil);
  }


-(unsigned)nFlagsSet
  {
   int index,
       count = 0;

   for (index = [self size] - 1; index >= 0; index--)
      if ([self at:index] != nil)
         count += 1;

   return count;
  }


-(BOOL)isNotEmpty
  {
   int index;
```

```
    for (index = [self size] - 1; index >= 0; index--)
       if ([self at:index] != nil)
          return YES;

    return NO;
   }


=:


/*==================== DO NOT REMOVE   EDIT ============================

      This comment and the following sccsId declaration are managed
      by SCCS for you. Do not edit or remove either.

      Source file:     /users/bmw/Alpha/Substrate/SCCS/s.RollBar.m
      Latest version:  1.1
      Last mod time:   07/19/89 at 10:18:15

======================================================================*/

static char *sccsId = "@(#)RollBar.m rev 1.1 created on 07/19/89 at 10:18:15";

/*==================== DO NOT REMOVE OR EDIT ==========================*/

#include "objc.h"
#include "uil.h"
#include "BMWGlobal.h"
#include <stdio.h>

= RollBar:BorderLayer(BM_WorkstationMsgs,UIMESSAGES)
{
  id currentColor;
  int standingBy;
}

-initialize {

  [super initialize];
  [[self borderWidth:1] borderColor:BM_colors.DarkFrameShadow];
  currentColor = nil;
  standingBy = FALSE;
  return self;
}

-colorNow { return currentColor; }

-setVisible:(BOOL)aBoolean {
  int minWidth;
  PT aPoint;

  if (aBoolean == YES) {
    minWidth = 2*[self borderWidth];
    aPoint = [self extent];
    if (X(aPoint) <= minWidth) return self;
  }
  [super setVisible:aBoolean];
  return self;
}

-setBarColor:aColor {
```

```
  [self insideColor:aColor];
  currentColor = aColor;
  [self repaint];
  return self;
}

-onActive {

  [self insideColor:BM_colors.Foreground];
  currentColor = BM_colors.Foreground;
  [self repaint];
  standingBy = FALSE;
  return self;
}

-onError {

  [self insideColor:colors.Red];
  currentColor = colors.Red;
  [self repaint];
  standingBy = FALSE;
  return self;
}

-onStandby {

  if (!standingBy) {
    [self insideColor:BM_colors.Frame];
    currentColor = BM_colors.Frame;
    [self repaint];
    standingBy = TRUE;
  }
  return self;
}

-displayLayer {

  [super displayLayer];
  return self;
}

-terminate$ {

  [super terminate$];
  return self;
}
=:

/*===================== DO NOT REMOVI    EDIT ==============================

        This comment and the following sccsId declaration are managed
        by SCCS for you. Do not edit or remove either.

        Source file:    /users/bmw/Alpha/DBServer/SCCS/s.BM_CSItem.m
        Latest version: 1.23
        Last mod time:  09/02/89 at 14:25:27

========================================================================*/

static char *sccsId = "@(#)BM_CSItem.m rev 1.23 created on 09/02/89 at 14:25:27";
```

```
/*==================== DO NOT REMOVE OR EDIT ===========================*/


#include "objc.h"
#include "uil.h"

#include "BMWGlobal.h"
#include "BMDBInterf.h"


@requires BM_Matrix, BM_StringMatrix, CharString, BM_Universe, BM_DataEntity,
          BM_TimeList;


= BM_CrossSectionItem: BM_DataItem (BM_WorkstationMsgs, Collection, Primitive)
  {
   id   universe;
   BOOL allAvailableEntities;
   BOOL allAvailableEntitiesForOneGroup;

   unsigned fromSeqNo;
   unsigned toSeqNo;
   unsigned seqNosPerColumn;

   unsigned currency;

   unsigned periodicity;
   unsigned defaultGroup;

   id       exchangeRateItem;
   int      exchangeRateItemID;

   id       anchorDate;

   id       physicalTableMap;

   unsigned seqNoTable;

   id       databaseServer;
  }


  -initialize
    {
     [super initialize];

     periodicity      = 0;
     defaultGroup     = 0;
     currency         = CURRENCY_UNKNOWN;
     anchorDate       = nil;
     databaseServer   = nil;
     exchangeRateItem = nil;
     exchangeRateItemID = 0;

     universe = nil;

     return self;
    }


  -terminate$
    {
```

```
    [physicalTableMap free];
    [anchorDate free];
    [exchangeRateItem free];

    return [super terminate$];
   }


+createInterfaceFor:(int)aDataBaseItem
          itemType:(unsigned)itemTyp
        itemSource:(unsigned)itemSrc
          currency:(unsigned)curr
        anchorDate:aDate
 exchangeRateItemID:(int)anItemID
     databaseServer:aDatabaseServer
   {
    self = [super new:itemTyp];

    itemID             = aDataBaseItem;
    source             = itemSrc;
    currency           = curr;
    databaseServer     = aDatabaseServer;
    exchangeRateItemID = anItemID;

    allAvailableEntities            = NO;
    allAvailableEntitiesForOneGroup = NO;

    /* calling -anchorDate: would screw up subclass */

    anchorDate = aDate;

    return self;
   }


+tempItemWithID:(int)anItemCode
      itemType:(unsigned)itemTyp
    itemSource:(unsigned)itemSrc
      tableMap:aTableMap
 databaseServer:aDatabaseServer
   {
    self = [super new:itemTyp];

    itemID            = anItemCode;
    source            = itemSrc;
    databaseServer    = aDatabaseServer;

    allAvailableEntities            = YES;
    allAvailableEntitiesForOneGroup = YES;

    [self physicalTableMap:aTableMap];

    return self;
   }

-seqNosPerColumn:(unsigned)snpc
   {
```

```
    seqNosPerColumn = snpc;
    return self;
   }

-(unsigned)seqNosPerColumn
   {
    return seqNosPerColumn;
   }

-exchangeRateItem:anItem
   {
    exchangeRateItem = anItem;
    return self;
   }

-exchangeRateItem
   {
    return exchangeRateItem;
   }

-(int)exchangeRateItemID
   {
    return exchangeRateItemID;
   }

-seqNoTable:(unsigned)aTableNumber
   {
    seqNoTable = aTableNumber;
    return self;
   }

-physicalTableMap
   {
    return physicalTableMap;
   }

-physicalTableMap:aTableMap
   {
    unsigned index1,
             index2;
    NUMBER   physicalTable;


    /* Note the scheme below for setting periodicity and default group.
       It treats the item as if it were available for only one
       group-periodicity combination.  Currently this is true for
       periodicity but not (necessarily) for group, although the scheme
       does produce reasonable default behavior.
    */


    physicalTableMap = aTableMap;

    for (index1 = 0; index1 < [physicalTableMap nRows]; index1++)
       for (index2 = 0; index2 < [physicalTableMap nColumns]; index2++)
          if ((physicalTable = [physicalTableMap numberAt:[physicalTableMap
                                                   offsetFromRow:index1
                                                          Col:index2]]) != NO_TABLE)
            {
             defaultGroup = index1;
             periodicity  = index2;
            }
```

```
        /* hack hack hack */

     switch (periodicity)
        {
         case 1: seqNoTable = 6;
                 seqNosPerColumn = 1;
                 break;

         case 2: seqNoTable = 6;
                 seqNosPerColumn = 5;
                 break;

         case 3: seqNoTable = 7;
                 seqNosPerColumn = 1;
                 break;

         case 4: seqNoTable = 7;
                 seqNosPerColumn = 3;
                 break;

         case 5: seqNoTable = 7;
                 seqNosPerColumn = 12;
                 break;
        }

     return self;
   }

-anchorDate
   {
    return anchorDate;
   }

-anchorDate:aDate
   {
    if (anchorDate != nil)
       [anchorDate free];

    anchorDate = aDate;

    return self;
   }

-(unsigned)seqNoTable
   {
    return seqNoTable;
   }

-resetBuffer
   {
    [super resetBuffer];

    if (universe != nil)
       universe = [universe free];

    fromSeqNo = 0;
    toSeqNo   = 0;

    return self;
   }
```

```
-(unsigned)periodicity
  {
   return periodicity;
  }

 -(unsigned)defaultGrp
   {
    return defaultGroup;
   }


 -deleteAllData
   {
    unsigned group;
    id tableName;

    for (group = 0;
         group < [physicalTableMap nRows];
         group++)
         {
          tableName = [databaseServer
                            tableName:(int)[physicalTableMap
                                          numberAtRow:group
                                                 Col:periodicity]];

          if (tableName != nil)
             DeleteItem ([tableName str], itemID);
         }

     allAvailableEntities            = YES;
     allAvailableEntitiesForOneGroup = YES;

     [self anchorDate:nil];

     return self;
    }


  -writeBuffer:(BOOL)doCurrencyConversion
    {
     unsigned group;
     id       table,
              tableName,
              entities;
     int      (*writeFunction)();

if(globalDebugFlag)printf("writing current buffer contents (%u to %u)\n",fromSeqNo,toSeqNo);


     for (group = 0;
          group < [physicalTableMap nRows];
          group++)
        if ([universe containsGroup:group])
          {
           entities = [databaseServer entitiesInGroup:group];

           table = [self traverseHierarchy:entities pullFromGroup:group
                                                    withTable:buffer
                                                    indexedBy:universe];

           tableName = [databaseServer
                             tableName:(int)[physicalTableMap
                                           numberAtRow:group
                                                  Col:periodicity]];
```

```
if(globalDebugFlag)if(tableName != nil)printf("table: %s\n",[tableName str]);

          if (itemType == NUMERIC_TYPE)
             writeFunction = WriteItemForAllEntities;
          else
             writeFunction = WriteStringItemForAllEntities;

          (*writeFunction) ((char *) [tableName str],

                            (int) itemID,
                            (int) [entityMap at:group],
                            (int) seqNosPerColumn,
                            (int) toSeqNo,
                            (int) table);

if(globalDebugFlag)printf("group %u written, %u rows, %u columns\n",group,[table nRows],[table nColumns]);

          [table free];
          [entities free];
         }

     bufferIsDirty = NO;
    }



  -xRateTable
    {
     if (exchangeRateItem != nil)
        return [databaseServer tableName:
                (int) [[exchangeRateItem physicalTableMap]
                        numberAtRow:[exchangeRateItem defaultGrp]
                              Col:[exchangeRateItem periodicity]]];
     else
        return nil;
    }


  -fillBufferForEntities:aUniverse
              fromSeq:(unsigned)fromSeq
                toSeq:(unsigned)toSeq
       seqNosPerColumn:(unsigned)snpc
  doCurrencyConversion:(BOOL)doCurrencyConversion
    {
     unsigned index;
     int      xRateItemID = 0;
     id       entity,
              newTable,
              physicalTableName,
              xRateTableName = nil;
     int      (*retrievalFunction)();


     for (index = 0; index < [aUniverse size]; index++)
       {
        entity = [aUniverse at:index];

        physicalTableName = [databaseServer
                       tableName:(int)[physicalTableMap
                                    numberAtRow:[entity group]
                                         Col:periodicity]];
```

```
        if (doCurrencyConversion)
          {
           xRateItemID    = exchangeRateItemID;
           xRateTableName = [self xRateTable];
if(globalDebugFlag)printf("getting xrates from:%s\n",[xRateTableName str]);
          }

if(globalDebugFlag)printf("reading from:%s\n",[physicalTableName str]);

        if (itemType == NUMERIC_TYPE)
           retrievalFunction = RetrieveItemForOneEntity;
        else
           retrievalFunction = RetrieveStringItemForOneEntity;


        if ((newTable = (id)(*retrievalFunction)
                          ((char *)[physicalTableName str],
                           (int) [entity entityID],
                           (int) itemID,
                           (int) [entityMap at:[entity group]],
                           (char *)[xRateTableName str],
                           (int) xRateItemID,
                           (int) snpc,
                           (int) fromSeq, (int) toSeq)) != nil)
          {
           if (universe == nil)
              universe = [BM_Universe add:entity];
           else
              [universe add:entity];

           if (buffer == nil)
              buffer = newTable;
           else
              buffer = [buffer concatenateWith:newTable];
          }
      }

   fromSeqNo        = fromSeq;
   toSeqNo          = toSeq;
   seqNosPerColumn = snpc;

   bufferIsDirty = NO;
  }


 -fillBufferForGroup:(unsigned)group
             fromSeq:(unsigned)fromSeq
               toSeq:(unsigned)toSeq
     seqNosPerColumn:(unsigned)snpc
  doCurrencyConversion:(BOOL)doCurrencyConversion
  {
   int xRateItemID = 0;
   id  newTable,
       newUniverse,
       physicalTableName,
       xRateTableName = nil;
   int (*retrievalFunction)();


  physicalTableName = [databaseServer
                        tableName:(int)[physicalTableMap
                                    numberAtRow:group
                                            Col:periodicity]];
```

```
if (doCurrencyConversion)
   {
    xRateItemID    = exchangeRateItemID;
    xRateTableName = [self xRateTable];
if(globalDebugFlag)printf("getting xrates from:%s\n",[xRateTableName str]);
   }

if(globalDebugFlag)printf("reading from:%s\n",[physicalTableName str]);

newUniverse = [databaseServer entitiesInGroup:group];

if (itemType == NUMERIC_TYPE)
   retrievalFunction = RetrieveItemForAllEntities;
else
   retrievalFunction = RetrieveStringItemForAllEntities;

if (([newUniverse size] > 0) &&
    ((newTable = (id)(*retrievalFunction)
                       ((char *)[physicalTableName str],
                        (int) itemID,
                        (int) [entityMap at:group],
                        (char *)[xRateTableName str],
                        (int) xRateItemID,
                        (int) [newUniverse size],
                        (int) snpc,
                        (int) fromSeq, (int) toSeq)) != nil))
   {
    universe = newUniverse;
    buffer = newTable;
   }
else
   [newUniverse free];

fromSeqNo       = fromSeq;
toSeqNo         = toSeq;
seqNosPerColumn = snpc;

allAvailableEntitiesForOneGroup = YES;

bufferIsDirty = NO;
}


-traverseHierarchy:aUniverse
    pullFromGroup:(unsigned)pullFromGroup
        withTable:aMatrix
        indexedBy:anIndexUniverse
{
 id result,
    response,
    entity,
    (*traversalFunction) ();
 unsigned nEntities, index;
 BOOL     firstTime = YES;


[statusMonitor traversal];

 result = nil;

 if ((nEntities = [aUniverse size]) == 0)
    return nil;
```

```
entity = [aUniverse at:0];

traversalFunction = [entity methodFor:@selector(moveDataFrom:
                                                indexedBy:
                                                forGroup:
                                                into:
                                                goUp:
                                                goDown:
                                       traversalFunction:)];

for (index = 0; index < nEntities; index++)
  {
   result = (*traversalFunction)
                ([aUniverse at:index],
                        @selector(moveDataFrom:
                                  indexedBy:
                                  forGroup:
                                  into:
                                  goUp:

                                  goDown:
                        traversalFunction:), aMatrix,
                                     anIndexUniverse,
                                     pullFromGroup,
                                     result,
                                     YES,
                                     YES,
                              traversalFunction);

          if (firstTime)
                result = [result capacity:[result capacity]*nEntities];

          firstTime = NO;
         }

  [statusMonitor normalStatus];

       return result;
      }


    -flushBuffer:(BOOL)doCurrencyConversion
      {
       if (bufferIsDirty)
          [self writeBuffer:doCurrencyConversion];

       return self;
      }


    -readDataFor:aUniverse
          pullFromGroup:(unsigned)pullFromGroup
                fromSeq:(unsigned)fromSeq
                  toSeq:(unsigned)toSeq
      doCurrencyConversion:(BOOL)doCurrencyConversion
      {
       unsigned desiredGroup;
       BOOL     universesMatch;
       BOOL     bufferWasReset ;

  if(globalDebugFlag)printf("f:%u t:%u p:%u u:%X\n",fromSeq,toSeq,seqNosPerColumn,aUniverse );
```

```
desiredGroup   = [aUniverse firstGroup];
universesMatch = [aUniverse isEqual:universe];
bufferWasReset = NO;

if (!((buffer != nil) &&
     (fromSeq == fromSeqNo) &&
     (toSeq   == toSeqNo) &&
     ((allAvailableEntities) ||
      ((allAvailableEntitiesForOneGroup) &&
       ([universe containsOneGroup]) &&
       ([universe firstGroup] == pullFromGroup)) ||
      ((desiredGroup == pullFromGroup) &&
       ((universesMatch) ||
        ([universe isSuperSetOf:aUniverse]))))))
   {
    [self flushBuffer:doCurrencyConversion];
    [self resetBuffer];

    allAvailableEntities            = NO;
    allAvailableEntitiesForOneGroup = NO;

    bufferWasReset = YES;

if(globalDebugFlag)printf("f:%u t:%u p:%u \n",fromSeq,toSeq,seqNosPerColumn);

    if ((desiredGroup == pullFromGroup) && ([aUniverse size] <= 50))
       [self fillBufferForEntities:aUniverse
                           fromSeq:fromSeq
                             toSeq:toSeq
                   seqNosPerColumn:seqNosPerColumn
              doCurrencyConversion:doCurrencyConversion];
    else
       [self fillBufferForGroup:pullFromGroup
                        fromSeq:fromSeq
                          toSeq:toSeq
                seqNosPerColumn:seqNosPerColumn
           doCurrencyConversion:doCurrencyConversion];
   }

if(globalDebugFlag)printf("read %u rows,%u cols\n",[buffer nRows],[buffer nColumns]);

  if ((desiredGroup == pullFromGroup) &&
      (universesMatch) &&
      (!bufferWasReset))
     return [self readData];
  else
     return [self traverseHierarchy:aUniverse pullFromGroup:pullFromGroup
                                               withTable:buffer
                                               indexedBy:universe];

}


-writeDataFor:aUniverse
           fromSeq:(unsigned)fromSeq
             toSeq:(unsigned)toSeq
            values:aMatrix
 doCurrencyConversion:(BOOL)doCurrencyConversion
{
 if ((([aMatrix isKindOf:BM_Matrix]) && (itemType == NUMERIC_TYPE)) ||
     (([aMatrix isKindOf:BM_StringMatrix])
                           && (itemType == STRING_TYPE)))
   {
```

```
if ([aMatrix isKindOf:BM_Matrix])
{
if ([aMatrix size] > 10)
if(globalDebugFlag)printf("%d rows, %d columns, val for slot 10 = %f\n",[aMatrix nRows],
                               [aMatrix nColumns],[aMatrix numberAt:10]);
else;
else
if(globalDebugFlag)printf("%d rows, %d columns, val for slot  0 = %f\n",[aMatrix nRows],
                               [aMatrix nColumns],[aMatrix numberAt:0]);
}
else
{
if ([aMatrix size] > 10)
if(globalDebugFlag)printf("%d rows, %d columns, val for slot 10 = %s\n",[aMatrix nRows],[aMatrix nColumns],[[aMatrix at:10] st
else;
else
if(globalDebugFlag)printf("%d rows, %d columns, val for slot  0 = %s\n",[aMatrix nRows],[aMatrix nColumns],[[aMatrix at:0] str
}
          if (buffer != nil)
            if ((fromSeq != fromSeqNo) || (toSeq != toSeqNo))
              if (bufferIsDirty)
                {
                 [self writeBuffer:doCurrencyConversion];

                 [self resetBuffer];

                 allAvailableEntities           = NO;
                 allAvailableEntitiesForOneGroup = NO;
                 }
              else
                 [self resetBuffer];
            else
              if ([universe isEqual:aUniverse])
                 [self resetBuffer];


          if (buffer == nil)
            {
             [self writeData:aMatrix];
             fromSeqNo = fromSeq;
             toSeqNo   = toSeq;
             universe = [aUniverse copy];
            }
          else
            {
             buffer   = [buffer concatenateWith:[aMatrix copy]];
             universe = [universe merge:aUniverse];
            }

          bufferIsDirty = YES;

if(globalDebugFlag)printf("%d entities\n",[universe size]);

          return self;
         }

      return nil;
     }


   -delete
     {
      [self deleteAllData];

      return [super delete];
     }
```

```
-retrieve:client doCurrencyConversion:(BOOL)doCurrencyConversion
  {
   id desiredUniverse,
      groupName,
      data,
      seqNos;
   unsigned pullFromGroup;

   desiredUniverse = [client universe];

   if ([desiredUniverse size] == 0)
      {
       currentStatusMessage = emptyUniverseError;
       return nil;
      }

   if ((groupName = [client qualifier]) == nil)
      groupName = [databaseServer groupName:[desiredUniverse firstGroup]];

   [[client defaultGroup] assignSTR:[groupName str]];

if(globalDebugFlag)printf(" %s\n",[groupName str]);

   pullFromGroup = [databaseServer groupCode:groupName];

seqNos = [BM_TimeList
            sequenceNumberRange:client
                 seqNoTableName:[databaseServer tableName:seqNoTable]
                           item:self
                    periodicity:[databaseServer
                                    periodicityName:periodicity]
                 isLeftHandSide:NO
                         values:nil
                           snpc:0];

if ((pullFromGroup != NOTFOUND) && (seqNos != nil))
   {
    unsigned firstSeqNo = [seqNos intAt:0];
    unsigned lastSeqNo  = [seqNos intAt:1];

    if ((seqNosPerColumn > 0) &&
       ((SeqNoIntervalWidth (firstSeqNo, lastSeqNo, seqNosPerColumn) *
                                 [desiredUniverse size]) > 150000))
      {
       [seqNos free];
       currentStatusMessage = tooMuchDataError;
       return nil;
      }

    data = [self readDataFor:desiredUniverse
             pullFromGroup:pullFromGroup
                   fromSeq:firstSeqNo
                     toSeq:lastSeqNo
       doCurrencyConversion:doCurrencyConversion];

    [data name:[CharString str:[[client identifier] str]]];

    if (periodicity != 0)
       [data description:[CharString str:[[seqNos names] str]]];

    [seqNos free];
```

```
    if (data == nil)
       currentStatusMessage = dataRetrievalError;

    return data;
   }
 else
   {
    currentStatusMessage = dataReferenceError;
    return nil;
   }
}


-assign:values client:client doCurrencyConversion:(BOOL)doCurrencyConversion
 {
  id result, seqNos;


  if (!databaseMaintenanceMode && (source != SOURCE_USER))
    {
     [values free];
     currentStatusMessage = writeProtectionError;
     return nil;
    }

  seqNos = [BM_TimeList
             sequenceNumberRange:client
                      seqNoTableName:[databaseServer tableName:seqNoTable]
                                item:self
                         periodicity:[databaseServer
                                       periodicityName:periodicity]
                      isLeftHandSide:YES
                              values:values
                                snpc:seqNosPerColumn];

      [values name:[CharString str:[[client identifier] str]]];

      if (periodicity != 0)
         [values description:[CharString str:[[seqNos names] str]]];

      result = [self writeDataFor:[client universe]
                          fromSeq:(unsigned)[seqNos intAt:0]
                            toSeq:(unsigned)[seqNos intAt:1]
                           values:values
           doCurrencyConversion:doCurrencyConversion];

      [seqNos free];

      if (result == nil)
         {
          [values free];
          currentStatusMessage = dataTypeError;
         }
      else
         result = values;


      return result;
     }


=:
```

```
/*===================== DO NOT REMOVI    EDIT ==============================

      This comment and the following sccsId declaration are managed
      by SCCS for you. Do not edit or remove either.

      Source file:     /users/bmw/Alpha/DBServer/SCCS/s.BM_DBServer.m
      Latest version:  1.36
      Last mod time:   09/02/89 at 14:25:57

==========================================================================*/

static char *sccsId = "@(#)BM_DBServer.m rev 1.36 created on 09/02/89 at 14:25:57";

/*===================== DO NOT REMOVE OR EDIT ============================*/


#include "objc.h"
#include "uil.h"
#include "stdio.h"
#include "BMWGlobal.h"
#include "BMDBInterf.h"

extern char *getenv();


@requires BM_TimeList, CharString, BM_DataItem, BM_CrossSectionItem,
          BM_EntityList, BM_PermanentCrossSectionItem, BM_IdentityItem,
          BM_TableMap, BM_StringMatrix, BM_Matrix, OrdCltn, BM_CICharString;


= BM_DatabaseServer: Object (BM_WorkstationMsgs,
                             Collection, Primitive)
  {
   id itemDictionary;
   id listDictionary;

   id groupTable;
   id periodicityTable;

   id tableNames;
   unsigned firstTemporaryTable;

   id identityItemName;
   id namesItemName;
   id genericNewNumericItem;
   id genericNewStringItem;

   id tableMapForTempNumericItems;
   id tableMapForTempStringItems;

   id tableMapForNewNumericItems;
   id tableMapForNewStringItems;

  BOOL doCurrencyConversion;
 }


 +new
   {
    char *environmentValue;

    self = [super new];
```

```
environmentValue = getenv ("BM_DBNAME");
if (!(strlen (environmentValue)))
   return nil;

OpenBISDatabase (environmentValue);

environmentValue = getenv ("BM_DBMAINTENANCE_MODE");
databaseMaintenanceMode = (!(_dictcmp (environmentValue, "yes")));

environmentValue = getenv ("BM_SEQNOSTARTYEAR");
if (!(strlen (environmentValue)))
   seqNoStartYear = DEFAULT_SEQNOSTARTYEAR;
else
   seqNoStartYear = atoi(environmentValue);

[self setUpEntityNetwork];
[self setUpGroupTables];
[self setUpTableNames];
[self setUpItems];
[self setUpLists];
[self loadReportingCurrenciesForGroup:GROUP_COMPANIES];
[self loadReportingCurrenciesForGroup:GROUP_SECURITIES];
[self setUpTableMapsForTemporaryItems];
[self setUpTableMapsForNewItems];
[self cleanTemporaryTables];
[self setUpStatusMessages];

doCurrencyConversion = NO;

return self;
}


-terminate$
 {
  [self destroyTemporaryTables];

  CloseBISDatabase ();

  return [super terminate$];
 }


-setUpStatusMessages
 {
  currentStatusMessage = nil;

  xRateError =          [CharString
  str:"Warning: Exchange-rate conversion cannot be performed on this item!"];
  dataTypeError       = [CharString
  str:"Error: This item is of the wrong data type for this assignment."];
  duplicateItemError  = [CharString
  str:"Error: An item with this name already exists in the database."];
  writeProtectionError= [CharString
  str:"Error: This item may not be overwritten."];
  dataReferenceError  = [CharString
  str:"Error: This item name or its modifiers are invalid."];
  conformabilityError = [CharString
  str:"Error: The right-hand side of this assignment is not conformable with the left-hand side."];
  assignmentNotSupportedError=[CharString
  str:"Error: This version of the Workstation system does not support this type of assignment."];
  unsuccessfulInstallationError=[CharString
```

```
str:"Error: Unsuccessful database installation."];
incompatibleAssignmentError=[CharString
str:"Error: This item is incompatible with this type of assignment."];
emptyUniverseError = [CharString
str:"Universe is empty; halting execution."];
tooMuchDataError = [CharString
str:"The amount of data requested here is unreasonably large; please try re-phrasing the request."];

    dataRetrievalError = [CharString
    str:"Internal error during data retrieval; possibly out of memory."];

    return self;
   }


-cleanTemporaryTables
   {
    int index;

    for (index = firstTemporaryTable; index < [tableNames size]; index++)
       CleanTemporaryTable ([[tableNames at:index] str]);

    return self;
   }


-destroyTemporaryTables
   {
    int index;

    for (index = firstTemporaryTable; index < [tableNames size]; index++)
       DestroyTemporaryTable ([[tableNames at:index] str]);

    return self;
   }


-setUpEntityNetwork
   {
    unsigned saveDefaultCapacity;
    extern unsigned cltnDefaultCapacity;

    saveDefaultCapacity = cltnDefaultCapacity;
    cltnDefaultCapacity = 3;

    RetrieveEntities ();

    RetrieveEntityLinks (masterEntityList);

    cltnDefaultCapacity = saveDefaultCapacity;

    return self;
   }


-setUpItems
   {
    id tableMap,
       entry,
       name,
       sequence,
       identityItem;
```

```
itemDictionary = (id) RetrieveItems (self);

sequence = [itemDictionary eachElement];

while (entry = [sequence next])
   {
    RetrieveTableMapInfo ([entry value]);
    [[entry value] exchangeRateItem:[self
                              item:[[entry value] exchangeRateItemID]]];
   }

     [sequence free];

     /* dummy */

     tableMap = [BM_Matrix nRows:NUMBER_OF_GROUPS
                      nColumns:NUMBER_OF_PERIODICITIES fillWith:NO_TABLE];
     [tableMap numberAtRow:0 Col:0 put:0.0];

     identityItem = [itemDictionary
               atKey:identityItemName = [BM_CICharString str:"~Identity~"]
                put:[BM_IdentityItem
                         createInterfaceFor:[self generateNewItemID]
                                  itemType:0
                                itemSource:0
                                  currency:CURRENCY_UNKNOWN
                                anchorDate:[CharString str:"Today"]
                         exchangeRateItemID:0
                            databaseServer:self]];

     [identityItem physicalTableMap:tableMap];

     namesItemName = [BM_CICharString str:"Name"];

     name = [BM_CICharString str:"~NewNumeric~"];
     genericNewNumericItem = [itemDictionary atKey:name];
     [name free];

     name = [BM_CICharString str:"~NewString~"];
     genericNewStringItem = [itemDictionary atKey:name];
     [name free];

     return self;
     }


   -setUpLists
     {
      id entry,
         name,
         sequence;

      listDictionary = (id) RetrieveLists (self);
/*
      sequence = [listDictionary eachElement];

      while (entry = [sequence next])
         {
          /* ?
         }
```

```
      [sequence free];
*/
      return self;
    }


  -loadReportingCurrenciesForGroup:aGroupCode
    {
     id currencyItemName = [BM_CICharString str:"RptCurrency"];
     id currencyItem     = [itemDictionary atKey:currencyItemName];

     [currencyItemName free];

     if (currencyItem != nil)
        {
         unsigned index;

     id entities   = [self entitiesInGroup:aGroupCode];

     id currencies = [currencyItem readDataFor:entities
                                  pullFromGroup:aGroupCode
                                        fromSeq:1
                                          toSeq:30000
                            doCurrencyConversion:NO];

     if (currencies != nil)
        for (index = 0; index < [entities size]; index++)
           if ([currencies getFlagValue:index])
              [[entities at:index]
                     reportCurrency:(int)[currencies numberAt:index]];
           else
              [[entities at:index] reportCurrency:0];

      [currencies free];
      [entities free];
     }

   return self;
  }


-setUpTableMapsForTemporaryItems
  {
   /* dummy!--Note the dependency on the number of tables in
                                                     -setUpTableNames */

   unsigned row;

   NUMBER tableNumber = firstTemporaryTable;

   tableMapForTempNumericItems =
                        [BM_TableMap nRows:NUMBER_OF_GROUPS
                                 nColumns:NUMBER_OF_PERIODICITIES
                                 fillWith:NO_TABLE];

   for (row = 1; row < NUMBER_OF_GROUPS; row++)
     [tableMapForTempNumericItems numberAtRow:row Col:1
                                           put:tableNumber++];

   for (row = 1; row < NUMBER_OF_GROUPS; row++)
     [tableMapForTempNumericItems numberAtRow:row Col:5
                                           put:tableNumber++];
```

```
tableMapForTempStringItems =
                        [BM_TableMap nRows:NUMBER_OF_GROUPS
                                    nColumns:NUMBER_OF_PERIODICITIES
                                    fillWith:NO_TABLE];

for (row = 1; row < NUMBER_OF_GROUPS; row++)
  [tableMapForTempStringItems numberAtRow:row Col:1
                                              put:tableNumber++];

for (row = 1; row < NUMBER_OF_GROUPS; row++)
  [tableMapForTempStringItems numberAtRow:row Col:5
                                              put:tableNumber++];

return self;
}


-setUpTableMapsForNewItems
 {
  tableMapForNewNumericItems = [genericNewNumericItem physicalTableMap];
  tableMapForNewStringItems  = [genericNewStringItem  physicalTableMap];

  return self;
 }


-setUpGroupTables
 {
  /* dummy! */

  groupTable = [BM_StringMatrix nRows:NUMBER_OF_GROUPS
                                nColumns:2];

  [groupTable atRow:0 Col:0 put:[CharString str:""]];
  [groupTable atRow:0 Col:1 put:[CharString str:""]];
  [groupTable atRow:1 Col:0 put:[CharString str:"glb"]];
  [groupTable atRow:1 Col:1 put:[CharString str:"globe"]];
  [groupTable atRow:2 Col:0 put:[CharString str:"reg"]];
  [groupTable atRow:2 Col:1 put:[CharString str:"regions"]];
  [groupTable atRow:3 Col:0 put:[CharString str:"cty"]];
  [groupTable atRow:3 Col:1 put:[CharString str:"countries"]];
  [groupTable atRow:4 Col:0 put:[CharString str:"sctr"]];
  [groupTable atRow:4 Col:1 put:[CharString str:"sectors"]];
  [groupTable atRow:5 Col:0 put:[CharString str:"majInd"]];
  [groupTable atRow:5 Col:1 put:[CharString str:"majorIndustries"]];
  [groupTable atRow:6 Col:0 put:[CharString str:"ind"]];
  [groupTable atRow:6 Col:1 put:[CharString str:"industries"]];
  [groupTable atRow:7 Col:0 put:[CharString str:"co"]];
  [groupTable atRow:7 Col:1 put:[CharString str:"companies"]];
  [groupTable atRow:8 Col:0 put:[CharString str:"sec"]];
  [groupTable atRow:8 Col:1 put:[CharString str:"securities"]];
  [groupTable atRow:9 Col:0 put:[CharString str:"seg"]];
  [groupTable atRow:9 Col:1 put:[CharString str:"segments"]];


  periodicityTable = [BM_StringMatrix nRows:NUMBER_OF_PERIODICITIES
                                      nColumns:2];

  [periodicityTable atRow:0 Col:0 put:[CharString str:"st"]];
  [periodicityTable atRow:0 Col:1 put:[CharString str:"static"]];
  [periodicityTable atRow:1 Col:0 put:[CharString str:"day"]];
  [periodicityTable atRow:1 Col:1 put:[CharString str:"days"]];
```

```
[periodicityTable atRow:2 Col:0 put:[CharString str:"wk"]];
[periodicityTable atRow:2 Col:1 put:[CharString str:"weeks"]];
[periodicityTable atRow:3 Col:0 put:[CharString str:"mo"]];
[periodicityTable atRow:3 Col:1 put:[CharString str:"months"]];
[periodicityTable atRow:4 Col:0 put:[CharString str:"qtr"]];
[periodicityTable atRow:4 Col:1 put:[CharString str:"quarters"]];
[periodicityTable atRow:5 Col:0 put:[CharString str:"yr"]];
[periodicityTable atRow:5 Col:1 put:[CharString str:"years"]];

return self;
}

-setUpTableNames
{
 id   hostName;
 char hostNameSTR [50],
      tableNameQualifier [50],
      tableName [50];
 int  group;

 extern unsigned short getuid ();

 tableNames = (id) RetrieveTableNames ();

 firstTemporaryTable = [tableName size];

 gethostname (hostNameSTR, sizeof(hostName));
 hostNameSTR [2] = 0;
 sprintf(tableNameQualifier, "%s%x", hostNameSTR, (int)getuid());

 for (group = 1; group < NUMBER_OF_GROUPS; group++)
   {
    sprintf(tableName, "%s_%d_%d", tableNameQualifier, group, 1);
    [tableNames add:[CharString str:tableName]];
   }

 for (group = 1; group < NUMBER_OF_GROUPS; group++)
   {
    sprintf(tableName, "%s_%d_%d", tableNameQualifier, group, 5);
    [tableNames add:[CharString str:tableName]];
   }

 for (group = 1; group < NUMBER_OF_GROUPS; group++)
   {
    sprintf(tableName, "%s_s_%d_%d", tableNameQualifier, group, 1);
    [tableNames add:[CharString str:tableName]];
   }

 for (group = 1; group < NUMBER_OF_GROUPS; group++)
   {
    sprintf(tableName, "%s_s_%d_%d", tableNameQualifier, group, 5);
    [tableNames add:[CharString str:tableName]];
   }

 return self;
}

-currentStatusMessage
{
 return currentStatusMessage;
}
```

```
-tableName:(int)tableNumber
  {
   if (tableNumber != NO_TABLE)
      return [tableNames at:tableNumber];
   else
      return nil;
  }


-(unsigned)lookup:aGroupName inTable:aGroupTable
  {
   unsigned row, col;
   id       groupName;

   for (row = 0; row < [aGroupTable nRows]; row++)
      for (col = 0; col < [aGroupTable nColumns]; col++)
         if ((groupName = [aGroupTable atRow:row Col:col]) &&
             (![groupName dictCompare:aGroupName]))
            return row;

if(globalDebugFlag)printf("%s not found\n",[aGroupName str]);

   return NOTFOUND;
  }
-groupTable
  {
   return groupTable;
  }


-(unsigned)groupCode:aGroupName
  {
   return [self lookup:aGroupName inTable:groupTable];
  }


-(unsigned)periodicityCode:aPeriodicityName
  {
   return [self lookup:aPeriodicityName inTable:periodicityTable];
  }


-periodicityName:(unsigned)aPeriodicityCode
  {
   return [periodicityTable atRow:aPeriodicityCode Col:1];
  }


-groupName:(unsigned)aGroupCode
  {
   return [groupTable atRow:aGroupCode Col:1];
  }


-item:(int)itemID
  {
   id entry,
      sequence;

   sequence = [itemDictionary eachElement];
```

```
  while (entry = [sequence next])
     if ([[entry value] itemID] == itemID)
        {
         [sequence free];
         return [entry value];
        }

   [sequence free];
   return nil;
  }


-itemNames:(int)desiredSource
  {
   id entry;
   id list = [BM_StringMatrix nRows:1 nColumns:1];
   id temp = [BM_StringMatrix nRows:1 nColumns:1];

   BOOL firstOne = YES;

   id sequence = [itemDictionary eachElement];

   while (entry = [sequence next])
      if ((((desiredSource == SOURCE_USER) &&
           ([[entry value] source] == SOURCE_USER)) ||
          ((desiredSource != SOURCE_USER) &&
           ([[entry value] source] != SOURCE_USER))) &&
         (*((STR)[entry str]) != '~'))
        if (firstOne)

           {
            [list atRow:0 Col:0 put:[[entry key] shared$]];
            firstOne = NO;
           }
        else
           {
            [temp atRow:0 Col:0 put:[[entry key] shared$]];
            list = [list concatenateFrom:temp firstRow:0 lastRow:0];
           }

    if (firstOne)
       list = [list free];

    [temp free];
    [sequence free];

    return list;
   }


-(unsigned)typeOfDataItem:aCharString
  {
   id item;

   if ((item = [itemDictionary atKey:aCharString]) != nil)
      return [item itemType];
   else
      return NOTFOUND;
  }
```

```
-itemCompletionForSTR:(STR)aStr
  {
   return [itemDictionary completionForSTR:aStr];
  }


-listCompletionForSTR:(STR)aStr
  {
   return [listDictionary completionForSTR:aStr];
  }


-emptyBuffers
  {
   id entry;
   id sequence = [itemDictionary eachElement];

   while (entry = [sequence next])
      if (![[entry value] bufferIsDirty])
         [[entry value] resetBuffer];

   [sequence free];

   return self;
  }


-(int)generateNewItemID
  {
   int  candidate;
   id   entry, sequence;
   BOOL foundOne;

   for (candidate = 32000; candidate > 0; candidate--)
     {


         foundOne = NO;

         sequence = [itemDictionary eachElement];

         while ((entry = [sequence next]) && (!foundOne))
            foundOne = ([[entry value] itemID] == candidate);

         [sequence free];

         if (!foundOne)
            return candidate;
        }
     return 0;
    }


  -entitiesInGroup:(unsigned)aGroupCode
    {
if(globalDebugFlag)printf("request for group:%u\n",aGroupCode);

     return [masterEntityList inGroup:aGroupCode];
    }
```

```
-doCurrencyConversion:(BOOL)doIt
  {
   [self emptyBuffers];

   doCurrencyConversion = doIt;

   return self;
  }


-(BOOL)doCurrencyConversion
  {
   return doCurrencyConversion;
  }


-timeIteratorFor:anInterval
  {
   int      index;
   id       iterator;

   iterator = [OrdCltn new:0];

   for (index = 0;
        index < [BM_TimeList numericPartOfInterval:anInterval]; index++)
      [iterator
           add:[[CharString sprintf:"%d ",index]
                  concatSTR:[BM_TimeList unitsPartOfInterval:anInterval]]];

   return iterator;
  }


-numericConstantFor:client
  {
   id result =  [BM_Matrix nRows:[[client universe] size]
                   nColumns:[BM_TimeList widthOfInterval:[client globalOver]
                                              inUnits:[client defaultPeriodicity]]
                   fillWith:[client number]];
   if ([result size] == 0)
      result = [result free];

     return result;
    }


  -stringConstantFor:client
    {
     id  result = [BM_StringMatrix
                      nRows:[[client universe] size]
                    nColumns:1
                  fillWithSTR:[[client string] str]];

     if ([result size] == 0)
        result = [result free];

     return result;
    }


  -identityMapFor:universe targetGroup:aGroup
    {
```

```
    unsigned groupCode;

    if (aGroup == nil)
       groupCode = [universe firstGroup];
    else
       groupCode = [self groupCode:aGroup];

    return [[itemDictionary atKey:identityItemName]
                          readDataFor:universe
                        pullFromGroup:groupCode
                              fromSeq:0
                                toSeq:0
                 doCurrencyConversion:NO];

   }


 -namesFor:universe
   {
    id names = [[itemDictionary atKey:namesItemName]
                          readDataFor:universe
                        pullFromGroup:[universe firstGroup]
                              fromSeq:1
                                toSeq:30000
                 doCurrencyConversion:NO];

     [names name:[CharString str:[namesItemName str]]];

     return names;
    }


  -retrieveItem:client
    {
     id item;

if(globalDebugFlag)printf("base %s\n",[[client base] str]);

     if ((item = [itemDictionary atKey:[client base]]) != nil)
        return [item retrieve:client
                      doCurrencyConversion:doCurrencyConversion];
     else
        {
         currentStatusMessage = dataReferenceError;
         return nil;
        }
     }
   -(BOOL)deleteItem:client
     {
      id item, entry;

      if ((entry = [itemDictionary associationAt:[client identifier]]) == nil)
         return YES;
      else
         if (([item=[entry value] source] == SOURCE_USER)
            {
             [itemDictionary remove:entry];
             [[item delete] free];
             [entry free];
if(globalDebugFlag)printf("%s deleted\n",[[client identifier] str]);
             return YES;
            }
         else
```

```
        {
         currentStatusMessage = writeProtectionError;
         return NO;
        }
  }


-assignCrossSectionItem:client makePermanent:(BOOL)makePermanent
  {
   id tableMap,
      value,
      item,
      seqNos,
      result,
      name;
   unsigned itemType,
            itemPeriodicity;


   value = [client value];

   if ([[client universe] size] != [value nRows])
      {
       [value free];
       currentStatusMessage = conformabilityError;
       return nil;
      }

   if ((item = [itemDictionary atKey:[client identifier]]) == nil)
      {
       if ([value isKindOf:BM_Matrix])
          itemType = NUMERIC_TYPE;
       else
          itemType = STRING_TYPE;

       itemPeriodicity=[self periodicityCode:[client defaultPeriodicity]];


       /* disallow creation of static items! */

       if ((itemPeriodicity == 0) || (itemPeriodicity == NOTFOUND))
          itemPeriodicity = 5;


       if (makePermanent)
          {
           if (itemType == NUMERIC_TYPE)
              tableMap = [[tableMapForNewNumericItems copy]

                        :ializeForPeriodicity:itemPeriodicity];
 else
    tableMap = [[tableMapForNewStringItems copy]
                     initializeForPeriodicity:itemPeriodicity];

 if (tableMap == nil)
    {
     [value free];
     currentStatusMessage = assignmentNotSupportedError;
     return nil;
    }
```

```
        item = [BM_PermanentCrossSectionItem
                          newPermanentItem:[client identifier]
                                  itemType:itemType
                                itemSource:SOURCE_USER
                                  tableMap:tableMap
                            databaseServer:self];

        if (item == nil)
           {
            [value free];
            currentStatusMessage = unsuccessfulInstallationError;
            return nil;
           }
        }
     else
        {
        if (itemType == NUMERIC_TYPE)
           tableMap = [[tableMapForTempNumericItems copy]
                          initializeForPeriodicity:itemPeriodicity];
        else
           tableMap = [[tableMapForTempStringItems copy]
                          initializeForPeriodicity:itemPeriodicity];

        if (tableMap == nil)
           {
            [value free];
            currentStatusMessage = assignmentNotSupportedError;
            return nil;
           }

        item = [BM_CrossSectionItem
                          tempItemWithID:[self generateNewItemID]
                                itemType:itemType
                              itemSource:SOURCE_USER
                                tableMap:tableMap
                          databaseServer:self];
        }

     [itemDictionary atKey:name =
                      [BM_CICharString str:[[client identifier] str]]
                  put:item];
    }


 if ([item isKindOf:BM_CrossSectionItem])
    return [item assign:value client:client
               doCurrencyConversion:doCurrencyConversion];
 else
    {
     [value free];
     currentStatusMessage = incompatibleAssignmentError;
     return nil;
    }
}
-assignItem:client
  {
   id item,
      value,
      result;

   value = [client value];
```

```
if ((item = [itemDictionary atKey:[client identifier]]) == nil)
  {
   if ([value isKindOf:BM_Matrix])
      item = [BM_DataItem new:NUMERIC_TYPE];
   else
      item = [BM_DataItem new:STRING_TYPE];

   [itemDictionary atKey:[BM_CICharString
                               str:[[client identifier] str]]
                 put:item];
  }

 if ([item isMemberOf:BM_DataItem])
    return [item assign:value client:client
             doCurrencyConversion:doCurrencyConversion];
 else
    {
     [value free];
     currentStatusMessage = incompatibleAssignmentError;
     return nil;
    }
}

-retrieveList:client
  {
   id list;

if(globalDebugFlag)printf("list %s\n",[[client identifier] str]);

   if ((list = [listDictionary atKey:[client identifier]]) != nil)
      return [list retrieve:client];
   else
      {
       currentStatusMessage = dataReferenceError;
       return nil;
      }
  }

-assignList:client
  {
   id list;

   if ((list = [listDictionary atKey:[client identifier]]) == nil)
      {
       list = [BM_EntityList createList:SOURCE_USER databaseServer:self];

       [listDictionary atKey:[BM_CICharString
                               str:[[client identifier] str]]
                 put:list];
      }

   return [list assign:[client universe]];
  }


=:
```

```
/*==================== DO NOT REMOVE   EDIT ============================

        This comment and the following sccsId declaration are managed
        by SCCS for you. Do not edit or remove either.

        Source file:     /users/bmw/Alpha/DBServer/SCCS/s.BM_DataEnt.m
        Latest version:  1.6
        Last mod time:   08/12/89 at 11:27:10

======================================================================*/

static char *sccsId = "@(#)BM_DataEnt.m rev 1.6 created on 08/12/89 at 11:27:10";

/*==================== DO NOT REMOVE OR EDIT ===========================*/

#include "objc.h"
#include "uil.h"
#include <stdio.h>
#include "BMWGlobal.h"
#include "BMDBInterf.h"


@requires BM_Matrix, BM_Universe;


= BM_DataEntity : BM_NetworkNode (BM_WorkstationMsgs, Collection, Primitive)
   {
    unsigned myGroup;
    int      myEntityID;
    int      ordinalWithinGroup;
    int      reportCurrency;
   }



+entityID:(int)anEntityID group:(unsigned)aGroupCode
            ordinalWithinGroup:(int)ordinal
   {
    self = [super new];

    myEntityID = anEntityID;
    myGroup    = aGroupCode;
    ordinalWithinGroup = ordinal;
    reportCurrency     = 0;
    parents    = nil;
    children   = nil;

    return self;
   }


+collectionClass
   {
    return BM_Universe;
   }


-reportCurrency:(int)aCurrencyEntityID
   {
    reportCurrency = aCurrencyEntityID;
```

```
  return self;
 }

-(unsigned)correctPathFromGroup:(unsigned)currentGroup



                    toGroup:(unsi    !)destGroup
 {
  switch (destGroup)
    {
     case 1:
     case 2:
     case 3: return 3;
     case 4:
     case 5:
     case 6: return 6;
    }
 }


-(int)entityID
 {
  return myEntityID;
 }


- (unsigned) group
 {
  return myGroup;
 }


- reportIdentityWithRespectTo:(unsigned)referenceGroup
              pullFromGroup:(unsigned)pullFromGroup
                      into:destMatrix
                 identifier:(int)identifier
                      goUp:(BOOL)goUp
                    goDown:(BOOL)goDown
 {
  int  myIdentifier;
  id   myData = nil;
  BOOL firstTime = YES;

  if (goUp)
     myIdentifier = myEntityID;
  else
     myIdentifier = identifier;

  if (pullFromGroup == myGroup)
     if (destMatrix == nil)
        myData = [BM_Matrix nRows:1 nColumns:1
                                         fillWith:(NUMBER)myIdentifier];
     else
        myData = [destMatrix concatenateNumber:(NUMBER)myIdentifier];
  else
     {
      id  parent   = nil;
      int saveSize = [destMatrix size];
```

```
if ((parents != nil) && goUp)
  {
   unsigned theRightPath = pullFromGroup;

   if (myGroup == 7)
      theRightPath =
                [self correctPathFromGroup:7 toGroup:pullFromGroup];

   if ([parents size] == 1)
      parent = [parents firstElement];
   else
      parent = [parents firstElementInGroup:(unsigned)theRightPath];

            if (parent != nil)
               destMatrix = [parent
                        reportIdentityWithRespectTo:(unsigned)referenceGroup
                                   pullFromGroup:(unsigned)pullFromGroup
                                           into:destMatrix
                                      identifier:myIdentifier
                                           goUp:YES
                                         goDown:NO];
           }

         if ((saveSize == [destMatrix size]) && (children != nil) && goDown)
           {
            id  cltn;
            int index;
  /*
            if ([children numberOfGroups] == 1) */
               cltn = children;   /*
            else
               cltn = [children inGroup:pullFromGroup];  */

            for (index = 0; index < [cltn size]; index++)
                destMatrix = [[cltn at:index]
                        reportIdentityWithRespectTo:(unsigned)referenceGroup
                                   pullFromGroup:(unsigned)pullFromGroup
                                           into:destMatrix
                                      identifier:myIdentifier
                                           goUp:NO
                                         goDown:YES];
            if (cltn != children)
               [cltn free];
           }

         if ((saveSize == [destMatrix size]) && goUp && goDown)
           if (destMatrix == nil)
              destMatrix = [BM_Matrix nRows:1 nColumns:1];
           else
              destMatrix = [destMatrix reDimensionRows:[destMatrix nRows]+1
                                             Columns:1];
         myData = destMatrix;
        }

      return myData;
     }


   -moveDataFrom:srcMatrix indexedBy:aUniverse
```

```
                    forGroup:(unsigned)aGroupCode
                        into:destMatrix
                        goUp:(BOOL)goUp
                      goDown:(BOOL)goDown
           traversalFunction:(id(*)())traversalFunction
  {
   unsigned offsetOfData;
   BOOL firstTime = YES;
   id myData = nil;
/*
printf ("%u %u %d\n",aGroupCode,myGroup,myEntityID);
*/
    if (aGroupCode == myGroup)
      if ((myEntityID != DUMMY_NODE) &&
          (aUniverse != nil) &&
          ((offsetOfData = (unsigned)[aUniverse offsetOf:self]) != NOTFOUND))
         if (destMatrix == nil)
           myData = [srcMatrix extractRowsFrom:offsetOfData To:offsetOfData];

     else
        myData = [destMatrix concatenateFrom:srcMatrix
                                   firstRow:offsetOfData
                                    lastRow:offsetOfData];

  else
     if (destMatrix == nil)
        myData = [[srcMatrix class] nRows:1
                                  nColumns:[srcMatrix nColumns]];

     else
        myData = [destMatrix reDimensionRows:[destMatrix nRows]+1
                                     Columns:[destMatrix nColumns]];

else
   {
    id  parent   = nil;
    int saveSize = [destMatrix size];


    if ((parents != nil) && goUp)
      {
       unsigned theRightPath = aGroupCode;

       if (myGroup == 7)
          theRightPath = [self correctPathFromGroup:7 toGroup:aGroupCode];

       if ([parents size] == 1)
          parent = [parents firstElement];
       else
          parent = [parents firstElementInGroup:(unsigned)theRightPath];

       if (parent != nil)
          destMatrix = (*traversalFunction)
                       (parent, @selector(moveDataFrom:
                                            indexedBy:
                                             forGroup:
                                                 into:
                                                 goUp:
                                               goDown:
                                    traversalFunction:), srcMatrix,
                                                         aUniverse,
                                                         aGroupCode,
                                                         destMatrix,
                                                         YES,
                                                         NO,
                                             traversalFunction);
```

```
        }

      if ((saveSize == [destMatrix size]) && (children != nil) && goDown)
        {
         id  cltn;
         int index;
/*
         if ([children numberOfGroups] == 1)   */
            cltn = children;   /*
         else
            cltn = [children inGroup:aGroupCode];  */

         firstTime = YES;

         for (index = 0; index < [cltn size]; index++)
             destMatrix = (*traversalFunction) ([cltn at:index],
                                  @selector(moveDataFrom:
                                                  indexedBy:
                                                   forGroup:
                                                       into:
                                                       goUp:
                                                     goDown:
                                      traversalFunction:), srcMatrix,
                                                      aUniverse,
                                                      aGroupCode,
                                                      destMatrix,
                                                      NO,
                                                      YES,
                                              traversalFunction);

        if (cltn != children)
           [cltn free];
       }

     if ((saveSize == [destMatrix size]) && goUp && goDown)
        if (destMatrix == nil)
           destMatrix = [[srcMatrix class] nRows:1
                                     nColumns:[srcMatrix nColumns]];
        else
           destMatrix = [destMatrix reDimensionRows:[destMatrix nRows]+1
                                     Columns:[destMatrix nColumns]];
     myData = destMatrix;
    }

 return myData;
}

/*===================== DO NOT REMOVI    EDIT ==============================

       This comment and the following sccsId declaration are managed
       by SCCS for you. Do not edit or remove either.

       Source file:    /users/bmw/Alpha/DBServer/SCCS/s.BM_DataItem.m
       Latest version:  1.11
       Last mod time:   08/22/89 at 20:54:15

========================================================================*/

static char *sccsId = "@(#)BM_DataItem.m rev 1.11 created on 08/22/89 at 20:54:15";

/*==================== DO NOT REMOVE OR EDIT =========================*/
```

```
#include "objc.h"
#include "uil.h"

#include "BMWGlobal.h"
#include "BMDBInterf.h"


@requires CharString;


= BM_DataItem: Object (BM_WorkstationMsgs, Collection, Primitive)
  {
   id       buffer;
   int      itemID;
   unsigned itemType;
   unsigned source;
   BOOL     bufferIsDirty;
  }


  +new:(unsigned)type
    {
     self = [super new];

     [self initialize];

     itemID   = 0;
     itemType = type;
     source   = SOURCE_USER;

     return self;
    }


 -initialize
   {
    buffer = nil;

    [self resetBuffer];

    return self;
   }


 -(unsigned)itemType
   {
    return itemType;
   }

 -itemID:(int)anItemID
   {
    itemID = anItemID;

    return self;
   }


 -(int)itemID
   {
    return itemID;
   }
```

```
-(unsigned)source
  {
   return source;
  }


-(BOOL)bufferIsDirty
  {
   return bufferIsDirty;
  }


-resetBuffer
  {
   if (buffer != nil)
      buffer = [buffer free];

   bufferIsDirty = NO;

   return self;
  }


-delete
  {
   return [self resetBuffer];
  }


-readData
  {
   return [buffer copy];
  }


-writeData:aMatrix
  {
   if (buffer != nil)
      [self resetBuffer];

   buffer = [aMatrix copy];
   bufferIsDirty = YES;

   return self;
  }


-retrieve:client doCurrencyConversion:(BOOL)doCurrencyConversion
  {
   id data = [self readData];

   [data name:[CharString str:[[client identifier] str]]];


  if (data == nil)
     currentStatusMessage = dataRetrievalError;

  return data;
 }
```

```
-assign:values client:client doCurrencyConversion:(BOOL)doCurrencyConversion
  {
   [self writeData:values];
   [values name:[CharString str:[[client identifier] str]]];
   return values;
  }


-terminate$
  {
   [self resetBuffer];

   return [super terminate$];
  }
=:

/*===================== DO NOT REMOVE    EDIT ============================

      This comment and the following sccsId declaration are managed
      by SCCS for you. Do not edit or remove either.

      Source file:     /users/bmw/Alpha/DBServer/SCCS/s.BM_EntList.m
      Latest version:  1.3
      Last mod time:   08/27/89 at 17:19:16

=========================================================================*/

static char *sccsId = "@(#)BM_EntList.m rev 1.3 created on 08/27/89 at 17:19:16";

/*===================== DO NOT REMOVE OR EDIT ===========================*/


#include "objc.h"
#include "uil.h"

#include "BMWGlobal.h"
#include "BMDBInterf.h"


@requires BM_Matrix, BM_Universe;


= BM_EntityList: BM_CrossSectionItem (BM_WorkstationMsgs, Collection, Primitive)
  {
   unsigned group;
  }


  -initialize
    {
     [super initialize];

     group = 0;

     return self;
    }


  +createList:(unsigned)aSourceCode databaseServer:aDatabaseServer
    {
```

```
self = [self createInterfaceFor:0
                      itemType:NUMERIC_TYPE
                    itemSource:aSourceCode
                      currency:CURRENCY_UNKNOWN
                    anchorDate:nil
            exchangeRateItemID:0
                databaseServer:aDatabaseServer];

 return self;
}


+createListForGroup:(unsigned)aGroupCode
         listSource:(unsigned)aSourceCode
     databaseServer:aDatabaseServer
 {
  id wholeGroup;

  self = [self createList:SOURCE_USER databaseServer:aDatabaseServer];

  wholeGroup = [aDatabaseServer entitiesInGroup:aGroupCode];

     [self assign:wholeGroup];

     source = aSourceCode;

     [wholeGroup free];

     return self;
    }


 -retrieve:client
    {
     return universe?[universe copy]:[BM_Universe new:0];
    }


 -assign:aUniverse
    {
     id result, seqNos;

     if (!databaseMaintenanceMode && (source != SOURCE_USER))
        {
         currentStatusMessage = writeProtectionError;
         return nil;
        }

      [self resetBuffer];

      if ([aUniverse size])
         [self writeDataFor:aUniverse
                    fromSeq:(unsigned)0
                      toSeq:(unsigned)30000
                     values:[BM_Matrix nRows:[aUniverse size]
                                    nColumns:1 fillWith:(NUMBER)1.0]
             doCurrencyConversion:NO];

      return aUniverse;
     }


=:
```

```
/*===================== DO NOT REMOV    EDIT =============================

        This comment and the following sccsId declaration are managed
        by SCCS for you. Do not edit or remove either.

        Source file:     /users/bmw/Alpha/DBServer/SCCS/s.BM_IdentItem.m
        Latest version:  1.10
        Last mod time:   08/12/89 at 11:28:37

========================================================================*/

static char *sccsId = "@(#)BM_IdentItem.m rev 1.10 created on 08/12/89 at 11:28:37";

/*===================== DO NOT REMOVE OR EDIT =========================*/


#include "objc.h"
#include "uil.h"

#include "BMWGlobal.h"


@requires BM_Matrix;


= BM_IdentityItem: BM_CrossSectionItem (BM_WorkstationMsgs, Collection, Primitive)
   {
   }

   -traverseHierarchy:aUniverse
        pullFromGroup:(unsigned)pullFromGroup
            withTable:aMatrix
            indexedBy:anIndexUniverse
      {
       id result,
          response,
          element;
       unsigned index;

       BOOL firstTime = YES;

 [statusMonitor traversal];

       result = nil;

       for (index = 0; index < [aUniverse size]; index++)
          {
           element = [aUniverse at:index];

           result  = [element reportIdentityWithRespectTo:[element group]
                                      pullFromGroup:pullFromGroup
                                               into:result
                                         identifier:0
                                               goUp:YES
                                             goDown:YES];
           if (firstTime)
              if (result != nil)
                 result = [result capacity:[result capacity]*[aUniverse size]];
              else
                 [self error:"nil response during identity traversal!"];
```

```
            firstTime = NO;
           }

     [statusMonitor normalStatus];

    return result;
   }


 -readDataFor:universe1
        pullFromGroup:(unsigned)pullFromGroup
            fromSeq:(unsigned)fromSeq
             toSeq:(unsigned)toSeq
   doCurrencyConversion:(BOOL)doCurrencyConversion
   {
    return [self traverseHierarchy:universe1 pullFromGroup:pullFromGroup
                                          withTable:nil
                                          indexedBy:nil];
   }


=:


/*==================== DO NOT REMOVE    EDIT ============================

     This comment and the following sccsId declaration are managed
     by SCCS for you. Do not edit or remove either.

     Source file:    /users/bmw/Alpha/DBServer/SCCS/s.BM_PermCSItm.m
     Latest version:  1.8
     Last mod time:   08/12/89 at 11:28:46

======================================================================*/

static char *sccsId = "@(#)BM_PermCSItm.m rev 1.8 created on 08/12/89 at 11:28:46";

/*==================== DO NOT REMOVE OR EDIT ==========================*/


#include "objc.h"
#include "uil.h"
#include "BMWGlobal.h"
#include "BMDBInterf.h"


= BM_PermanentCrossSectionItem: BM_CrossSectionItem
                          (BM_WorkstationMsgs, Collection, Primitive)
  {
  }

  +newPermanentItem:itemName
         itemType:(unsigned)itemTyp
        itemSource:(unsigned)itemSrc
         tableMap:aTableMap
    databaseServer:aDatabaseServer
    {
     self = [super new:itemTyp];

     [self initialize];
```

```
source          = itemSrc;
databaseServer  = aDatabaseServer;

[self physicalTableMap:aTableMap];

if ((GenerateNewItem (self, [itemName str])) &&
    (WriteTableMapInfo (self)))
   return self;
else
   return nil;
}


-anchorDate:aDate
{
 [super anchorDate:aDate];

 if (!databaseMaintenanceMode)
    UpdateItemDefinition (self);

 return self;
}



-writeDataFor:universe1
             fromSeq:(unsigned)fromSeq
               toSeq:(unsigned)toSeq
              values:aMatrix

  doCurrencyConversion:(BOOL)doCı    ıcyConversion
  {
   [super writeDataFor:universe1
                 fromSeq:fromSeq
                   toSeq:toSeq
                  values:aMatrix
    doCurrencyConversion:doCurrencyConversion];

   [self flushBuffer:doCurrencyConversion]; .

   return self;
  }


 -delete
  {
   DeleteTableMapInfo (itemID);
   DeleteItemDefinition (itemID);

   return [super delete];
  }
=:


/*==================== DO NOT REMOVI    EDIT ============================

    This comment and the following sccsId declaration are managed
    by SCCS for you. Do not edit or remove either.

    Source file:    /users/bmw/Alpha/DBServer/SCCS/s.BM_TableMap.m
    Latest version: 1.2
    Last mod time:  08/12/89 at 11:28:56
```

```
========================================================================*/

static char *sccsId = "@(#)BM_TableMap.m rev 1.2 created on 08/12/89 at 11:28:56";

/*===================== DO NOT REMOVE OR EDIT ===========================*/


#include "objc.h"
#include "uil.h"

#include "BMWGlobal.h"
#include "BMDBInterf.h"


= BM_TableMap: BM_Matrix (BM_WorkstationMsgs,
                          Collection, Primitive)
   {
   }

   -initializeForPeriodicity:(unsigned)aPeriodicityCode
     {
      unsigned row, col;

      for (col = 0; col < [self nColumns]; col++)
         if (col != aPeriodicityCode)
            for (row = 0; row < [self nRows]; row++)
               [self numberAtRow:row Col:col put:NO_TABLE];

      return self;
     }


=:

/*===================== DO NOT REMOVE    EDIT ============================

       This comment and the following sccsId declaration are managed
       by SCCS for you. Do not edit or remove either.

       Source file:     /users/bmw/Alpha/DBServer/SCCS/s.BM_TimeList.m
       Latest version:  1.10
       Last mod time:   09/13/89 at 12:35:41

========================================================================*/

static char *sccsId = "@(#)BM_TimeList.m rev 1.10 created on 09/13/89 at 12:35:41";

/*===================== DO NOT REMOVE OR EDIT ===========================*/


#include "objc.h"
#include "uil.h"

#include "BMWGlobal.h"

#include <string.h>

@requires CharString;


= BM_TimeList: IntOrdCltn (BM_WorkstationMsgs, Collection, Primitive)
   {
```

```
 id seqNoTableName;
 id names;
}

-names
  {
   return names;
  }

+sequenceNumberToDate:(unsigned)aSeqNo  tableName:aTableName
  {
   return (id) LookupDate ([aTableName str], (int)aSeqNo);
  }


+(unsigned)dateToSequenceNumber:aDate  tableName:aTableName
  {
   if (aDate == nil)
      return 0;
   else
      return (unsigned) LookupSequenceNumber ([aTableName str],[aDate str]);
  }


+date:aDate  minus:(unsigned)aNumber  period:(STR)aPeriodName
  {
   if (aDate == nil)
      return nil;
   else
      if ((!strchr(aPeriodName,'w'))&&(!strchr(aPeriodName,'W')))
         return (id) SubtractIntervalFromDate([aDate str],aNumber,
                                                       aPeriodName);
      else
         return (id) SubtractIntervalFromDate([aDate str],aNumber*7,"days");
  }


+(int)compareDates:date1:date2

  {
   return (int) CompareDates ([date1 str], [date2 str]);
  }


+(STR)unitsPartOfInterval:anInterval
  {
   char     *bytePtr;
   unsigned number;

   number = (unsigned) strtol([anInterval str], &bytePtr, 10);

   return bytePtr;
  }


+(int)numericPartOfInterval:anInterval
  {
   char *bytePtr;
   int  number;

   number = (int) strtol([anInterval str], &bytePtr, 10);

   return number;
  }
```

```
+(int)widthOfInterval:interval1 inUnits:interval2
  {
   char *str1, str2 [40];
   int number;

   if (interval1 == nil)
      return 1;
   else
      if (!strlen ([interval2 str]))
         {
          number = [self numericPartOfInterval:interval1];
          return number?number:1;
         }
      else
         {
          str1 = [self unitsPartOfInterval:interval1];
          if ((strchr(str1,'w')) || (strchr(str1,'W')))
             {
              sprintf (str2, "%d %s",
                          [self numericPartOfInterval:interval1]*7, "days");
              return (int) DateIntervalWidth (str2, [interval2 str]);
             }
          else
             return (int)DateIntervalWidth([interval1 str],[interval2 str]);
         }
  }


+date:aDate  minusInterval:anInterval
  {
   char     *bytePtr;
   unsigned number;
   id       earlyDate = nil;

   number = (unsigned) strtol([anInterval str], &bytePtr, 10);

   if (bytePtr == [anInterval str])
      return nil;
   earlyDate = [self date:aDate m     :number period:bytePtr];

   return earlyDate;
  }


+sequenceNumberRange:client
      seqNoTableName:seqNoTable
               item:aDataItem
         periodicity:periodicity
      isLeftHandSide:(BOOL)leftHandSide
              values:aMatrix
                snpc:(unsigned)snpc
  {
   id date,
      offset,
      over,
      temp1 = nil,
      temp2 = nil,
      targetDate = nil,
      earlyDate = nil,
      returnValue,
      range;

   char *targetDateSTR;
```

```
unsigned firstSeqNo,
         lastSeqNo;

if (((date = [client modifierFor:"date"]) == nil) &&
    ((date = [client globalDate]) == nil))
   if (leftHandSide)
     {
      temp1 = [CharString str:"Today"];
      temp2 = [CharString str:"0days"];
      targetDate    = [self date:temp1 minusInterval:temp2];
      targetDateSTR = [targetDate str];
      [temp1 free];
      [temp2 free];
      temp1 = targetDate;
     }
   else
     targetDateSTR = [[aDataItem anchorDate] str];
else
   targetDateSTR = [date str];

targetDate = [CharString str:targetDateSTR];
[temp1 free];

if(globalDebugFlag)printf("date %s\n",[targetDate str]);


if ((offset = [client modifierFor:"offset"]) != nil)
   {
    temp1 = [self date:targetDate minusInterval:offset];
    [targetDate free];
    targetDate = temp1;
   }

if ((offset = [client globalOffset]) != nil)
   {
    temp1 = [self date:targetDate minusInterval:offset];
    [targetDate free];
    targetDate = temp1;
   }
if(globalDebugFlag)printf("adjusted c    %s\n",[targetDate str]);


if ((leftHandSide) &&
    (targetDate != nil) &&
    (([aDataItem anchorDate] == nil) ||
     ([self compareDates:targetDate:[aDataItem anchorDate]] > 0)))
   [aDataItem anchorDate:[CharString str:[targetDate str]]];


if ([periodicity compareSTR:"static"] == 0)
   {
    firstSeqNo = 1;
    lastSeqNo  = 30000;
   }
else
   {
    lastSeqNo = [self dateToSequenceNumber:targetDate
                               tableName:seqNoTable];

    if (leftHandSide)
      {
       firstSeqNo = lastSeqNo - ([aMatrix nColumns] * snpc);
       earlyDate  = [self sequenceNumberToDate:firstSeqNo
                                    tableName:seqNoTable];
```

```
        }
      else
        {
         if (((over = [client modifierFor:"over"]) == nil) &&
             ((over = [client globalOver]) == nil))
            range = [[CharString str:" 1 "] concat:periodicity];
         else
            range = [CharString str:[over str]];

if(globalDebugFlag)printf("range %s\n",[range str]);

         if (([seqNoTable compareSTR:"trd_days"] == 0) &&
             (strchr([range str],'d') != (char *)0))
            {
             firstSeqNo = lastSeqNo - [self widthOfInterval:range
                                              inUnits:periodicity];
             earlyDate  = [self sequenceNumberToDate:firstSeqNo
                                      tableName:seqNoTable];
            }
         else
            {
             earlyDate = [self date:targetDate minusInterval:range];

             firstSeqNo = [self dateToSequenceNumber:earlyDate
                                      tableName:seqNoTable];
            }

         [range free];

         [[client defaultPeriodicity] assignSTR:[periodicity str]];
        }
    }

   if (firstSeqNo >= lastSeqNo)
      firstSeqNo = lastSeqNo - 1;

if(globalDebugFlag)printf ("%u %u\n",firstSeqNo,lastSeqNo);

   if ((firstSeqNo == 0) || (lastSeqNo == 0))
      returnValue = nil;
   else
       {
        self = [super with:2, (int)firstSeqNo, (int)lastSeqNo];

        seqNoTableName = [CharString str:[seqNoTable str]];
        names = [[[CharString str:[earlyDate str]]
                     concatSTR:" to "]
                     concatSTR:[targetDate str]];

        returnValue = self;
       }

     [targetDate free];
     [earlyDate  free];

     return returnValue;
    }


  -terminate$
    {
     if (seqNoTableName != nil)
       [seqNoTableName free];
```

```
    if (names != nil)
      [names free];

    return [super terminate$];
   }
=:

/*==================== DO NOT REMOVE    EDIT ============================

       This comment and the following sccsId declaration are managed
       by SCCS for you. Do not edit or remove either.

       Source file:     /users/bmw/Alpha/DBServer/SCCS/s.BM_Universe.m
       Latest version:  1.10
       Last mod time:   09/13/89 at 12:36:16

=========================================================================*/

static char *sccsId = "@(#)BM_Universe.m rev 1.10 created on 09/13/89 at 12:36:16";

/*==================== DO NOT REMOVE OR EDIT ==========================*/

#include "objc.h"
#include "uil.h"
#include "BMWGlobal.h"
#include "BMDBInterf.h"


@requires BM_DataEntity, CharString, BM_StringMatrix;

struct _ENTITY
   {
    @defs(BM_DataEntity)
   };
typedef struct _ENTITY *EntityPtr;


#define GROUP(id)   ((EntityPtr)id)->myGroup
#define ENTID(id)   ((EntityPtr)id)->myEntityID
#define ORDINAL(id) ((EntityPtr)id)->ordinalWithinGroup



= BM_Universe: OrdCltn (BM_WorkstationMsgs, Collection, Primitive)
   {
    BOOL     oneGroupRepresentedInSelf;
    unsigned theOneGroup;
    id       aDummyNode;

    unsigned offsetOfLastNodeSearchedFor;
   }


   -oneGroupRepresentedInSelf:(unsigned)aGroupCode
      {
       oneGroupRepresentedInSelf = YES;
       theOneGroup = aGroupCode;
       return self;
      }


   -(BOOL)containsOneGroup
```

```
  {
   return oneGroupRepresentedInSelf;
  }


-add:anEntity
  {
   if ([self size] == 0)
      [self oneGroupRepresentedInSelf:GROUP(anEntity)];
   else
      if ((oneGroupRepresentedInSelf) &&
          (theOneGroup != GROUP(a    ity)))
         oneGroupRepresentedInSelf = NO;

   return [super add:anEntity];
  }


-zapUsing:aSparseArray
  {
   int  index;
   BOOL stringMatrix;

   if ([aSparseArray size] == [self size])
      {
       id newUniverse = [BM_Universe new];

       stringMatrix = [aSparseArray isKindOf:BM_StringMatrix];

       for (index = 0; index < [aSparseArray size]; index++)
          if (([aSparseArray getFlagValue:index]) &&
              (stringMatrix ||
               ([aSparseArray numberAt:index] != 0.0)))
             [newUniverse add:[self at:index]];

       return newUniverse;
      }
   else
      return nil;
  }


-(BOOL)containsGroup:(unsigned)aGroupCode
  {
   unsigned index;

   for (index = 0; index < [self size]; index++)
      if (GROUP([self at:index]) == aGroupCode)
         return YES;

   return NO;
  }

-inGroup:(unsigned)aGroupCode
  {
   id element;

   id newUniverse = [BM_Universe new:(int)([self size]/2)];

   unsigned index = 0;
```

```
  for (index = 0; index < [self size]; index++)
     if (GROUP(element = [self at:index]) == aGroupCode)
        newUniverse = [newUniverse add:element];

  [newUniverse oneGroupRepresentedInSelf:aGroupCode];

  return newUniverse;
 }


-firstElementInGroup:(unsigned)aGroupCode
 {
  id  element;
  unsigned index;

  for (index = 0; index < [self size]; index++)
     if (GROUP(element=[self at:index]) == aGroupCode)
        return element;

  return nil;
 }


-(unsigned)offsetOf:anEntity
 {
  int size = [self size];
  int offset;
  int hash;

  if ((oneGroupRepresentedInSelf) &&
      (theOneGroup != GROUP(anEntity)))
     return NOTFOUND;

  hash = ORDINAL(anEntity);

  if (*(((id *)IV(self->contents))+hash) == anEntity)
     {
      offsetOfLastNodeSearchedFor = hash;
      return hash;
     }

  hash = offsetOfLastNodeSearchedFor + 1;

  if (hash >= size)
     offset = 0;
  else
     offset = hash;

  while (offset < size)
     if (*(((id *)IV(self->contents))+offset) == anEntity)
        {
         offsetOfLastNodeSearchedFor = offset;
         return offset;
        }
     else
        offset++;

  if (hash >= size)
     return NOTFOUND;
  else
     offset = hash;

  while (offset >= 0)
     if (*(((id *)IV(self->contents))+offset) == anEntity)
```

```
        {
         offsetOfLastNodeSearchedFor = offset;
         return offset;
        }
      else
         offset--;

   return NOTFOUND;
  }


-findEntity:(int)entityID group:(unsigned)group startLookingAt:anEntity
  {
   int hash = entityID;
   int size = [self size];
   int offset;

      if (anEntity != nil)
         if ((ENTID(anEntity) == entityID) &&
             (GROUP(anEntity) == group))
         return anEntity;
      else
         hash = offsetOfLastNodeSearchedFor;

      if ((oneGroupRepresentedInSelf) &&
          (theOneGroup != group))
         return nil;

      if (hash >= size)
         offset = 0;
      else
         offset = hash;

      while (offset < size)
         if ((ENTID(*(((id *)IV(self->contents))+offset)) == entityID) &&
             (GROUP(*(((id *)IV(self->contents))+offset)) == group))
            {
             offsetOfLastNodeSearchedFor = offset;
             return *(((id *)IV(self->contents))+offset);
            }
         else
            offset++;

      if (hash >= size)
         return nil;
      else
         offset = hash;

      offset = hash;

      while (offset >= 0)
         if ((ENTID(*(((id *)IV(self->contents))+offset)) == entityID) &&
             (GROUP(*(((id *)IV(self->contents))+offset)) == group))
            {
             offsetOfLastNodeSearchedFor = offset;
             return *(((id *)IV(self->contents))+offset);
            }
         else
            offset--;

      return nil;
     }
```

```
-(unsigned)firstGroup
  {
   if ([self size] > 0)
      return [[self at:0] group];
   else
      return NOTFOUND;
  }


-(BOOL)isSuperSetOf:aUniverse
  {
   unsigned index;

   for (index = 0; index < [aUniverse size]; index++)
      if ([self offsetOf:[aUniverse at:index]] == NOTFOUND)
         return NO;

   return YES;
  }
-merge:aUniverse
  {
   unsigned duplicate;
   id element;
   int index;

   for (index = 0; index < [aUniverse size]; index++)
      if ((duplicate = [self offsetOf:[aUniverse at:index]]) != NOTFOUND)
        {
         if (aDummyNode == nil)
            aDummyNode = [BM_DataEntity entityID:DUMMY_NODE
                                        group:-1
                              ordinalWithinGroup:0];
         [self at:duplicate put:aDummyNode];
        }

   [aUniverse addContentsTo:self];

   return self;
  }


-(BOOL)isEqual:aUniverse
  {
   if (([aUniverse size] != [self size]) ||
       (([self size] > 0) &&
        ([aUniverse at:0]                != [self at:0]) &&
        ([aUniverse at:[self size] - 1] != [self at:[self size] - 1])))
      return FALSE;
   else
      return TRUE;
  }

=:
```

XXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXX

```
######  #      # #      #
#     # ##    ## #   #  #
#     # # #  # # #   #  #
######  #  #   # #   #  #
#     # #      # #   #  #
#     # #      # #   #  #
######  #      #  ## ##

Request id: laser-1396    Printer: laser

Sat Sep 16 18:16:45 EDT 1989

/*==================== I  NOT REMOVE OR EDIT ========  ===============

        This comment and the following sccsId declaration are managed
        by SCCS for you. Do not edit or remove either.

        Source file:     /users/bmw/Alpha/DBServer/SCCS/s.DateSequence.c
        Latest version:  1.1
        Last mod time:   05/06/89 at 14:09:35

===========================================================================*/

static char *sccsId = "@(#)DateSequence.c rev 1.1 created on 05/06/89 at

                                14:09:35"

/*==================== DO NOT REMOVE OR EDIT ========================*/

#include <ctype.h>

/*
 *  From xcalendar.c on X11R3 conrib tape.
 *
 */

static int monthLength[] = {
   0,
   31, 29, 31, 30,
   31, 30, 31, 31,
   30, 31, 30, 31,
};

/*
 *      return day of the week
 *      of jan 1 of given year
 *      0 = Sunday, 6 = Saturday
 */

static int January1(yr)
{
        register y, d;

/*
 *      normal gregorian calendar
 *      one extra day per four years
 */

        y = yr;
        d = 4+y+(y+3)/4;

/*
 *      julian calendar
```

```
 *      regular gregorian
 *      less three days per 400
 */

        if(y > 1800) {
                d -= (y-1701)/100;
                d += (y-1601)/400;
        }

/*
 *      great calendar changeover instant
 */

        if(y > 1752)
                d += 3;

        return(d%7);

 }

 static int calInit = 0;

 static int FirstDay(m, y)
      int m,y;
 {
    register d, i;

    calInit = y;
    d = January1(y);
    monthLength[2] = 29;
    monthLength[9] = 30;

    switch((January1(y+1)+7-d)%7) {

       /*
        *         non-leap year
        */
      case 1:
       monthLength[2] = 28;
       break;

       /*
        *         1752
        */
      default:
       monthLength[9] = 19;
       break;

       /*
        *         leap year
        */
      case 2:
       ;
    }

    for(i=1; i<m; i++)
      d += monthLength[i];

    return(d % 7);
 }

 int NumberOfDays(m,y)
      int m,y;
```

```
{
   if(calInit != y)
     FirstDay(m,y);
   return monthLength[m];
}


/*
 *      BIS code
 */

#include "DateSequence.h"

/*
 *  Calculate leap days. Since it's relative we
 *  don't realy care about the calendar changes
 *  reflected in the code above. The formula
 *
 *      year     year     year
 *      ----  -  ----  +  ----
 *       4       100      400
 *
 *  gives "relative leap years" for a given year.
 *  We want the number of leap days in years up
 *  to the previous year for calculations, hence
 *  the following macro:
 */
#define LeapDays(year) ((97 * ((year) - 1)) / 400)

static int startYear = START_YEAR;

int SetStartYear(year)
     int year;
{
  int oldStart = startYear;

  if (year < 0) return(0);
  else startYear = year;
  return(oldStart);
}

static int DaysSinceStart(year)
     int year;
{
  register int days;

  days = 365 * (year - startYear);
  days += LeapDays(year) - LeapDays(startYear);

  return(days);
}

int DayOfWeek(day, month, year)
     int day, month, year;
{
  int firstDay = FirstDay(month, year);

  return((firstDay + day - 1) % 7);
}
```

```
int AllDaysSequenceNumber(day, month, year)
     int day;
     int month;
     int year;
{
  register int days = DaysSinceStart(year);
  register int i;

  for(i = 1; i < month; i++) days += NumberOfDays(i, year);

  days += day;

  return(days);
}

void AllDaysSequenceDate(sequenceNumber, dayPtr, monthPtr, yearPtr)
     int sequenceNumber;
     int *dayPtr;
     int *monthPtr;
     int *yearPtr;
{
  /*
   *  Divide the sequence number by 365. This will yield
   *  either the correct year or one year after the correct
   *  year. We then adjust to the correct year;
   */
  register int year = startYear + (sequenceNumber / 365);
  register int days = Da   ;inceStart(year);
  register int month;
  register int monthDays;

  if ((days + 1) > sequenceNumber)
    days = sequenceNumber - DaysSinceStart(--year);
  else days = sequenceNumber - days;

  for (month = 1, monthDays = NumberOfDays(month, year);
       days > monthDays;
       month++, monthDays = NumberOfDays(month, year)) days -
                                                     = monthDays;
  *yearPtr = year;
  *monthPtr = month;
  *dayPtr = days;
}

int TradeDaysSequenceNumber(day, month, year)
     int day;
     int month;
     int year;
{
  register int days = AllDaysSequenceNumber(day, month, year);
  register int tradeDays;
  register int startDayOfWeek = January1(startYear);
  register int weeks;

  /*
   *  Adjust days so it represents the number of
   *  days starting on Saturday.
   */
  switch (startDayOfWeek)
    {
    case DAY_saturday:
      if (days < 3) return(0);
      days -= 2; break;
```

```
    case DAY_sunday:
      if (days < 2) return(0);
      days--; break;

    default: /* All others */
      tradeDays = 6 - startDayOfWeek;
      if (days < tradeDays) return(days);
      days -= tradeDays;
      break;
    }

  if (days < 0) return(tradeDays + days);

  /*
   *  Get the number of complete work weeks.
   *  Adjust tradeDays and days accordingly.
   */
  weeks = days / 7;
  tradeDays += weeks * 5;
  days -= weeks * 7;

  /*
   *  Handle a partial week at the end.
   */
  tradeDays += ((days > 2) ? (days - 2) : 0);

  return(tradeDays);
}

void TradeDaysSequenceDa  (sequenceNumber, dayPtr, mor  Ptr, yearPtr)
     int sequenceNumber;
     int *dayPtr;
     int *monthPtr;
     int *yearPtr;
{
  register int days = 0;
  register int tradeDays = sequenceNumber;
  register int startDayOfWeek = January1(startYear);
  register int weeks;

  /*
   *  Adjust tradeDays so it represents the number of
   *  trade days starting on Monday.
   */
  switch (startDayOfWeek)
    {
    case DAY_saturday:
      days = 2; break;

    case DAY_sunday:
      days = 1; break;

    default: /* All others */
      days = 6 - startDayOfWeek;
      if (tradeDays < days)
        {
        days = tradeDays;
        tradeDays = 0;
        }
      else tradeDays -= days;
      break;
    }
```

```
  /*
   *  Get the number of complete work weeks.
   *  Adjust tradeDays and days accordingly.
   */
  weeks = tradeDays / 5;
  days += weeks * 7;
  tradeDays -= weeks * 5;

  /*
   *  Handle a partial week at the end.
   */
  if (tradeDays) days += tradeDays + 2;

  AllDaysSequenceDate(days, dayPtr, monthPtr, yearPtr);
}

/*
 *  For monthly series things are much less complicated:
 */

#define MonthsSinceStart(year) ((year) - startYear) * 12

int MonthlySequenceNumber(day, month, year)
     int day;
     int month;
     int year;
{
  register int months = MonthsSinceStart(year) + month;

  return(months);
}

  void MonthlySequenceDate  equenceNumber, dayPtr, montl  r, yearPtr)
       int sequenceNumber;
       int *dayPtr;
       int *monthPtr;
       int *yearPtr;
  {
    register int year = startYear + sequenceNumber / 12;
    register int month = sequenceNumber % 12;
    register int day;
    register int dayOfWeek;

    if (! month)
      {
       month = 12;
       year--;
      }

    day = NumberOfDays(month, year);
    dayOfWeek = DayOfWeek(day, month, year);

    if (dayOfWeek == DAY_saturday) day--;
    else if (dayOfWeek == DAY_sunday) day -= 2;

    *dayPtr = day;
    *monthPtr = month;
    *yearPtr = year;
  }

  static char *dayStrings[] =
  { "SUN", "MON", "TUE", "WED", "THU", "FRI", "SAT" };
```

```
char *DayToString(day)
     int day;
{
  if (day < DAY_sunday || day > DAY_saturday)
    return((char *) 0);
  else return(dayStrings[day]);
}

int StringToDay(str)
     char *str;
{
  int i;
  register char *strPtr;
  register char *dayPtr;
  char c1, c2, c3;

  for(i = 0; i < 7 ; i++)
    {
      strPtr = str;

      c1 = *(strPtr++);
      c2 = *(strPtr++);
      c3 = *(strPtr++);

      dayPtr = dayStrings[i];
      if (*(dayPtr++) == toupper(c1) &&
          *(dayPtr++) == toupper(c2) &&
          *dayPtr == toupper(c3)) return(i);
    }

  return(-1);
}


static char *monthStrings[] =
{ "NULL", "JAN", "FEB",  \R", "APR", "MAY", "JUN",
    "JUL", "AUG", "SEP",  OCT", "NOV", "DEC" };

char *MonthToString(month)
     int month;
{
  if (month < MONTH_january || month > MONTH_december)
    return((char *) 0);
  else return(monthStrings[month]);
}


int StringToMonth(str)
     char *str;
{
  int i;
  register char *strPtr;
  register char *monthPtr;
  char c1, c2, c3;

  for(i = 1; i < 13 ; i++)
    {
      strPtr = str;

      c1 = *(strPtr++);
      c2 = *(strPtr++);
      c3 = *(strPtr++);
```

```
      monthPtr = monthStrings[i];
      if (*(monthPtr++) == toupper(c1) &&
          *(monthPtr++) == toupper(c2) &&
          *monthPtr == toupper(c3)) return(i);
    }

  return(-1);
}


/*===================== DO NOT REMOVE    EDIT ============================

      This comment and the following sccsId declaration are managed
      by SCCS for you. Do not edit or remove either.

      Source file:     /users/bmw/Alpha/DBServer/SCCS/s.DateSequence.c
      Latest version:  1.1
      Last mod time:   05/06/89 at 14:09:35

=========================================================================*/

static char *sccsId = "@(#)DateSequence.c rev 1.1 created on 05/06/89 at 14:09:35";

/*==================== DO NOT REMOVE OR EDIT ===========================*/

#include <ctype.h>

/*
 *  From xcalendar.c on X11R3 conrib tape.
 *
 */

static int monthLength[] = {
    0,
    31, 29, 31, 30,
    31, 30, 31, 31,
    30, 31, 30, 31,
};

/*
 *      return day of the week
 *      of jan 1 of given year
 *      0 = Sunday, 6 = Saturday
 */

static int January1(yr)
{
        register y, d;

/*
 *      normal gregorian calendar
 *      one extra day per four years
 */

        y = yr;
        d = 4+y+(y+3)/4;

/*
 *      julian calendar
 *      regular gregorian
 *      less three days per 400
 */
```

```
        if(y > 1800) {
                d -= (y-1701)/100;
                d += (y-1601)/400;
        }

/*
 *      great calendar changeover instant
 */

        if(y > 1752)
                d += 3;

        return(d%7);
}

static int calInit = 0;

static int FirstDay(m, y)
    int m,y;
{
   register d, i;

   calInit = y;
   d = January1(y);
   monthLength[2] = 29;
   monthLength[9] = 30;

   switch((January1(y+1)+7-d)%7) {

      /*
       *        non-leap year
       */
    case 1:
      monthLength[2] = 28;
      break;

      /*
       *        1752
       */
    default:
      monthLength[9] = 19;
      break;

      /*
       *        leap year
       */
    case 2:
      ;
  }

  for(i=1; i<m; i++)
    d += monthLength[i];

  return(d % 7);
}

int NumberOfDays(m,y)
    int m,y;
{
  if(calInit != y)
    FirstDay(m,y);
  return monthLength[m];
}
```

```
/*
 *      BIS code
 */

#include "DateSequence.h"

/*
 *  Calculate leap days. Since it's relative we
 *  don't realy care about the calendar changes
 *  reflected in the code above. The formula
 *
 *      year     year     year
 *      ----  -  ----  +  ----
 *       4       100      400
 *
 *  gives "relative leap years" for a given year.
 *  We want the number of leap days in years up
 *  to the previous year for calculations, hence
 *  the following macro:
 */
#define LeapDays(year) ((97 * ((year) - 1)) / 400)

static int startYear = START_YEAR;

int SetStartYear(year)
     int year;
{
  int oldStart = startYear;

  if (year < 0) return(0);
  else startYear = year;
  return(oldStart);
}

static int DaysSinceStart(year)
     int year;
{
  register int days;

  days = 365 * (year - startYear);
  days += LeapDays(year) - LeapDays(startYear);

  return(days);
}

int DayOfWeek(day, month, year)
     int day, month, year;
{
  int firstDay = FirstDay(month, year);

  return((firstDay + day - 1) % 7);
}

int AllDaysSequenceNumber(day, month, year)
     int day;
     int month;
     int year;
{
  register int days = DaysSinceStart(year);
  register int i;

  for(i = 1; i < month; i++) days += NumberOfDays(i, year);
```

```
  days += day;

  return(days);
}

void AllDaysSequenceDate(sequenceNumber, dayPtr, monthPtr, yearPtr)
     int sequenceNumber;
     int *dayPtr;
     int *monthPtr;
     int *yearPtr;
{
  /*
   *  Divide the sequence number by 365. This will yield
   *  either the correct year or one year after the correct
   *  year. We then adjust to the correct year;
   */
  register int year = startYear + (sequenceNumber / 365);
  register int days = DaysSinceStart(    );
  register int month;
  register int monthDays;

  if ((days + 1) > sequenceNumber)
    days = sequenceNumber - DaysSinceStart(--year);
  else days = sequenceNumber - days;

  for (month = 1, monthDays = NumberOfDays(month, year);
       days > monthDays;
       month++, monthDays = NumberOfDays(month, year)) days -= monthDays;

  *yearPtr = year;
  *monthPtr = month;
  *dayPtr = days;
}

int TradeDaysSequenceNumber(day, month, year)
     int day;
     int month;
     int year;
{
  register int days = AllDaysSequenceNumber(day, month, year);
  register int tradeDays;
  register int startDayOfWeek = January1(startYear);
  register int weeks;

  /*
   *  Adjust days so it represents the number of
   *  days starting on Saturday.
   */
  switch (startDayOfWeek)
    {
    case DAY_saturday:
      if (days < 3) return(0);
      days -= 2; break;

    case DAY_sunday:
      if (days < 2) return(0);
      days--; break;

    default: /* All others */
      tradeDays = 6 - startDayOfWeek;
      if (days < tradeDays) return(days);
      days -= tradeDays;
      break;
    }
```

```
  if (days < 0) return(tradeDays + days);

  /*
   *  Get the number of complete work weeks.
   *  Adjust tradeDays and days accordingly.
   */
  weeks = days / 7;
  tradeDays += weeks * 5;
  days -= weeks * 7;

  /*
   *  Handle a partial week at the end.
   */
  tradeDays += ((days > 2) ? (days - 2) : 0);

  return(tradeDays);
}

void TradeDaysSequenceDate(sequenceNu ', dayPtr, monthPtr, yearPtr)
     int sequenceNumber;
     int *dayPtr;
     int *monthPtr;
     int *yearPtr;
{
  register int days = 0;
  register int tradeDays = sequenceNumber;
  register int startDayOfWeek = January1(startYear);
  register int weeks;

  /*
   *  Adjust tradeDays so it represents the number of
   *  trade days starting on Monday.
   */
  switch (startDayOfWeek)
    {
    case DAY_saturday:
      days = 2; break;

    case DAY_sunday:
      days = 1; break;

    default: /* All others */
      days = 6 - startDayOfWeek;
      if (tradeDays < days)
        {
          days = tradeDays;
          tradeDays = 0;
        }
      else tradeDays -= days;
      break;
    }

  /*
   *  Get the number of complete work weeks.
   *  Adjust tradeDays and days accordingly.
   */
  weeks = tradeDays / 5;
  days += weeks * 7;
  tradeDays -= weeks * 5;

  /*
   *  Handle a partial week at the end.
   */
```

```
  if (tradeDays) days += tradeDays + 2;

  AllDaysSequenceDate(days, dayPtr, monthPtr, yearPtr);
}

/*
 *  For monthly series things are much less complicated:
 */

#define MonthsSinceStart(year) ((year) - startYear) * 12

int MonthlySequenceNumber(day, month, year)
     int day;
     int month;
     int year;
{
  register int months = MonthsSinceStart(year) + month;

  return(months);
}

 void MonthlySequenceDate(sequenceNumb    dayPtr, monthPtr, yearPtr)
      int sequenceNumber;
      int *dayPtr;
      int *monthPtr;
      int *yearPtr;
 {
   register int year = startYear + sequenceNumber / 12;
   register int month = sequenceNumber % 12;
   register int day;
   register int dayOfWeek;

   if (! month)
     {
       month = 12;
       year--;
     }

   day = NumberOfDays(month, year);
   dayOfWeek = DayOfWeek(day, month, year);

   if (dayOfWeek == DAY_saturday) day--;
   else if (dayOfWeek == DAY_sunday) day -= 2;

   *dayPtr = day;
   *monthPtr = month;
   *yearPtr = year;
 }

static char *dayStrings[] =
{ "SUN", "MON", "TUE", "WED", "THU", "FRI", "SAT" };

char *DayToString(day)
     int day;
{
  if (day < DAY_sunday || day > DAY_saturday)
    return((char *) 0);
  else return(dayStrings[day]);
}

int StringToDay(str)
     char *str;
```

```
{
  int i;
  register char *strPtr;
  register char *dayPtr;
  char c1, c2, c3;

  for(i = 0; i < 7 ; i++)
    {
      strPtr = str;

      c1 = *(strPtr++);
      c2 = *(strPtr++);
      c3 = *(strPtr++);

      dayPtr = dayStrings[i];
      if (*(dayPtr++) == toupper(c1) &&
          *(dayPtr++) == toupper(c2) &&
          *dayPtr == toupper(c3)) return(i);
    }

  return(-1);
}


static char *monthStrings[] =

{ "NULL", "JAN", "FEB", "MAR", "APR",    Y", "JUN",
    "JUL", "AUG", "SEP", "OCT", "NOV",  DEC" };

char *MonthToString(month)
     int month;
{
  if (month < MONTH_january || month > MONTH_december)
    return((char *) 0);
  else return(monthStrings[month]);
}


int StringToMonth(str)
     char *str;
{
  int i;
  register char *strPtr;
  register char *monthPtr;
  char c1, c2, c3;

  for(i = 1; i < 13 ; i++)
    {
      strPtr = str;

      c1 = *(strPtr++);
      c2 = *(strPtr++);
      c3 = *(strPtr++);

      monthPtr = monthStrings[i];
      if (*(monthPtr++) == toupper(c1) &&
          *(monthPtr++) == toupper(c2) &&
          *monthPtr == toupper(c3)) return(i);
    }

  return(-1);
}
```

```
/*==================== DO NOT REMOVE    EDIT ============================

      This comment and the following sccsId declaration are managed
      by SCCS for you. Do not edit or remove either.

      Source file:     /users/bmw/Prototype/DBServer/SCCS/s.BMDBInterf.qc
      Latest version:  1.1
      Last mod time:   12/06/88 at 11:13:32

========================================================================*/

static char *sccsId = "@(#)BMDBInterf.qc rev 1.1 created on 12/06/88 at 11:13:32";

/*==================== DO NOT REMOVE OR EDIT ===========================*/


#include  <math.h>
#include "objc.h"
#include "uil.h"
#include "BMWGlobal.h"
#include "BMDBInterf.h"


struct _ENTITY
  {
   @defs(BM_DataEntity)
  };
typedef struct _ENTITY *EntityPtr;

#define ROUND(f) (fmod(f,1.0)>0.5? ceil(f*100000000.0)/100000000.0: \
                               floor(f*100000000.0)/100000000.0)


@requires CharString, BM_CICharString, BM_Matrix, BM_StringMatrix,
          BM_DataEntity, BM_Universe,
          BM_CrossSectionItem, BM_EntityList, BM_PermanentCrossSectionItem,
          BM_TableMap, BM_Dictionary, OrdCltn, ShortArray, Object, IntOrdCltn;

=(BM_WorkstationMsgs, UserInterface, Collection, Primitive)



## int OpenBISDatabase (DatabaseName)

## char *DatabaseName;

##   {
##    ingres DatabaseName
##   }


## int CloseBISDatabase ()

##   {
##    exit
##   }


id FindEntityFromEntityID (entityMap, entityID)

id  entityMap;
int entityID;
```

```
{
 int entity;
 if (entityID >= [entityMap size]:
    return nil;

 if ((entity = [entityMap intAt:entityID]) != -1)
    return (id)entity;
 else
    return nil;
}


int OrdinalValueFromEntityID (entityMap, entityID)

id  entityMap;
int entityID;

 {
  id entity;

  if ((entity = FindEntityFromEntityID (entityMap, entityID)) != nil)
     return ((EntityPtr)entity)->ordinalWithinGroup;
  else
     return -1;
 }


int ReportingCurrencyFromEntityID (entityMap, entityID)

id  entityMap;
int entityID;

 {
  id entity;

  if ((entity = FindEntityFromEntityID (entityMap, entityID)) != nil)
     return ((EntityPtr)entity)->reportCurrency;
  else
     return -1;
 }


## int RetrieveEntities ()

##   {
##    int entityID,
##        group;
     id  node;
     int entityCounter,
         entityIDCounter,
         currentGroup;

[statusMonitor ingres];

     masterEntityList = [BM_Universe new:0];
     entityMap        = [[OrdCltn new:1] add:[Object new]]; /* pad offset 0 */

     currentGroup    = -1;
     entityIDCounter = 0;
     entityCounter   = 0;
     group           = 1;
     [entityMap add:[IntOrdCltn new:0]];
```

```
##    range of rec is entity

##    retrieve (group = rec.grp, entityID = rec.entid) sort by #group, #entityID
##      {
        if (currentGroup == -1)
           currentGroup = group;

        if (group != currentGroup)
           {
            entityIDCounter = 0;
            entityCounter   = 0;
            currentGroup = group;
            [entityMap add:[IntOrdCltn new:0]];
           }

        for ( ; entityIDCounter < entityID; entityIDCounter++)
           [[entityMap at:group] addInt:-1];

        node = [BM_DataEntity entityID:entityID group:(unsigned)group
                    ordinalWithinGroup:entityCounter];

        [[entityMap at:group] addInt:(int)node];
        [masterEntityList add:node];

        entityIDCounter += 1;
        entityCounter   += 1;
##      }


[statusMonitor normalStatus];

for (group = 1; group < [entityMap size]; group++)
   printf("group %d: %d entities\n",group,[[entityMap at:group] size]);
##   }



## int RetrieveEntityLinks (masterEntityList)

## int masterEntityList;

##   {
##    int parentID, parentGroup,
##        childID,  childGroup;

      id parent = nil,
         child  = nil;

[statusMonitor ingres];

##    range of rec is ent_link

##    retrieve (parentGroup = rec.parent_grp, parentID = rec.parent_entid,
##              childGroup  = rec.child_grp,  childID  = rec.child_entid)
##      {
        parent = FindEntityFromEntityID ([entityMap at:parentGroup],
                                                                 parentID);
        child  = FindEntityFromEntityID ([entityMap at:childGroup], childID);

        if ((parent != nil) && (child != nil))
           {
            [parent addChild:child];
```

```
            [child addParent:parent];
           }
##       }


[statusMonitor normalStatus];

     return masterEntityList;

##   }




## int RetrieveLists (databaseServer)

id databaseServer;

##   {
##    int    ListId;
##    char   *ListName;
##    char   Date [40];
      id     dictionary = [BM_Dictionary new:0];
      unsigned group;

[statusMonitor ingres];


     for (group = 0; group < NUMBER_OF_GROUPS; group++)
       {
        switch (group)
          {
           case 1:  ListName = "globe";           break;
           case 2:  ListName = "regions";         break;
           case 3:  ListName = "countries";       break;
           case 4:  ListName = "sectors";         break;
           case 5:  ListName = "majorIndustries"; break;
           case 6:  ListName = "industries";      break;
           case 7:  ListName = "companies";       break;
           case 8:  ListName = "securities";      break;
           default: ListName = "";
          }
        if (strlen(ListName))
          [dictionary atKey:[BM_CICharString str:ListName]
                      put:[BM_EntityList
                             createListForGroup:group
                                    listSource:SOURCE_BIS
                               databaseServer:databaseServer]];
       }

[statusMonitor normalStatus];

     return (int) dictionary;
##   }



## int RetrieveItems (databaseServer)

id databaseServer;

##   {
##    int    ItemId;
```

```
##    char   ItemName [40];
##    char   ItemType [40];
##    char   Date [40];
##    int    xRate;
      unsigned itemType;
      unsigned itemSource;
      unsigned currency;
      id     factoryObj;
      id     dictionary = [BM_Dictionary new:0];

[statusMonitor ingres];

##    range of rec is itm

##    retrieve (ItemId = rec.itm, ItemName = rec.sname,
##              Date = rec.anchor_date, xRate = rec.exrate_itm,
##              ItemType = rec.format)
##       {
          ZAP_TRAILING_SPACES (ItemName);
          ZAP_TRAILING_SPACES (Date);
          CAPITALIZE_DATE (Date);

          if (ItemType [0] == 'f')
             itemType = NUMERIC_TYPE;
          else
             itemType = STRING_TYPE;

          if (ItemId < 15000)
             {
              currency   = CURRENCY_LOCAL;
              itemSource = SOURCE_BIS;
             }
          else
             {
              itemSource = SOURCE_USER;
              currency   = CURRENCY_UNKNOWN;
             }

          if (databaseMaintenanceMode || (itemSource == SOURCE_USER))
             factoryObj = BM_PermanentCrossSectionItem;
          else
             factoryObj = BM_CrossSectionItem;

          [dictionary atKey:[BM_CICharString str:ItemName]
                     put:[factoryObj
                          createInterfaceFor:ItemId
                                    itemType:itemType
                                  itemSource:itemSource
                                    currency:currency
                                  anchorDate:[CharString str:Date]
                          exchangeRateItemID:xRate
                              databaseServer:databaseServer]];
##       }

[statusMonitor normalStatus];

      return (int) dictionary;
##    }


## int GenerateNewItem (aDataItem, itemName)
```

```
    id   aDataItem;
##  char *itemName;

##  {
##   int    existingID, candidateID, newItemID, error;
##   char   existingName [40];
##   int    exchangeRateItemID;
##   char   *formatStr;
     int    numberOfTries;
     BOOL   nameAlreadyTaken = NO,
            successful = NO;

[statusMonitor ingres];
     for (numberOfTries = 0;
          (numberOfTries <= 5) && (!successful); numberOfTries++)
        {
         if ([aDataItem source] == SOURCE_USER)
            candidateID = 32000;
         else
            candidateID = 1;

##       retrieve (existingID = itm.itm, existingName = itm.sname)
##          {
             ZAP_TRAILING_SPACES (existingName);

             if (!_dictcmp(existingName,itemName))
                {
                 nameAlreadyTaken = YES;
##               endretrieve
                }

             if ([aDataItem source] == SOURCE_USER)
                {
                 if ((existingID >= 15000) &&
                     (existingID <= candidateID))
                   candidateID = existingID - 1;
                }
            else
                {
                 if ((existingID < 15000) &&
                     (existingID >= candidateID))
                   candidateID = existingID + 1;
                }
##          }

        if (nameAlreadyTaken)
          return NO;

##      inquire_equel (error = errorno)

        if (error > 0)
           continue;

        newItemID = candidateID;

        if ([aDataItem itemType] == NUMERIC_TYPE)
           formatStr = "float4";
        else
           formatStr = "text(50)";

        exchangeRateItemID = [aDataItem exchangeRateItemID];
```

```
##       append to itm (itm    = newItemID,
##                       sname  = itemName,
##                       lname  = itemName,
##                       format = formatStr,
##                       exrate_itm = exchangeRateItemID)

##       inquire_equel (error = errorno)

         if (error > 0)
            continue;

         [aDataItem itemID:newItemID];

         successful = YES;
        }
[statusMonitor normalStatus];

      return successful;
##    }



## int UpdateItemDefinition (aDataItem)

    id   aDataItem;

##   {
##    int    error;
##    char   *anchorDateSTR;
##    int    anchorSeq;
##    int    itemID;
      int    numberOfTries;
      BOOL   successful = NO;
      id     anchorDate;

[statusMonitor ingres];

      for (numberOfTries = 0;
           (numberOfTries <= 5) && (!successful); numberOfTries++)
        {
         if (anchorDate = [aDataItem anchorDate])
            {
             anchorDateSTR = [anchorDate str];

             /* hack hack */
             switch ([aDataItem seqNoTable])
               {
                case 5:
                     anchorSeq=LookupSequenceNumber("all_days",anchorDateSTR);
                     break;
                case 6:
                     anchorSeq=LookupSequenceNumber("trd_days",anchorDateSTR);
                     break;
                case 7:
                     anchorSeq=LookupSequenceNumber("mnthend_days",anchorDateSTR);
                     break;
               }
            }
         else
            {
             anchorDateSTR = "";
             anchorSeq = 0;
            }
```

```
        itemID = [aDataItem itemID];

##      replace itm (anchor_date = anchorDateSTR, anchor_seq = anchorSeq)
##   .      where itm.itm = itemID

##      inquire_equel (error = errorno)

        if (error > 0)
           continue;

        successful = YES;
       }

[statusMonitor normalStatus];

     return successful;
##   }

## int DeleteItemDefinition (itemID)

## int itemID;

##   {
##    int    error;
      int    numberOfTries;
      BOOL   successful = NO;

[statusMonitor ingres];

     for (numberOfTries = 0;
          (numberOfTries <= 5) && (!successful); numberOfTries++)
       {
##      delete itm where itm.itm = itemID

##      inquire_equel (error = errorno)

        if (error > 0)
           continue;

        successful = YES;
       }

[statusMonitor normalStatus];

     return successful;
##   }


## int DeleteTableMapInfo (itemID)

## int itemID;

##   {
##    int    error;
      int    numberOfTries;
      BOOL   successful = NO;

[statusMonitor ingres];

     for (numberOfTries = 0;
          (numberOfTries <= 5) && (!successful); numberOfTries++)
       {
```

```
##        delete itm_tbl_map where itm_tbl_map.itm = itemID

##        inquire_equel (error = errorno)

          if (error > 0)
             continue;

          successful = YES;
         }

 [statusMonitor normalStatus];

      return successful;
 ##   }



 ## int RetrieveTableNames ()
 ##   {
 ##    int     TableNumber;
 ##    char    TableName [40];
       id      tableNames = [OrdCltn new:0];

 [statusMonitor ingres];

 ##    range of rec is tbl

       [tableNames add:[CharString str:"the bad guy"]];

 ##    retrieve (TableNumber = rec.tbl_id, TableName = rec.tbl_name)
 ##       {
           if (TableNumber != [tableNames size])
             {
              printf ("bad table numbering sequence!!");
              return 0;
             }

           ZAP_TRAILING_SPACES (TableName);

           [tableNames add:[CharString str:TableName]];
 ##       }

 [statusMonitor normalStatus];

       return (int) tableNames;
 ##   }



 ## int RetrieveTableMapInfo (aDataItem)

 id aDataItem;

 ##   {
 ##    int ItemID;
 ##    int group1, group2,
 ##        snpc, seqNoTable, dataTable;
       id  tableMap;

 [statusMonitor ingres];
```

```
     ItemID = [aDataItem itemID];

     tableMap = [BM_TableMap nRows:NUMBER_OF_GROUPS
                         nColumns:NUMBER_OF_PERIODICITIES fillWith:NO_TABLE];

##   range of rec is itm_tbl_map

##   retrieve (group1 = rec.grp, group2 = rec.pcity,
##             snpc = rec.seq_period, seqNoTable = rec.date_tbl,
##             dataTable = rec.data_tbl)
##      where rec.itm = ItemID
##      {
        /* look here!!!! */

        if (group2 == 0)
           snpc = 100000;

        [tableMap numberAt:[tableMap offsetFromRow:group1 Col:group2]
                      put:(NUMBER)dataTable];
        [aDataItem physicalTableMap:tableMap];
        [aDataItem seqNosPerColumn:snpc];
        [aDataItem seqNoTable:seqNoTable];
##      }


[statusMonitor normalStatus];
##  }



## int WriteTableMapInfo (aDataItem)

id aDataItem;

##  {
##   int      ItemID, rowsAffected, seqNoTable, tableNumber,
##            row, col, snpc, error;
     NUMBER   dataTable;
     id       tableMap;
     int      numberOfTries;
     BOOL     successful = NO;

[statusMonitor ingres];

     ItemID     = [aDataItem itemID];
     tableMap   = [aDataItem physicalTableMap];
     snpc       = [aDataItem seqNosPerColumn];
     seqNoTable = [aDataItem seqNoTable];

     for (row = 0; row < [tableMap nRows]; row++)
        for (col = 0; col < [tableMap nColumns]; col++)
           {
            dataTable = [tableMap numberAtRow:(unsigned)row
                                          Col:(unsigned)col];

            if (dataTable != NO_TABLE)
               {
                tableNumber = (int) dataTable;

                successful = NO;
```

```
                for (numberOfTries = 0;
                     (numberOfTries <= 5) && (!successful); numberOfTries++)
                   {
##                  replace itm_tbl_map (seq_period = snpc,
##                                       date_tbl   = seqNoTable,
##                                       data_tbl   = tableNumber)
##                     where itm_tbl_map.itm = ItemID and
##                           itm_tbl_map.grp = row and
##                           itm_tbl_map.pcity = col

##                  inquire_equel (error = errorno, rowsAffected = rowcount)

                    if (error > 0)
                       continue;

                    if (rowsAffected <= 0)
                       {
##                      append to itm_tbl_map
##                                (itm       = ItemID,
##                                 grp       = row,
##                                 seq_period = snpc,
##                                 pcity     = col,
##                                 date_tbl = seqNoTable,
##                                 data_tbl = tableNumber)

##                      inquire_equel (error = errorno,
##                                     rowsAffected = rowcount)

                        if (error > 0)
                           continue;

                        if (rowsAffected > 0)
                           successful = YES;
                       }
                    else
                       successful = YES;
                   }
             }
          }

[statusMonitor normalStatus];

      return successful;
##   }



int ProcessNumericRow (entityID, seqNo, value, entityMap,
                       fromSequence, toSequence, seqNosPerColumn,
                       aMatrix, overWriteExistingValue)
int     entityID;
int     seqNo;
double value;
id      entityMap;
int     seqNosPerColumn;
int     fromSequence;
int     toSequence;
id      aMatrix;
BOOL    overWriteExistingValue;

  {
   unsigned row = (entityID == -1)?0:
                            OrdinalValueFromEntityID(entityMap,entityID);
```

```
   unsigned col = SeqNoIntervalWidth (fromSequence, seqNo, seqNosPerColumn)-1;

   unsigned offset = SeqNoIntervalWidth
                    (fromSequence, toSequence, seqNosPerColumn) * row + col;

   if ((row != (unsigned)-1) &&
      ((overWriteExistingValue) || (![aMatrix getFlagValue:offset])))
     {
      [aMatrix numberAt:offset put:value];
     }
  }



int ProcessStringRow (entityID, seqNo, string, entityMap,
                      fromSequence, toSequence, seqNosPerColumn,
                      aStringMatrix, overWriteExistingValue)
int    entityID;
int    seqNo;
char   *string;
id     entityMap;
int    seqNosPerColumn;
int    fromSequence;
int    toSequence;
id     aStringMatrix;
BOOL   overWriteExistingValue;

  {
   unsigned row = (entityID == -1)?0:
                               OrdinalValueFromEntityID(entityMap,entityID);
   unsigned col = SeqNoIntervalWidth (fromSequence, seqNo, seqNosPerColumn)-1;

   unsigned offset = SeqNoIntervalWidth
                    (fromSequence, toSequence, seqNosPerColumn) * row + col;
   ZAP_TRAILING_SPACES (string);

   if ((row != (unsigned)-1) &&
      ((overWriteExistingValue) || ([aStringMatrix at:offset] == nil)))
     [aStringMatrix at:offset put:[CharString str:string]];
  }



## int RetrieveItemForAllEntities (TableName,
                                   Item,
                                   entityMap,
                                   xRateTableName,
                                   xRateItem,
                                   nRows,
                                   seqNosPerColumn,
                                   fromSequence, toSequence)
## char   *TableName;
## int    Item;
## int    entityMap;
## char   *xRateTableName;
## int    xRateItem;
## int    nRows;
## int    seqNosPerColumn;
## int    fromSequence;
## int    toSequence;
```

```
##    {
##     int    seqNo;
##     int    entityID;
##     double val;
##     int    error;
       id     matrix;


 [statusMonitor ingres];

     matrix = [BM_Matrix nRows:nRows nColumns:SeqNoIntervalWidth
                              (fromSequence, toSequence, seqNosPerColumn)];

     if ((!TableName) || (xRateItem && !xRateTableName))
        return (int) matrix;

##   range of rec is TableName
##   inquire_equel (error = errorno)

     if (error != 0)
        return (int) matrix;

     if (xRateItem != 0)
##      retrieve (entityID = rec.entid, seqNo = rec.date_seq,
##               val = rec.value/xRateTableName.value)
##         where rec.itm = Item and
##               rec.currency = xRateTableName.entid and
##               rec.date_seq >  fromSequence and
##               rec.date_seq <= toSequence and
##               xRateTableName.date_seq = rec.date_seq and
##               xRateTableName.itm = xRateItem
##         {
          ProcessNumericRow(entityID, seqNo, val, entityMap,
                            fromSequence, toSequence, seqNosPerColumn,
                            matrix, YES);
##         }
     else
##      retrieve (entityID = rec.entid, seqNo = rec.date_seq, val = rec.value)
##         where rec.itm  = Item and
##               rec.date_seq >  fromSequence and
##               rec.date_seq <= toSequence
##         {
          ProcessNumericRow(entityID, seqNo, val, entityMap,
                            fromSequence, toSequence, seqNosPerColumn,
                            matrix, YES);
##         }

 [statusMonitor normalStatus];

     return (int) matrix;
##   }



## int RetrieveItemForOneEntity (TableName,
                                 EntityID,
                                 Item,
                                 entityMap,
                                 xRateTableName,
                                 xRateItem,
                                 seqNosPerColumn,
                                 fromSequence, toSequence)
```

```
## char    *TableName;
## int     EntityID;
## int     Item;
## int     entityMap;
## char    *xRateTableName;
## int     xRateItem;
## int     seqNosPerColumn;
## int     fromSequence;
## int     toSequence;

##   {
##     int      seqNo;
##     double   val;
##     int      error;
       id       matrix;

[statusMonitor ingres];

     matrix = [BM_Matrix nRows:1 nColumns:SeqNoIntervalWidth
                              (fromSequence, toSequence, seqNosPerColumn)];

     if ((!TableName) || (xRateItem && !xRateTableName))
        return (int) matrix;

##     range of rec is TableName
##     inquire_equel (error = errorno)

     if (error != 0)
        return (int) matrix;
     if (xRateItem != 0)
##      retrieve (seqNo = rec.date_seq,
##               val = rec.value / xRateTableName.value)
##         where rec.itm = Item and
##               rec.entid = EntityID and
##               rec.currency = xRateTableName.entid and
##               rec.date_seq >  fromSequence and
##               rec.date_seq <= toSequence and
##               xRateTableName.date_seq = rec.date_seq and
##               xRateTableName.itm = xRateItem
##         {
          ProcessNumericRow(-1, seqNo, val, entityMap,
                          fromSequence, toSequence, seqNosPerColumn,
                          matrix, YES);
##         }
     else
##      retrieve (seqNo = rec.date_seq, val = rec.value)
##         where rec.itm = Item and
##               rec.entid = EntityID and
##               rec.date_seq >  fromSequence and
##               rec.date_seq <= toSequence
##         {
          ProcessNumericRow(-1, seqNo, val, entityMap,
                          fromSequence, toSequence, seqNosPerColumn,
                          matrix, YES);
##         }

[statusMonitor normalStatus];

     return (int) matrix;
##   }
```

```
## int RetrieveStringItemForAllEntities (TableName,
                                        Item,
                                        entityMap,
                                        dummy1,
                                        dummy2,
                                        nRows,
                                        seqNosPerColumn,
                                        fromSequence, toSequence)

## char   *TableName;
## int    Item;
## int    entityMap;
## char   *dummy1;
## int    dummy2;
## int    seqNosPerColumn;
## int    nRows;
## int    fromSequence;
## int    toSequence;

##   {
##    int  seqNo;
##    int  entityID;
##    char val [200];
##    int  error;
      int  row = 0;
      int  col = 0;
      int  offset = 0;
      id   stringMatrix;

[statusMonitor ingres];
      stringMatrix =
           [BM_StringMatrix nRows:nRows nColumns:SeqNoIntervalWidth
                             (fromSequence, toSequence, seqNosPerColumn)];
      if (!TableName)
         return (int) stringMatrix;

##    range of rec is TableName
##    inquire_equel (error = errorno)

      if (error != 0)
         return (int) stringMatrix;

##    retrieve (entityID = rec.entid, seqNo = rec.date_seq, val = rec.value)
##       where rec.itm  = Item and
##             rec.date_seq >  fromSequence and
##             rec.date_seq <= toSequence
##       {
          ProcessStringRow (entityID, seqNo, val, entityMap,
                         fromSequence, toSequence, seqNosPerColumn,
                         stringMatrix, YES);
##       }

[statusMonitor normalStatus];

     return (int) stringMatrix;
##   }



## int RetrieveStringItemForOneEntity (TableName,
                                      EntityID,
                                      Item,
```

```
                                        entityMap,
                                        dummy1,
                                        dummy2,
                                        seqNosPerColumn,
                                        fromSequence, toSequence)

## char   *TableName;
## int    EntityID;
## int    Item;
## int    entityMap;
## char   *dummy1;
## int    dummy2;
## int    seqNosPerColumn;
## int    fromSequence;
## int    toSequence;

##   {
##    int  seqNo;
##    char val [200];
##    int  error;
      int  col = 0;
      id   stringMatrix;

[statusMonitor ingres];

     stringMatrix =
          [BM_StringMatrix nRows:1 nColumns:SeqNoIntervalWidth
                          (fromSequence, toSequence, seqNosPerColumn)];
     if (!stringMatrix)
        return (int) stringMatrix;

##    range of rec is TableName
##    inquire_equel (error = errorno)
      if (error != 0)
        return (int) stringMatrix;

##    retrieve (seqNo = rec.date_seq, val = rec.value)
##       where rec.itm  = Item and
##             rec.entid = EntityID and
##             rec.date_seq >  fromSequence and
##             rec.date_seq <= toSequence
##       {
         ProcessStringRow (-1, seqNo, val, entityMap,
                          fromSequence, toSequence, seqNosPerColumn,
                          stringMatrix, YES);
##       }

[statusMonitor normalStatus];

      return (int) stringMatrix;
##   }


## int DeleteItem (TableName, Item)

## char   *TableName;
## int    Item;

##   {
##    int error;

##    range of rec is TableName
##    inquire_equel (error = errorno)
```

```
      if (error == 0)
##        delete rec where rec.itm = Item
##    }



## int WriteStringItemForAllEntities (TableName,
                                      Item,
                                      entityMap,
                                      seqNosPerColumn,
                                      lastSeqNo,
                                      aStringMatrix)
## char   *TableName;
## int    Item;
## int    entityMap;
## int    seqNosPerColumn;
## int    lastSeqNo;
## int    aStringMatrix;

##    {
##     int    entityID;
##     int    seqNo;
##     char   val [200];
##     int    row    = 0;
##     int    col    = 0;
##     int    offset = 0;
##     int    nCols  = [(id)aStringMatrix nColumns];
##     char   *str;
##     int    error;
##     int    sourceCode =
                 databaseMaintenanceMode?SOURCE_BIS_MAINTENANCE:SOURCE_USER;
##     int    firstSeqNo;
##     char   table [MAX_TABLE_NAME_LENGTH*2];

[statusMonitor ingres];

     if (!TableName)
        return (int) nil;

     if (databaseMaintenanceMode)
        strcpy (table, "a_");
     else
        table [0] = 0;

     strcat (table, TableName);

     table [MAX_TABLE_NAME_LENGTH] = 0;


     firstSeqNo = lastSeqNo-((nCols-1)*seqNosPerColumn);

##   range of rec is table

##   inquire_equel (error = errorno)

     if (error != 0)
##      create table (entid=i2,date_seq=i2,itm=i2,value=text(50),src=i2)
     else
        {
##       retrieve (entityID = rec.entid, seqNo = rec.date_seq, val = rec.value)
##          where rec.itm = Item and
##                rec.date_seq >= firstSeqNo and
##                rec.date_seq <= lastSeqNo
```

```
##          {
             ProcessStringRow (entityID, seqNo, val, entityMap,
                               firstSeqNo-1, lastSeqNo, seqNosPerColumn,
                               (id)aStringMatrix, NO);
##          }

##       delete rec
##          where rec.itm  = Item and
##                rec.date_seq >= firstSeqNo and
##                rec.date_seq <= lastSeqNo
       }

     for (col = 0; col < nCols; col++)
        for (entityID = 0; entityID < [(id)entityMap size]; entityID++)
          {
           row = OrdinalValueFromEntityID (entityMap, entityID);

           if (row == -1)
              continue;

           offset = [(id)aStringMatrix offsetFromRow:row Col:col];

           seqNo = lastSeqNo-(nCols-1-col)*seqNosPerColumn;

           if ((str = [[(id)aStringMatrix at:offset] str]) != (char *)nil)
##            append to table
##                         (entid    = entityID,
##                          itm      = Item,
##                          date_seq = seqNo,
##                          value    = str,
##                          src      = sourceCode)
          }

[statusMonitor normalStatus];
##   }
## int WriteItemForAllEntities (TableName,
                                Item,
                                entityMap,
                                seqNosPerColumn,
                                lastSeqNo,
                                aMatrix)
## char   *TableName;
## int    Item;
## int    entityMap;
## int    seqNosPerColumn;
## int    lastSeqNo;
## int    aMatrix;

##   {
##    int    seqNo;
##    int    entityID;
##    double val;
##    int    reportingCurrency;
##    int    row    = 0;
##    int    col    = 0;
##    int    offset = 0;
##    int    nCols  = [(id)aMatrix nColumns];
##    int    error;
##    int    rowsAffected;
##    int    sourceCode =
                databaseMaintenanceMode?SOURCE_BIS_MAINTENANCE:SOURCE_USER;
##    int    firstSeqNo;
##    char   table [MAX_TABLE_NAME_LENGTH*2];
```

```
[statusMonitor ingres];

     if (!TableName)
        return (int) nil;

     if (databaseMaintenanceMode)
        strcpy (table, "a_");
     else
        table [0] = 0;

     strcat (table, TableName);

     table [MAX_TABLE_NAME_LENGTH] = 0;


     firstSeqNo = lastSeqNo-((nCols-1)*seqNosPerColumn);


##   range of rec is table

##   inquire_equel (error = errorno)

     if (error != 0)
##      create table (entid=i2,date_seq=i2,itm=i2,value=f4,
##                    src=i2,currency=i2)
     else
        {
##       retrieve (entityID = rec.entid, seqNo = rec.date_seq, val = rec.value)
##          where rec.itm  = Item and
##                rec.date_seq >= firstSeqNo and
##                rec.date_seq <= lastSeqNo
##          {
             ProcessNumericRow(entityID, seqNo, val, entityMap,
                               (id)aMatrix);
##          }


##       delete rec
##          where rec.itm  = Item and
##                rec.date_seq >= firstSeqNo and
##                rec.date_seq <= lastSeqNo
        }

     for (col = 0; col < nCols; col++)
        for (entityID = 0; entityID < [(id)entityMap size]; entityID++)
           {
            row = OrdinalValueFromEntityID (entityMap, entityID);
            reportingCurrency =
                  ReportingCurrencyFromEntityID (entityMap, entityID);

            if (row == -1)
               continue;

            offset = [(id)aMatrix offsetFromRow:row Col:col];

            seqNo = lastSeqNo-(nCols-1-col)*seqNosPerColumn;
            val   = [(id)aMatrix numberAt:offset];

            if ([(id)aMatrix getFlagValue:offset])
##             append to table
##                       (entid    = entityID,
##                        itm      = Item,
##                        date_seq = seqNo,
```

```
##                              value    = val,
##                              src      = sourceCode,
##                              currency = reportingCurrency)
        }

[statusMonitor normalStatus];
##   }



extern char *MonthToString ();


## int LookupDate (TableName, SequenceNumber)

## char *TableName;
## int  SequenceNumber;

##   {
##    char str [30];
      int  day, month, year;
      char *monthStr;

      SetStartYear(seqNoStartYear);

      if (!strcmp(TableName,"mnthend_days"))
         MonthlySequenceDate (SequenceNumber, &day, &month, &year);
      else
         if (!strcmp(TableName,"trd_days"))
            TradeDaysSequenceDate (SequenceNumber, &day, &month, &year);
         else
            if (!strcmp(TableName,"all_days"))
               AllDaysSequenceDate (SequenceNumber, &day, &month, &year);
      if (monthStr = MonthToString(m     ))
         sprintf (str, "%d\-%s\-%d", day, monthStr, year);
      else
         sprintf (str, "bad date");

      CAPITALIZE_DATE (str);

/*
..    range of rec is TableName

..    retrieve (str = rec.day) where rec.date_seq = SequenceNumber

      ZAP_TRAILING_SPACES (str);
      CAPITALIZE_DATE (str);
*/
      return (int) [CharString str:str];
##   }


## int LookupSequenceNumber (TableName, Date)

## char *TableName;
## char *Date;

##   {
##    int seqNo = 0;
##    char monthStr [4],
##         truncDate [40];
      int  day, month, year;
```

```
     SetStartYear(seqNoStartYear);

     if (!strcmp(TableName,"mnthend_days"))
##      retrieve (truncDate = date_trunc("months",date(Date)))
     else
        strcpy (truncDate, Date);

     sscanf (truncDate, "%d\-%c%c%c\-%d", &day, monthStr,
                                          monthStr+1,
                                          monthStr+2, &year);
     monthStr[3] = '\0';

     if ((month = StringToMonth (monthStr)) == -1)
        return 0;

     if (!strcmp(TableName,"mnthend_days"))
        seqNo = MonthlySequenceNumber (day, month, year);
     else
        if (!strcmp(TableName,"trd_days"))
           seqNo = TradeDaysSequenceNumber (day, month, year);
        else
           seqNo = AllDaysSequenceNumber (day, month, year);

/*
..   range of rec is TableName

     if (!strcmp(TableName,"mnthend_days"))
..      retrieve (seqNo = max (rec.date_seq where date_trunc("months",rec.day)
..                             <= date_trunc("months",date(Date))))
..   else
..      retrieve (seqNo = max (rec.date_seq where rec.day <= date(Date)))
*/

     return seqNo;
##   }

## int SubtractIntervalFromDate (Date, intervalLength, IntervalPeriod)

## char *Date;
## int  IntervalLength;
## char *IntervalPeriod;

##   {
##   int  error;
##   char earlyDate [30];

##   retrieve (earlyDate = (date (Date) - concat (ascii(IntervalLength),
##                                               IntervalPeriod)));

##   inquire_equel (error = errorno)
     if (error != 0)
        return (int) nil;

     ZAP_TRAILING_SPACES (earlyDate);
     CAPITALIZE_DATE (earlyDate);

     return (int) [CharString str:earlyDate];
##   }


## int DateIntervalWidth (Interval, Units)

## char *Interval;
## char *Units;
```

```
##   {
##    double width;

##    retrieve (width = interval (Units, date (Interval)))

      return (int) ROUND(width);
##   }


## int CompareDates (Date1, Date2)

## char *Date1;
## char *Date2;

##   {
##    double width;

##    retrieve (width = interval ("days", date (Date1) - date (Date2)))

      return (int) ROUND(width);
##   }



## int CleanTemporaryTable (TableName)

## char *TableName;

##   {
##    int error;

##    range of rec is TableName
##    inquire_equel (error = errorno)
      if (error == 0)
##       delete rec
##   }


## int DestroyTemporaryTable (TableName)

## char *TableName;

##   {
##    int error;

##    range of rec is TableName
##    inquire_equel (error = errorno)
      if (error == 0)
##       destroy TableName

##   }

/*==================== DO NOT REMOVE    EDIT ============================

       This comment and the following sccsId declaration are managed
       by SCCS for you. Do not edit or remove either.

       Source file:     %F%
       Latest version:  %I%
       Last mod time:   %H% at %U%
```

```
=========================================================================*/

static char *sccsId = "%Z%%M% rev %I% created on %H% at %U%";

/*===================== DO NOT REMOVE OR EDIT ===========================*/

#include "batterymarch.h"
#include "objc.h"
#include "uil.h"

= BM_AbsDateConst : BM_Identifier (BMPARSE)
{
}

-(STR)nodeNameText { return "AbsDateConst ";}

-BMinterface(BS_AbsDateConst)
=:

/*===================== DO NOT REMOVE   EDIT ============================

        This comment and the following sccsId declaration are managed
        by SCCS for you. Do not edit or remove either.

        Source file:    /users/bmw/Alpha/VRL/SCCS/s.BM_AexList.m
        Latest version: 1.2
        Last mod time:  03/06/89 at 22:02:32

=========================================================================*/

static char *sccsId = "@(#)BM_AexList.m rev 1.2 created on 03/06/89 at 22:02:32";

/*===================== DO NOT REMOVE OR EDIT ===========================*/

#include "batterymarch.h"
#include "objc.h"
#include "uil.h"


= BM_ArithExprList : BM_BinaryParseTreeNode (BMPARSE)
{
}

-(STR)nodeName
{
    return "ArithExprList";
}

-BMinterface(BS_ArithExprList)

-(int)positionals { return [self nPositionals]; }

-(int)nPositionals
{
    return [[self leftNode] nPositionals] + [[self rightNode] nPositionals];
}

-dataValueAtArg:(int)position
{
    id left, right;
    int leftCnt;

    left = [self at:0]; right = [self at:1];
```

```
   leftCnt = [left nPositionals];

   return (position < leftCnt) ? [left dataValueAt:position] :
      [right dataValueAt:(position-leftCnt)];
}

-dataValueAt:(int)position { return [self dataValueAtArg:position]; }


-listOn:nodeText
	{
	[[children at:0] listOn:nodeText];

	if ([children at:1])
	{
		[nodeText concatSTR:","];
		[[children at:1] listOn:nodeText];
	}

	return nodeText;
	}
=:

/*===================== DO NOT REMOVE    EDIT ==============================

	This comment and the following sccsId declaration are managed
	by SCCS for you. Do not edit or remove either.

	Source file:    /users/bmw/Alpha/VRL/SCCS/s.BM_ArithDIV.m
	Latest version:  1.2
	Last mod time:   03/06/89 at 21:59:07

==========================================================================*/

static char *sccsId = "@(#)BM_ArithDIV.m rev 1.2 created on 03/06/89 at 21:59:07";

/*===================== DO NOT REMOVE OR EDIT ===========================*/

#include "batterymarch.h"
#include "objc.h"
#include "uil.h"

= BM_ArithDIV : BM_BinaryFunctionParseTreeNode (BMPARSE)
{
}

-(STR)nodeName
{
    return "/";
}

-(STR)identifierSTR
{
    return "div";
}

-BMinterface(BS_ArithDIV)
=:
```

```
/*==================== DO NOT REMOVE   EDIT ============================

        This comment and the following sccsId declaration are managed
        by SCCS for you. Do not edit or remove either.

        Source file:     /users/bmw/Alpha/VRL/SCCS/s.BM_Fnctn_DEC.m
        Latest version:  1.3
        Last mod time:   04/11/89 at 17:11:42

=====================================================================*/

static char *sccsId = "@(#)BM_Fnctn_DEC.m rev 1.3 created on 04/11/89 at 17:11:42";

/*==================== DO NOT REMOVE OR EDIT ==========================*/


#include "objc.h"
#include "BMWGlobal.h"

@requires BM_Matrix, CharString;

= BM_Fnctn_DEC: BM_StatisticalFunction (BM_WorkstationMsgs, Collection, Primitive)
   {
   }

   -(STR)functionNameSTR
     {
      return "Decile";
     }

   -(unsigned)nUnnamedArgsRequired
     {
      return 1;
     }

   -computeWith:arg weights:weights
     {
      return [arg quantile:0.1 weights:weights];
     }


=:

/*==================== DO NOT REMOVE   EDIT ============================

        This comment and the following sccsId declaration are managed
        by SCCS for you. Do not edit or remove either.

        Source file:     /users/bmw/Alpha/VRL/SCCS/s.BM_ArithFn.m
        Latest version:  1.3
        Last mod time:   04/11/89 at 19:10:53

=====================================================================*/

static char *sccsId = "@(#)BM_ArithFn.m rev 1.3 created on 04/11/89 at 19:10:53";

/*==================== DO NOT REMOVE OR EDIT ==========================*/


#include "objc.h"
#include "uil.h"

#include "BMWGlobal.h"
```

```
@requires BM_StringMatrix, BM_Matrix;

= BM_ArithmeticFunction: BM_Function (BM_WorkstationMsgs, Collection, Primitive)
  {
  }

  -evaluate:argList
    {
     id arg1, arg2;

     if ([self checkArgs:argList])
        switch ([self nUnnamedArgsRequired])
          {
           case 1: return [self
                      checkTypesAndComputeWith:[argList dataValueAtArg:0]:nil];
           case 2: return [self
                      checkTypesAndComputeWith:[argList dataValueAtArg:0]:
                                              [argList dataValueAtArg:1]];
           case VARIABLE_NARGS:
             {
              id  result, temp;
              int index,
                  argCount = (int) [argList positionals];

              result = [argList dataValueAtArg:0];

              for (index = 1; index < argCount; index++)
                 result = [self checkTypesAndComputeWith:result:
                                              [argList dataValueAtArg:index]];
              return result;
             }
          }

     return nil;
    }

  -namedArgsSupported
    {
     return nil;
    }

  -(unsigned)nUnnamedArgsRequired
    {
     /* subclass responsibility */
    }

  -(unsigned)typeOfArgsRequired
    {
     return NUMERIC_TYPE;
    }


  -checkTypesAndComputeWith:arg1:arg2
    {
     if ((([self typeOfArgsRequired] == ANY_TYPE) &&
          ((arg2 == nil) ||
           ([arg2 class] == [arg1 class]))) ||
        ((arg1 == nil) ||
         (([arg1 isMemberOf:BM_Matrix]) &&
          ([self typeOfArgsRequired] == NUMERIC_TYPE)) ||
         (([arg1 isMemberOf:BM_StringMatrix]) &&
          ([self typeOfArgsRequired] == STRING_TYPE))) &&
        ((arg2 == nil) ||
```

```
        (([arg2 isMemberOf:BM_Matrix]) &&
         ([self typeOfArgsRequired] == NUMERIC_TYPE)) ||
        (([arg2 isMemberOf:BM_StringMatrix]) &&
         ([self typeOfArgsRequired] == STRING_TYPE))))
      return [self computeWith:arg1:arg2];
   else
      return nil;
   }


-computeWith:arg1:arg2
   {
    /* subclass responsibility */
   }

=:

/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BM_ArithMIN.m
        Latest version:  1.2
        Last mod time:   03/06/89 at 22:00:09

=====================================================================*/

static char *sccsId = "@(#)BM_ArithMIN.m rev 1.2 created on 03/06/89 at 22:00:09";

/*===================== DO NOT REMOVE OR EDIT ==========================*/

#include "batterymarch.h"
#include "objc.h"
#include "uil.h"

= BM_ArithMIN : BM_BinaryFunctionParseTreeNode (BMPARSE)
{
}

-(STR)nodeName
{
   return "-";
}

-(STR)identifierSTR
{
   return "sub";
}

-BMinterface(BS_ArithMIN)
=:

/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BM_ArithPLS.m
        Latest version:  1.2
        Last mod time:   03/06/89 at 21:55:27
```

```
=========================================================================*/

static char *sccsId = "@(#)BM_ArithPLS.m rev 1.2 created on 03/06/89 at 21:55:27";

/*===================== DO NOT REMOVE OR EDIT ===========================*/

#include "batterymarch.h"
#include "objc.h"
#include "uil.h"

= BM_ArithPLS : BM_BinaryFunctionParseTreeNode (BMPARSE)
{
}

-(STR)nodeName
{
    return "+";
}

-(STR)identifierSTR
{
    return "add";
}

-BMinterface(BS_ArithPLS)
=:

/*===================== DO NOT REMOVE   . EDIT =============================

        This comment and the following sccsId declaration are managed
        by SCCS for you. Do not edit or remove either.

        Source file:     /users/bmw/Alpha/VRL/SCCS/s.BM_ArithPOW.m
        Latest version:  1.2
        Last mod time:   03/06/89 at 21:59:45

=========================================================================*/

static char *sccsId = "@(#)BM_ArithPOW.m rev 1.2 created on 03/06/89 at 21:59:45";

/*===================== DO NOT REMOVE OR EDIT ===========================*/

#include "batterymarch.h"
#include "objc.h"
#include "uil.h"

= BM_ArithPOW : BM_BinaryFunctionParseTreeNode (BMPARSE)
{
}

-(STR)nodeName
{
    return "^";
}

-(STR)identifierSTR
{
    return "pow";
}

-BMinterface(BS_ArithPOW)

=:
```

```
/*==================== DO NOT REMOVE    EDIT ============================

        This comment and the following sccsId declaration are managed
        by SCCS for you. Do not edit or remove either.

        Source file:     /users/bmw/Alpha/VRL/SCCS/s.BM_ArithTMS.m
        Latest version:  1.2
        Last mod time:   03/06/89 at 21:59:57

========================================================================*/

static char *sccsId = "@(#)BM_ArithTMS.m rev 1.2 created on 03/06/89 at 21:59:57";

/*==================== DO NOT REMOVE OR EDIT ===========================*/

#include "batterymarch.h"
#include "objc.h"
#include "uil.h"

= BM_ArithTMS : BM_BinaryFunctionParseTreeNode (BMPARSE)
{
}

-(STR)nodeName
{
    return "*";
}

-(STR)identifierSTR
{
    return "mult";
}

-BMinterface(BS_ArithTMS)

=:
/*==================== DO NOT REMOVE _.. EDIT ============================

        This comment and the following sccsId declaration are managed
        by SCCS for you. Do not edit or remove either.

        Source file:     /users/bmw/Alpha/VRL/SCCS/s.BM_AunMIN.m
        Latest version:  1.3
        Last mod time:   06/18/89 at 15:35:24

========================================================================*/

static char *sccsId = "@(#)BM_AunMIN.m rev 1.3 created on 06/18/89 at 15:35:24";

/*==================== DO NOT REMOVE OR EDIT ===========================*/

#include "batterymarch.h"
#include "objc.h"
#include "uil.h"

= BM_ArithUnaryMIN : BM_BinaryFunctionParseTreeNode (BMPARSE)
{
}

-(STR)nodeName
{
    return "-";
}
```

```
-(STR)identifierSTR
{
   return "neg";
}

-(int)positionals { return 1; }        // the number of args I present to
                                       // aFunctionServer

-BMinterface(BS_ArithUnaryMIN)



-listOn:nodeText
       {
       if ([self hasParentheses])
              [nodeText concatSTR:"("];
       [nodeText concatSTR:" -"];
       [[children at:0] listOn:nodeText];
       if ([self hasParentheses])
              [nodeText concatSTR:")"];
       return nodeText;
       }
=:

/*===================== DO NOT REMOVE .. EDIT ============================

       This comment and the following sccsId declaration are managed
       by SCCS for you. Do not edit or remove either.

       Source file:     /users/bmw/Alpha/VRL/SCCS/s.BM_Begin.m
       Latest version:  1.3
       Last mod time:   03/27/89 at 15:35:20

========================================================================*/

static char *sccsId = "@(#)BM_Begin.m rev 1.3 created on 03/27/89 at 15:35:20";

/*===================== DO NOT REMOVE OR EDIT ===========================*/

#include "batterymarch.h"
#include "objc.h"
#include "uil.h"

= BM_Begin : BM_Nonary (BMPARSE)
{
}

-(STR)nodeName
{
    return "Begin";
}

-BMinterface(BS_Begin)


-listOn:nodeText
       {
       [nodeText concatSTR:[self nodeName]];
       [nodeText concatSTR:"\n\n"];
       return nodeText;
       }
=:
```

```
/*===================== DO NOT REMOVE .. EDIT ==============================

        This comment and the following sccsId declaration are managed
        by SCCS for you. Do not edit or remove either.

        Source files:     /users/bmw/Alpha/VRL/SCCS/s.BM_BiFunc.m
        Latest version:   1.4
        Last mod time:    09/06/89 at 17:10:24

===========================================================================*/

static char *sccsId = "@(#)BM_BiFunc.m rev 1.4 created on 09/06/89 at 17:10:24";

/*==================== DO NOT REMOVE OR EDIT ===========================*/

#include "batterymarch.h"
#include "objc.h"
#include "uil.h"

@requires BM_CICharString;

= BM_BinaryFunctionParseTreeNode : BM_BinaryParseTreeNode (BMPARSE)
{
    id functionName;     // a CharString for this function -- should be
                         // a class variable
}

+new
{
    self = [super new];
    functionName = [BM_CICharString str:[self identifierSTR]];
    return self;
}

-terminate$
{
    [functionName free];
    return [super terminate$];
}

-(STR)identifierSTR      // returns a STR containing the name of the function
{
    [self subclassResponsibility];
}
-identifier { return functionName; }

-evaluate:aPsb
{
 if (![aPsb globalStatus])
 {
    [self evaluating:YES];

    [super evaluate:aPsb];       // this does the children
 }
 if (![aPsb globalStatus])
 {
  id v;

    [self value:v = [[psb functionServer] evaluate:self]];

    if (v == nil)
       [psb functionCallError];

    [self evaluating:NO];
```

```
    return v;
  }
  else
    return nil;
}

-(int)nPositionals { return 1; }       // the number of values I have

-(int)positionals { return 2; }        // the number of args I present to
                                       // aFunctionServer


// to get my value
-dataValueAt:(int)n { return (n==0) ? [self value] :
                                [self error:"requested arg not present!" ]; }


// set by aFunctionServer to get my args
-dataValueAtArg:(int)n
{
    return [[self at:n] value];
}



-listOn:nodeText
        {
        if ([self hasParentheses])
                [nodeText concatSTR:"("];
        [[children at:0] listOn:nodeText];
        [nodeText concatSTR:[self nodeName]];
        [[children at:1] listOn:nodeText];
        if ([self hasParentheses])
                [nodeText concatSTR:")"];
        return nodeText;
        }

=:

/*===================== DO NOT REMOVL  . EDIT ============================

        This comment and the following sccsId declaration are managed
        by SCCS for you. Do not edit or remove either.

        Source file:     /users/bmw/Alpha/VRL/SCCS/s.BM_BpTnode.m
        Latest version:  1.4
        Last mod time:   04/11/89 at 19:19:42

========================================================================*/

static char *sccsId = "@(#)BM_BpTnode.m rev 1.4 created on 04/11/89 at 19:19:42";

/*===================== DO NOT REMOVE OR EDIT ==========================*/

#include "batterymarch.h"
#include "objc.h"
#include "uil.h"

= BM_BinaryParseTreeNode : BM_ParseTreeNode (BMPARSE)
{
}

+(int)defaultChildren { return 2;}
```

```
+leftNode:node1 rightNode:node2
{
    self = [self new];
    return [[self leftNode:node1] rightNode:node2];
}

+node:aNode
{
    self = [self new];
    return [self leftNode:aNode];
}

-leftNode { return [children at:0]; }
-rightNode { return [children at:1]; }
-leftNode:aNode { [children at:0 put:aNode]; return self;}
-rightNode:aNode { [children at:1 put:aNode]; return self;}

-(BOOL)checkSemantics:psb
{
    BOOL error;
    error = [super checkSemantics:psb];
    return error;
}

=:

/*===================== DO NOT REMOV    EDIT ============================

        This comment and the following sccsId declaration are managed
        by SCCS for you. Do not edit or remove either.

        Source file:     %F%
        Latest version:  %I%
        Last mod time:   %H% at %U%

=====================================================================*/

static char *sccsId = "%Z%%M% rev %I% created on %H% at %U%";

/*===================== DO NOT REMOVE OR EDIT ===========================*/

#include "batterymarch.h"
#include "objc.h"
#include "uil.h"

= BM_Continue : BM_UnaryParseTreeNode (BMPARSE)
{
}

-(STR)nodeName
{
    return "Continue ";
}

-BMinterface(BS_Continue)
=:

/*===================== DO NOT REMOV    EDIT ============================

        This comment and the following sccsId declaration are managed
        by SCCS for you. Do not edit or remove either.

        Source file:     %F%
        Latest version:  %I%
        Last mod time:   %H% at %U%
```

```
=========================================================================*/

static char *sccsId = "@(#)BM_CurCon.m work in progress by bmw";

/*===================== DO NOT REMOVE OR EDIT ============================*/

#include <stdio.h>
#include "batterymarch.h"
#include "objc.h"
#include "uil.h"

#include <math.h>

@requires CharString;


#define ROUND(f) fmod(f)>0.5? ceil(f*100000.0)/100000.0: \
                            floor(f*100000.0)/100000.0


= BM_CurrencyConst : BM_Identifier (BMPARSE)
{
   double number;      // the numeric part of the constant
}

+units:(STR)ident string:(STR)aStr
{
    self = [super str:ident];
    number = atof(number);
    number = ROUND(number);
    return self;
}

-BMinterface(BS_CurrencyConst)

-units:(STR)ident
{
    name = [name free];
    name = [CharString str:ident];
    return self;
}

-units { return name; }

-string:(STR)aStr
{
    number = atof(aStr);
    number = ROUND(number);
    return self;
}

-evaluate:aPsb
{
 id v;

 if (![aPsb globalStatus])
   {
     [self evaluating:YES];

     psb = aPsb;

     [self value:v=[[psb databaseServer] numericConstantFor:self]];
```

```
    [self evaluating:NO];
    return v;
    }
}

-(double)number { return number; }
-(int)nPositionals { return 1; }
-(int)positionals { return [self nPositionals]; }

-dataValueAtArg:(int)position
{
    return ([self dataValueAt:position]);
}

-dataValueAt:(int)n
{
    return (n==0) ? [self value] : [self error:"requested arg not present!"];
}


-(STR)nodeNameText { return "CurrencyConst ";}

-printOn:(IOD)anIOD indenting:(int)n
{
    [super printOn:anIOD indenting:n];
    [self indent:n+1 on:anIOD];
    fprintf(anIOD, "value is: %f %s\n",number, [name str]);
    return self;
}



-listOn:nodeText
        {
        double aNum;
        STR cSign;
        char cAmount[40];

        if (([self units] != nil) && (!(strcmp([[self units] str], "$"))))
                cSign = "$";
        else    cSign = "";

        aNum = [self number];

        if ((aNum <= 1000000000) && ((long)aNum==aNum))
                sprintf(cAmount,"%ld", (long)aNum);
        else    sprintf(cAmount,"%.3f",aNum);


        [nodeText concatSTR:cSign];
        [nodeText concatSTR:cAmount];
        return nodeText;
        }

/*==================== DO NOT REMOVE    EDIT ============================

        This comment and the following sccsId declaration are managed
        by SCCS for you. Do not edit or remove either.

        Source file:    /users/bmw/Alpha/VRL/SCCS/s.BM_Delete.m
        Latest version: 1.1
        Last mod time:  05/19/89 at 09:52:43
```

```
==========================================================================*/

static char *sccsId = "@(#)BM_Delete.m rev 1.1 created on 05/19/89 at 09:52:43";

/*==================== DO NOT REMOVE OR EDIT ==========================*/


#include <stdio.h>
#include "batterymarch.h"
#include "objc.h"
#include "uil.h"


= BM_Delete : BM_BinaryParseTreeNode (BMPARSE)
{
}

-(STR)nodeName
{
    return "Delete";
}

+(int)defaultChildren { return 1; }

-BMinterface(BS_Delete)


-evaluate:aPsb
{
    id right, left, where, v, l, result;
    id newDataObject;
    id initialUniverse;

   if (![aPsb globalStatus])
    {
    [self evaluating:YES];

    psb = aPsb;

    left = [self leftNode];

    [left deleteEvaluate:aPsb];

    [self evaluating:NO];

    return nil;
    }
}


-listOn:nodeText
        {
        id whereNode;

        [nodeText concatSTR:[self nodeName]];
        [nodeText concatSTR:" "];
        [[children at:0] listOn:nodeT    ;
        [nodeText concatSTR:"\n"];
        return nodeText;
        }

=:
```

```
/*==================== DO NOT REMOVE   EDIT ============================

        This comment and the following sccsId declaration are managed
        by SCCS for you. Do not edit or remove either.

        Source file:     %F%
        Latest version:  %I%
        Last mod time:   %H% at %U%

======================================================================*/

static char *sccsId = "%Z%%M% rev %I% created on %H% at %U%";

/*==================== DO NOT REMOVE OR EDIT ==========================*/
#include "batterymarch.h"
#include "objc.h"
#include "uil.h"

= BM_DateOffsetConst : BM_Identifier (BMPARSE)
{
}

-(STR)nodeNameText { return "DateOffsetConst ";}

-BMinterface(BS_DateOffsetConst)
=:
/*==================== DO NOT REMOVE   EDIT ============================

        This comment and the following sccsId declaration are managed
        by SCCS for you. Do not edit or remove either.

        Source file:     /users/bmw/Alpha/VRL/SCCS/s.BM_End.m
        Latest version:  1.2
        Last mod time:   03/06/89 at 22:01:21

======================================================================*/

static char *sccsId = "@(#)BM_End.m rev 1.2 created on 03/06/89 at 22:01:21";

/*==================== DO NOT REMOVE OR EDIT ==========================*/

#include "batterymarch.h"
#include "objc.h"
#include "uil.h"

= BM_End : BM_Nonary (BMPARSE)
{
}

-(STR)nodeName
{
    return "End";
}

-BMinterface(BS_End)

-listOn:nodeText
        {
        [nodeText concatSTR:[self nodeName]];
        [nodeText concatSTR:"\n"];
        return nodeText;
        }
=:
```

```
/*===================== DO NOT REMOVE    EDIT =============================

      This comment and the following sccsId declaration are managed
      by SCCS for you. Do not edit or remove either.

      Source file:     %F%
      Latest version:  %I%
      Last mod time:   %H% at %U%

==========================================================================*/

static char *sccsId = "%Z%%M% rev %I% created on %H% at %U%";

/*===================== DO NOT REMOVE OR EDIT ============================*/

#include <stdio.h>
#include "batterymarch.h"
#include "objc.h"
#include "uil.h"

= BM_Error : BM_BinaryParseTreeNode (BMPARSE)
{
}

-(STR)nodeName
{
   return "Error";
}

-evaluate:psb
{
   return nil;
}

-BMinterface(BS_Error)
=:

/*===================== DO NOT REMOVE    EDIT =============================

      This comment and the following sccsId declaration are managed
      by SCCS for you. Do not edit or remove either.

      Source file:     /users/bmw/Alpha/VRL/SCCS/s.BM_Fnctn_ABS.m
      Latest version:  1.3
      Last mod time:   04/11/89 at 17:10:56

==========================================================================*/

static char *sccsId = "@(#)BM_Fnctn_ABS.m rev 1.3 created on 04/11/89 at 17:10:56";

/*===================== DO NOT REMOVE OR EDIT ============================*/


#include "objc.h"
#include "uil.h"


= BM_Fnctn_ABS: BM_ArithmeticFunction (BM_WorkstationMsgs, Collection, Primitive)
  {
  }
```

```
-(STR)functionNameSTR
  {
   return "Abs";
  }

-(unsigned)nUnnamedArgsRequired
  {
   return 1;
  }

-computeWith:arg1:arg2
  {
   return [arg1 absoluteValue];
  }

=:
/*===================== DO NOT REMOVE    EDIT =============================

        This comment and the following sccsId declaration are managed
        by SCCS for you. Do not edit or remove either.

        Source file:     /users/bmw/Alpha/VRL/SCCS/s.BM_Fnctn_ADD.m
        Latest version:  1.4
        Last mod time:   04/11/89 at 19:10:41

=======================================================================*/

static char *sccsId = "@(#)BM_Fnctn_ADD.m rev 1.4 created on 04/11/89 at 19:10:41";

/*===================== DO NOT REMOVE OR EDIT ===========================*/


#include "objc.h"
#include "uil.h"

#include "BMWGlobal.h"

= BM_Fnctn_ADD: BM_ArithmeticFunction (BM_WorkstationMsgs, Collection, Primitive)
  {
  }

  -(STR)functionNameSTR
    {
     return "add";
    }

  -(unsigned)nUnnamedArgsRequired
    {
     return 2;
    }

  -(unsigned)typeOfArgsRequired
    {
     return ANY_TYPE;
    }

  -computeWith:arg1:arg2
    {
     id result = [arg1 addElementWise:arg2];
     [arg2 free];
     return result;
    }

=:
```

```
/*==================== DO NOT REMOVE    EDIT ============================

      This comment and the following sccsId declaration are managed
      by SCCS for you. Do not edit or remove either.

      Source file:     /users/bmw/Alpha/VRL/SCCS/s.BM_Fnctn_AND.m
      Latest version:  1.3
      Last mod time:   04/11/89 at 17:11:13

========================================================================*/

static char *sccsId = "@(#)BM_Fnctn_AND.m rev 1.3 created on 04/11/89 at 17:11:13";

/*==================== DO NOT REMOVE OR EDIT ===========================*/


#include "objc.h"
#include "uil.h"



= BM_Fnctn_AND: BM_ArithmeticFunction (BM_WorkstationMsgs, Collection, Primitive)
   {
   }

   -(STR)functionNameSTR
     {
      return "and";
     }

   -(unsigned)nUnnamedArgsRequired
     {
      return 2;
     }

   -computeWith:arg1:arg2
     {
      id result = [arg1 logicalAND:arg2];
      [arg2 free];
      return result;
     }

=:
/*==================== DO NOT REMOVI    EDIT ============================

      This comment and the following sccsId declaration are managed
      by SCCS for you. Do not edit or remove either.

      Source file:     /users/bmw/Alpha/VRL/SCCS/s.BM_Fnctn_AVG.m
      Latest version:  1.4
      Last mod time:   04/11/89 at 19:10:30

========================================================================*/

static char *sccsId = "@(#)BM_Fnctn_AVG.m rev 1.4 created on 04/11/89 at 19:10:30";

/*==================== DO NOT REMOVE OR EDIT ===========================*/

#include "objc.h"
#include "BMWGlobal.h"

@requires BM_Matrix, CharString;
```

```
= BM_Fnctn_AVG: BM_StatisticalFunction (BM_WorkstationMsgs, Collection, Primitive)
  {
  }

  -(STR)functionNameSTR
    {
     return "Average";
    }

  -(unsigned)nUnnamedArgsRequired
    {
     return 1;
    }

  -computeWith:arg weights:weights
    {
     NUMBER mean = [arg mean:weights];

     [arg free];

     if (mean == BOGUS_VALUE)
        return [BM_Matrix nRows:1 nColumns:1];
     else
        return [BM_Matrix nRows:1 nColumns:1 fillWith:mean];
    }


=:

/*===================== DO NOT REMOVE    EDIT ============================

       This comment and the following sccsId declaration are managed
       by SCCS for you. Do not edit or remove either.

       Source file:     /users/bmw/Alpha/VRL/SCCS/s.BM_Fnctn_CNT.m
       Latest version:  1.5
       Last mod time:   04/11/89 at 17:11:26

=========================================================================*/

static char *sccsId = "@(#)BM_Fnctn_CNT.m rev 1.5 created on 04/11/89 at 17:11:26";

/*===================== DO NOT REMOVE OR EDIT ===========================*/


#include "objc.h"

#include "BMWGlobal.h"

@requires BM_Matrix, CharString;

= BM_Fnctn_CNT: BM_StatisticalFunction (BM_WorkstationMsgs, Collection, Primitive)
  {
  }

  -(STR)functionNameSTR
    {
     return "Count";
    }

  -(unsigned)nUnnamedArgsRequired
    {
     return 1;
    }
```

```
-(unsigned)typeOfArgsRequired
  {
   return ANY_TYPE;
  }

-computeWith:arg weights:weights
  {
   id result;

   if (weights != nil)
     {
      [weights maskFlagsUsing:arg];
      result = [BM_Matrix nRows:1 nColumns:1
                              fillWith:(NUMBER)[weights nFlagsSet]];

      [weights free];
     }
   else
     result =  [BM_Matrix nRows:1 nColumns:1
                              fillWith:(NUMBER)[arg nFlagsSet]];

   [arg free];

   return result;
  }

=:

/*==================== DO NOT REMOVE    EDIT ============================

      This comment and the following sccsId declaration are managed
      by SCCS for you. Do not edit or remove either.

      Source file:    /users/bmw/Alpha/VRL/SCCS/s.BM_Fnctn_CUM.m
      Latest version: 1.4
      Last mod time:  04/11/89 at 19:10:18

=======================================================================*/

static char *sccsId = "@(#)BM_Fnctn_CUM.m rev 1.4 created on 04/11/89 at 19:10:18";

/*==================== DO NOT REMOVE OR EDIT ==========================*/

#include "objc.h"

@requires BM_Matrix, CharString;

= BM_Fnctn_CUM: BM_StatisticalFunction (BM_WorkstationMsgs, Collection, Primitive)
  {
  }

  -(STR)functionNameSTR
    {
     return "Cumulate";
    }

  -(unsigned)nUnnamedArgsRequired
    {
     return 1;
    }

  -computeWith:arg weights:weights
    {
     [weights free];
```

```
    return [arg cumulate];
   }


=:

/*==================== DO NOT REMOVE    EDIT ============================

       This comment and the following sccsId declaration are managed
       by SCCS for you. Do not edit or remove either.

       Source file:     /users/bmw/Alpha/VRL/SCCS/s.BM_Interp.m
       Latest version:  1.12
       Last mod time:   08/24/89 at 13:23:12

=========================================================================*/

static char *sccsId = "@(#)BM_Interp.m rev 1.12 created on 08/24/89 at 13:23:12";

/*==================== DO NOT REMOVE OR EDIT ===========================*/


#include "objc.h"

#include "BMWGlobal.h"
#include "BMDBInterf.h"

extern id parseTree;

id _theParser = nil;

@requires BM_StreamString, BM_Parser, BM_ProgramStatusBlock, CharString,
          BM_StringMatrix, OrdCltn;

= BM_Interpreter: Object (BM_WorkstationMsgs, Collection, Primitive)
  {
   id programStatusBlock;
   id currentModel;
   id parser;
  }

  +createInterfaceFor:aDatabaseServer  functionServer:aFunctionServer
                                           withParser:(BOOL)makeParser
    {
     self = [super new];

     programStatusBlock = [BM_ProgramStatusBlock new:aDatabaseServer
                                     functionServer:aFunctionServer];
     if (makeParser)
       {
        if (_theParser == nil)
           _theParser = [BM_Parser new];
        parser = _theParser;
       }

     return self;
    }

  -stubModel
    {
     [parser parse:[BM_StreamString
                            str:"begin for companies nullstmt next end"]];
     return parseTree;
    }
```

```
-stubPlate
  {
   [parser parse:[BM_StreamString str:"for companies nullstmt next"]];
   return parseTree;
  }

-currentModel:aNewModel

  {
   if (currentModel)
      [currentModel free];

   return currentModel = aNewModel;
  }

-currentModel
  {
   return currentModel;
  }

-executeCurrentModel
  {
   [currentModel evaluate:programStatusBlock];

   [programStatusBlock resetStatus];

   return self;
  }


-doCurrencyConversion:(BOOL)doIt
  {
   return [[programStatusBlock databaseServer] doCurrencyConversion:doIt];
  }


-(BOOL)doCurrencyConversion
  {
   return [[programStatusBlock databaseServer] doCurrencyConversion];
  }


-keepValues:(BOOL)doIt
  {
   [currentModel reset];

   return [programStatusBlock keepValues:doIt];
  }


-(BOOL)keepValues
  {
   return [programStatusBlock keepValues];
  }


-parseString:aCharString
  {
   if ([parser parse:[BM_StreamString str:[aCharString str]]])
      return nil;
   else
      return parseTree;
  }
```

```
-psb
  {
   return programStatusBlock;
  }


-operatorList
  {
   id list = [BM_StringMatrix nRows:14 nColumns:1];
   unsigned row = 0;

   [list atRow:row++ Col:0 put:[CharString str:" + "]];
   [list atRow:row++ Col:0 put:[CharString str:" - "]];
   [list atRow:row++ Col:0 put:[CharString str:" * "]];
   [list atRow:row++ Col:0 put:[CharString str:" / "]];
   [list atRow:row++ Col:0 put:[CharString str:" ^ "]];
   [list atRow:row++ Col:0 put:[CharString str:" = "]];
   [list atRow:row++ Col:0 put:[CharString str:" > "]];
   [list atRow:row++ Col:0 put:[CharString str:" < "]];
   [list atRow:row++ Col:0 put:[CharString str:" <> "]];
   [list atRow:row++ Col:0 put:[CharString str:" <= "]];
   [list atRow:row++ Col:0 put:[CharString str:" >= "]];
   [list atRow:row++ Col:0 put:[CharString str:" AND "]];
   [list atRow:row++ Col:0 put:[CharString str:" OR "]];
   [list atRow:row++ Col:0 put:[CharString str:" NOT "]];

   return list;
  }

-keyWordList
  {
   id list = [BM_StringMatrix nRows:5 nColumns:1];
   unsigned row = 0;

   [list atRow:row++ Col:0 put:[CharString str:"SET"]];
   [list atRow:row++ Col:0 put:[CharString str:"WHERE"]];
   [list atRow:row++ Col:0 put:[CharString str:"FOR"]];
   [list atRow:row++ Col:0 put:[CharString str:"NEXT"]];
   [list atRow:row++ Col:0 put:[CharString str:"MEMO"]];

   return list;
  }

-(unsigned)typeOfDataItem:aDataItem
  {
   return [[programStatusBlock databaseServer] typeOfDataItem:aDataItem];
  }

-dataItemList
  {
   return [[[programStatusBlock databaseServer] itemNames:0] sort];
  }

-newDataItemList
  {
   return [[[programStatusBlock databaseServer]
                                   itemNames:SOURCE_USER] sort];
  }

-listCompletionForSTR:(STR)aStr
  {
   return [[programStatusBlock databaseServer] listCompletionForSTR:aStr];
  }
```

```
-itemCompletionForSTR:(STR)aStr
  {
   return [[programStatusBlock databaseServer] itemCompletionForSTR:aStr];
  }

-functionList
  {
   return [[[programStatusBlock functionServer] functionNames] sort];
  }

-modifierList
/*===================== DO NOT REMOVE    EDIT ============================

       This comment and the following sccsId declaration are managed
       by SCCS for you. Do not edit or remove either.

       Source file:     /users/bmw/Alpha/VRL/SCCS/s.BM_Fnctn_DIV.m
       Latest version:  1.3
       Last mod time:   04/11/89 at 19:10:05

==========================================================================*/

static char *sccsId = "@(#)BM_Fnctn_DIV.m rev 1.3 created on 04/11/89 at 19:10:05";

/*===================== DO NOT REMOVE OR EDIT ==========================*/


#include "objc.h"
#include "uil.h"



= BM_Fnctn_DIV: BM_ArithmeticFunction (BM_WorkstationMsgs, Collection, Primitive)
  {
  }

  -(STR)functionNameSTR
    {
     return "div";
    }

  -(unsigned)nUnnamedArgsRequired
    {
     return 2;
    }

  -computeWith:arg1:arg2
    {
     id result = [arg1 divideElementWise:arg2];
     [arg2 free];
     return result;
    }

=:

/*===================== DO NOT REMOVE    EDIT ============================

       This comment and the following sccsId declaration are managed
       by SCCS for you. Do not edit or remove either.

       Source file:     /users/bmw/Alpha/VRL/SCCS/s.BM_Fnctn_EQ.m
       Latest version:  1.4
       Last mod time:   04/11/89 at 17:11:59
```

```
==========================================================================*/

static char *sccsId = "@(#)BM_Fnctn_EQ.m rev 1.4 created on 04/11/89 at 17:11:59";

/*==================== DO NOT REMOVE OR EDIT ===========================*/


#include "objc.h"
#include "uil.h"

#include "BMWGlobal.h"

= BM_Fnctn_EQ: BM_ArithmeticFunction (BM_WorkstationMsgs, Collection, Primitive)
  {
  }

  -(STR)functionNameSTR
    {
     return "eq";
    }

  -(unsigned)nUnnamedArgsRequired
    {
     return 2;
    }

  -(unsigned)typeOfArgsRequired
    {
     return ANY_TYPE;
    }

  -computeWith:arg1:arg2
    {
     id result = [arg1 compareElementWise:arg2:arg2 testEquality:YES];
     [arg2 free];
     return result;
    }

=:

/*==================== DO NOT REMOVI    EDIT ============================

       This comment and the following sccsId declaration are managed
       by SCCS for you. Do not edit or remove either.

       Source file:     /users/bmw/Alpha/VRL/SCCS/s.BM_Fnctn_EXP.m
       Latest version:  1.3
       Last mod time:   04/11/89 at 19:09:50

==========================================================================*/

static char *sccsId = "@(#)BM_Fnctn_EXP.m rev 1.3 created on 04/11/89 at 19:09:50";

/*==================== DO NOT REMOVE OR EDIT ===========================*/


#include "objc.h"
#include "uil.h"


= BM_Fnctn_EXP: BM_ArithmeticFunction (BM_WorkstationMsgs, Collection, Primitive)
  {
  }
```

```
-(STR)functionNameSTR
  {
   return "Exp";
  }

-(unsigned)nUnnamedArgsRequired
  {
   return 1;
  }

-computeWith:arg1:arg2
  {
   return [arg1 exponential];
  }

=:
/*==================== DO NOT REMOVI    EDIT ============================

      This comment and the following sccsId declaration are managed
      by SCCS for you. Do not edit or remove either.

      Source file:     /users/bmw/Alpha/VRL/SCCS/s.BM_Fnctn_GE.m
      Latest version:  1.4
      Last mod time:   04/11/89 at 19:09:39

=====================================================================*/

static char *sccsId = "@(#)BM_Fnctn_GE.m rev 1.4 created on 04/11/89 at 19:09:39";

/*==================== DO NOT REMOVE OR EDIT ==========================*/


#include "objc.h"
#include "uil.h"

#include "BMWGlobal.h"

= BM_Fnctn_GE: BM_ArithmeticFunction (BM_WorkstationMsgs, Collection, Primitive)
  {
  }

  -(STR)functionNameSTR
    {
     return "ge";
    }

  -(unsigned)nUnnamedArgsRequired
    {
     return 2;
    }

  -(unsigned)typeOfArgsRequired
    {
     return ANY_TYPE;
    }

  -computeWith:arg1:arg2
    {
     id result = [arg1 compareElementWise:arg2:nil testEquality:YES];
     [arg2 free];
     return result;
    }

=:
```

```
/*===================== DO NOT REMOVF    EDIT ==============================

        This comment and the following sccsId declaration are managed
        by SCCS for you. Do not edit or remove either.

        Source file:     /users/bmw/Alpha/VRL/SCCS/s.BM_Fnctn_GT.m
        Latest version:  1.4
        Last mod time:   04/11/89 at 17:12:15

==========================================================================*/

static char *sccsId = "@(#)BM_Fnctn_GT.m rev 1.4 created on 04/11/89 at 17:12:15";

/*===================== DO NOT REMOVE OR EDIT ============================*/


#include "objc.h"
#include "uil.h"

#include "BMWGlobal.h"

= BM_Fnctn_GT: BM_ArithmeticFunction (BM_WorkstationMsgs, Collection, Primitive)
   {
   }

   -(STR)functionNameSTR
      {
       return "gt";
      }

   -(unsigned)nUnnamedArgsRequired
      {
       return 2;
      }

   -(unsigned)typeOfArgsRequired
      {
       return ANY_TYPE;
      }

   -computeWith:arg1:arg2
      {
       id result = [arg1 compareElementWise:arg2:nil testEquality:NO];
       [arg2 free];
       return result;
      }

=:

/*===================== DO NOT REMOVF    EDIT ==============================

        This comment and the following sccsId declaration are managed
        by SCCS for you. Do not edit or remove either.

        Source file:     /users/bmw/Alpha/VRL/SCCS/s.BM_Fnctn_HI.m
        Latest version:  1.4
        Last mod time:   04/11/89 at 17:12:28

==========================================================================*/

static char *sccsId = "@(#)BM_Fnctn_HI.m rev 1.4 created on 04/11/89 at 17:12:28";

/*===================== DO NOT REMOVE OR EDIT ============================*/
```

```
#include "objc.h"
#include "BMWGlobal.h"

@requires BM_Matrix, CharString;

= BM_Fnctn_HI: BM_StatisticalFunction (BM_WorkstationMsgs, Collection, Primitive)
  {
  }

  -(STR)functionNameSTR
    {
     return "HighRange";
    }

  -(unsigned)nUnnamedArgsRequired
    {
     return 1;
    }

  -computeWith:arg weights:weights
    {
     NUMBER high = [arg maximumStatistic];

     [arg free];
     [weights free];

     if (high == BOGUS_VALUE)
        return [BM_Matrix nRows:1 nColumns:1];
     else
        return [BM_Matrix nRows:1 nColumns:1 fillWith:high];
    }


=:

/*===================== DO NOT REMOVE    EDIT ==============================

       This comment and the following sccsId declaration are managed
       by SCCS for you. Do not edit or remove either.

       Source file:     /users/bmw/Alpha/VRL/SCCS/s.BM_Fnctn_LE.m
       Latest version:  1.4
       Last mod time:   04/11/89 at 19:09:03

=====================================================================*/

static char *sccsId = "@(#)BM_Fnctn_LE.m rev 1.4 created on 04/11/89 at 19:09:03";

/*===================== DO NOT REMOVE OR EDIT ==========================*/


#include "objc.h"
#include "uil.h"

#include "BMWGlobal.h"

= BM_Fnctn_LE: BM_ArithmeticFunction (BM_WorkstationMsgs, Collection, Primitive)
  {
  }

  -(STR)functionNameSTR
    {
     return "le";
    }
```

```
-(unsigned)nUnnamedArgsRequired
  {
   return 2;
  }

-(unsigned)typeOfArgsRequired
  {
   return ANY_TYPE;
  }

-computeWith:arg1:arg2
  {
   id result = [arg1 compareElementWise:nil:arg2 testEquality:YES];
   [arg2 free];
   return result;
  }

=:

/*==================== DO NOT REMOVI    EDIT =============================

        This comment and the following sccsId declaration are managed
        by SCCS for you. Do not edit or remove either.

        Source file:     /users/bmw/Alpha/VRL/SCCS/s.BM_Fnctn_LOG.m
        Latest version:  1.3
        Last mod time:   04/11/89 at 17:12:43

=======================================================================*/

static char *sccsId = "@(#)BM_Fnctn_LOG.m rev 1.3 created on 04/11/89 at 17:12:43";

/*==================== DO NOT REMOVE OR EDIT ==========================*/


#include "objc.h"
#include "uil.h"



= BM_Fnctn_LOG: BM_ArithmeticFunction (BM_WorkstationMsgs, Collection, Primitive)
  {
  }

  -(STR)functionNameSTR
    {
     return "Log";
    }

  -(unsigned)nUnnamedArgsRequired
    {
     return 1;
    }

  -computeWith:arg1:arg2
    {
     return [arg1 naturalLog];
    }

=:

/*==================== DO NOT REMOVE    EDIT =============================

        This comment and the following sccsId declaration are managed
        by SCCS for you. Do not edit or remove either.
```

```
        Source file:     /users/bmw/Alpha/VRL/SCCS/s.BM_Fnctn_LOW.m
        Latest version:  1.4
        Last mod time:   04/11/89 at 17:13:00

==========================================================================*/

static char *sccsId = "@(#)BM_Fnctn_LOW.m rev 1.4 created on 04/11/89 at 17:13:00";

/*===================== DO NOT REMOVE OR EDIT ===========================*/


#include "objc.h"
#include "BMWGlobal.h"

@requires BM_Matrix, CharString;

= BM_Fnctn_LOW: BM_StatisticalFunction (BM_WorkstationMsgs, Collection, Primitive)

   {
   }

   -(STR)functionNameSTR
      {
       return "LowRange";
      }

   -(unsigned)nUnnamedArgsRequired
      {
       return 1;
      }

  -computeWith:arg weights:weights
      {
       NUMBER low = [arg minimumStatistic];

       [arg free];
       [weights free];

       if (low == BOGUS_VALUE)
          return [BM_Matrix nRows:1 nColumns:1];
       else
          return [BM_Matrix nRows:1 nColumns:1 fillWith:low];
      }


=:

/*===================== DO NOT REMOV     EDIT ===========================

        This comment and the following sccsId declaration are managed
        by SCCS for you. Do not edit or remove either.

        Source file:     /users/bmw/Alpha/VRL/SCCS/s.BM_Fnctn_LT.m
        Latest version:  1.4
        Last mod time:   04/11/89 at 17:13:15

==========================================================================*/

static char *sccsId = "@(#)BM_Fnctn_LT.m rev 1.4 created on 04/11/89 at 17:13:15";

/*===================== DO NOT REMOVE OR EDIT ===========================*/


#include "objc.h"
#include "uil.h"
```

```
#include "BMWGlobal.h"

= BM_Fnctn_LT: BM_ArithmeticFunction (BM_WorkstationMsgs, Collection, Primitive)
  {
  }

  -(STR)functionNameSTR
    {
     return "lt";
    }

  -(unsigned)nUnnamedArgsRequired
    {
     return 2;
    }

  -(unsigned)typeOfArgsRequired
    {
     return ANY_TYPE;
    }

  -computeWith:arg1:arg2
    {
     id result = [arg1 compareElementWise:nil:arg2 testEquality:NO];
     [arg2 free];
     return result;
    }

=:

/*==================== DO NOT REMOVE    EDIT ============================

        This comment and the following sccsId declaration are managed
        by SCCS for you. Do not edit or remove either.

        Source file:    /users/bmw/Alpha/VRL/SCCS/s.BM_Fnctn_MAX.m
        Latest version: 1.3
        Last mod time:  04/11/89 at 17:13:28

=======================================================================*/

static char *sccsId = "@(#)BM_Fnctn_MAX.m rev 1.3 created on 04/11/89 at 17:13:28";

/*==================== DO NOT REMOVE OR EDIT ==========================*/


#include "objc.h"
#include "uil.h"

#include "BMWGlobal.h"



= BM_Fnctn_MAX: BM_ArithmeticFunction (BM_WorkstationMsgs, Collection, Primitive)
  {
  }

  -(STR)functionNameSTR
    {
     return "Maximum";
    }

  -(unsigned)nUnnamedArgsRequired
    {
```

```
   return VARIABLE_NARGS;
  }

 -computeWith:arg1:arg2
  {
   id result = [arg1 maximum:arg2];
   [arg2 free];
   return result;
  }

=:

/*===================== DO NOT REMOVI    EDIT ==============================

      This comment and the following sccsId declaration are managed
      by SCCS for you. Do not edit or remove either.

      Source file:     /users/bmw/Alpha/VRL/SCCS/s.BM_Fnctn_MIN.m
      Latest version:  1.3
      Last mod time:   04/11/89 at 17:13:57

==========================================================================*/

static char *sccsId = "@(#)BM_Fnctn_MIN.m rev 1.3 created on 04/11/89 at 17:13:57";

/*===================== DO NOT REMOVE OR EDIT ==========================*/


#include "objc.h"
#include "uil.h"

#include "BMWGlobal.h"



= BM_Fnctn_MIN: BM_ArithmeticFunction (BM_WorkstationMsgs, Collection, Primitive)
  {
  }

  -(STR)functionNameSTR
   {
    return "Minimum";
   }

  -(unsigned)nUnnamedArgsRequired
   {
    return VARIABLE_NARGS;
   }

  -computeWith:arg1:arg2
   {
    id result = [arg1 minimum:arg2];
    [arg2 free];
    return result;
   }

=:

/*===================== DO NOT REMOVI    EDIT ==============================

      This comment and the following sccsId declaration are managed
      by SCCS for you. Do not edit or remove either.
```

```
        Source file:     /users/bmw/Alpha/VRL/SCCS/s.BM_Fnctn_MLT.m
        Latest version:  1.3
        Last mod time:   04/11/89 at 17:13:41

 =========================================================================*/

 static char *sccsId = "@(#)BM_Fnctn_MLT.m rev 1.3 created on 04/11/89 at 17:13:41";

 /*==================== DO NOT REMOVE OR EDIT ===========================*/


 #include "objc.h"
 #include "uil.h"



 = BM_Fnctn_MLT: BM_ArithmeticFunction (BM_WorkstationMsgs, Collection, Primitive)
   {
   }

   -(STR)functionNameSTR
     {
      return "mult";
     }

   -(unsigned)nUnnamedArgsRequired
     {
      return 2;
     }

   -computeWith:arg1:arg2
     {
      id result = [arg1 multiplyElementWise:arg2];
      [arg2 free];
      return result;
     }

=:

/*==================== DO NOT REMOVI    EDIT ============================

        This comment and the following sccsId declaration are managed
        by SCCS for you. Do not edit or remove either.

        Source file:     /users/bmw/Alpha/VRL/SCCS/s.BM_Fnctn_NE.m
        Latest version:  1.4
        Last mod time:   04/11/89 at 17:14:11

=========================================================================*/

static char *sccsId = "@(#)BM_Fnctn_NE.m rev 1.4 created on 04/11/89 at 17:14:11";

/*==================== DO NOT REMOVE OR EDIT ===========================*/


#include "objc.h"
#include "uil.h"

#include "BMWGlobal.h"

= BM_Fnctn_NE: BM_ArithmeticFunction (BM_WorkstationMsgs, Collection, Primitive)
  {
  }
```

```
   -(STR)functionNameSTR
     {
      return "ne";
     }

   -(unsigned)nUnnamedArgsRequired
     {
      return 2;
     }

   -(unsigned)typeOfArgsRequired
     {
      return ANY_TYPE;
     }

   -computeWith:arg1:arg2
     {
      id result =
            [[arg1 compareElementWise:arg2:arg2 testEquality:YES] logicalNOT];
      [arg2 free];
      return result;
     }

=:

/*===================== DO NOT REMOV    EDIT =============================

       This comment and the following sccsId declaration are managed
       by SCCS for you. Do not edit or remove either.

       Source file:     /users/bmw/Alpha/VRL/SCCS/s.BM_Fnctn_NEG.m
       Latest version:  1.3
       Last mod time:   04/11/89 at 17:14:24

========================================================================*/

static char *sccsId = "@(#)BM_Fnctn_NEG.m rev 1.3 created on 04/11/89 at 17:14:24";

/*===================== DO NOT REMOVE OR EDIT ===========================*/


#include "objc.h"
#include "uil.h"



= BM_Fnctn_NEG: BM_ArithmeticFunction (BM_WorkstationMsgs, Collection, Primitive)
  {
  }

   -(STR)functionNameSTR
     {
      return "neg";
     }

   -(unsigned)nUnnamedArgsRequired
     {
      return 1;
     }

   -computeWith:arg1:arg2
     {
```

```
    return [arg1 multiplyByScalar:-1.0];
    }

=:

/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BM_Fnctn_NOT.m
        Latest version:  1.3
        Last mod time:   04/11/89 at 17:14:40

=========================================================================*/

static char *sccsId = "@(#)BM_Fnctn_NOT.m rev 1.3 created on 04/11/89 at 17:14:40";

/*===================== DO NOT REMOVE OR EDIT ===========================*/


#include "objc.h"
#include "uil.h"



= BM_Fnctn_NOT: BM_ArithmeticFunction (BM_WorkstationMsgs, Collection, Primitive)
  {
  }

  -(STR)functionNameSTR
    {
     return "not";
    }

  -(unsigned)nUnnamedArgsRequired
    {
     return 1;
    }

  -computeWith:arg1:arg2
    {
     return [arg1 logicalNOT];
    }

=:

/*===================== DO NOT REMOV'    EDIT ============================

        This comment and the following sccsId declaration are managed
        by SCCS for you. Do not edit or remove either.

        Source file:     /users/bmw/Alpha/VRL/SCCS/s.BM_Fnctn_NRM.m
        Latest version:  1.4
        Last mod time:   04/11/89 at 17:14:55

=========================================================================*/

static char *sccsId = "@(#)BM_Fnctn_NRM.m rev 1.4 created on 04/11/89 at 17:14:55";

/*===================== DO NOT REMOVE OR EDIT ===========================*/


#include "objc.h"
#include "BMWGlobal.h"
```

```
@requires BM_Matrix, CharString;

= BM_Fnctn_NRM: BM_StatisticalFunction (BM_WorkstationMsgs, Collection, Primitive)
  {
  }

  -(STR)functionNameSTR
    {
     return "Normalize";
    }

  -(unsigned)nUnnamedArgsRequired
    {
     return 1;
    }

 -computeWith:arg weights:weights
    {
     /* weights not supported yet! */

     id     result;
     NUMBER stddev = [arg stddev:nil];

     [weights free];

     if (stddev == BOGUS_VALUE)
        {
         result = [BM_Matrix nRows:[arg nRows] nColumns:[arg nColumns]];
         [arg free];
        }
     else
        result = [[arg addScalar:-[arg mean:nil]]
                                 multiplyByScalar:stddev?1/stddev:1];

     return result;
    }


=:

/*===================== DO NOT REMOVI    EDIT =============================

       This comment and the following sccsId declaration are managed
       by SCCS for you. Do not edit or remove either.

       Source file:     /users/bmw/Alpha/VRL/SCCS/s.BM_Fnctn_NUL.m
       Latest version:  1.4
       Last mod time:   04/11/89 at 19:08:23

==========================================================================*/

static char *sccsId = "@(#)BM_Fnctn_NUL.m rev 1.4 created on 04/11/89 at 19:08:23";

/*===================== DO NOT REMOVE OR EDIT ===========================*/


#include "objc.h"
#include "uil.h"

#include "BMWGlobal.h"

= BM_Fnctn_NUL: BM_ArithmeticFunction (BM_WorkstationMsgs, Collection, Primitive)
  {
  }
```

```
-(STR)functionNameSTR
   {
    return "Null";
   }

-(unsigned)nUnnamedArgsRequired
   {
    return 1;
   }

-(unsigned)typeOfArgsRequired
   {
    return ANY_TYPE;
   }

-computeWith:arg1:arg2
   {
    return [[arg1 compareElementWise:nil:arg1 testEquality:YES] logicalNOT];
   }

=:

/*===================== DO NOT REMO\   ! EDIT ==============================

       This comment and the following sccsId declaration are managed
       by SCCS for you. Do not edit or remove either.

       Source file:     /users/bmw/Alpha/VRL/SCCS/s.BM_Fnctn_OR.m
       Latest version:  1.3
       Last mod time:   04/11/89 at 19:08:36

==========================================================================*/

static char *sccsId = "@(#)BM_Fnctn_OR.m rev 1.3 created on 04/11/89 at 19:08:36";

/*===================== DO NOT REMOVE OR EDIT ===========================*/


#include "objc.h"
#include "uil.h"


= BM_Fnctn_OR: BM_ArithmeticFunction (BM_WorkstationMsgs, Collection, Primitive)
  {
  }

  -(STR)functionNameSTR
     {
      return "or";
     }

  -(unsigned)nUnnamedArgsRequired
     {
      return 2;
     }

  -computeWith:arg1:arg2
     {
      id result = [arg1 logicalOR:arg2];
      [arg2 free];
      return result;
     }

=:
```

```
/*===================== DO NOT REMO'   ? EDIT ============================

        This comment and the following sccsId declaration are managed
        by SCCS for you. Do not edit or remove either.

        Source file:     /users/bmw/Alpha/VRL/SCCS/s.BM_Fnctn_POW.m
        Latest version:  1.3
        Last mod time:   04/11/89 at 19:08:49

==========================================================================*/

static char *sccsId = "@(#)BM_Fnctn_POW.m rev 1.3 created on 04/11/89 at 19:08:49";

/*===================== DO NOT REMOVE OR EDIT ==========================*/


#include "objc.h"
#include "uil.h"



= BM_Fnctn_POW: BM_ArithmeticFunction (BM_WorkstationMsgs, Collection, Primitive)
   {
   }

   -(STR)functionNameSTR
      {
       return "pow";
      }

   -(unsigned)nUnnamedArgsRequired
      {
       return 2;
      }

   -computeWith:arg1:arg2
      {
       id result = [arg1 exponentiateElementWise:arg2];
       [arg2 free];
       return result;
      }

=:
/*===================== DO NOT REMO'   ? EDIT ============================

        This comment and the following sccsId declaration are managed
        by SCCS for you. Do not edit or remove either.

        Source file:     /users/bmw/Alpha/VRL/SCCS/s.BM_Fnctn_PRC.m
        Latest version:  1.3
        Last mod time:   04/11/89 at 19:09:15

==========================================================================*/

static char *sccsId = "@(#)BM_Fnctn_PRC.m rev 1.3 created on 04/11/89 at 19:09:15";

/*===================== DO NOT REMOVE OR EDIT ==========================*/


#include "objc.h"
#include "BMWGlobal.h"
```

```
@requires BM_Matrix, CharString;

= BM_Fnctn_PRC: BM_StatisticalFunction (BM_WorkstationMsgs, Collection, Primitive)
  {
  }

  -(STR)functionNameSTR
    {
     return "Percentile";
    }

  -(unsigned)nUnnamedArgsRequired
    {
     return 1;
    }

  -computeWith:arg weights:weights
    {
     return [arg quantile:0.01 weights:weights];
    }


=:

/*==================== DO NOT REMO'   ł EDIT ============================

       This comment and the following sccsId declaration are managed
       by SCCS for you. Do not edit or remove either.*

       Source file:     /users/bmw/Alpha/VRL/SCCS/s.BM_Fnctn_PRP.m
       Latest version:  1.2
       Last mod time:   04/11/89 at 19:09:27

=====================================================================*/

static char *sccsId = "@(#)BM_Fnctn_PRP.m rev 1.2 created on 04/11/89 at 19:09:27";

/*==================== DO NOT REMOVE OR EDIT ==========================*/


#include "objc.h"
#include "BMWGlobal.h"

@requires BM_Matrix, CharString;

= BM_Fnctn_PRP: BM_StatisticalFunction (BM_WorkstationMsgs, Collection, Primitive)
  {
  }

  -(STR)functionNameSTR
    {
     return "Proportion";
    }

  -(unsigned)nUnnamedArgsRequired
    {
     return 1;
    }

  -computeWith:arg weights:weights
    {
     NUMBER total;

     if (weights != nil)
       {
```

```
        [arg multiplyElementWise:weights];
        [weights free];
       }

     total = [arg total:nil];

     if (total != 0.0)
        [arg proportion:total];

     return arg;
    }


=:
/*===================== DO NOT REMO\    : EDIT ==============================

       This comment and the following sccsId declaration are managed
       by SCCS for you. Do not edit or remove either.

       Source file:     /users/bmw/Alpha/VRL/SCCS/s.BM_Fnctn_QRT.m
       Latest version:  1.3
       Last mod time:   04/11/89 at 19:17:00

=========================================================================*/

static char *sccsId = "@(#)BM_Fnctn_QRT.m rev 1.3 created on 04/11/89 at 19:17:00";

/*===================== DO NOT REMOVE OR EDIT ===========================*/


#include "objc.h"
#include "BMWGlobal.h"

@requires BM_Matrix, CharString;

= BM_Fnctn_QRT: BM_StatisticalFunction (BM_WorkstationMsgs, Collection, Primitive)
  {
  }

  -(STR)functionNameSTR
    {
     return "Quartile";
    }

  -(unsigned)nUnnamedArgsRequired
    {
     return 1;
    }

 -computeWith:arg weights:weights
    {
     return [arg quantile:0.25 weights:weights];
    }


=:
/*===================== DO NOT REMO\    ' EDIT ==============================

       This comment and the following sccsId declaration are managed
       by SCCS for you. Do not edit or remove either.

       Source file:     /users/bmw/Alpha/VRL/SCCS/s.BM_Fnctn_REG.m
       Latest version:  1.3
       Last mod time:   04/11/89 at 19:17:28
```

```
======================================================================*/

static char *sccsId = "@(#)BM_Fnctn_REG.m rev 1.3 created on 04/11/89 at 19:17:28";

/*===================== DO NOT REMOVE OR EDIT ===========================*/


#include "objc.h"

= BM_Fnctn_REG: something (<message groups>)
  {
  }

  -executeWith:arg1:arg2
     {
/*
      return [[[[[arg2 transpose] mult:arg2] invert] mult:[arg2 transpose]]
                                                              mult:arg1];

*/
     }


=:
/*===================== DO NOT REMO'   ? EDIT ============================

       This comment and the following sccsId declaration are managed
       by SCCS for you. Do not edit or remove either.*

       Source file:     /users/bmw/Alpha/VRL/SCCS/s.BM_Fnctn_REV.m
       Latest version:  1.5
       Last mod time:   04/11/89 at 19:17:15

======================================================================*/

static char *sccsId = "@(#)BM_Fnctn_REV.m rev 1.5 created on 04/11/89 at 19:17:15";

/*===================== DO NOT REMOVE OR EDIT ===========================*/


#include "objc.h"
#include "BMWGlobal.h"

@requires BM_Matrix, CharString;

= BM_Fnctn_REV: BM_StatisticalFunction (BM_WorkstationMsgs, Collection, Primitive)
  {
  }

  -(STR)functionNameSTR
     {
      return "Reverse";
     }

  -(unsigned)nUnnamedArgsRequired
     {
      return 1;
     }

  -(unsigned)typeOfArgsRequired
     {
      return ANY_TYPE;
     }
```

```
-computeWith:arg weights:weights
    {
     [weights free];

     return [arg flip];
    }


=:
/*===================== DO NOT REMO   R EDIT =============================

      This comment and the following sccsId declaration are managed
      by SCCS for you. Do not edit or remove either.

      Source file:     /users/bmw/Alpha/VRL/SCCS/s.BM_Fnctn_RNG.m
      Latest version:  1.4
      Last mod time:   04/11/89 at 19:17:39

==========================================================================*/

static char *sccsId = "@(#)BM_Fnctn_RNG.m rev 1.4 created on 04/11/89 at 19:17:39";

/*===================== DO NOT REMOVE OR EDIT ===========================*/

#include "objc.h"

#include "BMWGlobal.h"

@requires BM_Matrix, CharString;

= BM_Fnctn_RNG: BM_StatisticalFunction (BM_WorkstationMsgs, Collection, Primitive)
  {
  }

  -(STR)functionNameSTR
    {
     return "Range";
    }

  -(unsigned)nUnnamedArgsRequired
    {
     return 1;
    }

  -computeWith:arg weights:weights
    {
     NUMBER high = [arg maximumStatistic];
     NUMBER low  = [arg minimumStatistic];

     [arg free];
     [weights free];

     if ((high == BOGUS_VALUE) || (low == BOGUS_VALUE))
        return [BM_Matrix nRows:1 nColumns:1];
     else
        return [BM_Matrix nRows:1 nColumns:1 fillWith:high-low];
    }

=:
/*===================== DO NOT REMO   R EDIT =============================

      This comment and the following sccsId declaration are managed
      by SCCS for you. Do not edit or remove either.
```

```
        Source file:      /users/bmw/Alpha/VRL/SCCS/s.BM_Fnctn_RNK.m
        Latest version:   1.6
        Last mod time:    04/11/89 at 19:18:29

==========================================================================*/

static char *sccsId = "@(#)BM_Fnctn_RNK.m rev 1.6 created on 04/11/89 at 19:18:29";

/*===================== DO NOT REMOVE OR EDIT ===========================*/


#include "objc.h"
#include "BMWGlobal.h"

@requires BM_Matrix, CharString;

= BM_Fnctn_RNK: BM_StatisticalFunction (BM_WorkstationMsgs, Collection, Primitive)
   {
   }

   -(STR)functionNameSTR
      {
       return "Rank";
      }

   -(unsigned)nUnnamedArgsRequired
      {
       return 1;
      }

  -computeWith:arg weights:weights
      {
       return [arg quantile:0.0 weights:weights];
      }


=:

/*===================== DO NOT REMO    R EDIT ===========================

        This comment and the following sccsId declaration are managed
        by SCCS for you. Do not edit or remove either.

        Source file:      /users/bmw/Alpha/VRL/SCCS/s.BM_Fnctn_STD.m
        Latest version:   1.5
        Last mod time:    05/13/89 at 15:59:51

==========================================================================*/

static char *sccsId = "@(#)BM_Fnctn_STD.m rev 1.5 created on 05/13/89 at 15:59:51";

/*===================== DO NOT REMOVE OR EDIT ===========================*/

#include "objc.h"
#include "BMWGlobal.h"

@requires BM_Matrix, CharString;

= BM_Fnctn_STD: BM_StatisticalFunction (BM_WorkstationMsgs, Collection, Primitive)
   {
   }

   -(STR)functionNameSTR
      {
```

```
    return "StdDeviation";
   }

 -(unsigned)nUnnamedArgsRequired
   {
    return 1;
   }

 -computeWith:arg weights:weights
   {
    NUMBER stddev = [arg stddev:weights];

    [arg free];

    if (stddev == BOGUS_VALUE)
       return [BM_Matrix nRows:1 nColumns:1];
    else
       return [BM_Matrix nRows:1 nColumns:1 fillWith:stddev];
   }

=:

/*===================== DO NOT REMO'   ? EDIT ==============================

       This comment and the following sccsId declaration are managed
       by SCCS for you. Do not edit or remove either.

       Source file:     /users/bmw/Alpha/VRL/SCCS/s.BM_Fnctn_SUB.m
       Latest version:  1.3
       Last mod time:   04/11/89 at 19:18:12

==========================================================================*/

static char *sccsId = "@(#)BM_Fnctn_SUB.m rev 1.3 created on 04/11/89 at 19:18:12";

/*===================== DO NOT REMOVE OR EDIT ===========================*/


#include "objc.h"
#include "uil.h"

= BM_Fnctn_SUB: BM_ArithmeticFunction (BM_WorkstationMsgs, Collection, Primitive)
  {
  }

  -(STR)functionNameSTR
    {
     return "sub";
    }

  -(unsigned)nUnnamedArgsRequired
    {
     return 2;
    }

  -computeWith:arg1:arg2
    {
     id temp   = [arg2 multiplyByScalar:-1.0];
     id result = [arg1 addElementWise:temp];
     [temp free];
     return result;
    }

=:
```

```
/*==================== DO NOT REMOV    EDIT ============================

        This comment and the following sccsId declaration are managed
        by SCCS for you. Do not edit or remove either.

        Source file:     %F%
        Latest version:  %I%
        Last mod time:   %H% at %U%

=====================================================================*/

static char *sccsId = "@(#)BM_Fnctn_TOT.m work in progress by bmw";

/*==================== DO NOT REMOVE OR EDIT ===========================*/

#include "objc.h"
#include "BMWGlobal.h"

@requires BM_Matrix, CharString;

= BM_Fnctn_TOT: BM_StatisticalFunction (BM_WorkstationMsgs, Collection, Primitive)
  {
  }

  -(STR)functionNameSTR
    {
     return "Total";
    }

  -(unsigned)nUnnamedArgsRequired
    {
     return 1;
    }

 -computeWith:arg weights:weights
    {
     NUMBER total = [arg total:weights];

     [arg free];

     if (total == BOGUS_VALUE)
        return [BM_Matrix nRows:1 nColumns:1];
     else
        return [BM_Matrix nRows:1 nColumns:1 fillWith:total];
    }


=:

/*==================== DO NOT REMOV    EDIT ============================

        This comment and the following sccsId declaration are managed
        by SCCS for you. Do not edit or remove either.

        Source file:     /users/bmw/Alpha/VRL/SCCS/s.BM_For.m
        Latest version:  1.7
        Last mod time:   08/27/89 at 17:19:04

=====================================================================*/

static char *sccsId = "@(#)BM_For.m rev 1.7 created on 08/27/89 at 17:19:04";

/*==================== DO NOT REMOVE OR EDIT ===========================*/
```

```
#include "batterymarch.h"
#include "objc.h"
#include "uil.h"


= BM_For : BM_BinaryParseTreeNode (BMPARSE)
{
}

-(STR)nodeName
{
    return "For";
}

-evaluate:aPsb
{
 if (![aPsb globalStatus])
 {
 [self evaluating:YES];
 psb = aPsb;

 [psb initializeForContext:[self leftNode]
              globalDate:[[self rightNode] modifierFor:"date"]
            globalOffset:[[self rightNode] modifierFor:"offset"]
              globalOver:[[self rightNode] modifierFor:"over"]];

 [self savedUniverse:[[psb currentUniverse] copy]];

 if ([psb currentUniverse] == nil)
    [psb contextError];
 [self evaluating:NO];
 }
}



-modifierFor:(STR)string
  {
   return [[self rightNode] modifierFor:string];
  }


-BMinterface(BS_For)



-listOn:nodeText
      {
      [nodeText concatSTR:[self nodeName]];
      [nodeText concatSTR:" "];
      [[children at:0] listOn:nodeText];
      if ([children at:1])
             {
             [nodeText concatSTR:"("];
             [[children at:1] listOn:nodeText];
             [nodeText concatSTR:")"];
             }
      [nodeText concatSTR:"\n"];

      return nodeText;
      }

=:
```

```
/*===================== DO NOT REMOVI    EDIT ==============================

       This comment and the following sccsId declaration are managed
       by SCCS for you. Do not edit or remove either.

       Source file:     /users/bmw/Alpha/VRL/SCCS/s.BM_FunServer.m
       Latest version:  1.13
       Last mod time:   08/07/89 at 16:48:10
===========================================================================*/

static char *sccsId = "@(#)BM_FunServer.m rev 1.13 created on 08/07/89 at 16:48:10";

/*===================== DO NOT REMOVE OR EDIT ==========================*/

#include <stdio.h>
#include "objc.h"
#include "uil.h"

#include "BMWGlobal.h"

@requires BM_Fnctn_ADD, BM_Fnctn_EXP, BM_Fnctn_LOG, BM_Fnctn_MIN, BM_Fnctn_MAX,
          BM_Fnctn_TOT, BM_Fnctn_AVG, BM_Fnctn_RNK, BM_Fnctn_STD, BM_Fnctn_REV,
          BM_Fnctn_CNT, BM_Fnctn_ABS, BM_Fnctn_LOW, BM_Fnctn_HI,
          BM_Fnctn_NRM, BM_Fnctn_POW, BM_Fnctn_MLT, BM_Fnctn_PRP,
          BM_Fnctn_AND, BM_Fnctn_NOT, BM_Fnctn_OR,  BM_Fnctn_LT,
          BM_Fnctn_GT,  BM_Fnctn_GE,  BM_Fnctn_LE,  BM_Fnctn_NE,  BM_Fnctn_EQ,
          BM_Fnctn_NEG, BM_Fnctn_QRT, BM_Fnctn_PRC, BM_Fnctn_DEC,
          BM_Fnctn_SUB, BM_Fnctn_DIV, BM_Fnctn_NUL, BM_Fnctn_CUM, Dictionary,
          OrdCltn, CharString, BM_CICharString, BM_StringMatrix;
= BM_FunctionServer : Object (BM_WorkstationMsgs,Collection, Primitive)
   {
    id dictionary;
   }

   +new
     {
      id name,
         function;

      self = [super new];
      dictionary = [Dictionary new:0];

      function = [BM_Fnctn_ADD new];
      name     = [BM_CICharString str:[function functionNameSTR]];
      [dictionary atKey:name put:function];

      function = [BM_Fnctn_LOG new];
      name     = [BM_CICharString str:[function functionNameSTR]];
      [dictionary atKey:name put:function];

      function = [BM_Fnctn_EXP new];
      name     = [BM_CICharString str:[function functionNameSTR]];
      [dictionary atKey:name put:function];

      function = [BM_Fnctn_ABS new];
      name     = [BM_CICharString str:[function functionNameSTR]];
      [dictionary atKey:name put:function];

      function = [BM_Fnctn_MIN new];
      name     = [BM_CICharString str:[function functionNameSTR]];
      [dictionary atKey:name put:function];

      function = [BM_Fnctn_MAX new];
      name     = [BM_CICharString str:[function functionNameSTR]];
```

```
[dictionary atKey:name put:fu    ɔn];

function = [BM_Fnctn_AVG new];
name     = [BM_CICharString str:[function functionNameSTR]];
[dictionary atKey:name put:function];

function = [BM_Fnctn_LOW new];
name     = [BM_CICharString str:[function functionNameSTR]];
[dictionary atKey:name put:function];

function = [BM_Fnctn_HI new];
name     = [BM_CICharString str:[function functionNameSTR]];
[dictionary atKey:name put:function];

function = [BM_Fnctn_TOT new];
name     = [BM_CICharString str:[function functionNameSTR]];
[dictionary atKey:name put:function];

function = [BM_Fnctn_CNT new];
name     = [BM_CICharString str:[function functionNameSTR]];
[dictionary atKey:name put:function];

function = [BM_Fnctn_STD new];
name     = [BM_CICharString str:[function functionNameSTR]];
[dictionary atKey:name put:function];

function = [BM_Fnctn_NRM new];
name     = [BM_CICharString str:[function functionNameSTR]];
[dictionary atKey:name put:function];

function = [BM_Fnctn_PRP new];
name     = [BM_CICharString str:[function functionNameSTR]];
[dictionary atKey:name put:function];

function = [BM_Fnctn_RNK new];
name     = [BM_CICharString str:[function functionNameSTR]];
[dictionary atKey:name put:function];

function = [BM_Fnctn_DEC new];
name     = [BM_CICharString str:[function functionNameSTR]];
[dictionary atKey:name put:function];

function = [BM_Fnctn_PRC new];
name     = [BM_CICharString str:[function functionNameSTR]];
[dictionary atKey:name put:function];

function = [BM_Fnctn_QRT new];
name     = [BM_CICharString str:[function functionNameSTR]];
[dictionary atKey:name put:function];
/*
function = [BM_Fnctn_REV new];
name     = [BM_CICharString str:[function functionNameSTR]];
[dictionary atKey:name put:function];
*/
function = [BM_Fnctn_POW new];
name     = [BM_CICharString str:[function functionNameSTR]];
[dictionary atKey:name put:function];

function = [BM_Fnctn_SUB new];
name     = [BM_CICharString str:[function functionNameSTR]];
[dictionary atKey:name put:function];

function = [BM_Fnctn_MLT new];
name     = [BM_CICharString str:[function functionNameSTR]];
[dictionary atKey:name put:function];
```

```
function = [BM_Fnctn_NEG new];
name     = [BM_CICharString str.[function functionNameSTR]];
[dictionary atKey:name put:function];

function = [BM_Fnctn_DIV new];
name     = [BM_CICharString str:[function functionNameSTR]];
[dictionary atKey:name put:function];

function = [BM_Fnctn_AND new];
name     = [BM_CICharString str:[function functionNameSTR]];
[dictionary atKey:name put:function];

function = [BM_Fnctn_OR new];
name     = [BM_CICharString str:[function functionNameSTR]];
[dictionary atKey:name put:function];

function = [BM_Fnctn_NOT new];
name     = [BM_CICharString str:[function functionNameSTR]];
[dictionary atKey:name put:function];

function = [BM_Fnctn_GE new];
name     = [BM_CICharString str:[function functionNameSTR]];
[dictionary atKey:name put:function];

function = [BM_Fnctn_LE new];
name     = [BM_CICharString str:[function functionNameSTR]];
[dictionary atKey:name put:function];

function = [BM_Fnctn_GT new];
name     = [BM_CICharString str:[function functionNameSTR]];
[dictionary atKey:name put:function];

function = [BM_Fnctn_LT new];
name     = [BM_CICharString str:[function functionNameSTR]];
[dictionary atKey:name put:function];

function = [BM_Fnctn_EQ new];
name     = [BM_CICharString str:[function functionNameSTR]];
[dictionary atKey:name put:function];

function = [BM_Fnctn_NE new];
name     = [BM_CICharString str:[function functionNameSTR]];
[dictionary atKey:name put:function];

function = [BM_Fnctn_NUL new];
name     = [BM_CICharString str:[function functionNameSTR]];
[dictionary atKey:name put:function];

function = [BM_Fnctn_CUM new];
name     = [BM_CICharString str:[function functionNameSTR]];
[dictionary atKey:name put:function];

return self;
}

-functionNames
{
  id entry;
  id list = [BM_StringMatrix nRows:1 nColumns:1];
  id temp = [BM_StringMatrix nRows:1 nColumns:1];

  BOOL firstOne = YES;

  id sequence = [dictionary eachElement];
```

```
 while (entry = [sequence next]
   {
    STR str = [entry str];

    if (toupper(str[0])==str[0])
       if (firstOne)
          {
           [list atRow:0 Col:0 put:[[entry key] shared$]];
           firstOne = NO;
          }
       else
          {
           [temp atRow:0 Col:0 put:[[entry key] shared$]];
           list = [list concatenateFrom:temp firstRow:0 lastRow:0];
          }
   }

 [temp free];
 [sequence free];

 return list;
}


-evaluate:client
  {
   id identifier, value,fn;
   int nPositionals;
   int i;

   nPositionals = (int) [client positionals];
   identifier = [client identifier];

   if (globalDebugFlag) {
   printf("FunctionServer evaluate: %s\n",[identifier str]);
   printf("    positionals = %d\n",nPositionals);
   }

   fn = [dictionary atKey:identifier];

   if(globalDebugFlag)printf("    function address = %X\n", fn);

   value = [fn evaluate:client];

   [value name:[CharString str:[identifier str]]];

   if(globalDebugFlag)printf("    value = %X\n", value);

   return value;
  }

=:
/*===================== DO NOT REMOVE    EDIT ============================

        This comment and the following sccsId declaration are managed
        by SCCS for you. Do not edit or remove either.

        Source file:     %F%
        Latest version:  %I%
        Last mod time:   %H% at %U%

========================================================================*/

static char *sccsId = "@(#)BM_FuncCall.m work in progress by bmw";
```

```
/*==================== DO NOT REMOVE OR EDIT ==========================*/

#include <stdio.h>
#include "batterymarch.h"
#include "objc.h"
#include "uil.h"

#include "BMWGlobal.h"


/*
        The left (at:0) child is an Identifier.
        The right (at:1) child is a NamedExpressionList.
*/

@requires CharString, BM_Matrix, BM_StringMatrix;

= BM_FunctionCall : BM_BinaryParseTreeNode (BMPARSE)
{
 BOOL returnMyValues;
}

-(STR)nodeName
{
    return "FunctionCall";
}

-BMinterface(BS_FunctionCall)

-evaluate:aPsb
{
 id v;


 if (![aPsb globalStatus])
 {
    [self evaluating:YES];

    [super evaluate:aPsb];              // this does the children
 }

 if (![aPsb globalStatus])
 {
    returnMyValues = NO; /* hack! */

    [[self leftNode] evaluating:YES];

    v = nil;

    if (_dictcmp([[self leftNode] str], "profile"))
       {
        [self value:v = [[psb functionServer] evaluate:self]];
    if ([psb keepValues])
       {
        [self savedUniverse:[[psb currentUniverse] copy]];
        [self savedValues:[v copy]];
       }
   }
 else
   if ([[psb currentUniverse] size] == 1)
      {
       int type;
       unsigned index;
```

```
    id rNode = [self rightNode];

    id l = [BM_StringMatrix nRows:(unsigned)[rNode positionals]
                        nColumns:1];

    for (index = 0; index < [rNode positionals]; index++)
      {
       id entityName;
       id newValue = [rNode dataValueAtArg:index];

       [l atRow:(unsigned)index Col:0 put:[CharString
                                      str:[newValue nameSTR]]];

       if (v == nil)
         {
          v = newValue;

          entityName = [[psb databaseServer]
                           namesFor:[psb currentUniverse]];
          [v nameSTR:[[entityName at:0] str]];
          [entityName free];

          if ([v isKindOf:BM_StringMatrix])
             type = STRING_TYPE;
          else
             type = NUMERIC_TYPE;
         }
       else
         {
          if (([newValue nColumns] == [v nColumns]) &&
              ((([newValue isKindOf:BM_StringMatrix]) &&
                (type == STRING_TYPE)) ||
               (([newValue isKindOf:BM_Matrix]) &&
                (type == NUMERIC_TYPE))))
             v = [v concatenateWith:newValue];
          else
            {
             v = [v free];
             l = [l free];
             break;
            }
         }
      }

  [self value:v];

  if ([psb keepValues])
    {
     [self savedValues:[v copy]];
     [self savedUniverse:nil];
     [self savedLabels:l];
    }
}

if (v == nil)
   [psb functionCallError];

[[self leftNode] evaluating:NO];
[self evaluating:NO];

returnMyValues = YES; /* hack! */

return v;
```

```
}
else
  return nil;
}

-(BOOL)isArithExpr { return YES; }

-identifier
{
   return [[self at:0] identifier];
}

-(int)nPositionals { return 1; }          // the number of values I have
-(int)positionals                         // the number of args I present
                                          // to a FunctionServer

{
   return [[self at:1] nPositionals];
}

-dataValueFor:(STR)keyword
{
   return [[self at:1] dataValueFor:keyword];
}

-dataValueAtArg:(int)position
{
   return returnMyValues?[self          dataValueAt:position]
                        :[[self at:1] dataValueAt:position];

}

-dataValueAt:(int)n { return (n==0) ? [self value] :
                                      [self error:"requested arg not present"];

}

-(BOOL)containsOnlyKeywords:(STR *)words
{
}

-(BOOL)containsAllKeywords:(STR *)words
{
}

-identitiesForCurrentUniverse
{
 return [[psb databaseServer] identityMapFor:[psb currentUniverse]
                                 targetGroup:nil];

}

-identsForDefaultGrpWRTCurUniv
{
 return [[psb databaseServer] identityMapFor:[psb currentUniverse]
                                 targetGroup:[psb defaultGroup]];

}

-constantForCurrentUniverse
{
 return [[psb databaseServer] numericConstantFor:self];

}

-(double)number
{
return 1.0;
}
```

```
-listOn:nodeText
        {
        [[children at:0] listOn:nodeText];
        [nodeText concatSTR:"["];
        [[children at:1] listOn:nodeText];
        [nodeText concatSTR:"]"];
        return nodeText;
        }
=:

/*==================== DO NOT REMOVE   EDIT ============================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "%Z%%M% rev %I% created on %H% at %U%";

/*==================== DO NOT REMOVE OR EDIT ==========================*/


#include "objc.h"
#include "uil.h"

#include "BMWGlobal.h"


= BM_Function: Object (BM_WorkstationMsgs,
                          Collection, Primitive)
  {
  }

  -(BOOL)checkArgs:argList
    {
     if (([argList positionals] == [self nUnnamedArgsRequired]) ||
        ([self nUnnamedArgsRequired] == VARIABLE_NARGS))
        return YES;
     else
        return NO;
    }

  -(unsigned)nUnnamedArgsRequired
    {
     /* subclass responsibility */
    }

  -namedArgsSupported
    {
     /* subclass responsibility */
    }

  -execute:argList
    {
     /* subclass responsibility */
    }

=:
```

```
/*===================== DO NOT REMOVE    EDIT ============================

      This comment and the following sccsId declaration are managed
      by SCCS for you. Do not edit or remove either.

      Source file:     /users/bmw/Alpha/VRL/SCCS/s.BM_Ident.m
      Latest version:  1.4
      Last mod time:   04/07/89 at 14:20:42
=========================================================================*/
static char *sccsId = "@(#)BM_Ident.m rev 1.4 created on 04/07/89 at 14:20:42";
/*===================== DO NOT REMOVE OR EDIT ==========================*/

#include "batterymarch.h"
#include "objc.h"
#include "uil.h"

@requires BM_CICharString;

= BM_Identifier : BM_ParseTreeNode (BMPARSE)
{
    id name;    // a CharString
}

+str:(STR)ident
{
    self = [self new];
    name = [BM_CICharString str:ident];
    return self;
}

+(int)defaultChildren { return 0;}

-BMinterface(BS_Identifier)

-(STR)str { return [name str]; }

-terminate$
{
    [name free];
    return [super terminate$];
}

-identifier { return name; }

#define MAXNODENAMELEN  200
-(STR)nodeNameText { return "Identifier "; }

-(STR)nodeName
{
    int j;
    char nodeName[MAXNODENAMELEN+1];
    strcpy(nodeName, [self nodeNameText]);
    j = strlen(nodeName);
    [name strcat:nodeName];
    return nodeName;
}

-modifierFor:(STR)keyword
{
    return nil;
}
```

```
{
return nil;
}

-listOn:nodeText
    {
    [nodeText concatSTR:[self str]];
    return nodeText;
    }

=:

/*==================== DO NOT REMOVE    EDIT ============================

    This comment and the following sccsId declaration are managed
    by SCCS for you. Do not edit or remove either.

    Source file:     /users/bmw/Alpha/VRL/SCCS/s.BM_Install.m
    Latest version:  1.1
    Last mod time:   02/22/89 at 16:53:01

=========================================================================*/

static char *sccsId = "@(#)BM_Install.m rev 1.1 created on 02/22/89 at 16:53:01";

/*==================== DO NOT REMOVE OR EDIT ===========================*/


#include <stdio.h>
#include "batterymarch.h"
#include "objc.h"
#include "uil.h"

= BM_Install : BM_Set (BMPARSE)
{
}

-(STR)nodeName
{
   return "Install";
}


-BMinterface(BS_Assign)


=:

    {
     id list = [BM_StringMatrix nRows:y nColumns:1];
     unsigned row = 0;

     [list atRow:row++ Col:0 put:[CharString str:"date:"]];
     [list atRow:row++ Col:0 put:[CharString str:"offset:"]];
     [list atRow:row++ Col:0 put:[CharString str:"over:"]];
     [list atRow:row++ Col:0 put:[CharString str:"stepOver:"]];
     [list atRow:row++ Col:0 put:[CharString str:"toPass:"]];
     [list atRow:row++ Col:0 put:[CharString str:"within:"]];
     [list atRow:row++ Col:0 put:[CharString str:"weights:"]];
     [list atRow:row++ Col:0 put:[CharString str:"file:"]];
     [list atRow:row++ Col:0 put:[CharString str:"template:"]];

     return list;
    }
```

```
/* this should be in DBServer!! */

-qualifierList
  {
   int  row;
   id   table, list, temp;
   BOOL firstOne = YES;

   if ([programStatusBlock databaseServer] == nil)
      return nil;

   table = [[programStatusBlock databaseServer] groupTable];
   list  = [BM_StringMatrix nRows:1 nColumns:1];
   temp  = [BM_StringMatrix nRows:1 nColumns:1];

   for (row = 1; row < [table nRows]; row++)
      if ([[table atRow:row Col:0] size])
         if (firstOne)
            {
             [list atRow:0 Col:0
                   put:[[[[CharString str:[[table atRow:row Col:1] str]]
                         concatSTR:"("]
                         concatSTR:[[table atRow:row Col:0] str]]
                         concatSTR:")"]];
             firstOne = NO;
            }
         else
            {
             [temp atRow:0 Col:0
                   put:[[[[CharString str:[[table atRow:row Col:1] str]]
                         concatSTR:"("]
                         concatSTR:[[table atRow:row Col:0] str]]
                         concatSTR:")"]];
             list = [list concatenateFrom:temp firstRow:0 lastRow:0];
            }

   if (firstOne)
      list = [list free];

   [temp free];

   return list;
  }
-addDependent:anObject
  {
   return [programStatusBlock addDependent:anObject];
  }
  -resetStatus
    {
     return [programStatusBlock resetStatus];
    }

  -(int)globalStatus
    {
     return [programStatusBlock globalStatus];
    }

  -terminate$
    {
     [self currentModel:nil];

     return [super terminate$];
    }

=:
```

```
/*==================== DO NOT REMOVE    EDIT ============================

        This comment and the following sccsId declaration are managed
        by SCCS for you. Do not edit or remove either.

        Source file:     /users/bmw/Alpha/VRL/SCCS/s.BM_KWexpr.m
        Latest version:  1.3
        Last mod time:   03/23/89 at 12:56:59

=========================================================================*/

static char *sccsId = "@(#)BM_KWexpr.m rev 1.3 created on 03/23/89 at 12:56:59";

/*==================== DO NOT REMOVE OR EDIT ==========================*/

#include "batterymarch.h"
#include "objc.h"
#include "uil.h"


= BM_KeywordExpr : BM_BinaryParseTreeNode (BMPARSE)
{
}

-(STR)nodeName
{
    return "KeywordExpr";
}

-BMinterface(BS_KeywordExpr)

-dataValueFor:(STR)keyword
{
    id left, right;
    left = [self at:0]; right = [self at:1];
    if(!_dictcmp([left str],keyword))return [right value];
    return nil;
}

-(int)nPositionals { return 0; }


-listOn:nodeText
        {
        [[children at:0] listOn:nodeText];
        [nodeText concatSTR:":"];
        [[children at:1] listOn:nodeText];

        return nodeText;
        }

=:

/*==================== DO NOT REMOVE    :DIT ============================

        This comment and the following sccsId declaration are managed
        by SCCS for you. Do not edit or remove either.

        Source file:     /users/bmw/Alpha/VRL/SCCS/s.BM_KWfield.m
        Latest version:  1.3
        Last mod time:   03/23/89 at 12:57:12
```

```
==========================================================================*/

static char *sccsId = "@(#)BM_KWfield.m rev 1.3 created on 03/23/89 at 12:57:12";

/*===================== DO NOT REMOVE OR EDIT ===========================*/

#include "batterymarch.h"
#include "objc.h"
#include "uil.h"


= BM_KeywordField : BM_BinaryParseTreeNode (BMPARSE)
{
}

-(STR)nodeName
{
    return "KeywordField";
}

-BMinterface(BS_KeywordField)

-modifierFor:(STR)keyword
{
    return (!_dictcmp([[self leftNode] str], keyword) ? [self rightNode]:nil);
}

-listOn:nodeText
        {
        [[children at:0] listOn:nodeText];
        [nodeText concatSTR:":"];
        [[children at:1] listOn:nodeText];

        return nodeText;
        }

=:

/*===================== DO NOT REMOVE    .DIT ============================

        This comment and the following sccsId declaration are managed
        by SCCS for you. Do not edit or remove either.

        Source file:     /users/bmw/Alpha/VRL/SCCS/s.BM_LogicAND.m
        Latest version:  1.2
        Last mod time:   03/06/89 at 21:57:44

==========================================================================*/

static char *sccsId = "@(#)BM_LogicAND.m rev 1.2 created on 03/06/89 at 21:57:44";

/*===================== DO NOT REMOVE OR EDIT ===========================*/

#include "batterymarch.h"
#include "objc.h"
#include "uil.h"

= BM_LogicAND : BM_BinaryFunctionParseTreeNode (BMPARSE)
{
}

-(STR)nodeName
{
    return " and ";
```

```
}

-(STR)identifierSTR
{
    return "and";
}

-BMinterface(BS_LogicAND)

=:

/*===================== DO NOT REMOVE   :DIT ==============================

        This comment and the following sccsId declaration are managed
        by SCCS for you. Do not edit or remove either.*

        Source file:     /users/bmw/Alpha/VRL/SCCS/s.BM_LogicEQ.m
        Latest version:  1.2
        Last mod time:   03/06/89 at 21:56:43

==========================================================================*/

static char *sccsId = "@(#)BM_LogicEQ.m rev 1.2 created on 03/06/89 at 21:56:43";

/*===================== DO NOT REMOVE OR EDIT ============================*/

#include "batterymarch.h"
#include "objc.h"
#include "uil.h"

= BM_LogicEQ : BM_BinaryFunctionParseTreeNode (BMPARSE)
{
}

-(STR)nodeName
{
    return "=";
}

-(STR)identifierSTR
{
    return "eq";
}

-BMinterface(BS_LogicEQ)

=:

/*===================== DO NOT REMOVE .  EDIT ==============================

        This comment and the following sccsId declaration are managed
        by SCCS for you. Do not edit or remove either.*

        Source file:     /users/bmw/Alpha/VRL/SCCS/s.BM_LogicGE.m
        Latest version:  1.2
        Last mod time:   03/06/89 at 21:56:55

==========================================================================*/

static char *sccsId = "@(#)BM_LogicGE.m rev 1.2 created on 03/06/89 at 21:56:55";

/*===================== DO NOT REMOVE OR EDIT ============================*/
```

```
#include "batterymarch.h"
#include "objc.h"
#include "uil.h"

= BM_LogicGE : BM_BinaryFunctionParseTreeNode (BMPARSE)
{
}

-(STR)nodeName
{
    return ">=";
}

-(STR)identifierSTR
{
    return "ge";
}

-BMinterface(BS_LogicGE)
=:
/*===================== DO NOT REMOVE    :DIT ==============================

       This comment and the following sccsId declaration are managed
       by SCCS for you. Do not edit or remove either.

       Source file:     /users/bmw/Alpha/VRL/SCCS/s.BM_LogicGT.m
       Latest version:  1.2
       Last mod time:   03/06/89 at 21:57:32

==========================================================================*/

static char *sccsId = "@(#)BM_LogicGT.m rev 1.2 created on 03/06/89 at 21:57:32";

/*===================== DO NOT REMOVE OR EDIT ===========================*/

#include "batterymarch.h"
#include "objc.h"
#include "uil.h"

= BM_LogicGT : BM_BinaryFunctionParseTreeNode (BMPARSE)
{
}

-(STR)nodeName
{
    return ">";
}

-(STR)identifierSTR
{
    return "gt";
}

-BMinterface(BS_LogicGT)
=:
/*===================== DO NOT REMOVE .  EDIT ==============================

       This comment and the following sccsId declaration are managed
       by SCCS for you. Do not edit or remove either.

       Source file:     /users/bmw/Alpha/VRL/SCCS/s.BM_LogicLE.m
       Latest version:  1.2
       Last mod time:   03/06/89 at 21:57:19
```

```
=========================================================================*/

static char *sccsId = "@(#)BM_LogicLE.m rev 1.2 created on 03/06/89 at 21:57:19";

/*===================== DO NOT REMOVE OR EDIT ============================*/

#include "batterymarch.h"
#include "objc.h"
#include "uil.h"

= BM_LogicLE : BM_BinaryFunctionParseTreeNode (BMPARSE)
{
}

-(STR)nodeName
{
    return "<=";
}

-(STR)identifierSTR
{
    return "le";
}

-BMinterface(BS_LogicLE)
=:

/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BM_LogicLT.m
        Latest version:  1.2
        Last mod time:   03/06/89 at 21:57:08

=========================================================================*/

static char *sccsId = "@(#)BM_LogicLT.m rev 1.2 created on 03/06/89 at 21:57:08";

/*===================== DO NOT REMOVE OR EDIT ============================*/

#include "batterymarch.h"
#include "objc.h"
#include "uil.h"

= BM_LogicLT : BM_BinaryFunctionParseTreeNode (BMPARSE)
{
}

-(STR)nodeName
{
    return "<";
}

-(STR)identifierSTR
{
    return "lt";
}

-BMinterface(BS_LogicLT)
=:
```

```
/*===================== DO NOT REMOVE ... EDIT =============================

      This comment and the following sccsId declaration are managed
      by SCCS for you. Do not edit or remove either.

      Source file:     /users/bmw/Alpha/VRL/SCCS/s.BM_LogicNE.m
      Latest version:  1.2
      Last mod time:   03/06/89 at 21:58:20

=========================================================================*/

static char *sccsId = "@(#)BM_LogicNE.m rev 1.2 created on 03/06/89 at 21:58:20";

/*===================== DO NOT REMOVE OR EDIT ===========================*/

#include "batterymarch.h"
#include "objc.h"
#include "uil.h"

= BM_LogicNE : BM_BinaryFunctionParseTreeNode (BMPARSE)
{
}

-(STR)nodeName
{
    return "<>";
}

-(STR)identifierSTR
{
    return "ne";
}

-BMinterface(BS_LogicNE)
=:
/*===================== DO NOT REMOVE    EDIT =============================

      This comment and the following sccsId declaration are managed
      by SCCS for you. Do not edit or remove either.

      Source file:     /users/bmw/Alpha/VRL/SCCS/s.BM_LogicNOT.m
      Latest version:  1.2
      Last mod time:   03/06/89 at 21:58:32

=========================================================================*/

static char *sccsId = "@(#)BM_LogicNOT.m rev 1.2 created on 03/06/89 at 21:58:32";

/*===================== DO NOT REMOVE OR EDIT ===========================*/

#include "batterymarch.h"
#include "objc.h"
#include "uil.h"


= BM_LogicNOT : BM_BinaryFunctionParseTreeNode (BMPARSE)
{
}

-(STR)nodeName
{
    return " not ";
}
```

```
-(STR)identifierSTR
{
    return "not";
}

-(int)positionals { return 1; }         // the number of args I present to
                                        // aFunctionServer

-BMinterface(BS_LogicNOT)


-listOn:nodeText
        {
        if ([self hasParentheses])
                [nodeText concatSTR:"("];
        [nodeText concatSTR:[self nodeName]];
        [[children at:0] listOn:nodeText];
        if ([self hasParentheses])
                [nodeText concatSTR:")"];

        return nodeText;
        }

=:

/*==================== DO NOT REMOVE    EDIT ============================

        This comment and the following sccsId declaration are managed
        by SCCS for you. Do not edit or remove either.

        Source file:      /users/bmw/Alpha/VRL/SCCS/s.BM_LogicOR.m
        Latest version:   1.2
        Last mod time:    03/06/89 at 21:58:55

========================================================================*/

static char *sccsId = "@(#)BM_LogicOR.m rev 1.2 created on 03/06/89 at 21:58:55";

/*==================== DO NOT REMOVE OR EDIT ===========================*/

#include "batterymarch.h"
#include "objc.h"
#include "uil.h"

= BM_LogicOR : BM_BinaryFunctionParseTreeNode (BMPARSE)
{
}

-(STR)nodeName
{
    return " or ";
}

-(STR)identifierSTR
{
    return "or";
}

-BMinterface(BS_LogicOR)
=:

/*==================== DO NOT REMOVE   EDIT ============================

       This comment and the following sccsId declaration are managed
       by SCCS for you. Do not edit or remove either.
```

```
        Source file:     %F%
        Latest version:  %I%
        Last mod time:   %H% at %U%

========================================================================*/

static char *sccsId = "@(#)BM_Memo.m work in progress by bmw";

/*===================== DO NOT REMOVE OR EDIT ===========================*/

#include "objc.h"
#include "uil.h"
#include "batterymarch.h"
#include "BMWGlobal.h"

@requires Chart,Report,CharString,BM_AskDialogBox;

= BM_Memo : BM_ParseTreeNode (BMPARSE)
{
}

+string:aStrLiteral enclose:aNamedExprList message:aNamedStringList
{
    self = [super new];
    [children at:0 put:aStrLiteral];
    [children at:1 put:aNamedExprList];
    [children at:2 put:aNamedStringList];
    return self;
}

+(int)defaultChildren { return 3;}

-(STR)nodeName
{
    return "Make";
}

-evaluate:aPsb
{
    int size;
    id myDocument, fileName;
    id tempName, tempFileName;
    char aFileName[20];
    id response;
    id newInterface;
    BOOL cancelFlag;

    psb = aPsb;
    [super evaluate:aPsb];

    if (![aPsb globalStatus])
      {
      if (! (_dictcmp([[children at:0] str],"Report")) )
         myDocument = [Report memo:[children at:2]:[children at:1]];
      else
         myDocument = [Chart memo:[children at:2]:[children at:1]];

      if (myDocument == nil)
         [psb memoError];
      else
         {
         tempName = [[children at:2]   ifierFor:"file"];
```

```
         if (strcmp([tempName str],""))
            {
            fileName = [CharString str:[tempName str]];
            [fileName concatSTR:[myDocument extensionSTR]];

            tempFileName = [[CharString str:"./temp/"] concat:fileName];
            [myDocument storeOn:[tempFileName str]];

            cancelFlag = NO;
            while ((!cancelFlag) &&
               ((newInterface = [deskTop installSTR:[fileName str]
                   oldFullPath:[tempFileName str]]) == nil))
               {
               strncpy(aFileName,[fileName str],size=[fileName length]-4);
               aFileName[size] = '\0';

               response = [BM_AskDialogBox
                  askSTR:"File exists! Change file name:"
                     defaultValue:aFileName client:deskTop];
               if ([response length]==0)
                  cancelFlag = YES;
               else
                  {
                  [fileName assignSTR:[response str]];
                  [fileName concatSTR:[myDocument extensionSTR]];
                  }
               [response free];
               }
            [fileName free];
            [tempFileName free];

            if (cancelFlag)
               myDocument = [myDocument free];
            else
               {
               [newInterface document:myDocument];
               [[newInterface iconHandler] open];
               }
            }
         else
            [self value:myDocument];
         }
      }
   return self;
}


-BMinterface(BS_Memo)



-listOn:nodeText
      {
      [nodeText concatSTR:[self nodeName]];
      [nodeText concatSTR:" "];
      [[children at:0] listOn:nodeText];
      [nodeText concatSTR:"\nenclose("];
      [[children at:1] listOn:nodeText];
      [nodeText concatSTR:")\nmessage("];
      [[children at:2] listOn:nodeText];
      [nodeText concatSTR:")\n"];

      return nodeText;
      }
```

```
=:
/*===================== DO NOT REMOVE    EDIT =============================

      This comment and the following sccsId declaration are managed
      by SCCS for you. Do not edit or remove either.

      Source file:    /users/bmw/Alpha/VRL/SCCS/s.BM_NaExprLi.m
      Latest version: 1.2
      Last mod time:  03/06/89 at 22:02:10

==========================================================================*/

static char *sccsId = "@(#)BM_NaExprLi.m rev 1.2 created on 03/06/89 at 22:02:10";

/*===================== DO NOT REMOVE OR EDIT ============================*/

#include "batterymarch.h"
#include "objc.h"
#include "uil.h"

@requires BM_KeywordExpr;

= BM_NamedExprList : BM_BinaryParseTreeNode (BMPARSE)
{
}

-(STR)nodeName
{
    return "NamedExprList";
}

-BMinterface(BS_NamedExprList)

-(int)nPositionals
{
    return [[self leftNode] nPositionals] + [[self rightNode] nPositionals];
}

-dataValueAt:(int)position
{
    id left, right;
    int leftCnt;

    left = [self at:0]; right = [self at:1];

    leftCnt = [left nPositionals];

    return (position < leftCnt) ? [left dataValueAt:position] :
        [right dataValueAt:(position-leftCnt)];
}

-dataValueFor:(STR)keyword
{
    id left, right;
    id tmp;

    left = [self at:0]; right = [self at:1];

    return (tmp = [left dataValueFor:keyword]) ? tmp :
        [right dataValueFor:keyword];
}

-(BOOL)containsOnlyKeywords:(STR *)words
{
```

```
}

-(BOOL)containsAllKeywords:(STR *)words
{
}


-listOn:nodeText
        {
        [[children at:0] listOn:nodeText];

        if ([children at:1])
        {
                [nodeText concatSTR:","];
                [[children at:1] listOn:nodeText];
        }

        return nodeText;
        }
=:

/*==================== DO NOT REMOVE  . EDIT =============================

        This comment and the following sccsId declaration are managed
        by SCCS for you. Do not edit or remove either.*

        Source file:     /users/bmw/Alpha/VRL/SCCS/s.BM_NaStr.m
        Latest version:  1.2
        Last mod time:   03/06/89 at 22:00:57

==========================================================================*/

static char *sccsId = "@(#)BM_NaStr.m rev 1.2 created on 03/06/89 at 22:00:57";

/*==================== DO NOT REMOVE OR EDIT ===========================*/

#include "batterymarch.h"
#include "objc.h"
#include "uil.h"

= BM_NamedStringList : BM_BinaryParseTreeNode (BMPARSE)
{
}

-(STR)nodeName
{
    return "NamedStringList";
}

-BMinterface(BS_NamedStringList)

-modifierFor:(STR)keyword
{
    id modifier;

    return (modifier=[[self leftNode] modifierFor:keyword]) ? modifier :
        [[self rightNode] modifierFor:keyword];
}


-listOn:nodeText
       {
       [[children at:0] listOn:nodeText];
```

```
if ([children at:1])
{
        [nodeText concatSTR:","];
        [[children at:1] listOn:nodeText];
}

return nodeText;
}


=:

/*===================== DO NOT REMOVE    EDIT ==============================

    This comment and the following sccsId declaration are managed
    by SCCS for you. Do not edit or remove either.

    Source file:     /users/bmw/Alpha/VRL/SCCS/s.BM_Next.m
    Latest version:  1.5
    Last mod time:   08/12/89 at 11:34:15

==========================================================================*/

static char *sccsId = "@(#)BM_Next.m rev 1.5 created on 08/12/89 at 11:34:15";

/*===================== DO NOT REMOVE OR EDIT ===========================*/

#include "batterymarch.h"
#include "objc.h"
#include "uil.h"

= BM_Next : BM_Nonary (BMPARSE)
{
}

-(STR)nodeName
{
    return "Next";
}

-evaluate:aPsb
{
 if (![aPsb globalStatus])
 {
 psb = aPsb;

 [psb globalDate:nil];
 [psb globalOffset:nil];
 [psb globalOver:nil];
 }
}

-BMinterface(BS_Next)


-listOn:nodeText
        {
        [nodeText concatSTR:[self nodeName]];
        [nodeText concatSTR:"\n"];
        return nodeText;
        }


=:
```

```
/*===================== DO NOT REMOVI    EDIT ============================

       This comment and the following sccsId declaration are managed
       by SCCS for you. Do not edit or remove either.
       Source file:     %F%
       Latest version:  %I%
       Last mod time:   %H% at %U%
=========================================================================*/

static char *sccsId = "%Z%%M% rev %I% created on %H% at %U%";

/*===================== DO NOT REMOVE OR EDIT ===========================*/

#include "batterymarch.h"
#include "objc.h"
#include "uil.h"

= BM_Nonary : BM_ParseTreeNode (BMPARSE)
{
}

+(int)defaultChildren { return 0;}

-(STR)nodeName
{
    return "Nonary";
}

=:

/*===================== DO NOT REMOVE    EDIT ============================

       This comment and the following sccsId declaration are managed
       by SCCS for you. Do not edit or remove either.

       Source file:     /users/bmw/Alpha/VRL/SCCS/s.BM_NullStmt.m
       Latest version:  1.2
       Last mod time:   03/06/89 at 21:56:32

=========================================================================*/

static char *sccsId = "@(#)BM_NullStmt.m rev 1.2 created on 03/06/89 at 21:56:32";

/*===================== DO NOT REMOVE OR EDIT ===========================*/

#include "batterymarch.h"
#include "objc.h"
#include "uil.h"

= BM_NullStatement : BM_UnaryParseTreeNode (BMPARSE)
{
}

-(STR)nodeName
{
    return "nullstmt";
}

-BMinterface(BS_NullStatement)

-listOn:nodeText
        {
        return nodeText;
        }
=:
```

```
/*===================== DO NOT REMOV     EDIT ============================

       This comment and the following sccsId declaration are managed
       by SCCS for you. Do not edit or remove either.

       Source file:     %F%
       Latest version:  %I%
       Last mod time:   %H% at %U%

========================================================================*/

static char *sccsId = "%Z%%M% rev %I% created on %H% at %U%";

/*===================== DO NOT REMOVE OR EDIT ===========================*/

#include "batterymarch.h"
#include "objc.h"
#include "uil.h"

= BM_Pause : BM_UnaryParseTreeNode (BMPARSE)
{
}

-(STR)nodeNameText
{
    return "Pause ";
}

-BMinterface(BS_Pause)
=:
/*===================== DO NOT REMOVE   . EDIT ============================

       This comment and the following sccsId declaration are managed
       by SCCS for you. Do not edit or remove either.

       Source file:     /users/bmw/Alpha/VRL/SCCS/s.BM_Plate.m
       Latest version:  1.4
       Last mod time:   08/12/89 at 11:34:24

========================================================================*/

static char *sccsId = "@(#)BM_Plate.m rev 1.4 created on 08/12/89 at 11:34:24";

/*===================== DO NOT REMOVE OR EDIT ===========================*/

#include "batterymarch.h"
#include "objc.h"
#include "uil.h"

#include <stdio.h>


@requires BM_Parser, BM_StreamString;

= BM_Plate : BM_ParseTreeNode (BMPARSE)
{
 id description;
}

+for:aFor statements:aStatementList next:aNext
{
    self = [super new];
    [children at:0 put:aFor];
```

```
    [children at:1 put:aStatementList];
    [children at:2 put:aNext];
    return self;
}

-evaluate:aPsb
  {
   int pass;

   id over,
      toPass,
      dummyStatement,
      forNode = [children at:0];
   extern id parseTree;
   extern id _theParser;

   if (![aPsb globalStatus])
   {
   psb = aPsb;

   [self evaluating:YES];

   if ((over = [forNode modifierFor:"stepOver"]) != nil)
      {
       int index;
       id  iterator;

       iterator = [[psb databaseServer] timeIteratorFor:over];

       for (index = 0; index < [iterator size]; index++)
          {
           [forNode evaluate:aPsb];
           [aPsb globalOffset:[[iterator at:index] copy]];
           [[children at:1] evaluat    sb];
          }

       [iterator freeContents];
       [iterator free];
      }
   else
      if ((toPass = [forNode modifierFor:"toPass"]) != nil)
         {
          for (pass = 1; pass <= [toPass number]; pass++)
            {
             if (_theParser == nil)
                _theParser = [BM_Parser new];
             [_theParser parse:[BM_StreamString sprintf:"set pass = %d",pass]];
                    [forNode evaluate:aPsb];
             [parseTree evaluate:aPsb];
             [[children at:1] evaluate:aPsb];

             [parseTree free];
            }
         }
      else
         [super evaluate:aPsb];

   return self;
   }
  }

+(int)defaultChildren { return 3; }
```

```
-(STR)nodeName
{
   return "Plate";
}

-description
{
 return description;
}

-description:aDescription
{
 if (description)
    [description free];

 description = aDescription;

 return self;
}

-terminate$
{
 if (description)
    [description free];

 return [super terminate$];
}

-BMinterface(BS_Plate)

-listOn:aCharString
{
 aCharString = [super listOn:aCharString];

 [[aCharString concat:description] concatSTR:"\n"];

 return aCharString;
}

=:

/*===================== DO NOT REMOVE    EDIT ============================

        This comment and the following sccsId declaration are managed
        by SCCS for you. Do not edit or remove either.

        Source file:    %F%
        Latest version: %I%
        Last mod time:  %H% at %U%

========================================================================*/

static char *sccsId = "%Z%%M% rev %I% created on %H% at %U%";

/*===================== DO NOT REMOVE OR EDIT ===========================*/

#include "batterymarch.h"
#include "objc.h"
#include "uil.h"

= BM_PlateList : BM_BinaryParseTreeNode (BMPARSE)
{
}

+(int)defaultChildren { return 2;}
```

```
-(STR)nodeName
{
    return "PlateList";
}

-BMinterface(BS_PlateList)
=:

/*==================== DO NOT REMOV   EDIT ============================

        This comment and the following sccsId declaration are managed
        by SCCS for you. Do not edit or remove either.

        Source file:     /users/bmw/Alpha/VRL/SCCS/s.BM_PrgStBlk.m
        Latest version:  1.7
        Last mod time:   08/22/89 at 20:55:00

=====================================================================*/

static char *sccsId = "@(#)BM_PrgStBlk.m rev 1.7 created on 08/22/89 at 20:55:00";

/*==================== DO NOT REMOVE OR EDIT ===========================*/


#include "objc.h"
#include "uil.h"

#include "BMWGlobal.h"

@requires CharString;


= BM_ProgramStatusBlock: Object (BM_WorkstationMsgs, UserInterface, Primitive)
  {
   id databaseServer;
   id functionServer;

   id currentUniverse;
   id globalDate;
   id globalOffset;
   id globalOver;

   id defaultGroup;
   id defaultPeriodicity;

   BOOL keepValues;

   int globalStatus;
   id  statusMessage;
  }


+new:aDatabaseServer functionServer:aFunctionServer
  {
   self = [super new];

   functionServer = aFunctionServer;
   databaseServer = aDatabaseServer;

   keepValues = YES;

   statusMessage = nil;

   return self;
  }
```

```
-initializeForContext:aListName  globalDate:aDate
                                 globalOffset:anOffset
                                 globalOver:anInterval

  {
   [self currentUniverse:[databaseServer retrieveList:aListName]];
   [self globalDate:aDate];
   [self globalOffset:anOffset];

=:

/*===================== DO NOT REMOVE    EDIT ==============================

       This comment and the following sccsId declaration are managed
       by SCCS for you. Do not edit or remove either.

       Source file:     /users/bmw/Alpha/VRL/SCCS/s.BS_LogicOR.m
       Latest version:  1.3
       Last mod time:   03/10/89 at 14:01:24

==========================================================================*/

static char *sccsId = "@(#)BS_LogicOR.m rev 1.3 created on 03/10/89 at 14:01:24";

/*===================== DO NOT REMOVE OR EDIT ===========================*/

#include "objc.h"
#include "uil.h"
#include "BMWGlobal.h"
#include "BMGFXInterf.h"


= BS_LogicOR: BS_ArithLog (BM_WorkstationMsgs, UIMESSAGES)
{
}


-(STR)getSign
{
       return(" or ");
}

=:

    [self globalOver:anInterval];

    if (defaultPeriodicity != nil)
       [defaultPeriodicity free];
    defaultPeriodicity = [CharString str:""];

    if (defaultGroup != nil)
       [defaultGroup free];
    defaultGroup = [CharString str:""];

    globalStatus = 0;

    return self;
   }


  -resetStatus
    {
     [self globalStatus:0];

     return self;
    }
```

```
-databaseServer
  {
   return databaseServer;
  }


-functionServer
  {
   return functionServer;
  }


-currentUniverse
  {
   return currentUniverse;
  }


-currentUniverse:aNewUniverse
  {
   if (currentUniverse != nil)
      [currentUniverse free];

   currentUniverse = aNewUniverse;

   return self;
  }


-globalOffset:aNewOffset
  {
   globalOffset = aNewOffset;

   return self;
  }


-globalOver:aNewInterval
  {
   globalOver = aNewInterval;

   return self;

  }


-globalDate:aNewDate
  {
   globalDate = aNewDate;

   return self;
  }


-defaultPeriodicity
  {
   return defaultPeriodicity;
  }


-defaultGroup
  {
   return defaultGroup;
  }
```

```
-globalOffset
  {
   return globalOffset;
  }


-globalOver
  {
   return globalOver;
  }


-globalDate
  {
   return globalDate;
  }


-keepValues:(BOOL)doIt
  {
   keepValues = doIt;

   return self;
  }


-(BOOL)keepValues
  {
   return keepValues;
  }


-statusMessage
  {
   return statusMessage;
  }


extern int newObjects,freedObjects;

  -(int)globalStatus
    {
#include <malloc.h>

struct mallinfo m;

      [self yieldControl];
/*
m = mallinfo (0);
printf ("new=%d, freed=%d, MEMORY: %d + %d in use, %d + %d free\n",newObjects,
                      freedObjects, m.uordblks,m.usmblks,m.fordblks,m.fsmblks);
*/
      return globalStatus;
     }


   -yieldControl
     {
      while ([eventQueue eventReady])
        {
         [eventQueue readEvent];

         if (event.code == EXPOSEEVENT)
           [baseLayer processEvent];
```

```
            else
               if ((event.code == KEYBOARDEVENT) && (event.ascii == 27))
                  {
                   [self globalStatus:BREAK_FROM_USER];
                   [eventQueue flush];
                  }
           }

        [clockLayer updateClock];

        return self;
       }


    -globalStatus:(int)status
       {
        int currentStatus = globalStatus;

        globalStatus = status;

        if (currentStatus == 0)
           [self changed:@selector(globalStatus:)];

printf ("STATUS:%d\n",status);

        return self;
       }


    -functionCallError
       {
        return [self globalStatus:FUNC_CALL_ERROR];
       }


    -universeScreenError
       {
        return [self globalStatus:SCREEN_ERROR];
       }


    -databaseServerError
       {
        statusMessage = [databaseServer currentStatusMessage];

        return [self globalStatus:DATABASE_ERROR];

       }


    -contextError
       {
        return [self globalStatus:CONTEXT_ERROR];
       }


    -memoError
       {
        return [self globalStatus:MEMO_ERROR];
       }

=:
```

```
/*===================== DO NOT REMOVE    EDIT ============================

      This comment and the following sccsId declaration are managed
      by SCCS for you. Do not edit or remove either.

      Source file:     /users/bmw/Alpha/VRL/SCCS/s.BM_Primary.m
      Latest version:  1.14
      Last mod time:   08/24/89 at 13:22:49

======================================================================*/

static char *sccsId = "@(#)BM_Primary.m rev 1.14 created on 08/24/89 at 13:22:49";

/*===================== DO NOT REMOVE OR EDIT ===========================*/

#include "batterymarch.h"
#include "objc.h"
#include "uil.h"

= BM_Primary : BM_BinaryParseTreeNode (BMPARSE)
{
}

-(STR)nodeName
{
    return "Primary";
}

-BMinterface(BS_Primary)

-evaluating:(BOOL)evaluating
{
 [[self leftNode] evaluating:evaluating];
 return [super evaluating:evaluating];
}

-evaluate:aPsb
{
 id v;

 if (![aPsb globalStatus])
    {
    [self evaluating:YES];

    psb = aPsb;

    [self value:v = [[psb databaseServer] retrieveItem:self]];

    if (v==nil)
       [psb databaseServerError];

    if ([psb keepValues])
       {
        [self savedUniverse:[[psb currentUniverse] copy]];
        [self savedValues:[v copy]];
       }

    [self evaluating:NO];
    return v;
    }
  else
     return nil;
 }

-LHSevaluate:aPsb
```

```
{
 id result;

 if (![aPsb globalStatus])
    {
    [self evaluating:YES];

    psb = aPsb;

    if (strcmp([parent nodeName],"Temp")==0)
       {
        [self savedUniverse:nil];
        result = [[psb databaseServer] assignItem:self];
       }
    else
       {
        [self savedUniverse:[[psb currentUniverse] copy]];
        result = [[psb databaseServer]
                 assignCrossSectionItem:self
                        makePermanent:!strcmp([parent nodeName],"Install")];
       }

    [self value:result];

    [self savedValues:[result copy]];

    if (result==nil)
       [psb databaseServerError];

    [self evaluating:NO];
    return result;
    }
 else
     return nil;
}


-(int)nPositionals { return 1; }

-(int)positionals { return [self nPositionals]; }


-dataValueAtArg:(int)position
{
    return ([self dataValueAt:position]);
}


-dataValueAt:(int)n
{
    return (n==0) ? [self value] : [self error:"requested arg not present!"];
}

-identifier { return [[self leftNode] identifier]; }
-base { return [[self leftNode] base]; }
-qualifier { return [[self leftNode] qualifier]; }
-universe { return [psb currentUniverse]; }


-modifierFor:(STR)keyword
{
    return [[self rightNode] modifierFor:keyword];
}

-setError:(int)n on:component
```

```
{
   [component setError:n];
}


-listOn:nodeText
        {
        [[children at:0] listOn:nodeText];
        if ([children at:1])
                {
                [nodeText concatSTR:"("];
                [[children at:1] listOn:nodeText];
                [nodeText concatSTR:")"];
                }

        return nodeText;
        }

=:

/*===================== DO NOT REMOVE    EDIT ============================

        This comment and the following sccsId declaration are managed
        by SCCS for you. Do not edit or remove either.

        Source file:     %F%
        Latest version:  %I%
        Last mod time:   %H% at %U%

==========================================================================*/

static char *sccsId = "%Z%%M% rev %I% created on %H% at %U%";

/*===================== DO NOT REMOVE OR EDIT ===========================*/

#include "batterymarch.h"
#include "objc.h"
#include "uil.h"

= BM_Program : BM_ParseTreeNode (BMPARSE)
{
}

+begin:aBegin plates:aPlateList end:anEnd
{
    self = [super new];
    [children at:0 put:aBegin];
    [children at:1 put:aPlateList];
    [children at:2 put:anEnd];
    return self;
}

+(int)defaultChildren { return 3;}

-(STR)nodeName
{
    return "Program";
}

-BMinterface(BS_Program)
=:
```

```
/*==================== DO NOT REMOVE    EDIT ============================

        This comment and the following sccsId declaration are managed
        by SCCS for you. Do not edit or remove either.

        Source file:     %F%
        Latest version:  %I%
        Last mod time:   %H% at %U%

========================================================================*/

static char *sccsId = "@(#)BM_PtreeNode.m work in progress by bmw";

/*==================== DO NOT REMOVE OR EDIT ==========================*/

#include "batterymarch.h"
#include "objc.h"
#include "uil.h"

#include "stdio.h"
#include "sys/types.h"
#include "sys/stat.h"

#include "BMWGlobal.h"

@requires IdArray, Sequence, CharString, BM_StreamString, BM_Parser;
@requires BM_StatementList, BM_PlateList, BM_Plate, BM_NullStatement;

= BM_ParseTreeNode : DepSharObject (BMPARSE)
{
    id value;           // the results of the last eval of this node
    id errorCode;       // zero, or code of error that has been detected
    id children;        // an IdArray of BM_ParseTreeNode
    id parent;          // the parent node or nil
    id psb;             // the psb from the last evaluate:
    BOOL evaluating;    // true if currently evaluating this node
    BOOL isCurrent;     // true if node is the stmt being currently edited

    id savedValues;
    id savedLabels;
    id savedUniverse;

    int plateNumber;
    BOOL hasParentheses;
    BOOL displayedHorizontally;
}

+new
{
    int nChildren;
    nChildren = [self defaultChildren];
    self = [super new];
    if(nChildren)children = [IdArray new:nChildren];
    hasParentheses = NO;
    displayedHorizontally = YES;
    savedValues = nil;
    savedLabels = nil;
    savedUniverse = nil;

    return self;
}

extern id _theParser;
extern id parseTree;
```

```
+readFrom:(STR)aFileName
{
 struct stat fileStatus;
 char *buffer;

 FILE *f = fopen (aFileName, "r");

 if (f != NULL)
   {
    stat (aFileName, &fileStatus);

    buffer = (char *) malloc (fileStatus.st_size+1);

    buffer[fread (buffer, 1, fileStatus.st_size, f)] = 0;

    fclose(f);

    if (_theParser == nil)
       _theParser = [BM_Parser new];

    [_theParser parse:[BM_StreamString str:buffer]];

    free(buffer);

    return parseTree;
   }

 return nil;
}

-(BOOL)storeOn:(STR)aFileName
{
 FILE *f = fopen (aFileName, "w");

 if (f != NULL)
   {
    id listing = [self listing];
    fprintf (f, "%s", [listing str]);
    fclose (f);
    [listing free];
    return YES;
   }

 return NO;
}

+(int)defaultChildren { [self subclassResponsibility]; return 0;}

-children { return children; }
-value
   {
    id v = value;
    value = nil;
    return v;
   }
-value:aValue { if (value != nil) [value free]; value = aValue; return self; }

-parent { return parent; }
-parent:aNode { parent = aNode; return self; }
```

```
-replace:aNode
{
    id siblings;
    siblings = [[aNode parent] children];
    [self parent:[aNode parent]];
    [[siblings at:[siblings offsetOf:aNode] put:self] free];
    return self;
}

-insertBefore:aNode
{
    id list;

    if ([self isKindOf:BM_Plate])
       if ([aNode isKindOf:BM_Plate])
          list = [BM_PlateList leftNode:self rightNode:aNode];
       else
          [self error:"illegal insertion!"];
    else
       list = [BM_StatementList leftNode:self rightNode:aNode];

    return [self completeInsertion:list:aNode];
}

// this method is very private
-completeInsertion:list:aNode
{
    id aNodeSiblings, grandpa;
    int offset;

    [list parent:grandpa=[aNode parent]];
    [self parent:list];
    [aNode parent:list];
    aNodeSiblings = [grandpa children];
    offset = [aNodeSiblings offsetOf:aNode];
    [aNodeSiblings at:offset put:list];
    return self;
}

-insertAfter:aNode
{
    id list;

    if ([self isKindOf:BM_Plate])
       if ([aNode isKindOf:BM_Plate])
          list = [BM_PlateList leftNode:aNode rightNode:self];
       else
          [self error:"illegal insertion!"];
    else
       list = [BM_StatementList leftNode:aNode rightNode:self];

    return [self completeInsertion:list:aNode];
}

-deleteNode
{
    id siblings;
    siblings = [parent children];
    [self parent:nil];
    [[siblings at:[siblings offsetOf:self] put:[BM_NullStatement new]] free];
    return self;
}

-free
{
    id result,
```

```
     saveMonitor = statusMonitor;

    [statusMonitor freeing];
    statusMonitor = nil;
    result = [super free];
    statusMonitor = saveMonitor;
    [statusMonitor normalStatus];

    return result;
}

-terminate$
{
    [self changed:@selector(terminate$)];
    [children freeContents];
    children = [children free];
    [self reset];
    return [super terminate$];
}

-evaluating:(BOOL)aBool
{
    evaluating = aBool;
    [self changed:@selector(evaluating:)];
    return self;
}

-(BOOL)evaluating
{
    return evaluating;
}


-isCurrent:(BOOL)aBool
{
        isCurrent = aBool;
        [self changed:@selector(isCurrent:)];
        return self;
}

-(BOOL)isCurrent
{
        return isCurrent;
}


-evaluate:aPsb
{
 if (![aPsb globalStatus])
    {
    psb = aPsb;
    [children elementsPerform:@selector(evaluate:) with:aPsb];
    return self;
    }
 else
    return nil;
}

-reset
{
    id result,
       saveMonitor = statusMonitor;

    [statusMonitor freeing];
```

```
    statusMonitor = nil;

    [children elementsPerform:@selector(reset)];
    psb = nil;

    [self value:nil];
    [self savedValues:nil];
    [self savedUniverse:nil];
    [self savedLabels:nil];

    statusMonitor = saveMonitor;
    [statusMonitor normalStatus];

    return self;
}

-at:(int)n
{
    return [children at:n];
}

-dataValueAt:(int)n
{
    return [[children at:n] value];
}

-dataValueFor:(STR)keyword { return nil; }

-(BOOL)checkSemantics:psb
{
    id aSequence;
    id child;
    BOOL error;
    for(aSequence = [Sequence over:children];
            (child = [aSequence next]) || [aSequence free];)
    {
        error = [child checkSemantics:psb] || error;
    }
    return error;
}

-universe { return [psb currentUniverse]; }

-universeNames
  {
   return [[psb databaseServer] namesFor:[psb currentUniverse]];
  }
-globalOffset { return [psb globalOffset]; }
-globalDate   { return [psb globalDate]; }
-globalOver   { return [psb globalOver]; }
-defaultGroup { return [psb defaultGroup]; }
-defaultPeriodicity { return [psb defaultPeriodicity]; }

-printTreeOn:(IOD)anIOD indenting:(int)n
{
    [self printOn:anIOD indenting:n];
    [children elementsPerform:@selector(printTreeOn:indenting:)
        with:anIOD with:n+1];
    return self;
}

-indent:(int)n on:(IOD)anIOD
{
    while(n--)fprintf(anIOD,"    ");
```

```
}

-printOn:(IOD)anIOD indenting:(int)n
{
    [self indent:n on:anIOD];
    fprintf(anIOD,"Id:%X Parent:%X NodeType:%s Value:%X P:%d\n",self,parent,[self nodeName],value,
    hasParentheses); return self;
}

-(STR)nodeName
{
    return "ParseTreeNode";
}

-(int)plateNumber
   {
    return plateNumber;
   }

-plateNumber:(int)aNumber
   {
    plateNumber = aNumber;
    return self;
   }

-hasParentheses:(BOOL)hasEm
   {
    hasParentheses = hasEm;
    return self;
   }

-(BOOL)hasParentheses
   {
    return hasParentheses;
   }

-displayedHorizontally:(BOOL)itIs
   {
    displayedHorizontally = itIs;
    return self;
   }

-(BOOL)displayedHorizontally
   {
    return displayedHorizontally;
   }

-listing
        {
        id listing = [CharString str:""];
        return [self listOn:listing];
        }


-listOn:nodeText
        {
         [children elementsPerform:@selector(listOn:) with:nodeText];
         return nodeText;
        }

-savedValues:aMatrix
   {
    if (savedValues)
       [savedValues free];
```

```
    savedValues = aMatrix;

    return self;
   }

-savedValues
   {
    return savedValues;
   }

-savedUniverse:aUniverse
   {
    if (savedUniverse)
       [savedUniverse free];

    savedUniverse = aUniverse;

    return self;
   }

-savedUniverse
   {
    return savedUniverse;
   }

-savedUniverseNames
   {
    if (savedUniverse != nil)
       return [[psb databaseServer] namesFor:savedUniverse];
    else
       return nil;
   }

-savedLabels
   {
    return savedLabels;
   }

-savedLabels:aStringArray
   {
    if (savedLabels)
       [savedLabels free];

    savedLabels = aStringArray;

    return self;
   }

=:
/*===================== DO NOT REMOVE    EDIT ============================

       This comment and the following sccsId declaration are managed
       by SCCS for you. Do not edit or remove either.

       Source file:     /users/bmw/Alpha/VRL/SCCS/s.BM_Qident.m
       Latest version:  1.8
       Last mod time:   08/24/89 at 13:23:02

======================================================================*/

static char *sccsId = "@(#)BM_Qident.m rev 1.8 created on 08/24/89 at 13:23:02";

/*===================== DO NOT REMOVE OR EDIT ==========================*/
```

```
#include <string.h>
#include "batterymarch.h"
#include "objc.h"
#include "uil.h"

@requires BM_CICharString;

= BM_Qidentifier : BM_Identifier (BMPARSE)
{
    id qualifier;       // the qualifier part
    id base;            // the base part
}

+str:(STR)ident
{
    char *t;
    self = [super str:ident];

    t = strchr(ident,'_');
    if(t)
    {
        *t = '\0';
        base = [BM_CICharString str:t+1];
        qualifier = [BM_CICharString str:ident];
    }
    else
    {
        base = [BM_CICharString str:ident];
    }
    return self;
}

-BMinterface(BS_Qidentifier)

-(STR)str { return [name str]; }

-terminate$
{
    [qualifier free];
    [base free];
    return [super terminate$];
}

-qualifier { return qualifier; }
-base { return base; }

-(STR)nodeNameText { return "Qidentifier "; }


-deleteEvaluate:aPsb


{
BOOL result;

if (![aPsb globalStatus])
   {
   [self evaluating:YES];

   psb = aPsb;

   result = [[psb databaseServer] deleteItem:self];
```

```
    if (!result)
       [psb databaseServerError];

    [self evaluating:NO];
    return nil;
    }
 else
     return nil;
}


-saveListEvaluate:aPsb
{
 id result;

 if (![aPsb globalStatus])
    {
    [self evaluating:YES];

    psb = aPsb;

    result = [[psb databaseServer] assignList:self];

    if (!result)
       [psb databaseServerError];

    [self evaluating:NO];
    return nil;
    }
 else
     return nil;
}


-savedValues
  {
   return [parent savedValues];
  }

-savedLabels
  {
   return [parent savedLabels];
  }

-savedUniverse
  {
   return [parent savedUniverse];
  }

-savedUniverseNames
  {
   return [parent savedUniverseNames];
  }
=:
/*===================== DO NOT REMOVE    EDIT ============================

       This comment and the following sccsId declaration are managed
       by SCCS for you. Do not edit or remove either.

       Source file:    /users/bmw/Alpha/VRL/SCCS/s.BM_SaveList.m
       Latest version: 1.1
       Last mod time:  08/24/89 at 13:23:44
```

```
=========================================================================*/

static char *sccsId = "@(#)BM_SaveList.m rev 1.1 created on 08/24/89 at 13:23:44";

/*===================== DO NOT REMOVE OR EDIT ===========================*/



#include <stdio.h>
#include "batterymarch.h"
#include "objc.h"
#include "uil.h"


= BM_SaveList : BM_BinaryParseTreeNode (BMPARSE)
{
}

-(STR)nodeName
{
    return "SaveList";
}

+(int)defaultChildren { return 1; }

-BMinterface(BS_SaveList)


-evaluate:aPsb
{
    id right, left, where, v, l, result;
    id newDataObject;
    id initialUniverse;

   if (![aPsb globalStatus])
    {
    [self evaluating:YES];

    psb = aPsb;

    left = [self leftNode];

    [left saveListEvaluate:aPsb];

    [self evaluating:NO];

    return nil;
    }
}

-listOn:nodeText
        {
        id whereNode;

        [nodeText concatSTR:[self nodeName]];

        [nodeText concatSTR:" "];
        [[children at:0] listOn:nodeText];
        [nodeText concatSTR:"\n"];
        return nodeText;
        }

=:
```

```
/*==================== DO NOT REMOVE    EDIT ============================

       This comment and the following sccsId declaration are managed
       by SCCS for you. Do not edit or remove either.

       Source file:     /users/bmw/Alpha/VRL/SCCS/s.BM_Set.m
       Latest version:  1.6
       Last mod time:   08/12/89 at 11:35:13

==========================================================================*/

static char *sccsId = "@(#)BM_Set.m rev 1.6 created on 08/12/89 at 11:35:13";

/*==================== DO NOT REMOVE OR EDIT ===========================*/


#include <stdio.h>
#include "batterymarch.h"
#include "objc.h"
#include "uil.h"


= BM_Set : BM_BinaryParseTreeNode (BMPARSE)
{
}

-(STR)nodeName
{
    return "Set";
}

+(int)defaultChildren { return 3; }

-BMinterface(BS_Assign)

-whereNode:aNode
{
    [children at:2 put:aNode];
    return self;
}

-whereNode
{
    return [children at:2];
}

-evaluate:aPsb
{
    id right, left, where, v, l, result;
    id newDataObject;
    id initialUniverse;

   if (![aPsb globalStatus])
    {
    [self evaluating:YES];

    psb = aPsb;

    if ((where = [self whereNode]) != nil)
      {
```

```
      initialUniverse = [[psb currentUniverse] copy];
      [where evaluate:aPsb];
      }

   [[self rightNode] evaluate:psb];

   v = [[self rightNode] value];
   l = [[[self rightNode] savedLabels, copy];

   left = [self leftNode];

   [left value:v];
   [left savedLabels:l];

   if (v != nil)
      {
       [left LHSevaluate:psb];

       result = [left value];

       if (where != nil)
          [psb currentUniverse:initialUniverse];
      }
   else
      result = nil;

    [self value:result];

    [self evaluating:NO];
    return result;
    }
}


-listOn:nodeText
        {
        id whereNode;

        [nodeText concatSTR:[self nodeName]];
        [nodeText concatSTR:" "];
        [[children at:0] listOn:nodeText];
        [nodeText concatSTR:" = "];
        [[children at:1] listOn:nodeText];
        if (whereNode = [children at:2])
                {
                [nodeText concatSTR:", "];
                [whereNode listOn:nodeText];
                }
        else [nodeText concatSTR:"\n"];
        return nodeText;
        }

=:

/*===================== DO NOT REMOVE    EDIT ============================

        This comment and the following sccsId declaration are managed
        by SCCS for you. Do not edit or remove either.

        Source file:    /users/bmw/Alpha/VRL/SCCS/s.BM_StatFn.m
        Latest version: 1.4
        Last mod time:  03/23/89 at 12:57:42
```

```
===========================================================================*/

static char *sccsId = "@(#)BM_StatFn.m rev 1.4 created on 03/23/89 at 12:57:42";

/*===================== DO NOT REMOVE OR EDIT ===========================*/


#include "objc.h"
#include "uil.h"

#include "BMWGlobal.h"

@requires BM_StringMatrix, BM_Matrix;

= BM_StatisticalFunction: BM_Function (BM_WorkstationMsgs,Collection, Primitive)
   {
   }

   -evaluate:client
      {
      BOOL weAreCrunching;

      unsigned index;

      id data,
         weights,
         within,
         sortTable,
         sequence,
         sampleSet,
         weightSet,
         sampleSets,
         weightSets,
         result = nil;


      if ([self checkArgs:client])
         {
          data    = [client dataValueAtArg:0];
          weights = [client dataValueFor:"weights"];

          if ((weights != nil) &&
              ([data size] != [weights size]))
             {
              [data free];
              [weights free];
              return nil;
             }

          weAreCrunching = ([data nRows] != [[client universe] size]);

          if ((within = [client dataValueFor:"within"]) == nil)
             if ([data nColumns] > 1)
                within = [client identitiesForCurrentUniverse];
             else
                if (weAreCrunching)
                   within = [client identsForDefaultGrpWRTCurUniv];
             else
                within = [client constantForCurrentUniverse];

if(globalDebugFlag)printf("data %u, %u\n",[data nRows], [data nColumns]);
if(globalDebugFlag)printf("within %u, %u\n",[within nRows], [within nColumns]);
```

```
/*[data storeOn:"out1"];
[within storeOn:"out2"];*/

        if (!weAreCrunching)
          {
           sortTable = [within ascendingSortTable];

           within  = [within  sortUsing:sortTable];
           data    = [data    sortUsing:sortTable];
           weights = [weights sortUsing:sortTable];
          }

        sampleSets = [data    takeApartUsing:within];
        weightSets = [weights takeApartUsing:within];

        for (index = 0; index < [sampleSets size]; index++)
          {
           sampleSet = [sampleSets at:index];
           weightSet = [weightSets at:index];

           if (result == nil)
              result = [self checkTypesAndComputeWith:sampleSet
                                              weights:weightSet];
           else
              result = [result concatenateWith:[self
                                 checkTypesAndComputeWith:sampleSet
                                                  weights:weightSet]];
          }

        [sampleSets free];
        [weightSets free];

        if (!weAreCrunching)
          {
           if ([result nRows] == [sortTable size])
              result = [result unSortUsing:sortTable];

           [sortTable free];
          }

        [data    free];
        [weights free];
        [within  free];

        return result;
       }

    return nil;
   }


 -namedArgsSupported
   {
    /*
    return "within";
    */
   }

 -(unsigned)nUnnamedArgsRequired
   {
    /* subclass responsibility */
```

```
    }

  -(unsigned)typeOfArgsRequired
    {
     return NUMERIC_TYPE;
    }

  -checkTypesAndComputeWith:arg weights:weights
    {
     if (([self typeOfArgsRequired] == ANY_TYPE) ||
         ((arg != nil) &&
          ((([arg isMemberOf:BM_Matrix]) &&
            ([self typeOfArgsRequired] == NUMERIC_TYPE)) ||
           (([arg isMemberOf:BM_StringMatrix]) &&
            ([self typeOfArgsRequired] == STRING_TYPE)))) &&
         ((weights == nil) ||
          ((([weights isMemberOf:BM_Matrix]) &&
            ([self typeOfArgsRequired] == NUMERIC_TYPE)) ||
           (([weights isMemberOf:BM_StringMatrix]) &&
            ([self typeOfArgsRequired] == STRING_TYPE)))))

        return [self computeWith:arg weights:weights];
     else
        return nil;
    }

  -computeWith:arg
    {
     /* subclass responsibility */
    }


=:
/*===================== DO NOT REMOVE    :DIT ============================

        This comment and the following sccsId declaration are managed
        by SCCS for you. Do not edit or remove either.

        Source file:     %F%
        Latest version:  %I%
        Last mod time:   %H% at %U%

==========================================================================*/

static char *sccsId = "%Z%%M% rev %I% created on %H% at %U%";

/*===================== DO NOT REMOVE OR EDIT ============================*/

#include "batterymarch.h"
#include "objc.h"
#include "uil.h"

= BM_StatementList : BM_BinaryParseTreeNode (BMPARSE)
{
}

+(int)defaultChildren { return 2;}

-(STR)nodeName
{
   return "StatementList";
}
```

```
-BMinterface(BS_StatementList)
=:

/*===================== DO NOT REMOVE    EDIT =============================

        This comment and the following sccsId declaration are managed
        by SCCS for you. Do not edit or remove either.

        Source file:     /users/bmw/Alpha/VRL/SCCS/s.BM_StrLit.m
        Latest version:  1.4
        Last mod time:   06/15/89 at 12:02:14

=========================================================================*/

static char *sccsId = "@(#)BM_StrLit.m rev 1.4 created on 06/15/89 at 12:02:14";

/*===================== DO NOT REMOVE OR EDIT ==========================*/


#include "batterymarch.h"
#include "objc.h"
#include "uil.h"

@requires CharString;

= BM_StringLiteral : BM_Identifier (BMPARSE)
{
}

+(int)defaultChildren { return 0;}

+str:(STR)ident
{
 self = [super new];
 ident[strlen(ident)-1] = 0;
 ident[0] = 0;
 name = [CharString str:ident+1];
 return self;
}

-string { return name; }

-BMinterface(BS_StringLiteral)

-(STR)nodeNameText { return "StringLiteral ";}

-(int)nPositionals { return 1; }
-(int)positionals { return [self nPositionals]; }



-dataValueAtArg:(int)position
{
    return ([self dataValueAt:position]);
}


-dataValueAt:(int)n
{
    return (n==0) ? [self value] : [self error:"requested arg not present!"];
}
```

```
        -evaluate:aPsb
        {
         id v;
            if (![aPsb globalStatus])
            {
            [self evaluating:YES];


    psb = aPsb;

    [self value:v = [[psb databaseServer] stringConstantFor:self]];

    [self evaluating:NO];
    return v;
    }
}


-listOn:nodeText
        {
        [nodeText concatSTR:"\""];
        [nodeText concatSTR:[self str]];
        [nodeText concatSTR:"\""];

        return nodeText;
        }

=:


/*===================== DO NOT REMOVE   EDIT ============================

        This comment and the following sccsId declaration are managed
        by SCCS for you. Do not edit or remove either.

        Source file:     %F%
        Latest version:  %I%
        Last mod time:   %H% at %U%

=======================================================================*/

static char *sccsId = "%Z%%M% rev %I% created on %H% at %U%";

/*===================== DO NOT REMOVE OR EDIT ==========================*/

#include <stdio.h>
#include "batterymarch.h"
#include "objc.h"
#include "uil.h"
/*
  An instance of this class is passed to the parser as an argument.
  It supports sequential access to the characters an permits backup.
*/
= BM_StreamString : CharString (BMPARSE)
{
    int position;
}

-(char)inputChar { return [self charAt:position++]; }
-(char)unputChar:(char)c { [self charAt:--position put:c]; return c; }
=:
```

```
/*==================== DO NOT REMOVI    EDIT ============================

        This comment and the following sccsId declaration are managed
        by SCCS for you. Do not edit or remove either.

        Source file:     /users/bmw/Alpha/VRL/SCCS/s.BM_Temp.m
        Latest version:  1.1
        Last mod time:   03/01/89 at 09:13:34

=========================================================================*/

static char *sccsId = "@(#)BM_Temp.m rev 1.1 created on 03/01/89 at 09:13:34";

/*==================== DO NOT REMOVE OR EDIT ===========================*/


#include <stdio.h>
#include "batterymarch.h"
#include "objc.h"
#include "uil.h"

= BM_Temp : BM_Set (BMPARSE)
{
}

-(STR)nodeName
{
    return "Temp";
}


-BMinterface(BS_Assign)


=:
/*==================== DO NOT REMOVE    EDIT ============================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "%Z%%M% rev %I% created on %H% at %U%";

/*==================== DO NOT REMOVE OR EDIT ===========================*/

#include "batterymarch.h"
#include "objc.h"
#include "uil.h"

= BM_UnaryParseTreeNode : BM_ParseTreeNode (BMPARSE)
{
}

+(int)defaultChildren { return 1;}

+node:node
{
```

```
        self = [super new];
        return [self node:node];
    }

    -node { return [children at:0]; }
    -node:aNode { [children at:0 put:aNode]; return self;}

    -(BOOL)checkSemantics:psb
    {
        BOOL error;
        error = [super checkSemantics:psb];
        return error;
    }

/*==================== DO NOT REMOVE    EDIT ============================

    This comment and the following sccsId declaration are managed
    by SCCS for you. Do not edit or remove either.

    Source file:     /users/bmw/Alpha/VRL/SCCS/s.BM_Where.m
    Latest version:  1.6
    Last mod time:   08/12/89 at 11:35:36

========================================================================*/

static char *sccsId = "@(#)BM_Where.m rev 1.6 created on 08/12/89 at 11:35:36";

/*==================== DO NOT REMOVE OR EDIT ==========================*/

#include "batterymarch.h"
#include "objc.h"
#include "uil.h"

= BM_Where : BM_UnaryParseTreeNode (BMPARSE)
{
}

-(STR)nodeName
{
    return "Where";
}

-evaluate:aPsb
  {
    id node, v, newUniverse = nil;

    if (![aPsb globalStatus])
    {
    [self evaluating:YES];
    psb = aPsb;

    [[self node] evaluate:aPsb];

    v = [[self node] value];

    if (v != nil)
       if (newUniverse=[[psb currentUniverse] zapUsing:v])
         {
          [psb currentUniverse:newUniverse];
          [self savedUniverse:[newUniverse copy]];
          printf("%d entities passed\n",[[psb currentUniverse] size]);
         }
```

```
          else
             [psb universeScreenError];

        [v free];
        [self evaluating:NO];
        }
      return newUniverse;
      }



-BMinterface(BS_Where)


-listOn:nodeText
        {
        [nodeText concatSTR:[self nodeName]];

[nodeText concatSTR:" "];

[[children at:0] listOn:nodeText];
[nodeText concatSTR:"\n"];
return nodeText;
}
=:

/*===================== DO NOT REMOVI    EDIT ==============================

       This comment and the following sccsId declaration are managed
       by SCCS for you. Do not edit or remove either.

       Source file:     %F%
       Latest version:  %I%
       Last mod time:   %H% at %U%

========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_AbsDateConst: BS_Terminal (BM_WorkstationMsgs, UIMESSAGES)
{
}



=:

/*===================== DO NOT REMOVI    EDIT ==============================

       This comment and the following sccsId declaration are managed
       by SCCS for you. Do not edit or remove either.
```

```
        Source file:     /users/bmw/Alpha/VRL/SCCS/s.BS_AexList.m
        Latest version:  1.4
        Last mod time:   06/18/89 at 15:35:16

==========================================================================*/

static char *sccsId = "@(#)BS_AexList.m rev 1.4 created on 06/18/89 at 15:35:16";

/*===================== DO NOT REMOVE OR EDIT ===========================*/

#include "objc.h"
#include "uil.h"
#include "BMWGlobal.h"
#include "BMGFXInterf.h"

@requires BM_ToggleButton;

= BS_ArithExprList: BS_PtreeNode (BM_WorkstationMsgs, UIMESSAGES)
{
}


-dispNode
{
        id lNode,rNode,aComma, tempLayer;
        int aWidth, aSize;


        lNode=[[self frontLayers] at:0];
        [lNode outsideOrigin:pt(0,0)];
        aSize = [[self frontLayers] size];
        aWidth = [lNode outsideWidth];

        if (aSize > 1)
        {

rNode=[[self frontLayers] at:1];

aComma = [self stringLayerForSTR:","];

[aComma borderWidth:0];

if ([model displayedHorizontally])
{
[self outsideExtent:pt([lNode outsideWidth]+[rNode outsideWidth]+[aComma outsideWidth],[aComma outsideHeight])
[aComma attachTo:self];
[aComma outsideOrigin:pt([lNode adjacentRight],0)];
[rNode outsideOrigin:pt([aComma adjacentRight],0)];
}
else
{
        if ([[lNode lastFrontLayer] isKindOf:BM_ToggleButton])
        {
        [aComma attachTo:lNode];
        [aComma outsideOrigin:pt([lNode adjacentRight],0)];
        [lNode outsideWidth:[lNode outsideWidth]+[aComma outsideWidth]];
        }
        else
        {
        [aComma attachTo:[lNode lastFrontLayer]];
        [[lNode lastFrontLayer] outsideWidth:[[lNode lastFrontLayer] outsideWidth] + [aComma outsideWidth]];
        [aComma outsideOrigin:pt([[lNode lastFrontLayer] adjacentRight]-[aComma outsideWidth],
```

```
                                        [[lNode lastFrontL    ] bottom]-[aComma height])];
            if ([[lNode la..FrontLayer] outsideWidth] > [lNode outsideWidtn])
                  [lNode outsideWidth:[[lNode lastFrontLayer] outsideWidth]];
            }

      if ([rNode outsideWidth] > [lNode outsideWidth])
            aWidth = [rNode outsideWidth];
      else aWidth = [lNode outsideWidth];

      [self outsideExtent:pt(aWidth,([rNode outsideHeight]+[lNode outsideHeight]))];
      [rNode outsideOrigin:pt(0,[lNode adjacentBottom])];
      }
}
else
{
      [self outsideExtent:pt(aWidth,[lNode outsideHeight])];
}

      return self;
}

=:

/*===================== DO NOT REMOVE   EDIT ==============================

      This comment and the following sccsId declaration are managed
      by SCCS for you. Do not edit or remove either.

      Source file:    %F%
      Latest version: %I%
      Last mod time:  %H% at %U%

=========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_ArithDIV: BS_ArithLog (BM_WorkstationMsgs, UIMESSAGES)
{
}


-(STR)getSign
{
      return("/");
}

=:
/*===================== DO NOT REMOVE   EDIT ==============================

      This comment and the following sccsId declaration are managed
      by SCCS for you. Do not edit or remove either.

      Source file:    /users/bmw/Alpha/VRL/SCCS/s.BS_ArithLog.m
      Latest version: 1.4
      Last mod time:  06/18/89 at 15:34:02
```

```
=========================================================================*/

static char *sccsId = "@(#)BS_ArithLog.m rev 1.4 created on 06/18/89 at 15:34:02";

/*==================== DO NOT REMOVE OR EDIT ===========================*/

#include "objc.h"
#include "uil.h"
#include "BMWGlobal.h"
#include "BMGFXInterf.h"


= BS_ArithLog: BS_PtreeNode (BM_WorkstationMsgs, UIMESSAGES)
{
}


-dispNode
{
        id aKey,lNode,rNode,lBracket,rBracket;

        [self insideColor:BM_colors.VRLTextOff];

        aKey = [self stringLayerForSTR:[self getSign]];

        [aKey attachTo:self];
        [aKey insideColor:BM_colors.VRLTextOff];
        [aKey borderWidth:0];

        lNode=[[self frontLayers] at:0];
        rNode=[[self frontLayers] at:1];

        if ([model hasParentheses])
        {
                lBracket = [self stringLayerForSTR:"("];

                [lBracket attachTo:self];
                [lBracket insideColor:BM_colors.VRLTextOff];
                [lBracket borderWidth:0];

                rBracket = [self stringLayerForSTR:")"];

                [rBracket attachTo:self];
                [rBracket insideColor:BM_colors.VRLTextOff];
                [rBracket borderWidth:0];

                [lBracket outsideOrigin:pt(0,0)];
                [lNode outsideOrigin:pt([lBracket adjacentRight],0)];
                [aKey outsideOrigin:pt([lNode adjacentRight],0)];
                [rNode outsideOrigin:pt([aKey adjacentRight],0)];
                [rBracket outsideOrigin:pt([rNode adjacentRight],0)];
                [self outsideExtent:pt([rBracket adjacentRight],[aKey outsideHeight])];
        }
        else
        {
                [lNode outsideOrigin:pt(0,0)];
                [aKey outsideOrigin:pt([lNode adjacentRight],0)];


                [rNode outsideOrigin:    aKey adjacentRight],0)];
                [self outsideExtent:pt\. Node adjacentRight],[aKey outsideHeight])];
        }
```

```
        [self insideColor:BM_colors.VRLTextOff];
        return self;
}

=:

/*===================== DO NOT REMOVE    EDIT ==============================

        This comment and the following sccsId declaration are managed
        by SCCS for you. Do not edit or remove either.

        Source file:      %F%
        Latest version:   %I%
        Last mod time:    %H% at %U%

==========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_ArithMIN: BS_ArithLog (BM_WorkstationMsgs, UIMESSAGES)
{
}


-(STR)getSign
{
        return("-");
}

=:
/*===================== DO NOT REMOVI    EDIT ==============================

        This comment and the following sccsId declaration are managed
        by SCCS for you. Do not edit or remove either.

        Source file:      %F%
        Latest version:   %I%
        Last mod time:    %H% at %U%

==========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_ArithPLS: BS_ArithLog (BM_WorkstationMsgs, UIMESSAGES)
{
}
```

```
-(STR)getSign
{
	return("+");
}

=:
/*===================== DO NOT REMOVE   EDIT ============================

	This comment and the following sccsId declaration are managed
	by SCCS for you. Do not edit or remove either.

	Source file:    %F%
	Latest version: %I%
	Last mod time:  %H% at %U%

==========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_ArithPOW: BS_ArithLog (BM_WorkstationMsgs, UIMESSAGES)
{
}


-(STR)getSign
{
	return("^");
}

=:
/*===================== DO NOT REMOVI   EDIT ============================

	This comment and the following sccsId declaration are managed
	by SCCS for you. Do not edit or remove either.

	Source file:    %F%
	Latest version: %I%
	Last mod time:  %H% at %U%

==========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_ArithTMS: BS_ArithLog (BM_WorkstationMsgs, UIMESSAGES)
{
}
```

```
-(STR)getSign
{
        return("*");
}

=:


/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BS_Assign.m
        Latest version:  1.7
        Last mod time:   06/18/89 at 15:34:24

==========================================================================*/

static char *sccsId = "@(#)BS_Assign.m rev 1.7 created on 06/18/89 at 15:34:24";

/*===================== DO NOT REMOVE OR EDIT ===========================*/


#include "objc.h"
#include "uil.h"
#include "BMWGlobal.h"
#include "BMGFXInterf.h"



= BS_Assign: BS_Statement (BM_WorkstationMsgs, UIMESSAGES)
{
}

-doNothing
        {
        return self;
        }


-dispNode
{
        id  aSign, rNode, lNode, whereNode, aComma;
        int aSize;

        aKey = [self toggleButtonForSTR:[model nodeName]];

        [[aKey onReceiver:self] onSelector:@selector(updateCurrentStmt)];
        [[aKey offReceiver:self] offSelector:@selector(checkButton)];
        [aKey attachTo:self ];
        [aKey outsideOrigin:pt(30,4)];
        [aKey borderWidth:1];

        aSign = [self stringLayerForSTR:"="];

        [aSign attachTo:self];
        [aSign borderWidth:0];

        aSize = [[self frontLayers] size];

        lNode = [[self frontLayers] at:0];
        rNode = [[self frontLayers] at:1];
```

```
[lNode outsideOrigin:pt(([aKey adjacentRight] + 5),11)];
[aSign outsideOrigin:pt(([lNode adjacentRight]),11)];
[rNode outsideOrigin:pt(([aSign adjacentRight]),11)];

if (aSize<5)
        {
        [self outsideExtent:pt(([rNode adjacentRight] + 10), ([aKey outsideHeight] + 10))];
        }
else
        {

                whereNode = [[self fr      ayers] at:2];
                [[[whereNode lastFrontLayer] onReceiver:self] onSelector:@selector(doNothing)];
                [[[whereNode lastFrontLayer] offReceiver:self] offSelector:@selector(doNothing)];
                [[whereNode lastFrontLayer] onColor:BM_colors.VRLTextOff];

                aComma = [self stringLayerForSTR:","];

                [aComma attachTo:self];
                [aComma borderWidth:0];

                [aComma outsideOrigin:pt(([rNode adjacentRight]),11)];
                [whereNode borderWidth:0];
                [whereNode outsideOrigin:pt(([aComma adjacentRight]),0)];

                [self outsideExtent:pt(([whereNode adjacentRight]+10),
                                ([aKey outsideHeight] + 10))];

                }

        return self;
}

=:
 /*==================== DO NOT REMOVE    EDIT ============================

        This comment and the following sccsId declaration are managed
        by SCCS for you. Do not edit or remove either.

        Source file:    /users/bmw/Alpha/VRL/SCCS/s.BS_AunMIN.m
        Latest version: 1.4
        Last mod time:  06/18/89 at 15:35:31

=======================================================================*/

static char *sccsId = "@(#)BS_AunMIN.m rev 1.4 created on 06/18/89 at 15:35:31";

/*==================== DO NOT REMOVE OR EDIT ===========================*/

#include "objc.h"
#include "uil.h"
#include "BMWGlobal.h"
#include "BMGFXInterf.h"


= BS_ArithUnaryMIN: BS_PtreeNode (BM_WorkstationMsgs, UIMESSAGES)
{
}


-dispNode
{
```

```
id aKey,lNode,lBracket,rBracket;

aKey = [self stringLayerForSTR:"-"];

[aKey attachTo:self];

lNode=[[self frontLayers] at:0];

if ([model hasParentheses])
{
        lBracket = [self stringLayerForSTR:"("];

        [lBracket attachTo:self];
        [lBracket borderWidth:0];

        rBracket = [self stringLayerForSTR:")"];

        [rBracket attachTo:self];
        [rBracket borderWidth:0];

[self outsideExtent:pt(([lBracket outsideWidth]+[rBracket outsideWidth]+[aKey outsideWidth]+[lNode outsideWidt
[lBracket outsideOrigin:pt(0,0)];
[aKey outsideOrigin:pt([lBracket adjacentRight],0)];
[lNode outsideOrigin:pt(([aKey adjacentRight]),0)];
[rBracket outsideOrigin:pt(([lNode adjacentRight]),0)];

        }
        else
        {
                [self outsideExtent:pt(([aKey outsideWidth]+[lNode outsideWidth]),[aKey outsideHeight])];
                [aKey outsideOrigin:pt(0,0)];
                [lNode outsideOrigin:pt(([aKey adjacentRight]),0)];
        }

        return self;
}

=:

/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BS_Begin.m
        Latest version:  1.2
        Last mod time:   05/01/89 at 17:36:35

=======================================================================*/

static char *sccsId = "@(#)BS_Begin.m rev 1.2 created on 05/01/89 at 17:36:35";

/*===================== DO NOT REMOVE OR EDIT ==========================*/

#include "objc.h"
#include "uil.h"
#include "BMWGlobal.h"
#include "BMGFXInterf.h"


@requires ToggleButton;
```

```
= BS_Begin: BS_PtreeNode (BM_WorkstationMsgs, UIMESSAGES)
{
}


-dispNode
{
	id aKey;

	aKey = [ToggleButton str:[model nodeName]];
	[aKey attachTo:self at:pt(10,10)];
	[aKey insideColor:BM_colors.VRLTextOff];
	[aKey borderColor:BM_colors.Border];

	[self width:[aKey width]+20];
	[self height: [aKey height]+20];
	[self insideColor:BM_colors.VRLTextOff];

	return self;
}

=:
/*===================== DO NOT REMOVE    EDIT =============================

	This comment and the following sccsId declaration are managed
	by SCCS for you. Do not edit or remove either.

	Source file:     /users/bmw/Alpha/VRL/SCCS/s.BS_Continue.m
	Latest version:  1.4
	Last mod time:   06/18/89 at 15:36:40

========================================================================*/

static char *sccsId = "@(#)BS_Continue.m rev 1.4 created on 06/18/89 at 15:36:40";

/*===================== DO NOT REMOVE OR EDIT ===========================*/

#include "objc.h"
#include "uil.h"
#include "BMWGlobal.h"
#include "BMGFXInterf.h"


= BS_Continue: BS_PtreeNode (BM_WorkstationMsgs, UIMESSAGES)
{
}


-dispNode
{
	id aKey, lNode;

	aKey = [self toggleButtonForSTR:[model nodeName]];

	[aKey attachTo:self at:pt(0,6)];
	[aKey borderWidth:1];

	[self extent:pt(([aKey width] + 6),([aKey height] + 17))];

	return self;
}

=:
```

```
/*==================== DO NOT REMOVE    DIT ============================

       This comment and the following sccsId declaration are managed
       by SCCS for you. Do not edit or remove either.

       Source file:     /users/bmw/Alpha/VRL/SCCS/s.BS_CurCon.m
       Latest version:  1.5
       Last mod time:   06/18/89 at 15:36:54

========================================================================*/

static char *sccsId = "@(#)BS_CurCon.m rev 1.5 created on 06/18/89 at 15:36:54";

/*==================== DO NOT REMOVE OR EDIT ===========================*/

#include "objc.h"
#include "uil.h"
#include "BMWGlobal.h"
#include "BMGFXInterf.h"

#include "math.h"

@requires CharString;


= BS_CurrencyConst: BS_Terminal (BM_WorkstationMsgs, UIMESSAGES)
{
}


+createInterfaceFor:aModel root:rtLayer
{
   id str;
   double aNum;
   char aStr [40];


        if (([aModel units] != nil) &&
           (!(strcmp([[aModel units] str],"$"))))
                {
                str=[CharString str:"$"];
                }
        else
           str = [CharString str:""];

        aNum = [aModel number];
        if ((aNum <= 1000000000) && ((long)aNum==aNum))
                sprintf(aStr,"%ld", (long)aNum);
        else    sprintf(aStr,"%.3f",aNum);

        str = [str concatSTR:aStr];
        self = [self str:[str str] font:BM_fonts.VRLText
                                color:BM_colors.VRLText];
        [self model:aModel];

        [self alignToggleAndStrLayers];

        return self;
}


=:
```

```
/*===================== DO NOT REMOVE    :DIT ============================

        This comment and the following sccsId declaration are managed
        by SCCS for you. Do not edit or remove either.

        Source file:    /users/bmw/Alpha/VRL/SCCS/s.BS_Delete.m
        Latest version: 1.3
        Last mod time:  06/18/89 at 15:34:49

=========================================================================*/

static char *sccsId = "@(#)BS_Delete.m rev 1.3 created on 06/18/89 at 15:34:49";

/*===================== DO NOT REMOVE OR EDIT ===========================*/


#include "objc.h"
#include "uil.h"
#include "BMWGlobal.h"
#include "BMGFXInterf.h"


= BS_Delete: BS_Statement (BM_WorkstationMsgs, UIMESSAGES)
{
}


-doNothing
        {
        return self;
        }


-dispNode
{
        id lNode;

        aKey = [self toggleButtonForSTR:[model nodeName]];

        [[aKey onReceiver:self] onSelector:@selector(updateCurrentStmt)];
        [[aKey offReceiver:self] offSelector:@selector(checkButton)];
        [aKey attachTo:self ];
        [aKey outsideOrigin:pt(30,4)];
        [aKey borderWidth:1];

        lNode = [[self frontLayers] at:0];

        [lNode outsideOrigin:pt(([aKey adjacentRight] + 5),11)];

        [self outsideExtent:pt(([lNode adjacentRight] + 10),
                               ([aKey outsideHeight] + 10))];
        return self;
}

=:


/*===================== DO NOT REMOVE    :DIT ============================

        This comment and the following sccsId declaration are managed
        by SCCS for you. Do not edit or remove either.
```

```
Source file:     %F%
Latest version:  %I%
Last mod time:   %H% at %U%

=========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_DateOffsetConst: BS_Terminal (BM_WorkstationMsgs, UIMESSAGES)
{
}

=:


/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BS_End.m
        Latest version:  1.2
        Last mod time:   05/01/89 at 17:36:24

=========================================================================*/

static char *sccsId = "@(#)BS_End.m rev 1.2 created on 05/01/89 at 17:36:24";

/*===================== DO NOT REMOVE OR EDIT ===========================*/

#include "objc.h"
#include "uil.h"
#include "BMWGlobal.h"
#include "BMGFXInterf.h"


@requires ToggleButton;



= BS_End: BS_PtreeNode (BM_WorkstationMsgs, UIMESSAGES)
{
}


-dispNode
{
        id aKey;

        aKey = [ToggleButton str:[model nodeName]];
        [aKey attachTo:self at:pt(10,10)];
        [aKey insideColor:BM_colors.VRLTextOff];
        [aKey borderColor:BM_colors.Border];
```

```
        [self width:[aKey width]+20];
        [self height: [aKey height]+20];
        [self insideColor:BM_colors.VRLTextOff];

        return self;
}

=:

/*==================== DO NOT REMOVE    EDIT ============================

        This comment and the following sccsId declaration are managed
        by SCCS for you. Do not edit or remove either.

        Source file:     %F%
        Latest version:  %I%
        Last mod time:   %H% at %U%

========================================================================*/

static char *sccsId = "%Z%%M% rev %I% created on %H% at %U%";

/*==================== DO NOT REMOVE OR EDIT ==========================*/

#include "objc.h"
#include "uil.h"
#include "BMWGlobal.h"
#include "BMGFXInterf.h"




= BS_Error: BS_PtreeNode (BM_WorkstationMsgs, UIMESSAGES)
{
}

=:

/*==================== DO NOT REMOVE    EDIT ============================

        This comment and the following sccsId declaration are managed
        by SCCS for you. Do not edit or remove either.

        Source file:     /users/bmw/Alpha/VRL/SCCS/s.BS_For.m
        Latest version:  1.10
        Last mod time:   07/11/89 at 10:43:47

========================================================================*/

static char *sccsId = "@(#)BS_For.m rev 1.10 created on 07/11/89 at 10:43:47";

/*==================== DO NOT REMOVE OR EDIT ==========================*/

#include "objc.h"
#include "uil.h"
#include "BMWGlobal.h"
#include "BMGFXInterf.h"

@requires BM_Menu,Prompter;
static id _stdLMenu = nil;
```

```
= BS_For:BS_Statement(BM_WorkstationMsgs,UIMESSAGES)
  {
  id stdMenu;
  }

- stdMenu
  {
  if (_stdLMenu == nil)
     _stdLMenu = [BM_Menu stdMenu2:"" owner:nil];

  return _stdLMenu;
  }


- displayUniverse
  {
  char aString[100];
  int universeSize;

  universeSize = [[[self model] savedUniverse] size];
  sprintf(aString,"Universe consists of %d entities.",universeSize);
  [[[Prompter  promptSTR:aString] insideColor:BM_colors.Prompter] free];

  return self;
  }



- updateCurrentStmt
  {
  [modelEditor forStmt:[self model]];
  return self;
  }


- dispNode
  {
  id  rNode,lNode,lBracket,rBracket;
  int aSize;

  if (!([self applicationFlag]))
     {
     aKey = [self toggleButtonForSTR:[model nodeName]];

     [aKey attachTo:self];
     [[aKey onReceiver:self] onSelector:@selector(updateCurrentStmt)];
     [[aKey offReceiver:self] offSelector:@selector(checkButton)];
     [aKey outsideOrigin:pt(10,5)];
     [[aKey borderWidth:1] borderColor:BM_colors.Border];
     [aKey menu:[self stdMenu]  owner:aKey];

     lNode = [[self frontLayers] at:0];
     [lNode outsideOrigin:pt(([aKey adjacentRight] + 5),11)];
     aSize = [[self frontLayers] size];

     if (aSize<3)
        {
        [self outsideExtent:pt(([lNode adjacentRight]+ 10),
           [aKey outsideHeight] + 10)];
        }
     else
```

```
        {
        lBracket = [self stringLayerForSTR:"("];
        [lBracket attachTo:self];
        [lBracket borderWidth:0];
        [lBracket outsideOrigin:pt(([lNode adjacentRight]),11)];

        rNode = [[self frontLayers] at:1];
        [rNode outsideOrigin:pt(([lBracket adjacentRight]),11)];

        rBracket = [self stringLayerForSTR:")"];
        [rBracket attachTo:self];
        [rBracket borderWidth:0];
        [rBracket outsideOrigin:pt(([rNode adjacentRight]),11)];

        [self outsideExtent:pt(([rBracket adjacentRight]+10),
           [aKey outsideHeight] + 10)];
        }
    displayFlag=NO;
    }
  else
    displayFlag=YES;

  return self;
  }

=:

/*==================== DO NOT REMOVE    :DIT ============================

        This comment and the following sccsId declaration are managed
        by SCCS for you. Do not edit or remove either.

        Source file:     /users/bmw/Alpha/VRL/SCCS/s.BS_FuncCall.m
        Latest version:  1.4
        Last mod time:   06/18/89 at 15:37:02

=======================================================================*/

static char *sccsId = "@(#)BS_FuncCall.m rev 1.4 created on 06/18/89 at 15:37:02";

/*==================== DO NOT REMOVE OR EDIT ==========================*/

#include "objc.h"
#include "uil.h"
#include "BMWGlobal.h"
#include "BMGFXInterf.h"



= BS_FunctionCall: BS_PtreeNode (BM_WorkstationMsgs, UIMESSAGES)
{
}


-dispNode
{
        id lNode, rNode, lBracket, rBracket;

        lBracket = [self stringLayerForSTR:"["];

        [lBracket attachTo:self];
        [lBracket borderWidth:0];
```

```
        rBracket = [self stringLayerForSTR:"]"];

        [rBracket attachTo:self ];
        [rBracket borderWidth:0];

        lNode = [[self frontLayers] at:0];
        rNode = [[self frontLayers] at:1];

        [lNode outsideOrigin:pt(0,0)];
        [self outsideExtent:pt(([lBracket outsideWidth] + [rBracket outsideWidth] + [lNode outsideWidth]
                              + [rNode outsideWidth]),([lBracket outsideHeight]))];
        [lBracket outsideOrigin:pt(([lNode adjacentRight]),0)];
        [rNode outsideOrigin:pt([lBracket adjacentRight],0)];
        [rBracket outsideOrigin:pt(([rNode adjacentRight]),0)];

        return self;
}

=:
/*===================== DO NOT REMOVE    :DIT ============================

        This comment and the following sccsId declaration are managed
        by SCCS for you. Do not edit or remove either.

        Source file:     /users/bmw/Alpha/VRL/SCCS/s.BS_Ident.m
        Latest version:  1.2
        Last mod time:   05/03/89 at 10:31:13

=======================================================================*/

static char *sccsId = "@(#)BS_Ident.m rev 1.2 created on 05/03/89 at 10:31:13";

/*===================== DO NOT REMOVE OR EDIT ==========================*/

#include "objc.h"
#include "uil.h"
#include "BMWGlobal.h"
#include "BMGFXInterf.h"


= BS_Identifier: BS_Terminal (BM_WorkstationMsgs, UIMESSAGES)
{
}

=:
/*===================== DO NOT REMOVE    EDIT ============================

        This comment and the following sccsId declaration are managed
        by SCCS for you. Do not edit or remove either.

        Source file:     /users/bmw/Alpha/VRL/SCCS/s.BS_KWexpr.m
        Latest version:  1.4
        Last mod time:   06/18/89 at 15:37:12

=======================================================================*/

static char *sccsId = "@(#)BS_KWexpr.m rev 1.4 created on 06/18/89 at 15:37:12";

/*===================== DO NOT REMOVE OR EDIT ==========================*/
```

```
#include "objc.h"
#include "uil.h"
#include "BMWGlobal.h"
#include "BMGFXInterf.h"


= BS_KeywordExpr: BS_PtreeNode (BM_WorkstationMsgs, UIMESSAGES)
{
}

-dispNode
{
        id  rNode, lNode, aColon;

        lNode = [[self frontLayers] at:0];
        rNode = [[self frontLayers] at:1];
        aColon = [self stringLayerForSTR:":"];

        [aColon attachTo:self];
        [aColon borderWidth:0];

        [aColon outsideOrigin:pt([lNode adjacentRight],0)];
        [rNode outsideOrigin:pt(([aColon adjacentRight]),0)];

        [self outsideExtent:pt(([lNode outsideWidth] + [rNode outsideWidth] + [aColon outsideWidth]),

        [lNode outsideHeight]))];

                return self;
        }

        =:

/*===================== DO NOT REMOVE    :DIT ============================

        This comment and the following sccsId declaration are managed
        by SCCS for you. Do not edit or remove either.

        Source file:     /users/bmw/Alpha/VRL/SCCS/s.BS_KWfield.m
        Latest version:  1.4
        Last mod time:   06/18/89 at 15:37:19

========================================================================*/

static char *sccsId = "@(#)BS_KWfield.m rev 1.4 created on 06/18/89 at 15:37:19";

/*===================== DO NOT REMOVE OR EDIT ===========================*/

#include "objc.h"
#include "uil.h"
#include "BMWGlobal.h"
#include "BMGFXInterf.h"


= BS_KeywordField: BS_PtreeNode (BM_WorkstationMsgs, UIMESSAGES)
{
}

-dispNode
{
        id  rNode, lNode, aColon;
```

```
lNode = [[self frontLayers] at:0];
rNode = [[self frontLayers] at:1];
aColon = [self stringLayerForSTR:":"];

[aColon attachTo:self];
[aColon borderWidth:0];

[aColon outsideOrigin:pt([lNode adjacentRight],0)];
[rNode outsideOrigin:pt(([aColon adjacentRight]),0)];


[self outsideExtent:pt(([lNode outsideWidth] + [rNode outsideWidth] + [aColon outsideWidth]),


  [lNode outsideHeight]))];

        return self;
}

=:

/*===================== DO NOT REMOVE    EDIT ==============================

        This comment and the following sccsId declaration are managed
        by SCCS for you. Do not edit or remove either.

        Source file:     /users/bmw/Alpha/VRL/SCCS/s.BS_ListNode.m
        Latest version:  1.4
        Last mod time:   06/18/89 at 15:37:26

========================================================================*/

static char *sccsId = "@(#)BS_ListNode.m rev 1.4 created on 06/18/89 at 15:37:26";

/*===================== DO NOT REMOVE OR EDIT ===========================*/

#include "objc.h"
#include "uil.h"
#include "BMWGlobal.h"
#include "BMGFXInterf.h"


= BS_ListNode: BS_PtreeNode (BM_WorkstationMsgs, UIMESSAGES)
{
}


-dispNode
{
        id lNode,rNode,aComma;
        int aWidth, aSize;


        lNode=[[self frontLayers] at:0];
        aSize = [[self frontLayers] size];
        aWidth = [lNode width];

        if (aSize > 1)
        {
                rNode=[[self frontLayers] at:1];

                aComma = [self toggleButtonForSTR:","];
```

```
        [aComma borderWidth:1];

 if ([model displayedHorizontally])
        {
        [self extent:pt([lNode width]+[rNode width]+[aComma width],[aComma height]+4)];
        [aComma attachTo:self];
        [aComma origin:pt([lNode width],2)];
        [rNode origin:pt([lNode width]+[aComma width],0)];
        }
else
        {
        [aComma attachTo:[lNode lastFrontLayer] at:pt([[lNode lastFrontLayer] width]-1,0)];

        [[lNode lastFrontLayer] width:[[lNode lastFrontLayer] width] + [aComma width]];
        if ([[lNode lastFrontLayer] width] > [lNode width])
                [lNode width:[[lNode lastFrontLayer] width]];

        if ([rNode width] > [lNode width])
                        aWidth = [rNode width];
        else aWidth = [lNode width];

        [self extent:pt(aWidth,([rNode height]+[lNode height]))];
        [rNode origin:pt(0,[lNode height])];
//      [[lNode model] displayedHorizontally:NO];


                }
        }
        else
        {
                [self extent:pt(aWidth,[lNode height]+2)];
        }

        return self;
}

=:


/*===================== DO NOT REMOVE    EDIT ============================

        This comment and the following sccsId declaration are managed
        by SCCS for you. Do not edit or remove either.

        Source file:    /users/bmw/Alpha/VRL/SCCS/s.BS_LogicAND.m
        Latest version: 1.3
        Last mod time:  03/10/89 at 14:01:03

=========================================================================*/

static char *sccsId = "@(#)BS_LogicAND.m rev 1.3 created on 03/10/89 at 14:01:03";

/*===================== DO NOT REMOVE OR EDIT ===========================*/

#include "objc.h"
#include "uil.h"
#include "BMWGlobal.h"
#include "BMGFXInterf.h"


= BS_LogicAND: BS_ArithLog (BM_WorkstationMsgs, UIMESSAGES)
{
}
```

```
-(STR)getSign
{
       return(" and ");
}

=:

/*==================== DO NOT REMOVE   EDIT =============================

       This comment and the following sccsId declaration are managed
       by SCCS for you. Do not edit or remove either.

       Source file:     %F%
       Latest version:  %I%
       Last mod time:   %H% at %U%

==========================================================================*/

static char *sccsId = "%Z%%M% rev %I% created on %H% at %U%";

/*==================== DO NOT REMOVE OR EDIT ===========================*/

#include "objc.h"
#include "uil.h"
#include "BMWGlobal.h"
#include "BMGFXInterf.h"


= BS_LogicEQ: BS_ArithLog (BM_WorkstationMsgs, UIMESSAGES)
{
}


-(STR)getSign
{
       return("=");
}

=:
/*==================== DO NOT REMOVE   EDIT =============================

       This comment and the following sccsId declaration are managed
       by SCCS for you. Do not edit or remove either.

       Source file:     %F%
       Latest version:  %I%
       Last mod time:   %H% at %U%

==========================================================================*/

static char *sccsId = "%Z%%M% rev %I% created on %H% at %U%";

/*==================== DO NOT REMOVE OR EDIT ===========================*/

#include "objc.h"
#include "uil.h"
#include "BMWGlobal.h"
#include "BMGFXInterf.h"


= BS_LogicGE: BS_ArithLog (BM_WorkstationMsgs, UIMESSAGES)
{
}
```

```
-(STR)getSign
{
	return(">=");
}

=:
/*===================== DO NOT REMOVE    EDIT ============================

	This comment and the following sccsId declaration are managed
	by SCCS for you. Do not edit or remove either.

	Source file:	%F%
	Latest version:	%I%
	Last mod time:	%H% at %U%

========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_LogicGT: BS_ArithLog (BM_WorkstationMsgs, UIMESSAGES)
{
}


-(STR)getSign
{
	return(">");
}

=:
/*===================== DO NOT REMOVE    :DIT ============================

	This comment and the following sccsId declaration are managed
	by SCCS for you. Do not edit or remove either.

	Source file:	%F%
	Latest version:	%I%
	Last mod time:	%H% at %U%

========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_LogicLE: BS_ArithLog (BM_WorkstationMsgs, UIMESSAGES)
{
}
```

```
-(STR)getSign
{
        return("<=");
}

=:
/*===================== DO NOT REMOVE    EDIT =============================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"


= BS_LogicLT: BS_ArithLog (BM_WorkstationMsgs, UIMESSAGES)
{
}


-(STR)getSign
{
        return("<");
}

=:

/*===================== DO NOT REMOVE    EDIT =============================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "%Z%%M% rev %I% created on %H% at %U%";

/*===================== DO NOT REMOVE OR EDIT ===========================*/

#include "objc.h"
#include "uil.h"
#include "BMWGlobal.h"
#include "BMGFXInterf.h"

= BS_LogicNE: BS_ArithLog (BM_WorkstationMsgs, UIMESSAGES)
{
}
```

```
-(STR)getSign
{
        return("<>");
}

=:

/*===================== DO NOT REMOVI    EDIT ==============================

        This comment and the following sccsId declaration are managed
        by SCCS for you. Do not edit or remove either.

        Source file:     /users/bmw/Alpha/VRL/SCCS/s.BS_LogicNOT.m
        Latest version:  1.6
        Last mod time:   06/18/89 at 15:37:33

========================================================================*/

static char *sccsId = "@(#)BS_LogicNOT.m rev 1.6 created on 06/18/89 at 15:37:33";

/*===================== DO NOT REMOVE OR EDIT ===========================*/

#include "objc.h"
#include "uil.h"
#include "BMWGlobal.h"
#include "BMGFXInterf.h"



= BS_LogicNOT: BS_PtreeNode (BM_WorkstationMsgs, UIMESSAGES)
{
}


-dispNode
{
        id aKey,lNode,lBracket,rBracket;

        aKey = [self stringLayerForSTR:" not "];

        [aKey attachTo:self];
        [aKey borderWidth:0];

        lNode = [[self frontLayers] at:0];

        if ([model hasParentheses])
        {
                lBracket = [self stringLayerForSTR:"("];

                [lBracket attachTo:self];
                [lBracket borderWidth:0];

                rBracket = [self stringLayerForSTR:")"];

                [rBracket attachTo:self];
                [rBracket borderWidth:0];

                [self outsideExtent:pt(([lBracket outsideWidth]+[rBracket outsideWidth]+[aKey outsideWidth]
                                +[lNode outsideWidth]),[aKey outsideHeight])];
                [lBracket outsideOrigin:pt(0,0)];
                [aKey outsideOrigin:pt([lBracket adjacentRight],0)];
                [lNode outsideOrigin:pt(([aKey adjacentRight]),0)];
                [rBracket outsideOrigin:pt(([lNode adjacentRight]),0)];
```

```
	}
	else
	{
		[self outsideExtent:pt(([aKey outsideWidth]+[lNode outsideWidth]),[aKey outsideHeight])];
		[aKey outsideOrigin:pt(0,0)];
		[lNode outsideOrigin:pt(([aKey adjacentRight]),0)];
	}

	return self;
}

			*yyxi != yychar ) )
			;
		if ( ( yy_n = yyxi[1] ) < 0 )
			YYACCEPT;
	}
}

/*
** check for syntax error
*/
if ( yy_n == 0 )	/* have an error */
{
	/* no worry about speed here! */
	switch ( yyerrflag )
	{
	case 0:		/* new error */
		yyerror( (nl_msg(30003,"syntax error")) );
		yynerrs++;
		goto skip_init;
	yyerrlab:
		/*
		** get globals into registers.
		** we have a user generated syntax type error
		*/
		yy_pv = yypv;
		yy_ps = yyps;
		yy_state = yystate;
		yynerrs++;
	skip_init:
	case 1:
	case 2:		/* incompletely recovered error */
			/* try again... */
		yyerrflag = 3;
		/*
		** find state where "error" is a legal
		** shift action
		*/
		while ( yy_ps >= yys )
		{
			yy_n = yypact[ *yy_ps ] + YYERRCODE;
			if ( yy_n >= 0 && yy_n < YYLAST &&
				yychk[yyact[yy_n]] == YYERRCODE)
				/*
				** simulate shift of "error"
				*/
				yy_state = yyact[ yy_n ];
				goto yy_stack;
			}
			/*
			** current state has no shift on
			** "error", pop stack
			*/
```

```
#if YYDEBUG
#       define _POP_ "Error recovery pops state %d, uncovers state %d\n"
                                        if ( yydebug )
                                                printf( _POP_, *yy_ps,
                                                        yy_ps[-1] );
#       undef _POP_
#endif
                                        yy_ps--;
                                        yy_pv--;
                                }
                                /*
                                ** there is no state on stack with "error" as
                                ** a valid shift.  give up.
                                */


/*===================== DO NOT REMOVI     EDIT ============================

        This comment and the following sccsId declaration are managed
        by SCCS for you. Do not edit or remove either.

        Source file:     /users/bmw/Alpha/VRL/SCCS/s.BS_Memo.m
        Latest version:  1.6
        Last mod time:   06/18/89 at 15:34:17

========================================================================*/

static char *sccsId = "@(#)BS_Memo.m rev 1.6 created on 06/18/89 at 15:34:17";

/*===================== DO NOT REMOVE OR EDIT ==========================*/

#include "objc.h"
#include "uil.h"
#include "BMWGlobal.h"
#include "BMGFXInterf.h"



= BS_Memo: BS_Statement (BM_WorkstationMsgs, UIMESSAGES)
{
}


-dispNode
{
        id   rNode, mNode, lNode, aMessage, anEnc;
        id   lParen1, rParen1, lParen2, rParen2;
        int  aWidth;


        aKey = [self toggleButtonForSTR:[model nodeName]];

        [[aKey onReceiver:self] onSelector:@selector(updateCurrentStmt)];
        [[aKey offReceiver:self] offSelector:@selector(checkButton)];

        [aKey attachTo:self];
        [aKey outsideOrigin:pt(30,4)];
        [aKey borderWidth:1];

        aMessage = [self stringLayerForSTR:"MES"];
```

```
[aMessage attachTo:self];
[aMessage borderWidth:1];
[aMessage borderColor:BM_colors.VRLTextOff];

anEnc = [self stringLayerForSTR:"ENC"];

[anEnc attachTo:self];
[anEnc borderWidth:1];
[anEnc borderColor:BM_colors.VRLTextOff];

lParen1 = [self stringLayerForSTR:"("];

[lParen1 attachTo:self];
[lParen1 borderWidth:0];

rParen1 = [self stringLayerForSTR:")"];

[rParen1 attachTo:self];
[rParen1 borderWidth:0];

lParen2 = [self stringLayerForSTR:"("];


[lParen2 attachTo:self];
[lParen2 borderWidth:0];

rParen2 = [self stringLayerForSTR:")"];

[rParen2 attachTo:self];
[rParen2 borderWidth:0];

lNode = [[self frontLayers] at:0];
rNode = [[self frontLayers] at:1];
mNode = [[self frontLayers] at:2];

[lNode outsideOrigin:pt(([aKey adjacentRight]+5),11)];

[aMessage outsideOrigin:pt([aKey adjacentLeft]+1,([aKey adjacentBottom]))];
[lParen1 outsideOrigin:pt(([aMessage adjacentRight]),([aKey adjacentBottom]))];
[mNode outsideOrigin:pt(([lParen1 adjacentRight]+9),([aKey adjacentBottom]))];
[rParen1 outsideOrigin:pt(([mNode adjacentRight]),([mNode adjacentBottom]-[rParen1 height]))];

[anEnc outsideOrigin:pt([aKey adjacentLeft]+1,([rParen1 adjacentBottom]))];
[lParen2 outsideOrigin:pt(([anEnc adjacentRight]),
                                            ([rParen1 adjacentBottom]))];
[rNode outsideOrigin:pt(([lParen2 adjacentRight]+9),
                                            ([rParen1 adjacentBottom]))];
[rParen2 outsideOrigin:pt(([rNode adjacentRight]),
                                            ([rNode adjacentBottom]-[rParen2 height]))];

if (([lNode adjacentRight] > ([rParen1 adjacentRight]))
                            && ([lNode adjacentRight] > ([rParen2 adjacentRight])))
        aWidth = [lNode adjacentRight];
else if ((([rParen1 adjacentRight]) > [lNode adjacentRight])
                            && (([rParen1 adjacentRight]) > [rParen2 adjacentRight]))
        aWidth = [rParen1 adjacentRight];
else if ((([rParen2 adjacentRight]) > [lNode adjacentRight])
                            && (([rParen2 adjacentRight]) > [rParen1 adjacentRight]))
        aWidth = [rParen2 adjacentRight];

[self outsideExtent:pt(aWidth, ([aKey outsideHeight]+[mNode outsideHeight]
                                            +[rNode outsideHeight]
                                            +12))];
```

```
        return self;
}

=:

/*==================== DO NOT REMOVI    EDIT ============================

        This comment and the following sccsId declaration are managed
        by SCCS for you. Do not edit or remove either.

        Source file:    /users/bmw/Alpha/VRL/SCCS/s.BS_NaExprLi.m
        Latest version: 1.4
        Last mod time:  06/18/89 at 15:35:58

======================================================================*/

static char *sccsId = "@(#)BS_NaExprLi.m rev 1.4 created on 06/18/89 at 15:35:58";

/*==================== DO NOT REMOVE OR EDIT ==========================*/

#include "objc.h"
#include "uil.h"
#include "BMWGlobal.h"
#include "BMGFXInterf.h"


= BS_NamedExprList: BS_PtreeNode (BM_WorkstationMsgs, UIMESSAGES)
{
}


-dispNode
{
        id lNode,rNode,aComma;
        int aWidth, aSize;


        lNode=[[self frontLayers] at:0];
        [lNode outsideOrigin:pt(0,0)];
        aSize = [[self frontLayers] size];
        aWidth = [lNode outsideWidth];

        if (aSize > 1)
        {
                rNode=[[self frontLayers] at:1];

                aComma = [self stringLayerForSTR:","];
                [aComma borderWidth:0];

        if ([model displayedHorizontally])
 {
 [self outsideExtent:pt([lNode outsideWidth]+[rNode outsideWidth]+[aComma outsideWidth],[aComma outsideHeight])
 [aComma attachTo:self];
 [aComma outsideOrigin:pt([lNode adjacentRight],0)];
 [rNode outsideOrigin:pt([aComma adjacentRight],0)];
 }
else
        {
        [aComma attachTo:[lNode lastFrontLayer]];

        [[lNode lastFrontLayer] outsideWidth:[[lNode lastFrontLayer] outsideWidth] + [aComma outsideWidth]];
        [aComma outsideOrigin:pt([[lNode lastFrontLayer] adjacentRight]-[aComma outsideWidth],
                                        [[lNode lastFrontLayer] bottom]-[aComma height])];
```

```
		if ([[lNode lastFrontLayer] outsideWidth] > [lNode outsideWidth])
			[lNode outsideWidth:[[lNode lastFrontLayer] outsideWidth]];

		if ([rNode outsideWidth] > [lNode outsideWidth])
				aWidth = [rNode outsideWidth];
		else aWidth = [lNode outsideWidth];



		[self outsideExtent:pt(aWidth,([rNode outsideHeight]+[lNode outsideHeight]))];
		[rNode outsideOrigin:pt(0,[lNode outsideHeight])];
		}
	}
	else
	{
		[self outsideExtent:pt(aWidth,[lNode outsideHeight])];
	}

	return self;
}

=:

/*===================== DO NOT REMOV:    EDIT ==============================

	This comment and the following sccsId declaration are managed
	by SCCS for you. Do not edit or remove either.

	Source file:     /users/bmw/Alpha/VRL/SCCS/s.BS_NaStr.m
	Latest version:  1.4
	Last mod time:   06/18/89 at 15:35:50

=======================================================================*/

static char *sccsId = "@(#)BS_NaStr.m rev 1.4 created on 06/18/89 at 15:35:50";

/*===================== DO NOT REMOVE OR EDIT ===========================*/

#include "objc.h"
#include "uil.h"
#include "BMWGlobal.h"
#include "BMGFXInterf.h"


= BS_NamedStringList: BS_PtreeNode (BM_WorkstationMsgs, UIMESSAGES)
{
}


-dispNode
{
	id lNode,rNode,aComma;
	int aWidth, aSize;


	lNode=[[self frontLayers] at:0];
	[lNode outsideOrigin:pt(0,0)];
	aSize = [[self frontLayers] size];
	aWidth = [lNode outsideWidth];

	if (aSize > 1)
	{
		rNode=[[self frontLayers] at:1];
```

```
        aComma = [self stringLayerForSTR:","];

        [aComma borderWidth:0];

if ([model displayedHorizontally])
        {
        [self outsideExtent:pt([lNode outsideWidth]+[rNode outsideWidth]+[aComma outsideWidth],
                [aComma outsideHeight])
        [aComma attachTo:self];
        [aComma outsideOrigin:pt([lNode adjacentRight],0)];
        [rNode outsideOrigin:pt([aComma adjacentRight],0)];
        }
else
        {
        [aComma attachTo:[lNode lastFrontLayer]];

        [[lNode lastFrontLayer] outsideWidth:[[lNode lastFrontLayer] outsideWidth] + [aComma outsideWidth]];
        [aComma outsideOrigin:pt([[lNode lastFrontLayer] adjacentRight]-[aComma outsideWidth],
                                        [[lNode lastFrontLayer] bottom]-[aComma height])];

        if ([[lNode lastFrontLayer] outsideWidth] > [lNode outsideWidth])
                [lNode outsideWidth:[[lNode lastFrontLayer] outsideWidth]];

        if ([rNode outsideWidth] > [lNode outsideWidth])
                        aWidth = [rNode outsideWidth];
        else aWidth = [lNode outsideWidth];
                [self outsideExtent:pt(aWidth,([rNode outsideHeight]+[lNode outsideHeight]))];
                [rNode outsideOrigin:pt(0,[lNode adjacentBottom])];
                }
        }
        else
        {
                [self outsideExtent:pt(aWidth,[lNode outsideHeight])];
        }

        return self;
}

=:

/*==================== DO NOT REMOV     EDIT ============================

        This comment and the following sccsId declaration are managed
        by SCCS for you. Do not edit or remove either.

        Source file:     /users/bmw/Alpha/VRL/SCCS/s.BS_Next.m
        Latest version:  1.7
        Last mod time:   07/11/89 at 10:43:59

======================================================================*/

static char *sccsId = "@(#)BS_Next.m rev 1.7 created on 07/11/89 at 10:43:59";

/*==================== DO NOT REMOVE OR EDIT ===========================*/

#include "objc.h"
#include "uil.h"
#include "BMWGlobal.h"
#include "BMGFXInterf.h"


= BS_Next:BS_Statement(BM_WorkstationMsgs,UIMESSAGES)
  {
```

```
  }

 - dispNode
  {
  if (!([self applicationFlag]))
     {
     aKey = [self toggleButtonForSTR:[model nodeName]];

     [aKey attachTo:self];
     [[aKey onReceiver:self] onSelector:@selector(updateCurrentStmt)];
     [[aKey offReceiver:self] offSelector:@selector(checkButton)];
     [aKey outsideOrigin:pt(10,5)];
     [[aKey borderWidth:1] borderColor:BM_colors.Border];

     [self outsideExtent:pt([aKey adjacentRight]+10,[aKey outsideHeight]+10)];
     displayFlag=NO;
     }
  else
     displayFlag=YES;

  return self;
  }


-updateCurrentStmt
{
       [modelEditor nextStmt:[self model]];
       return self;
}


=:

/*==================== DO NOT REMOV     EDIT ============================

       This comment and the following sccsId declaration are managed
       by SCCS for you. Do not edit or remove either.

       Source file:    /users/bmw/Alpha/VRL/SCCS/s.BS_NullStmt.m
       Latest version: 1.4
       Last mod time:  08/25/89 at 15:40:41

=======================================================================*/

static char *sccsId = "@(#)BS_NullStmt.m rev 1.4 created on 08/25/89 at 15:40:41";

/*==================== DO NOT REMOVE OR EDIT ===========================*/

#include "objc.h"
#include "uil.h"
#include "BMWGlobal.h"
#include "BMGFXInterf.h"


@requires BS_Next;

= BS_NullStatement:BS_Statement(BM_WorkstationMsgs,UIMESSAGES)
  {
  }


- updateCurrentStmt
```

```
  {
  [[[[[self backLayer] frontLayers] after:self] model] isCurrent:NO];

  return self;
  }


- update:aModel because:(SEL)aSelector
  {
  if ((aSelector == @selector(isCurrent:)) &&
       (!([modelEditor currentStmtId]==[self model])))
     [self updateCurrentStmt];
  else
     if (aSelector == @selector(terminate$))
        [self model:nil];
  return self;
  }



- dispNode
  {
  [self borderWidth:0];
  [self width:0];
  [self height:0];
  [self insideColor:BM_colors.WindowBackground];

  return self;
  }

=:

/*==================== DO NOT REMOV     EDIT ============================

        This comment and the following sccsId declaration are managed
        by SCCS for you. Do not edit or remove either.

        Source file:     /users/bmw/Alpha/VRL/SCCS/s.BS_Pause.m
        Latest version:  1.4
        Last mod time:   06/18/89 at 15:36:29

=======================================================================*/

static char *sccsId = "@(#)BS_Pause.m rev 1.4 created on 06/18/89 at 15:36:29";

/*==================== DO NOT REMOVE OR EDIT ==========================*/

#include "objc.h"
#include "uil.h"
#include "BMWGlobal.h"
#include "BMGFXInterf.h"



= BS_Pause: BS_PtreeNode (BM_WorkstationMsgs, UIMESSAGES)
{
}


-dispNode
{
        id aKey, lNode;
```

```
        aKey = [self toggleButtonForSTR:[model nodeName]];

        [aKey attachTo:self at:pt(0,6)];
        [aKey borderWidth:1];

        [self extent:pt(([aKey width] + 6),([aKey height] + 17))];

        return self;
}

=:

/*==================== DO NOT REMOV     EDIT ============================

        This comment and the following sccsId declaration are managed
        by SCCS for you. Do not edit or remove either.

        Source file:     /users/bmw/Alpha/VRL/SCCS/s.BS_Plate.m
        Latest version:  1.18
        Last mod time:   07/19/89 at 10:16:59

=======================================================================*/

static char *sccsId = "@(#)BS_Plate.m rev 1.18 created on 07/19/89 at 10:16:59";

/*==================== DO NOT REMOVE OR EDIT ==========================*/


#include "objc.h"
#include "uil.h"
#include "BMWGlobal.h"

@requires BS_NullStatement,BM_StatementList,CharString;
@requires  BM_StringEdit,BM_DialogBox;
@requires Menu,PopUpMenu,BorderLayer,StringLayer,ScrollBar;

static id _myMenu=nil;
static id _popUpMenu=nil;

BOOL applicationFlag;

= BS_Plate:RidgeLayer(BM_WorkstationMsgs,UIMESSAGES)
  {
  id  verticalBar,horizontalBar;
  id  bodyLayer;
  id  noteLayer;
  id  plateNum;

  short noteHeight;

  id model, children;
  id childLayers;
  id modelEditor;
  id currentNum;

  int numberOfLayers;
  int numberOfChildren;

  BOOL displayFlag;
  }

- verticalBar
```

```
{
return verticalBar;
}


- addVerticalBar
{
verticalBar = [ScrollBar verticalInterfaceFor:bodyLayer];
[verticalBar borderWidth:1];
[verticalBar borderColor:BM_colors.Border];
[verticalBar attachTo:self];
[verticalBar elevatorColor:BM_colors.VRLPlate];
[verticalBar barColor:BM_colors.Background];

return self;
}


- horizontalBar
{
return horizontalBar;
}


- addHorizontalBar
{
horizontalBar = [ScrollBar horizontalInterfaceFor:bodyLayer];
[horizontalBar borderWidth:1];
[horizontalBar borderColor:BM_colors.Border];
[horizontalBar attachTo:self];
[horizontalBar elevatorColor:BM_colors.VRLPlate];
[horizontalBar barColor:BM_colors.Background];

return self;
}


- plateNum
{
return plateNum;
}


- addPlateNum
{
plateNum = [StringLayer str:"1"];
[plateNum borderWidth:0];
[plateNum extent:pt(17,17)];
[plateNum color:BM_colors.VRLText];
[plateNum insideColor:BM_colors.VRLTextOn];
[plateNum attachTo:self];

return self;
}


- bodyLayer
{
return bodyLayer;
}
```

```
- bodyLayer:(PT)anExtent
  {
  [bodyLayer extent:anExtent];
  return self;
  }



- addBodyLayer
  {
  bodyLayer = [BorderLayer attachTo:self at:pt(0,0)];
  [bodyLayer insideColor:BM_colors.VRLPlate];
  [bodyLayer borderWidth:0];

  return self;
  }

- noteLayer
  {
  return noteLayer;
  }



- addNoteLayer
  {
  id aString1, aString2;
  short tempHeight;

  noteLayer = [BM_DialogBox attachTo:self at:pt(0,0)];
  [noteLayer  insideColor:BM_colors.Background];
  [noteLayer borderWidth:0];

  aString1 = [BM_StringEdit str:"" font:BM_fonts.VRLText
                                   color:BM_colors.VRLText];
  aString2 = [BM_StringEdit str:"" font:BM_fonts.VRLText
                                   color:BM_colors.VRLText];
  [aString1 maxValueSize:65];
  [aString1 insideColor:BM_colors.Background];
  [aString2 maxValueSize:65];
  [aString2 insideColor:BM_colors.Background];

  tempHeight = 24+2*[aString1 height];
  if (tempHeight > noteHeight)
     [noteLayer height:tempHeight];
  else [noteLayer height:noteHeight];

  [aString1 attachTo:noteLayer at:pt(10,8)];
  [aString2 attachTo:noteLayer];
  [aString2 origin:pt([aString1 left],[aString1 adjacentBottom]+8)];

  return self;
  }
- defaultMenu
  {
  if (!(_myMenu))
     {
     _myMenu = [Menu str:[self name]];
     [_myMenu append:[Menu str:"Raise" selector:@selector(toFront)]];
     [_myMenu append:[Menu str:"Lower" selector:@selector(toBack)]];
     [_myMenu append:[Menu str:"Move" selector:@selector(moveFromUser)]];
     }
  return [_myMenu shared$];
  }
```

```
- defaultPopUpMenu
  {
  if (!(_popUpMenu))
     {
     _popUpMenu = [PopUpMenu
        createInterfaceFor:[self defaultMenu] button:RIGHTBUTTON];
     }
  return [_popUpMenu shared$];
  }



- (BOOL)rightButtonDown
  {
  if (!(displayFlag))
     {
     [[self defaultPopUpMenu] receiver:self];
     [_popUpMenu activateAt:event.origin];
     }
  return YES;
  }



- format
  {
  [bodyLayer height:[self height]-2];
  [bodyLayer changed:@selector(extent:)];

  if (verticalBar)
     {
     [bodyLayer outsideWidth:[self width]-[verticalBar outsideWidth]-1];
     [verticalBar outsideOrigin:pt([bodyLayer adjacentRight],
        [bodyLayer adjacentTop])];
     }
  else
     [bodyLayer outsideWidth:[self width]-1];

  [bodyLayer changed:@selector(extent:)];

  if (horizontalBar)
     {
     [bodyLayer height:[bodyLayer height]-[horizontalBar outsideHeight]];
     [bodyLayer changed:@selector(extent:)];
     }

  if (noteLayer)
     {
     [noteLayer width:[self width]];
     [bodyLayer height:[bodyLayer height]-[noteLayer outsideHeight]+1];
     [bodyLayer changed:@selector(extent:)];
     [noteLayer origin:pt([bodyLayer adjacentLeft],[bodyLayer bottom])];
     }
  if (horizontalBar)
     {
     [horizontalBar
        outsideOrigin:pt([bodyLayer adjacentLeft],[bodyLayer adjacentBottom])];
     [horizontalBar width:[horizontalBar width]+2];
     if (noteLayer)
        [noteLayer origin:pt([bodyLayer adjacentLeft],
           [horizontalBar adjacentBottom])];
     }
```

```
if (verticalBar)
   [verticalBar height:[verticalBar height]+2];

if (plateNum)
   [plateNum origin:ptPlus([bodyLayer corner],pt(2,2))];
return self;
}


- (STR)name
{
return "Plate Menu";
}


- update:aModel because:(SEL)aSelector
{
if (aSelector == @selector(evaluating:))
   [self leftButtonDown];
else if (aSelector == @selector(terminate$))
   [self model:nil];
else if (aSelector == @selector(isCurrent:))
   {
   if (([[self model] isCurrent]) && (!(applicationFlag)))
      {
      [currentNum insideColor:BM_colors.VRLTextOn];
      [super toFront];
      }
   else
      [currentNum insideColor:BM_colors.VRLTextOff];
   }
return self;
}


- (BOOL)leftButtonDown
{
[self toFront];
return YES;
}


- toFront
{
BOOL wasInFront = (self == [backLayer lastFrontLayer]);
[super toFront];
if (!wasInFront)
   [[self modelEditor] updatePlates];
return self;
}


- dispNode
{
id aNode, currentBody;
short index, aSize;
PT aPos;

currentBody = [self bodyLayer];
currentNum = [self plateNum];
aSize = [[currentBody frontLayers] size];

if (!(applicationFlag))
```

```
    {
    displayFlag = NO;
    aPos =  pt(12,18);
    }
  else
    {
    displayFlag = YES;
    aPos =  pt(10,10);
    }

  for(index=0;index<aSize;index++)
    {
    aNode=[[currentBody frontLayers] at:index];
    [aNode outsideOrigin:aPos];
    if (!([aNode isKindOf:BS_NullStatement]))
       aPos = pt(10,[aNode adjacentBottom]);
    }

  [aNode left:12];
  [self insideColor:BM_colors.VRLPlate];

  [currentBody changed:@selector(maxContentsArea)];

  return self;
  }



- modelEditor
  {
  return modelEditor;
  }



- modelEditor:anyModel
  {
  modelEditor=anyModel;
  return self;
  }

+ createInterfaceFor:aModel root:rtLayer
  {
  id child, aLayer;
  int index, incY;

  self = [self new];    // creates its own layer
  [self model:aModel];
  [self borderWidth:0];

  children = [aModel children];
  numberOfChildren = [children size];

  for(index=0; index<numberOfChildren; index++)
    {
    child=[children at:index];
    if (!([aModel displayedHorizontally]))
       [child displayedHorizontally:NO];
```

```
    if (!([child isKindOf:BM_Statem     st]))
       {
       if (!(applicationFlag))
          aLayer = [[child interfaceClass]
             researchInterfaceFor:child root:[self bodyLayer]];
       else
          aLayer = [[child interfaceClass]
             applicationInterfaceFor:child root:[self bodyLayer]];
       }
    else
       aLayer = [[child interfaceClass]
          createInterfaceFor:child root:[self bodyLayer]];
    if (!([child isKindOf:BM_StatementList]))
       {
       [aLayer attachTo:[self bodyLayer]];
       [aLayer outsideOrigin:pt(0,0)];
       }
    else
       [aLayer free];
    }

 if ([aModel description] != nil)
    {
    char descriptionStr [200];
    int  length;
    char *line2;

    [[aModel description] asSTR:descriptionStr maxSize:200];
    length = [[aModel description] length];
    descriptionStr[length] = '\0';

    line2 = strchr(descriptionStr,'\n');

    /* don't get pound signs! */

    if (line2 != (char *) 0)
       {
       *(line2++) = '\0';
       if (strlen(line2))
          line2 [strlen(line2)-1] = 0;
       [[[noteLayer frontLayers] at:1] assignSTR:line2+2];
       }
    [[[noteLayer frontLayers] at:0] assignSTR:descriptionStr+2];
    }
 return self;
 }


+ researchInterfaceFor:aModel root:rtLayer
 {
 applicationFlag = NO;
 return [self createInterfaceFor:aModel root:rtLayer];
 }


+ applicationInterfaceFor:aModel root:rtLayer
 {
 applicationFlag = YES;
 return [self createInterfaceFor:aModel root:rtLayer];
 }
```

```
- formatNode
  {
  id  aChild;
  int index;
  childLayers = [[self bodyLayer] frontLayers];
  numberOfLayers = [childLayers size];

  for(index=0; index<numberOfLayers; index++)
     {
     aChild = [childLayers at:index];
     [aChild modelEditor:[self  modelEditor]];
     [aChild formatNode];
     [aChild dispNode];
     }
  return self;
  }


- saveDescription
  {
  id description = nil;

  char *line1 = [[[noteLayer frontLayers] at:0] str];
  char *line2 = [[[noteLayer frontLayers] at:1] str];

  if (strlen(line1) || strlen(line2))
     description = [[[[[CharString str:"##"]
                            concatSTR:line1]
                            concatSTR:"\n##"]
                            concatSTR:line2]
                            concatSTR:"\n"];

  [[self model] description:description];

  return self;
  }
- model
  {
  return model;
  }


- model: aModel
  {
  if (model)
     [model removeDependent:self];

  model=aModel;
  if (model)
     [model addDependent:self];
  return self;
  }



- extent:(PT)aPoint
  {
  [super extent:aPoint];
  [self format];

  return self;
  }
```

```
- initialize
  {
  [super initialize];

  [self borderWidth:4];

  noteHeight = 60;
  bodyLayer = nil;
  noteLayer = nil;
  verticalBar = nil;
  horizontalBar = nil;

  [self addBodyLayer];
  [self addVerticalBar];

  if (!(applicationFlag))
     {
     [self addHorizontalBar];
     [self addPlateNum];
     [self addNoteLayer];
     [self extent:pt(700,420)];
     }
  else
     [self outsideExtent:pt(520,105)];


  [self edgeLightColor:BM_colors.LightFrameShadow];
  [self edgeDarkColor:BM_colors.LightButtonShadow];
  return self;
  }


- terminate$
  {
  [self model:nil];
  return [super terminate$];
  }
=:

/*==================== DO NOT REMOVE    EDIT ============================

       This comment and the following sccsId declaration are managed
       by SCCS for you. Do not edit or remove either.

       Source file:     %F%
       Latest version:  %I%
       Last mod time:   %H% at %U%

======================================================================*/

static char *sccsId = "%Z%%M% rev %I% created on %H% at %U%";

/*==================== DO NOT REMOVE OR EDIT ==========================*/

#include "objc.h"
#include "uil.h"
#include "BMWGlobal.h"
#include "BMGFXInterf.h"


@requires BM_Plate;
```

```
= BS_PlateList: BS_PtreeNode (BM_WorkstationMsgs, UIMESSAGES)
{
}

+createInterfaceFor:aModel root:rtLayer
{
	id child, aLayer;
	int index;

	self = [self new];
	[self model:aModel];
	[self outsideExtent:pt(0,0)];

	children = [aModel children];
	numberOfChildren = [children size];

	for (index=0; index<numberOfChildren; index++)
	{
		child=[children at:index];
		aLayer = [[child interfaceClass] createInterfaceFor:child root:rtLayer];
		if ([child isKindOf:BM_Plate])
			{
			[aLayer attachTo:rtLayer];
			[aLayer outsideOrigin:pt(0,0)];
			}
		else [aLayer free];

	}
	return self;
}


=:

/*==================== DO NOT REMOVE    EDIT ============================

	This comment and the following sccsId declaration are managed
	by SCCS for you. Do not edit or remove either.

	Source file:    /users/bmw/Alpha/VRL/SCCS/s.BS_Primary.m
	Latest version: 1.4
	Last mod time:  06/18/89 at 15:35:43

========================================================================*/

static char *sccsId = "@(#)BS_Primary.m rev 1.4 created on 06/18/89 at 15:35:43";

/*==================== DO NOT REMOVE OR EDIT ==========================*/

#include "objc.h"
#include "uil.h"
#include "BMWGlobal.h"
#include "BMGFXInterf.h"


= BS_Primary: BS_PtreeNode (BM_WorkstationMsgs, UIMESSAGES)
{
}


-dispNode
{
```

```
        id lNode, rNode,lBracket,rBracket;
        int aSize;

        aSize = [[self frontLayers] size];
        lNode = [[self frontLayers] at:0];
        [lNode outsideOrigin:pt(0,0)];

        if (aSize > 1)
        {
                lBracket = [self stringLayerForSTR:"("];

                [lBracket attachTo:self];
                [lBracket borderWidth:0];

                rBracket = [self stringLayerForSTR:")"];

                [rBracket attachTo:self];
                [rBracket borderWidth:0];

                rNode = [[self frontLayers] at:1];
                [lBracket outsideOrigin:pt([lNode adjacentRight],0)];
                [rNode outsideOrigin:pt([lBracket adjacentRight],0)];
                [rBracket outsideOrigin:pt([rNode adjacentRight],0)];

                [self outsideExtent:pt([lNode outsideWidth]+[rNode outsideWidth]
                                +[lBracket outsideWidth]+[rBracket outsideWidth],
                                                [lNode outsideHeight])];
        }
        else
        {
                [self outsideExtent:pt([lNode outsideWidth],[lNode outsideHeight])];
        }

        [self borderWidth:0];

        return self;
}
=:

/*==================== DO NOT REMOVE    EDIT ============================

        This comment and the following sccsId declaration are managed
        by SCCS for you. Do not edit or remove either.

        Source file:    /users/bmw/Alpha/VRL/SCCS/s.BS_Program.m
        Latest version: 1.8
        Last mod time:  07/19/89 at 10:17:16

======================================================================*/

static char *sccsId = "@(#)BS_Program.m rev 1.8 created on 07/19/89 at 10:17:16";

/*==================== DO NOT REMOVE OR EDIT ==========================*/

#include "objc.h"
#include "uil.h"
#include "BMWGlobal.h"
#include "BMGFXInterf.h"

@requires BM_PlateList,BM_Plate;

BOOL applicationFlag;
```

```
= BS_Program:BS_PtreeNode(BM_WorkstationMsgs,UIMESSAGES)
  {
  }

- (BOOL)applicationFlag
  {
  return applicationFlag;
  }


- applicationFlag:(BOOL)aBoolean
  {
  applicationFlag = aBoolean;
  }

- dispNode
  {
  id lNode, mNode, rNode;
  int index,aSize;
  PT  aPos;
  char pStr[3];

  lNode=[[self frontLayers] at:0];
  rNode=[self lastFrontLayer];
  [self insideColor:BM_colors.WindowBackground];

  [lNode removeFromBackLayer];
  [lNode delete];
  [rNode removeFromBackLayer];
  [rNode delete];

  return self;
  }


+ createInterfaceFor:aModel root:rtLayer
  {
  id child, aLayer;
  int index;

  self = [self new];    // creates its own layer
  [self model:aModel];
  [self outsideExtent:pt(0,0)];
  [self borderWidth:0];

  children = [aModel children];
  numberOfChildren = [children size];

  for(index=0; index<numberOfChildren; index++)
    {
    child=[children at:index];

    if ([child isKindOf:BM_Plate])
       {
       if (!(applicationFlag))
          aLayer = [[child interfaceClass]
             researchInterfaceFor:child root:self];
       else
          aLayer = [[child interfaceClass]
             applicationInterfaceFor:child root:self];
       }
    else
       aLayer = [[child interfaceClass] createInterfaceFor:child root:self];
```

```
    if (!([child isKindOf:BM_PlateList]))
        {
        [aLayer attachTo:self];
        [aLayer outsideOrigin:pt(0,0)];
        }
    else [aLayer free];
    }
 return self;
 }



+ researchInterfaceFor:aModel root:rtLayer
  {
  applicationFlag = NO;
  return [self createInterfaceFor:aModel root:rtLayer];
  }


+ applicationInterfaceFor:aModel root:rtLayer
  {
  applicationFlag = YES;
  return [self createInterfaceFor:aModel root:rtLayer];
  }

=:

/*===================== DO NOT REMOVE    EDIT =============================

        This comment and the following sccsId declaration are managed
        by SCCS for you. Do not edit or remove either.

        Source file:     /users/bmw/Alpha/VRL/SCCS/s.BS_PtreeNode.m
        Latest version:  1.3
        Last mod time:   06/18/89 at 15:34:09

=========================================================================*/

static char *sccsId = "@(#)BS_PtreeNode.m rev 1.3 created on 06/18/89 at 15:34:09";

/*===================== DO NOT REMOVE OR EDIT ===========================*/

#include "objc.h"
#include "stdio.h"
#include "uil.h"
#include "BMWGlobal.h"
#include "BMGFXInterf.h"


@requires StringLayer, BM_ToggleButton;


= BS_PtreeNode:BorderLayer(BM_WorkstationMsgs,UIMESSAGES)
  {
  id   model, children;
  id   childLayers;
  id   modelEditor;

  int  numberOfChildren;
  int  numberOfLayers;
  }
```

```
- highlightChildren:(BOOL)aBooleanValue
 {
 id myKids;
 short numKids,index;

 if (aBooleanValue)
    [self highlight];
 else
    [self unHighlight];

 myKids  = [self frontLayers];
 numKids = [myKids size];
 for(index=0; index<numKids; index++)
    if ([[myKids at:index] frontLayers])
       [[myKids at:index] highlightChildren:aBooleanValue];
    else
       {
       if (aBooleanValue)
          [[myKids at:index] highlight];
       else
          [[myKids at:index] unHighlight];
       }
 return self;
 }



- modelEditor
 {

 return(modelEditor);
 }



- modelEditor:aModel
 {
 modelEditor=aModel;
 return self;
 }

- stringLayerForSTR:(STR)aSTR
 {
  id sl =[StringLayer str:aSTR font:BM_fonts.VRLText color:BM_colors.VRLText];

  [sl insideColor:BM_colors.VRLTextOff];

  return sl;
 }


- toggleButtonForSTR:(STR)aSTR
 {
  id tb = [BM_ToggleButton str:aSTR font:BM_fonts.VRLText
                                    color:BM_colors.VRLText];

  [tb  onColor:BM_colors.VRLTextOn];
  [tb offColor:BM_colors.VRLTextOff];

  return tb;
 }
```

```
- initialize
 {
  [super initialize];

  [self insideColor:BM_colors.VRLTextOff];

  return self;
 }


+ createInterfaceFor:aModel root:rtLayer
 {
 id child, aLayer;
 int index;

 self = [self new];    // creates its own layer
 [self model:aModel];
 [self outsideExtent:pt(0,0)];
 [self borderWidth:0];

 children = [aModel children];
 numberOfChildren = [children size];

 for(index=0; index<numberOfChildren; index++)
    {
    child=[children at:index];
    if (!([aModel displayedHorizontally]))
       [child displayedHorizontally:NO];
    aLayer = [[child interfaceClass] createInterfaceFor:child root:rtLayer];
    [aLayer attachTo:self];
    [aLayer outsideOrigin:pt(0,0)];
    }
 return self;

 }
- dispNode
 {
 id aNode;

 aNode = [[self frontLayers] at:0];
 [self outsideExtent:pt([aNode outsideWidth],[aNode outsideHeight])];
 [aNode outsideOrigin:pt(0,0)];

 return self;
 }



- formatNode
 {
 id  aChild;
 int index;

 childLayers = [self frontLayers];
 numberOfLayers = [childLayers size];

 for (index=0; index<numberOfLayers; index++)
 {
 aChild = [childLayers at:index];
 [aChild modelEditor:[self  modelEditor]];
 [aChild formatNode];
 [aChild dispNode];
 }
```

```
    return self;
    }
  - model
    {
    return model;
    }

  - model: aModel
    {
    if (model)
       [model removeDependent:self];
    model = aModel;
    if (model)
       [model addDependent:self];
    return self;
    }



  - terminate$
    {
    [self model:nil];
    return [super terminate$];
    }


  - update:aModel because:(SEL)aSelector
    {
    if (aSelector == @selector(terminate$))
       [self model:nil];
    return self;
    }


=:

/*==================== DO NOT REMOVE    :DIT ============================

        This comment and the following sccsId declaration are managed
        by SCCS for you. Do not edit or remove either.

        Source file:     /users/bmw/Alpha/VRL/SCCS/s.BS_Qident.m
        Latest version:  1.23
        Last mod time:   09/11/89 at 19:37:38

=====================================================================*/

static char *sccsId = "@(#)BS_Qident.m rev 1.23 created on 09/11/89 at 19:37:38";

/*==================== DO NOT REMOVE OR EDIT ==========================*/

#include "objc.h"
#include "uil.h"
#include "BMWGlobal.h"

@requires Prompter;
@requires BS_For;


= BS_Qidentifier:BS_Terminal(BM_WorkstationMsgs,UIMESSAGES)
  {
  }
```

```
- dispNode
 {
 [super dispNode];

 if ([[self backLayer] class] != BS_For)
    [self menu:[self stdMenu] owner:self];

 return self;
 }



- graph
 {
 id values = [[self model] savedValues];
 [self on];

 [[modelEditor researchWin]
    generateGraphFor:values chartType:HISTOGRAM
       node:[self model]];

 [self off];
 return self;
 }


- linePlot
 {
 id values = [[self model] savedValues];
 [self on];

 [[modelEditor researchWin]
    generateGraphFor:values chartType:LINE
       node:[self model]];

 [self off];
 return self;
 }
- barPlot
 {
 id values = [[self model] savedValues];
 [self on];

 [[modelEditor researchWin]
    generateGraphFor:values chartType:BAR
      node:[self model]];

 [self off];
 return self;
 }


- piePlot
 {
 id values = [[self model] savedValues];
 [self on];

 [[modelEditor researchWin]
    generateGraphFor:values chartType:PIE
       node:[self model]];

 [self off];
 return self;
 }
```

```
- view
  {
  id values   = [[self model] savedValues];
  [self on];

  [[modelEditor researchWin]
     generateReportFor:values node:[self model]];

  [self off];
  return self;
  }

=:

/*===================== DO NOT REMOVE .  EDIT ==============================

       This comment and the following sccsId declaration are managed
       by SCCS for you. Do not edit or remove either.

       Source file:     /users/bmw/Alpha/VRL/SCCS/s.BS_SaveList.m
       Latest version:  1.2
       Last mod time:   08/25/89 at 15:39:01

========================================================================*/

static char *sccsId = "@(#)BS_SaveList.m rev 1.2 created on 08/25/89 at 15:39:01";

/*===================== DO NOT REMOVE OR EDIT ===========================*/


#include "objc.h"
#include "uil.h"
#include "BMWGlobal.h"


= BS_SaveList: BS_Statement (BM_WorkstationMsgs, UIMESSAGES)
{
}


-doNothing
       {
       return self;
       }


- dispNode
 {
 if (!([self applicationFlag]))
    {
    id lNode;

    aKey = [self toggleButtonForSTR:[model nodeName]];

    [[aKey onReceiver:self] onSelector:@selector(updateCurrentStmt)];
    [[aKey offReceiver:self] offSelector:@selector(checkButton)];
    [aKey attachTo:self ];
    [aKey outsideOrigin:pt(30,4)];
    [aKey borderWidth:1];

    lNode = [[self frontLayers] at:0];

    [lNode outsideOrigin:pt(([aKey adjacentRight] + 5),11)];
```

```
    [self outsideExtent:pt(([lNode adjacentRight] + 10),
      ([aKey outsideHeight] + 10))];
    displayFlag = NO;
    }
  else
    displayFlag = YES;

  return self;
}

=:

/*==================== DO NOT REMOVE    EDIT ===========================

       This comment and the following sccsId declaration are managed
       by SCCS for you. Do not edit or remove either.

       Source file:     /users/bmw/Alpha/VRL/SCCS/s.BS_Statement.m
       Latest version:  1.6
       Last mod time:   07/19/89 at 10:17:28

=====================================================================*/

static char *sccsId = "@(#)BS_Statement.m rev 1.6 created on 07/19/89 at 10:17:28";

/*==================== DO NOT REMOVE OR EDIT ==========================*/

#include "objc.h"
#include "uil.h"
#include "BMWGlobal.h"
#include "BMGFXInterf.h"

@requires BM_ToggleButton, StringLayer;

BOOL applicationFlag;

= BS_Statement:BS_PtreeNode(BM_WorkstationMsgs,UIMESSAGES)
  {
  id aKey;
  BOOL displayFlag;
  }


- aKey
  {
  return aKey;
  }


- checkButton
  {
  if ([modelEditor currentStmtId]==[self model])
        [aKey on];
  return self;
  }


- updateCurrentStmt
  {
  [modelEditor currentStmtId:[self model]];
  return self;
  }
```

```
- (BOOL)leftButtonDown
  {
  if (displayFlag)
     {
     if (!([self isHighlighted]))
        [self highlightChildren:YES];
     [self show];
     [modelEditor currentStmtId:[self model]];
     }
  return YES;
  }


- update:aModel because:(SEL)aSelector
   {
   if ((aSelector == @selector(isCurrent:)) &&
         (!([modelEditor currentStmtId]==[self model])))
      {
      if (!(displayFlag))
         [aKey toggle];
      else
         {
         if ([self isHighlighted])
            {
            [self highlightChildren:NO];
            [self show];
            }
         else
            {
            [self highlightChildren:YES];
            [self show];
            [self updateCurrentStmt];
            }
         }
      }
  else
     if (aSelector == @selector(terminate$))
        [self model:nil];
  return self;
  }


- (BOOL)applicationFlag
  {
  return applicationFlag;
  }


+ researchInterfaceFor:aModel root:rtLayer
  {
  applicationFlag = NO;
  return [self createInterfaceFor:aModel root:rtLayer];
  }


+ applicationInterfaceFor:aModel root:rtLayer
  {
  applicationFlag = YES;
  return [self createInterfaceFor:aModel root:rtLayer];
  }
```

```
- initialize
  {
  [super initialize];
  aKey = nil;
  return self;
  }

=:

/*==================== DO NOT REMOVE    EDIT ============================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "%Z%%M% rev %I% created on %H% at %U%";

/*==================== DO NOT REMOVE OR EDIT ===========================*/

#include "objc.h"
#include "uil.h"
#include "BMWGlobal.h"
#include "BMGFXInterf.h"

@requires BM_StatementList;

= BS_StatementList: BS_PtreeNode (BM_WorkstationMsgs, UIMESSAGES)
{
}

+createInterfaceFor:aModel root:rtLayer
{
        id child, aLayer;
        int index;

        self = [self new];      // creates its own layer
        [self model:aModel];
        [self outsideExtent:pt(0,0)];
        [self borderWidth:0];

        children = [aModel children];
        numberOfChildren = [children size];

        for (index=0; index<numberOfChildren; index++)
        {
                child=[children at:index];
                if (!([aModel displayedHorizontally]))
                        [child displayedHorizontally:NO];
                aLayer = [[child interfaceClass] createInterfaceFor:child root:rtLayer];
                if (!([child isKindOf:BM_StatementList]))
                        {
                        [aLayer attachTo:rtLayer];
                        [aLayer outsideOrigin:pt(0,0)];
                        }
                else [aLayer free];
        }
        return self;
}

=:
```

```
/*==================== DO NOT REMOVE    EDIT ============================

        This comment and the following sccsId declaration are managed
        by SCCS for you. Do not edit or remove either.

        Source file:    /users/bmw/Alpha/VRL/SCCS/s.BS_StrLit.m
        Latest version: 1.4
        Last mod time:  06/18/89 at 15:36:48

=========================================================================*/

static char *sccsId = "@(#)BS_StrLit.m rev 1.4 created on 06/18/89 at 15:36:48";

/*==================== DO NOT REMOVE OR EDIT ===========================*/

#include "objc.h"
#include "uil.h"
#include "BMWGlobal.h"
#include "BMGFXInterf.h"

@requires CharString;


= BS_StringLiteral: BS_Terminal (BM_WorkstationMsgs, UIMESSAGES)
{
}


+createInterfaceFor:aModel root:rtLayer
{
        id aStr;

         aStr = [CharString str:"\""];
         aStr = [aStr concatSTR:[aModel str]];
         aStr = [aStr concatSTR:"\""];
         self = [self str:[aStr str] font:BM_fonts.VRLText
                                color:BM_colors.VRLText];
         [self model:aModel];

         [self alignToggleAndStrLayers];

         return self;
}



=:

/*==================== DO NOT REMOVE    EDIT ============================

        This comment and the following sccsId declaration are managed
        by SCCS for you. Do not edit or remove either.

        Source file:    /users/bmw/Alpha/VRL/SCCS/s.BS_Terminal.m
        Latest version: 1.6
        Last mod time:  07/29/89 at 10:48:02

=========================================================================*/

static char *sccsId = "@(#)BS_Terminal.m rev 1.6 created on 07/29/89 at 10:48:02";

/*==================== DO NOT REMOVE OR EDIT ===========================*/
```

```
#include "objc.h"
#include "uil.h"
#include "BMWGlobal.h"
#include "BMGFXInterf.h"

@requires BM_Menu, DispText;

static id _stdLogicalMenu = nil;

= BS_Terminal:BM_ToggleButton(BM_WorkstationMsgs,UIMESSAGES)
  {
  id stdMenu;
  id model;
  id modelEditor;
  }


- stdMenu
  {
  if (_stdLogicalMenu == nil)
      _stdLogicalMenu = [BM_Menu stdMenu:"" owner:nil];

  return _stdLogicalMenu;
  }


- (BOOL)leftButtonDown
  {
  return [[self backLayer] leftButtonDown];
  }


- highlightChildren:(BOOL)aBooleanValue
  {
  if (aBooleanValue)
     [self highlight];
  else
     [self unHighlight];
  return self;
  }


- update:aModel because:(SEL)aSelector
  {
  if (aSelector == @selector(evaluating:))
     [self toggle];
  else
     if (aSelector == @selector(terminate$))
        [self model:nil];

  return self;
  }


- alignToggleAndStrLayers
  {
  [self height:[BM_fonts.VRLText height]];

  return self;
  }
```

```
- modelEditor
{
return(modelEditor);
}


- modelEditor:aModel
{
modelEditor=aModel;
return self;
}


+ createInterfaceFor:aModel root:rtLayer
{
id child, aLayer;
int index, incY;

self = [self dispText:[[[DispText charString:[[aModel identifier] shared$]]
                                font:BM_fonts.VRLText]
                               color:BM_colors.VRLText]];
[self model:aModel];
[self alignToggleAndStrLayers];

return self;
}

- initialize
{
[super initialize];

[self onColor:BM_colors.VRLTextOn];
[self offColor:BM_colors.VRLTextOff];
[self borderWidth:0];

return self;
}

- dispNode
{
return self;
}


- formatNode
{
return self;
}


- model
{
return model;
}


- model: aModel
{
if (model)
   [model removeDependent:self];
```

```
 model=aModel;
 if (model)
    [model addDependent:self];
 return self;
 }


- terminate$
 {
 [self model:nil];
 return [super terminate$];
 }

=:

/*===================== DO NOT REMOVI    EDIT =============================

       This comment and the following sccsId declaration are managed
       by SCCS for you. Do not edit or remove either.

       Source file:    /users/bmw/Alpha/VRL/SCCS/s.BS_Where.m
       Latest version:  1.8
       Last mod time:   06/18/89 at 15:34:34

=========================================================================*/

static char *sccsId = "@(#)BS_Where.m rev 1.8 created on 06/18/89 at 15:34:34";

/*===================== DO NOT REMOVE OR EDIT ============================*/

#include "objc.h"
#include "uil.h"
#include "BMWGlobal.h"
#include "BMGFXInterf.h"


@requires Prompter,BM_Menu;

static id _stdLMenu = nil;


= BS_Where:BS_Statement(BM_WorkstationMsgs,UIMESSAGES)
  {
  id stdMenu;
  }


- stdMenu
  {
  if (_stdLMenu == nil)
     _stdLMenu = [BM_Menu stdMenu2:"" owner:nil];

  return _stdLMenu;
  }


- displayUniverse
  {
  char aString[100];
  int universeSize;

  universeSize = [[[self model] savedUniverse] size];
  sprintf(aString,"Universe consists of %d entities.",universeSize);
  [[[Prompter  promptSTR:aString] insideColor:BM_colors.Prompter] free];
```

```
 return self;
 }



- dispNode
 {
 id lNode;

 lNode = [[self frontLayers] at:0];
 if (!([self applicationFlag]))
   {
   aKey = [self toggleButtonForSTR:[model nodeName]];

   [aKey attachTo:self];
   [[aKey onReceiver:self] onSelector:@selector(updateCurrentStmt)];
   [[aKey offReceiver:self] offSel(    ':@selector(checkButton)];
   [aKey outsideOrigin:pt(30,4)];
   [aKey borderWidth:1];
   [aKey menu:[self stdMenu]  owner:aKey];
   [lNode outsideOrigin:pt(([aKey adjacentRight]+5),11)];
   [self outsideExtent:pt(([lNode adjacentRight]+10),
      ([aKey outsideHeight]+10))];
   displayFlag = NO;
   }
 else
   {
   [lNode outsideOrigin:pt(2,2)];
   [self outsideExtent:pt(([lNode adjacentRight]+2),
      ([BM_fonts.VRLText height]+4))];
   displayFlag = YES;
   }

 return self;
 }

=:

# line 2 "grammar.y"
/*==================== DO NOT REMOVE OR EDIT ============================

       This comment and the following sccsId declaration are managed
       by SCCS for you. Do not edit or remove either.

       Source file:     %F%
       Latest version:  %I%
       Last mod time:   %H% at %U%

=====================================================================*/

static char *sccsId = "@(#)grammar.y work in progress by bmw";

/*==================== DO NOT REMOVE OR EDIT ==========================*/


#include <stdio.h>
#include "batterymarch.h"
#include "objc.h"
#include "uil.h"

@requires BM_StatementList, BM_Set, BM_Delete, BM_SaveList, BM_Install;
@requires BM_Temp, BM_StringLiteral, BM_AbsDateConst, BM_CurrencyConst;
@requires BM_DateOffsetConst, CharString;
```

```
@requires BM_ArithExprList, BM_ArithTMS, BM_ArithPLS, BM_ArithMIN;
@requires BM_ArithDIV, BM_ArithPOW, BM_ArithUnaryMIN;
@requires BM_CurrencyConst;
@requires BM_Where, BM_Memo;
@requires BM_NamedExprList, BM_KeywordExpr;
@requires BM_LogicLT, BM_LogicGT, BM_LogicEQ;
@requires BM_LogicLE, BM_LogicGE, BM_LogicNE, BM_LogicAND;
@requires BM_LogicOR, BM_LogicNOT, BM_FunctionCall;
@requires BM_Primary, BM_Pause, BM_Continue, BM_For, BM_Next, BM_Begin;
@requires BM_End, BM_NamedStringList, BM_KeywordField, BM_Program;
@requires BM_Error, BM_Lexer, BM_StreamString;
@requires BM_Plate, BM_PlateList;
@requires BM_Qidentifier, BM_NullStatement;

extern STR rawtoken;
static BOOL parserErrorFlag;
static BOOL parseDebug = NO;
= BM_Parser : Object (BMPARSE)
{
        id myLexer;
}
// Turn on (off) yacc debugging
+ (BOOL) setDebug:(BOOL)value
{
    BOOL old = parseDebug;
    parseDebug = value;
    return parseDebug;
}
static id theLexer;     // assumes only one !!!
+new
{
    self = [super new];
    theLexer = myLexer = [BM_Lexer new];
    return self;
}

-(BOOL)parse:aStream
{
    [myLexer stream:aStream];
    parserErrorFlag = NO;
    yyparse();
    return (parserErrorFlag);
}
=:

#define yylex()         yynewlex(theLexer)

#define YYSTYPE id

/* just make this big enough for now; later need to re-do
 * parser function to allocate new stacks on demand
 */
#define YYMAXDEPTH 0x400        /* = 1024 decimal or 4 times default */
# define WHERE 257
# define SET 258
# define INSTALL 259
# define TEMP 260
# define IDENTIFIER 261
# define MEMO 262
# define ENCLOSE 263
# define LEFTPAREN 264
# define RIGHTPAREN 265
# define MESSAGE 266
```

```
# define PAUSE 267
# define CONTINUE 268
# define FOR 269
# define NEXT 270
# define BEGIN 271
# define END 272
# define COMMA 273
# define COLON 274
# define STRINGLITERAL 275
# define ABSOLUTEDATECONSTANT 276
# define DATEOFFSETCONSTANT 277
# define LEFTSQUARE 278
# define RIGHTSQUARE 279
# define CONSTANT 280
# define DOLLAR 281
# define LEFTBRACKETS 282
# define RIGHTBRACKETS 283
# define MODIFIER 284
# define NULLSTATEMENT 285
# define COMMENT 286
# define DELETE 287
# define SAVELIST 288
# define PLS 289
# define MIN 290
# define TMS 291
# define DIV 292
# define POW 293
# define OR 294
# define AND 295
# define NOT 296
# define LT 297
# define GT 298
# define EQ 299
# define LE 300
# define GE 301
# define NE 302

# line 102 "grammar.y"
id parseTree;
#define yyclearin yychar = -1
#define yyerrok yyerrflag = 0
extern int yychar;
extern int yyerrflag;
#ifndef YYMAXDEPTH
#define YYMAXDEPTH 150
#endif
#ifndef YYSTYPE
#define YYSTYPE int
#endif
YYSTYPE yylval, yyval;
typedef int yytabelem;
# define YYERRCODE 256

# line 514 "grammar.y"


extern int _VRLLineNumber;

yyerror(theComplaint)
char *theComplaint;
{
   printf("yyerror(%s): line %d\n",theComplaint,_VRLLineNumber);
}
```

```
yytabelem yyexca[] ={
-1, 0,
	0, 9,
	-2, 0,
-1, 1,
	0, -1,
	-2, 0,
-1, 5,
	272, 9,
	-2, 15,
-1, 6,
	0, 14,
	-2, 0,
	};
# define YYNPROD 88
# define YYLAST 311
yytabelem yyact[]={

 107,   65,   66,   64,   67,   68,   87,   86,   84,   69,
  70,   71,   72,   73,   74,   65,   66,   64,   67,   68,
  62,   63,   62,   68,   65,   66,   64,   67,   68,   59,
  61,  108,   69,   70,   71,   72,   73,   74,   12,   13,
  14,   15,   18,   81,   19,   32,  124,   61,   35,   20,
  21,   11,   23,   10,   24,   64,   67,   68,  121,   43,
  63,   62,   43,  156,   44,   83,  123,   22,  122,   16,
  17,  121,   82,  126,   37,   12,   13,   14,   15,   18,
  36,   19,  130,  146,  127,  125,   20,   21,   81,   23,
 107,  121,   61,  129,   88,   11,  153,   89,   65,   66,
  64,   67,   68,  128,   22,   11,   16,   17,   24,   65,
  66,   64,   67,   68,   65,   66,   64,   67,   68,   65,
  66,   64,   67,   68,   32,  150,  157,   79,   43,  137,
 138,  145,  152,   44,  120,  119,  151,   32,   43,  144,
 143,  142,   34,   44,   92,  110,   58,   40,   45,   42,
  38,   91,   80,   37,   30,    7,   39,   33,   29,    8,
  41,  112,    9,    3,   47,   27,    6,   50,   31,   26,
 111,   46,   46,   48,   49,   46,   51,  134,   75,   28,
  78,   52,   53,   57,   60,   25,    5,   56,   54,   55,
   4,    2,    1,   76,   77,    0,    0,    0,    0,   85,
   0,    0,    0,   90,    0,    0,    0,   96,   97,   98,
  99,  100,  101,  102,  103,  104,  105,  106,   93,    0,
  94,   95,  109,    0,  114,    0,    0,  116,    0,  117,
 118,    0,    0,    0,    0,    0,    0,    0,  113,    0,
 115,    0,    0,    0,    0,    0,    0,    0,    0,    0,
   0,    0,    0,    0,    0,    0,    0,    0,    0,    0,
   0,    0,  114,    0,    0,    `,  133,    0,  114,  140,
 141,  139,  132,  136,    0,    0,  113,   93,   93,    0,
   0,    0,  113,    0,  135,    0,    0,    0,    0,    0,
   0,    0,    0,    0,    0,    0,  114,    0,    0,  155,
 147,  148,  149,    0,  154,    0,    0,    0,    0,   93,
 113 };
yytabelem yypact[]={

 -218, -3000, -3000, -3000, -3000,  -174,  -181, -3000, -3000, -3000,
-3000,  -124, -3000,  -216,  -124,  -124,  -124,  -124,  -124,  -124,
 -213,  -213, -3000, -3000, -3000,  -164, -3000,  -181,  -181,  -257,
-3000,  -252, -3000,  -273,  -288,  -216,  -216,  -137, -3000,  -235,
-3000, -3000,  -209, -3000, -3000,  -291,  -252,  -292, -3000, -3000,
 -293,  -169, -3000, -3000, -3000, -3000,  -257, -3000, -3000, -3000,
-3000,  -124,  -216,  -216,  -137,  -137,  -137,  -137,  -137,  -137,
 -137,  -137,  -137,  -137,  -137,  -265,  -234, -3000,  -270,  -137,
-3000,  -137, -3000,  -124,  -137, -3000,  -137,  -137,  -129,  -130,
-3000,  -215, -3000,  -208, -3000,  -275,  -270,  -236,  -236,  -270,
-3000,  -274,  -274,  -274,  -274,  -274,  -274, -3000, -3000,  -175,
```

```
 -233,  -188,  -200,  -190,  -274, -3000,  -170,  -180,  -191,  -137,
 -124,  -124, -3000,  -147, -3000,  -137,  -137,  -137,  -116,  -117,
 -118,  -134,  -182, -3000, -3000, -3000, -3000, -3000, -3000, -3000,
 -274,  -274,  -216,  -216,  -216,  -141,  -127,  -273,  -273,  -273,
 -132,  -168,  -124,  -137,  -202,  -139, -3000, -3000 };
yytabelem yypgo[]={

    0,   192,   191,   163,   190,   186,   185,   162,   165,   179,
  158,   146,   154,   157,   148,   142,   156,   145,   151,   160,
  152,   144,   177,   149,   170,   161,   150,   147 };
yytabelem yyr1[]={

    0,     1,     1,     1,     2,     3,     3,     3,     3,     3,
    6,     6,     4,     4,     4,     4,     4,     9,     9,    12,
   12,    12,    12,    12,    12,    12,    12,    12,    12,    12,
   12,    12,    12,    12,    12,    12,    10,     8,     8,     5,
    7,    18,    18,    21,    16,    11,    22,    22,    22,    22,
   19,    17,    17,    17,    25,    25,    24,    15,    15,    15,
   15,    15,    15,    15,    15,    13,    13,    13,    13,    13,
   13,    13,    13,    13,    13,    13,    14,    14,    26,    26,
   26,    26,    26,    27,    27,    27,    23,    20 };
yytabelem yyr2[]={

    0,     3,     3,     3,     7,     7,     9,     5,     7,     0,
    3,     5,     3,     3,     3,     3,     3,     3,     5,     3,
    5,     9,    15,     9,    15,     5,     5,     9,    15,    21,
   21,     5,     5,     3,     3,     3,     3,     7,     5,     3,
    3,     7,     3,     7,     3,     3,     3,     3,     3,     3,
    3,     3,     7,     3,     3,     7,     7,     7,     7,     7,
    7,     7,     7,     5,     3,     7,     7,     7,     7,     7,
    7,     7,     7,     7,     5,     3,     3,     5,     3,     5,
    9,     3,     3,     3,     5,     7,     3,     7 };
yytabelem yychk[]={

-3000,    -1,    -2,    -3,    -4,    -5,    -8,   -12,   -10,    -7,
  271,   269,   256,   257,   258,   259,   287,   288,   260,   262,
  267,   268,   285,   270,   272,    -6,    -3,    -8,    -9,   -10,
  -12,   -16,   261,   -13,   -15,   264,   296,   290,   -26,   -16,
  -27,   -19,   -23,   275,   280,   -14,   -16,   -14,   -16,   -16,
  -14,   -16,   -19,   -19,    -7,    -3,   -10,   -12,   -11,   286,
  -20,   282,   295,   294,   291,   289,   290,   292,   293,   297,
  298,   299,   300,   301,   302,   -15,   -13,   -13,   -15,   264,
  -20,   278,   281,   274,   299,   -20,   299,   299,   263,   266,
  -11,   -18,   -21,   -16,   -13,   -13,   -15,   -15,   -15,   -15,
  -15,   -15,   -15,   -15,   -15,   -15,   -15,   265,   265,   -15,
  -17,   -24,   -25,   -16,   -15,   -16,   -15,   -15,   -15,   264,
  264,   273,   283,   274,   279,   273,   273,   274,   273,   273,
  273,   -17,   -18,   -21,   -22, [illegible],   -23,   276,   277,   -17,
  -15,   -15,   257,   257,   257,   265,   265,   -13,   -13,   -13,
  266,   263,   264,   264,   -18,   -17,   265,   265 };
yytabelem yydef[]={

   -2,    -2,     1,     2,     3,    -2,    -2,    12,    13,    16,
   39,     0,    19,     0,     0,     0,     0,     0,     0,     0,
   33,    34,    35,    36,    40,     0,    10,     0,     0,     7,
   17,    38,    44,    20,    75,     0,     0,     0,    64,    78,
   81,    82,    83,    50,    86,     0,    76,     0,    25,    26,
    0,     0,    31,    32,     4,    11,     5,    18,     8,    45,
   37,     0,     0,     0,     0,     0,     0,     0,     0,     0,
    0,     0,     0,     0,     0,    75,     0,    74,    63,     0,
   79,     0,    84,     0,     0,    77,     0,     0,     0,     0,
    6,     0,    42,     0,    71,    72,    57,    58,    59,    60,
   61,    65,    66,    67,    68,    69,    70,    62,    73,     0,
```

```
      0,    51,    53,    78,    54,    85,    21,    23,    27,     0,
      0,     0,    87,     0,    80,     0,     0,     0,     0,     0,
      0,     0,     0,    41,    43,    46,    47,    48,    49,    52,
     55,    56,     0,     0,     0,     0,     0,    22,    24,    28,
      0,     0,     0,     0,     0,     0,    29,    30 };
typedef struct { char *t_name; int t_val; } yytoktype;
#ifndef YYDEBUG
#       define YYDEBUG  0       /* don't allow debugging */
#endif

#if YYDEBUG

yytoktype yytoks[] =
{
        "WHERE",        257,
        "SET",  258,
        "INSTALL",      259,
        "TEMP", 260,
        "IDENTIFIER",   261,
        "MEMO", 262,
        "ENCLOSE",      263,
        "LEFTPAREN",    264,
        "RIGHTPAREN",   265,
        "MESSAGE",      266,
        "PAUSE",        267,
        "CONTINUE",     268,
        "FOR",  269,
        "NEXT", 270,
        "BEGIN",        271,
        "END",  272,
        "COMMA",        273,
        "COLON",        274,
        "STRINGLITERAL",        275,
        "ABSOLUTEDATECONSTANT", 276,
        "DATEOFFSETCONSTANT",   277,
        "LEFTSQUARE",   278,
        "RIGHTSQUARE",  279,
        "CONSTANT",     280,
        "DOLLAR",       281,
        "LEFTBRACKETS", 282,
        "RIGHTBRACKETS",        283,
        "MODIFIER",     284,
        "NULLSTATEMENT",        285,
        "COMMENT",      286,
        "DELETE",       287,
        "SAVELIST",     288,
        "PLS",  289,
        "MIN",  290,
        "TMS",  291,
        "DIV",  292,
        "POW",  293,
        "OR",   294,
        "AND",  295,
        "NOT",  296,
        "LT",   297,
        "GT",   298,
        "EQ",   299,
        "LE",   300,
        "GE",   301,
        "NE",   302,
        "-unknown-",    -1      /* ends search */
};
```

```
char * yyreds[] =
{
	"-no such reduction-",
	"ParseUnit : Program",
	"ParseUnit : Plate",
	"ParseUnit : SingleStatement",
	"Program : BeginStatement PlateList EndStatement",
	"Plate : ForStatement StatementList NextStatement",
	"Plate : ForStatement StatementList NextStatement Comment",
	"Plate : ForStatement NextStatement",
	"Plate : ForStatement NextStatement Comment",
	"Plate : /* empty */",
	"PlateList : Plate",
	"PlateList : PlateList Plate",
	"SingleStatement : Statement",
	"SingleStatement : NextStatement",
	"SingleStatement : ForStatement",
	"SingleStatement : BeginStatement",
	"SingleStatement : EndStatement",
	"StatementList : Statement",
	"StatementList : StatementList Statement",
	"Statement : error",
	"Statement : WHERE LogicalExpression",
	"Statement : SET LeftHandSide EQ ArithmeticExpression",
	"Statement : SET LeftHandSide EQ ArithmeticExpression COMMA WHERE LogicalExpression",
	"Statement : INSTALL LeftHandSide EQ ArithmeticExpression",
	"Statement : INSTALL LeftHandSide EQ ArithmeticExpression COMMA WHERE LogicalExpression",
	"Statement : DELETE Identifier",
	"Statement : SAVELIST Identifier",
	"Statement : TEMP LeftHandSide EQ ArithmeticExpression",
	"Statement : TEMP LeftHandSide EQ ArithmeticExpression COMMA WHERE LogicalExpression",
	"Statement : MEMO Identifier ENCLOSE LEFTPAREN NamedExpressionList RIGHTPAREN MESSAGE LEFTPAREN
	                                                                      NamedStringList RIGHTP
	"Statement : MEMO Identifier MESSAGE LEFTPAREN NamedStringList RIGHTPAREN ENCLOSE LEFTPAREN
	                                                                NamedExpressionList RIGHTP
	"Statement : PAUSE StringLiteral",
	"Statement : CONTINUE StringLiteral",
	"Statement : PAUSE",
	"Statement : CONTINUE",
	"Statement : NULLSTATEMENT",
	"NextStatement : NEXT",
	"ForStatement : FOR Identifier ModifierList",
	"ForStatement : FOR Identifier",
	"BeginStatement : BEGIN",
	"EndStatement : END",
	"NamedStringList : NamedStringList COMMA KeywordField",
	"NamedStringList : KeywordField",
	"KeywordField : Identifier COLON ConstantField",
	"Identifier : IDENTIFIER",
	"Comment : COMMENT",
	"ConstantField : StringLiteral",
	"ConstantField : Constant",
	"ConstantField : ABSOLUTEDATECONSTANT",
	"ConstantField : DATEOFFSETCONSTANT",
	"StringLiteral : STRINGLITERAL",
	"NamedExpressionList : Keywor    ression",
	"NamedExpressionList : KeywordExpression COMMA NamedExpressionList",
	"NamedExpressionList : ArithmeticExpressionList",
	"ArithmeticExpressionList : ArithmeticExpression",
	"ArithmeticExpressionList : ArithmeticExpressionList COMMA ArithmeticExpression",
	"KeywordExpression : Identifier COLON ArithmeticExpression",
	"ArithmeticExpression : ArithmeticExpression TMS ArithmeticExpression",
	"ArithmeticExpression : ArithmeticExpression PLS ArithmeticExpression",
```

```
        "ArithmeticExpression : ArithmeticExpression MIN ArithmeticExpression",
        "ArithmeticExpression : ArithmeticExpression DIV ArithmeticExpression",
        "ArithmeticExpression : ArithmeticExpression POW ArithmeticExpression",
        "ArithmeticExpression : LEFTPAREN ArithmeticExpression RIGHTPAREN",
        "ArithmeticExpression : MIN ArithmeticExpression",
        "ArithmeticExpression : Primary",
        "LogicalExpression : ArithmeticExpression LT ArithmeticExpression",
        "LogicalExpression : ArithmeticExpression GT ArithmeticExpression",
        "LogicalExpression : ArithmeticExpression EQ ArithmeticExpression",
        "LogicalExpression : ArithmeticExpression LE ArithmeticExpression",
        "LogicalExpression : ArithmeticExpression GE ArithmeticExpression",
        "LogicalExpression : ArithmeticExpression NE ArithmeticExpression",
        "LogicalExpression : LogicalExpression AND LogicalExpression",
        "LogicalExpression : LogicalExpression OR LogicalExpression",
        "LogicalExpression : LEFTPAREN LogicalExpression RIGHTPAREN",
        "LogicalExpression : NOT LogicalExpression",
        "LogicalExpression : ArithmeticExpression",
        "LeftHandSide : Identifier",
        "LeftHandSide : Identifier ModifierList",
        "Primary : Identifier",
        "Primary : Identifier ModifierList",
        "Primary : Identifier LEFTSQUARE NamedExpressionList RIGHTSQUARE",
        "Primary : CurrencyConstant",
        "Primary : StringLiteral",
        "CurrencyConstant : Constant",
        "CurrencyConstant : Constant DOLLAR",
        "CurrencyConstant : Constant COLON Identifier",
        "Constant : CONSTANT",
        "ModifierList : LEFTBRACKETS NamedStringList RIGHTBRACKETS",
};
#endif /* YYDEBUG */
#define YYFLAG  (-3000)
/* @(#) $Revision: 63.1 $ */

/*
** Skeleton parser driver for yacc output
*/

#if defined(NLS) && !defined(NL_SETN)
#include <msgbuf.h>
#endif

#ifndef nl_msg
#define nl_msg(i,s) (s)
#endif

/*
** yacc user known macros and defines
*/
#define YYERROR         goto yyerrlab

#ifndef __RUNTIME_YYMAXDEPTH
#define YYACCEPT        return(0)
#define YYABORT         return(1)
#else
#define YYACCEPT        {free_stacks(); return(0);}
#define YYABORT         {free_stacks(); return(1);}
#endif
#define YYBACKUP( newtoken, newvalue )\
{\
        if ( yychar >= 0 || ( yyr2[ yytmp ] >> 1 ) != 1 )\
```

```
	{\
		yyerror( (nl_msg(30001,"syntax error - cannot backup")) );\
		goto yyerrlab;\
	}\
	yychar = newtoken;\
	yystate = *yyps;\
	yylval = newvalue;\
	goto yynewstate;\
}
#define YYRECOVERING()  (!!yyerrflag)
#ifndef YYDEBUG
#	define YYDEBUG	1	/* make debugging available */
#endif

/*
** user known globals
*/
int yydebug;			/* set to 1 to get debugging */

/*
** driver internal defines
*/
/* define for YYFLAG now generated by yacc program. */
/*#define YYFLAG			(FLAGVAL)*/

/*
** global variables used by the parser
*/
# ifndef __RUNTIME_YYMAXDEPTH
YYSTYPE yyv[ YYMAXDEPTH ];	/* value stack */
int yys[ YYMAXDEPTH ];		/* state stack */
# else
YYSTYPE *yyv;			/* pointer to malloc'ed value stack */
int *yys;			/* pointer to malloc'ed stack stack */
extern char *malloc(), *realloc();
extern void free();
int allocate_stacks();
void free_stacks();
# ifndef YYINCREMENT
# define YYINCREMENT (YYMAXDEPTH/2) + 10
# endif
# endif
long  yymaxdepth = YYMAXDEPTH;

YYSTYPE *yypv;			/* top of value stack */
int *yyps;			/* top of state stack */

int yystate;			/* current state */
int yytmp;			/* extra var (lasts between blocks) */

int yynerrs;			/* number of errors */
int yyerrflag;			/* error recovery flag */
int yychar;			/* current input token number */



/*
** yyparse - return 0 if worked, 1 if syntax error not recovered from
*/
int
yyparse()
{
```

```
	register YYSTYPE *yypvt;		/* top of value stack for $vars */

	/*
	** Initialize externals - yyparse may be called more than once
	*/
# ifdef __RUNTIME_YYMAXDEPTH
	if (allocate_stacks()) YYABORT;
# endif
	yypv = &yyv[-1];
	yyps = &yys[-1];
	yystate = 0;
	yytmp = 0;
	yynerrs = 0;
	yyerrflag = 0;
	yychar = -1;

	goto yystack;
	{
		register YYSTYPE *yy_pv;	/* top of value stack */
		register int *yy_ps;		/* top of state stack */
		register int yy_state;		/* current state */
		register int  yy_n;		/* internal state number info */

		/*
		** get globals into registers.
		** branch to here only if YYBACKUP was called.
		*/
	yynewstate:
		yy_pv = yypv;
		yy_ps = yyps;
		yy_state = yystate;
		goto yy_newstate;

		/*
		** get globals into registers.
		** either we just started, or we just finished a reduction
		*/
	yystack:
		yy_pv = yypv;
		yy_ps = yyps;
		yy_state = yystate;

		/*
		** top of for (;;) loop while no reductions done
		*/
	yy_stack:
		/*
		** put a state and value onto the stacks
		*/
#if YYDEBUG
		/*
		** if debugging, look up token value in list of value vs.
		** name pairs.  0 and negative (-1) are special values.
		** Note: linear search is used since time is not a real
		** consideration while debugging.
		*/
		if ( yydebug )
		{
			register int yy_i;
```

```
			printf( "State %d, token ", yy_state );
			if ( yychar == 0 )
				printf( "end-of-file\n" );
			else if ( yychar < 0 )
				printf( "-none-\n" );
			else

			{
				for ( yy_i = 0; yytoks[yy_i].t_val >= 0;
					yy_i++ )
				{
					if ( yytoks[yy_i].t_val == yychar )
						break;
				}
				printf( "%s\n", yytoks[yy_i].t_name );
			}
		}
#endif /* YYDEBUG */
		if ( ++yy_ps >= &yys[ yymaxdepth ] )	/* room on stack? */
		{
# ifndef __RUNTIME_YYMAXDEPTH
			yyerror( (nl_msg(30002,"yacc stack overflow")) );
			YYABORT;
# else
			/* save old stack bases to recalculate pointers */
			YYSTYPE * yyv_old = yyv;
			int * yys_old = yys;
			yymaxdepth += YYINCREMENT;
			yys = (int *) realloc(yys, yymaxdepth * sizeof(int));
			yyv = (YYSTYPE *) realloc(yyv, yymaxdepth * sizeof(YYSTYPE));
			if (yys==0 || yyv==0) {
			    yyerror( (nl_msg(30002,"yacc stack overflow")) );
			    YYABORT;
			    }
			/* Reset pointers into stack */
			yy_ps = (yy_ps - yys_old) + yys;
			yyps = (yyps - yys_old) + yys;
			yy_pv = (yy_pv - yyv_old) + yyv;
			yypv = (yypv - yyv_old) + yyv;
# endif

		}
		*yy_ps = yy_state;
		*++yy_pv = yyval;

		/*
		** we have a new state - find out what to do
		*/
	yy_newstate:
		if ( ( yy_n = yypact[ yy_state ] ) <= YYFLAG )
			goto yydefault;		/* simple state */
#if YYDEBUG
		/*
		** if debugging, need to mark whether new token grabbed
		*/
		yytmp = yychar < 0;
#endif
		if ( ( yychar < 0 ) && ( ( yychar = yylex() ) < 0 ) )
			yychar = 0;		/* reached EOF */
#if YYDEBUG
		if ( yydebug && yytmp )
		{
			register int yy_i;
```

```
                printf( "Received token " );
                if ( yychar == 0 )
                        printf( "end-of-file\n" );
                else if ( yychar < 0 )
                        printf( "-none-\n" );
                else
                {
                        for ( yy_i = 0; yytoks[yy_i].t_val >= 0;
                                yy_i++ )
                        {
                                if ( yytoks[yy_i].t_val == yychar )
                                        break;
                        }
                        printf( "%s\n", yytoks[yy_i].t_name );
                }
        }
#endif /* YYDEBUG */
        if ( ( ( yy_n += yychar ) < 0 ) || ( yy_n >= YYLAST ) )
                goto yydefault;
        if ( yychk[ yy_n = yyact[ yy_n ] ] == yychar )  /*valid shift*/
        {
                yychar = -1;
                yyval = yylval;
                yy_state = yy_n;
                if ( yyerrflag > 0 )
                        yyerrflag--;
                goto yy_stack;
        }

    yydefault:
        if ( ( yy_n = yydef[ yy_state ] ) == -2 )
        {
#if YYDEBUG
                yytmp = yychar < 0;
#endif
                if ( ( yychar < 0 ) && ( ( yychar = yylex() ) < 0 ) )
                        yychar = 0;             /* reached EOF */
#if YYDEBUG
                if ( yydebug && yytmp )
                {
                        register int yy_i;

                        printf( "Received token " );
                        if ( yychar == 0 )
                                printf( "end-of-file\n" );
                        else if ( yychar < 0 )
                                printf( "-none-\n" );
                        else
                        {
                                for ( yy_i = 0;
                                        yytoks[yy_i].t_val >= 0;
                                        yy_i++ )
                                {
                                        if ( yytoks[yy_i].t_val
                                                == yychar )
                                        {
                                                break;
                                        }
                                }
                                printf( "%s\n", yytoks[yy_i].t_name );
                        }
                }
#endif /* YYDEBUG */
```

```
                        /*
                        ** look through exception table
                        */
                        {
                                register int *yyxi = yyexca;

                                while ( ( *yyxi != -1 ) ||
                                        ( yyxi[1] != yy_state ) )
                                {
                                        yyxi += 2;
                                }
                                while ( ( *(yyxi += 2) >= 0 ) &&
                                 YYABORT
                         case 3:        /* no shift yet; eat a token */
#if YYDEBUG
                                 /*
                                 ** if debugging, look up token in list of
                                 ** pairs.  0 and negative shouldn't occur,
                                 ** but since timing doesn't matter when
                                 ** debugging, it doesn't hurt to leave the
                                 ** tests here.
                                 */
                                 if ( yydebug )
                                 {
                                         register int yy_i;

                                         printf( "Error recovery discards " );
                                         if ( yychar == 0 )
                                                 printf( "token end-of-file\n" );
                                         else if ( yychar < 0 )
                                                 printf( "token -none-\n" );
                                         else
                                         {
                                                 for ( yy_i = 0;
                                                         yytoks[yy_i].t_val >= 0;
                                                         yy_i++ )
                                                 {
                                                         if ( yytoks[yy_i].t_val
                                                                 == yychar )
                                                         {
                                                                 break;
                                                         }
                                                 }
                                                 printf( "token %s\n",
                                                         yytoks[yy_i].t_name );
                                         }
                                 }
#endif /* YYDEBUG */
                                 if ( yychar == 0 )      /* reached EOF. quit */
                                         YYABORT;
                                 yychar = -1;
                                 goto yy_newstate;
                         }
                 }/* end if ( yy_n == 0 ) */
                 /*
                 ** reduction by production yy_n
                 ** put stack tops, etc. so things right after switch
                 */
#if YYDEBUG
                 /*
                 ** if debugging, print the string that is the user's
```

```
		** specification of the reduction which is just about
		** to be done.
		*/
		if ( yydebug )
			printf( "Reduce by (%d) \"%s\"\n",
				yy_n, yyreds[ yy_n ] );
#endif
		yytmp = yy_n;			/* value to switch over */
		yypvt = yy_pv;			/* $vars top of value stack */
		/*
		** Look in goto table for next state
		** Sorry about using yy_state here as temporary
		** register variable, but why not, if it works...
		** If yyr2[ yy_n ] doesn't have the low order bit
		** set, then there is no action to be done for
		** this reduction.  So, no saving & unsaving of
		** registers done.  The only difference between the
		** code just after the if and the body of the if is
		** the goto yy_stack in the body.  This way the test
		** can be made before the choice of what to do is needed.
		*/
		{
			/* length of production doubled with extra bit */
			register int yy_len = yyr2[ yy_n ];

			if ( !( yy_len & 01 ) )
			{
				yy_len >>= 1;
				yyval = ( yy_pv -= yy_len )[1]; /* $$ = $1 */
				yy_state = yypgo[ yy_n = yyr1[ yy_n ] ] +
					*( yy_ps -= yy_len ) + 1;
				if ( yy_state >= YYLAST ||
					yychk[ yy_state =
					yyact[ yy_state ] ] != -yy_n )
				{
					yy_state = yyact[ yypgo[ yy_n ] ];
				}
				goto yy_stack;
			}
			yy_len >>= 1;
			yyval = ( yy_pv -= yy_len )[1]; /* $$ = $1 */
			yy_state = yypgo[ yy_n = yyr1[ yy_n ] ] +
				*( yy_ps -= yy_len ) + 1;
			if ( yy_state >= YYLAST ||
				yychk[ yy_state = yyact[ yy_state ] ] != -yy_n )
			{
				yy_state = yyact[ yypgo[ yy_n ] ];
			}
		}
					/* save until reenter driver code */
		yystate = yy_state;
		yyps = yy_ps;
		yypv = yy_pv;
	}
	/*
	** code supplied by user is placed in this switch
	*/
	switch( yytmp )
	{
```

```
case 1:
# line 107 "grammar.y"
{ parseTree = yyval = yypvt[-0];
                                    if(parseDebug)
                                         [yypvt[-0] printTreeOn:stdout indenting:0];} break;

case 2:
# line 111 "grammar.y"
{ parseTree = yyval = yypvt[-0];
                                    if(parseDebug)
                                         [yypvt[-0] printTreeOn:stdout indenting:0];} break;

case 3:
# line 115 "grammar.y"
{ parseTree = yyval = yypvt[-0];
                                    if(parseDebug)
                                         [yypvt[-0] printTreeOn:stdout indenting:0];} break;

case 4:
# line 121 "grammar.y"
{ yyval = [BM_Program
                                              begin:yypvt[-2]
                                              plates:yypvt[-1]
                                              end:yypvt[-0]];
                                              [yypvt[-2] parent:yyval];
                                              [yypvt[-1] parent:yyval];
                                            [yypvt[-0] parent:yyval];
                                       } break;

case 5:
# line 132 "grammar.y"
{ yyval = [BM_Plate for:yypvt[-2]
                                       statements:yypvt[-1]
                                       next:yypvt[-0]];
                                       [yypvt[-2] parent:yyval];
                                       [yypvt[-1] parent:yyval];
                                       [yypvt[-0] parent:yyval];
                                  } break;

case 6:
# line 140 "grammar.y"
{ yyval = [BM_Plate for:yypvt[-3]
                                       statements:yypvt[-2]
                                       next:yypvt[-1]];
                                       [yypvt[-3] parent:yyval];
                                       [yypvt[-2] parent:yyval];
                                       [yypvt[-1] parent:yyval];
                                       [yyval description:yypvt[-0]];
                                  } break;

case 7:
# line 149 "grammar.y"
{
                                   id null;
                                   yyval = [BM_Plate for:yypvt[-1]
                                          statements:null=[BM_NullStatement new]
                                          next:yypvt[-0]];
                                          [null parent:yyval];
                                          [yypvt[-1]   parent:yyval];
                                          [yypvt[-0]   parent:yyval];
                                  } break;

case 8:
# line 159 "grammar.y"
{
                                   id null;
                                   yyval = [BM_Plate for:yypvt[-2]
                                          statements:null=[BM_NullStatement new]
                                          next:yypvt[-1]];
                                          [null parent:yyval];
```

```
                                    [yypvt[-2]    parent:yyval];
                                    [yypvt[-1]    parent:yyval];
                                    [yyval   description:yypvt[-0]];
                                } break;
case 10:
# line 172 "grammar.y"
{ yyval = yypvt[-0];} break;
case 11:
# line 174 "grammar.y"
{ yyval = [BM_PlateList
                                        leftNode:yypvt[-1] rightNode:yypvt[-0]];
                                  [yypvt[-1] parent:yyval];
                                  [yypvt[-0] parent:yyval];
                                } break;
case 12:
# line 181 "grammar.y"
{ yyval = yypvt[-0]; } break;
case 13:
# line 182 "grammar.y"
{ yyval = yypvt[-0]; } break;
case 14:
# line 183 "grammar.y"
{ yyval = yypvt[-0]; } break;
case 15:
# line 184 "grammar.y"
{ yyval = yypvt[-0]; } break;
case 16:
# line 185 "grammar.y"
{ yyval = yypvt[-0]; } break;
case 17:
# line 188 "grammar.y"
{ yyval = yypvt[-0]; } break;
case 18:
# line 190 "grammar.y"
{ yyval = [BM_StatementList
                                        leftNode:yypvt[-1] rightNode:yypvt[-0]];
                                  [yypvt[-1] parent:yyval];
                                  [yypvt[-0] parent:yyval];
                                } break;
case 19:
# line 197 "grammar.y"
{printf("Skipping statement\n");
                                    parserErrorFlag = YES;
                                    yyval = [BM_Error new];} break;
case 20:
# line 201 "grammar.y"
{ yyval = [BM_Where node:yypvt[-0]];
                                            [yypvt[-0] parent:yyval];
                                    } break;
case 21:
# line 205 "grammar.y"
{ yyval = [BM_Set leftNode:yypvt[-2] rightNode:yypvt[-0]];
                                    [yypvt[-2] parent:yyval];
                                    [yypvt[-0] parent:yyval];
                                } break;
case 22:
# line 210 "grammar.y"
{ yyval = [BM_Set leftNode:yypvt[-5] rightNode:yypvt[-3]];
                                    [yyval whereNode:[BM_Where node:yypvt[-0]]];
                                    [yypvt[-5] parent:yyval];
                                    [yypvt[-3] parent:yyval];
                                    [yypvt[-0] parent:[yyval whereNode]];
                                    [[yyval whereNode] parent:yyval];
                                } break;
```

```
case 23:
# line 218 "grammar.y"
{ yyval = [BM_Install leftNode:yypvt[-2] rightNode:yypvt[-0]];
                                        [yypvt[-2] parent:yyval];
                                        [yypvt[-0] parent:yyval];
                                      } break;
case 24:
# line 223 "grammar.y"
{ yyval = [BM_Install leftNode:yypvt[-5] rightNode:yypvt[-3]];
                                        [yyval whereNode:[BM_Where node:yypvt[-0]]];
                                        [yypvt[-5] parent:yyval];
                                        [yypvt[-3] parent:yyval];
                                        [yypvt[-0] parent:[yyval whereNode]];
                                        [[yyval whereNode] parent:yyval];
                                   } break;
case 25:
# line 231 "grammar.y"
{ yyval = [BM_Delete node:yypvt[-0]];
                                        [yypvt[-0] parent:yyval];
                                      } break;
case 26:
# line 235 "grammar.y"
{ yyval = [BM_SaveList node:yypvt[-0]];
                                        [yypvt[-0] parent:yyval];
                                      } break;
case 27:
# line 239 "grammar.y"
{ yyval = [BM_Temp leftNode:yypvt[-2] rightNode:yypvt[-0]];
                                         yypvt[-2] parent:yyval];
                                        [yypvt[-0] parent:yyval];
                                      } break;
case 28:
# line 244 "grammar.y"
{ yyval = [BM_Temp leftNode:yypvt[-5] rightNode:yypvt[-3]];
                                        [yyval whereNode:[BM_Where node:yypvt[-0]]];
                                        [yypvt[-5] parent:yyval];
                                        [yypvt[-3] parent:yyval];
                                        [yypvt[-0] parent:[yyval whereNode]];
                                        [[yyval whereNode] parent:yyval];
                                   } break;
case 29:
# line 254 "grammar.y"
{ yyval = [BM_Memo string:yypvt[-8] enclose:yypvt[-5]
                                                message:yypvt[-1]];
                                        [yypvt[-5] displayedHorizontally:NO];
                                        [yypvt[-1] displayedHorizontally:NO];
                                        [yypvt[-8] parent:yyval];
                                        [yypvt[-5] parent:yyval];
                                        [yypvt[-1] parent:yyval];
                               } break;
case 30:
# line 265 "grammar.y"
{ yyval = [BM_Memo string:yypvt[-8] enclose:yypvt[-1]
                                                message:yypvt[-5]];
                                        [yypvt[-1] displayedHorizontally:NO];
                                        [yypvt[-5] displayedHorizontally:NO];
                                        [yypvt[-8] parent:yyval];
                                        [yypvt[-5] parent:yyval];
                                        [yypvt[-1] parent:yyval];
                               } break;
case 31:
# line 274 "grammar.y"
{ yyval = [BM_Pause node:yypvt[-0]];
                                                [yypvt[-0] parent:yyval];
                                        } break;
```

```
case 32:
# line 278 "grammar.y"
{ yyval = [BM_Continue node:yypvt[-0]];
                                        [yypvt[-0] parent:yyval];
                                   } break;
case 33:
# line 282 "grammar.y"
{ yyval = [BM_Pause node:nil]; } break;
case 34:
# line 284 "grammar.y"
{ yyval = [BM_Continue node:nil]; } break;
case 35:
# line 286 "grammar.y"
{ yyval = [BM_NullStatement new]; } break;
case 36:
# line 290 "grammar.y"
{ yyval = [BM_Next new]; } break;
case 37:
# line 294 "grammar.y"
{ yyval = [BM_For leftNode:yypvt[-1] rightNode:yypvt[-0]];
                                   [yypvt[-1] parent:yyval];
                                   [yypvt[-0] parent:yyval];
                              } break;
case 38:
# line 299 "grammar.y"
{ yyval = [BM_For leftNode:yypvt[-0] rightNode:nil];
                                   [yypvt[-0] parent:yyval];
                              } break;
case 39:
# line 305 "grammar.y"
{ yyval = [BM_Begin new]; } break;
case 40:
# line 309 "grammar.y"
{ yyval = [BM_End new]; } break;
case 41:
# line 313 "grammar.y"
{ yyval = [BM_NamedStringList
                                   leftNode:yypvt[-2] rightNode:yypvt[-0]];
                                   [yypvt[-2] parent:yyval];
                                   [yypvt[-0] parent:yyval];
                              } break;
case 42:
# line 319 "grammar.y"
{ yyval = [BM_NamedStringList
                                   leftNode:yypvt[-0] rightNode:nil];
                                   [yypvt[-0] parent:yyval];
                              } break;
case 43:
# line 326 "grammar.y"
{ yyval = [BM_KeywordField
                                   leftNode:yypvt[-2] rightNode:yypvt[-0]];
                                   [yypvt[-2] parent:yyval];
                                   [yypvt[-0] parent:yyval];
                              } break;
case 44:
# line 333 "grammar.y"
{yyval = [BM_Qidentifier str:rawtoken];} break;
case 45:
# line 336 "grammar.y"
{yyval = [CharString str:rawtoken];} break;
case 46:
# line 339 "grammar.y"
{ yyval = yypvt[-0]; } break;
```

```
case 47:
# line 340 "grammar.y"
{ yyval = yypvt[-0]; } break;
case 48:
# line 341 "grammar.y"
{ yyval = [BM_AbsDateConst
                                        str:rawtoken]; } break;

case 49:
# line 343 "grammar.y"
{ yyval = [BM_DateOffsetConst
                                        str:rawtoken]; } break;

case 50:
# line 347 "grammar.y"
{yyval = [BM_StringLiteral str:rawtoken];} break;
case 51:
# line 349 "grammar.y"
{ yyval = yypvt[-0]; } break;
case 52:
# line 351 "grammar.y"
{ yyval = [BM_NamedExprList
                        leftNode:yypvt[-2] rightNode:yypvt[-0]];
                          [yypvt[-2] parent:yyval];
                          [yypvt[-0] parent:yyval];
                  } break;

case 53:
# line 356 "grammar.y"
{ yyval = yypvt[-0]; } break;
case 54:
# line 359 "grammar.y"
{ yyval = yypvt[-0]; } break;
case 55:
# line 361 "grammar.y"
{ yyval = [BM_ArithExprList
                        leftNode:yypvt[-2] rightNode:yypvt[-0]];
                          [yypvt[-2] parent:yyval];
                          [yypvt[-0] parent:yyval];
                  } break;

case 56:
# line 369 "grammar.y"
{ yyval = [BM_KeywordExpr
                        leftNode:yypvt[-2] rightNode:yypvt[-0]];
                          [yypvt[-2] parent:yyval];
                          [yypvt[-0] parent:yyval];
                  } break;

case 57:
# line 378 "grammar.y"
{  yyval = [BM_ArithTMS
                        leftNode:yypvt[-2] rightNode:yypvt[-0]];
                          [yypvt[-2] parent:yyval];
                          [yypvt[-0] parent:yyval];
                  } break;

case 58:
# line 384 "grammar.y"
{  yyval = [BM_ArithPLS
                        leftNode:yypvt[-2] rightNode:yypvt[-0]];
                          [yypvt[-2] parent:yyval];
                          [yypvt[-0] parent:yyval];
                  } break;

case 59:
# line 390 "grammar.y"
{  yyval = [BM_ArithMIN
                        leftNode:yypvt[-2] rightNode:yypvt[-0]];
                          [yypvt[-2] parent:yyval];
                          [yypvt[-0] parent:yyval];
                  } break;
```

```
case 60:
# line 396 "grammar.y"
{  yyval = [BM_ArithDIV
                                leftNode:yypvt[-2] rightNode:yypvt[-0]];
                                 [yypvt[-2] parent:yyval];
                                 [yypvt[-0] parent:yyval];
                        } break;
case 61:
# line 402 "grammar.y"
{  yyval = [BM_ArithPOW
                                leftNode:yypvt[-2] rightNode:yypvt[-0]];
                                 [yypvt[-2] parent:yyval];
                                 [yypvt[-0] parent:yyval];
                        } break;
case 62:
# line 408 "grammar.y"
{  yyval = yypvt[-1]; [yyval hasParentheses:YES]; } break;
case 63:
# line 410 "grammar.y"
{  yyval = [BM_ArithUnaryMIN
                                node:yypvt[-0]];
                                [yypvt[-0] parent:yyval];
                        } break;
case 64:
# line 414 "grammar.y"
{ yyval = yypvt[-0]; } break;
case 65:
# line 418 "grammar.y"
{ yyval = [BM_LogicLT leftNode:yypvt[-2] rightNode:yypvt[-0]];
                                 [yypvt[-2] parent:yyval];
                                 [yypvt[-0] parent:yyval];
                        } break;
case 66:
# line 423 "grammar.y"
{ yyval = [BM_LogicGT leftNode:yypvt[-2] rightNode:yypvt[-0]];
                                 [yypvt[-2] parent:yyval];
                                 [yypvt[-0] parent:yyval];
                        } break;
case 67:
# line 428 "grammar.y"
{ yyval = [BM_LogicEQ leftNode:yypvt[-2] rightNode:yypvt[-0]];
                                 [yypvt[-2] parent:yyval];
                                 [yypvt[-0] parent:yyval];
                        } break;
case 68:
# line 433 "grammar.y"
{ yyval = [BM_LogicLE leftNode:yypvt[-2] rightNode:yypvt[-0]];
                                 [yypvt[-2] parent:yyval];
                                 [yypvt[-0] parent:yyval];
                        } break;
case 69:
# line 438 "grammar.y"
{ yyval = [BM_LogicGE leftNode:yypvt[-2] rightNode:yypvt[-0]];
                                 [yypvt[-2] parent:yyval];
                                 [yypvt[-0] parent:yyval];
                        } break;
case 70:
# line 443 "grammar.y"
{ yyval = [BM_LogicNE leftNode:yypvt[-2] rightNode:yypvt[-0]];
                                 [yypvt[-2] parent:yyval];
                                 [yypvt[-0] parent:yyval];
                        } break;
case 71:
# line 448 "grammar.y"
```

```
{ yyval = [BM_LogicAND leftNode:yypvt[-2] rightNode:yypvt[-0]];
                                        [yypvt[-2] parent:yyval];
                                        [yypvt[-0] parent:yyval];
                                   } break;

case 72:
# line 453 "grammar.y"
{ yyval = [BM_LogicOR leftNode:yypvt[-2] rightNode:yypvt[-0]];
                                        [yypvt[-2] parent:yyval];
                                        [yypvt[-0] parent:yyval];
                                   } break;

case 73:
# line 458 "grammar.y"
{ yyval = yypvt[-1]; [yyval hasParentheses:YES]; } break;
case 74:
# line 460 "grammar.y"
{ yyval = [BM_LogicNOT node:yypvt[-0]];
                                        [yypvt[-0] parent:yyval];
                                   } break;

case 75:
# line 464 "grammar.y"
{ yyval = yypvt[-0]; } break;
case 76:
# line 469 "grammar.y"
{ yyval = [BM_Primary leftNode:yypvt[-0] rightNode:nil];
                                        [yypvt[-0] parent:yyval];
                                   } break;

case 77:
# line 473 "grammar.y"
{ yyval = [BM_Primary leftNode:yypvt[-1] rightNode:yypvt[-0]];
                                        [yypvt[-1] parent:yyval];
                                        [yypvt[-0] parent:yyval];
                                   } break;

case 78:
# line 480 "grammar.y"
{ yyval = [BM_Primary leftNode:yypvt[-0] rightNode:nil];
                                        [yypvt[-0] parent:yyval];
                                   } break;

case 79:
# line 484 "grammar.y"
{ yyval = [BM_Primary leftNode:yypvt[-1] rightNode:yypvt[-0]];
                                        [yypvt[-1] parent:yyval];
                                        [yypvt[-0] parent:yyval];
                                   } break;

case 80:
# line 490 "grammar.y"
{ yyval = [BM_FunctionCall
                                       leftNode:yypvt[-3] rightNode:yypvt[-1]];
                                        [yypvt[-3] parent:yyval];
                                        [yypvt[-1] parent:yyval];
                                   } break;

case 81:
# line 495 "grammar.y"
{ yyval = yypvt[-0]; } break;
case 82:
# line 496 "grammar.y"
{ yyval = yypvt[-0]; } break;
case 83:
# line 499 "grammar.y"
{ yyval = yypvt[-0]; } break;
case 84:
# line 500 "grammar.y"
{yyval = [yypvt[-1] units:"$"];} break;
case 85:
# line 502 "grammar.y"
```

```
{ yyval =       [yypvt[-2] units:[yypvt[-0] str]]; [yypvt[-0] free]; } break;
case 86:
# line 505 "grammar.y"
{yyval = [[BM_CurrencyConst new]
                                                  string:rawtoken]; } break;
case 87:
# line 509 "grammar.y"
{ yyval = yypvt[-1];
                                   [yyval hasParentheses:YES];
                                 } break;
        }
        goto yystack;           /* reset registers in driver code */
}

# ifdef __RUNTIME_YYMAXDEPTH

int allocate_stacks() {
        /* allocate the yys and yyv stacks */
        yys = (int *) malloc(yymaxdepth * sizeof(int));
        yyv = (YYSTYPE *) malloc(yymaxdepth * sizeof(YYSTYPE));

        if (yys==0 || yyv==0) {
           yyerror( (nl_msg(30004,"unable to allocate space for yacc stacks")) );
           return(1);
           }
        else return(0);

}


void free_stacks() {
        if (yys!=0) free(yys);
        if (yyv!=0) free(yyv);
}

# endif  /* defined(__RUNTIME_YYMAXDEPTH) */
# include "stdio.h"
# define U(x) x
# define NLSTATE yyprevious=YYNEWLINE
# define BEGIN yybgin = yysvec + 1 +
# define INITIAL 0
# define YYLERR yysvec
# define YYSTATE (yyestate-yysvec-1)
# define YYOPTIM 1
# define YYLMAX 200
# define output(c) putc(c,yyout)
# define input() (((yytchar=yysptr>yysbuf?U(*--yysptr):getc(yyin))==10?(yylineno++,yytchar):
   yytchar)==EOF?0:yytchar)
# define unput(c) {yytchar= (c);if(yytchar=='\n')yylineno--;*yysptr++=yytchar;}
# define yymore() (yymorfg=1)
# define ECHO fprintf(yyout, "%s",yytext)
# define REJECT { nstr = yyreject(); goto yyfussy;}
int yyleng; extern unsigned char yytext[];
int yymorfg;
extern unsigned char *yysptr, yysbuf[];
int yytchar;
FILE *yyin = {stdin}, *yyout = {stdout};
extern int yylineno;
struct yysvf {
        int yystoff;
        struct yysvf *yyother;
        int *yystops;};
struct yysvf *yyestate;
extern struct yysvf yysvec[], *yybgin;
/*==================== DO NOT REMOVE OR EDIT ============================
```

```
This comment and the following sccsId declaration are managed
by SCCS for you. Do not edit or remove either.

Source file:     /users/bmw/Alpha/VRL/SCCS/s.lexer.l
Latest version:  1.8
Last mod time:   09/08/89 at 15:00:42

=====================================================================*/

static char *sccsId = "@(#)lexer.l rev 1.8 created on 09/08/89 at 15:00:42";

/*==================== DO NOT REMOVE OR EDIT ==========================*/


#include <ctype.h>
#include "batterymarch.h"
#include "objc.h"
#include "uil.h"

#include "tokens.h"

int _VRLLineNumber;

#define MAXNAM 80
#define ret(arg1, arg2) lexVal = arg1; lexRet = arg2; goto doit

static BOOL
        PassFlag = NO,
        LexDbgFlag = NO;
= BM_Lexer : Object (BMPARSE)
{
    id inputStream;
}
+ (BOOL)setDebug:(BOOL)value { BOOL tmp = LexDbgFlag;
        LexDbgFlag = value; return tmp; }

-stream:aStrm
{
    if(inputStream)inputStream = [inputStream free];
    inputStream = aStrm;
    _VRLLineNumber = 1;
}

-stream { return inputStream; }

-(char)inputChar { return [inputStream inputChar]; }
-(char)unputChar:(char)c { return [inputStream unputChar:c]; }
=:

#undef input
#undef unput
#define input()     [theLexer inputChar]
#define unput(c)    [theLexer unputChar:(c)]

        static short lexVal, lexRet;
STR rawtoken = (STR)yytext;

/* Intrudes between lexer and parser for token-level debugging */
static id theLexer;
yynewlex(myLexer) id myLexer; {
    id oldToken; short retval;
    theLexer = myLexer;
    retval = rawlexer(myLexer);
    if (LexDbgFlag) printf("TOK=0x%3x(%3d) %s\n", retval, retval, rawtoken);
    return retval;
```

```
}
#define yylex() rawlexer()
# define YYNEWLINE 10
yylex(){
int nstr; extern int yyprevious;
rawtoken = (STR)yytext;
while((nstr = yylook()) >= 0)
yyfussy: switch(nstr){
case 0:
if(yywrap()) return(0); break;
case 1:
{ ret(ABSOLUTEDATECONSTANT,ABSOLUTEDATECONSTANT); }
break;
case 2:
                    { ret(CONSTANT,CONSTANT); }
break;
case 3:
                           { ret(CONSTANT,CONSTANT); }
break;
case 4:
        { ret(DATEOFFSETCONSTANT,DATEOFFSETCONSTANT); }
break;
case 5:
                       { ret(STRINGLITERAL,STRINGLITERAL); }
break;
case 6:
                       { ret(WHERE,WHERE); }
break;
case 7:
                       { ret(SET,SET); }
break;
case 8:
        { ret(INSTALL,INSTALL); }
break;
case 9:
                { ret(TEMP,TEMP); }
break;
case 10:
        { ret(DELETE,DELETE); }
break;
case 11:
       { ret(SAVELIST,SAVELIST); }
break;
case 12:
                { ret(MEMO,MEMO); }
break;
case 13:
        { ret(ENCLOSE,ENCLOSE); }
break;
case 14:
        { ret(MESSAGE,MESSAGE); }
break;
case 15:
                  { ret(PAUSE,PAUSE); }
break;
case 16:
    { ret(CONTINUE,CONTINUE); }
break;
case 17:
     { ret(NULLSTATEMENT,NULLSTATEMENT); }
break;
case 18:
                       { ret(FOR,FOR); }
```

```
break;
case 19:
        { ret(NEXT,NEXT); }
break;
case 20:
            { ret(END,END); }
break;
case 21:
          { ret(BEGIN,BEGIN); }
break;
case 22:
{ ret(TMS,TMS); }
break;
case 23:
{ ret(PLS,PLS); }
break;
case 24:
{ ret(MIN,MIN); }
break;
case 25:
{ ret(DIV,DIV); }
break;
case 26:
{ ret(POW,POW); }
break;
case 27:
{ ret(LEFTPAREN,LEFTPAREN); }
break;
case 28:
{ ret(RIGHTPAREN,RIGHTPAREN); }
break;
case 29:
{ ret(LEFTSQUARE,LEFTSQUARE); }
break;
case 30:
{ ret(RIGHTSQUARE,RIGHTSQUARE); }
break;
case 31:
{ ret(LEFTBRACKETS,LEFTBRACKETS); }
break;
case 32:
{ ret(RIGHTBRACKETS,RIGHTBRACKETS);
break;
case 33:
{ ret(NE,NE); }
break;
case 34:
{ ret(LE,LE); }
break;
case 35:
{ ret(GE,GE); }
break;
case 36:
{ ret(LT,LT); }
break;
case 37:
{ ret(GT,GT); }
break;
case 38:
{ ret(EQ,EQ); }
break;
case 39:
             { ret(AND,AND); }
```

```
break;
case 40:
                    { ret(OR,OR); }
break;
case 41:
                    { ret(NOT,NOT); }
break;
case 42:
{ ret(COLON,COLON); }
break;
case 43:
{ ret(COMMA,COMMA); }
break;
case 44:
{ ret(DOLLAR,DOLLAR);}
break;
case 45:
{ret(COMMENT,COMMENT);}
break;
case 46:
  { ret(IDENTIFIER,IDENTIFIER);


               /* A space optimization. See the ret macro. */
               doit: return lexRet;
}
break;
case 47:
{ /*discard*/; }
break;
case 48:
 { _VRLLineNumber++;}
break;
case -1:
break;
default:
fprintf(yyout,"bad switch yylook %d",nstr);
} return(0); }
/* end of yylex */
/* Wrapup after file is processed. Return 1 to signal end of input file. */
yywrap() { return 1; }


int yyvstop[] = {

0,

47,
0,

48,
0,

44,
0,

27,
0,

28,
0,

22,
0,
```

23,
0, 43,
0, 24,
0, 25,
0, 2,
0, 42,
0, 36,
0, 38,
0, 37,
0, 46,
0, 46,
0, 46,
0, 46,
0, 46,
0, 46,
0, 46,
0, 46,
0, 46,
0, 46,
0, 46,
0, 46,
0, 46,
0,
46,
0,
46,
0,
29,
0,
30,
0,
26,
0,
31,
0,
32,
0,
46,
0,
5,
0,
3,
0,
2,
0,
2,
0,
4,
0,
34,
0,
33,
0,
35,
0,
46,
0,
46,
0,
46,
0,
46,
0, 46,
0, 46,
0, 46,
0, 46,
0, 46,
0, 46,
0, 46,
0, 46,
0, 40,
46,
0, 46,
0, 46,
0, 46,
0, 46,
0, 46,
0, 2,
0, 39,
46,
0, 46,
0, 46,
0, 46,
0, 13,
46,
0,

```
20,
46,
0,

18,
46,
0,

46,
0,

46,
0,

14,
46,
0,

46,
0,

41,
46,
0,

46,
0,

46,
0,

46,
0,

7,
46,
0,

46,
0,

46,
0,

46,
0,

16,
46,
0,

46,
0,

46,
0,

46,
0,

12,
46,
0,
```

46,
0, 19,
46,
0, 46,
0, 46,
0, 46,
0, 9,
46,
0, 46,
0, 21,
46,
0, 46,
0, 46,
0, 46,
0, 46,
0, 46,
0, 46,
0, 15,
46,
0, 46,
0, 6,
46,
0, 45,
0, 46,
0,

```
10,
46,
0,

46,
0,

46,
0,

46,
0,

46,
0,

46,
0,

46,
0,

13,
46,
0,

8,
46,
0,

14,
46,
0,

17,
46,
0,

46,
0,

16,
46,
0,

17,
46,
0,

11,
46,
0,

1,
0,
0};
# define YYTYPE unsigned char
struct yywork { YYTYPE verify, advance; } yycrank[] = {
0,0,    0,0,    0,0,    0,0,
0,0,    0,0,    0,0,    0,0,
0,0,    0,0,    1,3,    1,4,
0,0,    1,3,    1,4,    0,0,
0,0,    0,0,    0,0,    0,0,
```

| | | | |
|---|---|---|---|
| 0,0, | 0,0, | 0,0, | 0,0, |
| 0,0, | 0,0, | 0,0, | 0,0, |
| 0,0, | 0,0, | 0,0, | 0,0, |
| 0,0, | 1,3, | 0,0, | 1,5, |
| 1,6, | 1,7, | 6,43, | 0,0, |
| 0,0, | 1,8, | 1,9, | 1,10, |
| 1,11, | 1,12, | 1,13, | 1,14, |
| 1,15, | 1,16, | 1,16, | 1,16, |
| 1,16, | 1,16, | 1,16, | 1,16, |
| 1,16, | 1,16, | 1,16, | 1,17, |
| 0,0, | 1,18, | 1,19, | 1,20, |
| 0,0, | 0,0, | 1,21, | 1,22, |
| 1,23, | 1,24, | 1,25, | 1,26, |
| 1,27, | 1,27, | 1,28, | 1,27, |
| 1,27, | 1,27, | 1,29, | 1,30, |
| 1,31, | 1,32, | 1,27, | 1,27, |
| 1,33, | 1,34, | 1,27, | 1,27, |
| 1,35, | 1,27, | 1,27, | 1,27, |
| 1,36, | 20,51, | 1,37, | 1,38, |
| 18,49, | 18,50, | 1,21, | 1,22, |
| 1,23, | 1,24, | 1,25, | 1,26, |
| 1,27, | 1,27, | 1,28, | 1,27, |
| 1,27, | 1,27, | 1,29, | 1,30, |
| 1,31, | 1,32, | 1,27, | 1,27, |
| 1,33, | 1,34, | 1,27, | 1,27, |
| 1,35, | 1,27, | 1,27, | 1,27, |
| 1,39, | 5,5, | 1,40, | 1,41, |
| 23,27, | 23,55, | 71,92, | 25,57, |
| 27,27, | 5,5, | 5,5, | 92,107, |
| 28,59, | 5,5, | 11,44, | 11,44, |
| 11,44, | 11,44, | 11,44, | 11,44, |
| 11,44, | 11,44, | 11,44, | 11,44, |
| 14,45, | 14,45, | 14,45, | 14,45, |
| 14,45, | 14,45, | 14,45, | 14,45, |
| 14,45, | 14,45, | 5,42, | 120,128, |
| 23,27, | 23,55, | 5,5, | 25,57, |
| 27,27, | 0,0, | 0,0, | 5,5, |
| 28,59, | 0,0, | 0,0, | 0,0, |
| 5,5, | 22,54, | 0,0, | 0,0, |
| 0,0, | 0,0, | 0,0, | 0,0, |
| 0,0, | 31,27, | 22,27, | 26,27, |
| 26,58, | 31,65, | 0,0, | 0,0, |
| 0,0, | 5,5, | 5,5, | 5,5, |
| 5,5, | 5,5, | 5,5, | 5,5, |
| 5,5, | 5,5, | 5,5, | 5,5, |
| 5,5, | 5,5, | 5,5, | 5,5, |
| 5,5, | 22,54, | 5,5, | 5,5, |
| 5,5, | 5,5, | 5,5, | 5,5, |
| 5,5, | 31,27, | 22,27, | 26,27, |
| 26,58, | 31,65, | 46,46, | 46,46, |
| 46,46, | 46,46, | 46,46, | 46,46, |
| 46,46, | 46,46, | 46,46, | 46,46, |
| 0,0, | 0,0, | 0,0, | 0,0, |
| 16,46, | 0,0, | 16,47, | 16,47, |
| 16,47, | 16,47, | 16,47, | 16,47, |
| 16,47, | 16,47, | 16,47, | 16,47, |
| 0,0, | 55,76, | 56,77, | 0,0, |
| 56,27, | 65,27, | 5,5, | 16,48, |
| 16,48, | 16,48, | 16,48, | 16,48, |
| 16,48, | 16,48, | 16,48, | 16,48, |
| 16,48, | 16,48, | 16,48, | 16,48, |
| 16,48, | 16,48, | 16,48, | 16,48, |
| 16,48, | 16,48, | 16,48, | 16,48, |
| 16,48, | 16,48, | 16,48, | 16,48, |

```
16,48,  55,76,  56,77,  60,82,
56,27,  65,27,  60,27,  16,48,
16,48,  16,48,  16,48,  16,48,
16,48,  16,48,  16,48,  16,48,
16,48,  16,48,  16,48,  16,48,
16,48,  16,48,  16,48,  16,48,
16,48,  16,48,  16,48,  16,48,
16,48,  16,48,  16,48,  16,48,
16,48,  21,41,  0,0,    60,82,
0,0,    0,0,    60,27,  0,0,
0,0,    21,41,  0,0,    21,41,
21,41,  21,41,  21,41,  21,41,
21,41,  21,41,  21,41,  21,41,
21,41,  0,0,    64,86,  58,27,
64,27,  74,27,  0,0,    58,80,
21,27,  21,27,  21,27,  21,27,
21,27,  21,27,  21,27,  21,27,
21,27,  21,27,  21,27,  21,27,
21,27,  21,52,  21,27,  21,27,
21,27,  21,27,  21,27,  21,27,
21,27,  21,27,  21,27,  21,27,
21,27,  21,27,  64,86,  58,27,
64,27,  74,27,  21,53,  58,80,
21,27,  21,27,  21,27,  21,27,
21,27,  21,27,  21,27,  21,27,
21,27,  21,27,  21,27,  21,27,
21,27,  21,52,  21,27,  21,27,
21,27,  21,27,  21,27,  21,27,
21,27,  21,27,  21,27,  21,27,
21,27,  21,27,  24,56,  29,60,
30,62,  21,41,  32,66,  29,61,
33,67,  34,69,  79,27,  24,27,
33,68,  30,27,  30,63,  52,74,
29,27,  35,70,  34,27,  32,27,
30,64,  33,27,  0,0,    35,27,
54,75,  52,27,  69,90,  69,27,
80,27,  85,27,  0,0,    54,27,
0,0,    0,0,    24,56,  29,60,
30,62,  0,0,    32,66,  29,61,
33,67,  34,69,  79,27,  24,27,
33,68,  30,27,  30,63,  52,74,
29,27,  35,70,  34,27,  32,27,
30,64,  33,27,  41,41,  35,27,
54,75,  52,27,  69,90,  69,27,
80,27,  85,27,  41,41,  54,27,
41,41,  41,41,  41,41,  41,41,
41,41,  41,41,  41,41,  41,41,
41,41,  41,41,  0,0,    59,27,
78,97,  86,102, 78,27,  86,27,
59,81,  41,41,  41,41,  41,41,
41,41,  41,41,  41,41,  41,41,
41,41,  41,41,  41,41,  41,41,
41,41,  41,41,  41,41,  41,41,
41,41,  41,41,  41,41,  41,41,
41,41,  41,41,  41,41,  41,41,
41,41,  41,41,  41,41,  59,27,
78,97,  86,102, 78,27,  86,27,
59,81,  41,41,  41,41,  41,41,
41,41,  41,41,  41,41,  41,41,
41,41,  41,41,  41,41,  41,41,
41,41,  41,41,  41,41,  41,41,
41,41,  41,41,  41,41,  41,41,
41,41,  41,41,  41,41,  41,41,
41,41,  41,41,  41,41,  43,43,
```

```
0,0,    61,27,  41,41,  66,27,
0,0,    89,27,  61,83,  43,43,
43,71,  47,72,  66,87,  43,43,
47,73,  47,73,  47,73,  47,73,
47,73,  47,73,  47,73,  47,73,
47,73,  47,73,  63,27,  68,27,
76,27,  0,0,    94,109, 99,27,
63,85,  68,89,  76,95,  0,0,
43,43,  61,27,  0,0,    66,27,
43,43,  89,27,  61,83,  0,0,
0,0,    43,43,  66,87,  0,0,
0,0,    0,0,    43,43,  62,27,
0,0,    0,0,    0,0,    0,0,
0,0,    0,0,    63,27,  68,27,
76,27,  62,84,  94,109, 99,27,
63,85,  68,89,  76,95,  43,43,
43,43,  43,43,  43,43,  43,43,
43,43,  43,43,  43,43,  43,43,
43,43,  43,43,  43,43,  43,43,
43,43,  43,43,  43,43,  62,27,
43,43,  43,43,  43,43,  43,43,
43,43,  43,43,  43,43,  0,0,
101,27, 62,84,  73,73,  73,73,
73,73,  73,73,  73,73,  73,73,
73,73,  73,73,  73,73,  73,73,
0,0,    0,0,    0,0,    0,0,
0,0,    0,0,    0,0,    0,0,
44,44,  44,44,  44,44,  44,44,
44,44,  44,44,  44,44,  44,44,
44,44,  44,44,  0,0,    90,27,
101,27, 90,105, 97,27,  97,112,
43,43,  44,48,  44,48,  44,48,
44,48,  44,48,  44,48,  44,48,
44,48,  44,48,  44,48,  44,48,
44,48,  44,48,  44,48,  44,48,
44,48,  44,48,  44,48,  44,48,
44,48,  44,48,  44,48,  44,48,
44,48,  44,48,  44,48,  90,27,
0,0,    90,105, 97,27,  97,112,
0,0,    44,48,  44,48,  44,48,
44,48,  44,48,  44,48,  44,48,
44,48,  44,48,  44,48,  44,48,
44,48,  44,48,  44,48,  44,48,
44,48,  44,48,  44,48,  44,48,
44,48,  44,48,  44,48,  44,48,
44,48,  44,48,  44,48,  48,48,
48,48,  48,48,  48,48,  48,48,
48,48,  48,48,  48,48,  48,48,
48,48,  48,48,  48,48,  48,48,
48,48,  48,48,  48,48,  48,48,
48,48,  48,48,  48,48,  48,48,
48,48,  48,48,  48,48,  48,48,
48,48,  0,0,    0,0,    0,0,
0,0,    0,0,    0,0,    48,48,
48,48,  48,48,  48,48,  48,48,
48,48,  48,48,  48,48,  48,48,
48,48,  48,48,  48,48,  48,48,
48,48,  48,48,  48,48,  48,48,
48,48,  48,48,  48,48,  48,48,
48,48,  48,48,  48,48,  48,48,
48,48,  53,41,  53,41,  53,41,
53,41,  53,41,  53,41,  53,41,
53,41,  53,41,  53,41,  53,41,
53,41,  53,41,  53,41,  53,41,
```

```
53,41, 53,41, 53,41, 53,41,
53,41, 53,41, 53,41, 53,41,
53,41, 53,41, 53,41, 0,0,
0,0,   0,0,   0,0,   0,0,
0,0,   53,41, 53,41, 53,41,
53,41, 53,41, 53,41, 53,41,
53,41, 53,41, 53,41, 53,41,
53,41, 53,41, 53,41, 53,41,
53,41, 53,41, 53,41, 53,41,
53,41, 53,41, 53,41, 53,41,
53,41, 53,41, 53,41, 57,78,
57,79, 67,27, 53,41, 70,91,
91,27, 104,117,      75,94, 104,27,
91,106, 67,88, 57,27, 75,27,
70,27, 128,135,      128,135,      128,135,
128,135,      128,135,      128,135,      128,135,
128,135,      128,135,      128,135,      0,0,
0,0,   0,0,   0,0,   0,0,
0,0,   0,0,   0,0,   57,78,
57,79, 67,27, 0,0,   70,91,
91,27, 104,117,      75,94, 104,27,
91,106, 67,88, 57,27, 75,27,
70,27, 72,93, 72,93, 72,93,
72,93, 72,93, 72,93, 72,93,
72,93, 72,93, 72,93, 72,93,
72,93, 72,93, 72,93, 72,93,
72,93, 72,93, 72,93, 72,93,
72,93, 72,93, 72,93, 72,93,
72,93, 72,93, 72,93, 0,0,
0,0,   0,0,   0,0,   0,0,
0,0,   72,93, 72,93, 72,93,
72,93, 72,93, 72,93, 72,93,
72,93, 72,93, 72,93, 72,93,
72,93, 72,93, 72,93, 72,93,
72,93, 72,93, 72,93, 72,93,
72,93, 72,93, 72,93, 72,93,
72,93, 72,93, 72,93, 77,96,
81,27, 82,99, 83,27, 84,27,
88,104, 103,116,     81,98, 83,100,
77,27, 84,101, 82,27, 87,27,
105,27, 88,27, 103,27, 109,27,
87,103, 135,139,     135,139,      135,139,
135,139,      135,139,      135,139,      135,139,
135,139,      135,139,      135,139,      0,0,
0,0,   0,0,   0,0,   77,96,
81,27, 82,99, 83,27, 84,27,
88,104, 103,116,     81,98, 83,100,
77,27, 84,101, 82,27, 87,27,
105,27, 88,27, 103,27, 109,27,
87,103, 93,108, 93,108, 93,108,
93,108, 93,108, 93,108, 93,108,
93,108, 93,108, 93,108, 93,108,
93,108, 93,108, 93,108, 93,108,
93,108, 93,108, 93,108, 93,108,
93,108, 93,108, 93,108, 93,108,
93,108, 93,108, 93,108, 95,110,
0,0,   0,0,   0,0,   0,0,
95,27, 93,108, 93,108, 93,108,
93,108, 93,108, 93,108, 93,108,
93,108, 93,108, 93,108, 93,108,
93,108, 93,108, 93,108, 93,108,
93,108, 93,108, 93,108, 93,108,
93,108, 93,108, 93,108, 93,108,
93,108, 93,108, 93,108, 95,110,
```

```
96,27,  98,113, 100,114,        102,27,
95,27,  110,121,        96,111, 106,118,
102,115,        111,122,        116,27, 118,27,
107,107,        0,0,    98,27,  100,27,
106,27, 0,0,    111,27, 114,125,
107,107,        107,119,        0,0,    112,27,
107,107,        122,27, 114,27, 0,0,
112,123,        113,124,        115,27, 113,27,
96,27,  98,113, 100,114,        102,27,
115,126,        110,121,        96,111, 106,118,
102,115,        111,122,        116,27, 118,27,
0,0,    107,107,        98,27,  100,27,
106,27, 107,107,        111,27, 114,125,
0,0,    0,0,    107,107,        112,27,
0,0,    122,27, 114,27, 107,107,
112,123,        113,124,        115,27, 113,27,
0,0,    0,0,    0,0,    0,0,
115,126,        124,131,        130,27, 124,27,
126,133,        126,27, 0,0,    0,0,
107,107,        107,107,        107,107,        107,107,
107,107,        107,107,        107,107,        107,107,
107,107,        107,107,        107,107,        107,107,
107,107,        107,107,        107,107,        107,107,
0,0,    107,107,        107,107,        107,107,
107,107,        107,107,        107,107,        107,107,
131,27, 124,131,        130,27, 124,27,
126,133,        126,27, 108,120,        108,120,
108,120,        108,120,        108,120,        108,120,
108,120,        108,120,        108,120,        108,120,
108,120,        108,120,        108,120,        108,120,
108,120,        108,120,        108,120,        108,120,
108,120,        108,120,        108,120,        108,120,
108,120,        108,120,        108,120,        108,120,
131,27, 0,0,    0,0,    0,0,
0,0,    107,107,        108,120,        108,120,
108,120,        108,120,        108,120,        108,120,
108,120,        108,120,        108,120,        108,120,
108,120,        108,120,        108,120,        108,120,
108,120,        108,120,        108,120,        108,120,
108,120,        108,120,        108,120,        108,120,
108,120,        108,120,        108,120,        108,120,
117,127,        121,27, 123,130,        125,132,
127,27, 117,27, 129,136,        132,27,
121,129,        127,134,        133,27, 123,27,
125,27, 134,27, 136,27, 129,27,
133,137,        137,27, 138,27, 134,138,
0,0,    0,0,    0,0,    0,0,
0,0,    0,0,    0,0,    0,0,
0,0,    0,0,    0,0,    0,0,
117,127,        121,27, 123,130,        125,132,
127,27, 117,27, 129,136,        132,27,
121,129,        127,134,        133,27, 123,27,
125,27, 134,27, 136,27, 129,27,
133,137,        137,27, 138,27, 134,138,
0,0};
struct yysvf yysvec[] = {
0,      0,      0,
1,      0,              0,
0,      yysvec+1,       0,
0,      0,              yyvstop+1,
0,      0,              yyvstop+3,
-124,   0,              0,
3,      0,              0,
0,      0,              yyvstop+5,
```

```
0,      0,           yyvstop+7,
0,      0,           yyvstop+9,
0,      0,           yyvstop+11,
90,     0,           yyvstop+13,
0,      0,           yyvstop+15,
0,      yysvec+11,   yyvstop+17,
100,    0,           0,
0,      0,           yyvstop+19,
186,    0,           yyvstop+21,
0,      0,           yyvstop+23,
35,     0,           yyvstop+25,
0,      0,           yyvstop+27,
32,     0,           yyvstop+29,
271,    0,           yyvstop+31,
104,    yysvec+21,   yyvstop+33,
50,     yysvec+21,   yyvstop+35,
325,    yysvec+21,   yyvstop+37,
53,     yysvec+21,   yyvstop+39,
105,    yysvec+21,   yyvstop+41,
54,     yysvec+21,   yyvstop+43,
58,     yysvec+21,   yyvstop+45,
330,    yysvec+21,   yyvstop+47,
327,    yysvec+21,   yyvstop+49,
103,    yysvec+21,   yyvstop+51,
333,    yysvec+21,   yyvstop+53,
335,    yysvec+21,   yyvstop+55,
332,    yysvec+21,   yyvstop+57,
337,    yysvec+21,   yyvstop+59,
0,      0,           yyvstop+61,
0,      0,           yyvstop+63,
0,      0,           yyvstop+65,
0,      0,           yyvstop+67,
0,      0,           yyvstop+69,
408,    0,           yyvstop+71,
0,      0,           yyvstop+73,
-530,   0,           0,
592,    0,           0,
0,      yysvec+14,   yyvstop+75,
170,    0,           yyvstop+77,
496,    yysvec+16,   yyvstop+79,
650,    0,           yyvstop+81,
0,      0,           yyvstop+83,
0,      0,           yyvstop+85,
0,      0,           yyvstop+87,
339,    yysvec+21,   yyvstop+89,
708,    0,           0,
345,    yysvec+21,   yyvstop+91,
167,    yysvec+21,   yyvstop+93,
170,    yysvec+21,   yyvstop+95,
764,    yysvec+21,   yyvstop+97,
253,    yysvec+21,   yyvstop+99,
389,    yysvec+21,   yyvstop+101,
204,    yysvec+21,   yyvstop+103,
455,    yysvec+21,   yyvstop+105,
501,    yysvec+21,   yyvstop+107,
476,    yysvec+21,   yyvstop+109,
254,    yysvec+21,   yyvstop+111,
171,    yysvec+21,   yyvstop+113,
457,    yysvec+21,   yyvstop+116,
755,    yysvec+21,   yyvstop+118,
477,    yysvec+21,   yyvstop+120,
341,    yysvec+21,   yyvstop+122,
766,    yysvec+21,   yyvstop+124,
95,     0,           0,
```

```
812,    0,            0,
574,    yysvec+16,    yyvstop+126,
255,    yysvec+21,    yyvstop+128,
765,    yysvec+21,    yyvstop+131,
478,    yysvec+21,    yyvstop+133,
866,    yysvec+21,    yyvstop+135,
392,    yysvec+21,    yyvstop+137,
324,    yysvec+21,    yyvstop+140,
342,    yysvec+21,    yyvstop+143,
858,    yysvec+21,    yyvstop+146,
868,    yysvec+21,    yyvstop+1
860,    yysvec+21,    yyvstop+15. ,
861,    yysvec+21,    yyvstop+153,
343,    yysvec+21,    yyvstop+155,
393,    yysvec+21,    yyvstop+158,
869,    yysvec+21,    yyvstop+160,
871,    yysvec+21,    yyvstop+162,
459,    yysvec+21,    yyvstop+164,
573,    yysvec+21,    yyvstop+167,
758,    yysvec+21,    yyvstop+169,
100,    0,            0,
920,    0,            0,
480,    yysvec+21,    yyvstop+171,
938,    yysvec+21,    yyvstop+173,
966,    yysvec+21,    yyvstop+176,
576,    yysvec+21,    yyvstop+178,
980,    yysvec+21,    yyvstop+180,
481,    yysvec+21,    yyvstop+182,
981,    yysvec+21,    yyvstop+185,
542,    yysvec+21,    yyvstop+187,
969,    yysvec+21,    yyvstop+190,
872,    yysvec+21,    yyvstop+192,
761,    yysvec+21,    yyvstop+194,
870,    yysvec+21,    yyvstop+196,
982,    yysvec+21,    yyvstop+199,
-1055,  0,            0,
1085,   0,            0,
873,    yysvec+21,    yyvstop+201,
971,    yysvec+21,    yyvstop+204,
984,    yysvec+21,    yyvstop+206,
989,    yysvec+21,    yyvstop+208,
997,    yysvec+21,    yyvstop+210,
992,    yysvec+21,    yyvstop+212,
996,    yysvec+21,    yyvstop+214,
976,    yysvec+21,    yyvstop+216,
1135,   yysvec+21,    yyvstop+219,
977,    yysvec+21,    yyvstop+221,
0,      0,            yyvstop+224,
114,    0,            0,
1131,   yysvec+21,    yyvstop+226,
991,    yysvec+21,    yyvstop+228,
1141,   yysvec+21,    yyvstop+231,
1037,   yysvec+21,    yyvstop+233,
1142,   yysvec+21,    yyvstop+235,
1039;   yysvec+21,    yyvstop+237,
1134,   yysvec+21,    yyvstop+239,
797,    0,            0,
1145,   yysvec+21,    yyvstop+241,
1036,   yysvec+21,    yyvstop+243,
1066,   yysvec+21,    yyvstop+246,
1137,   yysvec+21,    yyvstop+249,
1140,   yysvec+21,    yyvstop+252,
1143,   yysvec+21,    yyvstop+255,
905,    0,            0,
```

```
1144,   yysvec+21,      yyvstop+257,
1147,   yysvec+21,      yyvstop+260,
1148,   yysvec+21,      yyvstop+263,
0,      0,              yyvstop+266,
0,      0,      0};
struct yywork *yytop = yycrank+1259;
struct yysvf *yybgin = yysvec+1;
unsigned char yymatch[] = {
00  ,01  ,01  ,01  ,01  ,01  ,01  ,01  ,
01  ,011 ,012 ,01  ,011 ,015 ,01  ,01  ,
01  ,01  ,01  ,01  ,01  ,01  ,01  ,01  ,
01  ,01  ,01  ,01  ,01  ,01  ,01  ,01  ,
011 ,01  ,'"' ,01  ,01  ,01  ,'&' ,0
01  ,01  ,01  ,'+' ,01  ,'+' ,'&' ,01  ,
'0' ,'0' ,'0' ,'0' ,'0' ,'0' ,'0' ,'0' ,
'0' ,'0' ,01  ,01  ,01  ,01  ,01  ,01  ,
01  ,'A' ,'B' ,'C' ,'D' ,'E' ,'F' ,'G' ,
'H' ,'I' ,'J' ,'K' ,'L' ,'M' ,'N' ,'O' ,
'P' ,'J' ,'R' ,'S' ,'T' ,'U' ,'V' ,'W' ,
'X' ,'J' ,'J' ,01  ,01  ,01  ,01  ,01  ,
01  ,'A' ,'B' ,'C' ,'D' ,'E' ,'F' ,'G' ,
'H' ,'I' ,'J' ,'K' ,'L' ,'M' ,'N' ,'O' ,
'P' ,'J' ,'R' ,'S' ,'T' ,'U' ,'V' ,'W' ,
'X' ,'J' ,'J' ,01  ,01  ,01  ,'~' ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
01  ,01  ,01  ,01  ,01  ,01  ,01  ,01  ,
0};
unsigned char yyextra[] = {
0,0,0,0,0,0,0,0,
0,0,0,0,0,0,0,0,
0,0,0,0,0,0,0,0,
0,0,0,0,0,0,0,0,
0,0,0,0,0,0,0,0,
0,0,0,0,0,0,0,0,
0,0,0,0,0,0,0,0,
0};
/* @(#) $Revision: 42.1 $      */
int yylineno =1;
# define YYU(x) x
# define NLSTATE yyprevious=YYNEWLINE
/* char yytext[YYLMAX];
 * ***** nls8 ***** */
unsigned char yytext[YYLMAX];
struct yysvf *yylstate [YYLMAX], **yylsp, **yyolsp;
/* char yysbuf[YYLMAX];
 * char *yysptr = yysbuf;
 * ***** nls8 ***** */
unsigned char yysbuf[YYLMAX];
unsigned char *yysptr = yysbuf;
int *yyfnd;
```

```
extern struct yysvf *yyestate;
int yyprevious = YYNEWLINE;
yylook(){
	register struct yysvf *yystate, **lsp;
	register struct yywork *yyt;
	struct yysvf *yyz;
	int yych, yyfirst;
	struct yywork *yyr;
# ifdef LEXDEBUG
	int debug;
# endif
/*	char *yylastch;
 * ***** nls8 ***** */
	unsigned char *yylastch;
	/* start off machines */
# ifdef LEXDEBUG
	debug = 0;
# endif
	yyfirst=1;
	if (!yymorfg)
		yylastch = yytext;
	else {
		yymorfg=0;
		yylastch = yytext+yyleng;
		}
	for(;;){
		lsp = yylstate;
		yyestate = yystate = yybgin;
		if (yyprevious==YYNEWLINE) yystate++;
		for (;;){
# ifdef LEXDEBUG
			if(debug)fprintf(yyout,"state %d\n",yystate-yysvec-1);
# endif
			yyt = &yycrank[yystate->yystoff];
			if(yyt == yycrank && !yyfirst){  /* may not be any transitions */
				yyz = yystate->yyother;
				if(yyz == 0)break;
				if(yyz->yystoff == 0)break;
				}
			*yylastch++ = yych = input();
			yyfirst=0;
		tryagain:
# ifdef LEXDEBUG
			if(debug){
				fprintf(yyout,"char ");
				allprint(yych);
				putchar('\n');
				}
# endif
			yyr = yyt;
			if ( (int)yyt > (int)yycrank){
				yyt = yyr + yych;
				if (yyt <= yytop && yyt->verify+yysvec == yystate){
					if(yyt->advance+yysvec == YYLERR)	/* error transitions */
						{unput(*--yylastch);break;}
					*lsp++ = yystate = yyt->advance+yysvec;
					goto contin;
					}
				}
# ifdef YYOPTIM
			else if((int)yyt < (int)yycrank) {		/* r < yycrank */
				yyt = yyr = yycrank+(yycrank-yyt);
# ifdef LEXDEBUG
				if(debug)fprintf(yyout,"compressed state\n");
```

```
# endif
                        yyt = yyt + yych;
                        if(yyt <= yytop && yyt->verify+yysvec == yystate){
                                if(yyt->advance+yysvec == YYLERR)       /* error transitions */
                                        {unput(*--yylastch);break;}
                                *lsp++ = yystate = yyt->advance+yysvec;
                                goto contin;
                                }
                        yyt = yyr + YYU(yymatch[yych]);
# ifdef LEXDEBUG
                        if(debug){
                                fprintf(yyout,"try fall back character ");
                                allprint(YYU(yymatch[yych]));
                                putchar('\n');
                                }
# endif
                        if(y    = yytop && yyt->verify+yysvec == yystate){
                                if(yyt->advance+yysvec == YYLERR)       /* error transition */
                                        {unput(*--yylastch);break;}
                                *lsp++ = yystate = yyt->advance+yysvec;
                                goto contin;
                                }
                        }
                if ((yystate = yystate->yyother) && (yyt = &yycrank[yystate->yystoff]) != yycrank){
# ifdef LEXDEBUG
                        if(debug)fprintf(yyout,"fall back to state %d\n",yystate-yysvec-1);
# endif
                        goto tryagain;
                        }
# endif
                else
                        {unput(*--yylastch);break;}
        contin:
# ifdef LEXDEBUG
                if(debug){
                        fprintf(yyout,"state %d char ",yystate-yysvec-1);
                        allprint(yych);
                        putchar('\n');
                        }
# endif
                ;
                }
# ifdef LEXDEBUG
        if(debug){
                fprintf(yyout,"stopped at %d with ",*(lsp-1)-yysvec-1);
                allprint(yych);
                putchar('\n');
                }
# endif
        while (lsp-- > yylstate){
                *yylastch-- = 0;
                if (*lsp != 0 && (yyfnd= (*lsp)->yystops) && *yyfnd > 0){
                        yyolsp = lsp;
                        if(yyextra[*yyfnd]){            /* must backup */
                                while(yyback((*lsp)->yystops,-*yyfnd) != 1 && lsp > yylstate){
                                        lsp--;
                                        unput(*yylastch--);
                                        }
                                }
                        yyprevious = YYU(*yylastch);
                        yylsp = lsp;
                        yyleng = yylastch-yytext+1;
                        yytext[yyleng] = 0;
```

```
# ifdef LEXDEBUG
                        if(debug){
                                fprintf(yyout,"\nmatch ");
                                sprint(yytext);
                                fprintf(yyout," action %d\n",*yyfnd);
                                }
# endif
                        return(*yyfnd++);
                        }
                unput(*yylastch);
                }
        if (yytext[0] == 0  /* && feof(yyin) */)
                {
                yysptr=yysbuf;
                return(0);
                }
        yyprevious = yytext[0] = input();
        if (yyprevious>0)
                output(yyprevious);
        yylastch=yytext;
# ifdef LEXDEBUG
        if(debug)putchar('\n');
# endif
        }
    }
yyback(p, m)
    int *p;
{
if (p==0) return(0);
while (*p)
    {
    if (*p++ == m)
        return(1);
    }
return(0);
}
    /* the following are only used in the lex library */
yyinput(){
    return(input());
    }
yyoutput(c)
  int c; {
    output(c);
    }
yyunput(c)
  int c; {
    unput(c);
    }
%{
/*===================== DO NOT REMOVE OR EDIT ============================

    This comment and the following sccsId declaration are managed
    by SCCS for you. Do not edit or remove either.

    Source file:    /users/bmw/Alpha/VRL/SCCS/s.lexer.l
    Latest version: 1.8
    Last mod time:  09/08/89 at 15:00:42

======================================================================*/

static char *sccsId = "@(#)lexer.l rev 1.8 created on 09/08/89 at 15:00:42";

/*===================== DO NOT REMOVE OR EDIT ==========================*/
```

```
#include <ctype.h>
#include "batterymarch.h"
#include "objc.h"
#include "uil.h"

#include "tokens.h"

int _VRLLineNumber;

#define MAXNAM 80
#define ret(arg1, arg2) lexVal = arg1; lexRet = arg2; goto doit

static BOOL
        PassFlag = NO,
        LexDbgFlag = NO;
= BM_Lexer : Object (BMPARSE)
{
    id inputStream;
}
+ (BOOL)setDebug:(BOOL)value { BOOL tmp = LexDbgFlag;
        LexDbgFlag = value; return tmp; }

-stream:aStrm
{
    if(inputStream)inputStream = [inputStream free];
    inputStream = aStrm;
    _VRLLineNumber = 1;
}

-stream { return inputStream; }

-(char)inputChar { return [inputStream inputChar]; }
-(char)unputChar:(char)c { return [inputStream unputChar:c]; }
=:

#undef input
#undef unput
#define input()    [theLexer inputChar]
#define unput(c)   [theLexer unputChar:(c)]

        static short lexVal, lexRet;
STR rawtoken = (STR)yytext;

/* Intrudes between lexer and parser for token-level debugging */
static id theLexer;
yynewlex(myLexer) id myLexer; {
    id oldToken; short retval;
    theLexer = myLexer;
    retval = rawlexer(myLexer);
    if (LexDbgFlag) printf("TOK=0x%3:    1) %s\n", retval, retval, rawtoken);
    return retval;
}
#define yylex() rawlexer()
%}
%%
        rawtoken = (STR)yytext;
[0-9][0-9]"-"[a-zA-Z][a-zA-Z][a-zA-Z]"-"[0-9][0-9] { ret(ABSOLUTEDATECONSTANT,ABSOLUTEDATECONSTANT); }

[0-9]+"\."?[0-9]*             { ret(CONSTANT,CONSTANT); }
"\."[0-9]+                    { ret(CONSTANT,CONSTANT); }
[-\+]?[0-9]+[a-zA-Z]+       { ret(DATEOFFSETCONSTANT,DATEOFFSETCONSTANT); }
"\""[^"]*"\""                 { ret(STRINGLITERAL,STRINGLITERAL); }

[wW][hH][eE][rR][eE]           { ret(WHERE,WHERE); }
```

```
[sS][eE][tT]                              { ret(SET,SET); }
[iI][nN][sS][tT][aA][lL][lL]              { ret(INSTALL,INSTALL); }
[tT][eE][mM][pP]                          { ret(TEMP,TEMP); }
[dD][eE][lL][eE][tT][eE]                  { ret(DELETE,DELETE); }
[sS][aA][vV][eE][lL][iI][sS][tT]          { ret(SAVELIST,SAVELIST); }
[mM][aA][kK][eE]                          { ret(MEMO,MEMO); }
[eE][nN][cC]([lL][oO][sS][eE])?           { ret(ENCLOSE,ENCLOSE); }
[mM][eE][sS]([sS][aA][gG][eE])?           { ret(MESSAGE,MESSAGE); }
[pP][aA][uU][sS][eE]                      { ret(PAUSE,PAUSE); }
[cC][oO][nN][tT]([iI][nN][uU][eE])?       { ret(CONTINUE,CONTINUE); }
[nN][uU][lL][lL][sS][tT][mM][tT]?        { ret(NULLSTATEMENT,NULLSTATEMENT); }

[fF][oO][rR]                              { ret(FOR,FOR); }
[nN][eE][xX][tT]                          { ret(NEXT,NEXT); }
[eE][nN][dD]                              { ret(END,END); }
[bB][eE][gG][iI][nN]                      { ret(BEGIN,BEGIN); }


"*" { ret(TMS,TMS); }
"+" { ret(PLS,PLS); }
"-" { ret(MIN,MIN); }
"/" { ret(DIV,DIV); }
"^" { ret(POW,POW); }
"(" { ret(LEFTPAREN,LEFTPAREN); }
")" { ret(RIGHTPAREN,RIGHTPAREN); }
"[" { ret(LEFTSQUARE,LEFTSQUARE); }
"]" { ret(RIGHTSQUARE,RIGHTSQUARE); }
"{" { ret(LEFTBRACKETS,LEFTBRACKETS); }
"}" { ret(RIGHTBRACKETS,RIGHTBRACKETS); }
"<>" { ret(NE,NE); }
"<=" { ret(LE,LE); }
">=" { ret(GE,GE); }
"<" { ret(LT,LT); }
">" { ret(GT,GT); }
"=" { ret(EQ,EQ); }
[aA][nN][dD]                              { ret(AND,AND); }
[oO][rR]                                  { ret(OR,OR); }
[nN][oO][tT]                              { ret(NOT,NOT); }
":" { ret(COLON,COLON); }
"," { ret(COMMA,COMMA); }
"$" { ret(DOLLAR,DOLLAR);}

"##".*"\n##".*"\n" {ret(COMMENT,COMMENT);}

([a-zA-Z]+"_")?[a-zA-Z~][a-zA-Z0-9~&\.]*   { ret(IDENTIFIER,IDENTIFIER);


                /* A space optimization. See the ret macro. */
                doit: return lexRet;
}
[\t \f] { /*discard*/; }
[\r\n]  { _VRLLineNumber++;}


%%
/* Wrapup after file is processed. Return 1 to signal end of input file. */
yywrap() { return 1; }

%{
/*==================== DO NOT REMOVE OR EDIT ============================

        This comment and the following sccsId declaration are managed
        by SCCS for you. Do not edit or remove either.
```

```
        Source file:    %F%
        Latest version:  %I%
        Last mod time:   %H% at %U%

=======================================================================*/

static char *sccsId = "@(#)grammar.y work in progress by bmw";

/*==================== DO NOT REMOVE OR EDIT ==========================*/


#include <stdio.h>
#include "batterymarch.h"
#include "objc.h"
#include "uil.h"

@requires BM_StatementList, BM_Set, BM_Delete, BM_SaveList, BM_Install;
@requires BM_Temp, BM_StringLiteral, BM_AbsDateConst, BM_CurrencyConst;
@requires BM_DateOffsetConst, CharString;
@requires BM_ArithExprList, BM_ArithTMS, BM_ArithPLS, BM_ArithMIN;
@requires BM_ArithDIV, BM_ArithPOW, BM_ArithUnaryMIN;
@requires BM_CurrencyConst;
@requires BM_Where, BM_Memo;
@requires BM_NamedExprList, BM_KeywordExpr;
@requires BM_LogicLT, BM_LogicGT, BM_LogicEQ;
@requires BM_LogicLE, BM_LogicGE, BM_LogicNE, BM_LogicAND;
@requires BM_LogicOR, BM_LogicNOT, BM_FunctionCall;
@requires BM_Primary, BM_Pause, BM_Continue, BM_For, BM_Next, BM_Begin;
@requires BM_End, BM_NamedStringList, BM_KeywordField, BM_Program;
@requires BM_Error, BM_Lexer, BM_StreamString;
@requires BM_Plate, BM_PlateList;
@requires BM_Qidentifier, BM_NullStatement;

extern STR rawtoken;
static BOOL parserErrorFlag;
static BOOL parseDebug = NO;
= BM_Parser : Object (BMPARSE)
{
        id myLexer;
}
// Turn on (off) yacc debugging
+ (BOOL) setDebug:(BOOL)value
{
    BOOL old = parseDebug;
    parseDebug = value;
    return parseDebug;
}
static id theLexer;     // assumes only one !!!
+new
{
    self = [super new];
    theLexer = myLexer = [BM_Lexer new];
    return self;
}

-(BOOL)parse:aStream
{
    [myLexer stream:aStream];
    parserErrorFlag = NO;
    yyparse();
    return (parserErrorFlag);
}
=:
```

```
#define yylex()          yynewlex(theLexer)

#define YYSTYPE id

/* just make this big enough for now; later need to re-do
 * parser function to allocate new stacks on demand
 */
#define YYMAXDEPTH 0x400        /* = 1024 decimal or 4 times default */
%}

%token WHERE SET INSTALL TEMP IDENTIFIER MEMO ENCLOSE LEFTPAREN RIGHTPAREN
%token MESSAGE PAUSE CONTINUE FOR NEXT BEGIN END COMMA COLON
%token STRINGLITERAL ABSOLUTEDATECONSTANT DATEOFFSETCONSTANT
%token LEFTSQUARE RIGHTSQUARE CONSTANT DOLLAR LEFTBRACKETS RIGHTBRACKETS
%token MODIFIER NULLSTATEMENT COMMENT DELETE SAVELIST


/* Precedence levels -- lowest to highest
 */

%left PLS MIN
%left TMS DIV
%left POW
%left OR
%left AND
%left NOT
%nonassoc LT GT EQ LE GE NE

%start ParseUnit

%{
id parseTree;
%}
%%

ParseUnit               : Program
                                { parseTree = $$ = $1;
                                if(parseDebug)
                                        [$1 printTreeOn:stdout indenting:0];}
                        | Plate
                                { parseTree = $$ = $1;
                                if(parseDebug)
                                        [$1 printTreeOn:stdout indenting:0];}
                        | SingleStatement
                                { parseTree = $$ = $1;
                                if(parseDebug)
                                        [$1 printTreeOn:stdout indenting:0];}
                        ;

Program                 : BeginStatement PlateList EndStatement
                                        { $$ = [BM_Program
                                                begin:$1
                                                plates:$2
                                                end:$3];
                                                [$1 parent:$$];
                                                [$2 parent:$$];
                                                [$3 parent:$$];
                                        }
                        ;

Plate                   : ForStatement StatementList NextStatement
                                { $$ = [BM_Plate for:$1
```

```
                  statements:$2
                  next:$3];
                  [$1 parent:$$];
                  [$2 parent:$$];
                  [$3 parent:$$];
           }
         | ForStatement StatementList NextStatement Comment
           { $$ = [BM_Plate for:$1
                  statements:$2
                  next:$3];
                  [$1 parent:$$];
                  [$2 parent:$$];
                  [$3 parent:$$];
                  [$$ description:$4];
           }
         | ForStatement NextStatement
           {
            id null;
            $$ = [BM_Plate for:$1
                  statements:null=[BM_NullStatement new]
                  next:$2];
                  [null parent:$$];
                  [$1   parent:$$];
                  [$2   parent:$$];
           }
         | ForStatement NextStatement Comment
           {
            id null;
            $$ = [BM_Plate for:$1
                  statements:null=[BM_NullStatement new]
                  next:$2];
                  [null parent:$$];
                  [$1   parent:$$];
                  [$2   parent:$$];
                  [$$   description:$3];
           }
         ;

PlateList        : Plate { $$ = $1;}
                 | PlateList Plate
                   { $$ = [BM_PlateList
                          leftNode:$1 rightNode:$2];
                     [$1 parent:$$];
                     [$2 parent:$$];
                   }
                 ;
SingleStatement  : Statement { $$ = $1; }
                 | NextStatement { $$ = $1; }
                 | ForStatemert { $$ = $1; }
                 | BeginStatement { $$ = $1; }
                 | EndStatement { $$ = $1; }
                 ;
StatementList    : Statement { $$ = $1; }
                 | StatementList Statement
                   { $$ = [BM_StatementList
                          leftNode:$1 rightNode:$2];
                     [$1 parent:$$];
                     [$2 parent:$$];
                   }
                 ;

Statement        : error  {printf("Skipping statement\n");
                          parserErrorFlag = YES;
```

```
                $$ = [BM_Error new];}
| WHERE LogicalExpression
                { $$ = [BM_Where node:$2];
                        [$2 parent:$$];
                }
| SET LeftHandSide EQ ArithmeticExpression
             { $$ = [BM_Set leftNode:$2 rightNode:$4];
                [$2 parent:$$];
                [$4 parent:$$];
             }
| SET LeftHandSide EQ ArithmeticExpression COMMA WHERE LogicalExpression
        { $$ = [BM_Set leftNode:$2 rightNode:$4];
                [$$ whereNode:[BM_Where node:$7]];
                [$2 parent:$$];
                [$4 parent:$$];
                [$7 parent:[$$ whereNode]];
                [[$$ whereNode] parent:$$];
        }
| INSTALL LeftHandSide EQ ArithmeticExpression
             { $$ = [BM_Install leftNode:$2 rightNode:$4];
                [$2 parent:$$];
                [$4 parent:$$];
             }
| INSTALL LeftHandSide EQ ArithmeticExpression COMMA WHERE LogicalExpression
        { $$ = [BM_Install leftNode:$2 rightNode:$4];
                [$$ whereNode:[BM_Where node:$7]];
                [$2 parent:$$];
                [$4 parent:$$];
                [$7 parent:[$$ whereNode]];
                [[$$ whereNode] parent:$$];
        }
| DELETE Identifier
             { $$ = [BM_Delete node:$2];
                [$2 parent:$$];
             }
| SAVELIST Identifier
             { $$ = [BM_SaveList node:$2];
                [$2 parent:$$];
             }
| TEMP LeftHandSide EQ ArithmeticExpression
             { $$ = [BM_Temp leftNode:$2 rightNode:$4];
                [$2 parent:$$];
                [$4 parent:$$];
             }
| TEMP LeftHandSide EQ ArithmeticExpression COMMA WHERE LogicalExpression
        { $$ = [BM_Temp leftNode:$2 rightNode:$4];
                [$$ whereNode:[BM_Where node:$7]];
                [$2 parent:$$];
                [$4 parent:$$];
                [$7 parent:[$$ whereNode]];
                [[$$ whereNode] parent:$$];
        }
| MEMO Identifier
    ENCLOSE LEFTPAREN NamedExpressionList RIGHTPAREN
    MESSAGE LEFTPAREN NamedStringList RIGHTPAREN
   { $$ = [BM_Memo string:$2 enclose:$5
                        message:$9];
                [$5 displayedHorizontally:NO];
                [$9 displayedHorizontally:NO];
                [$2 parent:$$];
                [$5 parent:$$];
                [$9 parent:$$];
   }
| MEMO Identifier
    MESSAGE LEFTPAREN NamedStringList RIGHTPAREN
    ENCLOSE LEFTPAREN NamedExpressionList RIGHTPAREN
```

```
  { $$ = [/    emo string:$2 enclose:$9
                       message:$5];
               [$9 displayedHorizontally:NO];
               [$5 displayedHorizontally:NO];
               [$2 parent:$$];
               [$5 parent:$$];
               [$9 parent:$$];
  }
| PAUSE StringLiteral
               { $$ = [BM_Pause node:$2];
                      [$2 parent:$$];
               }
| CONTINUE StringLiteral
               { $$ = [BM_Continue node:$2];
                      [$2 parent:$$];
               }
| PAUSE
               { $$ = [BM_Pause node:nil]; }
| CONTINUE
               { $$ = [BM_Continue node:nil]; }
| NULLSTATEMENT
               { $$ = [BM_NullStatement new]; }
;

NextStatement          : NEXT
                           { $$ = [BM_Next new]; }
                       ;

ForStatement           : FOR Identifier ModifierList
                           { $$ = [BM_For leftNode:$2 rightNode:$3];
                                  [$2 parent:$$];
                                  [$3 parent:$$];
                           }
                       | FOR Identifier
                           { $$ = [BM_For leftNode:$2 rightNode:nil];
                                  [$2 parent:$$];
                           }
                       ;

BeginStatement         : BEGIN
                           { $$ = [BM_Begin new]; }
                       ;

EndStatement           : END
                           { $$ = [BM_End new]; }
                       ;

NamedStringList        : NamedStringList COMMA KeywordField
                           { $$ = [BM_NamedStringList
                                  leftNode:$1 rightNode:$3];
                                    [$1 parent:$$];
                                    [$3 parent:$$];
                           }
                       | KeywordField
                           { $$ = [BM_NamedStringList
                                  leftNode:$1 rightNode:nil];
                                    [$1 parent:$$];
                           }
                       ;

KeywordField           : Identifier COLON ConstantField
                           { $$ = [BM_KeywordField
                                  leftNode:$1 rightNode:$3];
                                    [$1 parent:$$];
                                    [$3 parent:$$];
                           }
```

```
                        ;

Identifier              : IDENTIFIER {$$ = [BM_Qidentifier str:rawtoken];}
                        ;

Comment                 : COMMENT {$$ = [CharString str:rawtoken];}
                        ;

ConstantField           :  StringLiteral { $$ = $1; }
                        |  Constant { $$ = $1; }
                        |  ABSOLUTEDATECONSTANT { $$ = [BM_AbsDateConst
                                                    str:rawtoken]; }
                        |  DATEOFFSETCONSTANT { $$ = [BM_DateOffsetConst
                                                   str:rawtoken]; }

                        ;

StringLiteral           :  STRINGLITERAL {$$ = [BM_StringLiteral str:rawtoken];}

NamedExpressionList     :  KeywordExpression { $$ = $1; }
                        |  KeywordExpression COMMA NamedExpressionList
                              { $$ = [BM_NamedExprList
                                    leftNode:$1 rightNode:$3];
                                      [$1 parent:$$];
                                      [$3 parent:$$];
                              }
                        |  ArithmeticExpressionList { $$ = $1; }
                        ;

ArithmeticExpressionList :  ArithmeticExpression { $$ = $1; }
                         |  ArithmeticExpressionList COMMA ArithmeticExpression
                              { $$ = [BM_ArithExprList
                                    leftNode:$1 rightNode:$3];
                                      [$1 parent:$$];
                                      [$3 parent:$$];
                              }
                         ;

KeywordExpression       :  Identifier COLON ArithmeticExpression
                              { $$ = [BM_KeywordExpr
                                    leftNode:$1 rightNode:$3];
                                      [$1 parent:$$];
                                      [$3 parent:$$];
                              }
                        ;

ArithmeticExpression    :  ArithmeticExpression TMS ArithmeticExpression
                              {  $$ = [BM_ArithTMS
                                      leftNode:$1 rightNode:$3];
                                       [$1 parent:$$];
                                       [$3 parent:$$];
                              }
                        |  ArithmeticExpression PLS ArithmeticExpression
                              {  $$ = [BM_ArithPLS
                                      leftNode:$1 rightNode:$3];
                                       [$1 parent:$$];
                                       [$3 parent:$$];
                              }
                        |  ArithmeticExpression MIN ArithmeticExpression
                              {  $$ = [BM_ArithMIN
                                      leftNode:$1 rightNode:$3];
                                       [$1 parent:$$];
                                       [$3 parent:$$];
                              }
                        |  ArithmeticExpression DIV ArithmeticExpression
                              {  $$ = [BM_ArithDIV
```

```
              eftNode:$1 rightNode:$3];
              [$1 parent:$$];
              [$3 parent:$$];
          }
        | ArithmeticExpression POW ArithmeticExpression
          {  $$ = [BM_ArithPOW
                leftNode:$1 rightNode:$3];
                [$1 parent:$$];
                [$3 parent:$$];
          }
        | LEFTPAREN ArithmeticExpression RIGHTPAREN
          {  $$ = $2; [$$ hasParentheses:YES]; }
        | MIN ArithmeticExpression %prec TMS
          {  $$ = [BM_ArithUnaryMIN
                node:$2];
                [$2 parent:$$];
          }
        | Primary { $$ = $1; }
        ;
LogicalExpression       : ArithmeticExpression LT  ArithmeticExpression
          { $$ = [BM_LogicLT leftNode:$1 rightNode:$3];
                [$1 parent:$$];
                [$3 parent:$$];
          }
        | ArithmeticExpression GT  ArithmeticExpression
          { $$ = [BM_LogicGT leftNode:$1 rightNode:$3];
                [$1 parent:$$];
                [$3 parent:$$];
          }
        | ArithmeticExpression EQ  ArithmeticExpression
          { $$ = [BM_LogicEQ leftNode:$1 rightNode:$3];
                [$1 parent:$$];
                [$3 parent:$$];
          }
        | ArithmeticExpression LE  ArithmeticExpression
          { $$ = [BM_LogicLE leftNode:$1 rightNode:$3];
                [$1 parent:$$];
                [$3 parent:$$];
          }
        | ArithmeticExpression GE  ArithmeticExpression
          { $$ = [BM_LogicGE leftNode:$1 rightNode:$3];
                [$1 parent:$$];
                [$3 parent:$$];
          }
        | ArithmeticExpression NE  ArithmeticExpression
          { $$ = [BM_LogicNE leftNode:$1 rightNode:$3];
                [$1 parent:$$];
                [$3 parent:$$];
          }
        | LogicalExpression AND LogicalExpression
          { $$ = [BM_LogicAND leftNode:$1 rightNode:$3];
                [$1 parent:$$];
                [$3 parent:$$];
          }
        | LogicalExpression OR  LogicalExpression
          { $$ = [BM_LogicOR leftNode:$1 rightNode:$3];
                [$1 parent:$$];
                [$3 parent:$$];
          }
        | LEFTPAREN LogicalExpression RIGHTPAREN
          { $$ = $2; [$$ hasParentheses:YES]; }
        | NOT LogicalExpression
          { $$ = [BM_LogicNOT node:$2];
                [$2 parent:$$];
          }
```

```
                        | Arithmeti    ression
                              { $$ = $1; }
                        ;

LeftHandSide            : Identifier
                              { $$ = [BM_Primary leftNode:$1 rightNode:nil];
                                     [$1 parent:$$];
                              }
                        | Identifier ModifierList
                              { $$ = [BM_Primary leftNode:$1 rightNode:$2];
                                     [$1 parent:$$];
                                     [$2 parent:$$];
                              }
                        ;

Primary                 : Identifier
                              { $$ = [BM_Primary leftNode:$1 rightNode:nil];
                                     [$1 parent:$$];
                              }
                        | Identifier ModifierList
                              { $$ = [BM_Primary leftNode:$1 rightNode:$2];
                                     [$1 parent:$$];
                                     [$2 parent:$$];
                              }
                        | Identifier LEFTSQUARE
                              NamedExpressionList RIGHTSQUARE
                              { $$ = [BM_FunctionCall
                                    leftNode:$1 rightNode:$3];
                                     [$1 parent:$$];
                                     [$3 parent:$$];
                              }
                        | CurrencyConstant { $$ = $1; }
                        | StringLiteral { $$ = $1; }
                        ;

CurrencyConstant        : Constant    { $$ = $1; }
                        | Constant DOLLAR {$$ = [$1 units:"$"];}
                        | Constant COLON Identifier
                              { $$ =  [$1 units:[$3 str]]; [$3 free]; }
                        ;

Constant                : CONSTANT  {$$ = [[BM_CurrencyConst new]
                                            string:rawtoken]; }

ModifierList            : LEFTBRACKETS NamedStringList RIGHTBRACKETS
                              { $$ = $2;
                                [$$ hasParentheses:YES];
                              }
                        ;

%%

extern int _VRLLineNumber;

yyerror(theComplaint)
char *theComplaint;
{
    printf("yyerror(%s): line %d\n",theComplaint,_VRLLineNumber);
}
/*===================== DO NOT REMOV     EDIT ==============================

        This comment and the following sccsId declaration are managed
        by SCCS for you. Do not edit or remove either.
```

```
        Source file:     %F%
        Latest version:  %I%
        Last mod time:   %H% at %U%

=======================================================================*/

static char *sccsId = "@(#)AboutBox.m work in progress by bmw";

/*===================== DO NOT REMOVE OR EDIT ===========================*/


#include "objc.h"
#include "uil.h"
#include "BMWGlobal.h"

@requires LogoLayer,InsetLayer,StringLayer;

= AboutBox : BM_DialogBox (BM_WorkstationMsgs, UserInterface,
                                               Collection, Primitive)
   {
   }


   +statusMessage:(STR)aStatusMessage
      {
       self =  [self new];
       [[[[StringLayer str:aStatusMessage font:BM_fonts.TitleBar
         color:colors.Red] attachTo:self] centerX:[self centerX]]
            top:[self centerY]+60];
      return self;
      }


   -initialize
      {
       id logoLayer;
       id titleString,subTitleString;
       id stringTM;

       id myInnerLayer;
       id versionString,patentString1,patentString2,licenseString;

       [super initialize];
       [self extent:pt(600,590)];

       logoLayer = [[[[LogoLayer new] borderWidth:2]
                                    insideColor:BM_colors.WindowForeground]
                                       attachTo:self];

       acceptButton = [[self defaultAcceptButton] attachTo:self];
       [self defaultPushButton:acceptButton];
       [self acceptSelector:@selector(modalDeactivate) receiver:self];
       [acceptButton offColor:colors.Blue];

       titleString = [[StringLayer str:"Batterymarch Investment Systems"
          font:fonts.font9 color:colors.Black] attachTo:self];

       subTitleString = [[StringLayer str:"BIS Research System"
          font:fonts.font9 color:colors.Black] attachTo:self];

       stringTM = [[StringLayer str:"TM"
```

```
  font:BM_fonts.Application     r:colors.Black] attachTo:self];

licenseString = [[StringLayer
  str:"Licensed to: Batterymarch Financial Management"
    font:BM_fonts.TitleBar color:colors.Black]
      attachTo:self];

myInnerLayer = [[InsetLayer extent:pt([self width]-100,100)]
  attachTo:self];

versionString = [[[StringLayer str:"Version 1.0,  September 1989"
  font:BM_fonts.Application color:colors.Black]
    insideColor:colors.White] attachTo:myInnerLayer];

patentString1 = [[[[[StringLayer
  sprintf:"\251 Batterymarch Investment Systems, 1988-89.  All rights reserved."]
    font:BM_fonts.Application] color:colors.Black]
      insideColor:colors.White] attachTo:myInnerLayer];

patentString2 = [[[StringLayer str:"US patent pending"
  font:BM_fonts.Application color:colors.Black]
    insideColor:colors.White] attachTo:myInnerLayer];

[[titleString centerX:[self centerX]] top:[self top]+40];

[[subTitleString centerX:[self centerX]]
  top:[titleString adjacentBottom]+10];

[stringTM origin:[subTitleString topRight]];

[[licenseString centerX:[self centerX]]
  top:[subTitleString adjacentBottom]+30];

[[[logoLayer width:210] centerX:[self centerX]]
  top:[licenseString adjacentBottom]+30];

[[myInnerLayer centerX:[self centerX]]
  top:[logoLayer adjacentBottom]+75];

[[versionString centerX:[myInnerLayer centerX]]
  top:[myInnerLayer top]+21];
[[patentString1 centerX:[myInnerLayer centerX]]
  top:[versionString adjacentBottom]+5];
[[patentString2 centerX:[myInnerLayer centerX]]
  top:[patentString1 adjacentBottom]+5];

[[acceptButton centerX:[self centerX]]
  top:[myInnerLayer adjacentBottom]+20];

return self;
}
/*==================== DO NOT REMOV    EDIT ============================

    This comment and the following sccsId declaration are managed
    by SCCS for you. Do not edit or remove either.

    Source file:    /users/bmw/Alpha/UserInterface/SCCS/s.ApplicWin.m
    Latest version: 1.6
    Last mod time:  09/13/89 at 12:35:02

======================================================================*/

static char *sccsId = "@(#)ApplicWin.m rev 1.6 created on 09/13/89 at 12:35:02";
```

```
/*==================== DO NOT REMOVE OR EDIT ===========================*/

#include "objc.h"
#include "uil.h"
#include "site.h"
#include <stdio.h>
#include "BMWGlobal.h"

@requires EventQ;
@requires FileIconHandler,BitMap,CharString,BM_Printer,BM_AskDialogBox;

extern id currentDisplay;

= ApplicationWin:WindowLayer(BM_WorkstationMsgs,UIMESSAGES)
  {
  id fileName;
  id shortFileName;
  id parent;

  BOOL opened;
  }


+ createInterfaceFor:aFileName parent:anId
  {
   self = [self new];

   [self fileName:aFileName];

   [self parent:anId];

   return self;
  }


-defaultParent
   {
    return deskTop;
   }


-defaultFileName
   {
    return nil;
   }


- parent
  {
  return parent;
  }
- parent:anId
  {
  parent = anId;
  return self;
  }


- fileName
  {
  return fileName;
  }
```

```
- fileName:aString
  {
  int  length;
  char *period;
  char tempStr [40];

  if (fileName != nil)
     [fileName free];
  if (shortFileName != nil)
     [shortFileName free];

  fileName = aString;
  length = [fileName length];
  [fileName asSTR:tempStr maxSize:40];
  tempStr[length] = '\0';

  if (period = strrchr(tempStr, '.'))
     *period = 0;

  if (strlen(tempStr))
     shortFileName = [CharString str:tempStr];
  else
     shortFileName = [CharString str:"Untitled"];

  [self assignSTR:[self defaultTitleSTR]];
  [[self iconHandler] assignSTR:[self defaultTitleSTR]];

  return self;
  }



- path
  {
  id path;

  path = [parent path];
  path = [path concatSTR:"/"];

  if (path != nil)
     path = [path concat:fileName];
  else
     path = [[CharString str:"./temp/"] concat:fileName];
if(globalDebugFlag)printf("path of ApplicationLayer:%s\n",[path str]);

  return path;
  }


- writeTemporaryFile:currentPath
  {
  id tempName;
  parent = nil;
  tempName = [self path];
  rename ([currentPath str],[tempName str]);

  [tempName free];

  return self;
  }

- writeFile:anObject
  {
  id path = [self path];
```

```
[anObject storeOn:[path str]];
[path free];

return self;
}


- (STR)extensionSTR
{
return "";
}



- saveFile:anObject
{
STR defaultNewName;
id  newName;

id currentName = [self fileName];
if (currentName)
    defaultNewName = [shortFileName str];
else
    defaultNewName = "";

newName = [BM_AskDialogBox askSTR:"Save as what file?"
   defaultValue:defaultNewName  client:self];
if ([newName length] == 0)
   newName = [newName free];

if (newName != nil)
   [newName concatSTR:[self extensionSTR]];

 if ((currentName != nil) && ([newName isEqual:currentName]))
    {
    [self writeFile:anObject];
    [newName free];
    return self;
    }
 else
    if (newName != nil)
       {
       id oldName = nil,
       oldParent;

if(globalDebugFlag)printf("new %s\n",[newName str]);
       if (fileName != nil)
          oldName = [CharString str:[fileName str]];

       oldParent = [self parent];

       [[self iconHandler] erase];
       [self fileName:newName];
       [self parent:nil];
       [self writeFile:anObject];

       if (![oldParent mvIntoSelf:self])
          {
          id newPath = [self path];
          unlink ([newPath str]);
          [self fileName:oldName];
          [self parent:oldParent];
          [newPath free];
          }
```

```
      else
         {
         [[self iconHandler] assignSTR:[self defaultTitleSTR]];
         [oldParent createVisualInterfaceFor:oldName];
         }
      }
   else
      [newName free];

 return self;
 }



- renameFile
 {
 id newName = [BM_AskDialogBox askSTR:"Rename to what?"
    client:[self iconHandler]];

 if ([newName length] == 0)
    newName = [newName free];

 if (newName != nil)
    [newName concatSTR:[self extensionSTR]];

 if ((newName != nil) && (strlen([newName str])))
    {
    id oldName,
       oldPath,
       oldParent;

if(globalDebugFlag)printf("new %s\n",[newName str]);
    oldName   = [CharString str:[fileName str]];
    oldPath   = [self path];
if(globalDebugFlag)printf("old %s\n",[oldPath str]);
    oldParent = [self parent];

    [self fileName:newName];
    [self writeTemporaryFile:oldPath];

    if (![oldParent mvIntoSelf:self])
       {
       id newPath = [self path];
       rename ([newPath str], [oldPath str]);
       [self fileName:oldName];
       [self parent:oldParent];
       [newPath free];
       }
    else
       [oldName free];

    [oldPath free];
    }
  else
    [newName free];

  return self;
  }


 - defaultIconHandler
  {
```

```
return [FileIconHandler createInterfaceFor:self];
}



- (STR)defaultTitleSTR
{
return [shortFileName str];
}


- open
{
if (!opened)
   opened = YES;

return self;
}


- adjustColorsForPrinting:aBitMap
{
return self;
}


- print
{
if ([[self applicationLayer]
      respondsTo:@selector(printOn:deviceType:spool:)])
   return [[self applicationLayer] print];
else
  {
id myBitMap, aPrinter;
id tempDisplay;
id layerParent;

myBitMap = [BitMap origin:[self outsideOrigin]
   extent:[self outsideExtent]];
                    // imageData: and depth: included for printer class?
tempDisplay = currentDisplay;
currentDisplay = myBitMap;

layerParent = [self backLayer];
[self removeFromBackLayer];
[self displayRect:myBitMap];
[self attachTo:layerParent];

currentDisplay= tempDisplay;

[self adjustColorsForPrinting:myBitMap];

aPrinter = [BM_Printer forBitMap];
[aPrinter drawBitMap:myBitMap];

[myBitMap free];
[aPrinter free];

return self;
}
}
```

```
- initialize
  {
  [super initialize];

  [[self titleBar] insideColor:BM_colors.TitleBar];

  [self fileName:[self defaultFileName]];
  [self   parent:[self defaultParent]];

  return self;
  }


- terminate$
  {
  if ((myIconHandler != nil) &&
     (![myIconHandler initiatedDeletion]))
     {
     [myIconHandler erase];
     [myIconHandler client:nil];
     myIconHandler = [myIconHandler delete];
     }
  else
     myIconHandler = nil;

  if (fileName != nil)
     [parent createVisualInterfaceFor:fileName];

  if (shortFileName != nil)
     [shortFileName free];

  return [super terminate$];
  }

=:
/*===================== DO NOT REMOVI    EDIT ============================

       This comment and the following sccsId declaration are managed
       by SCCS for you. Do not edit or remove either.

       Source file:     /users/bmw/Alpha/UserInterface/SCCS/s.BLCorner1.m
       Latest version:  1.3
       Last mod time:   06/22/89 at 16:54:55

========================================================================*/

static char *sccsId = "@(#)BLCorner1.m rev 1.3 created on 06/22/89 at 16:54:55";

/*===================== DO NOT REMOVE OR EDIT ===========================*/

#include "objc.h"
#include "uil.h"
#include "BMWGlobal.h"

= BLCorner1:BorderLayer(BM_WorkstationMsgs,UIMESSAGES)
{
}

-initialize {

   [super initialize];
   [self borderWidth:0];
   [self insideColor:BM_colors.Frame];
   return self;
```

```
 }

 -displayLayer {
   short midY,endX,endY;
   int   lightColorIndex = [BM_colors.LightFrameShadow colorIndex];
   int    darkColorIndex = [BM_colors.DarkFrameShadow  colorIndex];

   [super displayLayer];
   midY = [self height]-[self width];
   endX = [self width]-1;
   endY = [self height]-1;
   [self drawLineFrom:pt(0,0) to:pt(endX-1,0) colorIndex:lightColorIndex];
   [self drawLineFrom:pt(0,1) to:pt(0,endY) colorIndex:lightColorIndex];
   [self drawLineFrom:pt(1,1) to:pt(1,endY-1) colorIndex:lightColorIndex];
   [self drawLineFrom:pt(endX-1,1) to:pt(endX-1,midY+1) colorIndex:darkColorIndex];
   [self drawLineFrom:pt(endX,0) to:pt(endX,midY) colorIndex:darkColorIndex];
   [self drawLineFrom:pt(endX,midY+1) to:pt(endX,midY+1)
        colorIndex:lightColorIndex];
   [self drawLineFrom:pt(2,endY-1) to:pt(endX,endY-1) colorIndex:darkColorIndex];
   [self drawLineFrom:pt(1,endY) to:pt(endX,endY) colorIndex:darkColorIndex];

   return self;
 }

 =:
/*==================== DO NOT REMOVI    EDIT ============================

       This comment and the following sccsId declaration are managed
       by SCCS for you. Do not edit or remove either.

       Source file:     /users/bmw/Alpha/UserInterface/SCCS/s.BLCorner2.m
       Latest version:  1.3
       Last mod time:   06/22/89 at 16:55:07

=======================================================================*/

static char *sccsId = "@(#)BLCorner2.m rev 1.3 created on 06/22/89 at 16:55:07";

/*==================== DO NOT REMOVE OR EDIT ==========================*/

#include "objc.h"
#include "uil.h"
#include "BMWGlobal.h"

= BLCorner2:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  short endX,endY;
  int   lightColorIndex = [BM_colors.LightFrameShadow colorIndex];
  int    darkColorIndex = [BM_colors.DarkFrameShadow  colorIndex];

  [super displayLayer];
  endX = [self width]-1;
  endY = [self height]-1;
```

```
[super displayLayer];
[self drawLineFrom:pt(0,0) to:pt(endX,0) colorIndex:lightColorIndex];
[self drawLineFrom:pt(0,1) to:pt(endX,1) colorIndex:lightColorIndex];
[self drawLineFrom:pt(endX,2) to:pt(endX,endY-2) colorIndex:darkColorIndex];
[self drawLineFrom:pt(0,endY-1) to:pt(endX,endY-1) colorIndex:darkColorIndex];
[self drawLineFrom:pt(0,endY) to:pt(endX,endY) colorIndex:darkColorIndex];

return self;
}

=:
/*===================== DO NOT REMOVI    EDIT ==============================

       This comment and the following sccsId declaration are managed
       by SCCS for you. Do not edit or remove either.

       Source file:     /users/bmw/Alpha/UserInterface/SCCS/s.BM_3DLayer.m
       Latest version:  1.2
       Last mod time:   05/01/89 at 17:29:56

=========================================================================*/

static char *sccsId = "@(#)BM_3DLayer.m rev 1.2 created on 05/01/89 at 17:29:56";

/*===================== DO NOT REMOVE OR EDIT ===========================*/

#include "objc.h"
#include "uil.h"
#include "BMWGlobal.h"

extern id currentDisplay;

@requires RectList, BorderLayer;

= BM_3DLayer: Layer (BM_WorkstationMsgs, UserInterface, Collection,
                     Primitive)
  {
   PT shadowOffset;
   id shadowLayer;
   id applicationLayer;
  }

 +createInterfaceFor:aLayer
  {
   self = [super new];

   [self applicationLayer:aLayer];

   return self;
  }

 - initialize
  {
   [super initialize];

   X(shadowOffset) =  10;
   Y(shadowOffset) = -10;

   shadowLayer = [[[BorderLayer attachTo:self] borderWidth:0]
                                                insideColor:BM_colors.Border];

   applicationLayer = nil;

   return self;
  }
```

```
- format
  {
   PT myNewOrigin,
      appLayerTranslation;

   PT myOrigin = [self origin];
   PT appLayerOrigin = [applicationLayer outsideOrigin];
   PT appLayerCorner = [applicationLayer outsideCorner];
   PT shadowOrigin = ptPlus(appLayerOrigin,shadowOffset);
   PT shadowCorner = ptPlus(appLayerCorner,shadowOffset);
   int minX = min(ptX(appLayerOrigin),ptX(shadowOrigin));
   int minY = min(ptY(appLayerOrigin),ptY(shadowOrigin));
   int maxX = max(ptX(appLayerCorner    X(shadowCorner));
   int maxY = max(ptY(appLayerCorner),ptY(shadowCorner));

   [shadowLayer origin:shadowOrigin];
   [shadowLayer corner:shadowCorner];

   myNewOrigin = pt(minX,minY);

   appLayerTranslation = ptMinus(myOrigin,myNewOrigin);

   [self origin:myNewOrigin];
   [self corner:pt(maxX,maxY)];

   /* the following translation is necessary because changing my origin
      has caused my frontLayers to be shifted, which is bad. */

   [applicationLayer moveBy:appLayerTranslation];
   [shadowLayer      moveBy:appLayerTranslation];

   return self;
  }

-(BOOL)rightButtonDown
{
[self moveFromUser];
return YES;
}

- applicationLayer:aLayer
  {
   if (applicationLayer)
      {
       [applicationLayer removeFromBackLayer];
       [applicationLayer free];
      }

   [aLayer attachTo:self];

   applicationLayer = aLayer;

   [self format];

   return self;
  }

- applicationLayer
  {
   return applicationLayer;
  }

- shadowOffset:(PT)offset
  {
```

```
  shadowOffset = offset;
  [self format];
  return self;
 }

- shadowColor: aSolidColor
 {
  return [shadowLayer insideColor:aSolidColor];
 }

- (PT)shadowOffset
 {
  return shadowOffset;
 }

- shadowColor
 {
  return [shadowLayer insideColor];
 }

/*
- (BOOL)covers: aQuad
 {
  BOOL covered;
  id myBox = [self shadowBox];
  covered = [myBox containsRect: aQuad];
  [myBox free];
  return covered;
 }

- shadowBox
 {
  PT appLayerOrigin;
  PT shadowOrigin;

  if (applicationLayer == nil)
     return nil;

  appLayerOrigin = [applicationLayer outsideOrigin];
  shadowOrigin = ptPlus (appLayerOrigin, shadowOffset);
  return [RectList origin:shadowOrigin
                  extent:[applicationLayer outsideExtent]];
 }

- (BOOL)coversList: aRectList
 {
  id arect;
  BOOL foundMismatch = NO;
  id myBox = [self shadowBox];

  for( arect = aRectList;
                   (arect != nil) && !foundMismatch; arect = [arect next])
     if (![myBox containsRect:arect])
            foundMismatch = YES;
  [myBox free];

  return foundMismatch;
 }

- paintBackground
 {
  PT appLayerOrigin;
  PT shadowOrigin;
```

```
    if (applicationLayer == nil)
       return self;

    appLayerOrigin = [applicationLayer outsideOrigin];
    shadowOrigin = ptPlus (appLayerOrigin, shadowOffset);

    [self fillWith:shadowColor at:shadowOrigin
                         size:[applicationLayer outsideExtent]];
    return self;
   }
*/
=:
/*==================== DO NOT REMOV     EDIT ============================

       This comment and the following sccsId declaration are managed
       by SCCS for you. Do not edit or remove either."

       Source file:     /users/bmw/Alpha/UserInterface/SCCS/s.BM_AskDlgBox.m
       Latest version:  1.7
       Last mod time:   07/19/89 at 10:15:40

==========================================================================*/

static char *sccsId = "@(#)BM_AskDlgBox.m rev 1.7 created on 07/19/89 at 10:15:40";

/*==================== DO NOT REMOVE OR EDIT ==========================*/

#include "objc.h"
#include "uil.h"

#include "BMWGlobal.h"

@requires CharString;


= BM_AskDialogBox : SDialogBox (BM_WorkstationMsgs,
                                   UserInterface, Collection, Primitive)
   {
    id response;
   }


   +askSTR:(STR)aQuestion defaultValue:(STR)anAnswer client:aLayer
     {
      id aQuad;

      self = [super new];

      [self addEntryLabeled:aQuestion defaultValue:anAnswer];
      [self acceptSelector:@selector(acceptResponse:) receiver:self];
      [self cancelSelector:@selector(cancel:) receiver:self];
      [self extent:[self defaultExtent]];

      aQuad = [baseLayer insideQuad];
      [[self center:[aLayer center]] translateWithin:aQuad];
      [self attachTo:baseLayer];

      [self show];
      [aQuad free];
      [self modalActivate];
      [self delete];

      return response;
     }
```

```
+askSTR:(STR)aQuestion client:aLayer
   {
    return [self askSTR:aQuestion defaultValue:"" client:aLayer];
   }



-acceptResponse:aDialogBox
   {
    response = [CharString str:[aDialogBox valueAsStrAt:0]];

     return [self modalDeactivate]
    }

 -cancel:aDialogBox
    {
     response = nil;

     return [self modalDeactivate];
    }

=:

/*===================== DO NOT REMOV     EDIT ============================

       This comment and the following sccsId declaration are managed
       by SCCS for you. Do not edit or remove either.

       Source file:     /users/bmw/Alpha/UserInterface/SCCS/s.BM_BarMenu.m
       Latest version:  1.5
       Last mod time:   05/19/89 at 09:54:45

=========================================================================*/

static char *sccsId = "@(#)BM_BarMenu.m rev 1.5 created on 05/19/89 at 09:54:45";

/*==================== DO NOT REMOVE OR EDIT ===========================*/

/*
Created for Batterymarch by LVM on September 20, 1988
to create scrolling menus.

Modified BarMenu to have scrolling sub menus.  To create
a BM_BarMenu use the message +createInterfaceFor:button:withSubMenuFor:.
The last argument specifies the size of the menus submenus.  It is the
number of items that the menu will be set up for.  If there are more than
that menu items in the logical sub menu, then the submenu is scrollable.
To scroll the submenu place the cursor in the top or bottom border.

If the number of items is specified to be -1, it will default to a non
scrollable sub menu bit enough for all items in the menu.  If the number of
items is 0, defaults to 5.

RESTRICTION:  Assumes that all items have the same height.
*/

// Include Files
#include "objc.h"
#include "uil.h"
#include "BMWGlobal.h"

// @requires
@requires BM_MenuItem;
#define BORDERWIDTH 2
```

```
// Class Variables

= BM_BarMenu: BarMenu (BM_WorkstationMsgs, UIMESSAGES)
{
// Number of items specfiying size of the submenu
short subMenuItems;
id client;
}

/* $Default Category: Interrogation $ */

/*
Creates and returns a default menu item for the receiver.  aMenu is an object
that responds to the Menu protocol.  It is an item in the logical menu of the
receiver.  The default item for BM_BarMenu is an instance of BM_MenuItem.  Ownership
of the object returned is transferred to the calling context.
*/
-defaultItemFor: aMenu {
    return [BM_MenuItem createInterfaceFor: aMenu button: [self button]
        withSubMenuFor: subMenuItems];
}

/* $Default Category: Creation $ */

/*
Creates and returns an instance of BM_BarMenu for the logical menu, aMenu.
The menu and all its submenus are formated at this time if possible.  aMenu
is expected to respond to the Menu protocol.  The menu will respond to the
LEFTBUTTON.
*/
+createInterfaceFor: aMenu {
    return [self createInterfaceFor: aMenu button: LEFTBUTTON
        withSubMenuFor: -1 ];
}

/*
Creates and returns an instance of BM_BarMenu for the logical menu aMenu. aMenu
must respond to the Menu protocol.  The receiver formats its menu at this
time.  The receiver's menu will respond to the aButton.  aButton is expected
to be one of: LEFTBUTTON, MIDDLEBUTTON, or RIGHTBUTTON.
*/
+createInterfaceFor: aMenu button: (BUTTON)aButton {
    return [self createInterfaceFor: aMenu button: aButton
        withSubMenuFor: -1 ];
}

/*
Create and returns an instance of BM_BarMenu for aLogicalMenu that
has scrolling submenus with a maximum of numItemsin the submenus.
*/
+createInterfaceFor: aLogicalMenu button: (BUTTON)aButton
    withSubMenuFor: (short)numItems {
    self = [self new];
    [self borderWidth: BORDERWIDTH];
    if ( numItems != 0 )
        [self subMenuItems: numItems];

    [self menu: aLogicalMenu];
    // Format the menu
    [self button: aButton];

    return self;
}
```

```
/*
Create and return an instance of BM_BarMenu for aMenu with
numItems.
*/
+createInterfaceFor: aMenu withSubMenuFor: (short)numItems{
    return [self createInterfaceFor: aMenu button: LEFTBUTTON
        withSubMenuFor: numItems ];
}


+createInterfaceFor: aMenu button:aButton withSubMenuFor: (short)numItems client:aLayer
    {
    id aBarMenu;

    aBarMenu = [self createInterfaceFor: aMenu button: aButton
        withSubMenuFor: numItems ];
    [aBarMenu client:aLayer];
    return aBarMenu;
    }


+createInterfaceFor:aMenu client:aLayer
    {
    id aBarMenu;
    aBarMenu = [self createInterfaceFor:aMenu];
    [aBarMenu client: aLayer];
    return aBarMenu;
    }


-client:aLayer
    {
    client = aLayer;
    return self;
    }


-client
    {
    return client;
    }


-activate
    {
    if (client) [client updateMenu];
    return [super activate];
    }


/* $Default Category: Initialization $ */

/*
Initialize the receiver.  Sets up default number of items in the submenus.
*/
-initialize {
    [super initialize];
```

```
    // Should also reformat for new number of subItems
    subMenuItems = 5;
    client = nil;
    return self;
}

/* $Default Category: Interrogation and Setting $ */

/*
Set the number of sub menu items to numItems.  Returns self.
*/
-subMenuItems: (short)numItems {
    subMenuItems = numItems;
    return self;
}

/*
Return the number of items in the submenu.  Returns self.
*/
-(short)subMenuItems {
    return subMenuItems;
}

=:

/*===================== DO NOT REMOVE    EDIT ============================

        This comment and the following sccsId declaration are managed
        by SCCS for you. Do not edit or remove either.

        Source file:     /users/bmw/Alpha/UserInterface/SCCS/s.BM_ChoiceDB.m
        Latest version:  1.7
        Last mod time:   07/19/89 at 10:15:51

======================================================================*/

static char *sccsId = "@(#)BM_ChoiceDB.m rev 1.7 created on 07/19/89 at 10:15:51";

/*===================== DO NOT REMOVE OR EDIT ==========================*/



#include "objc.h"
#include "uil.h"

#include "BMWGlobal.h"

@requires CharString;


= BM_ChoiceDialogBox : SDialogBox (BM_WorkstationMsgs,
                                   UserInterface, Collection, Primitive)
  {
   unsigned response;
  }


  +(unsigned)askChoiceUsingSTR:(STR)aQuestion client:aLayer
    {
     id aQuad;

     self = [super new];

     [self addStaticLabel:aQuestion];
```

```
    [self acceptSelector:@selector(button1:) receiver:self];
    [self cancelSelector:@selector(button0:) receiver:self];
    [self extent:[self defaultExtent]];

    aQuad = [baseLayer insideQuad];
    [[self center:[aLayer center]] translateWithin:aQuad];
    [self attachTo:baseLayer];

    [self show];
    [aQuad free];
    [self modalActivate];
    [self delete];

    return response;
  }
+(unsigned)askChoiceUsingSTR:(STR)aQuestion client:aLayer
                          button0STR:(STR)button0STR
                          button1STR:(STR)button1STR
  {
    id aQuad;

    self = [super new];

    [self addStaticLabel:aQuestion];
    cancelPushButton = nil;

    [acceptButton assignSTR:button1STR];
    [acceptButton width:80];

    [cancelButton assignSTR:button0STR];
    [cancelButton width:80];

    [self acceptSelector:@selector(button1:) receiver:self];
    [self cancelSelector:@selector(button0:) receiver:self];

    [self extent:[self defaultExtent]];
    aQuad = [baseLayer insideQuad];
    [[self center:[aLayer center]] translateWithin:aQuad];
    [self attachTo:baseLayer];

    [self show];
    [aQuad free];
    [self modalActivate];

    [self delete];

    return response;
  }


-button0:aDialogBox
  {
    response = 0;

    return [self modalDeactivate];
  }

-button1:aDialogBox
  {
    response = 1;

    return [self modalDeactivate];
  }


=:
```

```
/*==================== DO NOT REMOVE   EDIT ============================

      This comment and the following sccsId declaration are managed
      by SCCS for you. Do not edit or remove either.*

      Source file:     /users/bmw/Alpha/UserInterface/SCCS/s.BM_DialogBox.m
      Latest version:  1.10
      Last mod time:   08/31/89 at 13:02:03

========================================================================*/

static char *sccsId = "@(#)BM_DialogBox.m rev 1.10 created on 08/31/89 at 13:02:03";

/*==================== DO NOT REMOVE OR EDIT ==========================*/


#include "objc.h"
#include "uil.h"

#include "BMWGlobal.h"


@requires EventQ,Button3D;


= BM_DialogBox:RidgeLayer(BM_WorkstationMsgs,UIMESSAGES)
  {
   id acceptButton;
   id cancelButton;

   id defaultPushButton;
   id cancelPushButton;

   BOOL keepControl;
  }


  -initialize
   {
    defaultPushButton = nil;
    cancelPushButton  = nil;

    return [super initialize];
   }


  -format
   {
    return self;
   }


  -extent:(PT)anExtent
   {
    [super extent:anExtent];

    [self format];

    return self;
   }


  -defaultPushButton:aButton
   {
    defaultPushButton = aButton;
```

```
  return self;
 }

-cancelPushButton:aButton
 {
  cancelPushButton = aButton;
  return self;
 }

-carriageReturn
 {
  [defaultPushButton on];
 }

-escape
 {
  [cancelPushButton on];
 }

-tab:currentFocus
 {
  unsigned index, count;
  id layer;

  index = [[self frontLayers] offsetOf:currentFocus];

  if (index == NOTFOUND)
     index = 0;
  else
     [currentFocus deactivate];

  for (count = 0; count < [frontLayers size]; count++)
    {
     layer = [frontLayers at:(index+1+count)%[frontLayers size]];

     if ([layer respondsTo:@selector(activate)])
        {
         [layer activate];
         break;
        }
    }

  return self;
 }

-activate
  {
   return [self tab:nil];
  }


-modalActivate
  {
   [self activate];

   keepControl = YES;

   while(keepControl)
     {
      do
        {
         [EventQ readEvent];

         switch (event.code)
           {
```

```
            case LEFTBUTTONDOW    NT:
            case MIDDLEBUTTONDOWNEVENT:
            case RIGHTBUTTONDOWNEVENT:
                if (![self containsPt:event.origin])
                  {
                   [self erase];
                   [self show];
                   break;
                  }
            default:
                if ((event.code != KEYBOARDEVENT) ||
                    (keyboardFocusLayer == nil) ||
                    (![keyboardFocusLayer processEvent]))
                   if (![self processEvent])
                      [self perform: event.selector];
            }
        }
     while([EventQ eventReady]);
    }

 return self;
}


-modalDeactivate
  {
   keepControl = NO;
   return self;
  }



-acceptButton
  {
   return acceptButton;
  }

-defaultAcceptButton
  {
   id button;

   button = [[Button3D str:"Ok"] extent:pt(BTNWIDTH,BTNHEIGHT)];
   [button offColor:colors.Green];
   [button onColor:BM_colors.ButtonOff];
   [button onSelector:@selector(off) onReceiver:button
      onArgument: nil];
   return button;
  }



-cancelButton
  {
   return cancelButton;
  }



-defaultCancelButton
  {
   id button;

   button = [[Button3D str:"Cancel"] extent:pt(BTNWIDTH,BTNHEIGHT)];
   [button onSelector:@selector(off) onReceiver: button
```

```
        onArgument: nil];
    [button offColor:colors.Red];
    [button onColor:BM_colors.ButtonOff];
    return button;
    }


-acceptSelector: (SEL)aSelector receiver: anObject
    {
     [acceptButton offSelector: aSelector offReceiver: anObject
        offArgument: self];
     return self;
    }


-cancelSelector: (SEL)aSelector receiver: anObject
    {
     [cancelButton offSelector: aSelector offReceiver: anObject
        offArgument: self];
     return self;
    }

=:
/*===================== DO NOT REMOVE    EDIT ==============================

        This comment and the following sccsId declaration are managed
        by SCCS for you. Do not edit or remove either.

        Source file:     /users/bmw/Alpha/UserInterface/SCCS/s.BM_EditLayer.m
        Latest version:  1.2
        Last mod time:   05/01/89 at 17:29:05

=======================================================================*/

static char *sccsId = "@(#)BM_EditLayer.m rev 1.2 created on 05/01/89 at 17:29:05";

/*===================== DO NOT REMOVE OR EDIT ===========================*/

#include "objc.h"
#include "uil.h"


@requires BitMap, BM_StringEdit, BM_GFXLayer, Sequence, Quad, DispText,
          BM_Printer, StringLayer;

= BM_EditLayer : BM_BorderLayer (BM_WorkstationMsgs, UserInterface,
                              Collection, Primitive)

    {
     PT insertionPoint;
     PT extentOfLastLayerAdded;
     id currentFont,
        currentColor;
     id currentlyActiveLayer;

     BOOL selectionEnabled;

     id document;
    }

    -deleteLayer: aLayer
       {
        [aLayer delete];
```

```
  /* move other layers up */

  return self;
 }

-insertLayer: aNewLayer at: (PT)aPoint
 {
  /* move other layers down */

  [aNewLayer attachTo:self at:aPoint];
  [aNewLayer setVisible:YES];
/*
  if ([self visible])
     [self changed:@selector (maxContentsArea)];
*/
  return aNewLayer;
 }

-insertLayer: aLayer
 {
  extentOfLastLayerAdded = [aLayer outsideExtent];

  [self insertLayer:aLayer at:insertionPoint];

  insertionPoint = ptPlus (insertionPoint, pt(ptX(extentOfLastLayerAdded),0));
  return aLayer;
 }

-insertDispObject:aDispObject
 {
  PT extentOfEditWindow = [self extent];

  insertionPoint = [aDispObject origin];

  if ([aDispObject isKindOf:(SHR)DispText])
     {
      id aStringEdit = [[BM_StringEdit dispText:aDispObject]
                                insideColor:insideColor];
      [self insertLayer:aStringEdit];
     }
  else
     if ([aDispObject isKindOf:(SHR)BitMap])
        {
         id aBMGFXLayer = [[BM_GFXLayer extent:[aDispObject extent]]
                                 retainedBitMap:aDispObject];

         [self insertLayer:aBMGFXLayer];
        }
         /*
     else
        /* handle intelligently */


  return self;
 }

-insertSTR: (STR) textString
 {
  id aDispText = [DispText str:textString
                         font:currentFont
                        color:currentColor];
```

```
  [aDispText origin:insertionPoint];

  [self insertDispObject:aDispText];

  return self;
 }

-insertDoc: aDocument
 {
  id dispObject,
     sequence = [[aDocument contents] eachElement];

  PT originalInsertionPoint = insertionPoint;

  while (dispObject = [sequence next])
     {
      id insertedObject = [dispObject copy];
      PT objectOrigin   = [insertedObject origin];

      [insertedObject origin:ptPlus(objectOrigin, originalInsertionPoint)];

      [self insertDispObject:insertedObject];

      [self format];
     }

  [sequence free];

  return self;
 }

-displayDoc: aDocument
 {
  id dispObject,
     sequence;
  PT myOrigin = [self origin];

  if (document != nil)
     [document free];

  [self reset];

  document = aDocument;

  sequence = [[document contents] eachElement];

  while (dispObject = [sequence next])
     {
      insertionPoint = [dispObject origin];
      [self adjustInsertionPoint:[dispObject extent]];
      [self format];
     }

  [sequence free];

  return [self display];
 }

-adjustInsertionPoint: (PT) insertionPointDelta
 {
  insertionPoint = ptPlus (insertionPoint, insertionPointDelta);
```

```
  return self;
  }

-currentColor: aSolidColor
  {
   return (currentColor = aSolidColor);
  }

-carriageReturn
  {
   insertionPoint = pt (0, ptY (insertionPoint) +
                            ptY (extentOfLastLayerAdded));
   return self;
  }

-format
  {
   PT currentExtent = [self extent];

   [self extent:pt(max(ptX(currentExtent), ptX(insertionPoint)),
                  max(ptY(currentExtent), ptY(insertionPoint)))];

   if ([self visible])
      [self changed:@selector (maxContentsArea)];

   return self;
  }

-(BOOL)keyboardEvent
  {
   if (currentlyActiveLayer != nil)
      if (![currentlyActiveLayer processKey])
         {
         }
   return YES;
  }

-(BOOL)leftButtonDown
  {
   id   sequence = [frontLayers eachElement];
   id   layer;

   if (currentlyActiveLayer != nil)
      [currentlyActiveLayer deactivate];

   currentlyActiveLayer=[[self frontLayerContaining:event.origin] activate];

   while (layer = [sequence next])
      if (layer != currentlyActiveLayer)
         {
          [layer unHighlight];
          [layer repaint];
         }

   [sequence free];

   return YES;
  }

-(BOOL)middleButtonDown
  {
   BOOL firstLayerInSelectedBlockFound = FALSE;
```

```
id   sequence = [frontLayers eachElement];
id   endOfSelectedBlock = [self frontLayerContaining:event.origin];
id   layer;

while (layer = [sequence next])
   {
    if ((!firstLayerInSelectedBlockFound) &&
        ((layer==currentlyActiveLayer) || (layer==endOfSelectedBlock)))
       {
        [layer highlight];
        [layer repaint];
        firstLayerInSelectedBlockFound = TRUE;
       }
    else
       if (firstLayerInSelectedBlockFound)
          {
           [layer highlight];
           [layer repaint];
           if ((layer==currentlyActiveLayer) ||
               (layer==endOfSelectedBlock))
           break;
          }
   }

 [sequence free];

 return YES;
}



/** This code is an attempt at a more efficient scrolling scheme; too bad it
    doesn't work.

  -scrollContents: (PT) originDelta
     {
      currentExtent = [self extent],
      frontLayerOrigin;
    id sequence,
      bitmap,
      cliplist,
      layer;

    insertionPoint = ptPlus (insertionPoint, originDelta);

    bitmap = [BitMap fromDisplay:[Quad origin:currentOrigin
                                      extent:currentExtent]];
    [self display:bitmap at:originDelta clipBy:[self insideClipList]];
    [bitmap free];

    cliplist = [self displayBox];

    cliplist = [cliplist subtract:[Quad
                                   origin:ptPlus (currentOrigin, originDelta)
                                   extent:currentExtent]];

    sequence = [frontLayers eachElement];

    while (layer = [sequence next])
       {
        frontLayerOrigin = [layer origin];
        [layer origin:ptPlus(frontLayerOrigin, originDelta)];
```

```
        }

        [sequence free];

        [self repaint:cliplist];

        [cliplist free];

        return self;
      }

    -paintBackground
      {
       id layer,
          cliplist = [[self clipList] copyList],
          sequence = [[self frontLayers] eachElement];

       while ((layer = [sequence next]) != nil)
          cliplist = [cliplist subtract:[Quad origin:[layer outsideOrigin]
                                        extent:[layer outsideExtent]]];

       [sequence free];

       [self fillWith:[self insideColor] at:[self origin] size:[self extent]
                                        rule:GXcopy clipBy:cliplist];

       [cliplist free];

       return self;
      }

**/



   -(PT)increaseUnitSize
     {
      return pt([currentFont widthOf:"n"], [currentFont height]);
     }

   -(PT)decreaseUnitSize
     {
      return pt([currentFont widthOf:"n"], [currentFont height]);
     }

   -displayLayer
     {
      if (document != nil)
         [document displayOn:self];
      else
         [super displayLayer];

      return self;
     }

   -printOn:(STR)fileName  deviceType:(STR)deviceType
     {
      id printer;

      if ((document != nil) && ((printer = [BM_Printer new:fileName]) != nil))
        {
         [document displayOn:printer];
```

```
      [printer free];
      }

    return self;
   }

-reset
   {
    [self freeFrontLayers];

    insertionPoint = pt (0, 0);

    currentFont  = fonts.standard;
    currentColor = colors.White;

    currentlyActiveLayer = nil;

    selectionEnabled = YES;

    document = nil;
   }

 -initialize
   {
    [super initialize];

    [self reset];

    return self;
   }
=:

/*===================== DO NOT REMOVE    EDIT ==============================

        This comment and the following sccsId declaration are managed
        by SCCS for you. Do not edit or remove either.

        Source file:     /users/bmw/Alpha/UserInterface/SCCS/s.BM_ExtEBox.m
        Latest version:  1.2
        Last mod time:   07/14/89 at 14:06:38

=========================================================================*/

static char *sccsId = "@(#)BM_ExtEBox.m rev 1.2 created on 07/14/89 at 14:06:38";

/*===================== DO NOT REMOVE OR EDIT ============================*/

#include "objc.h"
#include "uil.h"

@requires EventQ;

= ExtEBox:EchoBox(BM_WorkstationMsgs,UIMESSAGES)
  {
  }

/*
Leaves the origin of the receiver fixed and tracks the corner of the receiver
with the cursor in the horizontal direction while none of the mouse buttons
changes.  When a mouse button
changes state, sets the size of the receiver to the size indicated by the user.
This has the effect of a "rubberbox".  Returns self.
```

```
*/
- sizeRightFromUser
 {
 id oldCursor;
 PT op, cp;
 short height;


 height = [self height];
 [self show];
 do {
    [self extent: pt(X(event.origin)-X(origin)+1, height)];
    }
 while
    (![EventQ anyButtonChanged] && event.code != TIMEOUTEVENT);
 [self erase];
 op = [self origin];
 cp = [self corner];
 [self origin: pt(min(X(op),X(cp)), min(Y(op),Y(cp)))];
 [self corner: pt(max(X(op),X(cp)), max(Y(op),Y(cp)))];
 return self;
 }



- sizeLeftFromUser
 {
 id oldCursor;
 PT op, cp, myCorner;
 short height, xCorner;

 myCorner = [self bottomRight];
 xCorner = X(myCorner);

 height = [self height];
 [self show];
 do {
    [self extent: pt(xCorner-X(event.origin)+1, height)];
    [self origin:pt(X(event.origin)-1,Y(origin))];
    }
 while
    (![EventQ anyButtonChanged] && event.code != TIMEOUTEVENT);
 [self erase];
 op = [self origin];
 cp = [self corner];
 [self origin: pt(min(X(op),X(cp)), min(Y(op),Y(cp)))];
 [self corner: pt(max(X(op),X(cp)), max(Y(op),Y(cp)))];
 return self;
 }



/*
Leaves the origin of the receiver fixed and tracks the corner of the receiver
with the cursor in the vertical direction while none of the mouse buttons
changes.  When a mouse button
changes state, sets the size of the receiver to the size indicated by the user.
This has the effect of a "rubberbox".  Returns self.
```

```
*/
- sizeBottomFromUser
  {
  id oldCursor;
  PT op, cp;
  short width;

  width = [self width];
  [self show];
  do
    {
    [self extent: pt(width,Y(event.origin)-Y(origin)+1)];
    }
  while
    (![EventQ anyButtonChanged] && event.code != TIMEOUTEVENT);
  [self erase];
  op = [self origin];
  cp = [self corner];
  [self origin: pt(min(X(op),X(cp)), min(Y(op),Y(cp)))];
  [self corner: pt(max(X(op),X(cp)), max(Y(op),Y(cp)))];
  return self;
  }



- sizeTopFromUser
  {
  id oldCursor;
  PT op, cp, myCorner;
  short width, yCorner;

  myCorner = [self corner];
  yCorner = Y(myCorner);

  width = [self width];
  [self show];
  do
     {
     [self extent:pt(width, yCorner-Y[illegible]nt.origin)+1)];
     [self origin:pt(X(origin),(Y(event.origin)-1))];
     }
  while
     (![EventQ anyButtonChanged] && event.code != TIMEOUTEVENT);
  [self erase];
  op = [self origin];
  cp = [self corner];
  [self origin: pt(min(X(op),X(cp)), min(Y(op),Y(cp)))];
  [self corner: pt(max(X(op),X(cp)), max(Y(op),Y(cp)))];
  return self;
  }



- sizeTopLeftFromUser
  {
  id oldCursor;
  PT op, cp, myCorner;
  short xCorner, yCorner;
```

```
    myCorner = [self corner];
    xCorner = X(myCorner);
    yCorner = Y(myCorner);

    [self show];
    do {
       [self extent:pt(xCorner-X(event.origin)+1, yCorner-Y(event.origin)+1)];
       [self origin:pt(X(event.origin),Y(event.origin))];
       }
    while
       (![EventQ anyButtonChanged] && event.code != TIMEOUTEVENT);

    [self erase];
    op = [self origin];
    cp = [self corner];
    [self origin: pt(min(X(op),X(cp)), min(Y(op),Y(cp)))];
    [self corner: pt(max(X(op),X(cp)), max(Y(op),Y(cp)))];


    return self;
    }


- sizeTopRightFromUser
    {
    id oldCursor;
    PT op, cp, myCorner;
    short yCorner;

    myCorner = [self corner];
    yCorner = Y(myCorner);

    [self show];
    do {
       [self extent:pt(X(event.origin)-X(origin)+1, yCorner-Y(event.origin)+1)];
       [self top:Y(event.origin)];
       }
    while
       (![EventQ anyButtonChanged] && event.code != TIMEOUTEVENT);

    [self erase];
    op = [self origin];
    cp = [self corner];
    [self origin: pt(min(X(op),X(cp)), min(Y(op),Y(cp)))];
    [self corner: pt(max(X(op),X(cp)),    :Y(op),Y(cp)))];

    return self;
    }


- sizeBottomLeftFromUser
    {
    id oldCursor;
    PT op, cp, myCorner;
    short xCorner;

    myCorner = [self bottomRight];
    xCorner = X(myCorner);

    [self show];
    do {
```

```
  [self extent:pt(xCorner-X(event.origin)+1, Y(event.origin)-Y(origin)+1)];
  [self left:X(event.origin)];
  }
while
  (![EventQ anyButtonChanged] && event.code != TIMEOUTEVENT);

[self erase];
op = [self origin];
cp = [self corner];
[self origin: pt(min(X(op),X(cp)), min(Y(op),Y(cp)))];
[self corner: pt(max(X(op),X(cp)), max(Y(op),Y(cp)))];

return self;
}



- sizeBottomRightFromUser
 {
 return [super sizeFromUser];
 }


=:
/*===================== DO NOT REMOVE    EDIT ==============================

        This comment and the following sccsId declaration are managed
        by SCCS for you. Do not edit or remove either.

        Source file:     /users/bmw/Alpha/UserInterface/SCCS/s.BM_GFXLayer.m
        Latest version:  1.8
        Last mod time:   09/13/89 at 12:34:21

========================================================================*/

static char *sccsId = "@(#)BM_GFXLayer.m rev 1.8 created on 09/13/89 at 12:34:21";

/*===================== DO NOT REMOVE OR EDIT ===========================*/

#include "objc.h"
#include "uil.h"


#include "BMWGlobal.h"
#include "BMGFXInterf.h"


@requires BitMap, Quad, Cursor, Menu, PopUpMenu;

= BM_GFXLayer : InsetLayer (BM_WorkstationMsgs, UserInterface,
                                           Collection, Primitive )

    {
     id retainedBitMap;
     PT retainedBitMapExtent;
     PT currentBitMapOrigin;

     id cursor;

     double preferredAspectRatio;

     id popUpMenu, menu;
    }
```

```
-preferredAspectRatio:(double)aRatio
  {
   preferredAspectRatio = aRatio;

   return self;
  }


-height:(short)aHeight
  {
   return [self extent:pt((short)(aHeight/preferredAspectRatio),aHeight)];
  }


-width:(short)aWidth
  {
   return [self extent:pt(aWidth,(short)(aWidth*preferredAspectRatio))];
  }


-(BOOL)leftButtonDown
  {
   [popUpMenu activateAt:event.origin];

   return YES;
  }

-print
  {
   return self;
  }


-save
  {
   return self;
  }


-initialize
  {
   [super initialize];

   [self borderWidth:1];

   retainedBitMap = nil;

   preferredAspectRatio = 1.0;

   cursor = cursors.Normal;
/*
   menu = [Menu str:"Chart Menu"];
   [menu append:[Menu str:"Print" selector:@selector(print)
                                   receiver:self]];
   [menu append:[Menu str:"Save" selector:@selector(save)
                                   receiver:self]];
   popUpMenu = [PopUpMenu createInterfaceFor:menu];
*/
   menu = popUpMenu = nil;

   return self;
  }
```

```
-terminate$
  {
   /* [self retainedBitMap:nil]; */

   [menu free];
   [popUpMenu free];

   return [super terminate$];
  }



#if 0


  -insideClipList
    {
     id outsideClipList = [[self clipList] copyList];

     return[outsideClipList subtractAreaOutside:[Quad origin:[self origin]
                                                  extent:[self extent]]];


    }


  -retainedBitMap
    {
     if (retainedBitMap == nil)
        [[self snapshot] fillWith:BM_colors.Border];
     return retainedBitMap;
    }

  -retainedBitMap: aNewBitMap
    {
     if (retainedBitMap != nil)
        [retainedBitMap free];

     retainedBitMap = aNewBitMap;

     currentBitMapOrigin  = pt(0,0);

     if (retainedBitMap != nil)
        retainedBitMapExtent = [retainedBitMap extent];
     else
        retainedBitMapExtent = pt(0,0);

     [self changed: @selector (maxContentsArea)];

     return self;
    }


  -refresh
    {
     id insideClipList = [self insideClipList];

     [self display:retainedBitMap at:currentBitMapOrigin
                                                  clipBy:insideClipList];

     [insideClipList free];

     return self;
    }
```

```
-snapshot
  {
   if (retainedBitMap != nil)
      retainedBitMap = [retainedBitMap free];

   currentBitMapOrigin  = pt (0,0);
   retainedBitMapExtent = [self extent];

   retainedBitMap = [BitMap fromDisplay:[Quad
                        origin:[self origin] extent:retainedBitMapExtent]];

   [self changed: @selector (maxContentsArea)];

   return retainedBitMap;
  }


-displayLayer
  {
#ifndef XWIN
   if (retainedBitMap == nil)
      [super displayLayer];
   else
      [self refresh];
#endif

#ifdef XWIN
   [super displayLayer];
#endif

   return self;
  }


-maxContentsArea
  {
   return [Quad origin:currentBitMapOrigin extent:retainedBitMapExtent];
  }

-(PT)contentsStart
  {
   return (currentBitMapOrigin);
  }

-scrollContents:(PT)originDelta
  {
   currentBitMapOrigin = ptPlus (currentBitMapOrigin, originDelta);
   return [self displayLayer];
  }

-extent:(PT)newExtent
  {
   currentBitMapOrigin = pt(0,0);
   [super extent:newExtent];
   [self changed: @selector (extent)];
   return self;
  }

#endif


=:
```

```
/*==================== DO NOT REMOVI    EDIT ============================

      This comment and the following sccsId declaration are managed
      by SCCS for you. Do not edit or remove either.

      Source file:     /users/bmw/Alpha/UserInterface/SCCS/s.BM_LabelVal.m
      Latest version:  1.2
      Last mod time:   03/02/89 at 20:39:06

=====================================================================*/

static char *sccsId = "@(#)BM_LabelVal.m rev 1.2 created on 03/02/89 at 20:39:06";

/*==================== DO NOT REMOVE OR EDIT ===========================*/


#include "objc.h"
#include "uil.h"


= BM_LabelValue: LabelValue (BM_WorkstationMsgs, UIMESSAGES)
{
}

   -carriageReturn
     {
      if ([[self backLayer] respondsTo:@selector(carriageReturn)])
         [[self backLayer] carriageReturn];

      return self;
     }

   -tab:currentFocus
     {
      if ([[self backLayer] respondsTo:@selector(tab:)])
         [[self backLayer] tab:self];

      return self;
     }

   -escape
     {
      if ([[self backLayer] respondsTo:@selector(escape)])
         [[self backLayer] escape];

      return self;
     }

   -activate
     {
      return [[self value] activate];
     }

   -deactivate
     {
      return [[self value] deactivate];
     }

=:
```

```
/*==================== DO NOT REMOVE   EDIT ============================

       This comment and the following sccsId declaration are managed
       by SCCS for you. Do not edit or remove either.

       Source file:     /users/bmw/Alpha/UserInterface/SCCS/s.BM_Menu.m
       Latest version:  1.4
       Last mod time:   09/11/89 at 19:37:12

=======================================================================*/

static char *sccsId = "@(#)BM_Menu.m rev 1.4 created on 09/11/89 at 19:37:12";

/*==================== DO NOT REMOVE OR EDIT ==========================*/

#include "objc.h"
#include "uil.h"

#include "BMWGlobal.h"


= BM_Menu: Menu (BM_WorkstationMsgs, UserInterface, Collection, Primitive)
  {
   id myOwner;
  }

  +stdMenu: (STR)menuTitle  owner:someOne
    {
     self = [super str:menuTitle];

     [self append:[[[Menu str:"List"]   receiver:self]
                                        selector:@selector(view)]];
     [self append:[[[Menu str:"Histogram"]  receiver:self]
                                        selector:@selector(graph)]];
     [self append:[[[Menu str:"Line Plot"] receiver:self]
                                        selector:@selector(linePlot)]];
     [self append:[[[Menu str:"Column Plot"] receiver:self]
                                        selector:@selector(barPlot)]];
     [self append:[[[Menu str:"Pie Plot"] receiver:self]
                                        selector:@selector(piePlot)]];
     myOwner = someOne;

     return self;
    }


 +stdMenu2:(STR)menuTitle   owner:someOne              // temporary solution to display Universe
   {
    self = [super str:menuTitle];

    [self append:[[[Menu str:"Current Universe"]   receiver:self]
                                       selector:@selector(dispUniverse)]];
    myOwner = someOne;

    return self;
   }



-dispUniverse
  {
   return [[myOwner backLayer] displayUniverse];
  }
```

```
-expand
  {
   return self;
//   return [myOwner expand];
  }

-view
  {
   return [myOwner view];
  }

-print
  {
     return self;
//     return [myOwner printOn:[[stringTable defaultPrinterPath] str]
//             deviceType:[[stringTable defaultPrinterType] str]];
  }

-graph
  {
   return [myOwner graph];
  }

-linePlot
  {
   return [myOwner linePlot];
  }

-barPlot
  {
   return [myOwner barPlot];
  }

-piePlot
  {
   return [myOwner piePlot];
  }

-owner:anObject
  {
   myOwner = anObject;
  }

/*===================== DO NOT REMOVE    EDIT ============================

      This comment and the following sccsId declaration are managed
      by SCCS for you. Do not edit or remove either.

      Source file:    %F%
      Latest version: %I%
      Last mod time:  %H% at %U%

========================================================================*/

static char *sccsId = "%Z%%M% rev %I% created on %H% at %U%";

/*===================== DO NOT REMOVE OR EDIT ==========================*/

/*
Modified for Batterymarch by LVM on September 20, 1988
to create scrolling menus.

This class creates scrolling submenus.  It is used by
BM_BarMenu.
```

```
*/
#include "objc.h"
#include "uil.h"

// @requires
@requires BM_SRMenu;

= BM_MenuItem:MenuItem (BM_WorkstationMsgs, UIMESSAGES)
{
// the number of items in the scrolling submenu
// -1 means use all items in the menu
// 0 means use the default of five items
short subMenuItems;
}

/* $Default Category: Creation $ */

/*
Create and return an instance of BM_MenuItem.
*/
+createInterfaceFor: aMenu button: (BUTTON)aButton {
    return [self createInterfaceFor: aMenu button: aButton
       withSubMenuFor: -1];
}

/*
Create and return an instance of BM_MenuItem for aMenu
that responds to aButton.  numItems specifies how may items
will show in the submenu if there is a submenu.  If numItems
is 0, there will be 5 items;  if numItems is -1, it defaults
to showing all the items as in the regular 201 submenus.  If
there are less than numItems in the submenu, the submenu will
show all the items and will not be scrollable.

To scroll a scrollable submenu, place the cursor in the top
or bottom border of the submenu.
*/
+createInterfaceFor: aMenu button: (BUTTON)aButton
    withSubMenuFor: (short)numItems {
    self = [super new];
    if (numItems != 0 )
        subMenuItems = numItems;
    [self menu: aMenu];
    [self defaultFormat];
    if (subMenu)
        [subMenu button: aButton];
    return self;
}

/* $Default Category: Initialization $ */

/*
Initializes the receiver.  Initializes to have 5 items.  It there are
more than five items in the menu, it will be scrollable.  Returns self.
*/
-initialize {
    [super initialize];
    subMenuItems = 5;
    return self;
}
```

```
/*
Formats and returns an instance of the default submenu for the receiver.
BM_ScrollingItem defaults to an instance of BM_ScrlSMenu for its submenu.
Ownership of the object returned is passed to the calling context.
BM_ScrlSMenu is Scrolling Sub Menu.
*/
-defaultSubMenu {
    return [BM_SRMenu createInterfaceFor: [self menu] button: [self button]
        numItems: subMenuItems];
}

=:

/*===================== DO NOT REMOVE    EDIT ============================

        This comment and the following sccsId declaration are managed
        by SCCS for you. Do not edit or remove either.

        Source file:     /users/bmw/Alpha/UserInterface/SCCS/s.BM_PCLPrintr.m
        Latest version:  1.10
        Last mod time:   08/27/89 at 16:54:34

=========================================================================*/

static char *sccsId = "@(#)BM_PCLPrintr.m rev 1.10 created on 08/27/89 at 16:54:34";

/*===================== DO NOT REMOVE OR EDIT ===========================*/


#include "objc.h"
#include "uil.h"
#include "site.h"

#include <string.h>
#include <stdio.h>

#define MILLIMETERS_PER_INCH 25.641026

@requires Quad;

= BM_PCLPrinter: BM_Printer (BM_WorkstationMsgs,
                             UserInterface, Collection, Primitive)

    {
     PT    translationPT;
     short foregroundColor;
    }


 + forQuad:aQuad foregroundColor:(short)aColorIndex
    {
     id tempQuad;
     PT offset, defaultExtent;
 int x,y;

     self = [super new];

     [self origin:pt(0,0)];

     foregroundColor = aColorIndex;

     fprintf (deviceId, "\033E");

     defaultExtent = [self defaultExtent];
```

```
    if ([aQuad width] > ptX(defaultExtent))
       {
        fprintf (deviceId, "\033&l1O");
        [self extent:pt(ptY(defaultExtent),ptX(defaultExtent))];
       }
    else
       {
        fprintf (deviceId, "\033&l0O");
        [self extent:defaultExtent];
       }

    fprintf (deviceId, "\033(0U");

    fprintf (deviceId, "\033&l0E");
    fprintf (deviceId, "\033&l0L");

    translationPT = [aQuad origin];

    tempQuad = [Quad withBounds:aQuad];
    [tempQuad center:[self center]];
    offset = [tempQuad origin];
x=ptX(offset);
y=ptY(offset);

    [tempQuad free];

    translationPT = ptMinus(translationPT,offset);

    return self;
   }


+ new
   {
    self = [super new];

    fprintf (deviceId, "\033E");

    fprintf (deviceId, "\033&s0C");

    fprintf (deviceId, "\033&k2G");

    return self;
   }


-(int)dotsPerInch
   {
    return 300;
   }


-(int)pageWidthInDots
   {
    return 2400;
   }


-(int)pageHeightInDots
   {
    return 3180;
   }
```

```
-(double)horizontalDotsPerPixel
  {
   double pixelsPerInch = BM_XDisplayWidth() /
                          (double)(BM_XDisplayWidthMM()/MILLIMETERS_PER_INCH);

   return [self dotsPerInch]/pixelsPerInch;
  }


-(double)verticalDotsPerPixel
  {
   double pixelsPerInch = BM_XDisplayHeight() /
                          (double)(BM_XDisplayHeightMM()/MILLIMETERS_PER_INCH);

   return [self dotsPerInch]/pixelsPerInch;
  }
-(PT)defaultExtent
  {
   int x = [self pageWidthInDots] /[self horizontalDotsPerPixel];
   int y = [self pageHeightInDots]/[self verticalDotsPerPixel];

   return pt(x,y);
  }


- terminate$
  {
   if (deviceId)
      fprintf (deviceId, "\033E");

   return [super terminate$];
  }


- positionCursorAt:(PT)aPoint
  {
int y,x;
   if (deviceId)
     {
      fprintf (deviceId, "\033*p%dY",
        y=(int)(ptY(aPoint)-ptY(translationPT))*[self verticalDotsPerPixel]);
      fprintf (deviceId, "\033*p%dX",
      x=(int)(ptX(aPoint)-ptX(translationPT))*[self horizontalDotsPerPixel]);
     }

   return self;
  }


- pageBreak
  {
   if (deviceId)
      fprintf (deviceId, "\014");

   return self;
  }


- drawLineFrom:(PT)pt1 to:(PT)pt2 colorIndex:(short)aColorIndex lineType:(short)aType
                                                  rule:(RULE)aRule clipBy:aClipList

  {
   if ((deviceId) && (aColorIndex == foregroundColor))
     {
     }
```

```
    return self;
  }


- fillColorIndex:(short)aColorIndex at:(PT)aPoint size:(PT)aSize
          rule:(RULE)aRule clipBy:aClipList
  {
    if ((deviceId) && (aColorIndex == foregroundColor))
      {
int x,y;
       [self positionCursorAt:aPoint];

       fprintf (deviceId, "\033*c%dA",
                          x=(int)(ptX(aSize)*[self horizontalDotsPerPixel]));
       fprintf (deviceId, "\033*c%dB",
                           y=(int)(ptY(aSize)*[self verticalDotsPerPixel]));

       fprintf (deviceId, "\033*c0P");
      }

    return self;
  }


- textWrite:(STR)aString length:(short) aLength at:(PT)aPoint
      font:aFont foreground:(short)frontColor background:(short)backColor
      rule:(RULE)aRule clipBy:aRectList
  {
    char *typeFaceName;
    int   typeFace, pointSize, spacing, pitch;
int a,b,c,d,e,f;

    if (deviceId)
      {
       if (aFont)
         {
          PT lowerLeft = ptPlus (aPoint, pt(0,[aFont height]));

          [self positionCursorAt:lowerLeft];

          typeFaceName = [aFont familyName];
          pointSize    = [aFont pointSize];

          if (!strcmp(typeFaceName,"Courier"))   typeFace= 3,spacing = 0; else
          if (!strcmp(typeFaceName,"Helvetica")) typeFace= 4,spacing = 1; else
          if (!strcmp(typeFaceName,"Times"))     typeFace= 5,spacing = 1;
          else
            {
             spacing  = 0;

             if (pointSize <= 9)
                typeFace = 0;
             else
                typeFace = 3;
            }

          if (spacing == 0)
             if (pointSize <= 9)
                pitch = 16.66;
             else
                if (pointSize <= 10)
                   pitch = 12;
```

```
            else
               pitch = 10;
        else
           pitch = 0;

        fprintf (deviceId, "\033(s%dp", a=spacing);

        fprintf (deviceId, "\033(s%dh", f=pitch);

        fprintf (deviceId, "\033(s%dv", b=[aFont pointSize]);

        fprintf (deviceId, "\033(s%ds", c=[aFont italic]?1:0);

        fprintf (deviceId, "\033(s%db", d=[aFont bold]?3:0);

        fprintf (deviceId, "\033(s%dT", e=typeFace);
       }

    fprintf (deviceId, "%s", aString);
   }

  return self;
  }


=:
/*===================== DO NOT REMOVE    EDIT =============================

       This comment and the following sccsId declaration are managed
       by SCCS for you. Do not edit or remove either.

       Source file:    /users/bmw/Alpha/UserInterface/SCCS/s.BM_Printer.m
       Latest version:  1.11
       Last mod time:   08/24/89 at 14:15:45

=========================================================================*/

static char *sccsId = "@(#)BM_Printer.m rev 1.11 created on 08/24/89 at 14:15:45";

/*===================== DO NOT REMOVE OR EDIT ===========================*/

#include "objc.h"
#include "uil.h"
#include "site.h"

#include <string.h>
#include <stdio.h>

@requires Pattern,RectList,EventQ,Cursor, ColorMap;

= BM_Printer: DispMedium (BM_WorkstationMsgs,
                          UserInterface, Collection, Primitive)

   {
    IOD deviceId;
   }


 + initialize
   {
    return self;
   }
```

```
+new
  {
   self = [super new];

   if (deviceId = popen ("lpr -oraw", "w"))
      return self;
   else
      return nil;
  }


-(PT)defaultExtent
  {
   return pt(700,1000);
  }


- (WINDOW)windowId
  {
   return NULL;
  }


- screenBounds
  {
   return [[[RectList new] origin:pt(0,0)] extent:pt(10000,10000)];
  }
- terminate$
  {
   if (deviceId)
      pclose (deviceId);

   return [super terminate$];
  }


- (IOD) deviceId
  {
   return deviceId;
  }


- displayAt:(PT)aPoint size:(PT)aSize rule:(RULE)aRule clipBy:aRectList
      on:aMedium offsetBy:(PT)aSrcPoint
  {
   return self;
  }


- drawLineFrom:(PT)pt1 to:(PT)pt2 colorIndex:(short)aColorIndex lineType:(short)aType
                                              rule:(RULE)aRule clipBy:aClipList
  {
   return self;
  }


- drawImageAt:(PT)aPoint size:(PT)aSize from:(IMAGE)anImage at:(PT)srcPoint
      rule:(RULE)aRule clipBy:aClipList mask:(IMAGE)aMask
  {

   return self;
  }
```

```
- readImageAt:(PT)aPoint size:(PT)aSize into:(IMAGE)anImage at:(PT)dstPoint
  {
   return self;
  }


-copyImageAt:(PT)srcPoint size:(PT) aSize to:(PT)dstPoint rule:(RULE)aRule
  {
   return self;
  }


- fillColorIndex:(short)aColorIndex at:(PT)aPoint size:(PT)aSize
          rule:(RULE)aRule clipBy:aClipList
  {
   return self;
  }


- fillPattern:(IMAGE)aPattern ofSize:(PT)aSize at:(PT)anOrigin
       size:(PT)anExtent rule:(RULE)aRule clipBy:aClipList
  {
   return self;
  }


- textWrite:(STR)aString length: (short) aLength at:(PT)aPoint
      font:aFont foreground:(short)frontColor background:(short)backColor
      rule:(RULE)aRule clipBy:aRectList
  {
   return self;
  }

=:

/*===================== DO NOT REMOVE   EDIT ============================

       This comment and the following sccsId declaration are managed
       by SCCS for you. Do not edit or remove either.

       Source file:     /users/bmw/Alpha/UserInterface/SCCS/s.BM_PromptBox.m
       Latest version:  1.8
       Last mod time:   07/19/89 at 10:15:26

======================================================================*/

static char *sccsId = "@(#)BM_PromptBox.m rev 1.8 created on 07/19/89 at 10:15:26";

/*===================== DO NOT REMOVE OR EDIT ===========================*/

#include "objc.h"
#include "uil.h"

#include "BMWGlobal.h"

@requires CharString, OrdCltn, LayerGroup;


= BM_PromptBox: SDialogBox (BM_WorkstationMsgs,
                                    UserInterface, Collection, Primitive)

   {
    id response;
   }
```

```
+askSTR:(STR)aQuestion client:aLayer
  {
   id aQuad;

   self = [super new];

   [self addStaticLabel:aQuestion];
   [self acceptSelector:@selector(cancel:) receiver:self];

   [self extent:[self defaultExtent]];
   [self borderWidth:3];
   [self borderColor:colors.White];

   aQuad = [baseLayer insideQuad];
   [[self center:[aLayer center]] translateWithin:aQuad];
   [self attachTo:baseLayer];

   [self show];
   [aQuad free];
   [self modalActivate];
   [self delete];

   return response;
  }



-initialize
  {
   [super parentInitialize];

   defaultPushButton = acceptButton = [self defaultAcceptButton];
   maxWidth = [acceptButton outsideWidth] + 20;
   buttons = [LayerGroup extent:pt(maxWidth,[acceptButton outsideHeight])];
   [acceptButton attachTo:buttons];
   [buttons attachTo:self];
   maxValueSize = 40;
   [self extent:[self defaultExtent]];
   [self insideColor:BM_colors.Frame];

   return self;
  }


-cancel:aDialogBox
  {
   response = nil;

   return [self modalDeactivate];
  }

=:

/*==================== DO NOT REMOV    EDIT ============================

    This comment and the following sccsId declaration are managed
    by SCCS for you. Do not edit or remove either.

    Source file:    %F%
    Latest version: %I%
    Last mod time:  %H% at %U%
```

```
========================================================================*/

static char *sccsId = "%Z%%M% rev %I% created on %H% at %U%";

/*==================== DO NOT REMOVE OR EDIT ==========================*/


/*
Modified for Batterymarch by LVM on September 20, 1988
to create scrolling menus.

Modified SRItem every so slightly to work for scrolling
menus.  See LVM note below.
*/
// Include Files
#include "objc.h"
#include "uil.h"
#include "site.h"
@requires EventQ;

= BM_SRItem:SRItem (BM_WorkstationMsgs,UIMESSAGES)
{
}

/* $Default Category: Behavior $ */

/*
Performs any specific actions for the receiver.  This method is called by
|-activate|.  A SRItem activates its submenu if there is one.  Returns
self.
*/
-performActivation {
    PT aPoint,aPt;        // Point to display submenu
    BUTTON aButton;       // Button that this menu item responds to
    id chosenItem;        // menuItem chosen from a submenu
    id aRect;
    BOOL specialCase;

    PT oldCursorLocation;

    specialCase = NO;
    // If its time to show the submenu
    if ( [subMenuRect outsideContainsPt: [EventQ origin]] ) {
        if ( subMenu ) {

            // Figure the point to put up the submenu
            // The submenu should be displayed directly to
            // the right of this menu item.  The border of
            // this menu, and the submenu should overlap so
            // that the border for the submenu does not
            // look to wide, so subtract the width of the
            // border from the x coordinate of where to
            // display the submenu
            aPoint = pt( [self adjacentRight],(short)((int)[self adjacentTop] -
                [subMenu borderWidth]));

            [subMenu outsideOrigin: aPoint];
            aRect = [subMenu display    ;
            // Move it so it is in the baseLayer
            aPt = [aRect translateWithin: baseLayer];
            [subMenu outsideOrigin: [aRect origin]];

            if ( X(aPt) < 0 ) {
                // This is a special case
                specialCase = YES;
```

```
        }
        [aRect free];

        // Put the submenu up onto the screen
        [subMenu openUp];

        // Activate the submenu
        do {
            oldCursorLocation = event.origin;
            [subMenu activate];
            // Keep it active until the button is released or
            // The cursor is moved from this menu item
            // or its submenu
        } while ([backLayer buttonDown] &&
            ([self outsideContainsPt: event.origin] ||
             [subMenu outsideContainsPt: event.origin] ||
// LVM       changed outsideContainsPt: to containsPt:
             ![[self backLayer] containsPt: event.origin] ||
            // Checks to see if the user is headed directly for the submenu
            // If he is, allow the cursor to be a little less than exact
             [self consumeSlop: oldCursorLocation]) &&
            // Check to see if there is a special case, deactivate the
            // menu on special case if the cursor is to the left of the
            // submenu
            (!specialCase ||
                (X(event.origin) >= [subMenu left] ||
                 [self outsideContainsPt: event.origin])));

        // Erase the submenu
        [subMenu close];

        // See if any item was chosen from the submenu
        // Retrieve the menuItem chosen so its
        // action may be executed
        if ((chosenItem = [subMenu returnSelectedItem])) {
            selectedItem = chosenItem;
            subMenuSelected = YES;
        }
      }
    }
    return self;
}

=:

/*===================== DO NOT REMOV    EDIT =============================

        This comment and the following sccsId declaration are managed
        by SCCS for you. Do not edit or remove either.

        Source file:    %F%
        Latest version: %I%
        Last mod time:  %H% at %U%

======================================================================*/

static char *sccsId = "%Z%%M% rev %I% created on %H% at %U%";

/*===================== DO NOT REMOVE OR EDIT ===========================*/


/*
Created for Batterymarch by LVM on September 20, 1988
to create scrolling menus.
```

```
This class creates scrolling submenus.  It is used by
BM_MenuItem.
*/
// Include Files
#include "objc.h"
#include "uil.h"

// @requires
@requires Quad, BitMap, Cursor, EventQ, OrdCltn, BorderLayer;
@requires Prompter, BM_SRItem;

= BM_SRMenu:SRMenu (BM_WorkstationMsgs, UIMESSAGES)
{
// Number of non scrolling items
short numNSItems;
// Height of the area at top and bottom of
// menu that scrolls the menu
// currently it is the border width
short scrollAreaHeight;
// Units to scroll by, this will be the height of a the items
// in the menu
short scrollUnit;
}

/* $Default Category: Initialize $ */

/*
Initializes the receiver.  Sets non scrolling items to 5.
Returns self.
*/
-initialize{
    [super initialize];
    numNSItems = 35;
    return self;
}

/*
Return the default menu item for aMenu.  Returns an instance of
BM_SRItem.
*/
- defaultItemFor: aMenu {
    return [BM_SRItem createInterfaceFor: aMenu button: [self button]];
}

/* Default Category: Interrogation $ */

/*
Return YES if the cursor is the the receiver's up scrolling area.
Otherwise return NO.  The Up scrolling area is the top border.
*/
-(BOOL)scrollUpAreaContainsEvent{
    if ( (Y(event.origin) >= [self outsideTop]) &&
          Y(event.origin) <= ([self outsideTop] + scrollAreaHeight))
         return YES;
    else
         return NO;
}

/*
Return YES if the cursor is in the Down scrolling area.  Otherwise
return NO.  The Down scrolling area is the bottom border.
*/
-(BOOL)scrollDownAreaContainsEvent {
    if ( (Y(event.origin) <= [self outsideBottom]) &&
```

```
        Y(event.origin) >= ([self outsideBottom]  - scrollAreaHeight))
            return YES;
        else
            return NO;
}

/* $Default Category: Activation */

/*
Activate the receiver.  Returns self.

This method was changed from the inherited methods to add checking the
scrolling areas and to scroll if the cursor is in the scrolling areas.
*/
-activate{
    id item;    // Item that the cursor is over and is in control
    [Cursor push: [self defaultCursor]];
    do {
        // Find the menu item under the cursor
        item = [self frontLayerContaining: event.origin];

        // Tell that menu item to do its thing, it will get events till it is
        // done, if the cursor is not in an item, better get the next event
// LVM  added the top two if clauses to do scrolling
        if ([self scrollUpAreaContainsEvent]) {
            [self scrollUp];
            // Keep scrolling while the cursor remains in the scroll area
            [EventQ atInterval: 5 tell: self toDo: @selector(scrollUp)
                while: @selector(scrollUpAreaContainsEvent)];
        } else if ([self scrollDownAreaContainsEvent]) {
            [self scrollDown];
            // Keep scrolling while the cursor remains in the scroll area
            [EventQ atInterval: 5 tell: self toDo: @selector(scrollDown)
                while: @selector(scrollDownAreaContainsEvent)];
        } else if (item) {
            [item activate];
        } else {
            [EventQ readEvent];
        }

    // Keep it up while the button is down
    // And all menu specific constraints are met
    } while ([self buttonDown] && ![self testActivateDone]);

    [Cursor pop];
    return self;
}
/* $Default Category: Creation $ */

/*
Create and return an instance of BM_SRMenu.
*/
+createInterfaceFor: aMenu button: (BUTTON)aButton {
    return [self createInterfaceFor: aMenu button: aButton
        numItems: -1];
}

/*
Create and return an instance of BM_SRMenu.
*/
+createInterfaceFor: aMenu button: (BUTTON)aButton
    numItems: (short)numItems  {
    self = [super createInterfaceFor: aMenu button: aButton];
```

```
    if (numItems != 0 ) numItems = numNSItems;
    // -1 means let the menu show all items
    // need to make sure that there are more
    // items than numItems in the menu before setting up
    // for scrolling
    if ( numNSItems != -1 && [frontLayers size] > numNSItems )
        [self adjustForScrolling];
    return self;
}

/* $Default Category: Setting $ */

/*
Override extent to be the Layer classes extent method.  The inherited method
will try to reformat the menu when the size changes, dont whan that to happen
in the scrolling menu.  Returns self.
*/
-extent: (PT)aPoint {
    return [self layerExtent: aPoint];
}

/* $Default Category: Scrolling $ */

/*
Do additional formatting having to do with scrolling.  Specifically
sets up some instance variables and sets the menu to the size specified.
Return self.
*/
-adjustForScrolling {
    short h,w;
    short myHeight;

    // Set the border bigger so the user can access it easily
    [self borderWidth: 8];

    // Get the height and width of an item
    // Assumes all items are same height and width
    h = [[frontLayers at: 0] height];
    w = [[frontLayers at: 0] width];

    // Set scroll area height
    scrollAreaHeight = [self borderWidth];

    //  Now set the size of the receiver
    myHeight = numNSItems * h;
    [self extent: pt([self width], myHeight)];

    // Set the scrolling height to be the height of an item
    scrollUnit = 10*h;
    return self;

/* $Default Category: Creation $ */

/*
Create and return an instance of BM_SRMenu.
*/
+createInterfaceFor: aMenu button: (BUTTON)aButton {
    return [self createInterfaceFor: aMenu button: aButton
        numItems: -1];
}

/*
Create and return an instance of BM_SRMenu.
```

```
*/
+createInterfaceFor: aMenu button: (BUTTON)aButton
    numItems: (short)numItems  {
    self = [super createInterfaceFor: aMenu button: aButton];
    if (numItems != 0 ) numItems = numNSItems;
    // -1 means let the menu show all items
    // need to make sure that there are more
    // items than numItems in the menu before setting up
    // for scrolling
    if ( numNSItems != -1 && [frontLayers size] > numNSItems )
        [self adjustForScrolling];
    return self;
}

/* $Default Category: Setting $ */

/*
Override extent to be the Layer classes extent method.  The inherited method
will try to reformat the menu when the size changes, dont whan that to happen
in the scrolling menu.  Returns self.
*/
-extent: (PT)aPoint {
    return [self layerExtent: aPoint];
}

/* $Default Category: Scrolling $ */

/*
Do additional formatting having to do with scrolling.  Specifically
sets up some instance variables and sets the menu to the size specified.
Return self.
*/
-adjustForScrolling {
    short h,w;
    short myHeight;

    // Set the border bigger so the user can access it easily
    [self borderWidth: 8];

    // Get the height and width of an item
    // Assumes all items are same height and width
    h = [[frontLayers at: 0] height];
    w = [[frontLayers at: 0] width];

    // Set scroll area height
    scrollAreaHeight = [self borderWidth];

    //  Now set the size of the receiver
    myHeight = numNSItems * h;
    [self extent: pt([self width], myHeight)];

    // Set the scrolling height to be the height of an item
    scrollUnit = 10*h;
    return self;
}

/*
Scroll the receiver by aPoint pixels.  Adds to the inherited message to make
sure only scrolls when something is not visible.
Returns self.
*/
- scrollContents:(PT)aPoint {
    PT delta;
```

```
    id bottomRect, topRect;
    delta = aPoint;
    // Dont scroll beyond top or bottom
    topRect = [[Quad withBounds: [frontLayers at: 0]]
        moveBy: aPoint];
    bottomRect = [[Quad withBounds: [frontLayers at:
        [frontLayers size] -1]] moveBy: aPoint];

    // Check to see if we are scrolling too much and adjust point
    // if we are
    if ([topRect top] > [self top] )
        Y(delta) = Y(delta)-([topRect top] - [self top] );
    else if ( [bottomRect bottom] < ([self bottom] ) )
        Y(delta) = Y(delta)+([self bottom] - [bottomRect bottom]);

    // Only call super if there is movement
    if (delta != 0) {
        [super scrollContents: delta];
    }
    [bottomRect free];
    [topRect free];

    return self;
}

/*
Scroll the receiver up to show an item on above what is shown.
Returns self.
*/
-scrollUp {
    [self scrollContents: pt(0, scrollUnit)];
    return self;
}

/*
Scroll the receiver down to show an item below what is shown.
*/
-scrollDown {
    [self scrollContents: pt(0, -scrollUnit)];
    return self;
}
=:

/*===================== DO NOT REMOV'    EDIT ============================

        This comment and the following sccsId declaration are managed
        by SCCS for you. Do not edit or remove either.

        Source file:     /users/bmw/Alpha/UserInterface/SCCS/s.BM_ScrollBar.m
        Latest version:  1.3
        Last mod time:   08/02/89 at 18:30:34

========================================================================*/

static char *sccsId = "@(#)BM_ScrollBar.m rev 1.3 created on 08/02/89 at 18:30:34";

/*===================== DO NOT REMOVE OR EDIT ===========================*/

#include "objc.h"
#include "uil.h"
#include "scroll.h"
#include <string.h>
#include "BMWGlobal.h"
```

```
@requires EventQ;

= BM_ScrollBar : ScrollBar (BM_WorkstationMsgs,
                            UserInterface, Collection,Primitive)
  {
  }


-(PT)moveBar:(PT)aDeltaPoint
   {
   short scrollLen;
   short unitAmt;
   PT unit;

   if ( scaleFactor == 1.0 ) return pt(0,0);
   if ( aDeltaPoint == (PT) 0 ) return pt(0,0);

   scrollLen = (barType == SBVERTICAL ? Y(aDeltaPoint) : X(aDeltaPoint));

   if ( scrollLen > 0 )
      unit = [client increaseUnitSize];
   else
      unit = [client decreaseUnitSize];
   unitAmt = (barType == SBVERTICAL ? Y(unit) : X(unit));

   scrollLen = - scrollLen;
   if (scrollLen < 0)
      scrollLen = (short)(((float)scrollLen/scaleFactor)/(float)unitAmt - .8)*unitAmt;
   else
      scrollLen = (short)(((float)scrollLen/scaleFactor)/(float)unitAmt + .8)*unitAmt;

   return [self scrollBar: pt(scrollLen, scrollLen)];
   }



-(BOOL)leftButtonDown
   {
   register long eventPosition;
   register PT oldEventPoint;
   register PT deltaPoint ;
   short barTop, barBottom, elevatorTop,elevatorBottom;
   PT barOrigin, barCorner;
   barOrigin = [bar origin];
   barCorner = [bar corner];

   if (barType == SBVERTICAL)
      {
      elevatorTop = [self top] + elevatorStart ;
      barTop = [bar top];
      barBottom = [bar bottom];
      elevatorBottom = elevatorTop + elevatorLength ;
      eventPosition = Y(event.origin);
      }
   else
      {
      elevatorTop = [self left] + elevatorStart ;
      barTop = [bar left];
      barBottom = [bar right];
      elevatorBottom = elevatorTop + elevatorLength ;
      eventPosition = X(event.origin);
      }
```

```
  if (barTop <= eventPosition && barBottom >= eventPosition )
     {
     /* oldEventPoint = event.origin;
     while ( [EventQ leftButtonDown])
         {
         if  (barType == SBVERTICAL)
             {
             eventPosition = Y(event.origin);
             barTop = [bar top];
             barBottom = [bar bottom];
             }
         else
             {
             eventPosition = X(event.origin);
             barTop = [bar left];
             barBottom = [bar right];
             }
         deltaPoint = ptMinus(event.origin,oldEventPoint);
         if ( deltaPoint != (PT) 0) {
             if(!(eventPosition<elevatorTop && barTop<=elevatorTop)&&
                !(eventPosition>elevatorBottom && barBottom>=elevatorBottom))
                  [self elevatorAction];
         }
         oldEventPoint = event.origin;
      }*/
   return YES;
   }
   else return [self elevatorAction];
}


- formatBar {
       id dataArea;
       BOOL barVisible;
       int clientLength;
       long dataLength;
       PT contentsStart;
       PT myOrigin = [self origin];

       PT page  = [client pageSize];

       clientLength = (barType==SBVERTICAL ? Y(page) : X(page));

       dataArea = [client maxContentsArea ];
       dataLength =(barType==SBVERTICAL ? [ dataArea height]: ([dataArea width]));
       if ( dataLength <= clientLengtn ) {
          barLength = elevatorLength;
          scaleFactor = 1.; // no scrolling
       }
       else {
          scaleFactor=((float)elevatorLength/(float)dataLength);
          barLength =(short)((float)clientLength/(float)dataLength
                      * elevatorLength);
       }

       if (barVisible = [ bar visible ])  {
              [ bar setVisible:NO];
       //     [ bar erase];
       }

       contentsStart = [ client contentsStart];
       if ( barType== SBVERTICAL) {
```

```
            dataStart = [dataArea top];
            currentStart = Y(contentsStart);
            dataEnd = dataStart + dataLength;
            currentEnd = currentStart + clientLength;
            [bar offset:pt(3,elevatorStart)];
            [bar outsideExtent:pt(SBBARWIDTH,barLength)];
        }
        else {
            dataStart = [dataArea left];
            currentStart = X(contentsStart);
            dataEnd = dataStart + dataLength;
            currentEnd = currentStart +  clientLength;
            [bar offset:pt(elevatorStart,3)];
            [bar outsideExtent:pt(barLength,SBBARWIDTH)];
        }
        [ self adjustBar];
        if( barVisible){
                [ bar setVisible:YES];
        }
        [client scrollContents: [self scrollBar: [self contentsStart]]];
        [dataArea free];
        return self;
}


=:

/*==================== DO NOT REMOV    EDIT ============================

        This comment and the following sccsId declaration are managed
        by SCCS for you. Do not edit or remove either.

        Source file:     /users/bmw/Alpha/UserInterface/SCCS/s.BM_ScrollLyr.m
        Latest version:  1.4
        Last mod time:   08/02/89 at 18:30:47

========================================================================*/

static char *sccsId = "@(#)BM_ScrollLyr.m rev 1.4 created on 08/02/89 at 18:30:47";

/*==================== DO NOT REMOVE OR EDIT ==========================*/

#include "objc.h"
#include "uil.h"

extern id currentDisplay;

@requires Quad;

= BM_ScrollLayer:Layer (BM_WorkstationMsgs, UserInterface, Collection,
                        Primitive)
  {
  }

/* This class is designed to work with one and only one frontLayer. */


-extent:(PT)anExtent
  {
   [[frontLayers at:0] origin:[self origin]];
   return [super extent:(PT)anExtent];
  }
```

```
-(PT)increaseUnitSize
  {
   id layer;

   if (layer = [frontLayers at:0])
      return [layer increaseUnitSize];
   else
      return [super increaseUnitSize];
  }

-(PT)decreaseUnitSize
  {
   id layer;

   if (layer = [frontLayers at:0])
      return [layer decreaseUnitSize];
   else
      return [super decreaseUnitSize];
  }

static id _tempQuad = nil;

/* this method only works for vertical scrolling, and only if the receiver is
   unobscured by other layers (except the one being scrolled)! */

-scrollContents:(PT)delta
  {
   PT myOrigin     = [self origin];
   PT myBottomLeft = [self bottomLeft];
   PT myExtent     = [self extent];
   PT originOfCopyArea,
      extentOfCopyArea,
      originOfExposedArea,
      extentOfExposedArea,
      copyDestination;
   id layer;

   [backLayer toFront]; /* not generally good enough */

   if (layer = [frontLayers at:0])
      [layer moveBy:delta];

   if (Y(delta) < 0)
      {
       originOfCopyArea    = ptMinus(myOrigin,delta);
       extentOfCopyArea    = pt(X(myExtent),Y(myExtent)+Y(delta));
       copyDestination     = myOrigin;
       originOfExposedArea = ptPlus(myBottomLeft,delta);
       extentOfExposedArea = pt(X(myExtent),-Y(delta));
      }
   else
      {
       originOfCopyArea    = myOrigin;
       extentOfCopyArea    = pt(X(myExtent),Y(myExtent)-Y(delta));
       copyDestination     = ptPlus(myOrigin,delta);
       originOfExposedArea = myOrigin;
       extentOfExposedArea = pt(X(myExtent),Y(delta));
      }

   if (X(extentOfCopyArea) > 0 && Y(extentOfCopyArea) > 0)
      [currentDisplay copyImageAt:originOfCopyArea
                             size:extentOfCopyArea
                               to:copyDestination
                             rule:GXcopy];
```

```
        if (_tempQuad == nil)
           _tempQuad = [Quad new];

        [_tempQuad origin:originOfExposedArea
                   extent:extentOfExposedArea];
        [self displayRect:_tempQuad];

        return self;
      }


   - updateSelectionArea:aQuad
     {
     short temp;

     if ([self containsRect:aQuad])
        return self;

     if ([aQuad bottom] > [self bottom])
        temp = [self bottom] - [aQuad bottom];
     else
        temp = [self top] - [aQuad top];

     [self scrollContents:pt(0,temp)];
     [self changed:@selector(maxContentsArea)];

     return self;
     }
   - findSelectionItem:(PT)aPoint
     {
     return self;
     }


=:

/*==================== DO NOT REMO\      EDIT ============================

        This comment and the following sccsId declaration are managed
        by SCCS for you. Do not edit or remove either.

        Source file:    /users/bmw/Alpha/UserInterface/SCCS/s.BM_SolidColr.m
        Latest version: 1.2
        Last mod time:  07/05/89 at 13:20:52

==========================================================================*/

static char *sccsId = "@(#)BM_SolidColr.m rev 1.2 created on 07/05/89 at 13:20:52";

/*==================== DO NOT REMOVE OR EDIT ===========================*/


#include "objc.h"
#include "uil.h"

#include "BMWGlobal.h"


= BM_SolidColor: SolidColor (BM_WorkstationMsgs, UserInterface,
                                                Collection, Primitive)
  {
```

```
}


struct colorDatabaseEntry
  {
   float r, g, b;
   char  name [20];
  };


/* best if first entry is white, though not critical */

static struct colorDatabaseEntry colorDatabase [] = {

{1,              1,              1,                "White\0"},
{0,              0,              0,                "black\0"},
{0.19607843,     0.74901961,     0.75686275,       "aquamarine\0"},
{0,              0.57647059,     0.56078431,       "MediumAquamarine\0"},
{0,              0,              1,                "Blue\0"},
{0.37254902,     0.57254902,     0.61960784,       "CadetBlue\0"},
{0.13333333,     0.13333333,     0.59607843,       "CornflowerBlue\0"},
{0.21960784,     0.29411765,     0.4,              "DarkSlateBlue\0"},
{0.69019608,     0.88627451,     1,                "LightBlue\0"},
{0.48627451,     0.59607843,     0.82745098,       "LightSteelBlue\0"},
{0.19607843,     0.19607843,     0.8,              "MediumBlue\0"},
{0.41568627,     0.41568627,     0.55294118,       "MediumSlateBlue\0"},
{0.18431373,     0.18431373,     0.39215686,       "MidnightBlue\0"},
{0.1372549,      0.1372549,      0.45882353,       "NavyBlue\0"},
{0.1372549,      0.1372549,      0.45882353,       "navy\0"},
{0.44705882,     0.62352941,     1,                "SkyBlue\0"},
{0.49411765,     0.53333333,     0.67058824,       "SlateBlue\0"},
{0.32941176,     0.43921569,     0.66666667,       "SteelBlue\0"},
{1,              0.44705882,     0.3372549,        "coral\0"},
{0,              1,              1,                "Cyan\0"},
{0.55686275,     0.1372549,      0.1372549,        "firebrick\0"},
{0.64705882,     0.16470588,     0.16470588,       "Brown\0"},
{0.85490196,     0.66666667,     0,                "gold\0"},
{0.9372549,      0.8745098,      0.51764706,       "Goldenrod\0"},
{0.81960784,     0.75686275,     0.4,              "MediumGoldenrod\0"},
{0,              1,              0,                "green\0"},
{0,              0.3372549,      0.17647059,       "DarkGreen\0"},
{0.33333333,     0.3372549,      0.18[illegible]73,       "DarkOliveGreen\0"},
{0.31372549,     0.62352941,     0.411[illegible]471,     "ForestGreen\0"},
{0,              0.68627451,     0.07843137,       "LimeGreen\0"},
{0.19607843,     0.50588235,     0.29411765,       "MediumForestGreen\0"},
{0.20392157,     0.46666667,     0.4,              "MediumSeaGreen\0"},
{0.1372549,      0.55686275,     0.1372549,        "MediumSpringGreen\0"},
{0.45098039,     0.87058824,     0.47058824,       "PaleGreen\0"},
{0.32156863,     0.58431373,     0.51764706,       "SeaGreen\0"},
{0.25490196,     0.6745098,      0.25490196,       "SpringGreen\0"},
{0.19607843,     0.84705882,     0.21960784,       "YellowGreen\0"},
{0.18431373,     0.30980392,     0.30980392,       "DarkSlateGrey\0"},
{0.18431373,     0.30980392,     0.30980392,       "DarkSlateGray\0"},
{0.32941176,     0.32941176,     0.32941176,       "DimGrey\0"},
{0.32941176,     0.32941176,     0.32941176,       "DimGray\0"},
{0.65882353,     0.65882353,     0.65882353,       "LightGrey\0"},
{0.65882353,     0.65882353,     0.65882353,       "LightGray\0"},
{0.49411765,     0.49411765,     0.49411765,       "gray\0"},
{0.49411765,     0.49411765,     0.49411765,       "Grey\0"},
{0.70196078,     0.70196078,     0.49411765,       "Khaki\0"},
{1,              0,              1,                "magenta\0"},
{0.56078431,     0,              0.32156863,       "Maroon\0"},
{1,              0.52941176,     0,                "orange\0"},
```

```
{0.9372549,    0.51764706,   0.9372549,        "Orchid\0"},
{0.54509804,   0.1254902,    0.54509804,       "DarkOrchid\0"},
{0.74117647,   0.32156863,   0.74117647,       "MediumOrchid\0"},
{1,            0.70980392,   0.77254902,       "pink\0"},
{0.77254902,   0.28235294,   0.60784314,       "Plum\0"},
{1,            0,            0,                "red\0"},
{0.41960784,   0.22352941,   0.22352941,       "IndianRed\0"},
{0.83529412,   0.1254902,    0.4745098,        "MediumVioletRed\0"},
{1,            0.27058824,   0,                "OrangeRed\0"},
{0.95294118,   0.24313725,   0.58823529,       "VioletRed\0"},
{0.91372549,   0.58823529,   0.47843137,       "salmon\0"},
{0.58823529,   0.32156863,   0.17647059,       "Sienna\0"},
{0.87058824,   0.72156863,   0.52941176,       "tan\0"},
{0.84705882,   0.74901961,   0.84705882,       "Thistle\0"},
{0,            0,            0.00392157,       "transparent\0"},
{0.09803922,   0.8,          0.8745098,        "Turquoise\0"},
{0,            0.65098039,   0.65098039,       "DarkTurquoise\0"},
{0,            0.82352941,   0.82352941,       "MediumTurquoise\0"},
{0.61176471,   0.24313725,   0.80784314,       "violet\0"},
{0.54117647,   0.16862745,   0.88627451,       "BlueViolet\0"},
{0.96078431,   0.87058824,   0.70196078,       "wheat\0"},
{1,            1,            0,                "yellow\0"},
{0.67843137,   1,            0.18431373,       "GreenYellow"},
{0,            0,            0,                (char *)0}};


+(int)lookupColorSTR:(STR)aColorName
  {
   char *name;
   int  index;

   for (index = 0; (name=colorDatabase[index].name) != (char *)0; index++)
     if (!_dictcmp(name,aColorName))
        return index;

   return 0;
  }


+(int)colorIndexForName:(STR)aColorName
  {
   int DBIndex = [self lookupColorSTR:aColorName];

   return [[currentDisplay colorMap]

                              fin    or:colorDatabase[DBIndex].r
                                       :colorDatabase[DBIndex].g
                                       :colorDatabase[DBIndex].b
                                deltas:0.4:0.4:0.4];
  }


+colorName:(STR)colorName inverseColorName:(STR)inverseColorName
  {
   id newColor = [self colorIndex:[self colorIndexForName:colorName]];
   [newColor inverseColorIndex:[self
                                colorIndexForName:inverseColorName]];

   return newColor;
  }

=:
```

```
/*==================== DO NOT REMOV    EDIT ============================

    This comment and the following sccsId declaration are managed
    by SCCS for you. Do not edit or remove either.

    Source file:    /users/bmw/Alpha/UserInterface/SCCS/s.BM_StringEdt.m
    Latest version: 1.14
    Last mod time:  08/12/89 at 11:36:06

=========================================================================*/

static char *sccsId = "@(#)BM_StringEdt.m rev 1.14 created on 08/12/89 at 11:36:06";

/*==================== DO NOT REMOVE OR EDIT ==========================*/

/*
$Description: BM_StringEdit is a subclass of StringEdit that allows
its string to be edited by the user. $
*/

#include "objc.h"
#include "uil.h"
#include <ctype.h>
#include "BMWGlobal.h"

extern id currentDisplay;

#define NULLTERMINATOR '\0'
#define BLANK          ' '
#define NULL (char *)0
#define NOTSET -1

static char editPrompt = '_';

@requires Cursor, EventQ;

= BM_StringEdit: StringEdit (BM_WorkstationMsgs, UIMESSAGES)
{
int  inputChar;
BOOL bufferIsDirty;
}


- PRIVATE setUpBuffer {

    if (editBuffer == NULL)
        [self createBuffer:[self defaultBuffersize]];

    if (myDispString == nil)
        [self assignSTR:""];

    strncpy(editBuffer, [self str], strlen([self str])+1);

    editBuffer[maxCharacters+1] = NULLTERMINATOR;

    editChar = strlen(editBuffer);
    editBuffer[editChar] = BLANK;

    if (inputChar<0)
       inputChar = editChar;
```

```
    editBuffer[editChar+1] = NULLTERMINATOR;

    return self;
}

- PRIVATE updateDisplay:(int)fromChε
  {
   short colorIndex;

   if ([self visible])
     {

// With variable width fonts under X11 some characters have bounding boxes
// with non-zero origins. This causes funny results when only part of
// the string is displayed such as truncation or incomplete erasure.
// Since it is probably almost as efficient to just send the whole
// string and it fixes this glitch, do it:

//        [super updateDisplay:fromChar];
       [super updateDisplay:0];

       if ([self isHighlighted])
          colorIndex = [[self insideColor] inverseColorIndex];
       else
          colorIndex = [[self insideColor] colorIndex];

       [self fillColorIndex:colorIndex
               at:pt([myDispString left]+[[self font] widthOf:editBuffer], 0)
             size:pt([self width],[self height])];
       return self;
      }
   else
      return self;
  }


- PRIVATE updateMyCursor: (int) fromChar
  {
   PT displayPoint, stringOrigin;
   short delta, aColorIndex, aBackColorIndex;
   int numChar;

   if (![self visible])
      return self;

   stringOrigin = [myDispString origin];
   delta = [[myDispString font] widthOf: editBuffer numChars:fromChar];

   displayPoint = pt(X(stringOrigin)+delta, Y(stringOrigin));
   numChar = 1;

   if ([self isHighlighted] && gp_colorSupport)  {
       aColorIndex = [[myDispString color] colorIndex];
       aBackColorIndex = [[myDispString backgroundColor] colorIndex];
       }
   else {
       aColorIndex = [[myDispString color] colorIndex];
       aBackColorIndex = [[myDispString backgroundColor] colorIndex];
       }


   [self textWrite: &editBuffer[fromChar]
       length: numChar
```

```
        at: displayPoint
        font: [myDispString font]
        foreground: aColorIndex
        background: aBackColorIndex
        rule: [myDispString rule]
        clipBy: [self clipList]];

    return self;

}
-processString:aCharString
        {
        unsigned stringIndex, stringSize;
        int index;

        stringSize = [aCharString length];
        for (stringIndex=0; stringIndex<stringSize; stringIndex++)
                {
                if (editChar < maxCharacters)
                        {
                        for (index=editChar; index>=inputChar; --index)
                                editBuffer[index + 1] = editBuffer[index];
                        editChar++;
                        editBuffer[editChar+1] = NULLTERMINATOR;
                        editBuffer[inputChar]  = [aCharString charAt:stringIndex];
                        inputChar++;
                        [self updateDisplay: inputChar-1];
                        [self updateMyCursor: inputChar];
                        }
                else    {
                        [self maxError];
                        return self;
                        }
                }
        bufferIsDirty = YES;
        return self;
        }


- PRIVATE processMouseInput
        {
        id stringFont;
        unsigned mouseX, stringX, index;

        stringFont = [self font];
        mouseX = ptX(event.origin) - [self left];
        if (!([stringFont widthOf:[self str]] > mouseX))
                index=editChar+1;
        else
                {
                stringX = index = 0;
                while (stringX < mouseX)
                        {
                        index++;
                        stringX = [stringFont widthOf:[self str] numChars:index];
                        }
                }

        [self updateDisplay:inputChar];
        if (!(index == 0))
                inputChar = index-1;
        [self updateMyCursor:inputChar];
```

```
        return self;
        }




- PRIVATE processKey {
    short i,index;
    // If it is a printing character
    if (isprint (event.ascii)) {

        // If there is room in the string
        if (editChar < maxCharacters
            for (index=editChar; index>=inputChar; --index)
                editBuffer[index + 1] = editBuffer[index];
            editChar++;
            editBuffer[editChar+1] = NULLTERMINATOR;
            editBuffer[inputChar]  = event.ascii;
            inputChar++;
            [self updateDisplay: inputChar-1];
            [self updateMyCursor: inputChar];
        }
        else
            [self maxError];
    }
    else {  /* non printable characters */
        switch (event.ascii) {
            case '\177': /* delete */
                if (inputChar<editChar) {
                    for (index=inputChar; index<editChar; index++)
                        editBuffer[index] = editBuffer[index+1];
                    editChar--;

                    [self updateDisplay: inputChar];
                    [self updateMyCursor: inputChar];
                    editBuffer[editChar + 1] = NULLTERMINATOR;
                }
                break;

            case '\b':  /* backspace */
                if (inputChar>0) {

                    inputChar--;
                    for (index=inputChar; index<editChar; index++)
                        editBuffer[index] = editBuffer[index+1];
                    editChar--;

                    [self updateDisplay: inputChar];
                    [self updateMyCursor: inputChar];
                    editBuffer[editChar + 1] = NULLTERMINATOR;
                }
                break;

            case '\000' :       /* forwardspace or backwardspace */
                {
                if (event.scanCode == RIGHT_SCANCODE)
                {
                if (inputChar < editChar) {
                    ++inputChar;
                    [self updateDisplay: inputChar-1];
                    [self updateMyCursor: inputChar];
                        }
```

```
            }
            else if (event.scanCode == LEFT_SCANCODE)
            {
            if (inputChar>0) {
                inputChar--;
                [self updateDisplay: inputChar];
                [self updateMyCursor: inputChar];
                    }
            }
            }
            break;

        case '\n':  /* line feed */
        case '\r':  /* carriage return  */

            if ([[self backLayer] respondsTo:@selector(carriageReturn)])
               [[self backLayer]    riageReturn];

            break;

        case '\t':  /* tab */

            if ([[self backLayer] respondsTo:@selector(tab:)])
               [[self backLayer] tab:self];

            break;

        case '\003':        /* cntl c = abort */
        case '\033':        /* ESC = abort */

            if ([[self backLayer] respondsTo:@selector(escape)])
               [[self backLayer] escape];

            break;

        case '\025':        /* cntl u = clear */
                    [self clearBuffer];
                    editChar = 0;
                    inputChar = editChar;
                    editBuffer[editChar] = BLANK;
                    [self updateDisplay: 0];
                    [self updateMyCursor: 0];
            break;

        default:
            break;
      }/* end of switch */
   }

   bufferIsDirty = YES;

   return self;
}


-(BOOL)processEvent
   {
    if ((event.code != KEYBOARDEVENT) ||
        (!editingActive) ||
        ([self processKey] == nil))
       return [super processEvent];
    else
       return YES;
   }
```

```
-initialize
      {
      bufferIsDirty = NO;
      inputChar = -1;
      [super initialize];

      return self;
      }


- (BOOL)editingActive
  {
  return (editingActive);
  }

- activate
   {
    if (editingActive)
       {
       [self processMouseInput];
       return self;
       }

    editingActive = YES;
    [self highlight];

    // Set up the string to be edited
    [self setUpBuffer];
    [self repaint];

    [self updateMyCursor:inputChar];

    [baseLayer grabKeyboardFocus:self];

    return self;
   }


-deactivate
   {
    if (!editingActive)
       return self;

    [baseLayer releaseKeyboardFocus:self];
    // Reset and redisplay string
    [self unHighlight];
    // If the string has not changed, make sure to repaint so that
    // the receiver appears to unhighlight itself
    if( ![self updateString] )
      [self repaint];

    editingActive = NO;

    return self;
   }



-(STR)str
   {
    if (bufferIsDirty)
       [self updateString];
    return [super str];
   }
```

```
-(double)asDouble
  {
   if (bufferIsDirty)
      [self updateString];
   return [super asDouble];
  }


-(float)asFloat
  {
   if (bufferIsDirty)
      [self updateString];
   return [super asFloat];
  }

-(STR)asStr
  {
   if (bufferIsDirty)
      [self updateString];
   return [super asStr];
  }


-(int)asInt
  {
   if (bufferIsDirty)
      [self updateString];
   return [super asInt];
  }



-assignSTR:(STR)aString
  {
   id returnValue = [super assignSTR:aString];

   bufferIsDirty = NO;

   [self setUpBuffer];
   inputChar = editChar;
   [self repaint];
   return returnValue;
  }

-(BOOL)updateString
  {
   bufferIsDirty = NO;
   return [super updateString];
  }

-displayLayer
  {
   [super displayLayer];

   if (editingActive)
      [self updateMyCursor:inputChar];

   return self;
  }

-loseKeyboardFocus
  {
   return [self deactivate];
  }
```

```
-terminate$
  {
   if (editingActive)
     [self deactivate];

   return [super terminate$];
  }

=:
/*==================== DO NOT REMO\   ! EDIT ============================

       This comment and the following sccsId declaration are managed
       by SCCS for you. Do not edit or remove either.

       Source file:     /users/bmw/Alpha/UserInterface/SCCS/s.BM_StringTbl.m
       Latest version:  1.2
       Last mod time:   03/08/89 at 19:34:19

=========================================================================*/

static char *sccsId = "@(#)BM_StringTbl.m rev 1.2 created on 03/08/89 at 19:34:19";

/*==================== DO NOT REMOVE OR EDIT ===========================*/

#include "objc.h"
#include "uil.h"

#include "BMWGlobal.h"

@requires IdArray, CharString;

= BM_StringTable : IdArray (BM_WorkstationMsgs, Collection, Primitive )
   {
   }
   -applTitle
     {
      return [self at:0];
     }
   -gfxWindowTitle
     {
      return [self at:1];
     }
   -gfxPushButtonLabel
     {
      return [self at:2];
     }
   -menuItem_Print
     {
      return [self at:3];
     }
   -editWindowTitle
     {
      return [self at:4];
     }
   -defaultPrinterPath
     {
      return [self at:5];
     }
   -defaultPrinterType
     {
      return [self at:6];
     }
   -VRLErrorMessage:(int)errorCode
     {
```

```
    switch (errorCode)
      {
       case  FUNC_CALL_ERROR: return [self at:7];
       case     SCREEN_ERROR: return [self at:9];
       case    CONTEXT_ERROR: return [self at:11];
       case      XRATE_ERROR: return [self at:12];
       case         NO_ERROR: return [self at:13];
       case  BREAK_FROM_USER: return [self at:13];
       case       MEMO_ERROR: return [self at:2];
      }
     return nil;
    }
=:
/*==================== DO NOT REMO\     EDIT ============================

      This comment and the following sccsId declaration are managed
      by SCCS for you. Do not edit or remove either.

      Source file:     %F%
      Latest version:  %I%
      Last mod time:   %H% at %U%

=====================================================================*/

static char *sccsId = "%Z%%M% rev %I% created on %H% at %U%";

/*==================== DO NOT REMOVE OR EDIT ==========================*/


#include "objc.h"
#include "uil.h"

@requires PopUpMenu, EventQ;

= BM_ToggleButton : ToggleButton (BM_WorkstationMsgs, UserInterface, Collection)
  {
   BOOL selectionEnabled;
   BOOL catchMouseEvents;

   id myLogicalMenu;
   id myOwner;
  }

  -(PT)defaultExtent
    {
     PT defaultExtent = [super defaultExtent];

     return ptMinus(defaultExtent,pt(8,4));
    }

  -deactivate
    {
     [self off];

     return self;
    }

  -activate
    {
     if (!selectionEnabled)
        return nil;

     [self on];
```

```
    return self;
   }

 -catchMouseEvents
   {
    catchMouseEvents = YES;

    return self;
   }

 -ignoreMouseEvents
   {
    catchMouseEvents = NO;

    return self;

   }

 -(BOOL)rightButtonDown
   {
    id popUpMenu;

    if (myLogicalMenu != nil)
      {
       [myLogicalMenu assignSTR:[self str]];
       [myLogicalMenu     owner:myOwner];

       popUpMenu = [PopUpMenu createInterfaceFor:myLogicalMenu
                                          button:RIGHTBUTTON];
       [popUpMenu activateAt:[EventQ origin]];

       [popUpMenu free];
      }

    return YES;
   }

 -menu:aLogicalMenu owner:anObject
   {
    myLogicalMenu = aLogicalMenu;
    myOwner       = anObject;

    return self;
   }


 -initialize
   {
    [super initialize];

    selectionEnabled = YES;
    catchMouseEvents = YES;

    myLogicalMenu = nil;
    myOwner       = nil;

    return self;
   }

=:

/*==================== DO NOT REMOV    EDIT ============================

      This comment and the following sccsId declaration are managed
      by SCCS for you. Do not edit or remove either.
```

```
        Source file:     /users/bmw/Alpha/UserInterface/SCCS/s.BM_TogMenu.m
        Latest version:  1.1
        Last mod time:   03/02/89 at 20:39:42

========================================================================*/

static char *sccsId = "@(#)BM_TogMenu.m rev 1.1 created on 03/02/89 at 20:39:42";

/*===================== DO NOT REMOVE OR EDIT ===========================*/


#include "objc.h"
#include "uil.h"

#include <string.h>


= BM_ToggleMenu: Menu (BM_WorkstationMsgs, UIMESSAGES)
{
}


-(int)indicator
   {
    return '*';
   }


-(BOOL)performActionOn:receiver with:arg1 with:arg2
   {
    BOOL currentlyOn;
    char str[200];
    char *s;

    if ((s = [self str]) != (char *) 0)
       strcpy (str, s);
    else
       {
        str[0] = 0;
        str[1] = 0;
       }

    currentlyOn = (str[0] == [self indicator]);

    if (currentlyOn)
       str[0] = ' ';
    else
       str[0] = [self indicator];

    [self assignSTR:str];

    [[self receiver] perform:[self selector] with:!currentlyOn];

    return YES;
   }

=:

/*===================== DO NOT REMOVE    EDIT ============================

        This comment and the following sccsId declaration are managed
        by SCCS for you. Do not edit or remove either.
```

```
Source file:     /users/bmw/Alpha/UserInterface/SCCS/s.BRCorner1.m
Latest version:  1.3
Last mod time:   06/22/89 at 16:55:21

=========================================================================*/

static char *sccsId = "@(#)BRCorner1.m rev 1.3 created on 06/22/89 at 16:55:21";

/*===================== DO NOT REMOVE OR EDIT ===========================*/

#include "objc.h"
#include "uil.h"
#include "BMWGlobal.h"

= BRCorner1:BorderLayer(BM_WorkstationMsgs,UIMESSAGES)
{
}

-initialize {

  [super initialize];
  [self borderWidth:0];
  [self insideColor:BM_colors.Frame];
  return self;
}

-(BOOL)cursorMove {

  [cursors.Corner beCursor];
  return YES;
}

-displayLayer {
  short midY,endX,endY;
  int   lightColorIndex = [BM_colors.LightFrameShadow colorIndex];
  int    darkColorIndex = [BM_colors.DarkFrameShadow  colorIndex];

  [super displayLayer];
  midY = [self height]-[self width];
  endX = [self width]-1;
  endY = [self height]-1;

  [self drawLineFrom:pt(0,0) to:pt(endX-1,0) colorIndex:lightColorIndex];
  [self drawLineFrom:pt(0,1) to:pt(0,midY+1) colorIndex:lightColorIndex];
  [self drawLineFrom:pt(1,1) to:pt(1,midY+1) colorIndex:lightColorIndex];
  [self drawLineFrom:pt(endX-1,1) to:pt(endX-1,endY) colorIndex:darkColorIndex];
  [self drawLineFrom:pt(endX,0) to:pt(endX,endY) colorIndex:darkColorIndex];
  [self drawLineFrom:pt(0,endY-1) to:pt(endX,endY-1) colorIndex:darkColorIndex];
  [self drawLineFrom:pt(0,endY) to:pt(endX,endY) colorIndex:darkColorIndex];

  return self;
}

=:

/*===================== DO NOT REMOVI    EDIT ============================

        This comment and the following sccsId declaration are managed
        by SCCS for you. Do not edit or remove either.

        Source file:     /users/bmw/Alpha/UserInterface/SCCS/s.BRCorner2.m
        Latest version:  1.3
        Last mod time:   06/22/89 at 16:55:42

=========================================================================*/
```

```
static char *sccsId = "@(#)BRCorner2.m rev 1.3 created on 06/22/89 at 16:55:42";

/*==================== DO NOT REMOVE OR EDIT ==========================*/

#include "objc.h"
#include "uil.h"
#include "BMWGlobal.h"

= BRCorner2:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  short endX,endY;
  int   lightColorIndex = [BM_colors.LightFrameShadow colorIndex];
  int    darkColorIndex = [BM_colors.DarkFrameShadow  colorIndex];

  [super displayLayer];
  endX = [self width]-1;
  endY = [self height]-1;

  [self drawLineFrom:pt(0,0) to:pt(endX,0) colorIndex:lightColorIndex];
  [self drawLineFrom:pt(0,1) to:pt(endX,1) colorIndex:lightColorIndex];
  [self drawLineFrom:pt(0,2) to:pt(0,endY-2) colorIndex:lightColorIndex];
  [self drawLineFrom:pt(1,endY-1) to:pt(endX,endY-1) colorIndex:darkColorIndex];
  [self drawLineFrom:pt(0,endY) to:pt(endX,endY) colorIndex:darkColorIndex];

  return self;
}


=:

/*==================== DO NOT REMOV'   EDIT ============================

        This comment and the following sccsId declaration are managed
        by SCCS for you. Do not edit or remove either.

        Source file:     %F%
        Latest version:  %I%
        Last mod time:   %H% at %U%

=====================================================================*/

static char *sccsId = "@(#)BinButton.m work in progress by bmw";

/*==================== DO NOT REMOVE OR EDIT ==========================*/


#include "objc.h"
#include "uil.h"
#include "site.h"

#include "BMWGlobal.h"
```

```
@requires EchoBox, EventQ, PopUpMenu, DepMenu, ImageLayer, ImageLayer3D;
@requires KL_Folder, BorderLayer, BM_AskDialogBox, Menu, CharString, BitMap,
          FileIconHandler;


= BinButton : BinIcon (BM_WorkstationMsgs, UIMESSAGES)
{
}


-open
 {
  id newIconHandler;

  [self highlight];

  newIconHandler = [FileIconHandler createInterfaceFor:client];

  [client newIconHandler:newIconHandler];
  [deskTop   installIcon:newIconHandler];

  [[newIconHandler show] open];

  client = [[client class] new];
  [deskTop install:client];

  [self unHighlight];

  return self;
 }


-unHighlight
{
    [title unHighlight];
    [self repaint];
    return self;
}


-highlight
{
    [title highlight];
    [self repaint];
    return self;
}

=:
/*===================== DO NOT REMOV    EDIT =============================

        This comment and the following sccsId declaration are managed
        by SCCS for you. Do not edit or remove either.

        Source file:     /users/bmw/Alpha/UserInterface/SCCS/s.BinIcon.m
        Latest version:  1.2
        Last mod time:   09/13/89 at 12:34:38

=======================================================================*/

static char *sccsId = "@(#)BinIcon.m rev 1.2 created on 09/13/89 at 12:34:38";

/*==================== DO NOT REMOVE OR EDIT ===========================*/
```

```
#include "objc.h"
#include "uil.h"
#include "site.h"

#include "BMWGlobal.h"


= BinIcon : IconHandler3D (BM_WorkstationMsgs, UIMESSAGES)
{
}


-defaultMenu
{
 return nil;
}


+createInterfaceFor:anObject
   {
    self = [super createInterfaceFor:anObject];

    [imageLayer borderWidth:2];

    return self;
   }


-assignSTR:(STR)aString
   {
    return [super assignSTR:[self defaultTitle]];
   }


-unHighlight
{
    [imageLayer showImage];
    [self repaint];
    return self;
}


-highlight
{
    [imageLayer hideImage];
    [self repaint];
    return self;
}
-(BOOL)rightButtonDown
   {
    return YES;
   }


-(BOOL)middleButtonDown
   {
    return YES;
   }

=:
/*==================== DO NOT REMOVI    EDIT ==========================

        This comment and the following sccsId declaration are managed
        by SCCS for you. Do not edit or remove either.
```

```
Source file:    /users/bmw/Alpha/UserInterface/SCCS/s.Border3DLyr.m
Latest version: 1.3
Last mod time:  07/14/89 at 14:06:51

==========================================================================*/

static char *sccsId = "@(#)Border3DLyr.m rev 1.3 created on 07/14/89 at 14:06:51";

/*===================== DO NOT REMOVE OR EDIT ==========================*/

#include "objc.h"
#include "uil.h"
#include "BMWGlobal.h"
#include "site.h"
#include <stdio.h>

extern id currentDisplay;

@requires BottomFrame,TopFrame,LeftFrame,RightFrame;
@requires BLCorner1,BLCorner2,BRCorner1,BRCorner2;
@requires TLCorner1,TLCorner2,TRCorner1,TRCorner2;
@requires Cursor,EventQ,ExtEBox;


= Border3DLayer:BorderLayer(BM_WorkstationMsgs,UIMESSAGES)
  {
  id aBottomFrame,aBLCorner1,aBLCorner2,aBRCorner1,aBRCorner2,aLeftFrame;
  id aRightFrame,aTLCorner1,aTLCorner2,aTopFrame,aTRCorner1,aTRCorner2;

  BOOL sizeLayer;
  short barHeight;
  }

- (PT)defaultExtent
  {
  return pt(400,300);
  }


- sizeLayer:(BOOL)aBooleanValue
  {
  sizeLayer = aBooleanValue;
  }


- (BOOL)sizeLayer
  {
  return sizeLayer;
  }


- defaultTopFrame
  {
  return [TopFrame attachTo:self];
  }


- defaultBottomFrame
  {
  return [BottomFrame attachTo:self];
  }

- defaultLeftFrame
  {
```

```
  return [LeftFrame attachTo:self];
  }


- defaultRightFrame
  {
  return [RightFrame attachTo:self];
  }


- defaultTLCorner1
  {
  return [TLCorner1 attachTo:self];
  }


- defaultTLCorner2
  {
  return [TLCorner2 attachTo:self];
  }


- defaultTRCorner1
  {
  return [TRCorner1 attachTo:self];
  }


- defaultTRCorner2
  {
  return [TRCorner2 attachTo:self];
  }


- defaultBLCorner1
  {
  return [BLCorner1 attachTo:self];
  }


- defaultBLCorner2
  {
  return [BLCorner2 attachTo:self];
  }


- defaultBRCorner1
  {
  return [BRCorner1 attachTo:self];
  }


- defaultBRCorner2
  {
  return [BRCorner2 attachTo:self];
  }


- barHeight:(short)aHeight
  {
  barHeight = aHeight;
  return self;
  }
```

```
- (short)barHeight
{
return barHeight;
}


- initialize
{
[super initialize];
borderWidth = 0;
extent = pt(9,9);       // StepStone code from StdLayer

[self insideColor:BM_colors.Frame];
[self barHeight:[BM_fonts.Application height]+4];

aTLCorner1   = [self defaultTLCorner1];
aTLCorner2   = [self defaultTLCorner2];
aTopFrame    = [self defaultTopFrame];
aTRCorner1   = [self defaultTRCorner1];
aTRCorner2   = [self defaultTRCorner2];
aLeftFrame   = [self defaultLeftFrame];
aBLCorner1   = [self defaultBLCorner1];
aBLCorner2   = [self defaultBLCorner2];
aBottomFrame = [self defaultBottomFrame];
aBRCorner1   = [self defaultBRCorner1];
aBRCorner2   = [self defaultBRCorner2];
aRightFrame  = [self defaultRightFrame];

[self sizeLayer:NO];
return self;
}


- resetFrame
{
int xSpan,ySpan,xTL,yTL;
PT aPoint;

aPoint = [self topLeft];
xTL = X(aPoint);
yTL = Y(aPoint);
aPoint = [self extent];
xSpan = X(aPoint);
ySpan = Y(aPoint);

[[aTLCorner1 origin:pt(xTL+0,yTL+0)] extent:pt(11,barHeight+10)];
[[aTLCorner2 origin:pt(xTL+[aTLCorner1 width]-1,yTL+0)]
   extent:pt(barHeight-1,11)];
[aTopFrame origin:pt(xTL+10+barHeight-1,yTL+0)];
[aTopFrame extent:pt(xSpan-20-2*(barHeight-1)-1,11)];

[[aTRCorner1 origin:pt(xTL+xSpan-[aTRCorner1 width],yTL+0)]
   extent:pt(11,barHeight+10)];
[[aTRCorner2 origin:pt(xTL+xSpan-[aTRCorner1 width]-(barHeight-1),yTL+0)]
   extent:pt(barHeight-1,11)];

[aLeftFrame origin:pt(xTL+0,yTL+barHeight+10)];
[aLeftFrame extent:pt(11,ySpan-20-(2*barHeight))];

[aRightFrame origin:pt(xTL+xSpan-11,yTL+barHeight+10)];
[aRightFrame extent:pt(11,ySpan-20-(2*barHeight))];

[[aBLCorner1 origin:pt(xTL+0,yTL+ySpan-10-barHeight)]
```

```
   extent:pt(11,10+barHeight)];
[[aBLCorner2 origin:pt(xTL+11,yTL+ySpan-11)]
   extent:pt(barHeight-2,11)];

[aBottomFrame origin:pt(xTL+10+barHeight-1,yTL+ySpan-11)];
[aBottomFrame extent:pt(xSpan-20-2*(barHeight-1),11)];

[[aBRCorner1 origin:pt(xTL+xSpan-11,yTL+ySpan-10-barHeight)]
   extent:pt(11,10+barHeight)];
[[aBRCorner2 origin:pt(xTL+xSpan-10-barHeight+1,yTL+ySpan-11)]
   extent:pt(barHeight-2,11)];

return self;
}


- format
{
[self resetFrame];
return self;
}


- repairRegion:aRegion
{
id newRegion,rootLayer;
BOOL visibility;

if (visibility = [self visible] )
   [self setVisible:NO];

if (visibility )
   {
   [self setVisible:YES];
   [self repaint];
   newRegion = [self displayBox];

   aRegion = [aRegion subtract:newRegion];
   if (aRegion )
      {
      rootLayer = [self rootLayer];
      [[self rootLayer] repaint:aRegion];
      [aRegion freeAll];
      }
    [newRegion freeAll];
    }
return self;
}


- sizeFromUserUsingMethod:(SEL)resizeMethod
{
id anEchoBox;
id aRegion;

anEchoBox = [ExtEBox new];
[[anEchoBox origin:[self origin]] extent:[self extent]];
[anEchoBox perform:resizeMethod];
aRegion = [[self clipList] copyList];
[[self origin:[anEchoBox origin]] extent:[anEchoBox extent]];
[self repairRegion:aRegion];
anEchoBox = [anEchoBox free];
return self;
}
```

```
- (BOOL)leftButtonDown
  {
  if (((aTLCorner1==[self frontLayerContaining:event.origin]) ||
       (aTLCorner2==[self frontLayerContaining:event.origin])) &&
       [self sizeLayer])
     [self sizeFromUserUsingMethod:@selector(sizeTopLeftFromUser)];
  if (((aBLCorner1==[self frontLayerContaining:event.origin]) ||
       (aBLCorner2==[self frontLayerContaining:event.origin])) &&
       [self sizeLayer])
     [self sizeFromUserUsingMethod:@selector(sizeBottomLeftFromUser)];
  if (((aTRCorner1==[self frontLayerContaining:event.origin]) ||
       (aTRCorner2==[self frontLayerContaining:event.origin])) &&
       [self sizeLayer])
     [self sizeFromUserUsingMethod:@selector(sizeTopRightFromUser)];
  if (((aBRCorner1==[self frontLayerContaining:event.origin]) ||
       (aBRCorner2==[self frontLayerContaining:event.origin])) &&
       [self sizeLayer])
     [self sizeFromUserUsingMethod:@selector(sizeBottomRightFromUser)];
  if (aBottomFrame==[self frontLayerContaining:event.origin] &&
       [self sizeLayer])
     [self sizeFromUserUsingMethod:@selector(sizeBottomFromUser)];
  if (aTopFrame==[self frontLayerContaining:event.origin] &&
       [self sizeLayer])
     [self sizeFromUserUsingMethod:@selector(sizeTopFromUser)];
  if (aLeftFrame==[self frontLayerContaining:event.origin] &&
       [self sizeLayer])
     [self sizeFromUserUsingMethod:@selector(sizeLeftFromUser)];
  if (aRightFrame==[self frontLayerContaining:event.origin] &&
       [self sizeLayer])
     [self sizeFromUserUsingMethod:@selector(sizeRightFromUser)];

  [self toFront];
  return YES;
  }


- extent: (PT)aPoint
  {
  PT oldExtent;
  oldExtent = [self extent];
  if (ptIsEqual(aPoint,oldExtent))
     return self;

  [super extent:aPoint];
  [self format];
  [self changed:@selector(extent:)];
  return self;
  }


- freeFrameLayers
  {
  if (frontLayers)
     {
     [aBottomFrame free];
     [aBLCorner1 free];
     [aBLCorner2 free];
     [aBRCorner1 free];
     [aBRCorner2 free];
     [aLeftFrame free];
     [aRightFrame free];
     [aTLCorner1 free];
     [aTLCorner2 free];
     [aTopFrame free];
```

```
    [aTRCorner1 free];
    [aTRCorner2 free];
    }
  return self;
  }


- terminate$
  {
  if (frontLayers)
     [self freeFrameLayers];
  [super terminate$];
  return self;
  }
=:

=:

/*==================== DO NOT REMOV    EDIT ============================

        This comment and the following sccsId declaration are managed
        by SCCS for you. Do not edit or remove either.

        Source file:      /users/bmw/Alpha/UserInterface/SCCS/s.String3DLyr.m
        Latest version:  1.1
        Last mod time:    07/19/89 at 11:26:18

=======================================================================*/

static char *sccsId = "@(#)String3DLyr.m rev 1.1 created on 07/19/89 at 11:26:18";

/*==================== DO NOT REMOVE OR EDIT ==========================*/

#include "stdio.h"
#include "objc.h"
#include "uil.h"
#include "mivarargs.h"

extern id currentDisplay, baseLayer;

@requires BitMap, CharString, Cursor, DispText;

= String3DLayer: RidgeLayer (BM_WorkstationMsgs,UIMESSAGES)
  {
  id myDispString;
  id backgroundImage;
  }


+ str:(STR)aString
  {
  return [self str: aString font: [DispText defaultFont]];
  }


+ sprintf:(STR)fmt; va_declare(va_alist);
  {
  char buf[BUFSIZ];
  va_list ap;
  va_start(ap);
  vsprintf(buf, fmt, ap);
  va_end(ap);
  return [self str:buf];
  }
```

```
+ PRIVATE dispText: aDispText
  {
  self = [self new];
  [self dispText: aDispText];
  return self;
  }


+ charString: aCharString
  {
  return [self str: [aCharString str] font: [DispText defaultFont]];
  }


+ str:(STR)aString font:aFont
  {
  self = [self new];
  [self dispText: [DispText str: aString font: aFont]];
  return self;
  }


+ str:(STR)aString font:aFont color:aSolidColor
  {
  return [[self str: aString font: aFont] color: aSolidColor ];
  }


- initialize
  {
  [super initialize];

  myDispString = nil;
  backgroundImage = nil;
  return self;
  }


- assignSTR: (STR)aString
  {
  if (myDispString)
     {
     [myDispString assignSTR: aString];
     }
  else
     {
     [self dispText: [DispText str: aString]];
     }
  return self;
  }


- assign:aCharString
  {
  if (myDispString )
     {
     [myDispString assignSTR: [aCharString str]];
     }
  else
     {
     [self dispText: [DispText str: [aCharString str]]];
     }
  return self;
  }
```

```
- font:aFont
  {
  [myDispString font: aFont];
  return self;
  }


- color:aSolidColor
  {
  [myDispString color: aSolidColor];
  return self;
  }


- insideColor:aSolidColor
  {
  [super insideColor: aSolidColor];
  [myDispString backgroundColor: insideColor];
  return self;
  }



- PRIVATE dispText:aDispText
  {
  if (myDispString)
     {
     [myDispString removeDependent: self];
     [myDispString free];
     }
  myDispString = aDispText;
  [myDispString addDependent: self];
  [myDispString backgroundColor: [self insideColor]];

  [self extent: [self defaultExtent]];
  [self changed: @selector(dispText:)];
  return self;
  }


- (PT)defaultExtent
  {
  return [myDispString defaultExtent];
  }


- (STR)str
  {
  return [myDispString str];
  }


- font
  {
  return [myDispString font];
  }


- (short)colorIndex
  {
  return [myDispString colorIndex];
  }
```

```
- color
{
return [myDispString color];
}


- dispText
{
return myDispString;
}


- (unsigned)length
{
if (myDispString)
    return [myDispString length];
else
    return 0;
}

- (int)asInt
{
return [myDispString asInt];
}


- (long)asLong
{
return [myDispString asLong];
}


- (double)asFloat
{
return [myDispString asFloat];
}


- (double)asDouble
{
return [myDispString asDouble];
}


- (STR)asStr
{
return [myDispString str];
}


- asSTR: (STR)aString maxSize: (int)aSize
{
[myDispString asSTR: aString maxSize: aSize];
return self;
}


- asId
{
return [CharString str: [self str]];
}


- (BOOL)isEqualSTR:(STR)aString
{
```

```
 return [myDispString isEqualSTR: aString];
 }


- printOn:(IOD)anIOD
 {
 [myDispString printOn: anIOD];
 return self;
 }


- (char)charAt:(unsigned)anOffset
 {
 return [myDispString charAt: anOffset];
 }


- (char)charAt:(unsigned)anOffset put:(char)aChar
 {

/*==================== DO NOT REMOVI    EDIT ============================

       This comment and the following sccsId declaration are managed
       by SCCS for you. Do not edit or remove either.*

       Source file:     /users/bmw/Alpha/UserInterface/SCCS/s.BottomFrame.m
       Latest version:  1.3
       Last mod time:   06/22/89 at 16:55:55

=======================================================================*/

static char *sccsId = "@(#)BottomFrame.m rev 1.3 created on 06/22/89 at 16:55:55";

/*==================== DO NOT REMOVE OR EDIT ==========================*/

#include "objc.h"
#include "uil.h"
#include "BMWGlobal.h"

= BottomFrame:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  int xBR;
  PT aPoint;
  int   lightColorIndex = [BM_colors.LightFrameShadow colorIndex];
  int    darkColorIndex = [BM_colors.DarkFrameShadow  colorIndex];


  [super displayLayer];

  aPoint = [self extent];
  xBR = X(aPoint)-1;
```

```
  [self drawLineFrom:pt(0,0) to:pt(xBR,0) colorIndex:lightColorIndex];
  [self drawLineFrom:pt(0,1) to:pt(xBR,1) colorIndex:lightColorIndex];
  [self drawLineFrom:pt(xBR,2) to:pt(xBR,8) colorIndex:darkColorIndex];
  [self drawLineFrom:pt(0,2) to:pt(0,9) colorIndex:lightColorIndex];
  [self drawLineFrom:pt(1,9) to:pt(xBR,9) colorIndex:darkColorIndex];
  [self drawLineFrom:pt(0,10) to:pt(xBR,10) colorIndex:darkColorIndex];

  return self;
}

=:

/*==================== DO NOT REMOVI    EDIT ============================

       This comment and the following sccsId declaration are managed
       by SCCS for you. Do not edit or remove either.

       Source file:     /users/bmw/Alpha/UserInterface/SCCS/s.Button3D.m
       Latest version:  1.10
       Last mod time:   09/04/89 at 20:05:57

=======================================================================*/

static char *sccsId = "@(#)Button3D.m rev 1.10 created on 09/04/89 at 20:05:57";

/*==================== DO NOT REMOVE OR EDIT ===========================*/

#include "objc.h"
#include "uil.h"
#include "site.h"
#include "BMWGlobal.h"
#include <stdio.h>

#define SPACE 8

@requires ImageLayer;

= Button3D:String3DLayer(BM_WorkstationMsgs,UIMESSAGES)
  {
  id offColor;
  id onColor;
  BOOL active;
  SEL onSelector;
  id onArgument;
  id onReceiver;
  SEL offSelector;
  id offArgument;
  id offReceiver;

  id myPicture;
  }



- initialize
  {
  active = NO;
  [super initialize];
  offColor = [colors.Black copy];
  onColor = [colors.Red copy];

  onReceiver = nil;
  offReceiver = nil;
  onSelector = (SEL) 0;
  offSelector = (SEL) 0;
```

```
 onArgument = nil;
 offArgument = nil;

 [insideColor free];
 insideColor=offColor;

 myPicture = nil;
 return self;
 }

- insideColor: aSolidColor {
    if (active)
        [self onColor:aSolidColor];
    else
        [self offColor:aSolidColor];
    return self;
}

- onColor: aSolidColor {
    if ( !onColor || ![aSolidColor sameColor: onColor] ) {
        if (onColor) [onColor free];
        onColor = [aSolidColor copy];
        if ( active ) {
            insideColor = onColor;
            [myDispString backgroundColor: insideColor];
        }
    }
    return self;
}

- offColor: aSolidColor {
    if ( !offColor || ![aSolidColor sameColor: offColor] ) {
        if (offColor)[offColor free];
        offColor = [aSolidColor copy];
        if ( !active )  {
           insideColor = offColor;
           [myDispString backgroundColor:insideColor];
        }
    }
    return self;
}

- onReceiver: aReceiver {
    onReceiver = aReceiver;
    return self;
}

- onSelector: (SEL)aSelector {
    onSelector = aSelector;
    return self;
}

- onArgument: anArgument {
    onArgument = anArgument;
    return self;
}
```

```
- onSelector: (SEL)aSelector onReceiver: aReceiver onArgument: anArgument {
    [self onSelector: aSelector];
    [self onReceiver: aReceiver];
    [self onArgument: anArgument];
    return self;
}

-offSelector: (SEL)aSelector offReceiver: aReceiver offArgument: anArgument {
    [self offReceiver: aReceiver];
    [self offSelector: aSelector];
    [self offArgument: anArgument];
    return self;
}

- offReceiver: aReceiver {
    offReceiver = aReceiver;
    return self;
}

- offSelector: (SEL)aSelector {
    offSelector = aSelector;
    return self;
}

-offArgument: anArgument {
        offArgument = anArgument;
        return self;
}

- onColor {
        return onColor;
}

- offColor {
        return offColor;
}

-(PT)defaultExtent {
    PT myExtent;
    short width, height, border;

    myExtent = [super defaultExtent];
    border = 2*[self borderWidth];
    width = X(myExtent) + border + SPACE;
    height = Y(myExtent) + border + SPACE;
    return pt(width,height);
}

- onReceiver {
    return onReceiver;
}

-(SEL)onSelector {
    return onSelector;
}
```

```
- onArgument {
    return onArgument;
}


- offReceiver {
    return offReceiver;
}


- (SEL)offSelector {
    return offSelector;
}


- offArgument {
    return offArgument;
}



- (BOOL)isActive {
    return active;
}


- on {
    active = YES;
    insideColor = onColor;
    [myDispString backgroundColor:insideColor];
    [self repaint];
    if (onSelector)
        [onReceiver perform: onSelector with: onArgument];
    return self;
}


- off {
    active = NO;
    insideColor = offColor;
    [myDispString backgroundColor:insideColor];
    [self repaint];
    if (offSelector)
        [offReceiver perform: offSelector with: offArgument];
    return self;
}


- toggle {
    if (active)
        return [self off];
    else
        return [self on];
}


- (BOOL)leftButtonDown {
    [self toggle];
    return YES;
}


- terminate$ {

    [self deactivate];
```

```
    // The super free in BorderLayer will free the active color
    // which is set to the inside color so we don't free that one.
    if (active)
        [offColor free];
    else
        [onColor free];

    return [super terminate$];
}


-awakeFrom: aFiler {
    [super awakeFrom: aFiler];
    [onArgument notOwner$];
    [onReceiver notOwner$];
    [offArgument notOwner$];
    [offReceiver notOwner$];
    return self;
}



- format
  {
  if (myPicture)
     [myDispString center:pt([self left]+
        (short)(([self width]-[myPicture width])/2),[self centerY])];
  else [super format];
  return self;
  }



- myPicture
  {
  return myPicture;
  }


- myPicture:aBitMap
  {
  if (myPicture)
     myPicture = [myPicture free];
  myPicture = [ImageLayer createInterfaceFor:aBitMap];

  [[myPicture attachTo:self]
     origin:pt([self right]-[myPicture width]-2,
        [self centerY]-(short)([myPicture height]/2))];
  [self format];
  return self;
  }


- PRIVATE processKey {
        switch (event.ascii) {
            case '\n':  /* line feed */
            case '\r':  /* carriage return  */

                if ([[self backLayer] respondsTo:@selector(carriageReturn)])
                   [[self backLayer] carriageReturn];

                break;

            case '\t':  /* tab */
```

```
            if ([[self backLayer] respondsTo:@selector(tab:)])
               [[self backLayer] tab:self];

            break;

         case '\003':        /* cntl c = abort */
         case '\033':        /* ESC = abort */

            if ([[self backLayer] respondsTo:@selector(escape)])
               [[self backLayer] escape];

            break;

         default:
            break;
      }

   return self;
}


-(BOOL)processEvent
  {
   if ((event.code != KEYBOARDEVENT) ||
       ([self processKey] == nil))
      return [super processEvent];
   else
      return YES;
  }



- activate
  {
   [baseLayer grabKeyboardFocus:self];

   return self;
  }


-deactivate
  {
   [baseLayer releaseKeyboardFocus:self];

   return self;
  }


-loseKeyboardFocus
  {
   return [self deactivate];
  }


=:

/*==================== DO NOT REMOVE    EDIT ==============================

      This comment and the following sccsId declaration are managed
      by SCCS for you. Do not edit or remove either.

      Source file:    /users/bmw/Alpha/UserInterface/SCCS/s.ButtonGroup.m
      Latest version: 1.4
      Last mod time:  07/28/89 at 19:26:19
```

```
========================================================================*/

static char *sccsId = "@(#)ButtonGroup.m rev 1.4 created on 07/28/89 at 19:26:19";

/*==================== DO NOT REMOVE OR EDIT ============================*/


#include "objc.h"
#include "uil.h"
#include "site.h"
#include <stdio.h>


= ButtonGroup:LayerGroup(BM_WorkstationMsgs,UIMESSAGES)
  {
  }


- format {
    short i;            // For loop counter
    short count;        // Number of front layers
    short totalWidth;   // Width of all the front layers added together
    short totalHeight;  // Height of all the front layers added together
    id aLayer;          // A front layer
    BOOL vertical;      // YES if best visual way is vertical
    short xSpacing;     // Used to figure out best visual way to format
    short ySpacing;     // Used to figure out best visual way to format
    PT myExtent;        // My extent
    PT alignPoint;      // Next place to put a layer
    PT layerExtent;     // Extent of a front layer

    myExtent = [self extent];
    count=[frontLayers size];
    if (count) {
        totalWidth = 0;
        totalHeight = 0;
        for (i=0; i<count; i++) {
            layerExtent = [[frontLayers at:i] outsideExtent];
            totalWidth += X(layerExtent);
            totalHeight += Y(layerExtent);
        }

        xSpacing = (X(myExtent)-totalWidth)/(count+1);
        ySpacing = (Y(myExtent)-totalHeight)/(count+1);

        if (xSpacing > ySpacing)
            vertical = NO;
        else
            vertical = YES;

        if (vertical)
            alignPoint = [self topLeft];
        else
            alignPoint = [self centerLeft];

        for (i=0;i<count;i++){
            aLayer=[frontLayers at:i];
            if (vertical) {
                [aLayer outsideOrigin: ptPlus(alignPoint,pt(0,ySpacing))];
                alignPoint =
                   ptPlus([aLayer outsideOrigin],pt(0,[aLayer outsideHeight]));
            }
            else {
               [aLayer outsideOrigin:ptPlus(alignPoint,
                  pt(xSpacing,(short)(-[aLayer outsideHeight]/2)))];
```

```
            alignPoint = pt([aLayer adjacentRight],[aLayer centerY]);
        }
      }
    }
    return self;
}


- addButton:aButton
  {
  [self addFrontLayer:aButton];
  return self;
  }

=:

/*===================== DO NOT REMOVE    EDIT ============================

        This comment and the following sccsId declaration are managed
        by SCCS for you. Do not edit or remove either.*

        Source file:     /users/bmw/Alpha/UserInterface/SCCS/s.CSMore.m
        Latest version:  1.2
        Last mod time:   02/23/89 at 09:54:41

========================================================================*/

static char *sccsId = "@(#)CSMore.m rev 1.2 created on 02/23/89 at 09:54:41";

/*===================== DO NOT REMOVE OR EDIT ==========================*/

// (c) Batterymarch, Stepstone 1988.  All rights reserved.
// Report Writer
//
// $Source: /usr/u/lisa/batterymarch/reportwriter/RCS/CharStringMore.m,v $
// $Revision: 1.1 $
// $Date: 88/10/12 13:08:57 $ $State: Exp $
// $Product: $
//
// $Class name: CSMore (CharStringMore)

/*
$Description: Extensions to the CharString class.
*/

// Include Files
#include "objc.h"
#include "uil.h"

= CSMore: CharString (BM_WorkstationMsgs, UIMESSAGES) {
}

/*
Set the receiver's string to the string representing aNumber.
Returns self.
*/
-strFromInt: (int)aNumber {
    int anInt, rem;
    id buffer;
    short numChar = 0;
    anInt = aNumber;
    buffer = [CharString str: "          "];
    while ( anInt != 0 ) {
        rem = anInt % 10;
```

```
        [buffer charAt: 10-(++numChar) put: (char)((int)'0' + rem)];
        anInt = (anInt - rem)/10;
    }
    [self assignSTR: [buffer str]];
    [self stripLeadingBlanks];
    return self;
}

/*
Create and return an instance of CharStringMore initialize to the string
representing anInt.
*/
+fromInt: (int)anInt {
    self = [super new];
    [self strFromInt: anInt];
    return self;
}

/*
Strip all leading blanks from the receiver's string.  Returns self.
*/
-stripLeadingBlanks {
    int i, j;
    i = 0;
    while ( [self charAt: i++] == ' ');
    i = i-1;
    for(j = 0; i < [self length]; i++,j++)
        [self charAt: j put: [self charAt: i]];
    [self charAt: j put: '\0'];
    return self;
}

/*
Add the character aChar to the end of the receiver.  Returns self.
*/
-addChar:(char)aChar {
    [self concatSTR: " "];
    [self charAt: [self length] -1 put: aChar];
    return self;
}

=:

/*==================== DO NOT REMOVE    EDIT ===========================

        This comment and the following sccsId declaration are managed
        by SCCS for you. Do not edit or remove either."

        Source file:     /users/bmw/Alpha/UserInterface/SCCS/s.CloseBar.m
        Latest version:  1.2
        Last mod time:   06/22/89 at 16:59:02

=====================================================================*/

static char *sccsId = "@(#)CloseBar.m rev 1.2 created on 06/22/89 at 16:59:02";

/*==================== DO NOT REMOVE OR EDIT ==========================*/

#include "objc.h"
#include "uil.h"
#include "BMWGlobal.h"
#include <stdio.h>

= CloseBar:BorderLayer(BM_WorkstationMsgs,UIMESSAGES)
```

```
{
}

-initialize {

  [super initialize];
  [self borderWidth:0];
  [self insideColor:BM_colors.Frame];
  return self;
}

-(BOOL)cursorMove {

  [cursors.Normal beCursor];
  return YES;
}

-displayLayer {
  short endX,endY;
  short cX,cY;

  int   lightColorIndex = [BM_colors.LightFrameShadow colorIndex];
  int    darkColorIndex = [BM_colors.DarkFrameShadow  colorIndex];

  [super displayLayer];
  endX = [self width]-1;
  endY = [self height]-1;
  cX = (short)(endX/2);
  cY = (short)(endY/2);

  [self drawLineFrom:pt(0,0) to:pt(endX,0) colorIndex:lightColorIndex];
  [self drawLineFrom:pt(0,1) to:pt(0,endY-1) colorIndex:lightColorIndex];
  [self drawLineFrom:pt(endX,1) to:pt(endX,endY-2) colorIndex:darkColorIndex];
  [self drawLineFrom:pt(1,endY-1) to:pt(endX,endY-1)
     colorIndex:darkColorIndex];
  [self drawLineFrom:pt(0,endY) to:pt(endX,endY) colorIndex:darkColorIndex];

  [self drawLineFrom:pt(cX-2,cY-2) to:pt(cX+1,cY-2)
     colorIndex:lightColorIndex];
  [self drawLineFrom:pt(cX-2,cY-1) to:pt(cX-2,cY+1)
     colorIndex:lightColorIndex];
  [self drawLineFrom:pt(cX-1,cY+1) to:pt(cX+1,cY+1) colorIndex:darkColorIndex];
  [self drawLineFrom:pt(cX+1,cY-1) to:pt(cX+1,cY) colorIndex:darkColorIndex];
  return self;
}

-terminate$ {

  [super terminate$];
  return self;
}
=:
/*===================== DO NOT REMOV    EDIT =============================

       This comment and the following sccsId declaration are managed
       by SCCS for you. Do not edit or remove either.*

       Source file:     /users/bmw/Alpha/UserInterface/SCCS/s.Confirmer.m
       Latest version:  1.2
       Last mod time:   08/27/89 at 16:54:55

=======================================================================*/

static char *sccsId = "@(#)Confirmer.m rev 1.2 created on 08/27/89 at 16:54:55";
```

```
/*==================== DO NOT REMOVE OR EDIT ===========================*/

#include "objc.h"
#include "uil.h"
#include "BMWGlobal.h"

#define YESSTR  " Yes "
#define NOSTR   " No "
#define SPACE   10

extern id currentDisplay, baseLayer;

@requires Cursor, EventQ, String3DLayer;

= Confirmer: String3DLayer (BM_WorkstationMsgs,UIMESSAGES) {
/*
Object for an affirmative answer to the question.  This instance owns the
object in this instance variable.
*/
id yesObject;

/*
Object for a negative answer to the question.  This instance owns the object
in this instance variable.
*/
id noObject;
}

/* $Default Category: Interrogation $ */

/*
Returns the default size of the receiver.  The default width of a Confirmer is
the maximum of the length of the question string and the width of the two
answer areas, plus some border space.  The default height of a Confirmer is
the height of the question string plus the height of the tallest of the YES
and NO areas plus some border space.
*/
-(PT)defaultExtent {
        PT myHeight, myWidth;

        // The width is the bigger of  (the string or the two areas plus
        // the space between the areas) plus space on either side for
        // a border
        myWidth = max([myDispString width],
            [yesObject outsideWidth]+[noObject outsideWidth]+SPACE) + 2*SPACE;

        myHeight = (3*SPACE) + [myDispString height] +
            max ([yesObject outsideHeight], [noObject outsideHeight]);

        return pt(myWidth, myHeight);
}

/*
Returns the default string used for t    ffirmative answer.  The default string
on the affirmative answer area is " Yes ".
*/
-(STR)defaultYesStr {
    return YESSTR;
}

/*
Returns the default string used for the negative answer.  The default string
on the negative answer area is " No ".
*/
```

```
-(STR)defaultNoStr {
    return NOSTR;
}

/*
Returns the YES answer object.
*/
-yes {
    return yesObject;
}

/*
Returns the YES answer area's string.
*/
-(STR)yesStr {
    return [yesObject str];
}

/*
Returns the NO answer object.
*/
-no {
    return noObject;
}

/*
Returns the NO answer area's string.
*/
-(STR)noStr {
    return [noObject str];
}

/*
Returns the default yes object for the receiver.  The default yes object is
an instance of StringLayer with the defaultYesStr as the string.  Its
insideColor is colors.Green and it has a border of 2.  It is sized with
extra space between the string and its borders.  This method transfers
ownership of the object it creates to the calling context.
*/
-defaultYesObject {
    id yes;
    yes = [[String3DLayer str: [self defaultYesStr]]
                insideColor: colors.Green];
    return [yes extent: ptPlus([yes defaultExtent], pt(SPACE,SPACE))];
}

/*
Returns the default no object for the receiver.  The default no object is
an instance of StringLayer with the defaultNoStr as the string.  Its
insideColor is colors.Red and it has a border of 2.  It is sized with
extra space between the string and its borders.  This method transfers
ownership of the object it creates to the calling context.
*/
-defaultNoObject {
    id no;
    no = [[String3DLayer str: [self defaultNoStr]]
                insideColor: colors.Red];
    return [no extent: ptPlus([no defaultExtent], pt(SPACE,SPACE))];
}

/* $Default Category: Setting $ */

/*
Changes the yes object to anObject.  anObject must respond to the StringLayer
```

```
protocol. The old yes object is freed.  The receiver assumes ownership
of anObject.  Returns self.
*/
-yes: anObject {
    if ( yesObject){
        [self removeFrontLayer: yesObject];
        [yesObject free];
    }
    yesObject = anObject;
    [yesObject attachTo: self];
    return self;
}

/*
Changes the string on the yes area to aString.  The extent of the yes object is
updated to reflect the new string. Returns self.
*/
-yesSTR: (STR)aString {
    [yesObject assignSTR: aString];
    [yesObject extent: ptPlus([yesObject defaultExtent], pt(SPACE,SPACE))];
    return self;
}

/*
Changes the no object to anObject.  anObject must respond to the StringLayer
protocol. The old no object is freed.  The receiver assumes ownership
of anObject.  Returns self.
*/
-no: anObject {
    if (noObject) {
        [self removeFrontLayer: noObject];
        [noObject free];
    }
    noObject = anObject;
    [noObject attachTo:self];
    return self;
}

/*
Changes the string on the no area to aString.  The extent of the no object is
updated to reflect the new string. Returns self.
*/
-noSTR: (STR)aString {
    [noObject assignSTR: aString];
    [noObject extent: ptPlus([noObject defaultExtent], pt(SPACE,SPACE))];
    return self;
}

/* $Default Category: Initialization $ */

/*
Initializes the receiver.  A Confirmer is initialized to have a borderWidth of
4 pixels, a yes area specified by |-defaultYesObject|, a no area specified by
|-defaultNoObject| and an extent specified by |-defaultExtent|.  Returns self.
*/
-initialize {
    [super initialize];
    [self borderWidth: 4];

    yesObject = [self defaultYesObject];
    [yesObject attachTo: self];
    noObject = [self defaultNoObject];
    [noObject attachTo: self];
```

```
    [self extent: [self defaultExtent]];
    [self insideColor:BM_colors.Frame];
    return self;
}

/* $Default Category: Freeing */

/*
Frees the two answer areas, then frees self.  Returns nil.
*/
- terminate$ {
    if(frontLayers) {
        if(yesObject) {
            [self removeFrontLayer: yesObject];
            yesObject =[yesObject free];
        }
        if(noObject){
            [self removeFrontLayer: noObject];
            noObject = [noObject free];
        }
    }
    return [super terminate$];
}

/* $Default Category: Activation $ */

/*
Activates the receiver.  Activation causes the receiver to be displayed at
aPoint.  The upper left hand corner of the receiver is displayed at aPoint.
The receiver absorbs all events until the user presses and releases a mouse
button. Returns YES if the button was pressed over the affirmative answer,
otherwise returns NO.
*/
- (BOOL)askAt: (PT)aPoint {
    BOOL response;

    // Change cursor so it is easier to read the question
    [Cursor push: cursors.Marker];

    // Attach it in case a repaint is needed while waiting for user
    [self attachTo: baseLayer];

    // Blast the receiver up onto the screen
    [self openAt: aPoint];

    [EventQ readEvent];

    // wait for user to select the response
    [EventQ waitButton];

    // wait for user to release the button
    [EventQ waitNoButton];

    // Assume NO unless the button pressed in yes area
    if ([yesObject outsideContainsPt: [EventQ origin]])
        response = YES;
    else
        response = NO;

    // Don't forget to remove it
    [baseLayer removeFrontLayer: self];

    // Restore the cursor
    [Cursor pop];
```

```
    // Remove the receiver by replacing what was covered
    [self closeUp];

    // Return the answer
    return response;
}

/*
Activates the receiver.  Activation causes the receiver to be displayed at
aPoint.  The receiver absorbs all events until the user presses and
releases a mouse button over one of the answer areas. Returns YES if the button
was pressed over the affirmative answer, or NO if the mouse button was pressed
over the negative answer.
*/
- (BOOL)forceAnswerAt: (PT)aPoint {
    BOOL response;

    // Change cursor so it is easier to read the question
    [Cursor push: cursors.Marker];

    // Blast the receiver up onto the screen
    [self openAt: aPoint];

    // Attach it in case a repaint is needed while waiting for user
    [self attachTo: baseLayer];

    [EventQ readEvent];

    // Repeat until mouse button is pressed over one of the answer areas
    do {

        // wait for user to select the response
        [EventQ waitButton];
        // wait for user to release the button
        [EventQ waitNoButton];

    } while (![yesObject outsideContainsPt: [EventQ origin]] &&
                ![noObject outsideContainsPt: [EventQ origin]]);

    // Figure out what the user answered
    if ([yesObject outsideContainsPt: [EventQ origin]])
        response = YES;
    else
        response = NO;

    // Restore the cursor
    [Cursor pop];

    // Don't forget to remove it
    [baseLayer removeFrontLayer: self];

    // Remove the receiver by replacing what was covered up
    [self closeUp];

    // Return answer
    return response;
}

/*
Activates the receiver.  Activation     es the receiver to be displayed
centered on the location of the last event.  The receiver requires the
user to answer in the same format as the |-askAt:| method.  The return value
is as described in the |-askAt:| method.
```

```
*/
- (BOOL)ask {
        return [self askAt: [[self center: [EventQ origin]] origin]];
}

/* $Default Category: Instance Creation $ */

/*
Asks the user aQuestion and behaves as described in the |-ask| method, then
frees the receiver.  Return value is as described by the |-ask| method.
*/
+ (BOOL)askSTR: (STR)aQuestion {
    BOOL response;
    self = [self str: aQuestion];
    response = [self ask];
    [self free];
    return response;
}

/* $Default Category: Formating $ */

/*
Formats the receiver so that the question is centered at the middle of the
receiver horizontally, and 1/4 from the top vertically.  The yes area is
centered at the point 1/4 in from the left and 3/4 down from the top. The
no area is centered 3/4 in from the left and 3/4 down from the top.
Subclasses should override this method to change the default locations of
the answer areas and the receiver's string.  Returns self.
*/
-format {
    [myDispString center: [self asRelative: [self pointAt: 0.5 : 0.25]]];
    [yesObject center:[self pointAt: 0.25 : 0.75]];
    [noObject center:[self pointAt: 0.75 : 0.75]];
    return self;
}

/*
Formats the receiver in the default manner.  The default manner for a Confirmer
is to size the yes and no objects big enough to see their strings, and to
use |-defaultExtent| to size the receiver.  The receiver is formatted as
described in the |-format| method.  Returns self.
*/
-defaultFormat {
    [yesObject extent: ptPlus([yesObject defaultExtent], pt(SPACE,SPACE))];
    [noObject extent: ptPlus([noObject defaultExtent], pt(SPACE,SPACE))];
    [self extent: [self defaultExtent]];
    [self format];
    return self;
}

=:

/*==================== DO NOT REMOV    EDIT ============================

        This comment and the following sccsId declaration are managed
        by SCCS for you. Do not edit or remove either.*

        Source file:      /users/bmw/Alpha/UserInterface/SCCS/s.ControlPanel.m
        Latest version:   1.16
        Last mod time:    09/13/89 at 12:35:25

=====================================================================*/

static char *sccsId = "@(#)ControlPanel.m rev 1.16 created on 09/13/89 at 12:35:25";
```

```
/*===================== DO NOT REMOVE OR EDIT ============================*/

#include "objc.h"
#include "uil.h"
#include "BMWGlobal.h"
#include <stdio.h>

@requires Font,SolidColor, BM_SolidColor;


#define REPLACE_COLOR(color, newValue) { \
                                        [color free]; \
                                        color = newValue; \
                                       }


= ControlPanel:Object(BM_WorkstationMsgs,UIMESSAGES)

{
}

-setColors
 {
  BM_colors.DeskTop          = [BM_SolidColor colorName:"black"
                                        inverseColorName:"white"];
  BM_colors.Background          = [BM_SolidColor colorName:"seaGreen"
                                        inverseColorName:"white"];

  BM_colors.MenuBar    = [SolidColor
     colorIndex:[BM_colors.Background colorIndex]];
  [BM_colors.MenuBar
     inverseColorIndex:[BM_colors.Background inverseColorIndex]];

  BM_colors.Foreground       = [BM_SolidColor colorName:"white"
                                        inverseColorName:"white"];
  BM_colors.Text             = [BM_SolidColor colorName:"black"
                                        inverseColorName:"navy"];
  BM_colors.Border           = [BM_SolidColor colorName:"black"
                                        inverseColorName:"white"];
  BM_colors.VRLText          = [BM_SolidColor colorName:"black"
                                        inverseColorName:"navy"];
  BM_colors.VRLTextOff       = [BM_SolidColor colorName:"wheat"
                                        inverseColorName:"white"];
  BM_colors.VRLPlate         = [BM_SolidColor colorName:"wheat"
                                        inverseColorName:"lightGray"];
  BM_colors.WindowForeground = [BM_SolidColor colorName:"wheat"
                                        inverseColorName:"white"];
  BM_colors.WindowBackground = [BM_SolidColor colorName:"lightGray"
                                        inverseColorName:"white"];
  BM_colors.TitleBar         = [BM_SolidColor colorName:"lightGray"
                                        inverseColorName:"white"];
  BM_colors.VRLTextOn        = [BM_SolidColor colorName:"lightGray"
                                        inverseColorName:"lightGray"];
  BM_colors.Prompter         = [BM_S    Color colorName:"mediumSlateBlue"
                                        inverseColorName:"white"];
  BM_colors.Frame            = [BM_SolidColor colorName:"lightGray"
                                        inverseColorName:"white"];
  BM_colors.ButtonOn         = [BM_SolidColor colorName:"maroon"
                                        inverseColorName:"white"];
  BM_colors.ButtonOff        = [BM_SolidColor colorName:"black"
                                        inverseColorName:"white"];
  BM_colors.DarkFrameShadow  = [BM_SolidColor colorName:"darkSlateGray"
                                        inverseColorName:"white"];
```

```
BM_colors.LightFrameShadow = [SolidColor   colorIndex:
                               [[currentDisplay colorMap]
                                        findColor:0.90:0.90:1.00
                                          deltas:0.4 :0.4 :0.4]];
BM_colors.LightButtonShadow= [BM_SolidColor colorName:"grey"
                                   inverseColorName:"white"];
BM_colors.DarkButtonShadow = [BM_SolidColor colorName:"darkSlateGray"
                                   inverseColorName:"white"];
BM_colors.TextBoxHighlight = [BM_SolidColor colorName:"mediumSlateBlue"
                                   inverseColorName:"white"];
BM_colors.TextBox          = [BM_SolidColor colorName:"lightGray"
                                   inverseColorName:"mediumSlateBlue"];

REPLACE_COLOR (colors.Black,     [BM_SolidColor colorName:"black"
                                        inverseColorName:"white"]);
REPLACE_COLOR (colors.White,     [BM_SolidColor colorName:"white"
                                        inverseColorName:"black"]);
REPLACE_COLOR (colors.Red,       [BM_SolidColor colorName:"maroon"
                                        inverseColorName:"white"]);
REPLACE_COLOR (colors.Green,     [BM_SolidColor colorName:"seaGreen"
                                        inverseColorName:"white"]);
REPLACE_COLOR (colors.Blue,      [BM_SolidColor colorName:"navy"
                                        inverseColorName:"white"]);
REPLACE_COLOR (colors.Cyan,      [BM_SolidColor colorName:"seaGreen"
                                        inverseColorName:"white"]);
REPLACE_COLOR (colors.Magenta,   [BM_SolidColor colorName:"magenta"
                                        inverseColorName:"cyan"]);
REPLACE_COLOR (colors.Yellow,    [BM_SolidColor colorName:"gold"
                                        inverseColorName:"white"]);
REPLACE_COLOR (colors.Orange,    [BM_SolidColor colorName:"orange"
                                        inverseColorName:"white"]);
REPLACE_COLOR (colors.Desktop,   [BM_SolidColor colorName:"black"
                                        inverseColorName:"white"]);
colors.Background = [SolidColor
   colorIndex:[BM_colors.Background colorIndex]];
[colors.Background
   inverseColorIndex:[BM_colors.Background inverseColorIndex]];

REPLACE_COLOR (colors.Foreground,[BM_SolidColor colorName:"white"
                                        inverseColorName:"white"]);
REPLACE_COLOR (colors.Text,      [BM_SolidColor colorName:"white"
                                        inverseColorName:"navy"]);
return self;
}

-setFonts {
 BM_fonts.DeskTop     = [Font fontName:[fonts.alternate str]];
 BM_fonts.TitleBar    = [Font fontName:[fonts.standard str]];
 BM_fonts.MenuBar     = [Font fontName:[fonts.standard str]];
 BM_fonts.VRLText     = [Font fontName:[fonts.font2 str]];
 BM_fonts.Application = [Font fontName:[fonts.font5 str]];
 BM_fonts.ReportText  = [Font fontName:[fonts.font4 str]];
 BM_fonts.DisplayText    = [Font fontName:[fonts.font3 str]];
 BM_fonts.DisplayTitle   = [Font fontName:[fonts.font6 str]];
 BM_fonts.SmlButtonText  = [Font fontName:[fonts.font7 str]];
 BM_fonts.Icon           = [Font fontName:[fonts.font5 str]];

 return self;
}

=:
```

```
/*===================== DO NOT REMO'   ? EDIT ===========================

      This comment and the following sccsId declaration are managed
      by SCCS for you. Do not edit or remove either.*

      Source file:     /users/bmw/Alpha/UserInterface/SCCS/s.FileIconHdlr.m
      Latest version:  1.3
      Last mod time:   09/13/89 at 12:34:30

========================================================================*/

static char *sccsId = "@(#)FileIconHdlr.m rev 1.3 created on 09/13/89 at 12:34:30";

/*===================== DO NOT REMOVE OR EDIT ===========================*/


#include "objc.h"
#include "uil.h"
#include "site.h"

#include "BMWGlobal.h"


@requires EchoBox, EventQ, PopUpMenu, DepMenu, ImageLayer, ImageLayer3D;
@requires KL_Folder, BorderLayer, BM_AskDialogBox, Menu, CharString, BitMap;

static id myMenu;


= FileIconHandler : IconHandler3D (BM_WorkstationMsgs, UIMESSAGES)
{
}


-defaultMenu
{
 id menu = [super defaultMenu];
 [menu append:
    [Menu str:"Rename" selector:@selector(rename) receiver:nil]];
 return menu;
}


-rename
{
 [self erase];

 [client renameFile];

 [self assignSTR:[client defaultTitleSTR]];
 [self show];

 return self;
}


-moveFromUser
{
    PT oldOrigin, newOrigin;
    id newBackLayer, oldBackLayer;
    id oldParent, newParent;

    oldOrigin    = [self origin];
    oldBackLayer = backLayer;
    oldParent    = [client parent];
```

```
    [super moveFromUser];

    [self removeFromBackLayer];

    newOrigin = event.origin;

    newBackLayer = [baseLayer frontLayerAt:newOrigin];

    if (newBackLayer == deskTop)
        newParent = deskTop;
    else
        newParent = [newBackLayer backLayer];

    if ([newParent respondsTo:@selector(mvIntoSelf:)])
    {
        if (oldParent == newParent)     // move within same folder
            [self attachTo:oldBackLayer];
        else
            [newParent mvIntoSelf:client];
    }

    if(!backLayer)      // I have not yet been attached
    {
        [self erase];
        [self moveTo:oldOrigin];
        [self attachTo:oldBackLayer];
        [self show];
    }

    return self;
}


-(PT)zoomOrigin
{
    return ([[client parent] visible] || [client parent] == deskTop) ?
        [self origin] :
        [[[client parent] iconHandler] zoomOrigin];
}


=:

/*===================== DO NOT REMOV[     EDIT ==============================

        This comment and the following sccsId declaration are managed
        by SCCS for you. Do not edit or remove either.*

        Source file:    /users/bmw/Alpha/UserInterface/SCCS/s.IconBin.m
        Latest version:  1.4
        Last mod time:   09/13/89 at 14:59:15

===========================================================================*/

static char *sccsId = "@(#)IconBin.m rev 1.4 created on 09/13/89 at 14:59:15";

/*===================== DO NOT REMOVE OR EDIT ===========================*/


#include "objc.h"
#include "uil.h"

#include "BMWGlobal.h"
```

```
@requires LayerGroup;

= IconBin:String3DLayer(BM_WorkstationMsgs,UIMESSAGES)
{
 id iconSlots;
}


-(BOOL)leftButtonDown  {

  [self toFront];
  return YES;
}


-initialize {

  [super initialize];

  [self borderWidth:3];

  iconSlots = [[[LayerGroup new] attachTo:self] show];

  return self;
}


-format
  {
   unsigned index;
   int      totalHeight,
            maxWidth;

   for (index = 0, totalHeight = 3*[myDispString height],
                  maxWidth =  1.3*[myDispString width];
                               index < [[iconSlots frontLayers] size]; index++)
      {
       id icon = [[iconSlots frontLayers] at:index];

       totalHeight += [icon outsideHeight];
       maxWidth     = max (maxWidth, [icon outsideWidth]);
      }

   [[[iconSlots height:totalHeight] width:maxWidth] format];
   [[self height:[iconSlots height]     * [myDispString height]]
          width:maxWidth];

   [[myDispString centerX:[self centerX]]       top:[myDispString height]];
   [[iconSlots    centerX:[self centerX]] outsideTop:[myDispString
                                                    adjacentBottom]];

   return self;
  }


 -addSlot:aLayer
   {
    [aLayer attachTo:iconSlots];

    return self;
   }


 -installApplication:aWindowLayer iconFactory:anIconFactory
   {
```

```
    id iconHandler = [anIconFactory createInterfaceFor:aWindowLayer];

    [aWindowLayer newIconHandler:iconHandler];

    [deskTop install:aWindowLayer];

    [self addSlot:iconHandler];

    return self;
   }


=:
/*==================== DO NOT REMOVI    EDIT ============================

       This comment and the following sccsId declaration are managed
       by SCCS for you. Do not edit or remove either.*

       Source file:     /users/bmw/Alpha/UserInterface/SCCS/s.IconHndler3D.m
       Latest version:  1.4
       Last mod time:   09/13/89 at 12:35:12

======================================================================*/

static char *sccsId = "@(#)IconHndler3D.m rev 1.4 created on 09/13/89 at 12:35:12";

/*==================== DO NOT REMOVE OR EDIT ==========================*/


#include "objc.h"
#include "uil.h"
#include "site.h"

#include "BMWGlobal.h"


@requires EchoBox, EventQ, PopUpMenu, DepMenu, ImageLayer, ImageLayer3D;
@requires KL_Folder, BorderLayer, BM_AskDialogBox, Menu, CharString, BitMap,
          StringLayer;

static id myMenu;

= IconHandler3D : IconHandler (BM_WorkstationMsgs, UIMESSAGES)
{
 BOOL initiatedDeletion;
}


-defaultMenu
{
 id menu = [DepMenu str:"Icon Operations"];
 [menu append:
    [Menu str:"Raise" selector:@selector(toFront) receiver:nil]];
 [menu append:
    [Menu str:"Lower" selector:@selector(toBack) receiver:nil]];
 [menu append:
    [Menu str:"Move" selector:@selector(moveFromUser) receiver:nil]];
 [menu append:
    [Menu str:"Open" selector:@selector(open) receiver:nil]];

 return menu;
}
```

```
-initialize
  {
   initiatedDeletion = NO;

   [super initialize];

   if (!myMenu) {
       myMenu = [PopUpMenu createInterfaceFor:[self defaultMenu]
                                     button:RIGHTBUTTON];
   }

   [self origin:pt(0,0)];

   return self;
  }

-assignSTR:(STR)aTitle {
    id newTitle;
    if (title) {
        [self removeFrontLayer: title];
        [title free];
    }
    title = [StringLayer str:aTitle font:BM_fonts.Icon];
    [self addFrontLayer: title];
    [title extent: [title defaultExtent]];
    [self extent: [self defaultExtent]];
    return self;
}

- openSelf {
    id box,rootLayer;
    BOOL visibleFlag;

    if ([client backLayer]!=nil) return self;   /* already in the hierarchy? */
    visibleFlag = [self visible];
    [client setVisible: visibleFlag];/* transfer the visible information */
    [self highlight];
    if (visibleFlag) {  /* do the animation only if on screen */
        box = [EchoBox withBounds: self];
        [box smoothMoveTo: [client origin] size: [client extent]];
        [box erase];
        box = [box free];
    }

    [client attachTo: baseLayer];
    if (visibleFlag) {
        [client setVisible:YES];
        [client repaint];
    }
    [client computeClipList];
    return self;
}

-open
{
    [self openSelf];
    [client open];
    return self;
}

- (BOOL)rightButtonDown {
    [myMenu receiver: self];
```

```
    [myMenu openAt: [EventQ origin] object:self];
    return YES;
}


-(BOOL)opened { return ([client backLayer] == nil); }

#define zoomInEffect    1
- close {
    id box,rootLayer;
    BOOL visibleFlag;
    PT myorigin;

    // already an Icon or no backLayer?
    // if the origin is at 0 then th    ose position has most
    // likely not been set. If the de1ault position actually is
    // pt(0,0) then it will just get set every time.
    if ( [self origin] == pt(0,0) )
        [self origin: [self defaultPosition]];

    visibleFlag = [client visible];

    [self unHighlight];
    if (visibleFlag) {
        /* take my image off the screen */
        [client erase];

        /* do the animation */
        if ( zoomInEffect ) {
            box = [EchoBox withBounds: client];
            [box smoothMoveTo: [self zoomOrigin] size: [self extent]];
            [box erase];
            box = [box free];
        }
    }
    [client removeFromBackLayer];

    if ([backLayer visible]) {
        [self setVisible:YES];
        [self repaint];
    }
    [baseLayer computeClipList];
    return self;
}

-(PT)zoomOrigin // return the PT to close to
{
    return [self origin];
}

-unHighlight
{
    [title unHighlight];
    [imageLayer unHighlight];
    [self repaint];
    return self;
}

-highlight
{
    [title highlight];
    [imageLayer highlight];
    [self repaint];
    return self;
```

```
}

-(BOOL)initiatedDeletion
  {
   return initiatedDeletion;
  }


-terminate$
{
    if (client != nil)
       {
        id oldClient = client;
        client = nil;
        initiatedDeletion = YES;
        [oldClient delete];
       }

     return [super terminate$];
 }


 -bitMap: aBitMap {
     id newImage;
     if( imageLayer && [imageLayer isKindOf:ImageLayer])
         [imageLayer bitMap: aBitMap];
     else  {
         newImage = [ImageLayer3D createInterfaceFor:aBitMap];
         if(imageLayer)
             [newImage withBounds: imageLayer];
         [self imageLayer: newImage];
     }
     return self;
 }


 -(PT)defaultExtent {
     return pt(max([title outsideWidth], [imageLayer outsideWidth]),
         [title outsideHeight]+[imageLayer outsideHeight] + 20 );
 }


 - defaultImage {
     id image = nil;
     if ( [client respondsTo: @selector(defaultIcon)] )
         image = [client defaultIcon];
     if ( image ) {
         if ( [image isKindOf:BitMap] )
             return [ImageLayer3D createInterfaceFor: image];
         else
             return image;
     } else {
         image = [BitMap extent:pt(16,16)];

         if ( gp_colorSupport )
             [image convertToColor: [colors.White colorIndex]];

         return [ImageLayer3D createInterfaceFor: image];
     }

  }

  =:
```

```
/*==================== DO NOT REMOVE   EDIT ============================

       This comment and the following sccsId declaration are managed
       by SCCS for you. Do not edit or remove either.

       Source file:     /users/bmw/Alpha/UserInterface/SCCS/s.ImageLayer3D.m
       Latest version:  1.3
       Last mod time:   09/10/89 at 19:29:42

======================================================================*/

static char *sccsId = "@(#)ImageLayer3D.m rev 1.3 created on 09/10/89 at 19:29:42";

/*==================== DO NOT REMOVE OR EDIT ==========================*/


#include "objc.h"
#include "uil.h"

#include "BMWGlobal.h"


= ImageLayer3D:ImageLayer(BM_WorkstationMsgs,UIMESSAGES)
{
  BOOL imageIsVisible;
  id   edgeLightColor, edgeDarkColor;
}


- drawShadowBorder:(short)offset lightColor:ltColor darkColor:dkColor
  {
  short bWidth, bHeight;
  PT    points [6];

  bWidth  = [self width];
  bHeight = [self height];

  points [0] = pt(-offset,-offset);
  points [1] = pt(-offset,bHeight+offset);
  points [2] = pt(0,bHeight);
  points [3] = pt(0,0);
  points [4] = pt(bWidth,0);
  points [5] = pt(bWidth+offset,-offset);
  [self fillPolygon:points nPoints:6 colorIndex:[ltColor colorIndex]
             rule:GXcopy clipBy:[self clipList]];

  points [0] = pt(-offset,bHeight+offset);
  points [1] = pt(bWidth+offset,bHeight+offset);
  points [2] = pt(bWidth+offset,-offset);
  points [3] = pt(bWidth,0);
  points [4] = pt(bWidth,bHeight);
  points [5] = pt(0,bHeight);
  [self fillPolygon:points nPoints:6 colorIndex:[dkColor colorIndex]
             rule:GXcopy clipBy:[self clipList]];

  return self;
  }


-drawBorder:(short)borderWidth color:borderColor
  {
  if (borderWidth>1)
     [self drawShadowBorder:borderWidth lightColor:edgeLightColor
                                      darkColor:edgeDarkColor];
  else
```

```
    [super drawBorder:borderWidth co    borderColor];

  return self;
  }


-hideImage
  {
   imageIsVisible = NO;
   return self;
  }


-showImage
  {
   imageIsVisible = YES;
   return self;
  }


-paintBackground
  {
   [super paintBackground];

   if (!imageIsVisible)
      [self fillWith:insideColor];

   return self;
  }


-displayLayer
  {
   if (imageIsVisible)
      [super displayLayer];

   return self;
  }


-initialize
  {
   [super initialize];

   [self borderWidth:0];
   [self insideColor:BM_colors.DeskTop];

   imageIsVisible  = YES;

   edgeLightColor  = BM_colors.DarkButtonShadow;
   edgeDarkColor   = BM_colors.LightFrameShadow;

   return self;
  }

 =:

 /*===================== DO NOT REMOVE    EDIT ==============================

        This comment and the following sccsId declaration are managed
        by SCCS for you. Do not edit or remove either.

        Source file:     SCCS/s.InnerWindow.m
        Latest version:  1.1
```

```
Last mod time:   08/31/89 at 11:42:57

======================================================================*/

static char *sccsId = "@(#)InnerWindow.m rev 1.1 created on 08/31/89 at 11:42:57";

/*===================== DO NOT REMOVE OR EDIT ===========================*/

#include "objc.h"
#include "uil.h"
#include "BMWGlobal.h"

#define INNERTITLEHT 40

@requires InsetLayer,StringLayer;

= InnerWindow: InsetLayer (BM_WorkstationMsgs, UIMESSAGES)
  {
  id parent;
  id innerLayer;

  id myTitle;
  }

- parent:mainWindow
  {
  parent = mainWindow;
  return self;
  }


- parent
  {
  return parent;
  }


- myTitle
  {
  return myTitle;
  }


- myTitle:(STR)aString
  {
  short yTitle;

  if (myTitle)
     {
     [myTitle assignSTR:aString];
     [myTitle extent:[myTitle defaultExtent]];
     }
  else
     {
     myTitle = [StringLayer str:aString font:BM_fonts.Application];
     [myTitle attachTo:self];
     [myTitle insideColor:[self insideColor]];
     [myTitle color:BM_colors.VRLText];
     }
   yTitle = [self top]+(INNERTITLEHT/2)+4;
   [myTitle center:pt([self centerX],yTitle)];
   return self;
   }
```

```
- innerLayer
  {
  return innerLayer;
  }


- extent:(PT)aPoint
  {
  [super extent:aPoint];
  if (myTitle)
     [innerLayer outsideExtent:pt([self outsideWidth]-2*INNERSPACING,
         [self outsideHeight]-INNERTITLEHT-INNERSPACING)];
  else
     [innerLayer outsideExtent:pt([self outsideWidth]-2*INNERSPACING,
         [self outsideHeight]-2*INNERSPACING)];
  return self;
  }


- compose
  {
  short topHeight;

  if (myTitle)
     topHeight = INNERTITLEHT;
  else
     topHeight = INNERSPACING;

  innerLayer = [InsetLayer attachTo:self];
  [innerLayer outsideOrigin:
     pt([self adjacentLeft]+INNERSPACING,[self adjacentTop]+topHeight)];
  [innerLayer outsideExtent:pt([self outsideWidth]-2*INNERSPACING,
     [self outsideHeight]-topHeight-INNERSPACING)];
  [innerLayer insideColor:BM_colors.Foreground];

  return self;
  }


- initialize
  {
  [super initialize];
  [self insideColor:BM_colors.Background];
  innerLayer=nil;
  myTitle=nil;
  return self;
  }


=:

/*==================== DO NOT REMOVE   EDIT ============================

       This comment and the following sccsId declaration are managed
       by SCCS for you. Do not edit or remove either.

       Source file:     SCCS/s.InsetLayer.m
       Latest version:  1.5
       Last mod time:   08/31/89 at 18:08:09

=====================================================================*/

static char *sccsId = "@(#)InsetLayer.m rev 1.5 created on 08/31/89 at 18:08:09";

/*==================== DO NOT REMOVE OR EDIT ==========================*/
```

```
#include "objc.h"
#include "uil.h"
#include "BMWGlobal.h"
#include <stdio.h>

= InsetLayer:RidgeLayer(BM_WorkstationMsgs,UIMESSAGES)
{
}

-initialize {

  [super initialize];
  [self borderWidth:2];
  [self edgeLightColor:BM_colors.DarkButtonShadow];
  [self edgeDarkColor:BM_colors.LightFrameShadow];
  [self insideColor:BM_colors.Foreground];
  return self;
}

=:

/*==================== DO NOT REMOVI    EDIT ============================

       This comment and the following sccsId declaration are managed
       by SCCS for you. Do not edit or remove either.

       Source file:     /users/bmw/Alpha/UserInterface/SCCS/s.LabelButton.m
       Latest version:  1.4
       Last mod time:   07/28/89 at 19:26:40

======================================================================*/

static char *sccsId = "@(#)LabelButton.m rev 1.4 created on 07/28/89 at 19:26:40";

/*==================== DO NOT REMOVE OR EDIT ==========================*/

#include "objc.h"
#include "uil.h"
#include "site.h"
#include <stdio.h>

@requires StringLayer;

= LabelButton:ButtonGroup(BM_WorkstationMsgs,UIMESSAGES)
  {
  id myLabel,myButton;
  }


- (PT)defaultExtent
  {
  short aHeight, aWidth;

  if ([myButton outsideHeight] > [myLabel outsideHeight])
     aHeight = [myButton outsideHeight];
  else aHeight = [myLabel outsideHeight];

  aWidth = [myLabel outsideWidth]+[myButton outsideWidth]+9;

  return pt(aWidth,aHeight);
  }
```

```
- on
{
return [myButton on];
}

- off
{
return [myButton off];
}

- font:aFont
{
[myLabel font:aFont];
[myLabel extent:[myLabel defaultExtent]];
return self;
}

- font
{
return [myLabel font];
}

- fontColor:aColor
{
[myLabel color:aColor];
return self;
}

- fontColor
{
return [myLabel color];
}

- myButton
{
return myButton;
}

- myLabel
{
return myLabel;
}

- (STR) str
{
return [myLabel str];
}

- addButton:aButton label:(STR)aString font:aFont color:aColor
{
myButton = aButton;

if (aFont)
   myLabel = [StringLayer str:aString font:aFont];
```

```
  else
     myLabel = [StringLayer str:aString];

  if (aColor)
     [myLabel insideColor:aColor];

  [self addFrontLayer:myButton];
  [self addFrontLayer:myLabel];
  [self extent:[self defaultExtent]];

  [myButton addDependent:self];
  return self;
  }


- addButton:aButton label:(STR)aString
  {
  return [self addButton:aButton label:aString font:nil color:nil];
  }


- addButton:aButton label:(STR)aString font:aFont
  {
  return [self addButton:aButton label:aString font:aFont color:nil];
  }


- addButton:aButton label:(STR)aString color:aColor
  {
  return [self addButton:aButton label:aString font:nil color:aColor];
  }


- update:aButton because:(SEL)aSelector
  {
  if (aSelector == @selector(terminate$))
     {
     [aButton removeDependent:self];
     [self changed:@selector(terminate$)];
     }
  else if (aSelector == @selector(changeStatus))
     [self changed:@selector(changeStatus)];
  return self;
  }


- initialize
  {
  [super initialize];
  myLabel = nil;
  myButton = nil;

  return self;
  }


=:

/*===================== DO NOT REMOVE    EDIT ============================

        This comment and the following sccsId declaration are managed
        by SCCS for you. Do not edit or remove either.
```

```
        Source file:     /users/bmw/Alpha/UserInterface/SCCS/s.LeftFrame.m
        Latest version:  1.3
        Last mod time:   06/22/89 at 16:58:47

=========================================================================*/

static char *sccsId = "@(#)LeftFrame.m rev 1.3 created on 06/22/89 at 16:58:47";

/*==================== DO NOT REMOVE OR EDIT ==========================*/

#include "objc.h"
#include "uil.h"
#include "BMWGlobal.h"

= LeftFrame:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  int yBR;
  PT aPoint;
  int   lightColorIndex = [BM_colors.LightFrameShadow colorIndex];
  int    darkColorIndex = [BM_colors.DarkFrameShadow  colorIndex];

  [super displayLayer];

  aPoint = [self extent];
  yBR = Y(aPoint)-1;

  [self drawLineFrom:pt(0,0) to:pt(9,0) colorIndex:lightColorIndex];
  [self drawLineFrom:pt(0,1) to:pt(0,yBR) colorIndex:lightColorIndex];
  [self drawLineFrom:pt(1,1) to:pt(1,yBR-1) colorIndex:lightColorIndex];
  [self drawLineFrom:pt(9,1) to:pt(9,yBR) colorIndex:darkColorIndex];
  [self drawLineFrom:pt(10,0) to:pt(10,yBR) colorIndex:darkColorIndex];
  [self drawLineFrom:pt(1,yBR) to:pt(8,yBR) colorIndex:darkColorIndex];

  return self;
}


=:

/*===================== DO NOT REMOVI    EDIT ============================

        This comment and the following sccsId declaration are managed
        by SCCS for you. Do not edit or remove either.

        Source file:     /users/bmw/Alpha/UserInterface/SCCS/s.LogoLayer.m
        Latest version:  1.1
        Last mod time:   08/31/89 at 13:02:26

=========================================================================*/

static char *sccsId = "@(#)LogoLayer.m rev 1.1 created on 08/31/89 at 13:02:26";

/*==================== DO NOT REMOVE OR EDIT ==========================*/
```

```
#include "objc.h"
#include "uil.h"

#include <math.h>
#include <stdio.h>


#define WC_ORIGIN_X    (-0.3)
#define WC_ORIGIN_Y    (-0.7)
#define WC_HEIGHT      (1.2)
#define WC_WIDTH       (1.75)

#define DCEXTENT(w,h) pt((int)((double)w/WC_WIDTH*[self width]),\
                         (int)((double)h/WC_HEIGHT*[self height]))
#define DCPOINT(x,y)  pt((int)(((double)x-WC_ORIGIN_X)/WC_WIDTH*[self width]),\
                         (int)((WC_HEIGHT-(double)y+WC_ORIGIN_Y)/ \
                                              WC_HEIGHT*[self height]))


= LogoLayer : BM_GFXLayer (BM_WorkstationMsgs, UserInterface,
                           Collection, Primitive)

  {
  }

  -drawCannon
    {
     PT slashPoints[4];
     PT cannonPoints[200];

     double radius = 0.2;
     double lip = 0.05;
     double offCenter = radius*0.5;
     double lengthOfCannon = 1.25;
     double slashWidth = radius*0.35;

     double x, y;

     int cannonPointCount = 0;

     for (x = radius; x >= offCenter; x -= .005)
       {
        y = sqrt(radius*radius-x*x);
        cannonPoints[cannonPointCount] = DCPOINT(x,y);
        cannonPointCount += 1;
       }

     x = lengthOfCannon+offCenter;
     y = sqrt(radius*radius-offCenter*offCenter)-lip;
     cannonPoints[cannonPointCount] = DCPOINT(x,y);
     cannonPointCount += 1;

     x = lengthOfCannon+offCenter+lip;
     y = sqrt(radius*radius-offCenter*offCenter);
     cannonPoints[cannonPointCount] = DCPOINT(x,y);
     cannonPointCount += 1;

     x = lengthOfCannon+offCenter+lip;
     y = -sqrt(radius*radius-offCenter*offCenter);
     cannonPoints[cannonPointCount] = DCPOINT(x,y);
     cannonPointCount += 1;

     x = lengthOfCannon+offCenter;
     y = -sqrt(radius*radius-offCenter*offCenter)+lip;
     cannonPoints[cannonPointCount] = DCPOINT(x,y);
     cannonPointCount += 1;
```

```
  x = offCenter;
  y = -sqrt(radius*radius-offCenter*offCenter);
  cannonPoints[cannonPointCount] = DCPOINT(x,y);
  cannonPointCount += 1;

  for (x = offCenter; x <= radius; x += .005)
    {
     y = -sqrt(radius*radius-x*x);
     cannonPoints[cannonPointCount] = DCPOINT(x,y);
     cannonPointCount += 1;
    }

  slashPoints[0] = DCPOINT (0,-radius*3.0);
  slashPoints[1] = DCPOINT (lengthOfCannon/2,radius*2.0);
  slashPoints[2] = DCPOINT (lengthOfCannon/2+slashWidth,radius*2.0);
  slashPoints[3] = DCPOINT (slashWidth,-radius*3.0);

  [self fillPolygon:cannonPoints nPoints:cannonPointCount
        colorIndex:[colors.Blue colorIndex]
              rule:GXcopy clipBy:[self clipList]];

  [self fillPolygon:slashPoints nPoints:4
        colorIndex:[colors.Red colorIndex]
              rule:GXcopy clipBy:[self clipList]];

  [self fillArc:DCPOINT(-lip-radius,radius)
        extent:DCEXTENT(radius*2,radius*2)
       angle1:0 angle2:360*64 colorIndex:[colors.Red colorIndex]
     rule:GXcopy clipBy:[self clipList]];

  [self fillArc:DCPOINT(lengthOfCannon/2-radius,-radius)
        extent:DCEXTENT(radius*2,radius*2)
       angle1:0 angle2:360*64 colorIndex:[colors.Red colorIndex]
     rule:GXcopy clipBy:[self clipList]];

  return self;
 }


-displayLayer
 {
  [self drawCannon];

  return self;
 }


-initialize
 {
  [super initialize];

  [self preferredAspectRatio:WC_HEIGHT/WC_WIDTH];

  return self;
 }

-(BOOL)rightButtonDown
 {
  [self sizeFromUser];

  return YES;
 }

-(BOOL)middleButtonDown
 {
```

```
    [self moveFromUser];

    return YES;
   }

/*==================== DO NOT REMOVE  EDIT ============================

     This comment and the following sccsId declaration are managed
     by SCCS for you. Do not edit or remove either.

     Source file:    /users/bmw/Alpha/UserInterface/SCCS/s.MenuBar.m
     Latest version: 1.3
     Last mod time:  06/22/89 at 16:56:33

=====================================================================*/

static char *sccsId = "@(#)MenuBar.m rev 1.3 created on 06/22/89 at 16:56:33";

/*==================== DO NOT REMOVE OR EDIT ==========================*/

#include "objc.h"
#include "uil.h"
#include "BMWGlobal.h"
#include <stdio.h>

= MenuBar:BorderLayer(BM_WorkstationMsgs,UIMESSAGES)
{
}

-initialize {

  [super initialize];
  [self borderWidth:0];
  [self insideColor:BM_colors.Frame];
  return self;
}

-(BOOL)cursorMove {

  [cursors.Normal beCursor];
  return YES;
}

-displayLayer {
  short endX,endY;
  short cY, anOffset;

  int   lightColorIndex = [BM_colors.LightFrameShadow colorIndex];
  int    darkColorIndex = [BM_colors.DarkFrameShadow  colorIndex];

  [super displayLayer];
  endX = [self width]-1;
  endY = [self height]-1;
  cY = (short)(endY/2);
  anOffset = 3;

  [self drawLineFrom:pt(0,0) to:pt(endX,0) colorIndex:lightColorIndex];
  [self drawLineFrom:pt(0,1) to:pt(0,endY-1) colorIndex:lightColorIndex];
  [self drawLineFrom:pt(endX,1) to:pt(endX,endY-2) colorIndex:darkColorIndex];
  [self drawLineFrom:pt(1,endY-1) to:pt(endX,endY-1)
     colorIndex:darkColorIndex];
  [self drawLineFrom:pt(0,endY) to:pt(endX,endY) colorIndex:darkColorIndex];

  [self drawLineFrom:pt(anOffset,cY-2) to:pt(endX-anOffset,cY-2)
     colorIndex:lightColorIndex];
```

```
  [self drawLineFrom:pt(anOffset,cY-1) to:pt(anOffset,cY+1)
     colorIndex:lightColorIndex];
  [self drawLineFrom:pt(anOffset+1,cY+1) to:pt(endX-anOffset,cY+1)
     colorIndex:darkColorIndex];
  [self drawLineFrom:pt(endX-anOffset,cY) to:pt(endX-anOffset,cY-1)
     colorIndex:darkColorIndex];

  return self;
}

-terminate$ {

  [super terminate$];
  return self;
}
=:

/*===================== DO NOT REMOVI     EDIT =============================

        This comment and the following sccsId declaration are managed
        by SCCS for you. Do not edit or remove either.

        Source file:     /users/bmw/Alpha/UserInterface/SCCS/s.PermDlgBox.m
        Latest version:  1.5
        Last mod time:   07/19/89 at 10:16:29

==========================================================================*/

static char *sccsId = "@(#)PermDlgBox.m rev 1.5 created on 07/19/89 at 10:16:29";

/*===================== DO NOT REMOVE OR EDIT ============================*/

#include "objc.h"
#include "uil.h"
#include "BMWGlobal.h"

@requires CharString,Button3D,BitMap;


= PermanentDialogBox:BM_DialogBox(BM_WorkstationMsgs,
                                  UserInterface,Collection,Primitive)
  {
  }


- open
  {
  [self toFront];
  [self show];
  [self modalActivate];
  return self;
  }


- close
  {
  [self modalDeactivate];
  [self erase];
  return self;
  }


- initialize
  {
```

```
 [super initialize];
 defaultPushButton = acceptButton = [self defaultAcceptButton];
 cancelPushButton  = cancelButton = [self defaultCancelButton];
 return self;
 }

=:
/*===================== DO NOT REMOV     EDIT =============================

       This comment and the following sccsId declaration are managed
       by SCCS for you. Do not edit or remove either.

       Source file:     /users/bmw/Alpha/UserInterface/SCCS/s.Prompter.m
       Latest version:  1.2
       Last mod time:   08/27/89 at 16:54:45

========================================================================*/

static char *sccsId = "@(#)Prompter.m rev 1.2 created on 08/27/89 at 16:54:45";

/*===================== DO NOT REMOVE OR EDIT ===========================*/

// (c) Stepstone 1987, 1988.  All rights reserved.
// ICpak 201 Library Class
//
// $Source: /u/sally/icpak/HP/libSrc/RCS/Prompter.m,v $
// $Revision: 2.27 $
// $Date: 88/02/29 12:42:03 $ $State: Exp $
// $Product: ICpak 201$
//
// $Class name: Prompter

/*
$Description: Prompter is a box which notifies the user with a message. $
*/

// Include Files
#include "stdio.h"
#include "objc.h"
#include "uil.h"
#include "mivarargs.h"

// @requires
@requires EventQ;

extern id currentDisplay, baseLayer;

= Prompter: String3DLayer (BM_WorkstationMsgs,UIMESSAGES) {
}

/* $Default Category: Instance Creation $ */

/*
Prompts the user with aMessage, then frees the Prompter box.  Uses |-prompt|
to prompt the user.  Returns nil.
*/
+ promptSTR: (STR)aMessage {
    self = [self str: aMessage];
    [self prompt];
    return [self free];
}

/*
Prompts the user with the message formed from format and arguments.
```

```
then frees the Prompter box.  Uses |-prompt| to prompt the user which
waits for a mouse button to be pressed.  Returns nil.
The string is calculated by the standard C library function sprintf(), see
sprintf() for the formats and variable declarations.
*/
+ promptFormat:(STR)fmt; va_declare(va_alist); {
        char buf[BUFSIZ];
        va_list ap;
        va_start(ap);
        vsprintf(buf, fmt, ap);
        va_end(ap);
        return [self promptSTR:buf];
}

/*
Prompts the user with aMessage, waits for specified number of seconds and
then frees the Prompter box.  Uses |-waitFor| to prompt the user.  Returns nil.
*/
+ waitFor: (short)seconds promptSTR:(STR)aMessage {
    self = [self str: aMessage];
    [self center: [EventQ origin]];
    [self waitFor:seconds];
    return [self free];
}
/*
Prompts the user with the message formed from the format and its arguments,
waits for specified number of seconds and
then frees the Prompter box.  Uses |-waitFor| to prompt the user.  Returns nil.
The string is calculated by the standard C library function sprintf(), see
sprintf() for the formats and variable declarations.
*/
+ waitFor:(short)seconds  promptFormat:(STR)fmt; va_declare(va_alist); {
        char buf[BUFSIZ];
        va_list ap;
        va_start(ap);
        vsprintf(buf, fmt, ap);
        va_end(ap);
        return [self waitFor:seconds promptSTR:buf];
}


/* $Default Category: Interrogation $ */

/*
Returns the default size of the receiver.  The default size of a Prompter is
20 pixels wider than its message string and twice as high as its message string.
*/
-(PT)defaultExtent {
    return pt([myDispString width]+20,[myDispString height]*2);
}

/* $Default Category: Initialization $ */

/*
Initializes the receiver.  The border width is initialized to 5.  Returns self.
*/
- initialize {
    [super initialize];
    [self borderWidth:4];
    return self;
}

/* $Default Category: Activation $ */
```

```
/*
Prompts the user centered on the origin of the last event.  Uses
|-waitForUser| to prompt the user.  Returns self.
*/
-prompt {
    [self center: [EventQ origin]];
    [self waitForUser];
    return self;
}
/*
Prompts the user at the receiver's origin.  Prompting causes the receiver
to display itself, wait until the user responds by pressing a mouse button, and
then remove itself from the screen.  Returns self.
*/
- waitForUser {
    // Attach myself so I will remain around if a redisplay happens
    [self attachTo: baseLayer];

    // Blast myself up onto the screen
    [self openAt: [self origin]];

    [EventQ readEvent];

    // Wait for user to press and release any mouse button
    [EventQ waitButton];
    [EventQ waitNoButton];

    // Don't forget to remove myself
    [baseLayer removeFrontLayer: self];

    // Remove myself by replacing what I covered up
    [self closeUp];

    return self;
}

/*
Prompts at the receiver's origin.  Waits for seconds and then remove the
message.  Returns self.
*/
- waitFor: (short)seconds {

    // Attach myself so I will be there on a repaint if one happens
    [self attachTo: baseLayer];

    // Blast myself up there
    [self openAt: [self origin]];

    // Force screen update on XWindows systems
    [EventQ eventReady];

    // Wait the specified amount of time
    sleep(seconds);

    // Don't forget to remove myself
    [baseLayer removeFrontLayer: self];

    // Remove myself by replacing what I covered up
    [self closeUp];

    return self;
}

=:
```

```
/*==================== DO NOT REMOVI    EDIT ============================

        This comment and the following sccsId declaration are managed
        by SCCS for you. Do not edit or remove either.

        Source file:     /users/bmw/Alpha/UserInterface/SCCS/s.PushButton.m
        Latest version:  1.3
        Last mod time:   07/19/89 at 10:16:41

===========================================================================*/

static char *sccsId = "@(#)PushButton.m rev 1.3 created on 07/19/89 at 10:16:41";

/*==================== DO NOT REMOVE OR EDIT ==========================*/

#include "objc.h"
#include "uil.h"
#include "site.h"
#include <stdio.h>


= PushButton:Button3D(BM_WorkstationMsgs,UIMESSAGES)
  {
  }


- on
  {
  [super on];
  return [self off];
  }


=:

/*==================== DO NOT REMOV.    EDIT ============================

        This comment and the following sccsId declaration are managed
        by SCCS for you. Do not edit or remove either.

        Source file:     /users/bmw/Alpha/UserInterface/SCCS/s.RadioBGroup.m
        Latest version:  1.3
        Last mod time:   07/28/89 at 19:26:29

===========================================================================*/

static char *sccsId = "@(#)RadioBGroup.m rev 1.3 created on 07/28/89 at 19:26:29";

/*==================== DO NOT REMOVE OR EDIT ==========================*/

#include "objc.h"
#include "uil.h"
#include "site.h"
#include <stdio.h>

= RadioBGroup:ButtonGroup(BM_WorkstationMsgs,UIMESSAGES)
  {
  id controlStatus;
  }


- addButton:aButton
  {
```

```
 [super addButton:aButton];
 [aButton addDependent:self];

 return self;
 }



- update:aButton because:(SEL)aSelector
 {
 if (aSelector == @selector(terminate$))
    [aButton removeDependent:self];
 else if (aSelector == @selector(changeStatus))
    {
    if (controlStatus)
       [controlStatus off];
    controlStatus = aButton;
    }
 return self;
 }


- initialize
 {
 [super initialize];
 controlStatus = nil;
 return self;
 }

=:

/*===================== DO NOT REMOVE    EDIT =============================

       This comment and the following sccsId declaration are managed
       by SCCS for you. Do not edit or remove either.*

       Source file:     /users/bmw/Alpha/UserInterface/SCCS/s.RadioButton.m
       Latest version:  1.5
       Last mod time:   07/28/89 at 19:26:09

========================================================================*/

static char *sccsId = "@(#)RadioButton.m rev 1.5 created on 07/28/89 at 19:26:09";

/*===================== DO NOT REMOVE OR EDIT ===========================*/

#include "objc.h"
#include "uil.h"
#include "site.h"
#include <stdio.h>


= RadioButton:Button3D(BM_WorkstationMsgs,UIMESSAGES)
  {
  }

- (BOOL)leftButtonDown
  {
  [self on];
  return YES;
  }
```

```
- on
  {
  [self changed:@selector(changeStatus)];
  return [super on];
  }


- terminate$
  {
  [self changed:@selector(terminate$)];
  return [super terminate$];
  }



=:

/*===================== DO NOT REMOV    EDIT =============================

        This comment and the following sccsId declaration are managed
        by SCCS for you. Do not edit or remove either.

        Source file:    /users/bmw/Alpha/UserInterface/SCCS/s.RidgeLayer.m
        Latest version: 1.3
        Last mod time:  08/30/89 at 17:48:57

==========================================================================*/

static char *sccsId = "@(#)RidgeLayer.m rev 1.3 created on 08/30/89 at 17:48:57";

/*===================== DO NOT REMOVE OR EDIT ===========================*/

#include "objc.h"
#include "uil.h"
#include "BMWGlobal.h"

= RidgeLayer:BorderLayer(BM_WorkstationMsgs,UIMESSAGES)
  {
  id edgeLightColor, edgeDarkColor;
  }


- edgeLightColor
  {
  return edgeLightColor;
  }


- edgeLightColor:aColor
  {
  edgeLightColor = aColor;
  return self;
  }


- edgeDarkColor
  {
  return edgeDarkColor;
  }


- edgeDarkColor:aColor
  {
```

```
edgeDarkColor = aColor;
return self;
}


- drawShadowBorder:(short)offset lightColor:ltColor darkColor:dkColor
{
short bWidth, bHeight;
PT    points [6];

bWidth  = [self width];
bHeight = [self height];

points [0] = pt(-offset,-offset);
points [1] = pt(-offset,bHeight+offset);
points [2] = pt(0,bHeight);
points [3] = pt(0,0);
points [4] = pt(bWidth,0);
points [5] = pt(bWidth+offset,-offset);
[self fillPolygon:points nPoints:6 colorIndex:[ltColor colorIndex]

           rule:GXcopy clipBy:[s    :lipList]];

points [0] = pt(-offset,bHeight+offset);
points [1] = pt(bWidth+offset,bHeight+offset);
points [2] = pt(bWidth+offset,-offset);
points [3] = pt(bWidth,0);
points [4] = pt(bWidth,bHeight);
points [5] = pt(0,bHeight);
[self fillPolygon:points nPoints:6 colorIndex:[dkColor colorIndex]
           rule:GXcopy clipBy:[self clipList]];

return self;
}



- paintBackground
{
if (borderWidth>1)
   [self drawShadowBorder:borderWidth lightColor:[self edgeLightColor]
      darkColor:[self edgeDarkColor]];
else
   [self drawBorder:borderWidth color:borderColor];
[self fillWith:insideColor];
return self;
}


-initialize
{
[super initialize];

[self borderColor:BM_colors.Border];
[self borderWidth:4];
[self edgeLightColor:BM_colors.LightButtonShadow];
[self edgeDarkColor:BM_colors.DarkButtonShadow];

return self;
}

=:
```

```
/*==================== DO NOT REMOVE    EDIT ============================

      This comment and the following sccsId declaration are managed
      by SCCS for you. Do not edit or remove either.

      Source file:     /users/bmw/Alpha/UserInterface/SCCS/s.RightFrame.m
      Latest version:  1.3
      Last mod time:   06/22/89 at 16:58:04

=========================================================================*/

static char *sccsId = "@(#)RightFrame.m rev 1.3 created on 06/22/89 at 16:58:04";

/*==================== DO NOT REMOVE OR EDIT ===========================*/

#include "objc.h"
#include "uil.h"
#include "BMWGlobal.h"

= RightFrame:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  int yBR;
  PT aPoint;
  int   lightColorIndex = [BM_colors.LightFrameShadow colorIndex];
  int    darkColorIndex = [BM_colors.DarkFrameShadow  colorIndex];

  [super displayLayer];

  aPoint = [self extent];
  yBR = Y(aPoint)-1;

  [self drawLineFrom:pt(0,0) to:pt(9,0) colorIndex:lightColorIndex];
  [self drawLineFrom:pt(0,1) to:pt(0,yBR) colorIndex:lightColorIndex];
  [self drawLineFrom:pt(1,1) to:pt(1,yBR) colorIndex:lightColorIndex];
  [self drawLineFrom:pt(9,1) to:pt(9,yBR) colorIndex:darkColorIndex];
  [self drawLineFrom:pt(10,0) to:pt(10,yBR) colorIndex:darkColorIndex];
  [self drawLineFrom:pt(2,yBR) to:pt(8,yBR) colorIndex:darkColorIndex];

  return self;
}
=:
/*==================== DO NOT REMOV    EDIT ============================

      This comment and the following sccsId declaration are managed
      by SCCS for you. Do not edit or remove either.

      Source file:     /users/bmw/Alpha/UserInterface/SCCS/s.SDialogBox.m
      Latest version:  1.17
      Last mod time:   08/31/89 at 13:01:45

=========================================================================*/
```

```
static char *sccsId = "@(#)SDialogBox.m rev 1.17 created on 08/31/89 at 13:01:45";

/*==================== DO NOT REMOVE OR EDIT ==========================*/

#include "objc.h"
#include "uil.h"
#include "BMWGlobal.h"

@requires LayerGroup,ToggleButton,BM_StringEdit,StringLayer,BM_LabelValue;

= SDialogBox: BM_DialogBox (BM_WorkstationMsgs, UIMESSAGES) {

id  buttons;
int maxValueSize;
int maxWidth;
}



-parentInitialize  {
    [super initialize];
    return self;
   }



-initialize {
    [super initialize];
    defaultPushButton = acceptButton = [self defaultAcceptButton];
    cancelPushButton  = cancelButton = [self defaultCancelButton];
    maxWidth = [acceptButton outsideWidth] + [cancelButton outsideWidth] + 20;
    buttons = [LayerGroup extent: pt(maxWidth,
        ([acceptButton outsideHeight] > [cancelButton outsideHeight])
        ? [acceptButton outsideHeight] : [cancelButton outsideHeight])];
    [cancelButton attachTo: buttons];
    [acceptButton attachTo: buttons];
    [buttons attachTo: self];
    maxValueSize = 40;

    [self extent: [self defaultExtent]];
    [self insideColor:BM_colors.Frame];

    return self;
}


-(STR)valueAsStrAt: (int)i {
    if ( i < [frontLayers size] - 1 )
        return [[frontLayers at: i] valueAsStr];
    else
        return "";
}



-(int)valueAsIntAt: (int)i {
    if ( i < [frontLayers size] - 1 )
        return [[frontLayers at: i] valueAsInt];
    else
        return 0;
}
```

```
-(PT)defaultExtent {
    int i, size;
    short height = 50;
    size = [frontLayers size];
    for(i=0; i<size; i++)
        height = height + 5 + [[frontLayers at: i] height];
    return pt(maxWidth, height);
}


-addStaticLabel:(STR)aString
   {
    id label = [StringLayer str:aString];
    [label insideColor:[self insideColor]];

    maxWidth = (maxWidth < [label outsideWidth]+50) ?
                                          [label outsideWidth]+50:maxWidth;
    [self removeFrontLayer: buttons];
    [label attachTo: self];
    [buttons attachTo: self];
    return self;
   }


-addEntryLabeled: (STR)aString defaultValue: (STR)aDefaultValue {
    id se, lv;
    se = [[BM_StringEdit str: aDefaultValue] maxValueSize: maxValueSize];
    [se insideColor:[self insideColor]];
    lv = [BM_LabelValue createInterfaceFor: se labelSTR: aString];
    [lv borderWidth: 0];
    [lv insideColor:[self insideColor]];

    maxWidth = (maxWidth < [lv outsideWidth]+50)?[lv outsideWidth]+50:maxWidth;
    [self removeFrontLayer: buttons];
    [lv attachTo: self];
    [buttons attachTo: self];
    return self;
}


-addEntryLabeled: (STR)aString {
    [self addEntryLabeled: aString defaultValue: ""];
    return self;
}


-maxValueSize: (short)anInt {
    maxValueSize = anInt;
    return self;
}


+ maxValueSize: (short)anInteger{
    self = [super new];
    [self maxValueSize: anInteger];
    return self;
}
```

```
- format {
    short i;
    short count;
    short totalWidth;
    short totalHeight;
    id aLayer;
    BOOL vertical;
    short xSpacing;
    short ySpacing;
    PT myExtent;
    PT alignPoint;
    PT layerExtent;

    myExtent = [self extent];
    count=[frontLayers size];
    if (count) {
        // Scan the list of elements and find the best organization
        totalWidth = 0;
        totalHeight = 0;
        for (i=0; i<count; i++) {
            layerExtent = [[frontLayers at:i] extent];
            totalWidth += X(layerExtent);
            totalHeight += Y(layerExtent);
        }

        xSpacing = (X(myExtent)-totalWidth)/(count+1);
        ySpacing = (Y(myExtent)-totalHeight)/(count+1);

        // Will it be a vertical or horizontal format
        if (xSpacing > ySpacing)
            vertical = NO;
        else
            vertical = YES;

        // Do the layout for each element
        if (vertical)
            alignPoint = [self topCenter];
        else
            alignPoint = [self centerLeft];

        for (i=0;i<count;i++){
            aLayer=[frontLayers at:i];
            [aLayer width: maxWidth-2*borderWidth];
            if (vertical) {
                [aLayer topCenter: ptPlus(alignPoint,pt(0,ySpacing))];
                alignPoint = [aLayer bottomCenter];
            }
            else {
                [aLayer centerLeft: ptPlus(alignPoint,pt(xSpacing,0))];
                alignPoint = [aLayer centerRight];
            }
        }
        [buttons format];
    }
    return self;
}

=:
```

```
/*==================== DO NOT REMOV'    EDIT ============================

      This comment and the following sccsId declaration are managed
      by SCCS for you. Do not edit or remove either.

      Source file:     SCCS/s.SmartFont.m
      Latest version:  1.1
      Last mod time:   08/27/89 at 16:56:25

======================================================================*/

static char *sccsId = "@(#)SmartFont.m rev 1.1 created on 08/27/89 at 16:56:25";

/*==================== DO NOT REMOVE OR EDIT =========================*/


#include "objc.h"
#include "uil.h"
#include <string.h>
#include "BMWGlobal.h"

#ifdef XWIN
typedef unsigned long Atom;
#include <X11/Xatom.h>
#endif

extern Atom          BM_XInternAtom();
extern char         *BM_XQueryFont();
extern unsigned long BM_XGetFontProperty();

@requires Menu, CharString;

= SmartFont: Font (BM_WorkstationMsgs, UIMESSAGES)
   {
    short pointSize;
    BOOL  bold;
    BOOL  italic;
    BOOL  underline;
    id    familyName;
   }


   +(STR)defaultFontName
      {
       return [BM_fonts.ReportText fontName];
      }


   +defaultFontMenu
      {
       id fontMenu, font;

       fontMenu = [Menu str:"Font"];
       if (font = fonts.standard)
          [fontMenu append:[Menu str:[font fontName]]];
       if ((font = fonts.alternate) && (font != fonts.standard))
          [fontMenu append:[Menu str:[font fontName]]];
       if ((font = fonts.font2) && (font != fonts.standard))
          [fontMenu append:[Menu str:[font fontName]]];
       if ((font = fonts.font3) && (font != fonts.standard))
          [fontMenu append:[Menu str:[font fontName]]];
       if ((font = fonts.font4) && (font != fonts.standard))
          [fontMenu append:[Menu str:[font fontName]]];
```

```
 if ((font = fonts.font5) && (font != fonts.standard))
    [fontMenu append:[Menu str:[font fontName]]];
 if ((font = fonts.font6) && (font != fonts.standard))
    [fontMenu append:[Menu str    nt fontName]]];
 if ((font = fonts.font7) && (font != fonts.standard))
    [fontMenu append:[Menu str:[font fontName]]];
 if ((font = fonts.font8) && (font != fonts.standard))
    [fontMenu append:[Menu str:[font fontName]]];
 if ((font = fonts.font9) && (font != fonts.standard))
    [fontMenu append:[Menu str:[font fontName]]];
 if ((font = fonts.font10) && (font != fonts.standard))
    [fontMenu append:[Menu str:[font fontName]]];
 if ((font = fonts.font11) && (font != fonts.standard))
    [fontMenu append:[Menu str:[font fontName]]];
 if ((font = fonts.font12) && (font != fonts.standard))
    [fontMenu append:[Menu str:[font fontName]]];

 return fontMenu;
}


+fontName:(STR)aFontName
{
 id newFont = [super fontName:aFontName];

 if (newFont == nil)
    newFont = [super fontName:[self defaultFontName]];

 [newFont getFontProperties];

 return newFont;
}


-getFontProperties
{
 [self getBoldProperty];
 [self getItalicProperty];
 [self getFamilyNameProperty];
 [self getUnderlineProperty];
 [self getPointSizeProperty];

 return self;
}


-realizeFont
{
 id newFont = [[self class] fontName:[self fontName]];

 [self free];

 return newFont;
}


-awakeFrom:aFiler
{
 self = [self realizeFont];

 return self;
}
```

```
-(BOOL)fileOutFor:aFiler
  {
   BOOL  returnValue;
   char *saveFontPtr = myFont;
   myFont = 0;

   returnValue = [super fileOutFor:aFiler];

   myFont = saveFontPtr;

   return returnValue;
  }


-getFamilyNameProperty
  {
   char *fontStruct;

#ifdef XWIN
   unsigned long propValue;

   familyName = [familyName free];

   if (propValue = BM_XGetFontProperty
          (fontStruct = BM_XQueryFont ((char *)[self hardwareFont]),
                                                    XA_FAMILY_NAME))
      familyName = [CharString str:(char *)BM_XGetAtomName(propValue)];

   BM_XFreeFontInfo (fontStruct);
#endif
   return self;
  }


-getPointSizeProperty
  {
   char *fontStruct;

#ifdef XWIN
   unsigned long propValue;

   pointSize = 12;

   if (propValue = BM_XGetFontProperty
         (fontStruct = BM_XQueryFont ((char *)[self hardwareFont]),
                                                    XA_POINT_SIZE))
      pointSize = (short) (propValue / 10);

   BM_XFreeFontInfo (fontStruct);
#endif
   return self;
  }


-getBoldProperty
  {
   char *fontStruct;

#ifdef XWIN
   unsigned long propValue;

   bold = NO;
```

```
        if (propValue = BM_XGetFontProperty
             (fontStruct = BM_XQueryFont ((char *)[self hardwareFont]),
                                          BM_XInternAtom("WEIGHT_NAME")))
           bold = (BOOL) !strcmp (BM_XGetAtomName(propValue), "Bold");

        BM_XFreeFontInfo (fontStruct);
#endif
        return self;
      }


   -getUnderlineProperty
      {
        underline = NO;
#ifdef XWIN
#endif
        return self;
      }


   -getItalicProperty
      {
        char *fontStruct;

#ifdef XWIN
        unsigned long propValue;

        italic = NO;

        if (propValue = BM_XGetFontProperty
             (fontStruct = BM_XQueryFont ((char *)[self hardwareFont]),
                                               BM_XInternAtom("SLANT")))
           italic = (BOOL) (!strcmp (BM_XGetAtomName(propValue), "I") ||
                           !strcmp (BM_XGetAtomName(propValue), "O"));

        BM_XFreeFontInfo (fontStruct);
#endif
        return self;
      }


   -(BOOL)italic
      {
        return italic;
      }


   -(BOOL)bold
      {
        return bold;
      }


   -(BOOL)underline
      {
        return underline;
      }


   -(STR)familyName
      {
```

```
 if (familyName)
    return [familyName str];
 else
    return "";
 }


-(short)pointSize
  {
   return pointSize;
  }

  return [myDispString charAt: anOff    put: aChar];
  }

 - displayLayer
  {
  if (myDispString)
     [self display: myDispString];
  return self;
  }


 - displayAt:(PT)dstPoint size:(PT)aSize rule:(RULE)aRule clipBy:aClipList on:aMedium offsetBy:(PT)aSrcPoint
  {
  if ( myDispString)
     [myDispString displayAt: dstPoint size: aSize rule: aRule
         clipBy: aClipList on: aMedium];
  return self;
  }


 - PRIVATE openAt: (PT)aPoint
  {
  id aRect;

  [self outsideOrigin: aPoint];

  aRect = [self displayBox];
  if ( [aRect translateWithin: baseLayer])
     [ self outsideOrigin:[aRect origin] ];
  [aRect free];

  [Cursor cursorOff];
  backgroundImage = [BitMap fromDisplay:[self displayBox] ];
  [Cursor cursorOn];

  [ self show];

  return self;
  }


 - PRIVATE closeUp
  {
  [self menuVisible: NO];

  [Cursor cursorOff];

  [currentDisplay display: backgroundImage at: [self outsideOrigin]
      size: [self outsideExtent] rule: GXcopy];

  [Cursor cursorOn];
  backgroundImage = [backgroundImage free];
```

```
  return self;
  }


 - update: anObject because: (SEL)aSelector
  {
  [super update: anObject because: aSelector];

  if (anObject == myDispString)
    {
    if ((aSelector == @selector(backgroundColor:)) ||
       (aSelector == @selector(color:)))
      {
    if (visible)
      [self repaint];
    [self changed: aSelector];
    }

  if ((aSelector == @selector(assignSTR:)) ||
     (aSelector == @selector(font:)) || (aSelector == @selector(assign:)))
    {
    [self format];
    if (visible)
      [self repaint];
    [self changed: aSelector];
    }
  }
 return self;
 }


- terminate$
 {
 backgroundImage = [backgroundImage free];// normally it will be nil
 [myDispString removeDependent: self];
 myDispString = [myDispString free];
 return [super terminate$];
 }


- format
 {
 [myDispString center: [self asRelative: [self center]]];
 return self;
 }


- extent: (PT)aPoint
 {
 if (!ptIsEqual([self extent], aPoint)) {
   [super extent: aPoint];
 [self format];
 }
 return self;
 }

- highlight
 {
 [super highlight];
 [myDispString highlight];
 return self;
 }
```

```
- unHighlight
  {
  [super unHighlight];
  [myDispString unHighlight];
  return self;
  }


- awakeFrom: aFiler
  {
  [super awakeFrom: aFiler];
  [myDispString addDependent: self];
  return self;
  }
/*===================== DO NOT REMOVI    EDIT ============================

        This comment and the following sccsId declaration are managed
        by SCCS for you. Do not edit or remove either.

        Source file:     /users/bmw/Alpha/UserInterface/SCCS/s.TLCorner1.m
        Latest version:  1.4
        Last mod time:   06/22/89 at 16:56:46

==========================================================================*/

static char *sccsId = "@(#)TLCorner1.m rev 1.4 created on 06/22/89 at 16:56:46";

/*===================== DO NOT REMOVE OR EDIT ==========================*/

#include "objc.h"
#include "uil.h"
#include "BMWGlobal.h"

= TLCorner1:BorderLayer(BM_WorkstationMsgs,UIMESSAGES)
{
}

-initialize {

   [super initialize];
   [self borderWidth:0];
   [self insideColor:BM_colors.Frame];
   return self;
}

-(BOOL)cursorMove {

   [cursors.Origin beCursor];
   return YES;
}

-displayLayer {
   short endX,endY,midY;
   int   lightColorIndex = [BM_colors.LightFrameShadow colorIndex];
   int    darkColorIndex = [BM_colors.DarkFrameShadow  colorIndex];

   [super displayLayer];
   midY = endX = [self width]-1;
   endY = [self height]-1;
   [self drawLineFrom:pt(0,0) to:pt(endX,0) colorIndex:lightColorIndex];
   [self drawLineFrom:pt(0,1) to:pt(endX,1) colorIndex:lightColorIndex];
   [self drawLineFrom:pt(0,2) to:pt(0,endY) colorIndex:lightColorIndex];
```

```
  [self drawLineFrom:pt(1,2) to:pt(1,endY-1) colorIndex:lightColorIndex];
  [self drawLineFrom:pt(endX,midY) to:pt(endX,endY)
     colorIndex:darkColorIndex];
  [self drawLineFrom:pt(endX-1,midY-1) to:pt(endX-1,endY-1)
     colorIndex:darkColorIndex];
  [self drawLineFrom:pt(1,endY) to:pt(endX,endY) colorIndex:darkColorIndex];

  return self;
}


=:
/*==================== DO NOT REMOVI    EDIT ============================

       This comment and the following sccsId declaration are managed
       by SCCS for you. Do not edit or remove either.

       Source file:     /users/bmw/Alpha/UserInterface/SCCS/s.TLCorner2.m
       Latest version:  1.4
       Last mod time:   06/22/89 at 16:57:00

=====================================================================*/

static char *sccsId = "@(#)TLCorner2.m rev 1.4 created on 06/22/89 at 16:57:00";

/*==================== DO NOT REMOVE OR EDIT ==========================*/

#include "objc.h"
#include "uil.h"
#include "BMWGlobal.h"
#include <stdio.h>

= TLCorner2:BorderLayer(BM_WorkstationMsgs,UIMESSAGES)
{
}

-initialize {

  [super initialize];
  [self borderWidth:0];
  [self insideColor:BM_colors.Frame];
  return self;
}

-(BOOL)cursorMove {

  [cursors.Origin beCursor];
  return YES;
}

-displayLayer {
  short endX,endY;
  int   lightColorIndex = [BM_colors.LightFrameShadow colorIndex];
  int    darkColorIndex = [BM_colors.DarkFrameShadow  colorIndex];

  [super displayLayer];
  endY = [self height]-1;
  endX = [self width]-1;
  [self drawLineFrom:pt(0,0) to:pt(endX,0) colorIndex:lightColorIndex];
  [self drawLineFrom:pt(0,1) to:pt(endX-1,1) colorIndex:lightColorIndex];
  [self drawLineFrom:pt(endX,1) to:pt(endX,endY-1) colorIndex:darkColorIndex];
  [self drawLineFrom:pt(0,endY) to:pt(endX,endY) colorIndex:darkColorIndex];
```

```
  [self drawLineFrom:pt(0,endY-1) to:pt(endX-1,endY-1)
     colorIndex:darkColorIndex];

  return self;
}


=:
/*==================== DO NOT REMOVI    EDIT ============================

      This comment and the following sccsId declaration are managed
      by SCCS for you. Do not edit or remove either.

      Source file:    /users/bmw/Alpha/UserInterface/SCCS/s.TRCorner1.m
      Latest version: 1.4
      Last mod time:  06/22/89 at 16:57:22

=========================================================================*/

static char *sccsId = "@(#)TRCorner1.m rev 1.4 created on 06/22/89 at 16:57:22";

/*==================== DO NOT REMOVE OR EDIT ===========================*/

#include "objc.h"
#include "uil.h"
#include "BMWGlobal.h"

= TRCorner1:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  short endX,endY,midY;
  int lightColorIndex = [BM_colors.LightFrameShadow colorIndex];
  int darkColorIndex  = [BM_colors.DarkFrameShadow  colorIndex];

  [super displayLayer];
  endX = midY = [self width]-1;
  endY = [self height]-1;

  [self drawLineFrom:pt(0,0) to:pt(endX,0) colorIndex:lightColorIndex];
  [self drawLineFrom:pt(0,1) to:pt(endX-1,1) colorIndex:lightColorIndex];
  [self drawLineFrom:pt(endX,1) to:pt(endX,endY-1) colorIndex:darkColorIndex];
  [self drawLineFrom:pt(endX-1,2) to:pt(endX-1,endY-1)
     colorIndex:darkColorIndex];
  [self drawLineFrom:pt(0,midY-1) to:pt(0,midY-1) colorIndex:darkColorIndex];

  [self drawLineFrom:pt(0,midY) to:pt(0,endY) colorIndex:lightColorIndex];
  [self drawLineFrom:pt(1,midY-1) to:pt(1,endY-1) colorIndex:lightColorIndex];
  [self drawLineFrom:pt(1,endY) to:pt(endX,endY) colorIndex:darkColorIndex];

  return self;
}
```

```
=:

/*===================== DO NOT REMOVI    EDIT ============================

      This comment and the following sccsId declaration are managed
      by SCCS for you. Do not edit or remove either.

      Source file:    /users/bmw/Alpha/UserInterface/SCCS/s.TRCorner2.m
      Latest version: 1.4
      Last mod time:  06/22/89 at 16:57:11

=========================================================================*/

static char *sccsId = "@(#)TRCorner2.m rev 1.4 created on 06/22/89 at 16:57:11";

/*===================== DO NOT REMOVE OR EDIT ==========================*/

#include "objc.h"
#include "uil.h"
#include "BMWGlobal.h"

= TRCorner2:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  short endX,endY;
  int   lightColorIndex = [BM_colors.LightFrameShadow colorIndex];
  int    darkColorIndex = [BM_colors.DarkFrameShadow  colorIndex];

  [super displayLayer];
  endY = [self height]-1;
  endX = [self width]-1;
  [self drawLineFrom:pt(0,0) to:pt(endX,0) colorIndex:lightColorIndex];
  [self drawLineFrom:pt(0,1) to:pt(endX,1) colorIndex:lightColorIndex];
  [self drawLineFrom:pt(0,2) to:pt(0,endY-1) colorIndex:lightColorIndex];
  [self drawLineFrom:pt(0,endY) to:pt(endX,endY) colorIndex:darkColorIndex];
  [self drawLineFrom:pt(1,endY-1) to:pt(endX,endY-1)
     colorIndex:darkColorIndex];

  return self;
}


=:
/*===================== DO NOT REMOVI    EDIT ============================

      This comment and the following sccsId declaration are managed
      by SCCS for you. Do not edit or remove either.

      Source file:    /users/bmw/Alpha/UserInterface/SCCS/s.TitleBar.m
      Latest version: 1.4
      Last mod time:  07/07/89 at 11:01:59

=========================================================================*/
```

```
static char *sccsId = "@(#)TitleBar.m rev 1.4 created on 07/07/89 at 11:01:59";

/*==================== DO NOT REMOVE OR EDIT ==========================*/

#include "objc.h"
#include "uil.h"
#include "BMWGlobal.h"
#include <stdio.h>

= TitleBar:StringLayer(BM_WorkstationMsgs,UIMESSAGES)
  {
  }

- initialize
  {
  [super initialize];
  [self borderWidth:0];
  [self insideColor:BM_colors.Frame];
  [self font:BM_fonts.Application];
  [self color:BM_colors.Text];
  return self;
  }


- (BOOL)cursorMove
  {
  [cursors.Normal beCursor];
  return YES;
  }


- displayLayer
  {
  int xBR,yBR;
  PT aPoint;

  int   lightColorIndex = [BM_colors.LightFrameShadow colorIndex];
  int   darkColorIndex = [BM_colors.DarkFrameShadow  colorIndex];

  [super displayLayer];

  aPoint = [self extent];
  xBR = X(aPoint)-1;
  yBR = Y(aPoint)-1;
  [self drawLineFrom:pt(0,0) to:pt(xBR,0) colorIndex:lightColorIndex];
  [self drawLineFrom:pt(xBR,1) to:pt(xBR,yBR-2) colorIndex:darkColorIndex];
  [self drawLineFrom:pt(0,1) to:pt(0,yBR-1) colorIndex:lightColorIndex];
  [self drawLineFrom:pt(1,yBR-1) to:pt(xBR,yBR-1) colorIndex:darkColorIndex];
  [self drawLineFrom:pt(0,yBR) to:pt(xBR,yBR) colorIndex:darkColorIndex];

  return self;
  }

=:
```

```
/*==================== DO NOT REMOVI    EDIT ============================

       This comment and the following sccsId declaration are managed
       by SCCS for you. Do not edit or remove either.*

       Source file:     /users/bmw/Alpha/UserInterface/SCCS/s.TopFrame.m
       Latest version:  1.4
       Last mod time:   06/22/89 at 16:58:17

=======================================================================*/

static char *sccsId = "@(#)TopFrame.m rev 1.4 created on 06/22/89 at 16:58:17";

/*==================== DO NOT REMOVE OR EDIT ==========================*/

#include "objc.h"
#include "uil.h"
#include "BMWGlobal.h"

= TopFrame:BorderLayer(BM_WorkstationMsgs,UIMESSAGES)
{
}

-initialize {

  [super initialize];
  [self borderWidth:0];
  [self insideColor:BM_colors.Frame];
  return self;
}

-displayLayer {
  int xBR;
  PT aPoint;
  int   lightColorIndex = [BM_colors.LightFrameShadow colorIndex];
  int    darkColorIndex = [BM_colors.DarkFrameShadow  colorIndex];


  [super displayLayer];

  aPoint = [self extent];
  xBR = X(aPoint)-1;

  [self drawLineFrom:pt(0,0) to:pt(xBR,0) colorIndex:lightColorIndex];
  [self drawLineFrom:pt(0,1) to:pt(xBR-1,1) colorIndex:lightColorIndex];
  [self drawLineFrom:pt(xBR,1) to:pt(xBR,9) colorIndex:darkColorIndex];
  [self drawLineFrom:pt(0,2) to:pt(0,10) colorIndex:lightColorIndex];
  [self drawLineFrom:pt(0,10) to:pt(xBR,10) colorIndex:darkColorIndex];
  [self drawLineFrom:pt(1,9) to:pt(xBR-1,9) colorIndex:darkColorIndex];

  return self;
}

=:
/*==================== DO NOT REMOVL    EDIT ============================

       This comment and the following sccsId declaration are managed
       by SCCS for you. Do not edit or remove either.*

       Source file:     /users/bmw/Alpha/UserInterface/SCCS/s.ViewBar.m
       Latest version:  1.2
       Last mod time:   06/22/89 at 16:57:41

=======================================================================*/
```

```
static char *sccsId = "@(#)ViewBar.m rev 1.2 created on 06/22/89 at 16:57:41";

/*===================== DO NOT REMOVE OR EDIT ===========================*/

#include "objc.h"
#include "uil.h"
#include "BMWGlobal.h"
#include <stdio.h>

= ViewBar:BorderLayer(BM_WorkstationMsgs,UIMESSAGES)
{
}

-initialize {

  [super initialize];
  [self borderWidth:0];
  [self insideColor:BM_colors.Frame];
  return self;
}

-(BOOL)cursorMove {

  [cursors.Normal beCursor];
  return YES;
}

-displayLayer {
  short endX,endY;
  short anOffset;

  int   lightColorIndex = [BM_colors.LightFrameShadow colorIndex];
  int    darkColorIndex = [BM_colors.DarkFrameShadow  colorIndex];

  [super displayLayer];
  endX = [self width]-1;
  endY = [self height]-1;
  anOffset = 3;

  [self drawLineFrom:pt(0,0) to:pt(endX,0) colorIndex:lightColorIndex];
  [self drawLineFrom:pt(0,1) to:pt(0,endY-1) colorIndex:lightColorIndex];
  [self drawLineFrom:pt(endX,1) to:pt(endX,endY-2) colorIndex:darkColorIndex];
  [self drawLineFrom:pt(1,endY-1) to:pt(endX,endY-1) colorIndex:darkColorIndex];
  [self drawLineFrom:pt(0,endY) to:pt(endX,endY) colorIndex:darkColorIndex];


  [self drawLineFrom:pt(anOffset,anOffset) to:pt(endX-anOffset,anOffset)
     colorIndex:lightColorIndex];
  [self drawLineFrom:pt(anOffset,anOffset+1) to:pt(anOffset,endY-anOffset-1)
     colorIndex:lightColorIndex];
  [self drawLineFrom:pt(anOffset+1,endY-anOffset-1) to:pt(endX-anOffset,endY-anOffset-1)
     colorIndex:darkColorIndex];
  [self drawLineFrom:pt(endX-anOffset,anOffset+1) to:pt(endX-anOffset,endY-anOffset-2)
     colorIndex:darkColorIndex];
  return self;
}

-terminate$ {

  [super terminate$];
  return self;
}
=:
```

```
/*==================== DO NOT REMOVE OR EDIT ==============================

        This comment and the following sccsId declaration are managed
        by SCCS for you. Do not edit or remove either.

        Source file:     /users/bmw/Alpha/UserInterface/SCCS/s.WindowLayer.m
        Latest version:  1.11
        Last mod time:   09/13/89 at 12:34:49

=========================================================================*/

static char *sccsId = "@(#)WindowLayer.m rev 1.11 created on 09/13/89 at 12:34:49";

/*==================== DO NOT REMOVE OR EDIT ===========================*/

#include "objc.h"
#include "uil.h"
#include "BMWGlobal.h"
#include "site.h"
#include <stdio.h>


@requires Menu,DepMenu,PopUpMenu;
@requires IconHandler3D,EventQ,Confirmer,BitMap,Cursor,EchoBox;
@requires MenuBar,TitleBar;
@requires ViewBar,CloseBar;
@requires BM_Printer, BM_AskDialogBox;
@requires BorderLayer,ImageLayer;
@requires RectList,BM_ScrollBar;

extern id currentDisplay;

= WindowLayer:Border3DLayer(BM_WorkstationMsgs,UIMESSAGES)
  {
  id closeBox;
  id titleBar;
  id menuBox;
  id viewBox;
  id applicationLayer;

  id myMenu;
  id myPopUpMenu;
  id myIconHandler;

  id barMenu;
  id horizontalBar;
  id verticalBar;
  }


- initialize
  {
  [super initialize];
  menuBox  = [self defaultMenuBox];
  closeBox = [self defaultCloseBox];
  viewBox  = [self defaultViewBox];
  titleBar = [self defaultTitleBar];

  barMenu = nil;
  horizontalBar = nil;
  verticalBar = nil;
```

```
myIconHandler = [self defaultIconHandler];
[self applicationLayer:[self defaultApplicationLayer]];
myMenu = [self defaultMenu];
myPopUpMenu = [self defaultPopUp];

[self sizeLayer:YES];

[self titleFont:BM_fonts.TitleBar];

[self extent:[self defaultExtent]];

return self;
}


- (BOOL)leftButtonDown
{
if (titleBar == [self frontLayerContaining:event.origin])
   {
   [self toFront];
   [self moveFromUser];
   return YES;
   }
if (closeBox == [self frontLayerContaining:event.origin])
   {
   [self close];
   return YES;
   }
if (menuBox == [self frontLayerContaining:event.origin])
   {
   [myPopUpMenu button:LEFTBUTTON];
   [myPopUpMenu openAt:[EventQ origin] object:self];
   [myPopUpMenu button:RIGHTBUTTON];
   return YES;
   }
return ([super leftButtonDown]);
}


- (BOOL)knowsOrigin
{
return NO;
}


- open
{
 return self;
}


- defaultPopUp
{
return [PopUpMenu createInterfaceFor: myMenu button: RIGHTBUTTON];
}


- defaultTitleBar
{
id tb;
```

```
tb =  [[TitleBar str:[self defaultTitleSTR]] color:BM_colors.Text];
[tb attachTo:self];
return tb;
}
- defaultMenuBox
{
return [MenuBar attachTo:self];
}


- defaultCloseBox
{
return [CloseBar attachTo:self];
}


- defaultViewBox
{
return [ViewBar attachTo:self];
}


- (STR)defaultTitleSTR
{
return [self name];
}


- defaultApplicationLayer
{
return [[[[BorderLayer new] borderWidth: 0]
                          insideColor:BM_colors.Frame] setVisiblé:YES];
}



- defaultHorizontalBar
{
return [[[BM_ScrollBar horizontalInterfaceFor:applicationLayer]
   borderWidth:3] borderColor:BM_colors.Frame];
}


- defaultVerticalBar
{
return [[[BM_ScrollBar verticalInterfaceFor:applicationLayer]
   borderWidth:3] borderColor:BM_colors.Frame];
}


- defaultMenu
{
id menu;

menu =[DepMenu str: [self name]];
[menu append:[Menu str:"Redisplay"
   selector: @selector(display) receiver: self ]];
[menu append:[Menu str:"Raise"
   selector: @selector(toFront) receiver: self ]];
[menu append:[Menu str:"Lower"
   selector: @selector(toBack) receiver: self ]];
[menu append:[Menu str:"Move"
   selector: @selector(moveFromUser) receiver: self ]];
```

```
[menu append:[Menu str:"Size"
   selector: @selector(sizeFromUser) receiver: self ]];
[menu append:[Menu str:"Minimize"
   selector: @selector(close) receiver: self]];
[menu append:[Menu str:"Close"
   selector: @selector(askDelete) receiver: self]];

return menu;
}


- defaultIconHandler
{
return [IconHandler3D createInterfaceFor:self];
}


- defaultIcon
{
id myIcon;

myIcon = [BitMap readFrom:"windo.icon"];
return myIcon;
}


- closeBox
{
return closeBox;
}


- viewBox
{
return viewBox;
}


- menuBox
{
return menuBox;
}


- titleBar
{
return titleBar;
}


- horizontalBar
{
return horizontalBar;
}


- verticalBar
{
return verticalBar;
}
```

```
- applicationLayer
  {
  return applicationLayer;
  }


- barMenu
  {
  return barMenu;


 }



- menu
  {
  return myMenu;
  }


- popUpMenu
  {
  return myPopUpMenu;
  }


- (STR)str
  {
  return [titleBar str];
  }


- iconHandler
  {
  return myIconHandler;
  }



- menuBox: aMenuBar
  {
  if (menuBox)
     {
     [self removeFrontLayer:menuBox];
     [menuBox free];
     }
  menuBox=aMenuBar;
  if (aMenuBar)
     [self addFrontLayer:aMenuBar];
  [self format];
  [self changed: @selector(menuBox:)];
  return self;
  }


- closeBox: aCloseBar
  {
  if (closeBox)
     {
     [self removeFrontLayer:closeBox];
     [closeBox free];
     }
```

```
closeBox=aCloseBar;
if (aCloseBar)
   [self addFrontLayer:aCloseBar];
[self format];
[self changed: @selector(closeBox:)];
return self;
}


- viewBox: aViewBar
{
if (viewBox)
   {
   [self removeFrontLayer:viewBox];
   [viewBox free];
   }
viewBox=aViewBar;
if (aViewBar)
   [self addFrontLayer:aViewBar];
[self format];
[self changed: @selector(viewBox:)];
return self;
}


- titleBar:aTitleBar
{
if (titleBar)
   {
   [self removeFrontLayer:titleBar];
   [titleBar free];
  }
  titleBar=aTitleBar;
  if (titleBar)
     {
     [self addFrontLayer:aTitleBar];
     [aTitleBar moveToBack ];
     }
  [self format];
  [self changed: @selector(titleBar:)];
  return self;
  }


- barMenu:aBarMenu
{
if (barMenu)
   {
   [self removeFrontLayer:barMenu];
   [barMenu free];
   }

barMenu = aBarMenu;
[barMenu attachTo:self];
[self format];
[self changed:@selector(barMenu:)];
return self;
}
```

```
- applicationLayer:aLayer
 {
 int newWidth, newHeight;

 newWidth = newHeight = 0;
 if (applicationLayer)
    {
    [self removeFrontLayer:applicationLayer];
    [applicationLayer free];
    }

 applicationLayer = nil;

 if ([aLayer respondsTo:@selector(defaultBarMenu)])
    [self barMenu:[aLayer defaultBarMenu]];
 applicationLayer = aLayer;

 if (aLayer)
    [self addFrontLayer:aLayer];
 if (horizontalBar)
    [horizontalBar client:aLayer];
 if (verticalBar)
    [verticalBar client:aLayer];


 if (aLayer)
    {
    newWidth = [aLayer outsideWidth]+22;
    newHeight = [aLayer outsideHeight]+22;
    if (verticalBar)
       newWidth += [verticalBar outsideWidth];
    if (titleBar)
       newHeight += [titleBar outsideHeight];
    if (barMenu)
       newHeight += [barMenu outsideHeight];
    if (horizontalBar)
       newHeight += [horizontalBar outsideHeight];
    [self width:newWidth];
    [self height:newHeight];
    }

 [self format];
 [self changed:@selector(applicationLayer:)];
 return self;
 }



- horizontalBar:aScrollBar
 {
 if (horizontalBar)
    {
    [self removeFrontLayer: horizontalBar];
    [horizontalBar free];
    }
 horizontalBar = aScrollBar;
 if (aScrollBar )
    [self addFrontLayer: aScrollBar];
 [self format];
 [self changed: @selector(horizontalBar:)];
 return self;
 }
```

```
- verticalBar:aScrollBar
  {
  if (verticalBar)
     {
     [self removeFrontLayer:verticalBar];
     [verticalBar free];
     }
  verticalBar = aScrollBar;
  if (aScrollBar )
     [self addFrontLayer: aScrollBar];
  [self format];
  [self changed: @selector(verticalBar:)];
  return self;
  }

- noPageMarkers
  {
  if (verticalBar )
     [verticalBar noPageMarkers];
  if (horizontalBar )
     [horizontalBar noPageMarkers];
  return self;
  }

- menu: aMenu
  {
  id oldMenu;
  oldMenu = myMenu;
  myMenu = aMenu;
  [self popUpMenu: [self defaultPopUp]];
  [oldMenu free];
  [self changed: @selector(menu:)];
  return self;
  }

- popUpMenu: aPopUpMenu
  {
  id oldMenu;
  oldMenu = myPopUpMenu;
  myPopUpMenu = aPopUpMenu;
  [oldMenu free];
  [self changed: @selector(popUpMenu:)];
  return self;
  }

- iconHandler: anIconHandler
  {
  if ( myIconHandler)
     [myIconHandler free];
  myIconHandler = anIconHandler;
  [myIconHandler assignSTR:[self defaultTitleSTR]];
  [self changed: @selector(iconHandler:)];
  return self;
  }
```

```
- newIconHandler: anIconHandler
 {
 myIconHandler = anIconHandler;
 [myIconHandler assignSTR:[self defaultTitleSTR]];
 [self changed: @selector(iconHandler:)];
 return self;
 }


- closePosition:(PT)aPoint
 {
 [ myIconHandler closePosition:aPoint];
 return self;
 }


- assignSTR: (STR)aTitle
 {
 if (titleBar)
    [titleBar assignSTR:aTitle];
 return self;
 }


- title:(STR)aTitle
 {
 [self assignSTR:aTitle];
 return self;
 }


- titleFont:aFont
 {
 [self barHeight:[aFont height]+4];
 if (titleBar)
    [titleBar font:aFont];
 [self format];
 return self;
 }


- titleFont
 {
 return [titleBar font];
 }


- format
 {
 [self resetFrame];
 [self resetMenuBox];
 [self resetViewBox];
 [self resetCloseBox];
 [self resetTitleBar];
 [self resetBarMenu];
 [self resetApplicationLayer];
 [self resetScrollBars];
 return self;
 }
```

```
- resetMenuBox
 {
 short xTL,yTL;

 if (menuBox)
    {
    xTL = [self left];
    yTL = [self top];
    [menuBox extent:pt(barHeight-1,barHeight)];
    [menuBox origin:pt(xTL+10,yTL+10)];
    }
 return self;
 }


- resetViewBox
 {
 short xTR,yTR;

 if (viewBox)
    {
    xTR = [self right];
    yTR = [self top];
    [viewBox extent:pt(barHeight,barHeight)];
    [viewBox origin:pt(xTR-9-[viewBox width],yTR+10)];
    }
 return self;
 }


- resetCloseBox
 {
 short xTR,yTR;

 if (closeBox)
    {
    xTR = [self right];
    yTR = [self top];
    [closeBox extent:pt(barHeight,barHeight)];
    if (viewBox)
       [closeBox origin:pt(xTR-9-[closeBox width]-[viewBox width],yTR+10)];
    else
       [closeBox origin:pt(xTR-9-[closeBox width],yTR+10)];
    }
 return self;
 }


- resetTitleBar
 {
 short xTL,yTL,w;

 if (titleBar)
    {
    w = [self width]-20;
    xTL = [self left];
    yTL = [self top];

    if (menuBox)
       {
       w = w-[menuBox width];
       xTL = xTL+[menuBox width];
       }
```

```
  if (closeBox)
     w = w-[closeBox width];
  if (viewBox)
     w = w-[viewBox width];

  [titleBar width:w];
  [titleBar height:barHeight];
  [titleBar origin:pt(xTL+10,yTL+10)];
  }
return self;
}


- resetBarMenu
{
if (barMenu)
  {
  [barMenu outsideWidth:[self width]-22];
  if (titleBar)
     [barMenu outsideOrigin:pt([self left]+11,[titleBar adjacentBottom])];
  else
     [barMenu outsideOrigin:pt([self left]+11,[self top]+11)];
  }
return self;
}


- resetApplicationLayer
{
short h,w;

h = [self height]-22;
w = [self width]-22;

if (titleBar)
   h = h-[titleBar outsideHeight]+1;
if (barMenu)
   h = h-[barMenu outsideHeight];
if (horizontalBar)
   h = h-[horizontalBar defaultDimension]+1;

if (verticalBar)
   w = w-[verticalBar defaultDimension]+1;

if (barMenu)
   [applicationLayer
      outsideOrigin:pt([self left]+11,[barMenu adjacentBottom])];
else if (titleBar)
   [applicationLayer
      outsideOrigin:pt([self left]+11,[titleBar adjacentBottom])];
else
   [applicationLayer
      outsideOrigin:pt([self left]+11,[self top]+11)];

[applicationLayer outsideExtent:pt(w,h)];
return self;
}


- resetScrollBars
{
```

```
PT ex;
BOOL visibility;

if (visibility = [self visible])
   [self setVisible:NO];
if (verticalBar)
   {
   if (barMenu)
      [verticalBar outsideOrigin: pt([applicationLayer right],
         [barMenu adjacentBottom])];
   else
      [verticalBar outsideOrigin: pt([applicationLayer right],
         [titleBar adjacentBottom])];
   ex =  [verticalBar defaultExtent];
   [verticalBar extent:pt(X(ex),Y(ex))];
   }
if (horizontalBar)
   {
   [horizontalBar outsideOrigin: pt([applicationLayer adjacentLeft],
      [applicationLayer adjacentBottom])];
   ex =  [horizontalBar defaultExtent];
   [horizontalBar extent:pt(X(ex),Y(ex))];
   }
if (visibility)
   [self setVisible:YES];
return self;
}

- terminate$
 {
 if (frontLayers)
    {
    barMenu = [barMenu free];
    verticalBar = [verticalBar free];
    horizontalBar = [horizontalBar free];

    menuBox = [menuBox free];
    viewBox = [viewBox free];
    closeBox = [closeBox free];
    titleBar = [titleBar free];
    applicationLayer = [applicationLayer free];
    }
 myIconHandler = [myIconHandler free];
 myPopUpMenu = [myPopUpMenu free];
 myMenu = [myMenu free];
 return [super terminate$];
 }


- askDelete
 {
 if ([Confirmer askSTR:
       "Quit is permanent.  Are you sure you want to quit?"])
    {
    return [self delete];
    }
 return self;
 }


- close
 {
```

```
return [myIconHandler close];
}

- (BOOL)middleButtonDown
{
[self moveFromUser];
return YES;
}

- (BOOL)rightButtonDown
{
[myPopUpMenu openAt: [EventQ origin] object: self];
return YES;
}

- (BOOL)leftButtonUp
{
return YES;
}

- (BOOL)middleButtonUp
{
return YES;
}

- (BOOL)rightButtonUp
{
return YES;
}

- (BOOL)cursorMove
{
return YES;
}

- (BOOL)keyboardEvent
{
return YES;
}

- (BOOL)keyboardUp
{
return YES;
}

- (BOOL)unknownEvent
{
return YES;
}

- (BOOL)enterWindowEvent
{
return YES;
}
```

```
- (BOOL)leaveWindowEvent
  {
  return YES;
  }


=:
```

```
XXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXX

######  #     # #     #
#     # ##   ## #  #  #
#     # # # # # #  #  #
######  #  #  # #  #  #
#     # #     # #  #  #
#     # #     # #  #  #
######  #     #  ## ##
```

Request id: laser-1616    Printer: laser

Sun Sep 17 00:00:08 EDT 1989

```
/*==================== I  IOT REMOVE OR EDIT ========   ================

       This comment and the following sccsId declaration are managed
       by SCCS for you. Do not edit or remove either.

       Source file:     %F%
       Latest version:  %I%
       Last mod time:   %H% at %U%

======================================================================*/

static char *sccsId = "@(#)BMGFXInterf.c work in progress by bmw";

/*==================== DO NOT REMOVE OR EDIT ==========================*/


#include <stdio.h>
#include "gks.h"
#include "cchart.h"
#include "BMGFXInterf.h"

#define  ASPECT_RATIO 0.85

char *IdToMediumName (Id, Name)

   int  Id;
   char *Name;

   {
    sprintf (Name, "BMGFX_%d\0", Id);

    return Name;
   }
```

```
int MediumNameToId (Name)

   char *Name;

   {
    int Id;

    sscanf (Name, "BMGFX_%d", &Id);

    return Id;
   }


void BM_OpenGraphicsPackage (errorfile)
FILE* errorfile;
   {
    Gerror gopengks ();

    gopengks ((long) 0, errorfile);
   }

void BM_CloseGraphicsPackage ()
   {
    Gerror gclosegks ();

    gclosegks ();
   }


GFXWSPTR BM_OpenGraphicsWorkstation (devicename, workstationtype)
char *devicename,
     *workstationtype;
   {
    Gws *ws, *gopenws ();

    ws = gopenws (devicename, workstationtype);
    gactivatews (ws);

    return ws;
   }

void BM_CloseGraphicsWorkstation (ws)
Gws *ws;
   {
    gdeactivatews(ws);
    gclosews(ws);
   }




Ctxbd *cinqdtindlbltextrep ();
Ctxbd *cinqlgndttltextrep ();
Ctxbd *cinqdtlgtextrep ();
Ctxbd *cinqttltextrep ();
Ctxbd *cinqaxhdrtextrep ();
Ctxbd *cinqaxlbltextrep ();

Gwsct    *ginqwsconntype();
Gdspsize *ginqmaxdisplaysize();


void SetTextAttributes ()
   {
    Ctxbd  *defaultAttributes;
    Gfloat line1height;
```

```
    defaultAttributes = cinqlgndttltextrep ();
    defaultAttributes -> fnt = H_UNI_SIMPLEX;
    csetlgndttltextrep (defaultAttributes);

    defaultAttributes = cinqttltextrep (0);
    defaultAttributes -> fnt = H_UNI_SIMPLEX;
    defaultAttributes -> ht *= 0.82;
    csetttltextrep (0, defaultAttributes);

    defaultAttributes = cinqttltextrep (1);
    defaultAttributes -> fnt = H_UNI_SIMPLEX;
    line1height = defaultAttributes -> ht;
    csetttltextrep (1, defaultAttributes);

    defaultAttributes = cinqttltextrep (2);
    defaultAttributes -> fnt = H_UNI_SIMPLEX;
    defaultAttributes -> ht  = line1height;
    csetttltextrep (2, defaultAttributes);

    defaultAttributes = cinqttltextrep (3);
    defaultAttributes -> fnt = H_UNI_SIMPLEX;
    defaultAttributes -> ht  = line1height;
    csetttltextrep (3, defaultAttributes);

    defaultAttributes = cinqaxhdrtextrep (GLEFT);
    defaultAttributes -> fnt = H_UNI_SIMPLEX;
    csetaxhdrtextrep (GLEFT, defaultAttributes);

    defaultAttributes = cinqaxhdrtextrep (GDOWN);
    defaultAttributes -> fnt = H_UNI_SIMPLEX;
    csetaxhdrtextrep (GDOWN, defaultAttributes);

    defaultAttributes = cinqaxhdrtextrep (GRIGHT);
    defaultAttributes -> fnt = H_UNI_SIMPLEX;
    csetaxhdrtextrep (GRIGHT, defaultAttributes);

    defaultAttributes = cinqaxhdrtextrep (GUP);
    defaultAttributes -> fnt = H_UNI_SIMPLEX;
    csetaxhdrtextrep (GUP, defaultAttributes);

    defaultAttributes = cinqaxlbltextrep (GLEFT);
    defaultAttributes -> fnt = H_UNI_SIMPLEX;
    csetaxlbltextrep (GLEFT, defaultAttributes);

    defaultAttributes = cinqaxlbltextrep (GDOWN);
    defaultAttributes -> fnt = H_UNI_SIMPLEX;
    csetaxlbltextrep (GDOWN, defaultAttributes);

    defaultAttributes = cinqaxlbltextrep (GRIGHT);
    defaultAttributes -> fnt = H_UNI_SIMPLEX;
    csetaxlbltextrep (GRIGHT, defaultAttributes);

    defaultAttributes = cinqaxlbltextrep (GUP);
    defaultAttributes -> fnt = H_UNI_SIMPLEX;
    csetaxlbltextrep (GUP, defaultAttributes);
   }

void BM_BeginPlotting (ws, chartType, showLegend,
                                   title1, title2, title3, title4,
                                                              xLabel, yLabel)

Gws  *ws;
Gint chartType;
Gint showLegend;
char *title1,
     *title2,
     *title3,
     *title4,
     *xLabel,
     *yLabel;
```

```
   {
    Cmarg    margins;
    Gdspsize *size;
    Gnrect   viewport;

    cchtopen   (1,2,stderr);
    cnewws     (ws);

    margins.left   = 0.10;
    margins.right  = 0.05;
    margins.top    = 0.20;
    margins.bottom = 0.10;
    csetmargin (&margins);

    viewport.ll.x = 0.00;
    viewport.ll.y = 0.00;
    viewport.ur.x = 1.00;
    viewport.ur.y = 1.00;
    csetviewport (&viewport);

    size = ginqmaxdisplaysize(ginqwsconntype(ws)->type);
    csetaspect (ws, size->device.y/size->device.x);

    csetprevlevel (4);
    csetttlstr (0, title1,;
    csetttlstr (1, title2);
    csetttlstr (2, title3);
    csetttlstr (3, title4);

    csetaxhdrstr (GLEFT, yLabel);
    csetaxhdrstr (GDOWN, xLabel);

    csetaxautoscale (GLEFT, chartType);
    csetaxautoscale (GDOWN, chartType);

    csetaxvis (GLEFT, (int)(chartType != PIE));
    csetaxvis (GDOWN, (int)(chartType != PIE));

    csetlgndvis (showLegend);

    SetTextAttributes ();
   }


void BM_FinishPlotting ()
   {
    cdrawsets();

    cdrawaxis (GLEFT);
    cdrawaxis (GDOWN);

    cdrawlegend ();

    cdrawtitles ();

    cchtclose ();
   }


void BM_AddDataSet (setNumber, chartType, fillBelow, legendLabel,
                                                  numOfPoints, ptrToPoints)

Gint    setNumber,
        chartType,
        fillBelow;
char    *legendLabel;
Gint    numOfPoints;
Gwpoint *ptrToPoints;
```

```
   {
    Ctxbd *defaultAttributes;

    caddset (setNumber, chartType, numOfPoints, ptrToPoints);

    if (fillBelow)
       csetdtcurvefill (setNumber, F_BELOW);

    if (chartType == PIE)
      {
       defaultAttributes = cinqdtindlbltextrep (setNumber, 0);
       defaultAttributes -> fnt = H_UNI_SIMPLEX;
       csetdtindlbltextrep (setNumber, ALL, defaultAttributes);

       csetdtindlblvis (setNumber, ALL, 0);  /* gets turned back on below! */

       csetdtpierad (setNumber, 0.2);
      }

    if (strlen(legendLabel))
      {
       csetdtlgstr (setNumber, legendLabel);

       defaultAttributes = cinqdtlgtextrep (setNumber);
       defaultAttributes -> fnt = H_UNI_SIMPLEX;
       csetdtlgtextrep (setNumber, defaultAttributes);
      }
   }


void BM_AddPointLabel (setNumber, pointNumber, label)

Gint setNumber,
     pointNumber;
char *label;

   {
    csetdtindlblstr (setNumber, pointNumber, label);
    csetdtindlblfmt (setNumber, "TEXT: PERCENT%");
    csetdtindlblvis (setNumber, pointNumber, 1);
   }



#define MENDITEM        0
#define MCLEARWS        1
#define MUPDATEWS       3
#define MESCAPE         6
#define MPOLYLINE       11
#define MPOLYMARKER     12
#define MTEXT           13
#define MFILLAREA       14
#define MCELLARAY       15


PlayMetafile (WorkstationID, MetafileName)
int WorkstationID;
char *MetafileName;

{
Gws *metaws;                    /* workstation pointer for metafile */
extern Gws *gopenws();          /* workstation open function */
Ggksmit *gksmit;                /* gks meta item */
extern Ggksmit *ggetgksm();     /* function to get metafile item */
Gwsct connect;                  /* connect type for main ws */
Glong memory=0;                 /* 0 = virtual memory */
```

```
FILE *metain;                    /* metafile input file pointer */
FILE *errorfile;                 /* error file pointer */
int i;
int request;                     /* chart request from command line */
int chartcount = 0;              /* chart counter */
int screenfull = FALSE;          /* flag for full screen */


extern int vec___getread;
extern int vec___newfile;

vec___getread = 0;
vec___newfile = 1;


if ((metain = fopen (MetafileName,"r")) == NULL)
        {
        fprintf (stderr, "Problem opening metafile \"%s\"\n", MetafileName);
        }

if ((metaws = gopenws(MetafileName,"mi")) == (Gws *) NULL)
   fprintf (stderr, "Can not open metafile \"%s\"\n", MetafileName);

request = 0;

    cchtopen   (1,2,stderr);
    cnewws     (WorkstationID);
    csetaspect (WorkstationID, ASPECT_RATIO);


/*************************************************************************/
/** loop through metafile until no more information ************************/
/*************************************************************************/


while ((gksmit = ggetgksm(metaws))->type != MENDITEM) {
            greadgksm (metaws, NULL, (Gchar *)NULL);
                                                  /* read internally the
                                                    metafile item. NOTE: The
                                                      last two arguments are
                                                  dummies as no user defined
                                                  metafile items are used */
        switch (gksmit->type)    {
/*************************************************************************/
/** CLEARWS is the indicator that a chart is finished **********************/
/*************************************************************************/
                case MCLEARWS:                        /* if type was a clear */
                        if (chartcount == request || request == 0)
                                gclearws (WorkstationID, ALWAYS);

                        chartcount++;                /* increment chart count */
                        screenfull = FALSE;             /* make screen empty */
                        break;                        /* break out of switch */
/*************************************************************************/
/** Any primitives make screen full ******************************************/
/*************************************************************************/
                case MESCAPE:
                case MPOLYLINE:
                case MPOLYMARKER:
                case MTEXT:
                case MFILLAREA:
                case MCELLARAY:
                        if (chartcount == request || request == 0)
                                screenfull = TRUE;          /* screen is full */
/*************************************************************************/
/** UPDATEWS only when requested chart is found *****************************/
/*************************************************************************/
                case MUPDATEWS:                 /* if type was an update item */
                        if (chartcount == request || request == 0)
```

```
                        ginterpret (gksmit,(Gchar *)NULL);/* decode */
                break;                         /* leave switch loop */
/***************************************************************************/
/** All other commands are interpreted ************************************/
/***************************************************************************/
            default:
                ginterpret (gksmit,(Gchar *)NULL);        /* decode */
            }
        }

/***************************************************************************/
/** When all done, close down the file itself ******************************/
/***************************************************************************/
                                                   /* close metafile ws */
gclosews (metaws);                               /* close the actual file */
fclose (metain);
cchtclose();
}

/*====================== DO NOT REMOVE (    )IT =============================

    This comment and the following sccsId declaration are managed
    by SCCS for you. Do not edit or remove either.

    Source file:     %F%
    Latest version:  %I%
    Last mod time:   %H% at %U%

=========================================================================*/

static char *sccsId = "@(#)BMGFXInterf.c work in progress by bmw";

/*====================== DO NOT REMOVE OR EDIT ===========================*/


#include <stdio.h>
#include "gks.h"
#include "cchart.h"
#include "BMGFXInterf.h"

#define  ASPECT_RATIO 0.85

char *IdToMediumName (Id, Name)

   int  Id;
   char *Name;

   {
    sprintf (Name, "BMGFX_%d\0", Id);

    return Name;
   }

 int MediumNameToId (Name)

   char *Name;

   {
    int Id;

    sscanf (Name, "BMGFX_%d", &Id);

    return Id;
   }
```

```
void BM_OpenGraphicsPackage (errorfile)
FILE* errorfile;
   {
    Gerror gopengks ();

    gopengks ((long) 0, errorfile);
   }

void BM_CloseGraphicsPackage ()
   {
    Gerror gclosegks ();

    gclosegks ();
   }


GFXWSPTR BM_OpenGraphicsWorkstation (devicename, workstationtype)
char *devicename,
     *workstationtype;
   {
    Gws *ws, *gopenws ();

    ws = gopenws (devicename, workstationtype);
    gactivatews (ws);

    return ws;
   }

void BM_CloseGraphicsWorkstation (ws)
Gws *ws;
   {
    gdeactivatews(ws);
    gclosews(ws);
   }




Ctxbd *cinqdtindlbltextrep ();
Ctxbd *cinqlgndttltextrep ();
Ctxbd *cinqdtlgtextrep ();
Ctxbd *cinqttltextrep ();
Ctxbd *cinqaxhdrtextrep ();
Ctxbd *cinqaxlbltextrep ();

Gwsct    *ginqwsconntype();
Gdspsize *ginqmaxdisplaysize();


void SetTextAttributes ()
   {
    Ctxbd  *defaultAttributes;
    Gfloat line1height;

    defaultAttributes = cinqlgndttltextrep ();
    defaultAttributes -> fnt = H_UNI_SIMPLEX;
    csetlgndttltextrep (defaultAttributes);

    defaultAttributes = cinqttltextrep (0);
    defaultAttributes -> fnt = H_UNI_SIMPLEX;
    defaultAttributes -> ht *= 0.82;
    csetttltextrep (0, defaultAttributes);
```

```
defaultAttributes = cinqttltextrep (1);
defaultAttributes -> fnt = H_UNI_SIMPLEX;
line1height = defaultAttributes -> ht;
csetttltextrep (1, defaultAttributes);

defaultAttributes = cinqttltextrep (2);
defaultAttributes -> fnt = H_UNI_SIMPLEX;
defaultAttributes -> ht  = line1height;
csetttltextrep (2, defaultAttributes);

defaultAttributes = cinqttltextrep (3);
defaultAttributes -> fnt = H_UNI_SIMPLEX;
defaultAttributes -> ht  = line1height;
csetttltextrep (3, defaultAttributes);

defaultAttributes = cinqaxhdrtextrep (GLEFT);
defaultAttributes -> fnt = H_UNI_SIMPLEX;
csetaxhdrtextrep (GLEFT, defaultAttributes);

defaultAttributes = cinqaxhdrtextrep (GDOWN);
defaultAttributes -> fnt = H_UNI_   PLEX;
csetaxhdrtextrep (GDOWN, defaultAttributes);

defaultAttributes = cinqaxhdrtextrep (GRIGHT);
defaultAttributes -> fnt = H_UNI_SIMPLEX;
csetaxhdrtextrep (GRIGHT, defaultAttributes);

defaultAttributes = cinqaxhdrtextrep (GUP);
defaultAttributes -> fnt = H_UNI_SIMPLEX;
csetaxhdrtextrep (GUP, defaultAttributes);

defaultAttributes = cinqaxlbltextrep (GLEFT);
defaultAttributes -> fnt = H_UNI_SIMPLEX;
csetaxlbltextrep (GLEFT, defaultAttributes);

defaultAttributes = cinqaxlbltextrep (GDOWN);
defaultAttributes -> fnt = H_UNI_SIMPLEX;
csetaxlbltextrep (GDOWN, defaultAttributes);

defaultAttributes = cinqaxlbltextrep (GRIGHT);
defaultAttributes -> fnt = H_UNI_SIMPLEX;
csetaxlbltextrep (GRIGHT, defaultAttributes);

defaultAttributes = cinqaxlbltextrep (GUP);
defaultAttributes -> fnt = H_UNI_SIMPLEX;
csetaxlbltextrep (GUP, defaultAttributes);
}


void BM_BeginPlotting (ws, chartType, showLegend,
                       title1, title2, title3, title4,
                                              xLabel, yLabel)

Gws  *ws;
Gint chartType;
Gint showLegend;
char *title1,
     *title2,
     *title3,
     *title4,
     *xLabel,
     *yLabel;
```

```
   {
    Cmarg    margins;
    Gdspsize *size;
    Gnrect   viewport;

    cchtopen   (1,2,stderr);
    cnewws     (ws);

    margins.left   = 0.10;
    margins.right  = 0.05;
    margins.top    = 0.20;
    margins.bottom = 0.10;
    csetmargin (&margins);

    viewport.ll.x = 0.00;
    viewport.ll.y = 0.00;
    viewport.ur.x = 1.00;
    viewport.ur.y = 1.00;
    csetviewport (&viewport);

    size = ginqmaxdisplaysize(ginqwsconntype(ws)->type);
    csetaspect (ws, size->device.y/size->device.x);

    csetprevlevel (4);
    csetttlstr (0, title1);
    csetttlstr (1, title2);
    csetttlstr (2, title3);
    csetttlstr (3, title4);

    csetaxhdrstr (GLEFT, yLabel);
    csetaxhdrstr (GDOWN, xLabel);

    csetaxautoscale (GLEFT, chartType);
    csetaxautoscale (GDOWN, chartType);

    csetaxvis (GLEFT, (int)(chartType != PIE));
    csetaxvis (GDOWN, (int)(chartType != PIE));

    csetlgndvis (showLegend);

    SetTextAttributes ();
   }


void BM_FinishPlotting ()
   {
    cdrawsets();

    cdrawaxis (GLEFT);
    cdrawaxis (GDOWN);

    cdrawlegend ();

    cdrawtitles ();

    cchtclose ();
   }


void BM_AddDataSet (setNumber, chartType, fillBelow, legendLabel,
                                                numOfPoints, ptrToPoints)
```

```
Gint    setNumber,
        chartType,
        fillBelow;
char    *legendLabel;
Gint    numOfPoints;
Gwpoint *ptrToPoints;

   {
    Ctxbd *defaultAttributes;

    caddset (setNumber, chartType, numOfPoints, ptrToPoints);

    if (fillBelow)
       csetdtcurvefill (setNumber, F_BELOW);

    if (chartType == PIE)
      {
       defaultAttributes = cinqdtindlbltextrep (setNumber, 0);
       defaultAttributes -> fnt = H_UNI_SIMPLEX;
       csetdtindlbltextrep (setNumber, ALL, defaultAttributes);

       csetdtindlblvis (setNumber, ALL, 0);  /* gets turned back on below! */

       csetdtpierad (setNumber, 0.2);
      }

    if (strlen(legendLabel))
      {
       csetdtlgstr (setNumber, legendLabel);

       defaultAttributes = cinqdtlgtextrep (setNumber);
       defaultAttributes -> fnt = H_UNI_SIMPLEX;
       csetdtlgtextrep (setNumber, defaultAttributes);
      }
   }


void BM_AddPointLabel (setNumber, pointNumber, label)

Gint setNumber,
     pointNumber;
char *label;

   {
    csetdtindlblstr (setNumber, pointNumber, label);
    csetdtindlblfmt (setNumber, "TEXT: PERCENT%");
    csetdtindlblvis (setNumber, pointNumber, 1);
   }



#define MENDITEM        0
#define MCLEARWS        1
#define MUPDATEWS       3
#define MESCAPE         6
#define MPOLYLINE       11
#define MPOLYMARKER     12
#define MTEXT           13
#define MFILLAREA       14
#define MCELLARAY       15
```

```
PlayMetafile (WorkstationID, MetafileName)
int WorkstationID;
char *MetafileName;

{
Gws *metaws;                    /* workstation pointer for metafile */
extern Gws *gopenws();          /* workstation open function */
Ggksmit *gksmit;                /* gks meta item */
extern Ggksmit *ggetgksm();     /* function to get metafile item */
Gwsct connect;                  /* connect type for main ws */
Glong memory=0;                 /* 0 = virtual memory */
FILE *metain;                   /* metafile input file pointer */
FILE *errorfile;                /* error file pointer */
int i;
int request;                    /* chart request from command line */
int chartcount = 0;             /* chart counter */
int screenfull = FALSE;         /* flag for full screen */


extern int vec___getread;
extern int vec___newfile;

vec___getread = 0;
vec___newfile = 1;


if ((metain = fopen (MetafileName,"r")) == NULL)
        {
        fprintf (stderr, "Problem opening metafile \"%s\"\n", MetafileName);
        }

if ((metaws = gopenws(MetafileName,"mi")) == (Gws *) NULL)
   fprintf (stderr, "Can not open metafile \"%s\"\n", MetafileName);

request = 0;

    cchtopen   (1,2,stderr);
    cnewws     (WorkstationID);
    csetaspect (WorkstationID, ASPECT_RATIO);


/******************************************************************************/
/** loop through metafile until no more information *************************/
/******************************************************************************/


while ((gksmit = ggetgksm(metaws))->type != MENDITEM) {
            greadgksm (metaws, NULL, (Gchar *)NULL);
                                                /* read internally the
                                                  metafile item. NOTE: The
                                                    last two arguments are
                                                dummies as no user defined
                                                metafile items are used */
        switch (gksmit->type)   {
/******************************************************************************/
/** CLEARWS is the indicator that a chart is finished ***********************/
/******************************************************************************/
                case MCLEARWS:                   /* if type was a clear */
                        if (chartcount == request || request == 0)
                                gclearws (WorkstationID, ALWAYS);

                        chartcount++;            /* increment chart count */
                        screenfull = FALSE;          /* make screen empty */
```

```
                        break;                      /* break out of switch */
/*****************************************************************************/
/** Any primitives make screen full ******************************************/
/*****************************************************************************/
                case MESCAPE:
                case MPOLYLINE:
                case MPOLYMARKER:
                case MTEXT:
                case MFILLAREA:
                case MCELLARAY:
                        if (chartcount == request || request == 0)
                                screenfull = TRUE;      /* screen is full */
/*****************************************************************************/
/** UPDATEWS only when requested chart is found ******************************/
/*****************************************************************************/
                case MUPDATEWS:                 /* if type was an update item */
                        if (chartcount == request || request == 0)
                                ginterpret (gksmit,(Gchar *)NULL);/* decode */
                        break;                          /* leave switch loop */
/*****************************************************************************/
/** All other commands are interpreted ***************************************/
/*****************************************************************************/
                default:
                        ginterpret (gksmit,(Gchar *)NULL);      /* decode */
                }
        }

/*****************************************************************************/
/** When all done, close down the file itself ********************************/
/*****************************************************************************/
gclosews (metaws);                                      /* close metafile ws */
fclose (metain);                                     /* close the actual file */
cchtclose();
}

/*===================== DO NOT REMOVE     )IT ==============================

        This comment and the following sccsId declaration are managed
        by SCCS for you. Do not edit or remove either.

        Source file:    /users/bmw/Alpha/Reports/SCCS/s.BM_ListBox.m
        Latest version: 1.15
        Last mod time:  09/08/89 at 14:32:50

==========================================================================*/

static char *sccsId = "@(#)BM_ListBox.m rev 1.15 created on 09/08/89 at 14:32:50";

/*===================== DO NOT REMOVE OR EDIT ============================*/



#include "objc.h"
#include "uil.h"
#include "BMWGlobal.h"
#include <string.h>

@requires ReportDALayer,DataCltn,BM_ScrollLayer,ReportDataArea;
@requires ScrollBar;

= BM_ListBox:RidgeLayer(BM_WorkstationMsgs,UIMESSAGES)
  {
  id verticalBar;
```

```
 id repDALayer;
 id scrollLayer;

 id myDataCltn;
 id myTemplate;
 }


- repDALayer
 {
 return repDALayer;
 }


- verticalBar
 {
 return verticalBar;
 }


- myDataCltn
 {
 return myDataCltn;
 }


- myTemplate
 {
 return myTemplate;
 }



- insideColor:aColor
 {
 [repDALayer insideColor:aColor];
 return [super insideColor:aColor];
 }


- color:aColor
 {
 [repDALayer setTextColor:aColor];
 return self;
 }


- createDataAndTemplateAndDALayer:aStringMatrix font:aFont
 {
 if (aStringMatrix)
    {
    myDataCltn = [[DataCltn new] addSet:aStringMatrix];
    myTemplate = [ReportDataArea
       defaultStringDataArea:aStringMatrix addTitle:nil];
    }
 else
    {
    myDataCltn = nil;
    myTemplate = [ReportDataArea new];
    }

 [myTemplate valueFontName:[aFont str]];
 repDALayer =[ReportDALayer data:myDataCltn template:myTemplate parent:nil];
```

```
return self;
}


- createScrollLayer:(int)height
{
scrollLayer = [BM_ScrollLayer new];
[scrollLayer extent:pt([repDALayer outsideWidth],height)];
[repDALayer attachTo:scrollLayer at:pt(0,0)];
[scrollLayer attachTo:self at:pt(0,0)];

verticalBar = [[ScrollBar verticalInterfaceFor:scrollLayer] attachTo:self];
[verticalBar extent:[verticalBar defaultExtent]];
[verticalBar barColor:BM_colors.Background];
[[verticalBar borderWidth:1] borderColor:BM_colors.Border];
[verticalBar origin:pt([scrollLayer adjacentRight],[scrollLayer top])];

[self extent:pt([repDALayer outsideWidth]+[verticalBar outsideWidth],height)];

return self;
}


+ stringMatrix:aStringMatrix height:(int)height client:aClient font:aFont
{
self = [self new];
[self createDataAndTemplateAndDALayer:aStringMatrix font:aFont];

height = (int)(height/[repDALayer lineHeight])*[repDALayer lineHeight];
[self createScrollLayer:height];

return self;
}


+ stringMatrix:aStringMatrix height:(int)height client:aClient
{
return [self stringMatrix:aStringMatrix height:height client:aClient
        font:BM_fonts.ReportText]
}


+ stringMatrix:aStringMatrix lines:(int)numberOfLines client:aClient font:aFont
{
self = [self new];
[self createDataAndTemplateAndDALayer:aStringMatrix font:aFont];
[self createScrollLayer:[repDALayer lineHeight]*numberOfLines];

return self;
}


+ stringMatrix:aStringMatrix lines:(int)numberOfLines client:aClient
{
return [self stringMatrix:aStringMatrix lines:(int)numberOfLines
   client:aClient font:BM_fonts.ReportText];
}


- extent:(PT)aPoint
```

```
{
[super extent:aPoint];

[scrollLayer height:[self height]];
[scrollLayer width:[self width]-[verticalBar width]];
[verticalBar outsideOrigin:pt([scrollLayer adjacentRight],
                              [scrollLayer top])];
return self;
}



- terminate$
{
if (myDataCltn)
   myDataCltn  = [myDataCltn free];

if (myTemplate)
   myTemplate = [myTemplate free];

return [super terminate$];
}


=:

/*==================== DO NOT REMOV     EDIT ============================

      This comment and the following sccsId declaration are managed
      by SCCS for you. Do not edit or remove either.

      Source file:     /users/bmw/Alpha/Reports/SCCS/s.DataArea.m
      Latest version:  1.15
      Last mod time:   09/04/89 at 20:03:20

=======================================================================*/

static char *sccsId = "@(#)DataArea.m rev 1.15 created on 09/04/89 at 20:03:20";

/*==================== DO NOT REMOVE OR EDIT ==========================*/

#include "objc.h"
#include "uil.h"
#include "string.h"
#include "BMWGlobal.h"

#define SNORMAL 0
#define SASCEND 1
#define SDESCEND 2


= DataArea:DepSharObject(BM_WorkstationMsgs,UIMESSAGES)
{
int border;           // Border width in pixels
short sort;           // Sort mechanism, SNORMAL, SASCEND, SDESCEND
unsigned primarySort; // Primary sort data set
unsigned secondarySort;
                      // Secondary sort data set
unsigned sortColumn;
}
```

```
+ new
{
self = [super new];
[self initialize];
return self;
}


- (unsigned)sortColumn
{
return sortColumn;
}


- sortColumn:(unsigned)anOffset
{
sortColumn = anOffset;
return self;
}


- (short)sortType
{
return sort;
}


- initialize
{
sort = SASCEND;
primarySort = -1;
secondarySort = -1;
[self borderWidth:0];
sortColumn = 0;

return self;
}


- (int)borderWidth
{
return border;
}


- borderWidth: (int)aBorderWidth
{
border = aBorderWidth;
[self changed: @selector(borderWidth:)];
return self;
}


- (BOOL)isNormalSort
{
if (sort == SNORMAL)
   return YES;
else
   return NO;
}
```

```
- (BOOL)isAscendingSort
 {
 if (sort == SASCEND )
    return YES;
 else
    return NO;
 }


- (BOOL)isDescendingSort
 {
 if (sort == SDESCEND )
    return YES;
 else
    return NO;
 }


- (unsigned) primarySortSet
 {
 return primarySort;
 }


- (unsigned) secondarySortSet
 {
 return secondarySort;
 }


- normalSort
 {
 sort = SNORMAL;
 [self changed: @selector(normalSor
 return self;
 }


- ascendingSort
 {
 sort = SASCEND;
 [self changed: @selector(ascendingSort)];
 return self;
 }


- descendingSort
 {
 sort = SDESCEND;
 [self changed: @selector(descendingSort)];
 return self;
 }


- primarySortSet: (unsigned)aNumber
 {
 if (aNumber > 1 && aNumber <= [self numDataSets])
    primarySort = aNumber;
 else
    primarySort = -1;
 [self changed: @selector(primarySortSet:)];
 return self;
 }
```

```
- secondarySortSet: (unsigned)aNumber
 {
 if (aNumber > 1 && aNumber <= [self numDataSets])
    secondarySort = aNumber;
 else
    secondarySort = -1;
 [self changed: @selector(secondarySortSet:)];
 return self;
 }

=:

/*===================== DO NOT REMOV     EDIT ============================

       This comment and the following sccsId declaration are managed
       by SCCS for you. Do not edit or remove either.

       Source file:     /users/bmw/Alpha/Reports/SCCS/s.DataCltn.m
       Latest version:  1.2
       Last mod time:   09/02/89 at 15:44:26

=========================================================================*/

static char *sccsId = "@(#)DataCltn.m rev 1.2 created on 09/02/89 at 15:44:26";

/*===================== DO NOT REMOVE OR EDIT ===========================*/

/*
   A DataCltn contains "sets" of data.  From the point of view of users of the
   class, these sets are all one "column" wide.  DataCltn may in fact manage
   data sets (instances of BM_Matrix or BM_StringMatrix) of arbitrary width,
   and thus handles the mapping between "set numbers" and collection-index/
   column-offset combinations.  Example: A DataCltn containing three matrices
   of widths 3, 1, and 2 responds to a request for "set number 5" by accessing
   the third element in its collection and the second column within that
   element. (Sets are numbered from 0!)
*/

#include "objc.h"
#include "uil.h"

#include "BMWGlobal.h"

@requires BM_StringMatrix, BM_Matrix;

= DataCltn:OrdCltn (BM_WorkstationMsgs, UIMESSAGES) {
id sortTable;   // Instance of BM_NumericArray, holding sort positions

unsigned lastSetAccessed;
unsigned setNumber, offsetWithinSet;

unsigned sortColumn, sortType;
}

/* $Default Category: Initialization $ */

/*
Initialize the receiver.  Returns self.
*/
-initialize {
    sortTable = nil;
    sortType  = 0;
    sortColumn = 0;
```

```
    lastSetAccessed = (unsigned)-1;

    return self;
}


+new {
    self = [super new];
    [self initialize];
    return self;
}


-(unsigned)nSets
        {
        unsigned nSets;
        int index, aSize;

        index = nSets = 0;
        aSize = [self size];

        for (; index < aSize; index++)
                nSets += [[self at:index] nColumns];

        return nSets;
        }


-dataSetAndOffsetFromColumn:(unsigned)aSetNumber
        {
        unsigned maxSize;
        int index, indexPos;
        BOOL found;

        if (aSetNumber == lastSetAccessed)
           return self;

        lastSetAccessed = aSetNumber;

        maxSize = [self nSets];

        index = 0;
        indexPos = [[self at:0] nColumns];
        found = NO;

        while ( (!(found)) && (aSetNumber < maxSize))
                {
                if (aSetNumber < indexPos)
                        found = YES;
                else    {
                        index++;
                        indexPos += [[self at:index] nColumns];
                        }
                }
        setNumber = index;
        offsetWithinSet = [[self at:index] nColumns] - (indexPos - aSetNumber);
        return self;
        }


-(unsigned)setNumberFromColumn:(unsigned)aSetNumber
        {
```

```
        [self dataSetAndOffsetFromColumn:aSetNumber];
        return setNumber;
        }


-(unsigned)offsetWithinSet:(unsigned)aSetNumber
        {
        [self dataSetAndOffsetFromColumn:aSetNumber];
        return offsetWithinSet;
        }



/*
Returns YES if the data at index anIndex in the receiver has a type of
Integer, otherwise returns NO.
*/
-(BOOL)isIntAt: (unsigned)anIndex {
    return NO;
}

/*
Returns YES if the data at index anIndex in the receiver has a type of
Float, otherwise returns NO.
*/
-(BOOL)isFloatAt: (unsigned)anIndex {
    if ( [[self at: [self setNumberFromColumn:anIndex]] class] == BM_Matrix )
        return YES;
    else
        return NO;
}

/*
Returns YES if the data at index anIndex in the receiver has a type of
Text, otherwise returns NO.
*/
-(BOOL)isTextAt: (unsigned)anIndex {
    if ( [[self at: [self setNumberFromColumn:anIndex]] class] == BM_StringMatrix )
        return YES;
    else
        return NO;
}

/*
Return the integer data item from the receiver's data set aSet at index
anIndex.
*/
-(int)intInSet: (unsigned)aSet at: (unsigned)anIndex {
    return 0;
}

/*
Return the float data item from the receiver's data set aSet at index
anIndex.
*/
-(float)floatInSet: (unsigned)aSet at: (unsigned)anIndex {
    [self dataSetAndOffsetFromColumn:aSet];
    if (sortTable)
        return [[self at:setNumber]
                numberAtRow:(unsigned)[sortTable doubleAt:anIndex]  Col:offsetWithinSet];
    else
        return [[self at:setNumber] numberAtRow:anIndex  Col:offsetWithinSet];
}
```

```
/*
Return the textual data item from the receiver's data set aSet at index
anIndex.  An instance of CharString is returned.
*/
-textInSet: (unsigned)aSet at: (unsigned)anIndex {
    [self dataSetAndOffsetFromColumn:aSet];
    if (sortTable)
        return [[self at:setNumber]
                atRow:(unsigned)[sortTable doubleAt:anIndex]  Col:offsetWithinSet];
    else
        return [[self at:setNumber] atRow:anIndex  Col:offsetWithinSet];
}


/*
Return the number of data items in the receiver's sets.  All the sets have the
same number of data items.
*/
-(unsigned)numberOfElements {
    if ( [self size] > 0 )
        return [[self at: 0] nRows];
    else
        return 0;
}

/*
Return YES if there is an data item at anIndex in set aSet.  Returns
NO otherwise.
*/
-(BOOL)floatEntryInSet: (unsigned)aSet at: (unsigned)anIndex {
    [self dataSetAndOffsetFromColumn:aSet];
    if (sortTable)
        return [[self at:setNumber]
                flagValueAtRow:(unsigned)[sortTable doubleAt:anIndex]  Col:offsetWithinSet];
    else
        return [[self at:setNumber] flagValueAtRow:anIndex  Col:offsetWithinSet];
}


/*
Return YES if there is an data item at anIndex in set aSet.  Returns
NO otherwise.
*/
-(BOOL)textEntryInSet: (unsigned)aSet at: (unsigned)anIndex {
    [self dataSetAndOffsetFromColumn:aSet];
    if (sortTable)
        return ([[self at:setNumber]
                atRow:(unsigned)[sortTable doubleAt:anIndex]  Col:offsetWithinSet] != nil);
    else
        return ([[self at:setNumber] atRow:anIndex  Col:offsetWithinSet] != nil);
}



-addIntSet: aSet  {
    [self add: aSet];
    [self changed: @selector(addIntSet:)];
    return self;
}


-addFloatSet: aBM_Matrix {
    [self add: aBM_Matrix];
```

```
    [self changed: @selector(addFloatSet:)];
    return self;
}


-addTextSet: aBM_StrMatrix  {
    [self add: aBM_StrMatrix];
    [self changed: @selector(addTextSet:)];
    return self;
}


-addSet: aBM_StrMatrix  {
    [self add: aBM_StrMatrix];
    [self changed: @selector(addSet:)];
    return self;
}

-sprintfTextInSet:(unsigned)aSetNumber row:(unsigned)rowNumber
                                formatSTR:(STR)formatSTR
                                   buffer:(STR)destBuffer
{
 id  text;
 STR textSTR;

 if (formatSTR == (STR)0)
    formatSTR = "%s";

 text = [self textInSet:aSetNumber at:rowNumber];

 if (text != nil)
    textSTR = [text str];
 else
    textSTR = "N/A";

 sprintf(destBuffer,formatSTR,textSTR);

 return self;
}


-sprintfFloatInSet:(unsigned)aSetNumber row:(unsigned)rowNumber
                                formatSTR:(STR)formatSTR
                              scaleFactor:(NUMBER)scaleFactor
                                   buffer:(STR)destBuffer
{
 if (formatSTR == (STR)0)
    formatSTR = "%9.3d";

 if ([self floatEntryInSet:aSetNumber at:rowNumber])
    sprintf(destBuffer,formatSTR,
                    [self floatInSet:aSetNumber at:rowNumber]/scaleFactor);
 else
    sprintf(destBuffer,"N/A");

 return self;
}


/*
Terminate the receiver.  Returns nil.
*/
```

```
-terminate$ {
    if (sortTable) [sortTable free];
    return [super terminate$];
}


-sortColumn:(unsigned)aCol
    {
    sortColumn = aCol;
    return self;
    }


-(unsigned)sortColumn
    {
    return sortColumn;
    }


-sortType:(short)aSort
    {
    sortType = aSort;
    return self;
    }


-(short)sortType
    {
    return sortType;
    }


-(BOOL)toSortOrNot:(short)newSortType column:(unsigned)newSortColumn
    {
    if (([self sortType] == newSortType) && ([self sortColumn] == newSortColumn))
        return NO;
    [self sortType:newSortType];
    [self sortColumn:newSortColumn];
    return YES;
    }


-sortTable:(short)aSortType column:(unsigned)anOffset
    {
    id aColumn;

    if (!([self toSortOrNot:aSortType column:anOffset]))
          return self;

    aColumn = [self at:[self setNumberFromColumn:anOffset]];
    if ([aColumn nColumns] > 1)                        // temporary - must be solved
        return self;

    if (sortTable)
        sortTable = [sortTable free];
    if (aSortType == 2)
        sortTable = [aColumn descendingSortTable];
    else if (aSortType == 1)
        sortTable = [aColumn ascendingSortTable];
    else sortTable = nil;

    return self;
    }
```

```
- (unsigned)find:(STR)aString beginningAtRow:(unsigned)anIndex
                                      Col:(unsigned)aSet
  {
  if ([self isTextAt:aSet])
     {
     [self dataSetAndOffsetFromColumn:aSet];
     return ([[self at:setNumber] find:aString beginningAtRow:anIndex
                         Col:offsetWithinSet sortTable:sortTable]);
     }
  else
    return anIndex;
  }
=:

/*===================== DO NOT REMO\    ! EDIT ==============================

       This comment and the following sccsId declaration are managed
       by SCCS for you. Do not edit or remove either.

       Source file:     /users/bmw/Alpha/Reports/SCCS/s.DocLayer.m
       Latest version:  1.4
       Last mod time:   09/13/89 at 14:57:18

==========================================================================*/

static char *sccsId = "@(#)DocLayer.m rev 1.4 created on 09/13/89 at 14:57:18";

/*===================== DO NOT REMOVE OR EDIT ===========================*/

#include "objc.h"
#include "uil.h"
#include "BMWGlobal.h"

@requires CharString,OrdCltn;
@requires Menu,PopUpMenu,CSMore,Quad,SmartFont,BM_PromptBox;
@requires Cursor,BitMap,SDialogBox,BM_PCLPrinter,BM_AskDialogBox;

static id _viewMenu;
static id _viewPopUpMenu;

= DocumentLayer:BorderLayer(BM_WorkstationMsgs,UIMESSAGES)
  {
  id document;          // Report or Chart
  id dataArea;          // OrdCltn of DALayers

  PT dataAreaSize;      // Size of the data area
  PT dataAreaOrigin;    // Origin of the data area
  int pages;            // Number of pages in the receiver
  int currentPage;      // Page number that is currently visible
  id currentDA;         // ReportDALayer that corresponds to currentPage

  id nextPageMenu;      // The "next page" menu instance
  id previousPageMenu;  // The "previous page" menu instance

  id parent;            // Parent Window
  }


+ createInterfaceFor:aDocument parent:aParent
  {
  self = [self new];
  parent = aParent;
```

```
[self document:aDocument];
return self;
}


- parent
{
return parent;
}


- storeOnFromUser
{
[parent saveFile:document];

return self;
 }


- (int)currentPage
{
return currentPage;
}


- currentDA
{
return currentDA;
}


- document
{
return document;
}


- document:aDocument
{
if (document)
   document = [document free];
document = aDocument;
[self format];
return self;
}


- origin:(PT)aPoint
{
PT delta,displayPoint;
PT myOrigin;
myOrigin = [self origin];
delta = ptMinus (aPoint, myOrigin);
if ((X(delta) == 0) && (Y(delta) == 0))
   return self;            /* no movement */
[super origin:aPoint];
dataAreaOrigin = ptPlus(dataAreaOrigin, delta);
return self;
}
```

```
- currentPage:(int)aPageNo
 {
 if (currentPage == aPageNo )
    return self;
 currentPage = aPageNo;
 [self currentDataArea: [dataArea at: currentPage - 1]];

 [self display];
 [self changed:@selector(maxContentsArea)];
 return self;
 }



- currentDataArea: aDataAreaLayer
 {
 if ( currentDA != nil )
    {
    [currentDA setVisible:NO];
    [self removeFrontLayer: currentDA];
    }
 currentDA = aDataAreaLayer;
 [currentDA origin: dataAreaOrigin];
 if ([self visible])
    [currentDA setVisible: YES];

 [currentDA attachTo: self];
 return self;
 }




- format
 {
 [self freeParts];
 [self setSize];
 [self createParts];
 [self adjustParts];
 [self createData];
 return self;
 }



- adjustParts
 {
 short width, height, heightOffset;
 id rTemplate;

 rTemplate = [document template];
 width = [self width];
 if (width < 0)
     width = 0;
 height = [self height];
 if (height < 0)
    height = 0;
 dataAreaSize = pt(width,height);

 dataAreaOrigin =  pt([self left],[self top]);
 return self;
 }
```

```
- setSize
 {
 id dTemplate = [document template];

 [self extent: [dTemplate pageSize]];
 return self;
 }



- freeParts
 {
 if (dataArea)
    dataArea = [dataArea freeContents];
 if (dataArea)
    dataArea = [dataArea free];

 dataAreaSize = pt(0,0);
 dataAreaOrigin = pt(0,0);
 pages = 0;
 currentPage = 0;
 currentDA = nil;

 return self;
 }



- dataArea
 {
 return dataArea;
 }


- createParts
 {
 return self;
 }



- createData
 {
 return self;
 }


- update:anObject because:(SEL)aSelector
 {
 if (anObject==document)
    {
    if (aSelector == @selector(template:))
       [self format];
    else if (aSelector == @selector(data:))
       [self format];
    }
 [super update: anObject because: aSelector];
 return self;
 }


- viewPopUpMenu
 {
```

```
 if (_viewPopUpMenu == nil)
    _viewPopUpMenu = [PopUpMenu createInterfaceFor:[self defaultViewMenu]];
 return [_viewPopUpMenu shared$];
 }



- (BOOL)leftButtonDown
 {
 [self defaultViewMenu];
 [self updateViewMenu];
 nextPageMenu = [[_viewMenu children] at:0];
 previousPageMenu = [[_viewMenu children] at:1];
 [self updatePageMenu];

 [[self viewPopUpMenu] activateAt: event.origin];
 return YES;
 }


- updateViewMenu
 {
 [[_viewMenu children] elementsPerform:@selector(receiver:) with:self];
 return self;
 }



- updatePageMenu
 {
 [previousPageMenu selectable:YES];
 [nextPageMenu selectable:YES];

 if (currentPage == 1) [previousPageMenu selectable:NO];
 if (currentPage == pages) [nextPageMenu selectable:NO];

 return self;
 }


- nextPage
 {
 [self currentPage: [self currentPage] + 1];
 return self;
 }


- previousPage
 {
 [self currentPage: [self currentPage] -1];
 return self;
 }


- firstPage
 {
 [self currentPage: 1 ];
 return self;
 }
```

```
- lastPage
 {
 [self currentPage: pages];
 return self;
 }



- pageFromUser
 {
 id pointStr, response;
 int tempPage;

 pointStr = [CSMore fromInt: [self currentPage]];
 response = [BM_AskDialogBox askSTR:"Go to page:" defaultValue:[pointStr str] client:self];
 if (response)
    {
    tempPage = atoi([response str]);
    if ((!(tempPage > pages)) && (tempPage > 0))
       [self currentPage: tempPage];
    else  [BM_PromptBox askSTR:"Error - Page number out of bounds" client:self];
    [response free];
    [pointStr free];
    }

 return self;
 }


- cancel:aStringDialogBox
 {
 [aStringDialogBox modalDeactivate];
 return self;
 }


- acceptDSFrom: aStringDialogBox
 {
 int startIndex, endIndex;

 startIndex = [aStringDialogBox valueAsIntAt:1];
 endIndex   = [aStringDialogBox valueAsIntAt:2];

 if (  ((!(startIndex > pages)) && (startIndex > 0)) &&
       ((!(endIndex < startIndex)) && (!(endIndex > pages))))
    {
    [aStringDialogBox erase];
    [self printDocument:startIndex to:endIndex];
    [aStringDialogBox modalDeactivate];
    }
 else
    [BM_PromptBox askSTR:"Error - Page index out of bounds" client:self];

 return self;
 }



- printFromUser
 {
 id db;
 char documentSize[30];

 db = [SDialogBox new];
```

```
sprintf(documentSize,"Document consists of %d pages",pages);

[db addEntryLabeled:documentSize];
[db addEntryLabeled:"From: " defaultValue:"1"];
[db addEntryLabeled:"To  : " defaultValue:"1"];
[db acceptSelector:@selector(acceptDSFrom:) receiver:self];
[db cancelSelector:@selector(cancel:) receiver:self];
[db extent:[db defaultExtent]];
[[db center:[self center]] translateWithin:baseLayer];
[db attachTo:baseLayer];
[db show];
[db modalActivate];

[db delete];
return self;
}


- printDocument:(int)sIndex to:(int)eIndex
{
id  aPrinter;
id  tempDisplay, saveBackLayer;
int index;

tempDisplay = currentDisplay;

aPrinter = [BM_PCLPrinter forQuad:self
   foregroundColor:[[self borderColor] colorIndex]];

for(index=sIndex; index <= eIndex ; index++)
   {
   [self currentPage:index];
   saveBackLayer = [self backLayer];
   [self removeFromBackLayer];

   currentDisplay = aPrinter;
   [self displayRect:self];
   currentDisplay = tempDisplay;

   [self attachTo:saveBackLayer];

   [aPrinter pageBreak];
   }

[aPrinter free];

return self;
}


- plotFromUser
{
return self;
}


- writeToTextFile
{
id defaultNewName;
id newName;
```

```
defaultNewName = [[CharString str:[parent str]] concatSTR:".ssi"];
newName = [BM_AskDialogBox askSTR:"Export to what file?"
   defaultValue:[defaultNewName str] client:self];
[defaultNewName free];

if ([newName length] != 0)
   [document textFileOut:[newName str] columnDelimiter:'\t'];

[newName free];

return self;
}



- initialize
{
[super initialize];

document = nil;

dataArea = nil;
dataAreaSize = pt(0,0);
dataAreaOrigin = pt(0,0);
pages = 0;
currentPage = 0;

return self;
}


- terminate$
{
id result,
saveMonitor = statusMonitor;

[statusMonitor freeing];
statusMonitor = nil;

if (document) document = [document free];

[dataArea removeAt:currentPage-1];

if(dataArea) dataArea = [dataArea freeContents];
if(dataArea) dataArea = [dataArea free];

result =  [super terminate$];

statusMonitor = saveMonitor;
[statusMonitor normalStatus];

return result;
}


- defaultViewMenu
{
if (!(_viewMenu))
   {
   _viewMenu = [Menu str: "View"];
   [_viewMenu append: [Menu str: "Next Page"
          selector: @selector(nextPage) receiver: self]];
```

```
  [_viewMenu append: [Menu str: "Previous Page"
          selector: @selector(previousPage) receiver: self]];
  [_viewMenu append: [Menu str: "First Page"
          selector: @selector(firstPage) receiver: self]];
  [_viewMenu append: [Menu str: "Last Page"
          selector: @selector(lastPage) receiver: self]];
  [_viewMenu append: [Menu str: "Go To Page"
          selector: @selector(pageFromUser) receiver: self]];
  [_viewMenu append: [Menu str: "Print"
          selector: @selector(printFromUser) receiver: self]];
  [_viewMenu append: [Menu str: "Plot"
          selector: @selector(plotFromUser) receiver: self]];
  [_viewMenu append: [Menu str: "Export to Text File"
          selector: @selector(writeToTextFile) receiver: self]];
  [_viewMenu append: [Menu str: "Save"
          selector: @selector(storeOnFromUser) receiver: self]];
  }
  return [_viewMenu shared$];
}



- (PT)pageSize
 {
 return pt(1,1);
 }


- (PT)increaseUnitSize
 {
 return pt(1,0);
 }


- (PT)decreaseUnitSize
 {
 return pt(1,0);
 }


- maxContentsArea
 {
 id aLayer;
 PT minOrigin, maxCorner;
 PT aOrigin, aCorner, cornerIncrement;
 int i,n;

 minOrigin = [self origin];
 maxCorner = [ self corner];

 if (pages > 0)
    X(minOrigin) = X(minOrigin) - currentPage + 1;

 if (pages > 0)
    X(maxCorner) = X(minOrigin) + pages - 1;
 else
    X(maxCorner) = X(minOrigin);

 return [Quad origin:[self asRelative:minOrigin]
            corner:[ self asRelative:maxCorner ]];
 }
```

```
- scrollContents:(PT)aPoint
 {
 int numPages, indexPage;

 if (X(aPoint) == 0) return self;

 indexPage = currentPage;
 numPages = (int)(X(aPoint));
 indexPage = indexPage - numPages;
 if (indexPage < 1)
    indexPage = 1;
 if (indexPage > pages)
    indexPage = pages;

 [self currentPage:indexPage];
 return self;
 }

=:

/*===================== DO NOT REMOVE    EDIT =============================

       This comment and the following sccsId declaration are managed
       by SCCS for you. Do not edit or remove either.

       Source file:     /users/bmw/Alpha/Reports/SCCS/s.Document.m
       Latest version:  1.1
       Last mod time:   09/11/89 at 19:33:55

=========================================================================*/

static char *sccsId = "@(#)Document.m rev 1.1 created on 09/11/89 at 19:33:55";

/*===================== DO NOT REMOVE OR EDIT ===========================*/

#include "objc.h"
#include "uil.h"
#include "BMWGlobal.h"

@requires CharString;

= Document:Object (BM_WorkstationMsgs, UIMESSAGES)
  {
  id data;
  id template;
  }


+ data: aData template: aTemplate
  {
  self = [self new];

  [self data: aData];
  [self template: aTemplate];
  return self;
  }


 - data
  {
  return data;
  }
```

```
- template
 {
 return template;
 }


- data: aData
 {
 if (data)
    {
    [data freeContents];
    data = [data free];
     }
 data = aData;
 return self;
 }


- template: aTemplate
 {
 if (template )
    template = [template free];
  template = aTemplate;
  return self;
  }



- terminate$
  {
  [self data:nil];
  [self template:nil];
  return [super terminate$];
  }


=:

/*==================== DO NOT REMOVE    EDIT ============================

       This comment and the following sccsId declaration are managed
       by SCCS for you. Do not edit or remove either.

       Source file:     /users/bmw/Alpha/Reports/SCCS/s.DocumentWin.m
       Latest version:  1.1
       Last mod time:   09/11/89 at 19:34:11

========================================================================*/

static char *sccsId = "@(#)DocumentWin.m rev 1.1 created on 09/11/89 at 19:34:11";

/*==================== DO NOT REMOVE OR EDIT ===========================*/

#include "objc.h"
#include "uil.h"
#include "BMWGlobal.h"

@requires Object,Prompter;
@requires BM_PromptBox,Quad;


= DocumentWin:ApplicationWin(BM_WorkstationMsgs,UIMESSAGES)
  {
```

```
  id document;
  }


- document:aDocument
  {
  document = aDocument;
  return self;
  }


- open
  {
  id    path, docLayer,q1, q2;
  STR   errorMessage;
  short newWidth, newHeight;

  if (!opened)
     {
     if ([self fileName] != nil)
        {
        path = [self path];

        if (document == nil)
            document = [Object readFrom: [path str]];

        if (document == nil)
           {
           sprintf(errorMessage,"%s file was not found",[path str]);
           [BM_PromptBox askSTR:errorMessage client:self];
           }
        else
           {
           docLayer=[[[self class] documentLayerFactoryObject] createInterfaceFor:document parent:self];

           q1 = [baseLayer insideQuad];
           q2 = [Quad withBounds:self];

           [self applicationLayer:docLayer];
           [self translateWithin:q1];
           [self show];
            if (![self containsRect:q2])
               [baseLayer displayRect:q2];

            [q1 free];
            [q2 free];
            }
         [path free];
         }
     opened = YES;
     }
  return [super open];
  }


+ createInterfaceFor:aString parent:anId
  {
  self = [super createInterfaceFor:aString parent: anId];
  [[self iconHandler] assignSTR: [self defaultTitleSTR]];
  return self;
  }
```

```
- initialize
 {
 [super initialize];
 [self viewBox:nil];
 [self titleFont:BM_fonts.TitleBar];

 [self horizontalBar:[self defaultHorizontalBar]];
 [self noPageMarkers];
 [[self horizontalBar] barColor:BM_colors.MenuBar];
 document = nil;
 return self;
 }

=:

/*==================== DO NOT REMOVE   EDIT ============================

       This comment and the following sccsId declaration are managed
       by SCCS for you. Do not edit or remove either.

       Source file:    /users/bmw/Alpha/Reports/SCCS/s.FootEdit.m
       Latest version: 1.2
       Last mod time:  09/06/89 at 16:12:25

=========================================================================*/

static char *sccsId = "@(#)FootEdit.m rev 1.2 created on 09/06/89 at 16:12:25";

/*==================== DO NOT REMOVE OR EDIT ==========================*/

#include "objc.h"
#include "uil.h"
#include <ctype.h>

#define MAXVALUESIZE 35

@requires StringEdit, LabelValue, CSMore, Menu, PopUpMenu;
@requires SDialogBox, BM_AskDialogBox, CharString, SmartFont;

static id _footMenu;
= FootEdit: FootLayer (BM_WorkstationMsgs, UIMESSAGES) {
}

-updateMenu
    {
    [[[_footMenu children] at:0] receiver:self];
    [[[[_footMenu children] at:1] children] elementsPerform:@selector(receiver:) with:self];
    return self;
    }



-defaultFontMenu
    {
    id aMenu;

    aMenu = [SmartFont defaultFontMenu];
    [aMenu assignSTR:"Footer Font"];
    [[aMenu children] elementsPerform:@selector(selector:) with:@selector(modifyAttributes:)];
    [[aMenu children] elementsPerform:@selector(receiver:) with:self];
    return aMenu;
    }
```

```
-defaultMenu {
   id f;

   if (!(_footMenu))
     {
     _footMenu = [Menu str: "Footer"];
     [_footMenu append: [Menu str: "Edit Text"
           selector: @selector(textFromUser) receiver: self]];
     [_footMenu append: [self defaultFontMenu]];
     }
   return [_footMenu shared$];
}



-defaultEdit: (STR)aString {
    id aStringEdit, aLabelValue ;
    aStringEdit = [[StringEdit str: aString font:font]
        maxValueSize: MAXVALUESIZE];
    aLabelValue = [LabelValue createInterfaceFor: aStringEdit
        labelSTR: "Enter text: "];

    return aLabelValue;
}


-defaultTextEdit {
    id db;
    db = [SDialogBox new];
    [db addEntryLabeled: "Left:   " defaultValue: [[model leftPart] str]];
    [db addEntryLabeled: "Center: " defaultValue: [[model centerPart] str]];
    [db addEntryLabeled: "Right:  " defaultValue: [[model rightPart] str]];
    [db acceptSelector: @selector(acceptTextFrom:) receiver: self];
    [db cancelSelector: @selector(cancel:) receiver: self];
    [db extent: [db defaultExtent]];

    return db;
}


-(BOOL)leftButtonDown {
    if ([left containsPt: [self asRelative: event.origin]])
        [self editLeftOn: LEFTBUTTON];
    else if ([center containsPt: [self asRelative: event.origin]])
        [self editCenterOn: LEFTBUTTON];
    else if ([right containsPt: [self asRelative: event.origin]])
        [self editRightOn: LEFTBUTTON];
    else
        return NO;
    return YES;
}


-editLeftOn: (BUTTON)aButton {
    id edit;
    edit = [self defaultEdit: [[model leftPart] str]];
    [[edit origin: event.origin] edit];
    [model leftSTR: [edit valueAsStr]];
    return self;
}
```

```
-editCenterOn: (BUTTON)aButton {
    id edit;
    edit = [self defaultEdit: [[model centerPart] str]];
    [[edit origin: event.origin] edit];
    [model centerSTR: [edit valueAsStr]];
    return self;
}


-editRightOn: (BUTTON)aButton  {
    id edit;
    edit = [self defaultEdit: [[model rightPart] str]];
    [[edit origin: event.origin] edit];
    [model rightSTR: [edit valueAsStr]];

    return self;
}


-cancel: aStringDialogBox {
    [aStringDialogBox modalDeactivate];

    return self;
}


-acceptTextFrom: aStringDialogBox {
    [aStringDialogBox erase];
    [aStringDialogBox modalDeactivate];
    [model leftSTR: [aStringDialogBox valueAsStrAt: 0]];
    [model centerSTR: [aStringDialogBox valueAsStrAt: 1]];
    [model rightSTR: [aStringDialogBox valueAsStrAt: 2]];

    return self;
}


-addDSFromUser {
    id db, aQuad;
    db = [SDialogBox new];
    [db addEntryLabeled: "Title:  " defaultValue: "A Title"];
    [db addEntryLabeled: "Format: " defaultValue: "xxxxxx.xx"];
    [db acceptSelector: @selector(acceptDSFrom:) receiver: self];
    [db cancelSelector: @selector(cancel:) receiver: self];
    [db extent: [db defaultExtent]];

    aQuad = [baseLayer insideQuad];
    [[db center:[self center]] translateWithin:aQuad];
    [db attachTo: baseLayer];
    [db show];
    aQuad = [aQuad free];
    return self;
}


-textFromUser {
    id db, aQuad;
    db = [self defaultTextEdit];
```

```
    aQuad = [baseLayer insideQuad];
    [[db center: [self center]] translateWithin:aQuad];
    [db attachTo: baseLayer];
    [db show];

    aQuad = [aQuad free];
    [db modalActivate];
    [db delete];
    return self;
}


-modifyAttributes:aMenuItem
    {
    id userFont, mattributes;

    mattributes = [model attributes];
    userFont = [CharString str:[[aMenuItem menu] str]];

    [mattributes fontName: [userFont str]];
    [userFont free];

    return self;
    }

=:

/*==================== DO NOT REMOVE    EDIT ============================

        This comment and the following sccsId declaration are managed
        by SCCS for you. Do not edit or remove either.

        Source file:     /users/bmw/Alpha/Reports/SCCS/s.FootLayer.m
        Latest version:  1.11
        Last mod time:   08/17/89 at 15:39:43

=======================================================================*/

static char *sccsId = "@(#)FootLayer.m rev 1.11 created on 08/17/89 at 15:39:43";

/*==================== DO NOT REMOVE OR EDIT ==========================*/


/*
$Description: A FooterLayer displays a footer for a Report.
*/

#include "objc.h"
#include "uil.h"

@requires DispText, SmartFont;

= FootLayer: Layer (BM_WorkstationMsgs, UIMESSAGES) {
id report;              // Report
id model;               // Footer
id left, center, right; // DispText's
id font;                // Font

id parent;              // RepLayer
}

/* $Default Category: Creation $ */
```

```
/*
Create and return an instance of FooterLayer for aFooter.  aFooter is
expected to be an instance of Footer.
*/
+ createInterfaceFor: aFooter report:aReport parent:aParentLayer
    {
    self = [super new];
    [self model: aFooter];
    [self extent: [self defaultExtent]];

    report = aReport;
    parent = aParentLayer;
    return self;
    }

/* $Default Category: Setting $ */


static char pageNumber[4];
-(STR)translateGlobalValues:(STR)aString
    {
    long t;
    int  l;
    char *s;


    if (report)
       {
       if (_strmatchn(aString,"<date>",6) == -1)
          {
          t = [report myDate];
          s = ctime(&t);
          if (l = strlen(s))
             s[l-1] = 0;
          return s;
          }

        else if (_strmatchn(aString,"<page>",6) == -1)
          {
          sprintf(pageNumber,"%d",[parent currentPage]);
          return pageNumber;
          }

        else if (_strmatchn(aString,"<userName>",10) == -1)
          {
          return [[report myUserName] str];
          }

        else if (_strmatchn(aString,"<siteName>",10) == -1)
          {
          return [[report mySiteName] str];
          }

       }
     return aString;
     }



   -createParts
     {
     if (right)
        [right assignSTR:[self translateGlobalValues:[[model rightPart] str]]];
```

```
  else
    right = [DispText str :[self
                             translateGlobalValues:[[model rightPart] str]]];

  if (left)
    [left assignSTR:[self translateGlobalValues:[[model leftPart] str]]];
  else
    left = [DispText str:[self
                             translateGlobalValues:[[model leftPart] str]]];

  if (center)
     [center assignSTR:[self
                             translateGlobalValues:[[model centerPart] str]]];
  else
    center = [DispText str:[self
                             translateGlobalValues:[[model centerPart] str]]];
  [self format];

  return self;
  }


/*
Set the receiver's model to aFooter.  aFooter is expected to be an instance
of Footer.  Returns self.
*/
-model:aFooter {
    if ( model ) {
        [model removeDependent: self];
        right=[right free];
        left=[left free];
        center=[center free];
    }
    model = aFooter;
    if  (model)
        {
        [model addDependent: self];
        [self createParts];
        [self setFont];
        }
    return self;
}

-font:aFont
  {
   [font free];
   font = aFont;
   return self;
  }

-setFont {
    id modelAttributes;

    modelAttributes = [model attributes];

    if (modelAttributes)
       [self font:[SmartFont fontName:[modelAttributes fontName]]];
    else
       [self font:nil];

    if (font)
       {
        [right font: font];
        [left font: font];
```

```
        [center font: font];
      }
    return self;
}

/*
Set the receiver's size to aPoint.  Returns self.
*/
-extent: (PT)aPoint {
    [super extent: aPoint];
    [self format];
    return self;
}

/* $Default Category: Formatting $ */

/*
Format the reciever.  Returns self.
*/
-format {
    [[left bottom: [self bottom]] left: [self left]];
    [left origin: [self asRelative: [left origin]]];

    [[center center: [self center]] bottom: [self bottom]];
    [center origin: [self asRelative: [center origin]]];

    [[right bottom: [self bottom]] right: [self right]];
    [right origin: [self asRelative: [right origin]]];
    return self;
}

/* $Default Category: Interrogation $ */

/*
Return the default extent of the rec
*/
-(PT)defaultExtent {
    short height;
    height = [left height];
    if (height < [center height])
        height = [center height];
    if (height < [right height])
        height = [right height];

    return pt([left width]+[right width]+[center width]+10, height*2);
}

/* $Default Category: Dependencies $ */

/*
Update the receiver according to anObject.  Returns self.
*/
-update: anObject because: (SEL)aSelector {
    if (anObject == model) {
        // Left string changed
        if ( aSelector == @selector(leftSTR:)) {
            [left assignSTR:[self translateGlobalValues:[[model leftPart] str]]];
            [self format];
            [self display];
        // Right string changed
        } else if ( aSelector == @selector(rightSTR:)) {
            [right assignSTR:[self translateGlobalValues:[[model rightPart] str]]];
            [self format];
            [self display];
```

```
        // Center string changed
        } else if ( aSelector == @selector(centerSTR:)) {
            [center assignSTR:[self translateGlobalValues:[[model centerPart] str]]];
            [self format];
            [self display];
        // Font changed
        } else if ( aSelector == @selector(textAttributes:) ||
                    aSelector == @selector(fontName:) ||
                    aSelector == @selector(bold:) ||
                    aSelector == @selector(italics:) ||
                    aSelector == @selector(underline:) ||
                    aSelector == @selector(pointSize:))  {
            [self setFont];
            [self format];
            [self display];
        } else if (aSelector == @selector(free)) model = nil;
          else {
            [super update: anObject because: aSelector];
        }
    }
    [super update: anObject because: aSelector];
    return self;
}

/* $Default Category: Displaying $ */

/*
Display the receiver's contents.  Returns self.
*/
-displayLayer
    {
    [self display: left];
    [self display: center];
    [self display: right];
    return self;
}

=:

/*===================== DO NOT REMOVE    EDIT ==============================

        This comment and the following sccsId declaration are managed
        by SCCS for you. Do not edit or remove either.

        Source file:     /users/bmw/Alpha/Reports/SCCS/s.Footer.m
        Latest version:  1.7
        Last mod time:   08/25/89 at 11:32:44

=======================================================================*/

static char *sccsId = "@(#)Footer.m rev 1.7 created on 08/25/89 at 11:32:44";

/*===================== DO NOT REMOVE OR EDIT ===========================*/


#include "objc.h"
#include "uil.h"
#include <string.h>

@requires TextAtt, CharString, OrdCltn;

= Footer: DepSharObject (BM_WorkstationMsgs, UIMESSAGES) {

id attributes;  // TextAtt
id left;        // CharString, smart charstrings
```

```
id center;      // CharString
id right;       // CharString
}

/* $Default Category: Initialization $ */

/*
Initialize the receiver.  Returns self.
*/
-initialize {
    [self textAttributes: [self defaultAttributes]];
    left = [self defaultLeft];
    center = [self defaultCenter];
    right = [self defaultRight];
    return self;
}

/* $Default Category: Creation $ */

/*
Create and return an instance of Footer.
*/
+new {
    self = [super new];
    [self initialize];
    return self;
}

/* $Default Category: Interrogation $*/

/*
Return the left portion of the receiver.
*/
-leftPart {
    return left;
}

/*
Return the center portion of the receiver.
*/
-centerPart {
    return center;
}

/*
Return the right portion of the receiver.
*/
-rightPart {
    return right;
}

/*
Return the text attributes of the receiver.
*/
-attributes {
    return attributes;
}

/*
Return the default attributes of the receiver.  Returns a
TextAtt.
*/
-defaultAttributes {
    return [TextAtt new];
```

```
}

/*
Return the default right portion of the receiver.  Returns a
empty CharString.
*/
-defaultRight {
    return [CharString str: "right"];
}

/*
Return the default left portion of the receiver.  Returns a
empty CharString.
*/
-defaultLeft {
    return [CharString str: "left"];
}

/*
Return the default center portion of the receiver.  Returns a
empty CharString.
*/
-defaultCenter {
    return [CharString str: "center"];
}

/*
Return the reciever's left string.
*/
-(STR)leftSTR {
    return [left str];
}

/*
Return the reciever's center string.
*/
-(STR)centerSTR {
    return [center str];
}

/*
Return the reciever's right string.
*/
-(STR)rightSTR {
    return [right str];
}

/* $Default Catagory: Setting $ */

/*
Set the receiver's left string to aString.  Returns self.
*/
-leftSTR: (STR)aString {
    if ( strcmp(aString, [left str]) == 0 ) return self;
    [left assignSTR: aString];
    [self changed: @selector(leftSTR:)];
    return self;
}

/*
Set the receiver's center string to aString.  Returns self.
*/
-centerSTR: (STR)aString {
    if ( strcmp(aString, [center str]) == 0 ) return self;
```

```
    [center assignSTR: aString];
    [self changed: @selector(centerSTR:)];
    return self;
}

/*
Set the receiver's right string to aString.  Returns self.
*/
-rightSTR: (STR)aString {
    if ( strcmp(aString, [right str]) == 0 ) return self;
    [right assignSTR: aString];
    [self changed: @selector(rightSTR:)];
    return self;
}

/*
Set the receiver's text attributes to aTextAttribute.  aTextAttribute is
expected to be an instance of TextAtt.  Returns self.
*/
-textAttributes: aTextAtt {
    [attributes removeDependent: self];
    attributes = aTextAtt;
    [attributes addDependent: self];
    [self changed: @selector(textAttributes:)];
    return self;
}

/* $Default Category: Dependencies $ */

/*
Update the receiver according to anObject.  Returns self.
*/
-update: anObject because: (SEL)aSelector {
    if (anObject == attributes) {
        if ( aSelector == @selector(fontName:) ||
             aSelector == @selector(bold:) ||
             aSelector == @selector(italics:) ||
             aSelector == @selector(underline:) ||
             aSelector == @selector(pointSize:))
                [self changed: aSelector];
    }

    [super update: anObject because: aSelector];
    return self;

}

/*
Terminate the receiver.  Returns nil.
*/
-terminate$ {
    left = [left free];
    right = [right free];
    center = [center free];
    attributes = [attributes free];
    return [super terminate$];
}


/*
Restablish dependencies for the receiver.  Returns self.
*/
-awakeFrom: aFiler {
    [attributes addDependent: self];
    return self;
```

```
}

-copy {
    id newF;

    newF = [super copy];

    newF->attributes = [attributes copy];
    [newF->attributes addDependent:newF];
    [newF changed:@selector(textAttributes:)];

    newF->left = [CharString str:[left str]];
    newF->center = [CharString str:[center str]];
    newF->right = [CharString str:[right str]];
    return newF;
}
=:
/*===================== DO NOT REMC    R EDIT ==============================

        This comment and the following sccsId declaration are managed
        by SCCS for you. Do not edit or remove either.

        Source file:     /users/bmw/Alpha/Reports/SCCS/s.HeadEdit.m
        Latest version:  1.2
        Last mod time:   09/06/89 at 16:12:43

==========================================================================*/

static char *sccsId = "@(#)HeadEdit.m rev 1.2 created on 09/06/89 at 16:12:43";

/*===================== DO NOT REMOVE OR EDIT ===========================*/

#include "objc.h"
#include "uil.h"
#include <ctype.h>
#include "BMWGlobal.h"

#define MAXVALUESIZE 35

@requires StringEdit, LabelValue, CSMore, Menu, PopUpMenu, SDialogBox,
          BM_AskDialogBox, CharString, SmartFont;

static id _headMenu;

= HeadEdit: HeadLayer (BM_WorkstationMsgs, UIMESSAGES) {
}


-defaultFontMenu
    {
    id fontMenu;

    fontMenu = [SmartFont defaultFontMenu];
    [fontMenu assignSTR:"Header Font"];
    [[fontMenu children] elementsPerform:@selector(selector:) with:@selector(modifyAttributes:)];
    [[fontMenu children] elementsPerform:@selector(receiver:) with:self];
    return fontMenu;
    }


-defaultTitleFontMenu
    {
    id fontMenu;
```

```
    fontMenu = [SmartFont defaultFontMenu];
    [fontMenu assignSTR:"Title Font"];
    [[fontMenu children] elementsPerform:@selector(selector:) with:@selector(modifyTitleAtt:)];
    [[fontMenu children] elementsPerform:@selector(receiver:) with:self];
    return fontMenu;
    }


-defaultSubTitleFontMenu
    {
    id fontMenu;

    fontMenu = [SmartFont defaultFontMenu];
    [fontMenu assignSTR:"SubTitle Font"];
    [[fontMenu children] elementsPerform:@selector(selector:) with:@selector(modifySubTitleAtt:)];
    [[fontMenu children] elementsPerform:@selector(receiver:) with:self];
    return fontMenu;
    }

-defaultMenu {
    id style;

    if (!(_headMenu))
      {
      _headMenu = [Menu str: "Header"];
      [_headMenu append: [Menu str: "Edit Text"
            selector: @selector(textFromUser) receiver: self]];

      [_headMenu append: [self defaultTitleFontMenu]];
      [_headMenu append: style = [Menu str: "Title Justification" ]];
      [style append: [Menu str: "Left"
           selector: @selector(titleLeftJustify) receiver: self]];
      [style append: [Menu str: "Centered"
           selector: @selector(titleCentered) receiver: self]];
      [style append: [Menu str: "Right"
           selector: @selector(titleRightJustify) receiver: self]];


      [_headMenu append: [self defaultSubTitleFontMenu]];
      [_headMenu append: style = [Menu str: "SubTitle Justification" ]];
      [style append: [Menu str: "Left"
           selector: @selector(subTitleLeftJustify) receiver: self]];
      [style append: [Menu str: "Centered"
           selector: @selector(subTitleCentered) receiver: self]];
      [style append: [Menu str: "Right"
           selector: @selector(subTitleRightJustify) receiver: self]];

      [_headMenu append: [self  defaultFontMenu]];

      }
    return [_headMenu shared$];
}


-updateMenu
    {
    [[[_headMenu children] at:0] receiver:self];

    [[[[_headMenu children] at:1]  children] elementsPerform:@selector(receiver:) with:self];
    [[[[_headMenu children] at:2]  children] elementsPerform:@selector(receiver:) with:self];
    [[[[_headMenu children] at:3]  children] elementsPerform:@selector(receiver:) with:self];
    [[[[_headMenu children] at:4]  children] elementsPerform:@selector(receiver:) with:self];
```

```
    [[[_headMenu children] at:5]  children] elementsPerform:@selector(receiver:) with:self];
    return self;
    }


-modifyAttributes: aMenuItem
   {
   id userFont, mattributes;

   mattributes = [model attributes];
   userFont = [CharString str:[[aMenuItem menu] str]];
   [mattributes fontName:[userFont str]];
   [userFont free];

   return self;
   }

-modifyTitleAtt:aMenuItem
   {
   id userFont, mattributes;

   mattributes = [model titlePart];
   userFont = [CharString str:[[aMenuItem menu] str]];
   [mattributes fontName:[userFont str]];
   [userFont free];

   return self;
   }


-modifySubTitleAtt:aMenuItem
   {
   id userFont, mattributes;

   mattributes = [model subTitlePart];
   userFont = [CharString str:[[aMenuItem menu] str]];
   [mattributes fontName:[userFont str]];
   [userFont free];

   return self;
   }



-defaultEdit: (STR)aString {
    id aStringEdit, aLabelValue ;
    aStringEdit = [[StringEdit str: aString font:font]
        maxValueSize: MAXVALUESIZE];
    aLabelValue = [LabelValue createInterfaceFor: aStringEdit
        labelSTR: "Enter text: "];
    return aLabelValue;
}


-titleEdit: (STR)aString {
    id aStringEdit, aLabelValue ;
    aStringEdit = [[StringEdit str: aString font:titleFont]
        maxValueSize: MAXVALUESIZE];
    aLabelValue = [LabelValue createInterfaceFor: aStringEdit
        labelSTR: "Enter text: "];
    return aLabelValue;
}
```

```
-subTitleEdit: (STR)aString {
    id aStringEdit, aLabelValue ;
    aStringEdit = [[StringEdit str: aString font:subTitleFont]
        maxValueSize: MAXVALUESIZE];
    aLabelValue = [LabelValue createInterfaceFor: aStringEdit
        labelSTR: "Enter text: "];
    return aLabelValue;
}


-defaultTextEdit {
    id db;
    db = [SDialogBox new];
    [db addEntryLabeled: "Left:      "  defaultValue: [[model leftPart] str]];
    [db addEntryLabeled: "Center:    "  defaultValue: [[model centerPart] str]];
    [db addEntryLabeled: "Right:      defaultValue: [[model rightPart] str]];
    [db addEntryLabeled: "Title:     "  defaultValue: [[model titlePart] str]];
    [db addEntryLabeled: "SubTitle: "  defaultValue: [[model subTitlePart] str]];

    [db acceptSelector: @selector(acceptTextFrom:) receiver: self];
    [db cancelSelector: @selector(cancel:) receiver: self];
    [db extent: [db defaultExtent]];

    return db;
}


-(BOOL)leftButtonDown {
    if ([left containsPt: [self asRelative: event.origin]])
        [self editLeftOn: LEFTBUTTON];
    else if ([center containsPt: [self asRelative: event.origin]])
        [self editCenterOn: LEFTBUTTON];
    else if ([right containsPt: [self asRelative: event.origin]])
        [self editRightOn: LEFTBUTTON];
    else if ([title containsPt: [self asRelative: event.origin]])
        [self editTitleOn: LEFTBUTTON];
    else if ([subTitle containsPt: [self asRelative: event.origin]])
        [self editSubTitleOn: LEFTBUTTON];
    else
        return NO;
    return YES;
}


-cancel: aStringDialogBox {
    [aStringDialogBox modalDeactivate];
    return self;
}


-acceptTextFrom: aStringDialogBox {
    [aStringDialogBox erase];
    [aStringDialogBox modalDeactivate];
    [model leftSTR: [aStringDialogBox valueAsStrAt: 0]];
    [model centerSTR: [aStringDialogBox valueAsStrAt: 1]];
    [model rightSTR: [aStringDialogBox valueAsStrAt: 2]];
    [model titleSTR: [aStringDialogBox valueAsStrAt: 3]];
    [model subTitleSTR: [aStringDialogBox valueAsStrAt: 4]];
    return self;
}
```

```
-addDSFromUser {
   id db, aQuad;
   db = [SDialogBox new];
   [db addEntryLabeled: "Title:  " defaultValue: "A Title"];
   [db addEntryLabeled: "Format: " defaultValue: "xxxxxx.xx"];
   [db acceptSelector: @selector(acceptDSFrom:) receiver: self];
   [db cancelSelector: @selector(cancel:) receiver: self];
   [db extent: [db defaultExtent]];

   aQuad = [baseLayer insideQuad];
   [[db center:[self center]] translateWithin:aQuad];
   [db attachTo: baseLayer];

   [db show];
   aQuad = [aQuad free];
   [db modalActivate];
   [db delete];
   return self;
}


-editTitleOn: (BUTTON)aButton {
    id edit;
    edit = [self titleEdit: [[model titlePart] str]];
    [[edit origin: event.origin] edit];
    [model titleSTR: [edit valueAsStr]];
    return self;
}


-editSubTitleOn: (BUTTON)aButton {
    id edit;
    edit = [self subTitleEdit: [[model subTitlePart] str]];
    [[edit origin: event.origin] edit];
    [model subTitleSTR: [edit valueAsStr]];
    return self;
}


-textFromUser {
    id db, aQuad;
    db = [self defaultTextEdit];
    aQuad = [baseLayer insideQuad];
    [[db center:[self center]] translateWithin:aQuad];
    [db attachTo: baseLayer];
    [db show];

    aQuad = [aQuad free];
    [db modalActivate];
    [db delete];
    return self;
}


-titleLeftJustify  {
    [model titleJustification:JLEFT];
    return self;
}
```

```
-titleRightJustify {
    [model titleJustification:JRIGHT];
    return self;
}


-titleCentered {
    [model titleJustification:JCENTER];
    return self;
}


-subTitleLeftJustify {
    [model subTitleJustification:JLEFT];
    return self;
}


-subTitleRightJustify {
    [model subTitleJustification:JRIuhT];
    return self;
}


-subTitleCentered {
    [model subTitleJustification:JCENTER];
    return self;
}


-editLeftOn: (BUTTON)aButton {
    id edit;
    edit = [self defaultEdit: [left str]];
    [[edit origin: event.origin] edit];
    [model leftSTR: [edit valueAsStr]];
    return self;
}


-editCenterOn: (BUTTON)aButton {
    id edit;
    edit = [self defaultEdit: [center str]];
    [[edit origin: event.origin] edit];
    [model centerSTR: [edit valueAsStr]];
    return self;
}


-editRightOn: (BUTTON)aButton  {
    id edit;
    edit = [self defaultEdit: [right str]];
    [[edit origin: event.origin] edit];
    [model rightSTR: [edit valueAsStr]];
    return self;
}


=:

/*==================== DO NOT REMC    R EDIT ============================

        This comment and the following sccsId declaration are managed
        by SCCS for you. Do not edit or remove either.
```

```
        Source file:    /users/bmw/Alpha/Reports/SCCS/s.HeadLayer.m
        Latest version: 1.10
        Last mod time:  08/27/89 at 17:19:53

==========================================================================*/

static char *sccsId = "@(#)HeadLayer.m rev 1.10 created on 08/27/89 at 17:19:53";

/*==================== DO NOT REMOVE OR EDIT ===========================*/


/*
$Description: A HeaderLayer displays a Header for a Report.
*/

#include "objc.h"
#include "uil.h"
#include "BMWGlobal.h"

@requires DispText, SmartFont;

= HeadLayer: FootLayer (BM_WorkstationMsgs, UIMESSAGES) {
id title;               // DispText that displays title
id subTitle;            // DispText that displays sub title
id titleFont;           // Font for title
id subTitleFont;        // Font for sub title
}


-createParts
  {
  [super createParts];

  if (title)
     [title assignSTR:[self translateGlobalValues:[[model titlePart] str]]];
  else
     title = [DispText str:[self translateGlobalValues: [[model titlePart] str]]];

  if (subTitle)
     [title assignSTR:[self translateGlobalValues:[[model titlePart] str]]];
  else
     subTitle = [DispText str:[self translateGlobalValues: [[model subTitlePart] str]]];

  return self;
  }


/*
Set the receiver's model to aHeader.  aHeader is expected to be an instance
of Header.  Returns self.
*/
-model:aHeader {
    id aFont;
    id attributes;
    if ( model ) {
        title=[title free];
        subTitle=[subTitle free];
    }

    [super model:aHeader];

if  (model)
    {
    [self createParts];
    [self setTitleFont];
```

```
        [self setSubTitleFont];
        }
    return self;
}

/* $Default Category: Displaying $ */

/*
Display the receiver's contents.  Returns self.
*/
-displayLayer {
    [super displayLayer];
    [self display: title];
    [self display: subTitle];
    return self;
}

/* $Default Category: Formatting $ */

/*
Format the reciever.  Returns self.
*/
-format {
    short top;
    id titleModel, subTitleModel;

    [[left left: [self left]] top: [self top]];

    [[center center: [self center]] top: [self top]];

    [[right top: [self top]] right: [self right]];

    top = [left height];
    if (top < [center height])
        top = [center height];
    if (top < [right height])
        top = [right height];
    top = (top * 2) + [self top];

    titleModel = [model titlePart];

    switch ([titleModel justification])
      {
       case JCENTER: [title center:[self center]];
                     break;
       case JRIGHT:  [title right:[self right]];
                     break;
       case JLEFT:   [title left:[self left]];
                     break;
      }

    subTitleModel = [model subTitlePart];

    switch ([subTitleModel justification])
      {
       case JCENTER: [subTitle center:[self center]];
                     break;
       case JRIGHT:  [subTitle right:[self right]];
                     break;
       case JLEFT:   [subTitle left:[self left]];
                     break;
      }
    [title top: top];
    top = top + [title height];
```

```
   [subTitle top: top];

   [left origin: [self asRelative: [left origin]]];
   [title origin: [self asRelative: [title origin]]];
   [subTitle origin: [self asRelative: [subTitle origin]]];
   [center origin: [self asRelative: [center origin]]];
   [right origin: [self asRelative: [right origin]]];

   return self;
}

/* $Default Category: Interrogation $ */

/*
Return the default extent of the receiver.
*/
-(PT)defaultExtent {
    short height, width;

    // Get the height of the left, center right
    height = [left height];
    if (height < [center height])
        height = [center height];
    if (height < [right height])
        height = [right height];
    height = height * 2;

    // Now add in the title and subtitle
    height = height + [title height] + [subTitle height] +
                              max([title height],[subTitle height]);

    //
    width = [left width]+[right width]+[center width];
    if (width < [title width])
        width = [title width];
    if (width < [subTitle width])
        width = [subTitle width];
    width = width+10;
    return pt(width, height);
}


-titleFont:aFont
   {
    titleFont=[titleFont free];
    titleFont = aFont;
    return self;
   }


-subTitleFont:aFont
   {
    subTitleFont=[subTitleFont free];
    subTitleFont = aFont;
    return self;
   }



-setTitleFont {
    id modelAttributes;

    modelAttributes = [model titlePart];
```

```
    if (modelAttributes)
       [self titleFont:[SmartFont fontName:[modelAttributes fontName]]];
    else
       [self titleFont:nil];

    if (titleFont)
        [title font:titleFont];

    return self;
}

-setSubTitleFont {
    id modelAttributes;

    modelAttributes = [model subTitlePart];

    if (modelAttributes)
       [self subTitleFont:[SmartFont fontName:[modelAttributes fontName]]];
    else
       [self subTitleFont:nil];

    if (subTitleFont)
       [subTitle font:subTitleFont];
    return self;
}

/* $Default Category: Dependencies $ */

/*
Update the receiver according to anObject.  Returns self.
*/
-update: anObject because: (SEL)aSelector {
    if (anObject == model) {
        if ( aSelector == @selector(titlePart:)) {
            [title assignSTR: [[model titlePart] str]];
            [self setTitleFont];
            [self format];
            [self display];
        } else if ( aSelector == @selector(titleSTR:)) {
            [title assignSTR:[self translateGlobalValues:[[model titlePart] str]]];
            [self format];
            [self display];
        } else if ( aSelector == @selector(subTitlePart:)) {
            [subTitle assignSTR: [[model subTitlePart] str]];
            [self setSubtTitleFont];
            [self format];
            [self display];
        } else if ( aSelector == @selector(subTitleSTR:)) {
            [subTitle assignSTR:[self translateGlobalValues:[[model subTitlePart] str]]];
            [self format];
            [self display];
        } else if ( aSelector == @selector(titleFontName:) ||
                aSelector == @selector(titleBold:) ||
                aSelector == @selector(titleItalics:) ||
                aSelector == @selector(titleUnderline:) ||
                aSelector == @selector(titlePointSize:)) {
            [self setTitleFont];
            [self format];
            [self display];
        } else if ( aSelector == @selector(subTitleFontName:) ||
                aSelector == @selector(subTitleBold:) ||
                aSelector == @selector(subTitleItalics:) ||
                aSelector == @selector(subTitleUnderline:) ||
                aSelector == @selector(subTitlePointSize:)) {
```

```
            [self setSubTitleFont];
            [self format];
            [self display];
        } else if (aSelector == @selector(titleJustification:) ||
                   aSelector == @selector(subTitleJustification:)) {
            [self format];
            [self display];
        }
        else {
            [super update: anObject because: aSelector];
        }
    } else {
        [super update: anObject because: aSelector];
    }
    return self;
}

=:

/*==================== DO NOT REMOVE    EDIT ============================

        This comment and the following sccsId declaration are managed
        by SCCS for you. Do not edit or remove either.

        Source file:     /users/bmw/Alpha/Reports/SCCS/s.Header.m
        Latest version:  1.7
        Last mod time:   08/25/89 at 11:32:31

=======================================================================*/

static char *sccsId = "@(#)Header.m rev 1.7 created on 08/25/89 at 11:32:31";

/*==================== DO NOT REMOVE OR EDIT ==========================*/


#include "objc.h"
#include "uil.h"
#include "BMWGlobal.h"

@requires CharString, TextUnit, OrdCltn;

= Header: Footer (BM_WorkstationMsgs, UIMESSAGES) {
id title;       // Text Unit
id subTitle;    // Text Unit
}

/* $Default Category: Initialization $ */

/*
Initialize the receiver.  Returns self.
*/
-initialize {
    [super initialize];
    [self titlePart: [self defaultTitlePart]];
    [self subTitlePart: [self defaultSubTitlePart]];
    return self;
}

/* $Default Category: Setting $ */

/*
Change the title to aTextUnit.  aTextUnit is expected to be an instance
of TextUnit.  Returns self.
*/
```

```
-titlePart: aTextUnit {
    [title removeDependent: self];
    title = aTextUnit;
    [title addDependent: self];
    [self changed: @selector(titlePart:)];
    return self;
}

/*
Change the sub title to aTextUnit.  aTextUnit is expected to be an instance
of aTextUnit.  Returns self.
*/
-subTitlePart: aTextUnit {
    [subTitle removeDependent: self];
    subTitle = aTextUnit;
    [subTitle addDependent: self];
    [self changed: @selector(subTitlePart:)];
    return self;
}

/*
Set the receiver's title to aString.    urns self.
*/
-titleSTR: (STR)aString {
  if ( strcmp(aString, [title str]) == 0 ) return self;
  [title assignSTR: aString];
  return self;
}

/*
Set the receiver's sub title to aString.  Returns self.
*/
-subTitleSTR: (STR)aString {
  if ( strcmp(aString, [subTitle str]) == 0 ) return self;
  [subTitle assignSTR: aString];
  return self;
}

/*
Set the font for the receiver's title to aFontName.  Returns self.
*/
-titleFontName:  (STR)aFontName{
    [title fontName: aFontName];
    return self;
}

/*
If aBool is YES, set the font for the reciever's title to bold, otherwise
set the receiver's title font to not bold.  Returns self.
*/
-titleBold: (BOOL)aBool{
    [title bold: aBool];
    return self;
}

/*
If aBool is YES, set the font for the reciever's title to italics, otherwise
set the receiver's title font to not italics.  Returns self.
*/
-titleItalics: (BOOL)aBool{
    [title italics: aBool];
    return self;
}
```

```
/*
If aBool is YES, set the font for the reciever's title to underlined, otherwise
set the receiver's title font to not underlined.  Returns self.
*/
-titleUnderline: (BOOL)aBool{
    [title underline: aBool];
    return self;
}

/*
Set the receiver's title font to a point size of aPointSize.  Returns self.
*/
-titlePointSize: (short)aPointSize{
    [title pointSize: aPointSize];
    return self;
}


-titleJustification:(unsigned)justification {
    [title justification:justification];
    return self;
}

/*
Set the font for the receiver's sub title to aFontName.  Returns self.
*/
-subTitleFontName:  (STR)aFontName{
    [subTitle fontName: aFontName];
    return self;
}

/*
If aBool is YES, set the font for the reciever's sub title to bold, otherwise
set the receiver's sub title font to not bold.  Returns self.
*/
-subTitleBold: (BOOL)aBool{
    [subTitle bold: aBool];
    return self;
}

/*
If aBool is YES, set the font for the reciever's sub title to italics,
otherwise set the receiver's sub title font to not italics.  Returns self.
*/
-subTitleItalics: (BOOL)aBool{
    [subTitle italics: aBool];
    return self;
}

/*
If aBool is YES, set the font for the reciever's sub title to underlined,
otherwise set the receiver's sub title font to not underlined.  Returns self.
*/
-subTitleUnderline: (BOOL)aBool{
    [subTitle underline: aBool];
    return self;
}

/*
Set the receiver's sub title font to a point size of aPointSize.  Returns self.
*/
-subTitlePointSize: (short)aPointSize{
    [subTitle pointSize: aPointSize];
    return self;
}
```

```
-subTitleJustification:(unsigned)justification {
    [subTitle justification:justification];
    return self;
}


/* $Default Category: Interrogation $*/

/*
Return the title portion of the receiver.
*/
-titlePart {
    return title;
}

/*
Return the sub title portion of the receiver.
*/
-subTitlePart {
    return subTitle;
}

/*
Return the default title portion of the receiver.  Returns a
center justified ReportText.
*/
-defaultTitlePart {
    id text;
    text = [TextUnit str:"Title"];
    [text justification:JCENTER];
    return text;
}

/*
Return the default sub title portion of the receiver.  Returns a
center justified ReportText.
*/
-defaultSubTitlePart {
    id text;
    text = [TextUnit str:"Sub Title"];
    [text justification:JCENTER];
    return text;
}

/* $Default Category: Dependencies $ */

/*
Update the receiver according to anObject.  Returns self.
*/
-update: anObject because: (SEL)aSelector {
    if (anObject == subTitle) {
        if ( aSelector == @selector(assignSTR:))
            [self changed: @selector(subTitleSTR:)];
        else if ( aSelector == @selector(fontName:))
            [self changed: @selector(subTitleFontName:)];
        else if ( aSelector == @selector(bold:))
            [self changed: @selector(subTitleBold:)];
        else if ( aSelector == @selector(italics:))
            [self changed: @selector(subTitleItalics:)];
        else if ( aSelector == @selector(underline:))
            [self changed: @selector(subTitleUnderline:)];
        else if ( aSelector == @selector(pointSize:))
            [self changed: @selector(subTitlePointSize:)];
        else if ( aSelector == @selector(justification:))
```

```
            [self changed: @selector(subTitleJustification:)];
    } else if (anObject == title) {
        if ( aSelector == @selector(assignSTR:))
            [self changed: @selector(titleSTR:)];
        else if ( aSelector == @selector(fontName:))
            [self changed: @selector(titleFontName:)];
        else if ( aSelector == @selector(bold:))
            [self changed: @selector(titleBold:)];
        else if ( aSelector == @selector(italics:))
            [self changed: @selector(titleItalics:)];
        else if ( aSelector == @selector(underline:))
            [self changed: @selector(titleUnderline:)];
        else if ( aSelector == @selector(pointSize:))
            [self changed: @selector(titlePointSize:)];
        else if ( aSelector == @selector(justification:))
            [self changed: @selector(titleJustification:)];
    }
    [super update: anObject because: aSelector];
    return self;
}

/*
Restablish dependencies for the rece    .  Returns self.
*/
-awakeFrom: aFiler {
    [title addDependent: self];
    [subTitle addDependent: self];
    return [super awakeFrom:aFiler];;
}


/*
Terminate the receiver.  Returns nil.
*/
-terminate$ {
    title = [title free];
    subTitle = [subTitle free];
    return [super terminate$];
}


-copy {
    id newH;

    newH = [super copy];

    newH->title = [title copy];
    [newH->title addDependent:newH];
    [newH changed:@selector(titlePart:)];

    newH->subTitle = [subTitle copy];
    [newH->subTitle addDependent:newH];
    [newH changed:@selector(subTitlePart:)];

    return newH;
}

=:

/*===================== DO NOT REMOV    EDIT =============================

       This comment and the following sccsId declaration are managed
       by SCCS for you. Do not edit or remove either.
```

```
        Source file:     /users/bmw/Alpha/Reports/SCCS/s.RSDataArea.m
        Latest version:  1.4
        Last mod time:   09/04/89 at 20:04:29

==========================================================================*/

static char *sccsId = "@(#)RSDataArea.m rev 1.4 created on 09/04/89 at 20:04:29";

/*===================== DO NOT REMOVE OR EDIT ============================*/

#include "objc.h"
#include "uil.h"

@requires OrdCltn,CharString;

= ReportSpecsDataArea:ReportDataArea(BM_WorkstationMsgs,UIMESSAGES)
  {
  id reportItems;
  }

- reportItems
  {
  return reportItems;
  }

- reportItems:aCollection
  {
  if (reportItems)
     reportItems = [reportItems free];
  reportItems = aCollection;
  return self;
  }

- copy
  {
  id newRSDA;
  short index;

  newRSDA = [super copy];

  newRSDA->reportItems = [OrdCltn new];
  for (index=0;index<[reportItems size];index++)
      [newRSDA->reportItems add:[CharString str:[[reportItems at:index] str]]];

  return newRSDA;
  }

- initialize
  {
  [super initialize];
  reportItems = [OrdCltn new];
  return self;
  }

- terminate$
  {
  if (reportItems)
     reportItems = [reportItems free];
  return [super terminate$];
  }


=:
```

```
/*==================== DO NOT REMOV    EDIT ============================

        This comment and the following sccsId declaration are managed
        by SCCS for you. Do not edit or remove either.

        Source file:     /users/bmw/Alpha/Reports/SCCS/s.RSTemplate.m
        Latest version:  1.3
        Last mod time:   09/04/89 at 20:02:40

=====================================================================*/

static char *sccsId = "@(#)RSTemplate.m rev 1.3 created on 09/04/89 at 20:02:40";

/*==================== DO NOT REMOVE OR EDIT ==========================*/

#include "objc.h"
#include "uil.h"
#include "stdio.h"
#include "BMWGlobal.h"

@requires ReportSpecsDataArea;
@requires BM_ParseTreeNode,BM_Parser,BM_StreamString;

= ReportSpecsTemplate:ReportTemplate(BM_WorkstationMsgs,UIMESSAGES)
  {
  id model;
  }


- model
  {
  return model;
  }


- model:aModel
  {
  model = aModel;
  return self;
  }


- defaultDataArea
  {
  return [ReportSpecsDataArea new];
  }


- copy
  {
  id newRST;

  newRST = [super copy];

  newRST->model = nil;
  return newRST;
  }


- initialize
  {
  [super initialize];
  model = nil;
  return self;
  }
```

```
extern id _theParser;
extern id parseTree;

- awakeFrom:aFiler
  {
  if (model)
     {
     if (_theParser == nil)
         _theParser = [BM_Parser new];
     [_theParser parse:[BM_StreamString str:[model str]]];
     model = parseTree;
     }
  return [super awakeFrom:aFiler];
  }


- (BOOL)fileOutFor:aFiler
  {
  id vrlModel;
  BOOL response;

  vrlModel = model;
  model = [model listing];
  response = [super fileOutFor:aFiler];
  model = vrlModel;
  return response;
  }

=:


/*===================== DO NOT REMOV    EDIT ============================

        This comment and the following sccsId declaration are managed
        by SCCS for you. Do not edit or remove either.

        Source file:     /users/bmw/Alpha/Reports/SCCS/s.RSpecsDAEdit.m
        Latest version:  1.5
        Last mod time:   09/08/89 at 14:32:33

=====================================================================*/

static char *sccsId = "@(#)RSpecsDAEdit.m rev 1.5 created on 09/08/89 at 14:32:33";

/*===================== DO NOT REMOVE OR EDIT ===========================*/

#include "objc.h"
#include "uil.h"

@requires CharString,CSMore,SDialogBox,BM_PromptBox;

= ReportSpecsDAEdit:ReportDAEdit(BM_WorkstationMsgs,UIMESSAGES)
  {
  }


- cancel:aStringDB
  {
  [super cancel:aStringDB];
  if ([[[self template] titles] size] > 0)
     [parent findSelectionItem:pt([self columnOffset],0)];
  return self;
  }
```

```
- acceptDSFrom:aStringDB
 {
 int number;

 number = atoi([aStringDB valueAsStrAt:2]);
 if ( (!(number>[[[self template] titles] size])) &&
      (!(number < 0)) )
    {
    id parsedMemoId;

    [[template reportItems] at:number
       insert:[CharString str:[aStringDB valueAsStrAt:3]]];
    parsedMemoId = [[parent parent]
       parseMemoStatement:[template reportItems]];

    if (parsedMemoId==nil)
       {
       [[template reportItems] removeAt:number];
       [BM_PromptBox askSTR:"Syntax Error! Check Statement" client:self];
       }
    else
       {
       [aStringDB erase];
       [aStringDB modalDeactivate];
       return [super addDS:number title:[aStringDB valueAsStrAt:0]
                   value:[aStringDB valueAsStrAt:1]];
       }
    }
 else
    [self offsetErrorMessage];

 return self;
  }



// This is called from doubleclick
- addDS:anOffset title:(STR)dataTitle value:(STR)dataValue
  {
  [[template reportItems] at:anOffset insert:[CharString str:dataTitle]];
  [[parent parent] parseMemoStatement:[template reportItems]];

  return [super addDS:anOffset title:dataTitle value:dataValue];
  }


- deleteDS:(short)anOffset
  {
  [[template reportItems] removeAt:anOffset];
  [[parent parent] parseMemoStatement:[template reportItems]];

  [template removeDataSetAt:anOffset];

  if (anOffset < [[template reportItems] size])
     return [parent freeDataPartsAndHighlightItem:anOffset];
  else if (anOffset > 0)
     return [parent freeDataPartsAndHighlightItem:anOffset-1];
  else  return [parent freeDataParts];
  }


-editDS:(short)anOffset {
    id aStringDB, aQuad;
    char dataItemName[50];
```

```
    [self columnOffset:anOffset];
    aStringDB = [SDialogBox new];
    [aStringDB addEntryLabeled: "Title :"
        defaultValue: [[[template titles] at:anOffset] str]];
    [aStringDB addEntryLabeled: "Format:"
        defaultValue: [[[template values] at:anOffset] str]];

    strcpy(dataItemName,"Data Item: ");
    strcat(dataItemName,[[[template reportItems] at:anOffset] str]);
    dataItemName[strlen(dataItemName)] = 0;
    [aStringDB addStaticLabel:dataItemName];

    [aStringDB acceptSelector: @selector(replaceDSFrom:) receiver: self];
    [aStringDB cancelSelector: @selector(cancel:) receiver: self];
    [aStringDB extent: [aStringDB defaultExtent]];

    aQuad = [baseLayer insideQuad];
    [[aStringDB center:[self center]] translateWithin:aQuad];
    [aStringDB attachTo: baseLayer];
    [aStringDB show];

    [aQuad free];
    if (aStringDB)
       [aStringDB modalActivate];
    if (aStringDB)
       aStringDB = [aStringDB delete];
    return self;
}

- replaceDSFrom:aStringDB

 {
 [aStringDB modalDeactivate];
 [template replaceTitle:[CSMore str:[aStringDB valueAsStrAt:0]]
    replaceValue:[CSMore str:[aStringDB valueAsStrAt:1]]
       at:[self columnOffset]];
 return [parent freeDataPartsAndHighlightItem:[self columnOffset]];
 }

=:

/*===================== DO NOT REMOVI     EDIT ==============================

       This comment and the following sccsId declaration are managed
       by SCCS for you. Do not edit or remove either.

       Source file:     /users/bmw/Alpha/Reports/SCCS/s.RSpecsEdit.m
       Latest version:  1.4
       Last mod time:   09/08/89 at 15:18:51

=========================================================================*/

static char *sccsId = "@(#)RSpecsEdit.m rev 1.4 created on 09/08/89 at 15:18:51";

/*===================== DO NOT REMOVE OR EDIT ===========================*/

#include "objc.h"
#include "uil.h"

@requires ReportSpecsDAEdit;

= ReportSpecsEdit:TemplateEdit(BM_WorkstationMsgs,UIMESSAGES)
  {
  }
```

```
+ dataLayerFactoryObject
  {
  return ReportSpecsDAEdit;
  }



- setSize
  {
  PT aPageSize;

  [self borderWidth:[template reportBorderWidth]];
  aPageSize = [template pageSize];
  [self extent:pt((ptX(aPageSize)),(int)[parent templateLayerHeight])];

  return self;
  }


- update:anObject because:(SEL)aSelector
  {
  if (anObject==template)
     {
     if (aSelector == @selector(free))
        {
        template = nil;
        return self;
        }
     if ((aSelector==@selector(pageSize:)) ||
         (aSelector==@selector(reportBorderWidth:)) ||
         (aSelector==@selector(topMargin:)) ||
              (aSelector==@selector(bottomMargin:)) ||
              (aSelector==@selector(rightMargin:)) ||
              (aSelector==@selector(leftMargin:)))
        {
        [self erase];
        [self format];
        }
     [parent formatTemplateLayer];
     }
  return self;
  }



- freeDataPartsAndHighlightItem:(short)anOffset
  {
  [self freeDataParts];
  [self findSelectionItem:pt(anOffset,0)];
  return self;
  }


=:

/*==================== DO NOT REMOV   EDIT ============================

        This comment and the following sccsId declaration are managed
        by SCCS for you. Do not edit or remove either.

        Source file:     SCCS/s.RTemplate.m
        Latest version:  1.25
        Last mod time:   09/04/89 at 20:02:50
```

```
=========================================================================*/

static char *sccsId = "@(#)RTemplate.m rev 1.25 created on 09/04/89 at 20:02:50";

/*==================== DO NOT REMOVE OR EDIT ===========================*/


/*
$Description: ReportTemplate is a report template that describes how to format
a set of data into a report.
*/

#include "objc.h"
#include "uil.h"
#include <time.h>

@requires Footer,Header,TextAtt,OrdCltn,CSMore;

= ReportTemplate:Template(BM_WorkstationMsgs,UIMESSAGES)
  {
  short reportBorder;   // Report border width in pixels
  short topMargin;      // Top margins in pixels
  short bottomMargin;   // Bottom margins in pixels
  short rightMargin;    // Right margins in pixels
  short leftMargin;     // Left margins in pixels
  id defaultText;       // TextAtt, default text characteristics

  id header;            // Header, report header
  id footer;            // Footer, report footer
  }


- initialize
  {
  [super initialize];

  pageSize = pt(500,880);
  reportBorder = 0;
  topMargin = 10;
  bottomMargin = 10;
  rightMargin = 10;
  leftMargin = 10;
  defaultText = [self defaultText];
  header = [self defaultHeader];
  footer = [self defaultFooter];

  return self;
  }


+ defaultTemplate:aDataList
  {
  int index, aSize, pWidth;

  self = [super new];
  [self initialize];
  aSize = [aDataList nSets];
  pWidth = 150;

  for (index=0;index<aSize;index++)
      if ([aDataList isTextAt:index])
         {
         [data addTitle:[CSMore str:[[aDataList
                   at:[aDataList setNumberFromColumn:index]] nameSTR]]
```

```
            addValue:[CSMore str:"xxxxxxxxxxxxxxxxxxxx"]];
        if (pWidth < 860)
            pWidth += 200;
        }
    else
        {
        [data addTitle:[CSMore str:[[aDataList
                    at:[aDataList setNumberFromColumn:index]] nameSTR]]
            addValue:[CSMore str:"##########.###"]];
        if (pWidth < 910)
            pWidth += 150;
        }
 [footer leftSTR:""];
 [footer rightSTR:""];
 [footer centerSTR:"<page>"];
 [header leftSTR:"BFM"];
 [header rightSTR:"<date>"];
 [header centerSTR:""];
 [header titleSTR:"Batterymarch Investment Systems"];
 [header subTitleSTR:"Report"];

 if (pWidth > 800)
     pageSize = pt(pWidth,800);
 else
      pageSize = pt(pWidth,880);

 return self;
 }



- (short)reportBorderWidth
 {
 return reportBorder;
 }


- reportBorderWidth: (short)aBorderWidth
 {
 reportBorder = aBorderWidth;
 [self changed: @selector(reportBorderWidth:)];
 return self;
 }


- defaultFooter
 {
 return [Footer new];
 }


- defaultHeader
 {
 return [Header new];
 }


- defaultText
 {
 return [TextAtt new];
 }


- (short)rightMargin
 {
```

```
return rightMargin;
}


- (short)leftMargin
{
return leftMargin;
}


- (short)topMargin
{
return topMargin;
}


- (short)bottomMargin
{
return bottomMargin;
}


- rightMargin: (short)aMargin
{
rightMargin = aMargin;
[self changed: @selector(rightMargin:)];
return self;
}


- leftMargin: (short)aMargin
{
leftMargin = aMargin;
[self changed: @selector(leftMargin:)];
return self;
}


- topMargin: (short)aMargin
{
topMargin = aMargin;
[self changed: @selector(topMargin:)];
return self;
}

- bottomMargin: (short)aMargin
{
bottomMargin = aMargin;
[self changed: @selector(bottomMargin:)];
return self;
}


- PRIVATE defaultTextAttributes
{
return defaultText;
}

- (STR)defaultFontName
{
return [defaultText fontName];
}
```

```
- (BOOL)defaultBold
{
return [defaultText bold];
}


- (BOOL)defaultItalics
{
return [defaultText italics];
}


- (BOOL)defaultUnderline
{
return [defaultText underline];
}


- (short)defaultPointSize
{
return [defaultText pointSize];
}


- (unsigned)defaultJustification
{
return [defaultText justification];
}


- defaultFontName: (STR)aFontName
{
[defaultText fontName: aFontName];
[self changed: @selector(defaultFontName:)];
return self;
}


- defaultBold: (BOOL)aBool
{
[defaultText bold: aBool];
[self changed: @selector(defaultBold:)];
return self;
}


- defaultItalics: (BOOL)aBool
{
[defaultText italics: aBool];
[self changed: @selector(defaultItalics:)];
return self;
}


- defaultUnderline: (BOOL)aBool
{
[defaultText underline: aBool];
[self changed: @selector(defaultUnderline:)];
return self;
}
- defaultPointSize: (short)aPointSize
{
[defaultText pointSize: aPointSize];
```

```
    [self changed: @selector(defaultPointSize:)];
    return self;
    }


- defaultJustification:(unsigned)justification
    {
    [defaultText justification:justification];
    [self changed: @selector(defaultJustification:)];
    return self;
    }


- (STR)headerLeftSTR
    {
    return [header leftSTR];
    }


- (STR)headerRightSTR
    {
    return [header rightSTR];
    }


- (STR)headerCenterSTR
    {
    return [header centerSTR];
    }


- (STR)headerFontName
    {
    return [header fontName];
    }


- (BOOL)headerBold
    {
    return [header bold];
    }


- (BOOL)headerItalics
    {
    return [header italics];
    }


- (BOOL)headerUnderline
    {
    return [header underline];
    }


- (short)headerPointSize
    {
    return [header pointSize];
    }


- (STR)titleSTR
    {
    return [[header titlePart] str];
    }
```

```
- (STR)titleFontName
 {
 return [[header titlePart] fontName];
 }


- (BOOL)titleBold
 {
 return [[header titlePart] bold];
 }


- (BOOL)titleItalics
 {
 return [[header titlePart] italics];
 }


- (BOOL)titleUnderline
 {
 return [[header titlePart] underline];
 }


- (short)titlePointSize
 {
 return [[header titlePart] pointSize];
 }


- (unsigned)titleJustification
 {
 return [[header titlePart] justification];
 }


- (STR)subTitleSTR
 {
 return [[header subTitlePart] str];
 }


- (STR)subTitleFontName
 {
 return [[header subTitlePart] fontName];
 }


- (BOOL)subTitleBold
 {
 return [[header subTitlePart] bold];
 }


- (BOOL)subTitleItalics
 {
 return [[header subTitlePart] italics];
 }


- (BOOL)subTitleUnderline
 {
 return [[header subTitlePart] underline];
 }
```

```
- (short)subTitlePointSize
  {
  return [[header subTitlePart] pointSize];
  }

- (unsigned)subTitleJustification
  {
  return [[header subTitlePart] justification];
  }

- (STR)footerLeftSTR
  {
  return [footer leftSTR];
  }

- (STR)footerRightSTR
  {
  return [footer rightSTR];
  }

- (STR)footerCenterSTR
  {
  return [footer centerSTR];
  }

- (STR)footerFontName
  {
  return [footer fontName];
  }

- (BOOL)footerBold
  {
  return [footer bold];
  }

- (BOOL)footerItalics
  {
  return [footer italics];
  }

- (BOOL)footerUnderline
  {
  return [footer underline];
  }

- (short)footerPointSize
  {
  return [footer pointSize];
  }

- titleSTR:(STR)aString
  {
  [header titleSTR: aString];
  [self changed: @selector(titleSTR:)];
  return self;
  }
```

```
- subTitleSTR:(STR)aString
  {
  [header subTitleSTR: aString];
  [self changed: @selector(subTitleSTR:)];
  return self;
  }


- footerLeftSTR:(STR)aString
  {
  [footer leftSTR: aString];
  [self changed: @selector(footerLeftSTR:)];
  return self;
  }


- footerCenterSTR:(STR)aString
  {
  [footer centerSTR: aString];
  [self changed: @selector(footerCenterSTR:)];
  return self;
  }


- footerRightSTR:(STR)aString
  {
  [footer rightSTR: aString];
  [self changed: @selector(footerRightSTR:)];
  return self;
  }


- headerLeftSTR:(STR)aString
  {
  [header leftSTR: aString];
  [self changed: @selector(headerLeftSTR:)];
  return self;
  }


- headerCenterSTR:(STR)aString
  {
  [header centerSTR: aString];
  [self changed: @selector(headerCenterSTR:)];
  return self;
  }


- headerRightSTR:(STR)aString
  {
  [header rightSTR: aString];
  [self changed: @selector(rightCenterSTR:)];
  return self;
  }


- headerFontName: (STR)aFontName
  {
  [header fontName: aFontName];
  [self changed: @selector(headerFontName:)];
  return self;
  }
```

```
- headerBold: (BOOL)aBool
  {
  [header bold: aBool];
  [self changed: @selector(headerBold:)];
  return self;
  }

- headerItalics: (BOOL)aBool
  {
  [header italics: aBool];
  [self changed: @selector(headerItalics:)];
  return self;
  }

- headerUnderline: (BOOL)aBool
  {
  [header underline: aBool];
  [self changed: @selector(headerUnderline:)];
  return self;
  }

- headerPointSize: (short)aPointSize
  {
  [header pointSize: aPointSize];
  [self changed: @selector(headerPointSize:)];
  return self;
  }

- footerFontName: (STR)aFontName
  {
  [footer fontName: aFontName];
  [self changed: @selector(footerFontName:)];
  return self;
  }

- footerBold: (BOOL)aBool
  {
  [footer bold: aBool];
  [self changed: @selector(footerBold:)];
  return self;
  }

- footerItalics: (BOOL)aBool
  {
  [footer italics: aBool];
  [self changed: @selector(footerItalics:)];
  return self;
  }

- footerUnderline: (BOOL)aBool
  {
  [footer underline: aBool];
  [self changed: @selector(footerUnderline:)];
  return self;
  }

- footerPointSize: (short)aPointSize
  {
```

```
[footer pointSize: aPointSize];
[self changed: @selector(footerPointSize:)];
return self;
}


- titleFontName: (STR)aFontName
{
[[header titlePart] fontName: aFontName];
[self changed: @selector(titleFontName:)];
return self;
}


- titleBold: (BOOL)aBool
{
[[header titlePart] bold: aBool];
[self changed: @selector(titleBold:)];
return self;
}


- titleItalics: (BOOL)aBool
{
[[header titlePart] italics: aBool];
[self changed: @selector(titleItalics:)];
return self;
}


- titleUnderline: (BOOL)aBool
{
[[header titlePart] underline: aBool];
[self changed: @selector(titleUnderline:)];
return self;
}


- titlePointSize: (short)aPointSize
{
[[header titlePart] pointSize: aPointSize];
[self changed: @selector(titlePointSize:)];
return self;
}


- titleJustification:(unsigned)justification
{
[[header titlePart] justification:justification];
[self changed: @selector(titleJustification:)];
return self;
}


- subTitleFontName: (STR)aFontName
{
[[header subTitlePart] fontName: aFontName];
[self changed: @selector(subTitleFontName:)];
return self;
}


- subTitleBold: (BOOL)aBool
```

```
{
[[header subTitlePart] bold: aBool];
[self changed: @selector(subTitleBold:)];
return self;
}


- subTitleItalics: (BOOL)aBool
{
[[header subTitlePart] italics: aBool];
[self changed: @selector(subTitleItalics:)];
return self;
}


- subTitleUnderline: (BOOL)aBool
{
[[header subTitlePart] underline: aBool];
[self changed: @selector(subTitleUnderline:)];
return self;
}


- subTitlePointSize: (short)aPointSize
{
[[header subTitlePart] pointSize: aPointSize];
[self changed: @selector(subTitlePointSize:)];
return self;
}


- subTitleJustification:(unsigned)justification
{
[[header subTitlePart] justification:justification];
[self changed: @selector(subTitleJustification:)];
return self;
}

- header
{
return header;
}

- footer
{
return footer;
}

- terminate$
{
[header free];
[footer free];
[defaultText free];

return [super terminate$];
}

- copy
{
id newRT;

newRT = [super copy];
```

```
    newRT->defaultText = [defaultText copy];
    newRT->header = [header copy];
    newRT->footer = [footer copy];

    return newRT;
    }
=:
/*===================== DO NOT REMOVE     )IT ============================

        This comment and the following sccsId declaration are managed
        by SCCS for you. Do not edit or remove either.

        Source file:     /users/bmw/Alpha/Reports/SCCS/s.RepDAEdit.m
        Latest version:  1.3
        Last mod time:   09/04/89 at 20:05:36

===========================================================================*/

static char *sccsId = "@(#)RepDAEdit.m rev 1.3 created on 09/04/89 at 20:05:36";

/*===================== DO NOT REMOVE OR EDIT ============================*/

#include "objc.h"
#include "uil.h"
#include "BMWGlobal.h"

#define MAXVALUESIZE 35

@requires CSMore, Menu, PopUpMenu;
@requires SDialogBox, SmartFont, BM_AskDialogBox, BM_PromptBox, CharString;

static id _myMenu;

= ReportDAEdit: ReportDALayer (BM_WorkstationMsgs, UIMESSAGES)
   {
   }


-template: aDataAreaTemplate {
    if ( template ) {
        [template removeDependent: self];
    }
    template = aDataAreaTemplate;
    [template addDependent: self];
    [self preformat];
    return self;
}


-offsetErrorMessage
    {
    [BM_PromptBox askSTR:"Error - Data offset is out of bounds" client:self];
    return self;
    }

-modifyTitleAtt:aMenuItem
    {
    id userFont;

    userFont = [CharString str:[[aMenuItem menu] str]];

    [[template titleAttributes] fontName:[userFont str]];
    [userFont free];
    return [parent freeDataParts];
```

```
}


-modifyValueAtt:aMenuItem
   {
   id userFont;
   userFont = [CharString str:[[aMenuItem menu] str]];

   [[template valueAttributes] fontName:[userFont str]];
   [userFont free];
   return [parent freeDataParts];
   }


-borderFromUser {
   id response ;
   id pointStr;

   pointStr = [CSMore fromInt: [template borderWidth]];
   response = [BM_AskDialogBox askSTR:"Enter border width:" defaultValue:[pointStr str] client:self];
   if (response)
      {
      [template borderWidth:atoi([response str])];
      [response free];
      }

   [pointStr free];
   return self;
}


-cancel:aStringDB {
   [aStringDB modalDeactivate];
   return self;
}


-addDS:(short)anOffset title:(STR)aTitle value:(STR)aValue {
   [template addTitle:[CSMore str:aTitle]
      addValue:[CSMore str:aValue] at:anOffset];
   return [parent freeDataParts];
}


-acceptDSFrom:aStringDB {
   int number;

   number = atoi([aStringDB valueAsStrAt:2]);
   if ( (!(number > [[template titles] size])) && (!(number < 0)) )
      {
      [aStringDB erase];
      [aStringDB modalDeactivate];
      return [self addDS:number title:[aStringDB valueAsStrAt:0]
         value:[aStringDB valueAsStrAt:1]];
      }

   [aStringDB modalDeactivate];
   [self offsetErrorMessage];
   return self;
```

```
}


-addDSFromUser:(short)aNumber title:(STR)aTitle value:(STR)aValue
                                        dataItem:(STR)aDataItem {
    id aStringDB, aQuad;
    char anOffset[3];
    aStringDB = [SDialogBox new];
    sprintf(anOffset,"%d",aNumber);
    [aStringDB addEntryLabeled: "Title :" defaultValue: aTitle];
    [aStringDB addEntryLabeled: "Format:" defaultValue: aValue];
    [aStringDB addEntryLabeled: "Offset:" defaultValue: anOffset];
    [aStringDB addEntryLabeled: "Item  :" defaultValue: aDataItem];
    [aStringDB acceptSelector: @selector(acceptDSFrom:) receiver: self];
    [aStringDB cancelSelector: @selector(cancel:) receiver: self];
    [aStringDB extent: [aStringDB defaultExtent]];

    aQuad = [baseLayer insideQuad];
    [[aStringDB center:[self center]] translateWithin:aQuad];
    [aStringDB attachTo: baseLayer];
    [aStringDB show];

    [aQuad free];
    [aStringDB modalActivate];
    [aStringDB delete];

    return self;
}


-addDSFromUser:(short)anOffset title:(STR)aTitle value:(STR)aValue {
     return [self addDSFromUser:anOffset title:aTitle value:aValue
        dataItem:"A Data Item"];
}


- addDSFromUser {
    short anOffset;

    anOffset = [[template titles] size];
    return [self addDSFromUser:anOffset title:"A Title"
       value:"xxxxxxxxxxxxxxxx" dataItem:"A Data Item"];
}


-deleteDS:(short)anOffset {
    [template removeDataSetAt:anOffset];
    return [parent freeDataParts];
}


-deleteDSFromUser {
    id response;
    int number;

    response = [BM_AskDialogBox askSTR:"Enter offset of data set to remove:"
       defaultValue:"0" client:self];
    if (response)
       {
       number =  atoi([response str]);

       if ( (number < [[template titles] size]) && (!(number < 0)))
            {
```

```
            [response free];
            return [self deleteDS:number];
            }

      [self offsetErrorMessage];
      [response free];
      }
   return self;
}

-replaceDSFrom:aStringDB {
   [aStringDB modalDeactivate];

   [template replaceTitle:[CSMore str:[aStringDB valueAsStrAt:0]]
      replaceValue:[CSMore str:[aStringDB valueAsStrAt:1]]
         at:[self columnOffset]];
   return [parent freeDataParts];
}



-editDS:(short)anOffset {
   id aStringDB, aQuad;

   [self columnOffset:anOffset];
   aStringDB = [SDialogBox new];
   [aStringDB addEntryLabeled: "Title :"
      defaultValue: [[[template titles] at:anOffset] str]];
   [aStringDB addEntryLabeled: "Format:"
      defaultValue: [[[template values] at:anOffset] str]];

   [aStringDB acceptSelector: @selector(replaceDSFrom:) receiver: self];
   [aStringDB cancelSelector: @selector(cancel:) receiver: self];
   [aStringDB extent: [aStringDB defaultExtent]];

   aQuad = [baseLayer insideQuad];
   [[aStringDB center:[self center]] translateWithin:aQuad];
   [aStringDB attachTo: baseLayer];
   [aStringDB show];

   [aQuad free];
   if (aStringDB)
      [aStringDB modalActivate];
   if (aStringDB)
      aStringDB = [aStringDB delete];
   return self;
}



-editDSFromUser {
   id response;
   int number;

   response = [BM_AskDialogBox askSTR:"Data offset:"
      defaultValue:"0" client:self];
   if (response)
      {
      number =  atoi([response str]);
      if ( (number < [[template titles] size])  && (!(number < 0)))
         {
         [response free];
         return [self editDS:number];
         }
```

```
        [self offsetErrorMessage];
        [response free];
        }
    return self;
}


-titleLeftJustify {
    [template titleJustification:JLEFT];
    return self;
}


-titleRightJustify {
    [template titleJustification:JRIGHT];
    return self;
}


-titleCentered {
    [template titleJustification:JCENTER];
    return self;
}


-valueLeftJustify {
    id response;
    int number;

    response = [BM_AskDialogBox askSTR:"Enter data set to left-justify:" defaultValue:"0" client:self];

    if (response)
        {
        number = atoi([response str]);
        if ( (number < [[template titles] size]) && (!(number < 0)))
                [template valueJustification:JLEFT at:number];
        else [self offsetErrorMessage];
        [response free];
        }

    return self;
}


-valueRightJustify {
    id response;
    int number;

    response = [BM_AskDialogBox askSTR:"Enter data set to right-justify:" defaultValue:"0" client:self];

    if (response)
        {
        number = atoi([response str]);
        if ( (number < [[template titles] size]) && (!(number < 0)))
                [template valueJustification:JRIGHT at:number];
        else [self offsetErrorMessage];
        [response free];
        }

    return self;
}
```

```
-valueDecimalJustify {
   id response;
   int number;

   response = [BM_AskDialogBox askSTR:"Enter data set to decimal-justify:"
                                        defaultValue:"0" client:self];

   if (response)
      {
      number = atoi([response str]);
      if ( (number < [[template titles] size]) && (!(number < 0)))
            [template valueJustification:JDECIMAL at:number];
      else [self offsetErrorMessag
      [response free];
      }

   return self;
}


-valueCentered {
   id response;
   int number;

   response = [BM_AskDialogBox askSTR:"Enter data set to center:" defaultValue:"0" client:self];

   if (response)
      {
      number = atoi([response str]);
      if ( (number < [[template titles] size]) && (!(number < 0)))
            [template valueJustification:JCENTER at:number];
      else [self offsetErrorMessage];
      [response free];
      }

   return self;
}


-dataSortFromUser
   {
   id response;

   response = [BM_AskDialogBox askSTR:"Enter column offset:" defaultValue:"0" client:self];
   if (response)
      {
      short number = atoi([response str]);
      if ( (number < [[template titles] size]) && (!(number < 0)))
           {
           [template sortColumn:number];
           }
      else [self offsetErrorMessage];
      }

   return response;
   }



-sortAsReceived
   {
   [template normalSort];
   return self;
   }
```

```
-sortAscending
   {
   id response;

   response = [self dataSortFromUser];
   if (response)
      {
      [response free];
      [template ascendingSort];
      }

   return self;
   }



-sortDescending
   {
   id response;

   response = [self dataSortFromUser];
   if (response)
      {
      [response free];
      [template descendingSort];
      }

   return self;
   }



-updateMenu {
      [[[[_myMenu children] at:0] children] elementsPerform:@selector(receiver:) with:self];
      [[[[_myMenu children] at:1] children] elementsPerform:@selector(receiver:) with:self];
      [[[[_myMenu children] at:2] children] elementsPerform:@selector(receiver:) with:self];
      [[[[_myMenu children] at:3] children] elementsPerform:@selector(receiver:) with:self];

      [[[_myMenu children] at:4] receiver:self];
      [[[_myMenu children] at:5] receiver:self];
      [[[_myMenu children] at:6] receiver:self];
      [[[_myMenu children] at:7] receiver:self];
      [[[[_myMenu children] at:8] children] elementsPerform:@selector(receiver:) with:self];
      return self;
      }



-defaultMenu {

   if (_myMenu == nil)
      {
       id edit, style, editDS, addDS, deleteDS, border;
       id sortType;

       _myMenu = [Menu str: "Data"];
       [_myMenu append: [self defaultTitleFontMenu]];
       [_myMenu append: style = [Menu str: "Title Justification" ]];
       [style append: [Menu str: "Left"
            selector: @selector(titleLeftJustify) receiver: self]];
       [style append: [Menu str: "Centered"
            selector: @selector(titleCentered) receiver: self]];
       [style append: [Menu str: "Right"
            selector: @selector(titleRightJustify) receiver: self]];
```

```
        [_myMenu append: [self defaultValueFontMenu]];
        [_myMenu append: style = [Menu str: "Value Justification" ]];
        [style append: [Menu str: "Left"
             selector: @selector(valueLeftJustify) receiver: self]];
        [style append: [Menu str: "Centered"
             selector: @selector(valueCentered) receiver: self]];
        [style append: [Menu str: "Decimal"
             selector: @selector(valı    :imalJustify) receiver: self]];
        [style append: [Menu str: "Right"
             selector: @selector(valueRightJustify) receiver: self]];

        [_myMenu append: border = [Menu str: "Border Width"
               selector: @selector(borderFromUser) receiver: self]];
        [_myMenu append: addDS = [Menu str: "Add a Data Set"
               selector: @selector(addDSFromUser) receiver: self]];
        [_myMenu append: editDS = [Menu str: "Edit a Data Set"
               selector: @selector(editDSFromUser) receiver: self]];
        [_myMenu append: deleteDS = [Menu str: "Delete a Data Set"
               selector: @selector(deleteDSFromUser) receiver: self]];
        [_myMenu append: sortType = [Menu str: "Type of Sort"]];

        [sortType append: [[Menu str: "As Received"]
                selector:@selector(sortAsReceived) receiver:self]];
        [sortType append: [[Menu str: "Ascending"]
                selector:@selector(sortAscending) receiver:self]];
        [sortType append: [[Menu str: "Descending"]
                selector:@selector(sortDescending) receiver:self]];
       }
    return [_myMenu sharedS];
}



-defaultTitleFontMenu
    {
    id fontMenu;

    fontMenu = [SmartFont defaultFontMenu];
    [fontMenu assignSTR:"Title Font"];
    [[fontMenu children] elementsPerform:@selector(selector:) with:@selector(modifyTitleAtt:)];
    [[fontMenu children] elementsPerform:@selector(receiver:) with:self];
    return fontMenu;
     }


-defaultValueFontMenu
    {
    id fontMenu;

    fontMenu = [SmartFont defaultFontMenu];
    [fontMenu assignSTR:"Value Font"];
    [[fontMenu children] elementsPerform:@selector(selector:) with:@selector(modifyValueAtt:)];
    [[fontMenu children] elementsPerform:@selector(receiver:) with:self];
    return fontMenu;
     }


=:
```

```
/*===================== DO NOT REMOVE OR EDIT ============================

        This comment and the following sccsId declaration are managed
        by SCCS for you. Do not edit or remove either.

        Source file:    /users/bmw/Alpha/Reports/SCCS/s.RepDALayer.m
        Latest version: 1.4
        Last mod time:  09/08/89 at 15:19:14

=========================================================================*/

static char *sccsId = "@(#)RepDALayer.m rev 1.4 created on 09/08/89 at 15:19:14";

/*===================== DO NOT REMOVE OR EDIT ===========================*/

#include "objc.h"
#include "uil.h"
#include "BMWGlobal.h"
#include <ctype.h>
#include <string.h>

#define SPACEBETWEENCOLUMNS 40

@requires DispText, OrdCltn, IntOrdCltn, CharString, CSMore, SmartFont;
@requires RectList, Quad;

= ReportDALayer: BorderLayer (BM_WorkstationMsgs, UIMESSAGES) {

id data;
id template;

int startingSet;
int numberOfColumns;
int startingRow;
int numberOfRows;

BOOL formatted;

id titles;              // OrdCltn of DispTexts for titles
id values;              // OrdCltn of DispTexts for value formats

id titleFont;
id valueFont;

id columnWidths;        // IntOrdCltn; pixel widths of each col.
id columnLeftPixels;    // IntOrdCltn; pixel locations of the left of each col.

int columnOffset;       // offset of dataset being currently manipulated
id  parent;

PT selectionPt;         // x and y offset of highlighted dispText - NOT PIXELS
id selectionItem;       // DispText which is highlighted
id multipleSelectionList;
                        // OrdCltn of DISPTEXTS selected by User
BOOL allowMultipleSelection;
                        // User enables or disables multipleSelection
}


+ createInterfaceFor: aDataArea parent:aParent {
    self = [super new];
    parent = aParent;
    [self template: aDataArea];
    [self extent: [self defaultExtent]];
```

```
    return self;
}


+extent: (PT)aPoint template: aDataArea parent:aParent {
    self = [super new];
    parent = aParent;
    [self extent:aPoint];
    [self borderWidth:[aDataArea borderWidth]];

    template = aDataArea;
    [template addDependent:self];

    return self;
}


+data:someData template:aDataArea parent:aParent{
    self = [super new];

    template = aDataArea;
    data     = someData;

    parent = aParent;

    [self borderWidth:[aDataArea borderWidth]];

    [self getTitleFont];
    [self getValueFont];

    numberOfColumns = [someData nSets];
    startingSet   = 0;

    numberOfRows    = [[someData at:0] nRows];
    startingRow   = 0;

    [self calculateWidth];
    [self calculateHeight];

    return self;
}

-initialize {
    [super initialize];
    [self borderWidth: 0];

    startingRow   = 0;
    startingSet   = 0;
    numberOfRows    = 0;
    numberOfColumns = 0;

    formatted = NO;
    selectionItem = nil;
    selectionPt = pt(0,0);
    allowMultipleSelection = NO;
    multipleSelectionList = nil;
    return self;
}


-reinitialize {
    if (selectionItem)
       [self loseKeyboardFocus];
```

```
    if (values) {
        if (data)
           [values elementsPerform:@selector(freeContents)];
        [values elementsPerform:@selector(free)];
        values = [values free];
    }

    if (titles) {
        [titles elementsPerform:@selector(free)];
        titles = [titles free];
    }

    if (columnWidths)
       columnWidths = [columnWidths free];

    if (columnLeftPixels)
       columnLeftPixels = [columnLeftPixels free];

    if (parent == nil)
       valueFont = [valueFont free];

    if (parent == nil)
       titleFont = [titleFont free];

    numberOfRows    = 0;
    numberOfColumns = 0;

    formatted = NO;
    return self;
}


-terminate$
       {
       [self changed:@selector(terminate$)];
       [self reinitialize];
       if (allowMultipleSelection)
          multipleSelectionList = [multipleSelectionList free];
       [template removeDependent:self];
       return [super terminate$];
       }

- template
  {
  return template;
  }


- (int)startingSet
  {
  return startingSet;
  }


- (int)endingSet
  {
  return startingSet + numberOfColumns - 1;
  }


- (int)startingRow
  {
  return startingRow;
  }
```

```
- (int)endingRow
  {
  return startingRow + numberOfRows - 1;
  }


- (short)lineHeight
  {
  return  [valueFont height]*1.15;
  }


-(PT)increaseUnitSize
   {
    int delta = [self lineHeight];

    if (valueFont)
       return pt(delta,delta);
    else
       return [super increaseUnitSize];
   }


-(PT)decreaseUnitSize
   {
    int delta = [self lineHeight];

    if (valueFont)
       return pt(delta,delta);
    else
       return [super decreaseUnitSize];
   }


- (BOOL)doubleClick
  {
  [self changed:@selector(doubleClick)];
  if (!(data))                    // m    orrect this later....
     return [parent doubleClick];

  return YES;
  }


- (PT)selectionPt
  {
  return selectionPt;
  }


- (BOOL)containsSelectionPt:(PT)aPoint
  {
  if ( ((ptX(aPoint)) >= startingSet) && ((ptX(aPoint)) <= [self endingSet]) &&
       ((ptY(aPoint)) >= startingRow) && ((ptY(aPoint)) <= [self endingRow]))
     {
     selectionPt = aPoint;
     return YES;
     }

  else
     return NO;
  }
```

```
- selectionItem
 {
 return selectionItem;
 }



- selectionItem:anId
 {
 selectionItem = anId;
 return self;
 }


- updateSelectionItem
 {
 if (selectionItem)
    {
    if (!(allowMultipleSelection && ([multipleSelectionList size] > 0)) )
       {
       [selectionItem unHighlight];
       if ([self visible])
          [self display:selectionItem];
       }
    }
 else
    [baseLayer grabKeyboardFocus:self];

 if (data)
    [self selectionItem:[[values at:(ptX(selectionPt)-startingSet)]
       at:(ptY(selectionPt)-startingRow)]];
else
    [self selectionItem:[values at:(ptX(selectionPt)-startingSet)]];

 [selectionItem highlight];
 if ([self visible])
    [self display:selectionItem];

 if (parent)
    {
    [parent hasSelection:YES];
    if (!([self visible]))
       [parent updateSelectionArea:self];
    }
 else
    {
    id aQuad = [Quad extent:[selectionItem extent]];
    [aQuad origin:ptPlus([selectionItem origin],[self origin])];
    [[self backLayer] updateSelectionArea:aQuad];
    aQuad = [aQuad free];
    }

 [self changed:@selector(updateSelectionItem)];
 return self;
 }


- loseKeyboardFocus
 {
 [baseLayer releaseKeyboardFocus:self];

 if (allowMultipleSelection)
    [self resetMultipleSelectionList];
```

```
[selectionItem unHighlight];
if ([self visible])
   [self display:selectionItem];
selectionItem = nil;
selectionPt = pt(0,0);

if (parent)
   [parent hasSelection:NO];

return self;
}


- findString:(STR)aString
{
short targetRow;

if (data)
   {
   targetRow = [data find:aString beginningAtRow:(ptY(selectionPt))
                      Col:(ptX(selectionPt))];
   if ([self containsSelectionPt:pt((ptX(selectionPt)),targetRow)])
      [self updateSelectionItem];
   else
      [parent findSelectionItem:pt((ptX(selectionPt)),targetRow)];
   }
return self;
}



- (BOOL)processEvent
{
if ( (!(event.code == KEYBOARDEVENT)) || ([self processKey] == nil) )
   return [super processEvent];
else
   return YES;
}

- PRIVATE processKey
{
if (parent)          // condition for REPLAYER
   {
   if (!([parent hasSelection]))
      return self;
   }
else                 // condition for LISTBOX
   if (!(selectionItem))
      return self;

if (isprint (event.ascii))
   {
   char temp[2];
   temp[0]=event.ascii;
   temp[1]=0;
   [self findString:temp];
   if ((allowMultipleSelection) && ([multipleSelectionList size]>0))
      [self resetMultipleSelectionList];
   }
else
   switch(event.ascii)
      {
      case '\000' :   /* forwardspace or backwardspace or up or down*/
      {
```

```
        if ( (allowMultipleSelection) && ([multipleSelectionList size]>0) &&
             (event.scanCode == LEFT_SCANCODE ||
              event.scanCode == RIGHT_SCANCODE ||
              event.scanCode == UP_SCANCODE ||
              event.scanCode == DOWN_SCANCODE) )
           [self resetMultipleSelectionList];

        if (event.scanCode == RIGHT_SCANCODE)
        {
        if (ptX(selectionPt) < [self endingSet])
           {
           selectionPt = ptPlus(selectionPt,pt(1,0));
           [self updateSelectionItem];
           }
        else [parent findSelectionItem:(ptPlus(selectionPt,pt(1,0)))];
        }
        else if (event.scanCode == LEFT_SCANCODE)
        {
        if (ptX(selectionPt) > startingSet)
           {
           selectionPt = ptMinus(selectionPt,pt(1,0));
           [self updateSelectionItem];
           }
        else [parent findSelectionItem:(ptMinus(selectionPt,pt(1,0)))];
        }

        else if (event.scanCode == UP_SCANCODE)
        {
        if (ptY(selectionPt) > startingRow)
           {
           selectionPt = ptMinus(selectionPt,pt(0,1));
           [self updateSelectionItem];
           }
        else [parent findSelectionItem:(ptMinus(selectionPt,pt(0,1)))];
        }
        else if (event.scanCode == DOWN_SCANCODE)
        {
        if (ptY(selectionPt) < [self endingRow])
           {
           selectionPt = ptPlus(selectionPt,pt(0,1));
           [self updateSelectionItem];
           }
        else [parent findSelectionItem:(ptPlus(selectionPt,pt(0,1)))];
        }
        }
        break;
   }
  return self;
  }

- (BOOL)leftButtonDown
  {
  short index,numElements,numColumns;
  BOOL found;
  PT oldSelectionPt;

  found = NO;
  numColumns = [values size];

  for (index=0;index<numColumns && (!found);index++)
      if (data)
         {
         if ( ((ptX(event.origin))>=([[[values at:index] at:0] left]
                                  +[self left]) ) &&
```

```
          ((ptX(event.origin))<=([[[values at:index] at:0] left]
                                  +[self left]+[columnWidths intAt:index])))
          found = YES;
      }
    else
      {
      if ( ((ptX(event.origin))>=([[values at:index] left]+[self left])) &&
          ((ptX(event.origin))<=([[values at:index] right]+[self left])) )
        found =  YES;
      }

if (!found) return NO;

found = NO;

if (selectionItem)
   oldSelectionPt = selectionPt;
else
   oldSelectionPt = pt(-1,-1);

selectionPt = pt(startingSet+index-1,0);

if (data)
   numElements = [[values at:((ptX(selectionPt)) - startingSet)] size];
else
   numElements = 1;

for (index=0;index<numElements && (!found);index++)
    if (data)
      {
      if ( ((ptY(event.origin))>=([[[values at:((ptX(selectionPt))
             -startingSet)] at:index] top]+[self top])) &&
          ((ptY(event.origin))<=([[[values at:((ptX(selectionPt))
             -startingSet)] at:index] bottom]+[self top])) )
          found = YES;
      }
    else
      {
       if ( ((ptY(event.origin))>=     alues at:((ptX(selectionPt))
             -startingSet)] top]+[self top])) &&
           ((ptY(event.origin))<=([[values at:((ptX(selectionPt))
             -startingSet)] bottom]+[self top])))
         found =  YES;
       }

 if (!found) return NO;

 selectionPt = pt(ptX(selectionPt),startingRow+index-1);

 if (ptIsEqual(oldSelectionPt,selectionPt))
    return [self doubleClick];

 [self updateSelectionItem];
 if (allowMultipleSelection)
    {
    if (event.scanCode == SHIFT_SCANCODE)
       [multipleSelectionList add:selectionItem];
    else if ([multipleSelectionList size]>0)
       [self resetMultipleSelectionList];
    }
 return YES;
 }
```

```
- multipleSelectionList
  {
  return multipleSelectionList;
  }


- resetMultipleSelectionList
  {
  short index;

  if (multipleSelectionList)
     {
     for (index=0;index<[multipleSelectionList size];index++)
         {
         if (!([multipleSelectionList at:index]==selectionItem))
            {
            [[multipleSelectionList at:index] unHighlight];
            if ([self visible])
               [self display:[multipleSelectionList at:index]];
            }
         }
     multipleSelectionList = [multipleSelectionList free];
     }

  multipleSelectionList = [OrdCltn new];
  return self;
  }


- allowMultipleSelection:(BOOL)aBooleanValue
  {
  allowMultipleSelection = aBooleanValue;
  if (allowMultipleSelection)
     [self resetMultipleSelectionList];
  return self;
  }


- (BOOL)allowMultipleSelection
  {
  return allowMultipleSelection;
  }

- formatted:(BOOL)aFlag
  {
  formatted = aFlag;
  return self;
  }


- (BOOL)formatted
  {
  return formatted;
  }


- (unsigned)columnOffset
  {
  return columnOffset;
  }
```

```
- columnOffset:(unsigned)anOffset
  {
  columnOffset = anOffset;
  return self;
  }



-(PT)defaultExtent {
    return pt(50,100);
}


-(int)spaceBetweenColumns {
    return SPACEBETWEENCOLUMNS;
}
-template: aDataAreaTemplate {
    template = aDataAreaTemplate;
    [self preformat];
    return self;
}



-data: aData {
    data = aData;
    [self preformat];
    return self;
}


-preformat {

    if ( template == nil ) return self;

    [self reinitialize];
    [self getTitleFont];
    [self getValueFont];
    [self calculateLayout];

    return self;
}


-format {
    if (!(formatted))
        {
        [self createParts];
        [self layOutParts];
        [self formatted:YES];
        }

    return self;
}


-setTextColor:aColor {
   int size, i;
```

```
    size = [titles size];
    for(i=0; i<size; i++ )
        [[titles at: i] color:aColor];

    size = [values size];
    for(i=0; i<size; i++ )
        {
        if (data)
            [[values at: i] elementsPerform:@selector(color:) with:aColor];
        else [[values at: i] color:aColor];
        }
    return self;
}


-insideColor:aColor {
    int size, i;

    size = [titles size];
    for(i=0; i<size; i++ )
        [[titles at: i] backgroundColor:aColor];

    size = [values size];
    for(i=0; i<size; i++ )
        {
        if (data)
            [[values at: i] elementsPerform:@selector(backgroundColor:)
               with:aColor];
        else [[values at: i] backgroundColor:aColor];
        }
    return [super insideColor:aColor];
}


-setValueFont {
    int size, i;
    size = [values size];
    for(i=0; i<size; i++ )
        {
        if (data)
            [[values at: i] elementsPerform:@selector(font:) with:valueFont];
        else [[values at: i] font: valueFont];
        }
    return self;
}


-setTitleFont {
    int size, i;
    size = [titles size];
    for(i=0; i<size; i++ )
        [[titles at: i] font: titleFont];
    return self;
}


-layOutParts {
    [self layOutTitles];
    [self layOutValues];
    return self;
```

```
}

-layOutTitles {
    int i, size, titleTop, position;

    titleTop = [titleFont height];
    size = [titles size];

    switch ([[template titleAttributes] justification])
      {
       case JLEFT: for ( i=0; i< size; i++)
                    [[titles at: i] origin:pt([columnLeftPixels intAt:i],
                                                                    titleTop)];
                   break;
       case JCENTER:
                   for ( i=0; i< size; i++)
                      {
                       position = [columnLeftPixels intAt: i]+
                                              ([columnWidths intAt:i]/2);
                       [[titles at:i] center:pt(position,titleTop)];
                      }
                   break;
       default:    for ( i=0; i< size; i++)
                      {
                       [[titles at:i] right:[columnLeftPixels intAt:i]+
                                          [columnWidths intAt: i] - 1];
                       [[titles at:i] top:titleTop];
                      }
                   break;
      }

    return self;
}


-layOutValues {
    if (data)
        [self layOutReportValues];
    else [self layOutTemplateValues];
    return self;
}


-layOutTemplateValues {
    int i, size, dataTop, position;
    unsigned justification;

    dataTop =  [titleFont height] + [self lineHeight];
    size = [values size];

    for ( i=0; i< size; i++)
      {
       justification = [template valueJustificationAt:i];

       if (justification == JDEFAULT)
          justification = [template isTextAt:i] ? JLEFT : JDECIMAL;

       switch (justification)
          {
           case JRIGHT:
           case JDECIMAL: [[values at: i] right:
                                 [columnLeftPixels intAt: i]+
                                           [columnWidths intAt: i] - 1];
```

```
                        [[values at: i] top: dataTop];
                        break;
            case JLEFT:   [[values at: i]
                               origin:pt([columnLeftPixels intAt:i],dataTop)];
                        break;
            case JCENTER: position = [columnLeftPixels intAt:i]+
                                          ([columnWidths intAt: i]/2);
                        [[values at: i] center: pt(position, dataTop)];
                        [[values at: i] top: dataTop];
                        break;
        }
    }

    return self;
}



-layOutReportValues {
    register int j,i;
    int      size, numElements, left, itemTop, rightEdge,widthOfTrailingDigits;
    int      dataTop, heightOfData, heightOfTitle, position, trailingDigits;
    int      maxTrailingDigits, stdWidthOfTrailingDigits;
    id       set, dispText;
    unsigned justification;
    char     *decimal, *str;

    if ([titles size] > 0)
       heightOfTitle = [titleFont height] * 2;
    else
       heightOfTitle = 0;

    heightOfData = [self lineHeight];

    size = [values size];
    numElements = [[values at: 0] size];

    for(i = 0; i<size; i++ )
       {
        justification = [template valueJustificationAt:i+startingSet];

        if (justification == JDEFAULT)
           justification = [template isTextAt:i+startingSet]? JLEFT : JDECIMAL;

        switch (justification)
          {
           case JLEFT:    left = [columnLeftPixels intAt: i];
                          itemTop = heightOfTitle;
                          set = [values at:i];
                          for ( j=0; j<numElements; j++)
                             {
                              [[set at:j] origin: pt(left, itemTop)];
                              itemTop += heightOfData;
                             }
                          break;
           case JCENTER:  left = [columnLeftPixels intAt: i];
                          itemTop = heightOfTitle;
                          position = left+([columnWidths intAt: i]/2);
                          set = [values at:i];
                          for ( j=0; j<numElements; j++)
                             {
                              dispText = [set at:j];
                              [dispText center: pt(position, itemTop)];
```

```
                    [dispText top: itemTop];
                    itemTop += heightOfData;
                  }
                break;
        case JRIGHT:    left = [columnLeftPixels intAt: i];
                itemTop = heightOfTitle;
                rightEdge = left + [columnWidths intAt:i]-1;
                set = [values at:i];
                for ( j=0; j<numElements; j++)
                  {
                   dispText = [set at:j];
                   [dispText right:rightEdge];
                   [dispText top:itemTop];
                   itemTop += heightOfData;
                  }
                break;
        case JDECIMAL: left = [columnLeftPixels intAt: i];
                itemTop = heightOfTitle;
                rightEdge = left + [columnWidths intAt:i]-1;
                set = [values at:i];
                maxTrailingDigits = 0;
                for ( j=0; j<numElements; j++)
                  {
                   str = [[set at:j] str];
                   if (decimal = (char *)strrchr (str, '.'))
                      trailingDigits = str+strlen(str)-decimal-1;
                   else
                      trailingDigits = 0;
                   maxTrailingDigits =
                          (trailingDigits > maxTrailingDigits) ?
                               trailingDigits : maxTrailingDigits;
                  }
               for ( j=0; j<numElements; j++)
                  {
                   dispText = [set at:j];
                   str      = [dispText str];
                   stdWidthOfTrailingDigits = strcmp(str,"N/A")?
                            [[dispText font]
                                 widthOf:"9"]*maxTrailingDigits:0;
                   if (decimal = (char *)strrchr (str, '.'))
                      {
                       trailingDigits = str+strlen(str)-decimal-1;
                       widthOfTrailingDigits =
                             [[dispText font] widthOf:decimal+1];
                      }
                   else
                      widthOfTrailingDigits = 0;
                   [dispText right:rightEdge -
                               stdWidthOfTrailingDigits +
                               widthOfTrailingDigits];
                   [dispText top:itemTop];
                   itemTop += heightOfData;
                  }
               break;
         }
      }
   return self;
}

-createReportParts {
   id   templateTitles, valueFormats;
   int  c,r;
   id   nextCltn;
   BOOL newFlag;
   char formatBuffer [100];
```

```
    newFlag = NO;
    if (!(values)) newFlag = YES;

    if (newFlag) titles = [OrdCltn new];
    if (newFlag) values = [OrdCltn new];

    templateTitles = [template titles];

    for( c = 0; c < numberOfColumns; c++) {
        if ((newFlag) && ([templateTitles size] > c))
           [titles add: [DispText str: [[templateTitles at: c+startingSet] str]
                font:titleFont]];
        if (newFlag)
                [values add: nextCltn = [OrdCltn new]];
        else    nextCltn = [values at:c];
          if ( [data isTextAt: c+startingSet] ) {
            [self textDataFormatSTR:[template textValueFormatAt:c+startingSet
                                                      buffer:formatBuffer]
                data:data set: c+startingSet toCltn:nextCltn];
        } else {
            [self floatDataFormatSTR:[template floatValueFormatAt:c+startingSet
                                                      buffer:formatBuffer]
                data:data set:c+startingSet toCltn:nextCltn];
        }
    }

    return self;
}


-createTemplateParts {
    id templateTitles, valueFormats;
    int i, size, c;

    titles = [OrdCltn new];
    values = [OrdCltn new];

    templateTitles = [template titles];
    valueFormats = [template values];

    for( c = 0; c < numberOfColumns; c++) {
        if ([templateTitles size] > c)
           [titles add: [DispText str: [[templateTitles at: c+startingSet] str]
                font:titleFont]];
        [values add: [[DispText str: [[valueFormats at: c+startingSet] str]]
             font: valueFont]];
    }
    return self;
}


-createParts {
     if (data) [self createReportParts];
     else [self createTemplateParts];
     return self;
}

-calculateColumnPositions:(int)total    h {
    int space, i, size, nextColumn;

    if ( columnLeftPixels) [columnLeftPixels free];
    columnLeftPixels = [IntOrdCltn new];
```

```
    size = [columnWidths size];

    space = ([self width] - totalWidth) / (size+1);

    nextColumn = space;
    for( i=0; i<size; i++) {
        [columnLeftPixels addInt: nextColumn];
        nextColumn = nextColumn + space + [columnWidths intAt: i];
    }
    return self;
}

-getTitleFont {
    id titleAttributes;

    if (parent)
       titleFont = [parent dataAreaTitleFont];
    else
       {
        titleAttributes = [template titleAttributes];
        titleFont = [SmartFont fontName:[titleAttributes fontName]];
       }

    return self;
}


-getValueFont {
    int i, size;
    id valueAttributes;

    if (parent)
       valueFont = [parent dataAreaValueFont];
    else
       {
        valueAttributes = [template valueAttributes];
        valueFont = [SmartFont fontName:[valueAttributes fontName]];
       }

    return self;
}


-updateDataAreaForRemove {

    [titles removeAt: [self columnOffset]];
    [values removeAt: [self columnOffset]];
    [self calculateLayout];
    [self layOutParts];
    return self;
}


-updateDataAreaForAdd {

    int size;
    id templateTitles, templateFormats;

    templateTitles = [template titles];
    templateFormats = [template values];
    size = [templateTitles size];
    [titles at:[self columnOffset] insert: [[DispText str: [[templateTitles at: [self columnOffset]] str]]
       font: titleFont]];
    [values at:[self columnOffset] insert: [[DispText str: [[templateFormats at: [self columnOffset]] str]]
       font: valueFont]];
```

```
    [self calculateLayout];
    [self layOutParts];
    return self;
}


-updateDataAreaForReplace {

    int size;
    id templateTitles, templateFormats;
    templateTitles = [template title
    templateFormats = [template values];
    size = [templateTitles size];
    [[titles at:[self columnOffset] put: [[DispText str: [[templateTitles at: [self columnOffset]] str]]
        font: titleFont]] free];
    if (!(data))
        {
        [[values at:[self columnOffset] put: [[DispText str: [[templateFormats at: [self columnOffset]] str]]
                font: valueFont]] free];
        }
    else [self createReportParts];
    [self calculateLayout];
    [self layOutParts];
    return self;
}


-floatDataFormatSTR:(STR)aFormat data:aData set:(unsigned)aSet toCltn:aCltn {
    int    i, size;
    char   buffer [100], *firstNonBlank, *lastPercent, *m, *b;
    NUMBER scaleFactor;

    lastPercent = strrchr (aFormat,'%');

    if (((b=strrchr(aFormat,'b')) || (b=strrchr(aFormat,'B'))) &&
        (b > lastPercent))
       scaleFactor = 1000000000.000000;
    else
       if (((m=strrchr(aFormat,'m')) || (m=strrchr(aFormat,'M'))) &&
           (m > lastPercent))
          scaleFactor = 1000000.000000;
       else
          scaleFactor = 1.000000;

    for( i = startingRow; i < startingRow + numberOfRows; i++)
       {
        [data sprintfFloatInSet:aSet row:i formatSTR:aFormat
                                 scaleFactor:scaleFactor
                                      buffer:buffer];

        for (firstNonBlank = buffer;isspace(*firstNonBlank); firstNonBlank++);

        if (!([aCltn size]+startingRow > i))
           [aCltn add:[DispText str:firstNonBlank font:valueFont]];
        else
           [[aCltn at:i-startingRow] assignSTR:firstNonBlank];
       }

    return self;
}
```

```
-textDataFormatSTR:(STR)aFormat data:aData set: (unsigned)aSet toCltn:aCltn {
    int i, size;
    char buffer [100];
    id   sharString;

    for( i = startingRow; i < startingRow + numberOfRows; i++)
      {
       [data sprintfTextInSet:aSet row:i formatSTR:aFormat buffer:buffer];

       if ([aCltn size]+startingRow <= i)
          [aCltn add:[DispText str:buffer font:valueFont]];
       else
          [[aCltn at:i-startingRow] assignSTR:buffer];
       }

    return self;
}


-calculateHeight
  {
    int heightOfData, heightOfTitle;
    int myHeight;
    int areaForValues;

    heightOfData = [self lineHeight];

    if ([titles size])
       heightOfTitle = [titleFont height] * 2;
    else
       heightOfTitle = 0;

    areaForValues = numberOfRows*heightOfData;

    myHeight = areaForValues + heightOfTitle;

    [self height:myHeight];
  }


-calculateRows {
    int i, size;
    int heightOfData, heightOfTitle;
    int myHeight;
    int areaForValues;

    myHeight = [self height];
    heightOfData = [self lineHeight];

    if ([[template titles] size] > 0)
       heightOfTitle = [titleFont height] * 2;
    else
       heightOfTitle = 0;

    areaForValues = myHeight - heightOfTitle;

    numberOfRows = areaForValues/heightOfData;

    if (numberOfRows > [[data at: 0] nRows] - startingRow)
        numberOfRows = [[data at: 0] nRows] - startingRow;

    return self;
}
```

```
-calculateWidth
 {
  int i;
  int widthOfData, widthOfTitle, columnWidth;
  int myWidth, totalWidth = 0;

  myWidth = SPACEBETWEENCOLUMNS;

  if (columnWidths)
     columnWidths = [columnWidths free];

  columnWidths = [IntOrdCltn new];

  for (i = startingSet; i <= [self endingSet]; i++)
    {
     widthOfData  = [valueFont widtnOf: [[[template values] at: i] str]];

     if ([[template titles] size])
        widthOfTitle = [valueFont widthOf: [[[template titles] at: i] str]];
     else
        widthOfTitle = 0;

     if ( widthOfData > widthOfTitle )
        columnWidth = widthOfData;
     else
        columnWidth = widthOfTitle;

     [columnWidths addInt:columnWidth];

     myWidth += columnWidth;

     totalWidth += columnWidth;
    }

  numberOfColumns = [columnWidths size];

  [self width:myWidth];

  [self calculateColumnPositions:totalWidth];

  return self;
 }


-calculateColumns {
   register int i, size;
   register int widthOfData, widthOfTitle, columnWidth;
   register int nextColumn;
   register int myWidth, totalWidth = 0;

   id  templateTitles,
       templateValues;

   myWidth = [self width];

   nextColumn = SPACEBETWEENCOLUMNS;

   if (columnWidths)
      columnWidths = [columnWidths free];

   columnWidths = [IntOrdCltn new];

   size = [[template values] size];
```

```
    templateTitles = [template titles];
    templateValues = [template values];

    numberOfColumns = 0;

    if (size > 0)
      {
       columnWidth = 0;

       for (i = startingSet; (i < size) &&
                                (nextColumn + columnWidth < myWidth); i++)
         {
          widthOfData = [valueFont widthOf:[[templateValues at:i] str]];

          if (templateTitles != nil)
             widthOfTitle = [valueF    widthOf:[[templateTitles at:i] str]];
          else
             widthOfTitle = 0;

          if (widthOfData > widthOfTitle)
             columnWidth = widthOfData;
          else
             columnWidth = widthOfTitle;

          if (nextColumn + columnWidth < myWidth)
             {
              [columnWidths addInt:columnWidth];
              nextColumn += columnWidth;
              totalWidth += columnWidth;
              numberOfColumns++;
             }
         }

       if ([columnWidths size] == 0)
         {
          columnWidth = myWidth-nextColumn;
          if (columnWidth < 0)
              columnWidth = 0;
          [columnWidths addInt:columnWidth];
          totalWidth += columnWidth;
          numberOfColumns++;
         }

       [self calculateColumnPositions:totalWidth];
    }
    else
        numberOfColumns = 0;

    return self;
}

-calculateLayout {
    [self calculateColumns];
    if (data) [self calculateRows];
    return self;
}

-startingSet:(int)theStartingSet startingRow:(int)theStartingRow
    data: aData{

    startingSet = theStartingSet;
    startingRow = theStartingRow;

    [self data: aData];
```

```
    return self;
}


-displayLayer {
    register int j, i, numElements, size;
    id  set, dispText;

    if (!formatted)
       [self format];
    size = [values size];

    if (data)
       {
       for ( i=0; i<size; i++) {
           if ((titles != nil) && ([titles size] > i))
              [self display: [titles at:i]];
           set = [values at:i];
           numElements = [set size];
           for ( j=0; j<numElements; j++)
              {
               dispText = [set at:j];
               [self display:dispText];
              }
           }
       }
    else{
       for ( i=0; i<size; i++) {
           [self display: [titles at: i]];
           [self display: [values at: i]];
           }
       }
    return self;
}


-update: anObject because: (SEL)aSelector {
    PT dataAreaSize;

    if (anObject == template) {
        if ( aSelector == @selector(valueJustification:at:) ||
                aSelector == @selector(titleJustification:) ||
                aSelector == @selector(valueJustification:)) {
            [self layOutParts];
            if (self == [parent currentDA]) [self  display];
        } else if ( aSelector == @selector(borderWidth:)) {
            if (self == [parent currentDA])
                    [self erase];
            [self borderWidth: [template borderWidth]];
            if (self == [parent currentDA])
                    [self show];
        } else if ( aSelector == @selector(ascendingSort) ||
               aSelector == @selector(descendingSort) ||
               aSelector == @selector(normalSort)) {
            if ((data) && (formatted))
               {
               [data sortTable:[template sortType] column:[template sortColumn]];
               [self formatted:NO];
               if (selectionItem)
                  [self loseKeyboardFocus];
               [self calculateLayout];
               [self format];
```

```
            if (self == [parent currentDA]) [self display];
            }
        } else if ( aSelector == @selector(free)) template = nil;
    }

    [super update: anObject because: aSelector];
    return self;
}


=:


/*===================== DO NOT REMOV   EDIT ============================

        This comment and the following sccsId declaration are managed
        by SCCS for you. Do not edit or remove either.

        Source file:    /users/bmw/Alpha/Reports/SCCS/s.RepDataArea.m
        Latest version: 1.2
        Last mod time:  09/04/89 at 20:04:16

=======================================================================*/

static char *sccsId = "@(#)RepDataArea.m rev 1.2 created on 09/04/89 at 20:04:16";

/*===================== DO NOT REMOVE OR EDIT ==========================*/

#include "objc.h"
#include "uil.h"
#include "string.h"
#include "BMWGlobal.h"

@requires CharString,TextUnit,TextAtt,OrdCltn,IntOrdCltn,CSMore;

char * strchr();

= ReportDataArea:DataArea(BM_WorkstationMsgs,UIMESSAGES)
  {
  id columnSpacing;     // IntOrdCltn, Column Spacing
  id rowSpacing;        // IntOrdCltn, Row Spacing

  BOOL columnDefaultSpacing;
  BOOL rowDefaultSpacing;

  id titles;            // OrdCltn of CharStrings, report titles
  id titleAttributes;   // TextAtt, title attributes
  id values;            // OrdCltn of CharStrings, report value formats
  id valueAttributes;   // TextAtt, value  attributes
  id valueJustifications;
                        // IntOrdCltn of justifications for each set of data
 unsigned columnOffset;
                      . // dataset offset
  }


- PRIVATE getFormatString:oneColumnStrMatrix formatChar:(STR)aChar
  {
  int maxStringLength,index,length;
  id formatString,string;
```

```
maxStringLength = 0;
for (index = [oneColumnStrMatrix size] - 1; index >= 0; index--)
    if ((string = [oneColumnStrMatrix at:index]) &&
        ((length = [string length]) > maxStringLength))
        maxStringLength = length;

formatString = [CSMore str:""];
while (maxStringLength--)
    [formatString concatSTR:aChar];

return formatString;
}



+ defaultStringDataArea:oneColumnStringMatrix  addTitle:aTitle
{
id formatString;

self = [self new];
formatString = [self getFormatString:oneColumnStringMatrix formatChar:"x"];
[self addTitle:aTitle addValue:formatString];
return self;
}



- (unsigned)columnOffset
{
return columnOffset;
}



- columnOffset:(unsigned)anOffset
{
columnOffset = anOffset;
return self;
}


- initialize
{
[super initialize];
columnDefaultSpacing = YES;
rowDefaultSpacing = YES;

[self titleAttributes: [self defaultTitleAttributes]];
[self valueAttributes: [self defaultValueAttributes]];
titles = [OrdCltn new];
values = [OrdCltn new];
valueJustifications = [IntOrdCltn new];

return self;
}



- defaultTitleAttributes
{
return [[[[TextAtt new] bold: YES] underline: YES] justification:JCENTER];
}
```

```
- defaultValueAttributes
  {
  return [[TextAtt new] justification:JDECIMAL];
  }


- (unsigned) numDataSets
  {
  return [titles size];
  }


- (BOOL)defaultColumnSpacing
  {
  return columnDefaultSpacing;
  }


- (BOOL)isIntAt:(unsigned)anIndex

  {
  return NO;
  }


- (BOOL)isFloatAt: (unsigned)anIndex
  {
  char *format;
  char *decimal;

  format = [[values at: anIndex] str];
  decimal = strchr(format, '#');
  if (decimal == (char *)0)
     return NO;
  return YES;
  }


- (BOOL)isTextAt: (unsigned)anIndex
  {
  char *format;
  char *help;

  format = [[values at: anIndex] str];
  help = strchr(format, 'x');
  if (help == (char *)0)
     return NO;
  return YES;
}


- (BOOL)rowColumnSpacing
  {
  return columnDefaultSpacing;
  }


- titles
  {
  return titles;
  }
```

```
- values
 {
 return values;
 }


- (STR)textValueFormatAt:aSetNumber buffer:(STR)buffer
 {
 [self textConvert:[values at:aSetNumber] intoCFormatSTR:buffer];
 return buffer;
 }


- (STR)floatValueFormatAt:aSetNumber buffer:(STR)buffer
 {
 [self floatConvert:[values at:aSetNumber] intoCFormatSTR:buffer];
 return buffer;
 }


- floatConvert: stringFormat intoCFormatSTR:(STR)cFormatSTR
 {
 int i, size, count, pointcount;

size = [stringFormat length];

// Assumes at least one # before '.'
cFormatSTR[0] = 0;

i = 0; count = 0; pointcount = 0;
while( i<size && [stringFormat charAt: i] != '#')
   {
   sprintf(cFormatSTR+strlen(cFormatSTR), "%c", [stringFormat charAt:i]);
   i++;
   }
while ( i<size && [stringFormat charAt: i] == '#')
   {
   count++; i++;
   }
if ([stringFormat charAt: i] == '.')
   {
   i++;
   while ( i<size && [stringFormat charAt: i] == '#')
      {
      pointcount++; i++;
      }
   }
if ( count > 0 || pointcount > 0)
   {
   sprintf(cFormatSTR+strlen(cFormatSTR), "%%");
   sprintf(cFormatSTR+strlen(cFormatSTR), "%d", count);
   sprintf(cFormatSTR+strlen(cFormatSTR), ".");
   sprintf(cFormatSTR+strlen(cFormatSTR), "%d", pointcount);
   sprintf(cFormatSTR+strlen(cFormatSTR), "f");
   }
while( i<size )
   {
   sprintf(cFormatSTR+strlen(cFormatSTR), "%c", [stringFormat charAt:i]);
   i++;
   }
return self;
}
```

```
- textConvert: stringFormat intoCFormatSTR:(STR)cFormatSTR
 {
 int i, size, count;

 size = [stringFormat length];

 i = 0; count = 0;

 cFormatSTR[0] = 0;

 while( i<size && [stringFormat charAt: i] != 'x')
   {
   sprintf(cFormatSTR+strlen(cFormatSTR), "%c", [stringFormat charAt:i]);
   i++;
   }
 while ( i<size && [stringFormat charAt: i] == 'x')
   {
   count++; i++;
   }
 if ( count > 0 )
   {
   sprintf(cFormatSTR+strlen(cFormatSTR), "%%");
   sprintf(cFormatSTR+strlen(cFormatSTR), ".");
   sprintf(cFormatSTR+strlen(cFormatSTR), "%d", count);
   sprintf(cFormatSTR+strlen(cFormatSTR), "s");
   }
 while( i<size )
   {
   sprintf(cFormatSTR+strlen(cFormatSTR), "%c", [stringFormat charAt:i]);
   i++;
   }
 return self;

   }



 - titleAttributes
   {
   return titleAttributes;
   }


 - valueAttributes
   {
   return valueAttributes;
   }


 - (unsigned)valueJustificationAt:(unsigned)i
   {
   return (unsigned)[valueJustifications intAt:i];
   }



 - replaceTitle: aTitle replaceValue: aValue at:(int)i
   {
   [[titles at:i put: aTitle] free];
   [[values at:i put: aValue] free];
```

```
[self columnOffset:i];
[self changed: @selector(replaceTitle:replaceValue:at:)];

return self;
}


- addTitle: aTitle addValue: aValue at:(int)i
{
[titles at:i insert: aTitle];
[values at:i insert: aValue];
[valueJustifications at:i addInt:(int)JDEFAULT];
[self columnOffset:i];
[self changed: @selector(addTitle:addValue:at:)];

return self;
}


- addTitle: aTitle addValue: aValue
{
[titles add: aTitle];
[values add: aValue];
[valueJustifications addInt:(int)JDEFAULT];
[self changed: @selector(addTitle:addValue:)];
return self;
}

- removeDataSetAt: (int)i
{
[[titles removeAt: i] free];
[[values removeAt: i] free];
[self columnOffset:i];
[self changed: @selector(removeDataSetAt:)];

return self;
}


- titleAttributes: aTextAttribute
{
if (titleAttributes)
   [titleAttributes removeDependent: self];
titleAttributes = aTextAttribute;
[titleAttributes addDependent: self];
[self changed: @selector(titleAttribute:)];

return self;
}


- valueAttributes: aTextAttribute
{
if (valueAttributes)
   [valueAttributes removeDependent: self];
valueAttributes = aTextAttribute;
[valueAttributes addDependent: self];
[self changed: @selector(valueAttribute:)];

return self;
}
```

```
- titleFontName: (STR)aFontName
{
[titleAttributes fontName: aFontName];
return self;
}

- titleBold: (BOOL)aBool
{
[titleAttributes bold: aBool];
return self;
}

- titleItalics: (BOOL)aBool
{
[titleAttributes italics: aBool];
return self;
}

- titleUnderline:(BOOL)aBool
{
[titleAttributes underline: aBool];
return self;
}

- titlePointSize:(short)aPointSize
{
[titleAttributes pointSize: aPointSize];
return self;
}

- titleJustification:(unsigned)justification
{
[titleAttributes justification:justification];
return self;
}

- valueFontName: (STR)aFontName
{
[valueAttributes fontName: aFontName];
return self;
}

- valueBold: (BOOL)aBool
{
[valueAttributes bold: aBool];
return self;
}

- valueItalics: (BOOL)aBool
{
[valueAttributes italics: aBool];
return self;
}
```

```
- valueUnderline:(BOOL)aBool
  {
  [valueAttributes underline: aBool];
  return self;
  }


- valuePointSize:(short)aPointSize
  {
  [valueAttributes pointSize: aPointSize];
  return self;
  }


- valueJustification:(unsigned)justification at:(unsigned)i
  {
  [valueJustifications at:i putInt:(int)justification];
  [self changed: @selector(valueJustification:at:)];
  return self;
  }


- update: anObject because: (SEL)aSelector
  {
  if (anObject == titleAttributes)
     {
     if ( aSelector == @selector(fontName:))
        [self changed: @selector(titleFontName:)];
     if ( aSelector == @selector(bold:))
        [self changed: @selector(titleBold:)];
     if ( aSelector == @selector(italics:))
        [self changed: @selector(titleItalics:)];
     if ( aSelector == @selector(underline:))
        [self changed: @selector(tit'  ierline:)];
     if ( aSelector == @selector(pointSize:))
        [self changed: @selector(titlePointSize:)];
     if ( aSelector == @selector(justification:))
        [self changed: @selector(titleJustification:)];
     }
   else if (anObject == valueAttributes )
     {
     if ( aSelector == @selector(fontName:))
        [self changed: @selector(valueFontName:)];
     if ( aSelector == @selector(bold:))
        [self changed: @selector(valueBold:)];
     if ( aSelector == @selector(italics:))
        [self changed: @selector(valueItalics:)];
     if ( aSelector == @selector(underline:))
        [self changed: @selector(valueUnderline:)];
     if ( aSelector == @selector(pointSize:))
        [self changed: @selector(valuePointSize:)];
     if ( aSelector == @selector(justification:))
        [self changed: @selector(valueJustification:)];
     }
   [super update: anObject because: aSelector];
   return self;
   }


- terminate$
  {
  [titles freeContents];
  [titles free];
```

```
[titleAttributes free];

[values freeContents];
[values free];
[valueAttributes free];
[valueJustifications free];

return [super terminate$];
}


- awakeFrom: aFiler
{
[titleAttributes addDependent: self];
[valueAttributes addDependent: self];
return self;
}


- copy
{
id newDA;
short index;

newDA = [super copy];

newDA->columnSpacing = [columnSpacing copy];
newDA->rowSpacing = [rowSpacing copy];

newDA->titles = [OrdCltn new];
for (index=0;index<[titles size];index++)
    [newDA->titles add:[CharString str:[[titles at:index] str]]];
newDA->titleAttributes=[titleAttributes copy];
[newDA->titleAttributes addDependent:newDA];
[newDA changed:@selector(valueAttribute:)];

newDA->values = [OrdCltn new];
for (index=0;index<[values size];index++)
    [newDA->values add:[CharString str:[[values at:index] str]]];
newDA->valueAttributes = [valueAttributes copy];
[newDA->valueAttributes addDependent:newDA];
[newDA changed: @selector(valueAttribute:)];

newDA->valueJustifications = [IntOrdCltn new];
for (index=0;index<[valueJustifications size];index++)
    [newDA->valueJustifications addInt:[valueJustifications intAt:index]];

return newDA;
}

=:

/*==================== DO NOT REMOVE    EDIT ============================

        This comment and the following sccsId declaration are managed
        by SCCS for you. Do not edit or remove either.

        Source file:     /users/bmw/Alpha/Reports/SCCS/s.RepEdit.m
        Latest version:  1.6
        Last mod time:   09/13/89 at 14:57:31

=====================================================================*/
```

```
static char *sccsId = "@(#)RepEdit.m rev 1.6 created on 09/13/89 at 14:57:31";

/*==================== DO NOT REMOVE OR EDIT ==========================*/

#include "objc.h"
#include "uil.h"

@requires EventQ, ReportDAEdit, HeadEdit, FootEdit, Menu, PopUpMenu, Cursor;
@requires CSMore, CharString, BM_AskDialogBox, SDialogBox, SmartFont, OrdCltn;
@requires BM_BarMenu;

#define MAXVALUESIZE 20

static id _myMenu;

= ReportEdit:ReportLayer (BM_WorkstationMsgs, UIMESSAGES)
  {
  id template;
  id pageMenu;
  }


+ createInterfaceFor: aReport  parent:aParent
  {
  self = [self new];
  parent = aParent;

  [self document:aReport];
  [self template: [aReport template]];

  return self;
  }


+ dataLayerFactoryObject
  {
   return ReportDAEdit;
  }


- document:aReport
  {
  if (document)
     document = [document free];
  document = aReport;
  return self;
  }



- template: aReportTemplate
  {
  if (template)
     [template removeDependent: self];
  template = aReportTemplate;

  [template addDependent: self];
  [self format];

  return self;
  }
```

```
- freeParts
  {
  unsigned i;

  if (header)
     [[template header] removeDependent:header];

  if (footer)
     [[template header] removeDependent:footer];

  if (dataArea)
     {
     for (i = 0; i<[dataArea size]; i++)
         [[template dataArea] removeDependent:[dataArea at:i]];
     }

  return [super freeParts];
  }



- freeDataParts
  {
  unsigned i;

  if (dataArea)
     {
     for (i = 0; i<[dataArea size]; i++)
         [[template dataArea] removeDependent:[dataArea at:i]];

     dataArea = [dataArea freeContents];
     dataArea = [dataArea free];
     }

  pages = 0;
  currentPage = 0;
  currentDA = nil;

  [self createData];
  return self;
  }



- createParts
  {
  header = [[HeadEdit createInterfaceFor: [template header]
     report:document parent:self] attachTo: self];
  footer = [[FootEdit createInterfaceFor: [template footer]
     report:document parent:self] attachTo: self];
  return self;
  }

- setSize
  {
  [self borderWidth:[template reportBorderWidth]];
  [self extent:[template pageSize]];

  return self;
  }
```

```
- adjustParts
  {
  short width, heightOffset;

  width = [self width] - ([template rightMargin] + [template leftMargin]);
  [header width: width];
  [footer width: width];
  dataAreaSize = pt(width,([self height] - [template bottomMargin] -
     [template topMargin] - [header height] - [footer height]));

  heightOffset = [template bottomMargin];
  [header offset: pt([template leftMargin],[template topMargin])];
  dataAreaOrigin = pt([header left],[header adjacentBottom]);
  [footer offset: pt([template leftMargin], [self height]-
     [template bottomMargin]-[footer height])];

  return self;
  }



- updateMenu
  {
  [[[[[self defaultMenu] children] at:0] children]
     elementsPerform:@selector(receiver:) with:self];
  [[[[[_myMenu children] at:0] children] at:6] selectable:NO];
  [[[[[_myMenu children] at:0] children] at:7] selectable:YES];

  [[[[_myMenu children] at:1] children]
     elementsPerform:@selector(receiver:) with:self];
  [[[[_myMenu children] at:2] children]
     elementsPerform:@selector(receiver:) with:self];

  nextPageMenu = [[[[_myMenu children] at:0] children] at:0];
  previousPageMenu = [[[[_myMenu children] at:0] children] at:1];
  [self updatePageMenu];

  [header updateMenu];
  [footer updateMenu];
  [currentDA updateMenu];
  pageMenu = [currentDA defaultMenu];
  [[[pageMenu children] at:5] selectable:NO];
  [[[pageMenu children] at:7] selectable:NO];

  return self;
  }


- defaultMenu
  {
  id subMenu;

  if (!(_myMenu))
     {
     _myMenu = [Menu str: "Report Editor"];

  [_myMenu append:[self defaultVi[illegible]u]];

  [_myMenu append: subMenu = [Menu str: "Report"]];
  [subMenu append: [Menu str: "Page Size"
        selector: @selector(pageSizeFromUser) receiver: self]];
```

```
    [subMenu append: [Menu str: "Border Width"
          selector: @selector(borderFromUser) receiver: self]];
    [subMenu append: [Menu str: "Top Margin"
          selector: @selector(topMarginFromUser) receiver: self]];
    [subMenu append: [Menu str: "Bottom Margin"
          selector: @selector(bottomMarginFromUser) receiver: self]];
    [subMenu append: [Menu str: "Left Margin"
          selector: @selector(leftMarginFromUser) receiver: self]];
    [subMenu append: [Menu str: "Right Margin"
          selector: @selector(rightMarginFromUser) receiver: self]];

    [_myMenu append: [header defaultMenu]];
    [_myMenu append: [currentDA defaultMenu]];
    [_myMenu append: [footer defaultMenu]];
    }
  return [_myMenu shared$];
  }



- defaultBarMenu
  {
  return [BM_BarMenu createInterfaceFor:[self defaultMenu] client:self];
  }



- update: anObject because: (SEL)aSelector
  {
  id repWndw;
  PT oldOrigin;

  if (anObject == template)
     {
     if (aSelector == @selector(free))
        {
        template = nil;
        return self;
        }

     oldOrigin = [self outsideOrigin];
     if (aSelector == @selector(pageSize:))
        [self format];
     else  if ( aSelector == @selector(reportBorderWidth:))
        [self borderWidth: [template reportBorderWidth]];
     else  if (aSelector == @selector(topMargin:) ||
           aSelector == @selector(bottomMargin:) ||
           aSelector == @selector(rightMargin:) ||
           aSelector == @selector(leftMargin:))
        [self format];

     repWndw = parent;
     [repWndw erase];
     [self outsideOrigin:oldOrigin];
     [repWndw width:[self outsideWidth]+22];
     [repWndw height:[self outsideHeight] + [[repWndw titleBar] outsideHeight]
        + [[repWndw barMenu] outsideHeight]
        + [[repWndw horizontalBar] outsideHeight]+22];
     [repWndw show];
     }
```

```
return [super update: anObject because: aSelector];
}



- modifyAttributes:aMenuItem
{
id userFont;

userFont = [CharString str:[[aMenuItem menu] str]];
[[template defaultTextAttributes] fontName:[userFont str]];
[userFont free];

return self;
}



- borderFromUser
{
id pointStr, response;

pointStr = [CSMore fromInt: [template reportBorderWidth]];
response = [BM_AskDialogBox askSTR:"Enter border width:"
   defaultValue:[pointStr str] client:self];
if (response)
   {
   [template reportBorderWidth:atoi([response str])];
   [response free];
   }

[pointStr free];
return self;
}


- topMarginFromUser
{
id pointStr, response;

pointStr = [CSMore fromInt: [template topMargin]];
response = [BM_AskDialogBox askSTR:"Top margin:" defaultValue:[pointStr str]
    client:self];
if (response)
   {
   [template topMargin:atoi([response str])];
   [response free];
   }

[pointStr free];
return self;
}


- bottomMarginFromUser
{
id pointStr, response;
```

```
pointStr = [CSMore fromInt: [template bottomMargin]];
response = [BM_AskDialogBox askSTR:"Bottom margin:"
  defaultValue:[pointStr str] client:self];
if (response)

  {
  [template bottomMargin:atoi([response str])];
  [response free];
  }

[pointStr free];
return self;
}


- leftMarginFromUser
{
id pointStr, response;

pointStr = [CSMore fromInt: [template leftMargin]];
response = [BM_AskDialogBox askSTR:"Left margin:" defaultValue:[pointStr str]
   client:self];
if (response)
   {
   [template leftMargin:atoi([response str])];
   [response free];
   }

[pointStr free];
return self;
}


- rightMarginFromUser
{
id pointStr, response;

pointStr = [CSMore fromInt: [template rightMargin]];
response = [BM_AskDialogBox askSTR:"Right margin:"
   defaultValue:[pointStr str] client:self];
if (response)
   {
   [template rightMargin:atoi([response str])];
   [response free];
   }

[pointStr free];
return self;
}


- pageSizeFromUser
{
id db, aQuad;
id pointStr;
PT aPoint;

db = [SDialogBox new];
aPoint = [template pageSize];
pointStr = [CSMore fromInt: X(aPoint)];
[db addEntryLabeled: "Width :" defaultValue: [pointStr str]];
[pointStr free];
```

```
pointStr = [CSMore fromInt: Y(aPoint)];
[db addEntryLabeled: "Height:" defaultValue: [pointStr str]];
[pointStr free];
[db acceptSelector: @selector(pageSizeFromUser:) receiver: self];
[db cancelSelector: @selector(cancel:) receiver: self];
[db extent: [db defaultExtent]];

aQuad = [baseLayer insideQuad];
[[db center:[self center]] translateWithin:aQuad];

  [db attachTo: baseLayer];

  [db show];
  aQuad = [aQuad free];
  [db modalActivate];
  [db delete];

  return self;
  }


- pageSizeFromUser: aStringDialogBox
  {
  short xPoint,yPoint;

  [aStringDialogBox erase];
  [aStringDialogBox modalDeactivate];
  xPoint =  [aStringDialogBox valueAsIntAt:0];
  yPoint =  [aStringDialogBox valueAsIntAt:1];
  [template pageSize:pt(xPoint,yPoint)];

  return self;
  }



- (BOOL)leftButtonDown
  {
  return YES;
  }



- initialize
  {
  [super initialize];
  template = nil;
  return self;
  }
=:

/*===================== DO NOT REMOV\     EDIT ==============================

       This comment and the following sccsId declaration are managed
       by SCCS for you. Do not edit or remove either.

       Source file:     %F%
       Latest version:  %I%
       Last mod time:   %H% at %U%

=====================================================================*/
```

```
static char *sccsId = "@(#)RepLayer.m work in progress by bmw";

/*===================== DO NOT REMOVE OR EDIT ===========================*/


#include "objc.h"
#include "uil.h"
#include "BMWGlobal.h"

@requires TextAtt, CharString, OrdCltn, HeadLayer, FootLayer, ReportDALayer;
@requires CSMore, Quad, SmartFont, BM_PromptBox;
@requires Cursor, BitMap, SDialogBox, BM_PCLPrinter, BM_AskDialogBox;

= ReportLayer:DocumentLayer(BM_WorkstationMsgs, UIMESSAGES)
  {
  id header;    // HeadLayer, displays header
  id footer;    // FootLayer, displays footer

  id dataAreaTitleFont;
  id dataAreaValueFont;

  BOOL hasSelection;
  }


- dataAreaTitleFont
  {
  return dataAreaTitleFont;
  }


- dataAreaTitleFont:aFont
  {
  if (dataAreaTitleFont)
     [dataAreaTitleFont free];
  dataAreaTitleFont = aFont;

  return self;
 }


- dataAreaValueFont
  {
  return dataAreaValueFont;
  }


- dataAreaValueFont:aFont
  {
  if (dataAreaValueFont)
     [dataAreaValueFont free];

  dataAreaValueFont = aFont;

  return self;

  }



- currentPage: (int)aPageNo
  {
```

```
if (currentPage == aPageNo)
   return self;
currentPage = aPageNo;
[self currentDataArea: [dataArea at: currentPage - 1]];

[header createParts];
[footer createParts];

[self display];
[self changed:@selector(maxContentsArea)];
return self;
}


- adjustParts
{
short width, height, heightOffset;
id rTemplate;

rTemplate = [document template];
width = [self width] - ([rTemplate rightMargin] + [rTemplate leftMargin]);
if (width < 0)
    width = 0;
[header width: width];
[footer width: width];

height = [self height] - [rTemplate bottomMargin] - [rTemplate topMargin]
                       - [header height] - [footer height];
if (height < 0)
    height = 0;
dataAreaSize = pt(width,height);

heightOffset = [rTemplate bottomMargin];
[header offset: pt([rTemplate leftMargin],[rTemplate topMargin])];
[footer left: [header left]];
[footer bottom: [self bottom] - [rTemplate bottomMargin]];
dataAreaOrigin =  pt([header left],[header adjacentBottom]);
return self;
}


- setSize
{
id rTemplate;

rTemplate = [document template];
[self borderWidth: [rTemplate reportBorderWidth]];
[self extent: [rTemplate pageSize]];

return self;
}


- freeParts
{
if(header) header = [header free];
if(footer) footer = [footer free];

return [super freeParts];
}
```

```
- createParts
  {
  id rTemplate;

  rTemplate = [document template];
  header = [[HeadLayer createInterfaceFor: [rTemplate header] report:document
     parent:self] attachTo: self];
  footer = [[FootLayer createInterfaceFor: [rTemplate footer] report:document
     parent:self] attachTo: self];

  return self;
  }



+ dataLayerFactoryObject
  {
  return ReportDALayer;
  }


- createData
  {
  id aPage;
  id dataAreaTemplate;  // DataArea
  unsigned currentIndex, currentSet, loopIndex;

  id dataLayerFactoryObject = [[self class] dataLayerFactoryObject];

  dataAreaTemplate = [[document template] dataArea];

  [self dataAreaValueFont:[SmartFont
              fontName:[[dataAreaTemplate valueAttributes] fontName]]];

  [self dataAreaTitleFont:[SmartFont
              fontName:[[dataAreaTemplate titleAttributes] fontName]]];

  currentIndex = 0;
  loopIndex = 0;
  dataArea = [OrdCltn new];

  while(currentIndex < [[document data] numberOfElements])
     {
     currentSet = 0;
     while (currentSet < [[document data] nSets])
        {
        loopIndex = currentIndex;
        aPage = [dataLayerFactoryObject extent: dataAreaSize template:
           dataAreaTemplate parent:self];
        [aPage origin: dataAreaOrigin];
        [aPage startingSet: currentSet startingRow: loopIndex data:
           [document data]];
        currentSet = [aPage endingSet] + 1;
        [dataArea add: aPage];
        pages++;
        }
     currentIndex = [aPage endingRow] + 1;
     }
  if ( pages > 0 )
     [self currentPage: 1];
  return self;
  }
```

```
- initialize
 {
 [super initialize];

 hasSelection = NO;
 return self;
 }


- terminate$
 {
 if (dataAreaTitleFont) [dataAreaTitleFont free];
 if (dataAreaValueFont) [dataAreaValueFont free];
 return [super terminate$];
 }


- (BOOL)hasSelection
 {
 return hasSelection;
 }


- hasSelection:(BOOL)aBooleanValue
 {
 hasSelection=aBooleanValue;
 return self;
 }


- updateSelectionArea:aRepDALayer
 {
 int aPageNo;

 aPageNo = [dataArea offsetOf:aRepDALayer] + 1;

 [self currentPage:aPageNo];
 return self;
 }


- (PT)getSelectionPt
 {
 short index, anOffset;
 PT aPoint;
 BOOL found;

 found = NO;
 for (index=0;index<pages&&(!found);index++)
     if ([[dataArea at:index] selectionItem])
        found = YES;

 aPoint = [[dataArea at:index-1] selectionPt];
 return aPoint;
 }


- findSelectionItem:(PT)aPoint
 {
 short index;
 BOOL found;
```

```
if ( ((ptX(aPoint))>=0) &&
     ((ptX(aPoint))<=[[dataArea at:(pages-1)] endingSet]) &&
     ((ptY(aPoint))>=0) &&
     ((ptY(aPoint))<=[[dataArea at:(pages-1)] endingRow]) )
   {
   found = NO;
   for (index=0;index<pages && (!found);index++)
       found = [[dataArea at:index] containsSelectionPt:aPoint];
   if (found)
      {
      [self currentPage:index];
      [currentDA updateSelectionItem];
      }
   }

 return self;
 }

=:

/*==================== DO NOT REMOV    EDIT ============================

       This comment and the following sccsId declaration are managed
       by SCCS for you. Do not edit or remove either.

       Source file:     /users/bmw/Alpha/Reports/SCCS/s.Report.m
       Latest version:  1.28
       Last mod time:   09/15/89 at 20:42:50

=======================================================================*/

static char *sccsId = "@(#)Report.m rev 1.28 created on 09/15/89 at 20:42:50";

/*==================== DO NOT REMOVE OR EDIT ==========================*/

#include "objc.h"
#include "uil.h"
#include <stdio.h>
#include "BMWGlobal.h"
#include <time.h>

@requires CharString,DataCltn,Object;
@requires ReportWin, ReportTemplate;

= Report:Document(BM_WorkstationMsgs,UIMESSAGES)
  {
  long myDate;
  id   myUserName;
  id   mySiteName;
  }


 - (STR)extensionSTR
   {
   return ".rpt";
   }


 - setGlobalValues
   {
   myDate = time((long *)0);
   myUserName=userName;
   mySiteName=siteName;
```

```
return self;
}


- (long) myDate
{
return myDate;
}


- myUserName
{
return myUserName;
}


- mySiteName
{
return mySiteName;
}

+ (BOOL)fitData:aData template:aTemplate
{
unsigned size, index, nRows;
BOOL errorFlag;

errorFlag = NO;
size = [aData nSets];
if (size == [[[aTemplate dataArea] titles] size])
   for (index=0; (index < size) && (!(errorFlag)); index++)
      {
      if (!(([aData isFloatAt:index] && [[aTemplate dataArea] isFloatAt:index]) ||
         ([aData isTextAt:index]  && [[aTemplate dataArea] isTextAt:index])))
         errorFlag = YES;
      }
else
   errorFlag = YES;

size = [aData size];
for(index=0; (index < size) && (!(errorFlag)); index++)
   {
   if (index == 0)
      nRows = [[aData at:index] nRows];
   else
      if ((unsigned)[[aData at:index] nRows] != nRows)
         errorFlag = YES;

   /* disallow gigantic reports */
   if (nRows*size > 50000)
      errorFlag = YES;
   }
return errorFlag;
}


+ setupData:aData title:aTitle subTitle:aSubTitle template:aTemplate
{
if (aTitle)
   [[aTemplate header] titleSTR:[aTitle str]];
if (aSubTitle)
   [[aTemplate header] subTitleSTR:[aSubTitle str]];
```

```
[aData sortTable:[[aTemplate dataArea] sortType]
   column:[[aTemplate dataArea] sortColumn]];

return self;
}



+ memo: messageArgList: encloseArgList
{
int  index, size;
id   d, t;

id   templateName,fileName;
id   titleInput;
id   response;
id   newInterface;
BOOL errorFlag;

errorFlag = NO;

size = [encloseArgList positionals];
 if (size>0)
    {
    d = [DataCltn new];
    for(index = 0; index < size; index++ )
       [d addSet:[encloseArgList dataValueAtArg: index]];

    templateName = [messageArgList modifierFor:"template"];
    if (templateName)
       {
       fileName = [CharString str:"./"];
       fileName = [fileName concatSTR:[templateName str]];
       [fileName concatSTR:".rwr"];
       t = [Object readFrom:[fileName str]];
       [fileName free];
       }
    else
       t=[ReportTemplate defaultTemplate:d];

    errorFlag = [self fitData:d template:t];
    }
  else d = nil;

  if (! ((errorFlag) || (d==nil) || (t==nil)) )
     {
     [self setupData:d title:[messageArgList modifierFor:"title"]
        subTitle:[messageArgList modifierFor:"subtitle"] template:t];

     self = [self data:d template:t];
     return self;
     }
  [d free];
  [t free];
  return nil;
  }


+ defaultReportFor:aDataCltn titleSTR:titleString subTitleSTR:subTitleString
  {
  id tem;
```

```
tem=[ReportTemplate defaultTemplate:aDataCltn];

[[tem header]    titleSTR:titleString];
[[tem header] subTitleSTR:subTitleString];

[aDataCltn sortTable:[[tem dataArea] sortType]
   column:[[tem dataArea] sortColumn]];
self = [self data:aDataCltn template:tem];

return self;
}


+ new
{
self = [super new];
[self setGlobalValues];
return self;
}



- (BOOL)textFileOut:(STR)fileName columnDelimiter:(char)delimiter
{
FILE     *file;
char     buffer [100],

         format [100],
         tempSTR1 [100],
         tempSTR2 [100];
char     delimiterSTR [10];
unsigned columnsInHeader,
         leftColumn,
         rightColumn,
         centerColumn;

unsigned nColumns = [data nSets];

delimiterSTR [0] = delimiter;
delimiterSTR [1] = 0;

if ((file = fopen(fileName, "w")) == NULL)
   return NO;

if (nColumns == 0)
   columnsInHeader = 5;
else
   columnsInHeader = nColumns;

centerColumn = columnsInHeader / 2;
leftColumn   = 0;
rightColumn  = columnsInHeader - 1;

tempSTR1 [0] = 0;
tempSTR2 [0] = 0;

fprintf (file, "%s%s%s%s%s\n", [[[template header] leftPart] str],
        _strrpt(tempSTR1, delimiterSTR, centerColumn-leftColumn),
                          [[[template header] centerPart] str],
        _strrpt(tempSTR2, delimiterSTR, rightColumn-centerColumn),
                          [[[template header] rightPart] str]);
```

```
fprintf (file, "%s%s\n",
        _strrpt(tempSTR1, delimiterSTR, centerColumn-leftColumn),
                            [[[template header] titlePart] str]);

fprintf (file, "%s%s\n",
         _strrpt(tempSTR2, delimiterSTR, centerColumn-leftColumn),
                         [[[template header] subTitlePart] str]);

if ((nColumns = [data nSets]) > 0)
   {
   unsigned row,
            nRows = [[data at:0] nRows];

   for(row = 0; row < nRows; row++)
      {
      unsigned column;

      for(column = 0; column < nColumns; column++)
         {
         if ([data isTextAt:column])
            [data sprintfTextInSet:column row:row
                         formatSTR:[[template dataArea]
                  textValueFormatAt:column buffer:format]
                            buffer:buffer];
         else
            if ([data isFloatAt:column])
               [data sprintfFloatInSet:column row:row
                            formatSTR:[[template dataArea]
                     floatValueFormatAt:column buffer:format]
                          scaleFactor:1.000000
                              buffer:buffer];

            fprintf (file, "%s%s", bu    , delimiterSTR);
            }
         fprintf (file, "\n");
         }
      }
   fprintf (file, "%s%s%s%s%s\n", [[[template footer] leftPart] str],
           _strrpt(tempSTR1, delimiterSTR, centerColumn-leftColumn),
                              [[[template footer] centerPart] str],
          _strrpt(tempSTR2, delimiterSTR, rightColumn-centerColumn),
                              [[[template footer] rightPart] str]);

   fclose(file);

   return YES;
   }
   =:
/*===================== DO NOT REMOVE OR EDIT ============================

       This comment and the following sccsId declaration are managed
       by SCCS for you. Do not edit or remove either.

       Source file:     /users/bmw/Alpha/Reports/SCCS/s.ReportWin.m
       Latest version:  1.21
       Last mod time:   09/11/89 at 19:33:13

=========================================================================*/

static char *sccsId = "@(#)ReportWin.m rev 1.21 created on 09/11/89 at 19:33:13";

/*===================== DO NOT REMOVE OR EDIT ==========================*/
```

```
#include "objc.h"
#include "uil.h"
#include "BMWGlobal.h"

@requires BitMap,ReportEdit;

static id _myIconImage;

= ReportWin:DocumentWin(BM_WorkstationMsgs,UIMESSAGES)
  {
  }


+ documentLayerFactoryObject
 {
 return ReportEdit;
 }


- (STR)extensionSTR
  {
  return ".rpt";
  }


- defaultIcon
  {
  if (_myIconImage == nil)
     _myIconImage = [BitMap readFrom:"icons/report.icon"];

  return [_myIconImage shared$];
  }

=:


/*===================== DO NOT REMOV    EDIT =============================

        This comment and the following sccsId declaration are managed
        by SCCS for you. Do not edit or remove either.

        Source file:      %F%
        Latest version:   %I%
        Last mod time:    %H% at %U%

======================================================================*/

static char *sccsId = "@(#)TempEdit.m work in progress by bmw";

/*===================== DO NOT REMOVE OR EDIT ==========================*/

#include "objc.h"
#include "uil.h"

@requires ReportDAEdit, PopUpMenu;
@requires OrdCltn, SmartFont;


= TemplateEdit:ReportEdit (BM_WorkstationMsgs, UIMESSAGES)
  {
  }
```

```
+ dataLayerFactoryObject
  {
  return ReportDAEdit;
  }


+ createInterfaceFor: aReportTemplate  parent:aParent
  {
  self = [self new];
  [self template: aReportTemplate];
  parent = aParent;

  return self;
  }


- storeOnFromUser
  {
  return [parent saveFile:template];
  }


- createData
  {
  id aPage, dataAreaTemplate;

  id dataLayerFactoryObject = [[self class] dataLayerFactoryObject];

  dataAreaTemplate = [template dataArea];
  dataArea = [OrdCltn new];

  [self dataAreaValueFont:[SmartFont
                loadFont:[[dataAreaTemplate valueAttributes] fontName]]];

  [self dataAreaTitleFont:[SmartFont
                loadFont:[[dataAreaTemplate titleAttributes] fontName]]];


if ([[[template dataArea] titles] size] == 0)
   {
   aPage = [dataLayerFactoryObject extent: dataAreaSize
      template:dataAreaTemplate parent:self];
   [aPage origin: dataAreaOrigin];
   [aPage startingSet:0 startingRow:0 data:nil];
   [dataArea add:aPage];
   pages++;
   }
else
   {
   unsigned currentSet = 0;
   while (currentSet < [[[template dataArea] titles] size])
      {
      aPage = [dataLayerFactoryObject extent: dataAreaSize
         template:dataAreaTemplate parent:self];
      [aPage origin: dataAreaOrigin];
      [aPage startingSet:currentSet startingRow:0 data:nil];
      [dataArea add:aPage];
```

```
    currentSet = [aPage endingSet] + 1;
    pages++;
    }
  }
[self currentPage: 1];
return self;
}



- updateMenu
 {
 [super updateMenu];

 [[[pageMenu children] at:5] selectable:YES];
 [[[pageMenu children] at:7] selectable:YES];

 return self;
 }


- (BOOL)doubleClick
  {
  [self changed:@selector(doubleClick)];
  return YES;
  }

=:

/*===================== DO NOT REMOVE    EDIT ==============================

       This comment and the following sccsId declaration are managed
       by SCCS for you. Do not edit or remove either.

       Source file:      /users/bmw/Alpha/Reports/SCCS/s.Template.m
       Latest version:  1.3
       Last mod time:    09/04/89 at 20:02:30

 ======================================================================*/

 static char *sccsId = "@(#)Template.m rev 1.3 created on 09/04/89 at 20:02:30";

 /*===================== DO NOT REMOVE OR EDIT ============================*/

 #include "objc.h"
 #include "uil.h"

 @requires ReportDataArea;

 = Template:DepSharObject(BM_WorkstationMsgs,UIMESSAGES)
   {
   PT pageSize;            // Page Size, in pixels
   id data;                // DataArea, chart data area
   }


  - initialize
    {
    data = [self defaultDataArea];
    return self;
    }
```

```
+ new
  {
  self = [super new];
  [self initialize];
  return self;
  }


- (PT)pageSize
  {
  return pageSize;
  }


- pageSize:(PT)aPoint
  {
  pageSize = aPoint;
  [self changed: @selector(pageSize:)];
  return self;
  }


- psFromUser:(PT)aPoint
  {
  pageSize = aPoint;
  return self;
  }


- defaultDataArea
  {
  return [ReportDataArea new];


  }


- dataArea
  {
  return data;
  }


- terminate$
  {
  [data free];
  return [super terminate$];
  }


- copy
  {
  id newCT;

  newCT = [super copy];

  newCT->data = [data copy];

  return newCT;
  }
=:
```

```
/*===================== DO NOT REMOV    EDIT =============================

       This comment and the following sccsId declaratjon are managed
       by SCCS for you. Do not edit or remove either.

       Source file:     /users/bmw/Alpha/Reports/SCCS/s.TemplateWin.m
       Latest version:  1.4
       Last mod time:   09/10/89 at 19:28:17

========================================================================*/

static char *sccsId = "@(#)TemplateWin.m rev 1.4 created on 09/10/89 at 19:28:17";

/*===================== DO NOT REMOVE OR EDIT ===========================*/

#include "objc.h"
#include "uil.h"
#include "BMWGlobal.h"

static id _myIconImage;

@requires BorderLayer,BitMap,Object,Prompter;
@requires TemplateEdit,CharString,ReportTemplate,Quad;

= TemplateWin:ApplicationWin(BM_WorkstationMsgs,UIMESSAGES)
  {
  }


- defaultIcon
  {
  if (_myIconImage == nil)
     _myIconImage = [BitMap readFrom:"icons/template.icon"];

  return [_myIconImage shared$];
  }


- (STR)extensionSTR
  {
  return ".tem";
  }


- open
  {
  id template, path, tl, rl, q1, q2;
  id aDataArea, aDataAreaTL;

  if (!opened)
     {
     path = [self path];

     if (fileName == nil)
        template = [ReportTemplate new];
     else
        template = [Object readFrom: [path str]];

     if (template == nil )
        [Prompter promptFormat: "%s file was not found", [path str]];
     else
```

```
{
printf("********** %d %d \n",[self width],[self height]);
rl = [TemplateEdit createInterfaceFor:template parent:self];
q1 = [baseLayer insideQuad];
q2 = [Quad withBounds:self];


  }


=:

/*===================== DO NOT REMOVE    EDIT ==============================

       This comment and the following sccsId declaration are managed
       by SCCS for you. Do not edit or remove either.

       Source file:     SCCS/s.InputWindow.m
       Latest version:  1.1
       Last mod time:   08/31/89 at 11:46:22

=========================================================================*/

static char *sccsId = "@(#)InputWindow.m rev 1.1 created on 08/31/89 at 11:46:22";

/*===================== DO NOT REMOVE OR EDIT ===========================*/

#include "objc.h"
#include "uil.h"
#include "BMWGlobal.h"

@requires BM_AskDialogBox,CharString,StringLayer;

= InputWindow:InnerWindow(BM_WorkstationMsgs,UIMESSAGES)
 {
 id researchWin;

 id myDisplay;
 id myStr;

 id button1,button2,button3;
 }



- researchWin:aWindow
 {
 researchWin = aWindow;
 return self;
 }


- researchWin
 {
 return researchWin;
 }


- button1
 {
 return button1;
 }
```

```
- button2
  {
  return button2;
  }


- button3
  {
  return button3;
  }


- (STR)myStr
  {
  return [myStr str];
  }


- myStr:(STR)aString
  {
  if (myStr)
     myStr = [myStr free];

  myStr = [CharString str:aString];
  return self;
  }


- updateMyDisplay
  {
  if (myDisplay)
     myDisplay = [myDisplay free];

  myDisplay = [StringLayer str:[self myStr] font:BM_fonts.Application];
  [myDisplay attachTo:innerLayer at:pt(35,65)];
  [[myDisplay borderWidth:1] borderColor:BM_colors.Border];
  [[myDisplay color:BM_colors.VRLText] insideColor:BM_colors.Foreground];
  [myDisplay extent:pt([innerLayer outsideWidth]-45,17)];

  [myDisplay show];
  return self;
  }


- (BOOL)updateStatement:(STR)aString
  {
  [self myStr:aString];
  if ([[self researchWin] updateForStmt])
     return YES;
  return NO;
  }


- inputFromUser:aQuestionString
  {
  id response;

  response = [BM_AskDialogBox askSTR:aQuestionString
     defaultValue:[myDisplay str] client:self];
```

```
if (response)
   {
   if ([self updateStatement:[response str]])
      [self updateMyDisplay];
   else
      {
      if (!(strcmp([myDisplay str],"")))
         [button1 on];
      else
         [self updateStatement:[myDisplay str]];
      }
   [response free];
   }
else
   if (!(strcmp([myDisplay str],"")))
      [button1 on];
   else



      [self updateStatement:[myDis     str]];

 return self;
 }



- initialize
 {
 [super initialize];
 myStr = myDisplay = nil;
 [self myStr:""];

 [self outsideExtent:pt(190,147)];
 return self;
 }


- terminate$
 {
 if (myStr)
    myStr = [myStr free];
 return [super terminate$];
 }

=:


/*==================== DO NOT REMOVE    EDIT ============================

       This comment and the following sccsId declaration are managed
       by SCCS for you. Do not edit or remove either.

       Source file:     /users/bmw/Alpha/Research/SCCS/s.ModelEditor.m
       Latest version:  1.3
       Last mod time:   09/12/89 at 18:07:50

=====================================================================*/

static char *sccsId = "@(#)ModelEditor.m rev 1.3 created on 09/12/89 at 18:07:50";

/*==================== DO NOT REMOVE OR EDIT ==========================*/
```

```
#include "objc.h"
#include "uil.h"
#include "BMWGlobal.h"

@requires BM_Interpreter, BM_For, BM_Next,
         BM_ChoiceDialogBox, BM_ParseTreeNode;
@requires Cursor,Prompter,CharString;


= ModelEditor:InnerWindow(BM_WorkstationMsgs,UIMESSAGES)
  {
  char aStatement[1000];
  id displayTree;
  id currentStmtId;
  short statementMethod;        // 1:insertAfter 2:replace 3:delete

  id researchWin;
  id myStatementEditor;

  BOOL forFlag;
  }



- (PT)centerErrorPrompter
  {
  if (myStatementEditor)
     return [[myStatementEditor editLayer] center];
  return [self center];
  }


- displayErrorPrompter:aMessage
  {
  [[[[Prompter str:[aMessage str]]
     center:[self centerErrorPrompter]] insideColor:BM_colors.Prompter]
        waitForUser] free];
  return self;
  }


- forStmt:anId
  {
  [self currentStmtId:anId];
  return self;
  }


- nextStmt:anId
  {
  [self currentStmtId:anId];

  return self;
  }



- forFlag:(BOOL)aBoolean
  {
  forFlag = aBoolean;
  return self;
  }
```

```
- (BOOL)forFlag
{
return forFlag;
}



- checkFor
{
if (!(strcmp([[[self statementEditor] editLayer] statementType],"For")))
   [self forFlag:YES];
else [self forFlag:NO];
return self;
}



- researchWin:aWindow
{
researchWin = aWindow;
return self;
}


- researchWin
{
return researchWin;
}



- displayTree
{
return displayTree;
}



- model
{
return [displayTree model];
}



- createInterfaceFor:aBM_Node root:aRootNode
{
id subTree;

[statusMonitor formatting];
subTree = [[aBM_Node interfaceClass] researchInterfaceFor:aBM_Node root:nil];
[subTree modelEditor:self];
[subTree formatNode];
[subTree dispNode];
[self applicationLayer:rl];
[self translateWithin:q1];
[self show];

if (![self containsRect:q2])
   [baseLayer displayRect:q2];
```

```
      [q1 free];
      [q2 free];
      }
    [path free];
    }
  return [super open];
  }


+ createInterfaceFor: aString parent: anId
  {
  self = [super createInterfaceFor: aString parent: anId];
  [[self iconHandler] assignSTR: [self defaultTitleSTR]];
  return self;
  }


- initialize
  {
  [super initialize];
  [self viewBox:nil];
  [self titleFont:BM_fonts.TitleBar];

  [self horizontalBar:[self defaultHorizontalBar]];
  [[self horizontalBar] barColor:BM_colors.MenuBar];
  [self noPageMarkers];
  return self;
  }

=:


/*===================== DO NOT REMOV    EDIT ============================

        This comment and the following sccsId declaration are managed
        by SCCS for you. Do not edit or remove either.

        Source file:     /users/bmw/Alpha/Reports/SCCS/s.TextAtt.m
        Latest version:  1.10
        Last mod time:   08/25/89 at 11:32:19

========================================================================*/

static char *sccsId = "@(#)TextAtt.m rev 1.10 created on 08/25/89 at 11:32:19";

/*===================== DO NOT REMOVE OR EDIT ==========================*/


#include "objc.h"
#include "uil.h"

#define JLEFT 0
#define JRIGHT 1
#define JCENTERED 2

@requires CharString, OrdCltn, SmartFont;

= TextAtt: DepSharObject (BM_WorkstationMsgs, UIMESSAGES) {
id fontName;            // CharString, font name
BOOL bold;              // YES if font is bold, NO otherwise
BOOL italics;           // YES if font is italics, NO otherwise
```

```
BOOL underline;         // YES if font is underlined, NO otherwise
short pointSize;        // Font size, point size
unsigned justification; // Justification, one of JLEFT, JRIGHT, JCENTERED
}

/* $Default Category: Creation $ */

/*
Create and return an new instance of TextAttributes.
*/
+new {
    self = [super new];
    [self initialize];
    return self;
}

/* $Default Category: Initialization $ */

/*
Initialize the receiver.  Returns self.
*/
-initialize {
    bold = NO;
    italics = NO;
    underline = NO;
    pointSize = 12;
    justification = JCENTERED;
    fontName = [CharString str:[SmartFont defaultFontName]];
    return self;
}

/* $Default Category: Interrogation $*/

/*
Return the font name of the reciever.
*/
-(STR)fontName {

    return [fontName str];
}

/*
Return YES if the receiver is bold, NO otherwise.
*/
-(BOOL)bold {
    return bold;
}

/*
Return YES if the receiver is italics, NO otherwise.
*/
-(BOOL)italics {
    return italics;
}

/*
Return YES if the receiver is underline, NO otherwise.
*/
-(BOOL)underline {
    return underline;
}
```

```
/*
Return the point size of the reciever.
*/
-(short)pointSize {
    return pointSize;
}


-(unsigned)justification {
    return justification;
}


/* $Default Category: Setting $ */

/*
Set the font name of the reciever to aFontName.  Returns self.
*/
-fontName: (STR)aFontName {
    if ( [fontName compareSTR: aFontName] != 0 ) {
        [fontName assignSTR: aFontName];
        [self changed: @selector(fontName:)];
    }
    return self;
}

/*
Set the receiver's bold attribute, if aBool is YES, turn bold
on, if aBool is NO, turn it off.  Returns self.
*/
-bold: (BOOL)aBool {
    // TO BE DETERMINED -- is it possible to have italics and bold?
    // if not fix up italics
    if ( aBool != bold) {
        bold = aBool;
        [self changed: @selector(bold:)];
    }
    return self;
}

/*
Set the receiver's italics attribute, if aBool is YES, turn italics
on, if aBool is NO, turn it off.  Re    s self.
*/
-italics: (BOOL)aBool {
    // TO BE DETERMINED -- is it possible to have italics and bold?
    // if not fix up bold
    if ( aBool != italics ) {
        italics = aBool;
        [self changed: @selector(italics:)];
    }
    return self;
}

/*
Set the receiver's underline attribute, if aBool is YES, turn underline
on, if aBool is NO, turn it off.  Returns self.
*/
```

```
-underline: (BOOL)aBool {
    if ( aBool != underline ) {
        underline = aBool;
        [self changed: @selector(underline:)];
    }
    return self;
}

/*
Set the t··  :int size of the reciever to aPointSize.  Returns self.
*/
-pointSize: (short)aPointSize {
    if ( aPointSize != pointSize ) {
        pointSize = aPointSize;
        [self changed: @selector(pointSize:)];
    }
    return self;
}


-justification:(unsigned)aJustificationCode
  {
   unsigned oldJustification = justification;

   justification = aJustificationCode;

  if (oldJustification != justification)
      [self changed: @selector(justification:)];
   return self;
}


- copy {
    id newTA;

    newTA = [super copy];
    newTA->fontName = [CharString str:[fontName str]];

    return newTA;
}

/*===================== DO NOT REMOV     EDIT ============================

        This comment and the following sccsId declaration are managed
        by SCCS for you. Do not edit or remove either.

        Source file:     /users/bmw/Alpha/Reports/SCCS/s.TextUnit.m
        Latest version:  1.4
        Last mod time:   08/17/89 at 15:39:00

=======================================================================*/

static char *sccsId = "@(#)TextUnit.m rev 1.4 created on 08/17/89 at 15:39:00";

/*===================== DO NOT REMOVE OR EDIT ===========================*/

// (c) Batterymarch, Stepstone 1988.  All rights reserved.
// Report Writer
//
// $Source: /usr/u/lisa/batterymarch/reportwriter/RCS/TextUnit.m,v $
// $Revision: 1.2 $
// $Date: 88/10/12 13:09:47 $ $State: Exp $
```

```
// $Product: $
//
// $Class name: TextUnit

/*
$Description: TextUnit adds a string to TextAttributes.
*/

// Needs to be filled out with CharString protocol

// Include Files
#include "objc.h"
#include "uil.h"

// @requires
@requires CharString;

= TextUnit: TextAtt (BM_WorkstationMsgs, UIMESSAGES) {
id myString;    // CharString
}

/* $Default Category: Initialization $ */

/*
Initialize the receiver.  Returns self.
*/
-initialize {
    [super initialize];
    myString = [CharString str: ""];
    return self;
}

/* $Default Category: Creation $*/

/*
Create and return an instance of TextUnit initialize to the string aString.
*/
+str: (STR)aString {
    self = [self new];
    [self assignSTR: aString];
    return self;
}

/* $Default Category: Setting $*/

/*
Assign aString to the receiver.  Returns self.
*/
-assignSTR:(STR)aString {
    [myString assignSTR: aString];
    [self changed: @selector(assignSTR:)];
    return self;
}

/* $Default Category: Interrogation $*/

/*
Return the receiver's string.
*/
-(STR)str {
    return [myString str];
}
```

```
-copy {
    id newTU;

    newTU = [super copy];
    newTU->myString = [CharString str:[myString str]];
    return newTU;
    }

=:


/*==================== DO NOT REMOVE    EDIT ============================

        This comment and the following sccsId declaration are managed
        by SCCS for you. Do not edit or remove either.

        Source file:      /users/bmw/Alpha/Charts/SCCS/s.BM_VECLayer.m
        Latest version:   1.3
        Last mod time:    09/11/89 at 16:24:49

=========================================================================*/

static char *sccsId = "@(#)BM_VECLayer.m rev 1.3 created on 09/11/89 at 16:24:49";

/*==================== DO NOT REMOVE OR EDIT ==========================*/

#include "objc.h"
#include "uil.h"

#include "BMGFXInterf.h"
#include "BMWGlobal.h"


static char *spoolFileName = "./temp/BM_Spool";


@requires Cursor, Prompter, BM_ChoiceDialogBox, CharString, BM_SolidColor;

= BM_VECLayer : BM_GFXLayer (BM_WorkstationMsgs, UserInterface,
                             Collection, Primitive)
   {
    GFXWSPTR gfxWorkstation, gfxMetafile;
    char     tempMetafileName [150], gfxWorkstationName [20];
   }


   -metafileName
      {
       if (([backLayer respondsTo:@selector(fileName)]) &&
           ([backLayer fileName] != nil))
          return [backLayer path];
       else
          return [CharString str:tempMetafileName];
      }


    -tempMetafileName:(STR)aFileName
      {
       strcpy (tempMetafileName,aFileName);
       return self;
      }
```

```
-(STR)tempMetafileName
 {
  return tempMetafileName;
 }


-printOn:(STR)printerName deviceType:(STR)deviceType
 {
  char commandLine [220];
  id   metafileName;

  metafileName = [self metafileName];

  if ([metafileName length])
     {
      sprintf (commandLine, "../bin/viewmeta %s %s \"%s\"; lpr %s %s",
                                              spoolFileName, deviceType,
                            [metafileName str], printerName, spoolFileName);

      system (commandLine);
     }
   else
     {
      gfxWorkstation = BM_OpenGraphicsWorkstation
                                              (spoolFileName, deviceType);
      [self drawContents];
      BM_CloseGraphicsWorkstation (gfxWorkstation);

      sprintf (commandLine, "lpr %s %s", printerName, spoolFileName);

      system (commandLine);
     }

   return self;
  }


-print
  {
   if (![BM_ChoiceDialogBox
            askChoiceUsingSTR:"Send output to printer or to plotter?"
                       client:self
                  button0STR:"Printer"
                  button1STR:"Plotter"])
      return [self printOn:"-oraw -onb" deviceType:"hp150"];
   else
      return [self printOn:"-dplotter" deviceType:"hp7475a"];
  }


-save
  {
   [backLayer saveFile:self];

   return self;
  }


-(GFXWSPTR) openGFXWorkstation:aDispMedium
              createMetafile:(BOOL)createMetaFile
  {
   [Cursor push:cursors.Wait];

   [statusMonitor graphics];
```

```
   gfxWorkstation = BM_OpenGraphicsWorkstation
            (IdToMediumName (aDispMedium, gfxWorkstationName),"stepston");

   if (createMetaFile)
      {
       strcpy (tempMetafileName, "./temp/");
       strcat (tempMetafileName, gfxWorkstationName);
       strcat (tempMetafileName, "_MF");

       gfxMetafile = BM_OpenGraphicsWorkstation (tempMetafileName, "mo");
      }

   return (gfxWorkstation);
  }
 -closeGFXWorkstation:(BOOL)closeMetafile
  {
   BM_CloseGraphicsWorkstation (gfxWorkstation);

   if (closeMetafile && strlen(tempMetafileName))
      BM_CloseGraphicsWorkstation (gfxMetafile);

   [statusMonitor normalStatus];

   [Cursor pop];

   return self;
  }
 .

-drawContents
  {
   id metafileName = [self metafileName];

   if ([metafileName length])
      PlayMetafile (gfxWorkstation, [metafileName str]);

   [metafileName free];

   return self;
  }


-displayLayer
  {
   [self openGFXWorkstation:self createMetafile:NO];
   [self drawContents];
   [self closeGFXWorkstation:NO];

   return self;
  }


-beginPlotting:(int)chartType showLegend:(BOOL)showLegend
                          title1:(STR)title1 title2:(STR)title2
                          title3:(STR)title3 title4:(STR)title4
                          xLabel:(STR)xLabel yLabel:(STR)yLabel
  {
   BM_BeginPlotting (gfxWorkstation, chartType, showLegend,
                                           title1, title2, title3,
                                           title4, xLabel, yLabel);
   return self;
  }
```

```
-addDataSet:aDoubleArray setNumber:(unsigned)setNumber
                          legendLabel:(STR)legendLabel
                             nPoints:(unsigned)nPoints
                          pointLabels:aStringArray
                            chartType:(int)chartType fill:(BOOL)fill

  {
   char *label;
   int  point;
   id   string;

   if (legendLabel == (char *) 0)
      label = "";
   else
      label = legendLabel;
   BM_AddDataSet ((int)setNumber.    ıt)chartType, (int)fill,
                                 ιchar *)label,  (int)nPoints,
                                            (char *)IV(aDoubleArray));

   if (aStringArray != nil)
      for (point = 0; point < nPoints; point++)
         if (((string = [aStringArray at:point]) != nil) &&
             ([aDoubleArray numberAt:(unsigned)(point*2+1)] != 0.0))
            BM_AddPointLabel ((int)setNumber, point, [string str]);

   return self;
  }


-finishPlotting
  {
   BM_FinishPlotting ();

   return self;
  }


-initialize
  {
   [super initialize];

   gfxWorkstationName [0] = 0;
   tempMetafileName   [0] = 0;
   [self insideColor:BM_colors.Background];

   return self;
  }


-terminate$
  {
   char commandLine [280];

   if (strlen (tempMetafileName))
      {
       strcpy (commandLine, "rm \"");
       system (strcat (strcat (commandLine, tempMetafileName), "\""));
      };

   return [super terminate$];
  }


/* shouldn't be here */
```

```
void BM_InitializeColorTable (aColorTable)

short *aColorTable;

   {
    aColorTable [0] = [BM_SolidColor colorIndexForName:"black"];
    aColorTable [1] = [BM_SolidColor colorIndexForName:"white"];
    aColorTable [2] = [BM_SolidColor colorIndexForName:"blue"];
    aColorTable [3] = [BM_SolidColor colorIndexForName:"green"];
    aColorTable [4] = [BM_SolidColor colorIndexForName:"red"];
    aColorTable [5] = [BM_SolidColor colorIndexForName:"cyan"];
    aColorTable [6] = [BM_SolidColor colorIndexForName:"yellow"];
    aColorTable [7] = [BM_SolidColor colorIndexForName:"magenta"];
    aColorTable [8] = [BM_SolidColor colorIndexForName:"cadetBlue"];
    aColorTable [9] = [BM_SolidColor colorIndexForName:"wheat"];
    aColorTable [10]= [BM_SolidColor colorIndexForName:"maroon"];
    aColorTable [11]= [BM_SolidColo   lorIndexForName:"lightGrey"];
    aColorTable [12]= [BM_SolidColor colorIndexForName:"brown"];
    aColorTable [13]= [BM_SolidColor colorIndexForName:"navy"];
    aColorTable [14]= [BM_SolidColor colorIndexForName:"darkSlateGrey"];
    aColorTable [15]= [BM_SolidColor colorIndexForName:"gold"];
   }

=:

/*==================== DO NOT REMOV    EDIT ============================

        This comment and the following sccsId declaration are managed
        by SCCS for you. Do not edit or remove either.

        Source file:     /users/bmw/Alpha/Charts/SCCS/s.CSDataArea.m
        Latest version:  1.3
        Last mod time:   09/08/89 at 14:31:48

=========================================================================*/

static char *sccsId = "@(#)CSDataArea.m rev 1.3 created on 09/08/89 at 14:31:48";

/*==================== DO NOT REMOVE OR EDIT ==========================*/

#include "objc.h"
#include "uil.h"
#include "string.h"
#include "BMWGlobal.h"

@requires OrdCltn,CharString;

= ChartSpecsDataArea:ChartDataArea(BM_WorkstationMsgs,UIMESSAGES)
  {
  id chartItems;
  }



- chartItems
  {
  return chartItems;
  }


- chartItems:aCollection
  {
  if (chartItems)
```

```
   chartItems = [chartItems free];
 chartItems = aCollection;
 return self;
 }


- copy
 {
 id newCSDA;
 short index;

 newCSDA = [super copy];

 newCSDA->chartItems = [OrdCltn new];
 for (index=0;index<[chartItems size];index++)
     [newCSDA->chartItems add:[CharString str:[[chartItems at:index] str]]];

 return newCSDA;
 }


- initialize
 {
 [super initialize];
 chartItems = [OrdCltn new];
 return self;
 }


- terminate$
 {
 if (chartItems)
    chartItems = [chartItems free];
 return [super terminate$];
 }


=:

/*===================== DO NOT REMO\    : EDIT =============================

        This comment and the following sccsId declaration are managed
        by SCCS for you. Do not edit or remove either.

        Source file:     /users/bmw/Alpha/Charts/SCCS/s.CSTemplate.m
        Latest version:  1.3
        Last mod time:   09/08/89 at 14:31:40

=========================================================================*/

static char *sccsId = "@(#)CSTemplate.m rev 1.3 created on 09/08/89 at 14:31:40";

/*===================== DO NOT REMOVE OR EDIT ===========================*/

#include "objc.h"
#include "uil.h"
#include "BMWGlobal.h"

@requires ChartSpecsDataArea;
@requires BM_ParseTreeNode,BM_Parser,BM_StreamString;

= ChartSpecsTemplate:ChartTemplate(BM_WorkstationMsgs,UIMESSAGES)
```

```
  {
  id model;
  }


- model
  {
  return model;
  }


- model:aModel
  {
  model = aModel;
  return self;
  }


- defaultDataArea
  {
  return [ChartSpecsDataArea new];
  }


- copy
  {
  id newCST;

  newCST = [super copy];

  newCST->model = nil;
  return newCST;
  }


- initialize
  {
  [super initialize];
  model = nil;
  return self;
  }
extern id _theParser;
extern id parseTree;

- awakeFrom:aFiler
  {
  if (model)
     {
     if (_theParser == nil)
         _theParser = [BM_Parser new];
     [_theParser parse:[BM_StreamString str:[model str]]];
     model = parseTree;
     }
  return [super awakeFrom:aFiler];
  }


- (BOOL)fileOutFor:aFiler
  {
  id vrlModel;
  BOOL response;
```

```
vrlModel = model;
model = [model listing];
response = [super fileOutFor:aFiler];
model = vrlModel;
return response;
}

=:

/*===================== DO NOT REMO  R EDIT ============================

        This comment and the following sccsId declaration are managed
        by SCCS for you. Do not edit or remove either.

        Source file:    /users/bmw/Alpha/Charts/SCCS/s.CSpecsDAEdit.m
        Latest version: 1.3
        Last mod time:  09/08/89 at 14:31:20

=======================================================================*/

static char *sccsId = "@(#)CSpecsDAEdit.m rev 1.3 created on 09/08/89 at 14:31:20";

/*===================== DO NOT REMOVE OR EDIT ==========================*/

#include "objc.h"
#include "uil.h"
#include "BMWGlobal.h"

= ChartSpecsDAEdit:ChartDAEdit(BM_WorkstationMsgs,UIMESSAGES)
  {
  }

=:

/*===================== DO NOT REMOV   EDIT ============================

        This comment and the following sccsId declaration are managed
        by SCCS for you. Do not edit or remove either.

        Source file:    /users/bmw/Alpha/Charts/SCCS/s.CSpecsEdit.m
        Latest version: 1.4
        Last mod time:  09/08/89 at 14:31:32

=======================================================================*/

static char *sccsId = "@(#)CSpecsEdit.m rev 1.4 created on 09/08/89 at 14:31:32";

/*===================== DO NOT REMOVE OR EDIT ==========================*/

#include "objc.h"
#include "uil.h"
#include "BMWGlobal.h"

@requires ChartSpecsDAEdit;

= ChartSpecsEdit:ChartEdit(BM_WorkstationMsgs,UIMESSAGES)
  {
  }

+ dataLayerFactoryObject
  {
  return ChartSpecsDAEdit;
  }
```

```
- storeOnFromUser
  {
  return [parent saveFile:[document template]];
  }

=:

/*===================== DO NOT REMOVE    EDIT =============================

        This comment and the following sccsId declaration are managed
        by SCCS for you. Do not edit or remove either.

        Source file:      /users/bmw/Alpha/Charts/SCCS/s.CTemplate.m
        Latest version:  1.3
        Last mod time:    09/08/89 at 14:30:45

=========================================================================*/

static char *sccsId = "@(#)CTemplate.m rev 1.3 created on 09/08/89 at 14:30:45";

/*===================== DO NOT REMOVE OR EDIT ===========================*/

#include "objc.h"
#include "uil.h"

@requires ChartDataArea;

= ChartTemplate:Template(BM_WorkstationMsgs,UIMESSAGES)
  {
  }


- initialize
  {
  [super initialize];
  pageSize = pt(630,590);

  return self;
  }


- defaultDataArea
  {
  return [ChartDataArea new];
  }

=:

/*===================== DO NOT REMOVI    EDIT =============================

        This comment and the following sccsId declaration are managed
        by SCCS for you. Do not edit or remove either.

        Source file:      %F%
        Latest version:  %I%
        Last mod time:    %H% at %U%

=========================================================================*/

static char *sccsId = "@(#)Chart.m work in progress by bmw";

/*===================== DO NOT REMOVE OR EDIT ===========================*/

#include "objc.h"
```

```
#include "uil.h"
#include <stdio.h>
#include "BMWGlobal.h"

@requires CharString,ChartDataCltn,Object;
@requires ChartWin,ChartTemplate;

= Chart:Document(BM_WorkstationMsgs,UIMESSAGES)
  {
  }


- (STR)extensionSTR
  {
  return ".cht";
  }



+ (BOOL)fitData:aData template:aTemplate
  {
  unsigned size, index, nRows;
  BOOL errorFlag;

  errorFlag = NO;
  size = [aData nSets];

  for (index=0; (index < size) && (!(errorFlag)); index++)
      if  (!([aData isFloatAt:index]))
          errorFlag = YES;

  size = [aData size];
  for(index=0; (index < size) && (!(errorFlag)); index++)
     {
     if (index == 0)
        nRows = [[aData at:index] nRows];
     else
        if ((unsigned)[[aData at:index] nRows] != nRows)
           errorFlag = YES;

     /* disallow gigantic reports */
     if (nRows*size > 50000)
        errorFlag = YES;
     }

   return errorFlag;
   }


 + memo:messageArgList:encloseArgList
   {
   int  index, size;
   id   d, t;

   id   templateName,fileName,chartType;
   id   titleInput;
   id   response;
   id   newInterface;
   BOOL errorFlag;
   id   cLabels,sLabels;

   errorFlag = NO;
```

```
 size = [encloseArgList positionals];

 if (size>0)
    {
    d = [ChartDataCltn new];

    cLabels = [encloseArgList universeNames];
    sLabels = nil;

    for(index = 0; index < size; index++ )
       [d addSet:[encloseArgList dataValueAtArg: index]];

    templateName = [messageArgList modifierFor:"template"];
    if (templateName)
       {
       fileName = [CharString str:"./"];
       fileName = [fileName concatSTR:[templateName str]];
       [fileName concatSTR:".cwr"];
       t = [Object readFrom:[fileName str]];
       [fileName free];
       }
    else
       t=[ChartTemplate new];

    chartType = [messageArgList modifierFor:"chart"];
    if (chartType)
       {
       if (!_dictcmp([chartType str],"BAR"))
          [[t dataArea] chartType:BAR];
       else if (!_dictcmp([chartType str],"PIE"))
          [[t dataArea] chartType:PIE];
       else if (!_dictcmp([chartType str],"COLUMN"))
          [[t dataArea] chartType:COLUMN];
       else if (!_dictcmp([chartType str],"LINE"))
          [[t dataArea] chartType:LINE];
       else if (!_dictcmp([chartType str],"HISTOGRAM"))
          [[t dataArea] chartType:HISTOGRAM];
       else if (!_dictcmp([chartType str],"SCATTER"))
       [[t dataArea] chartType:SCATTER];
       }
    }
 else d = nil;

 errorFlag = [self fitData:d template:t];

 if (! ((errorFlag) || (d==nil) || (t==nil)) )
    {
    [d sortTable:[[t dataArea] sortType]
       column:[[t dataArea] sortColumn]];
    [d categoryLabels:cLabels];
    [d seriesLabels:sLabels];

    self = [self data:d template:t];
    return self;
    }

 [d free];
 [t free];
 return nil;
 }


+ defaultChartFor:aChtDataCltn categoryLabels:cLabels seriesLabels:vLabels
```

```
  {
  id t;

  t = [ChartTemplate new];
  [aChtDataCltn sortTable:[[t dataArea] sortType] column:[[t dataArea]
     sortColumn]];
  [aChtDataCltn categoryLabels:cLabels];
  [aChtDataCltn seriesLabels:vLabels];
  self = [self data:aChtDataCltn template:t];
  return self;
  }



- removeTemplate
  {
  template = nil;
  return self;
  }

=:

/*==================== DO NOT REMOVE    EDIT ============================

       This comment and the following sccsId declaration are managed
       by SCCS for you. Do not edit or remove either.

       Source file:     /users/bmw/Alpha/Charts/SCCS/s.ChartEdit.m
       Latest version:  1.6
       Last mod time:   09/13/89 at 14:56:51

=======================================================================*/

static char *sccsId = "@(#)ChartEdit.m rev 1.6 created on 09/13/89 at 14:56:51";

/*==================== DO NOT REMOVE OR EDIT ==========================*/

#include "objc.h"
#include "uil.h"
#include "BMWGlobal.h"

@requires ChartDAEdit,BM_BarMenu,Menu;
@requires CSMore,SDialogBox;

static id _myMenu;

@requires BM_BarMenu;

= ChartEdit:ChartLayer(BM_WorkstationMsgs,UIMESSAGES)
  {
  id template;
  }


- defaultBarMenu
  {
  return [BM_BarMenu createInterfaceFor:[self defaultMenu] client:self];
  }


+ createInterfaceFor:aChart parent:aParent
```

```
{
self = [self new];
parent = aParent;

[self document:aChart];
[self template:[aChart template]];

return self;
}


+ dataLayerFactoryObject
{
 return ChartDAEdit;
}


- document:aChart
{
if (document)
   document = [document free];
document = aChart;
return self;
}


- template:aChartTemplate
{
if (template)
   [template removeDependent:self];
template = aChartTemplate;
[template addDependent: self];
[self format];

return self;
}


- freeParts
{
unsigned i;

if (dataArea)
   for (i = 0; i<[dataArea size]; i++)
       [[template dataArea] removeDependent:[dataArea at:i]];

return [super freeParts];
}


- freeDataParts
{
unsigned i;

if (dataArea)
   {
   for (i = 0; i<[dataArea size]; i++)
       [[template dataArea] removeDependent:[dataArea at:i]];

   dataArea = [dataArea freeContents];
   dataArea = [dataArea free];
   }
```

```
pages = 0;
currentPage = 0;
currentDA = nil;

[self createData];
return self;
}


- updateMenu
{
[[[[[self defaultMenu] children] at:0] children]
   elementsPerform:@selector(receiver:) with:self];
[[[[[_myMenu children] at:0] children] at:6] selectable:YES];
[[[[[_myMenu children] at:0] children] at:7] selectable:NO];

nextPageMenu = [[[[_myMenu children] at:0] children] at:0];
previousPageMenu = [[[[_myMenu children] at:0] children] at:1];
[self updatePageMenu];
[currentDA updateMenu];

return self;
}


- defaultMenu
{

id subMenu;

if (!(_myMenu))
   {
   _myMenu = [Menu str: "Chart Editor"];
   [_myMenu append:[self defaultViewMenu]];

/*   [_myMenu append: subMenu = [Menu str: "Chart"]];
     [subMenu append: [Menu str: "Page Size"
           selector: @selector(pageSizeFromUser) receiver: self]];
*/
   [_myMenu append:[currentDA defaultMenu]];
   }
return [_myMenu shared$];
}



- pageSizeFromUser
{
id db, aQuad;
id pointStr;
PT aPoint;

db = [SDialogBox new];
aPoint = [template pageSize];
pointStr = [CSMore fromInt: X(aPoint)];
[db addEntryLabeled: "Width :" defaultValue: [pointStr str]];
[pointStr free];
pointStr = [CSMore fromInt: Y(aPoint)];
[db addEntryLabeled: "Height:" defaultValue: [pointStr str]];
[pointStr free];
[db acceptSelector: @selector(pageSizeFromUser:) receiver: self];
[db cancelSelector: @selector(cancel:) receiver: self];
[db extent: [db defaultExtent]];
```

```
 aQuad = [baseLayer insideQuad];
 [[db center:[self center]] translateWithin:aQuad];
 [db attachTo: baseLayer];

 [db show];
 aQuad = [aQuad free];
 [db modalActivate];
 [db delete];

 return self;
 }


- pageSizeFromUser:aStringDialogBox
 {
 short xPoint,yPoint;

 [aStringDialogBox erase];
 [aStringDialogBox modalDeactivate];
 xPoint =  [aStringDialogBox valueAsIntAt:0];
 yPoint =  [aStringDialogBox valueAsIntAt:1];
 [template pageSize:pt(xPoint,yPoint)];

 return self;
 }



- update:anObject because:(SEL)aSelector
 {
 id chartWndw;
 PT oldOrigin;

 if (anObject == template)
    {
    if (aSelector == @selector(free))
       {
       template = nil;
       return self;
       }
   else if (aSelector == @selector(pageSize:))
       {
       [self format];
       return self;
       }
   }
 return [super update: anObject because: aSelector];
 }



- (BOOL)leftButtonDown
 {
 return YES;
 }



- plotFromUser
 {
 [currentDA plotChart];
 return self;
 }
```

```
- initialize
 {
 [super initialize];
 template = nil;
 return self;
 }


=:

/*==================== DO NOT REMOVE   EDIT ============================

       This comment and the following sccsId declaration are managed
       by SCCS for you. Do not edit or remove either.

       Source file:     /users/bmw/Alpha/Charts/SCCS/s.ChartLayer.m
       Latest version:  1.7
       Last mod time:   09/13/89 at 14:57:04

======================================================================*/

static char *sccsId = "@(#)ChartLayer.m rev 1.7 created on 09/13/89 at 14:57:04";

/*==================== DO NOT REMOVE OR EDIT ==========================*/

#include "objc.h"
#include "uil.h"
#include "BMWGlobal.h"

@requires OrdCltn,ChartDALayer;


= ChartLayer:DocumentLayer(BM_WorkstationMsgs,UIMESSAGES)
  {
  }

+ dataLayerFactoryObject
  {
   return ChartDALayer;
  }


- createData
  {
  id aPage;
  id dataAreaTemplate;  // DataArea
  unsigned currentIndex, currentSet, loopIndex;

  id dataLayerFactoryObject = [[self class] dataLayerFactoryObject];

  dataAreaTemplate = [[document template] dataArea];

  currentIndex = 0;
  loopIndex = 0;
  dataArea = [OrdCltn new];

  while (currentIndex<[[document data] numberOfElements])
     {
     currentSet = 0;
     while (currentSet < [[document data] nSets])
        {
        loopIndex = currentIndex;
        aPage = [dataLayerFactoryObject extent:dataAreaSize
```

```
          template:dataAreaTemplate parent:self];
       [aPage origin:dataAreaOrigin];
       [aPage startingSet:currentSet startingRow:loopIndex
          data:[document data]];
       currentSet = [aPage endingSet] + 1;
       [dataArea add:aPage];
       pages++;
       }
    currentIndex = [aPage endingRow] + 1;
    }
 if (pages>0)
    [self currentPage:1];
 return self;
 }


- printDocument:(int)sIndex to:(int)eIndex
 {
 short index;

 for (index=sIndex;index<=eIndex;index++)
     {
     [self currentPage:index];
     [currentDA printChart];
     }

 return self;
 }


- extent:(PT)aPoint
 {
 BOOL flag = NO;
 id   cTemplate = [document template];

 if ([self visible])
    {
    flag = YES;
    [self setVisible:NO];
    [[parent horizontalBar] setVisible:NO];
    }
 [super extent:aPoint];

 if (! (ptIsEqual([cTemplate pageSize],aPoint)) )
    [cTemplate pageSize:aPoint];
 else if (flag)
    {
    [self setVisible:YES];
    [[parent horizontalBar] setVisible:YES];
    }

 return self;
 }


=:
```

```
/*==================== DO NOT REMOVE    :DIT ============================

        This comment and the following sccsId declaration are managed
        by SCCS for you. Do not edit or remove either.

        Source file:     /users/bmw/Alpha/Charts/SCCS/s.ChartWin.m
        Latest version:  1.5
        Last mod time:   09/11/89 at 19:32:06

=========================================================================*/

static char *sccsId = "@(#)ChartWin.m rev 1.5 created on 09/11/89 at 19:32:06";

/*==================== DO NOT REMOVE OR EDIT ===========================*/

#include "objc.h"
#include "uil.h"
#include "BMWGlobal.h"

@requires BitMap,ChartEdit;

static id _myIconImage;

= ChartWin:DocumentWin(BM_WorkstationMsgs,UIMESSAGES)
  {
  }


+ documentLayerFactoryObject
 {
 return ChartEdit;
 }


- (STR)extensionSTR
  {
  return ".cht";
  }


- defaultIcon
  {
  if (_myIconImage == nil)
     _myIconImage = [BitMap readFrom:"icons/Chart.icon"];

  return [_myIconImage shared$];
  }

=:

/*==================== DO NOT REMO\    : EDIT ============================

        This comment and the following sccsId declaration are managed
        by SCCS for you. Do not edit or remove either.

        Source file:     /users/bmw/Alpha/Charts/SCCS/s.ChtDAEdit.m
        Latest version:  1.4
        Last mod time:   09/11/89 at 19:32:47

=========================================================================*/

static char *sccsId = "@(#)ChtDAEdit.m rev 1.4 created on 09/11/89 at 19:32:47";

/*==================== DO NOT REMOVE OR EDIT ===========================*/
```

```
#include "objc.h"
#include "uil.h"
#include "BMWGlobal.h"


@requires BM_PromptBox,BM_AskDialogBox,Menu;

static id _myMenu;

= ChartDAEdit:ChartDALayer(BM_WorkstationMsgs,UIMESSAGES)
  {
  }


- template:aDataAreaTemplate
  {
  if (template)
     [template removeDependent:self];
  template = aDataAreaTemplate;
  [template addDependent:self];
  [self preformat];
  return self;
  }


- offsetErrorMessage
  {
  [BM_PromptBox askSTR:"Error - Data offset is out of bounds" client:self];
  return self;
  }


- cancel:aStringDB
  {
  [aStringDB modalDeactivate];
  return self;
  }


- dataSortFromUser
  {
  id response;

  response = [BM_AskDialogBox askSTR:"Enter column offset:" defaultValue:"0"
     client:self];
  if (response)
     {
     short number = atoi([response str]);
     if ( (number < [[template titles] size]) && (!(number < 0)) )
        [template sortColumn:number];
    else
        [self offsetErrorMessage];
     }
   return response;
   }


 - sortAsReceived
   {
   [template normalSort];
   return self;
   }
```

```
- sortAscending
  {
  id response;

  response = [self dataSortFromUser];
  if (response)
     {
     [response free];
     [template ascendingSort];
     }
  return self;
  }


- sortDescending
  {
  id response;

  response = [self dataSortFromUser];
  if (response)
     {
     [response free];
     [template descendingSort];
     }
  return self;
  }



- updateMenu
  {
  [[[self defaultMenu] children]
     elementsPerform:@selector(receiver:) with:self];

  return self;
  }



- chartType:(short)aChartType
  {
  [template chartType:aChartType];
  return [parent freeDataParts];
  }



- chartTypeFromUser:aMenuItem
  {
  STR aChartType;
  short chartType;

  aChartType = [[aMenuItem menu] str];
   if (! (strcmp(aChartType,"Column")) )
       chartType = COLUMN;
   else if (! (strcmp(aChartType,"Bar")) )
       chartType = BAR;
   else if (! (strcmp(aChartType,"Line")) )
      chartType = LINE;
   else if (!(strcmp(aChartType,"Pie")))
      chartType = PIE;
   else if (! (strcmp(aChartType,"Histogram")) )
      chartType = HISTOGRAM;
```

```
  else if (! (strcmp(aChartType,"Scatter")) )
     chartType = SCATTER;

  return [self chartType:chartType];
  }


- defaultMenu
  {
  if (!(_myMenu))
     {
     _myMenu = [Menu str: "Chart Type"];
     [_myMenu append: [Menu str:"Column"
            selector:@selector(chartTypeFromUser:) receiver: self]];
     [_myMenu append: [[Menu str:"Bar"
            selector:@selector(chartTypeFromUser:) receiver: self]
            selectable:NO]];
     [_myMenu append: [Menu str:"Line"
            selector:@selector(chartTypeFromUser:) receiver: self]];
     [_myMenu append: [Menu str:"Pie"
            selector:@selector(chartTypeFromUser:) receiver: self]];
     [_myMenu append: [Menu str:"Histogram"
            selector:@selector(chartTypeFromUser:) receiver: self]];
     [_myMenu append: [[Menu str:"Scatter"
            selector:@selector(chartTypeFromUser:) receiver: self]
            selectable:NO]];
     }
  return [_myMenu shared$];
  }


=:

/*===================== DO NOT REMOVI    EDIT =============================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "@(#)ChtDALayer.m work in progress by bmw";

/*===================== DO NOT REMOVE OR EDIT ===========================*/

#include <stdio.h>
#include <string.h>
#include "objc.h"
#include "uil.h"
#include "BMWGlobal.h"

static unsigned histWidth = 3;
static NUMBER   histResolution = 0.1;


@requires CharString,BM_Matrix,OrdCltn;

= ChartDALayer:BM_VECLayer(BM_WorkstationMsgs,UIMESSAGES)
  {
  id data;
  id template;
```

```
int startingSet;
int numberOfColumns;
int startingRow;
int numberOfRows;

BOOL formatted;       // Flag indicating whether page has been formatted

int columnOffset;     // offset of dataset being currently manipulated

id parent;

id labelsExtract;
id matrixExtract;

id values;
id xValues;
}


+ createInterfaceFor:aDataArea parent:aParent
{
self = [super new];
parent = aParent;
[self template:aDataArea];
[self extent:[self defaultExtent]];

return self;
}


+ extent:(PT)aPoint template:aDataArea parent:aParent
{
self = [super new];
parent = aParent;
[self extent:aPoint];

template = aDataArea;
[template addDependent:self];

return self;
}


- initialize
{
[super initialize];
[self borderWidth:0];

numberOfColumns = 0;
startingSet     = 0;
numberOfRows    = 0;
startingRow     = 0;

formatted = NO;
return self;
}


- reinitialize
{
numberOfColumns = 0;
numberOfRows    = 0;
```

```
 [matrixExtract free];
 [labelsExtract free];

 [values free];
 [xValues free];

 formatted      = NO;
 return self;
 }


- terminate$
 {
 [self changed:@selector(terminate$)];
 [self reinitialize];
 [template removeDependent:self];
 return [super terminate$];
 }



- template
 {
 return template;
 }


- (int)startingSet
 {
 return startingSet;
 }


- (int)endingSet
 {
 return startingSet + numberOfColumns - 1;
 }

- (int)startingRow
 {
 return startingRow;
 }


- (int)endingRow
 {
 return startingRow + numberOfRows - 1;
 }


- formatted:(BOOL)aFlag
 {
 formatted = aFlag;
 return self;
 }


- (BOOL)formatted
 {
 return formatted;
 }
```

```
- (unsigned)columnOffset
  {
  return columnOffset;
  }


- columnOffset:(unsigned)anOffset
  {
  columnOffset = anOffset;
  return self;
  }


- (PT)defaultExtent
  {
  return pt(630,590);
  }


- template:aDataAreaTemplate
  {
  template = aDataAreaTemplate;
  [self preformat];
  return self;
  }


- data:aData
  {
  data = aData;
  [self preformat];
  return self;
  }


- preformat
  {
  if (template == nil)
     return self;

  [self reinitialize];
  [self calculateLayout];
  return self;
  }


- format
  {
  if (!formatted)
    {
    unsigned numberOfSlots;

    matrixExtract = [[data at:0] extractRowsFrom:startingRow
                                              To:[self endingRow]];
    [matrixExtract nameSTR:[[data at:0] nameSTR]];
    [matrixExtract description:[CharString str:[[data at:0] descriptionSTR]]];

    switch ([template chartType])
       {
       case HISTOGRAM: numberOfSlots = (2 * histWidth / histResolution + 1);
                  xValues = [BM_Matrix nRows:1
                                      nColumns:numberOfSlots
                                      fillWith:histResolution];
```

```
                    [[xValues cumulate]
                       addScalar:(NUMBER)(-1.0*histWidth-histResolution)];
                    break;
        case SCATTER:  break;
        case LINE:
        case COLUMN:
        case BAR:
        case PIE:      if ([template chartType] == PIE)
                          {
                           values  = [[matrixExtract copy] transpose];
                           xValues = [self defaultXValues:values];
                          }
                       else
                          xValues = [self defaultXValues:matrixExtract];

                       labelsExtract = [[data categoryLabels]
                                          extractRowsFrom:startingRow
                                                    To:[self endingRow]];
                       break;
      }

    [self formatted:YES];
    }
  return self;
  }


- calculateRows
  {
  if ( ([template chartType] == BAR) || ([template chartType] == COLUMN) ||
       ([template chartType] == LINE) )
     numberOfRows = 14;
  else if ([template chartType] == PIE)
     numberOfRows = 30;
  else
     numberOfRows = [[data at:0] nRows];

  if (numberOfRows > [[data at:0] nRows] - startingRow)
     numberOfRows = [[data at:0] nRows] - startingRow;
     {
     if ( aSelector == @selector(ascendingSort) ||
          aSelector == @selector(descendingSort) ||
          aSelector == @selector(normalSort))
       {
       if ((data) && (formatted))
          {
          [data sortTable:[template sortType] column:[template sortColumn]];
          [self reinitialize];
          if (self == [parent currentDA])
             [self display];
          }
       }
     else if (aSelector == @selector(free))
            template = nil;
     }

   [super update: anObject because: aSelector];
   return self;
   }


- (BOOL)leftButtonDown
```

```
{
return YES;
}


- printChart
{
[self printOn:"-oraw -onb" deviceType:"hp150"];
return self;
}


- plotChart
{
[self printOn:"-dplotter" deviceType:"hp7475a"];
return self;
}


// Graphics methods

- defaultXValues:aMatrix
{
id xVals = [BM_Matrix nRows:1 nColumns:[aMatrix nColumns] fillWith:1.0];

if (xVals != nil)
   [xVals cumulate];

return xVals;
}


- plot:aMatrix xValues:xVector plotType:(int)chartType
          fillBelow:(BOOL)fill showLegend:(BOOL)showLegend
                             legendLabels:legendLabels
                             pointLabels:pointLabels
                                  title1:(STR)title1
                                  title2:(STR)title2
                                  title3:(STR)title3
                                    tle4:(STR)title4
                                  xLabel:(STR)xLabel
                                  yLabel:(STR)yLabel
{
id dataSet,
   dataSets;
unsigned row;


[self beginPlotting:chartType showLegend:showLegend
                title1:title1 title2:title2 title3:title3
                title4:title4 xLabel:xLabel yLabel:yLabel];

dataSets = [OrdCltn new:0];

for(row = 0; (row < [aMatrix nRows]) && (row < 14); row++)
   {
   dataSet = [xVector copy];
   dataSet = [[dataSet
      concatenateWith:[aMatrix extractRowsFrom:row To:row]]transpose];

   [dataSet substituteForNull:0.0];
```

```
  if (dataSet != nil)
     {
     [self addDataSet:dataSet setNumber:(unsigned)row
              legendLabel:[[legendLabels at:row] str]
                 nPoints:(unsigned)[aMatrix nColumns]
              pointLabels:pointLabels
                chartType:(int)chartType
                    fill:(BOOL)fill];

     [dataSets add:dataSet];
     }
  else
     return nil;
  }

[self finishPlotting];

[dataSets freeContents];
[dataSets free];

return self;
}


- linePlot
{
[self plot:matrixExtract xValues:xValues
              plotType:LINE fillBelow:NO showLegend:YES
                                    legendLabels:labelsExtract
                                     pointLabels:nil
                                          title1:[matrixExtract nameSTR]
                                          title2:""
                                          title3:""
                                          title4:""
                                          xLabel:[matrixExtract descriptionSTR]
                                          yLabel:""];
return self;
}


- barPlot
{
[self plot:matrixExtract xValues:xValues
              plotType:COLUMN    3elow:NO showLegend:YES
                                    legendLabels:labelsExtract
                                     pointLabels:nil
                                          title1:[matrixExtract nameSTR]
                                          title2:""
                                          title3:""
                                          title4:""
                                          xLabel:[matrixExtract descriptionSTR]
                                          yLabel:""];
return self;
}


- piePlot
{
[self plot:values xValues:xValues
              plotType:PIE fillBelow:NO showLegend:NO
                                   legendLabels:nil
                                    pointLabels:labelsExtract
                                         title1:[matrixExtract nameSTR]
```

```
                                        title2:[matrixExtract descriptionSTR]
                                        title3:""
                                        title4:""
                                        xLabel:""
                                        yLabel:""];
return self;
}


- scatterPlot
{
return [self plot:matrixExtract xValues:xValues
        plotType:SCATTER fillBelow:NO showLegend:NO
                                 legendLabels:nil
                                  pointLabels:nil
                                         title1:[matrixExtract nameSTR]
                                         title2:""
                                         title3:""
                                         title4:""
                                         xLabel:""
                                         yLabel:""];
}



- histogram
{
NUMBER delta,
       minimum    = [matrixExtract minimumStatistic],
       maximum    = [matrixExtract maximumStatistic],
       mean       = [matrixExtract mean:nil],
       stddev     = [matrixExtract stddev:nil],
       minimumValueConsidered;
id     frequencies,
       title3,
       title4;
int    index;
       unsigned n;
       unsigned slotNumber;

unsigned numberOfSlots = (2 * histWidth / histResolution + 1);

frequencies = [BM_Matrix nRows:1 nColumns:numberOfSlots fillWith:0.0];

delta = stddev * histResolution;

minimumValueConsidered = (mean - ('   Width * stddev) - (delta / 2));

n = 0;
for (index = [matrixExtract size]; index != 0; index--)
    if ([matrixExtract getFlagValue:index-1] == YES)
       {
       if (delta != 0)
          slotNumber = (((NUMBER) [matrixExtract numberAt:index-1] -
                          minimumValueConsidered)/delta);
       else
           slotNumber = numberOfSlots / 2;

       if ((slotNumber >= 0) && (slotNumber < numberOfSlots))
          [frequencies numberAt:slotNumber add:1.0];

       n += 1;
       }
```

```
 if (n == 0)
    {
    minimum = 0;
    maximum = 0;
    mean    = 0;
    stddev  = 0;
    }

 [self plot:frequencies xValues:xValues plotType:HISTOGRAM
                        fillBelow:YES
                       showLegend:NO
                     legendLabels:nil
                      pointLabels:nil
                           title1:[matrixExtract nameSTR]
                           title2:[matrixExtract descriptionSTR]
                           title3:[title3=[CharString
                              sprintf:"Low: %5.3f  Mean: %5.3f High: %5.3f",
                                 minimum, mean, maximum] str]
                           title4:[title4=[CharString
                              sprintf:"Std. Dev.: %5.3f  Sample size: %u", stddev, n] str]
                           xLabel:"Std. Deviations Around Mean"
                           yLabel:"Occurrences"];

 [title3 free];
 [title4 free];
 [frequencies free];
 return self;
 }



=:

 return self;
 }


- calculateColumns
 {
 numberOfColumns = [data nSets];

 return self;
 }


- calculateLayout
 {
 [self calculateColumns];
 [self calculateRows];
 return self;
 }



- startingSet:(int)theStartingSet startingRow:(int)theStartingRow
        data:aData
 {
 startingSet = theStartingSet;
 startingRow = theStartingRow;

 [self data:aData];
 return self;
 }
```

```
- drawContents
  {
   switch ([template chartType])
      {
       case BAR:        [self barPlot];
                        break;
       case COLUMN:     [self barPlot];
                        break;
       case LINE:       [self linePlot];
                        break;
       case PIE:        [self piePlot];
                        break;
       case HISTOGRAM:[self histogram];
                        break;
       case SCATTER:    [self scatterPlot];
                        break;
      }

   return self;
  }


- displayLayer
 {
  if (!formatted)
     [self format];

  return [super displayLayer];
 }


- update: anObject because: (SEL)aSelector
 {
 if (anObject == template)

/*===================== DO NOT REMOV!    EDIT =============================

       This comment and the following sccsId declaration are managed
       by SCCS for you. Do not edit or remove either.

       Source file:     /users/bmw/Alpha/Charts/SCCS/s.ChtDataArea.m
       Latest version:  1.3
       Last mod time:   09/08/89 at 14:30:54

========================================================================*/

static char *sccsId = "@(#)ChtDataArea.m rev 1.3 created on 09/08/89 at 14:30:54";

/*===================== DO NOT REMOVE OR EDIT ============================*/

#include "objc.h"
#include "uil.h"
#include "BMWGlobal.h"

= ChartDataArea:DataArea(BM_WorkstationMsgs,UIMESSAGES)
  {
  short chartType;
  }


- initialize
```

```
  {
  [super initialize];
  chartType = COLUMN;

  return self;
  }


- chartType:(short)aChartType
  {
  chartType = aChartType;
  [self changed:@selector(chartType:)];
  return self;
  }


- (short)chartType
  {
  return chartType;
  }

=:

/*===================== DO NOT REMOV    EDIT ==============================

        This comment and the following sccsId declaration are managed
        by SCCS for you. Do not edit or remove either.

        Source file:     /users/bmw/Alpha/Charts/SCCS/s.ChtDataCltn.m
        Latest version:  1.1
        Last mod time:   09/08/89 at 14:37:55

==========================================================================*/

static char *sccsId = "@(#)ChtDataCltn.m rev 1.1 created on 09/08/89 at 14:37:55";

/*===================== DO NOT REMOVE OR EDIT ============================*/

#include "objc.h"
#include "uil.h"
#include "BMWGlobal.h"

@requires BM_StringMatrix,BM_Matrix;

= ChartDataCltn:DataCltn(BM_WorkstationMsgs,UIMESSAGES)
  {
  id categoryLabels,seriesLabels;
  }


- initialize
  {
  [super initialize];
  categoryLabels = nil;
  seriesLabels = nil;

  return self;
  }


- categoryLabels:aStrMatrix
```

```
{
if (categoryLabels)
   categoryLabels = [categoryLabels free];
categoryLabels = aStrMatrix;
return self;
}


- categoryLabels
{
return categoryLabels;
}


- seriesLabels:aStrMatrix
{
if (seriesLabels)
   seriesLabels = [seriesLabels free];
seriesLabels = aStrMatrix;
return self;
}


- seriesLabels
{
return seriesLabels;
}
- terminate$
{
if (categoryLabels)
   categoryLabels = [categoryLabels free];
if (seriesLabels)
   seriesLabels = [seriesLabels free];

return [super terminate$];
}

=:

/*===================== DO NOT REMOVE    EDIT ============================

       This comment and the following sccsId declaration are managed
       by SCCS for you. Do not edit or remove either.

       Source file:     /users/bmw/Alpha/Research/SCCS/s.CharactWin.m
       Latest version:  1.4
       Last mod time:   09/08/89 at 14:39:01

==========================================================================*/

static char *sccsId = "@(#)CharactWin.m rev 1.4 created on 09/08/89 at 14:39:01";

/*===================== DO NOT REMOVE OR EDIT ===========================*/

#include "objc.h"
#include "uil.h"
#include "BMWGlobal.h"

@requires InsetLayer,CharString,PushButton;
@requires DateLayer,CurrencyLayer,BorderLayer,BM_StringMatrix;
@requires CompULayer,UniverseLayer;
@requires BitMap,InnerWindow;
```

```
static id _myIconImage;

= CharactWin:VRLOutputWin(BM_WorkstationMsgs,UIMESSAGES)
  {
  id initialULayer,comparisonULayer;
  id chartLayer;
  }


- defaultIcon
  {
  if (_myIconImage == nil)
     _myIconImage = [BitMap readFrom:"icons/CharactWin.icon"];

  return [_myIconImage shared$];
  }



- (STR)extensionSTR
  {
  return ".cwr";
  }



- (PT)defaultExtent
  {
  return pt(1062,505);
  }


- open
  {
  if (!opened)
     {
     opened = YES;
     [self openWindow];
     }
  return self;
  }
- compose
  {
  id dataList;
  id button1,button2;
  id saveButton,printButton,quitButton,plotButton;

  [self title:"characteristics"];
  [self show];

  initialULayer = [CompULayer attachTo:applicationLayer
     at:pt(SPACING,SPACING)];
  [initialULayer myTitle:"BENCHMARK LIST"];
  [initialULayer compose];
  [initialULayer show];

  comparisonULayer = [[CompULayer attachTo:applicationLayer] outsideOrigin:
     pt([initialULayer adjacentLeft]+1,
        [initialULayer adjacentBottom]+SPACING)];
  [comparisonULayer myTitle:"COMPARISON LIST"];
  [comparisonULayer compose];
```

```
[[[comparisonULayer [button1a] myLabel] assignSTR:"xxxxxx"];
[[[comparisonULayer [button1a] myLabel] extent:
   [[[comparisonULayer [button1a] myLabel] defaultExtent]];
[[comparisonULayer [button1a] extent:
   [[comparisonULayer [button1a] defaultExtent]];

[[[comparisonULayer [button1b] myLabel] assignSTR:"xxxxxx"];
[[[comparisonULayer [button1b] myLabel] extent:
   [[[comparisonULayer [button1b] myLabel] defaultExtent]];
[[comparisonULayer [button1b] extent:
   [[comparisonULayer [button1b] defaultExtent]];
[comparisonULayer show];

dateLayer = [[DateLayer
  origin:pt([initialULayer left],[comparisonULayer adjacentBottom]+SPACING)]
     attachTo:applicationLayer];
[dateLayer compose];
[dateLayer show];

currencyLayer = [[CurrencyLayer attachTo:applicationLayer] outsideOrigin:
   pt([dateLayer adjacentRight]+SPACING,[dateLayer adjacentTop]+1)];
[currencyLayer compose];
[currencyLayer show];

resultsLayer = [[[[InsetLayer new]
   outsideExtent:pt(3*[dateLayer outsideHeight]+2*SPACING,
                   3*[dateLayer outsideHeight]+2*SPACING)]
   outsideOrigin:pt([initialULayer adjacentRight]+SPACING,
                   [initialULayer adjacentTop]+1)]
   attachTo:applicationLayer];
[resultsLayer insideColor:BM_colors.Background];
[resultsLayer show];

dataList = [[InnerWindow attachTo:applicationLayer] outsideExtent:
   pt(205,2*[dateLayer outsideHeight]+SPACING+41)];
[dataList outsideOrigin:
   pt([resultsLayer adjacentRight]+SPACING,[resultsLayer adjacentTop])];
[dataList insideColor:BM_colors.Frame];
[dataList myTitle:"DATA ITEMS"];

dataCltn = [[self interpreter] dataItemList];
dataLB = [self addListBox:dataCltn
   width:[dataList outsideWidth]-2*INNERSPACING lines:16];
[[dataLB attachTo:dataList] outsideOrigin:
   pt([dataList adjacentLeft]+INNEF    ING,[dataList adjacentTop]+40)];
[dataList show];

button1 = [[[PushButton str:"Bar" font:BM_fonts.Application]
   outsideExtent:pt(BTNWIDTH,BTNHEIGHT)] color:BM_colors.Foreground];
[button1 myPicture:[BitMap readFrom:"./icons/bar.icon"]];

button2 = [[[PushButton str:"Line" font:BM_fonts.Application]
   outsideExtent:pt(BTNWIDTH,BTNHEIGHT)] color:BM_colors.Foreground];
[button2 myPicture:[BitMap readFrom:"./icons/line.icon"]];

controlLayer = [[InsetLayer origin:pt([dataList left],
   [dataList adjacentBottom]+SPACING)]
      extent:pt([dataList width],[currencyLayer height]-41)];
[controlLayer insideColor:BM_colors.Frame];
[controlLayer attachTo:applicationLayer];

[button1 attachTo:controlLayer at:pt(25,SPACING)];
[[button2 attachTo:controlLayer]
   outsideOrigin:pt([button1 adjacentRight]+1,[button1 adjacentTop]+1)];
```

```
    saveButton = [[PushButton str:"Save" font:BM_fonts.Application]
       outsideExtent:pt(BTNWIDTH,BTNHEIGHT)];
    [[saveButton onSelector:@selector(saveFile:) onReceiver:self
       onArgument:chartLayer] offColor:BM_colors.Frame];

    quitButton = [[[PushButton str:"Quit" font:BM_fonts.Application]
       outsideExtent:pt(BTNWIDTH,BTNHEIGHT)] offColor:BM_colors.Frame];

    plotButton = [[PushButton str:"Plot" font:BM_fonts.Application]
       outsideExtent:pt(BTNWIDTH,BTNHEIGHT)];
    [[[plotButton onSelector:@selector(plotChart)] onReceiver:self]
       offColor:BM_colors.Frame];

    printButton = [[PushButton str:"Print" font:BM_fonts.Application]
       outsideExtent:pt(BTNWIDTH,BTNHEIGHT)];
    [[[printButton onSelector:@selector(printChart)] onReceiver:self]
       offColor:BM_colors.Frame];

    [[plotButton attachTo:controlLayer]
       outsideOrigin:pt([button1 adjacentLeft]+1,[button2 adjacentBottom]+3)];
    [[printButton attachTo:controlLayer]
       outsideOrigin:pt([button2 adjacentLeft]+1,[plotButton adjacentTop]+1)];
    [[saveButton attachTo:controlLayer]
       outsideOrigin:pt([button1 adjacentLeft]+1,[plotButton adjacentBottom]+1)];
    [[quitButton attachTo:controlLayer]
      outsideOrigin:pt([printButton adjacentLeft]+1,[saveButton adjacentTop]+1)];

    [controlLayer show];

    return self;
    }


  - initialize
    {
    [super initialize];
    [self extent:pt(1082,505)];
    [self insideColor:BM_colors.Frame];
    chartLayer = nil;
    return self;
    }


  - askDelete
    {
    return [self delete];
    }

  =:

/*===================== DO NOT REMOV'   EDIT ==============================

       This comment and the following sccsId declaration are managed
       by SCCS for you. Do not edit or remove either.

       Source file:     /users/bmw/Alpha/Research/SCCS/s.ChtSpecsWin.m
       Latest version:  1.11
       Last mod time:   09/15/89 at 20:43:18

=========================================================================*/

static char *sccsId = "@(#)ChtSpecsWin.m rev 1.11 created on 09/15/89 at 20:43:18";
```

```
/*===================== DO NOT REMOVE OR EDIT ===========================*/

#include "objc.h"
#include "uil.h"
#include "BMWGlobal.h"
#include "BMGFXInterf.h"

@requires UniverseLayer,DateLayer,CurrencyLayer,RangeLayer,HelpLayer;
@requires CharString,InsetLayer,InnerWindow;
@requires BM_ScrollBar,BitMap,PushButton,Cursor;
@requires ChartSpecsEdit,ChartSpecsTemplate;

static id _myIconImage;

= ChartSpecsWin: VRLOutputWin (BM_WorkstationMsgs, UIMESSAGES)
  {
  }


- defaultIcon
  {
  if (_myIconImage == nil)
     _myIconImage = [BitMap readFrom:"icons/ChartWin.icon"];

  return [_myIconImage shared$];
  }



- (STR)extensionSTR
  {
  return ".cwr";
  }



- (STR)name
  {
  return "Charts";
  }



- (PT)defaultExtent
  {
  return pt(965,658);
  }



- openModel
  {
  if (!model)
     [super openModel];
  else
     {
     [super openModel];

     if ([[[template dataArea] chartItems] size] > 0)
        {
        BOOL foundDataItem = NO;
        id tempString = [CharString
           str:[[[[template dataArea] chartItems] at:0] str]];
```

```
        [[dataLB repDALayer] containsSelectionPt:pt(0,0)];
        [[dataLB repDALayer] findString:[tempString str]];
        if (! (_dictcmp([[[dataLB repDALayer] selectionItem] str],
                      [tempString str])) )
          foundDataItem = YES;

         if ( (!foundDataItem) && ([userDataLB myDataCltn]) )
           {
           [[userDataLB repDALayer] containsSelectionPt:pt(0,0)];
           [[userDataLB repDALayer] findString:[tempString str]];
           if (!(_dictcmp([[[userDataLB repDALayer] selectionItem] str],
                        [tempString str])) )
             foundDataItem = YES;
           }

        if (!foundDataItem)
          {
          id message = [CharString
            sprintf:"Cannot retrieve data item, %s",[tempString str]];
          [self displayErrorPrompter:message];
          message = [message free];
          }
        else
          [self generateChart:[[template dataArea] chartType]];

        tempString = [tempString free];
        }
    }
  return self;
  }


- update:anObject because:(SEL)aSelector
  {
  if (aSelector==@selector(updateSelectionItem))
    {
    [self addDS:anObject];
    return self;
    }
  return [super update:anObject because:aSelector];
  }


- addDS:aRepDALayer
  {
  short anOffset;
  STR dataTitle;

  dataTitle = [[aRepDALayer selectionItem] str];

  if ([[[template dataArea] chartItems] size]>0)
    [[[[template dataArea] chartItems] at:0 put:[CharString str:dataTitle]]
      free];
  else
    [[[template dataArea] chartItems] at:0 insert:[CharString str:dataTitle]];
  [self parseMemoStatement:[[template dataArea] chartItems]];
  return self;
  }


- printChart
  {
  if (templateLayer)
    [templateLayer printFromUser];
```

```
return self;
}



- plotChart
{
if (templateLayer)
   [[templateLayer currentDA] plotChart];

return self;
}



- defaultTemplate
{
id cTemplate;
cTemplate = [ChartSpecsTemplate new];
[cTemplate pageSize:pt(522,495)];

return cTemplate;
}


- templateLayer:aChart
{
if (templateLayer)
   {
   id oldChart = [templateLayer document];
   [oldChart removeTemplate];
   [templateLayer document:aChart];
   [templateLayer format];
   }
else
   {
   id chartMenuBar;
   templateLayer = [ChartSpecsEdit createInterfaceFor:aChart parent:self];
   chartMenuBar = [templateLayer defaultBarMenu];
   [[[chartMenuBar attachTo:resultsLayer]
     outsideWidth:[resultsLayer width]] outsideOrigin:[resultsLayer origin]];
   [[templateLayer attachTo:resultsLayer]
     outsideOrigin:pt([chartMenuBar adjacentLeft]+1,
                   [chartMenuBar adjacentBottom])];

   [templateScrollBar client:templateLayer];
   [chartMenuBar show];
   [templateLayer show];
   [templateScrollBar repaint];
   }
return self;
}
- generateChart:(short)aChartType
{
id chartItems;

[Cursor push:cursors.Wait];
[statusMonitor traversal];

chartItems = [[template dataArea] chartItems];

if ([chartItems size]>0)
```

```
    {
    id aChart;

    [self runModel];

    if (aChart = [dataTree value])
       {
       [statusMonitor graphics];

       [[template dataArea] chartType:aChartType];
       [aChart template:template];
       [self templateLayer:aChart];
       }
    }
 else
    {
    id message = [CharString str:"Select data item from list!"];
    [self displayErrorPrompter:message];
    message = [message free];
    }

 [statusMonitor normalStatus];
 [Cursor pop];
 return self;
 }



- compose
 {
 id button1,button2,button3,button4,button5;
 id dataList,userDataList;
 id saveButton,printButton,quitButton,plotButton,printMButton;

 universeLayer = [UniverseLayer attachTo:applicationLayer
    at:pt(SPACING,SPACING)];
 [universeLayer parent:self];
 [universeLayer researchWin:self];
 [universeLayer compose];
 [universeLayer myTitle:"UNIVERSE"];
 [universeLayer show];

 dateLayer = [[DateLayer attachTo:applicationLayer] outsideOrigin:
   pt([universeLayer adjacentLeft]+1,[universeLayer adjacentBottom]+SPACING)];
 [dateLayer parent:self];
 [dateLayer researchWin:self];
 [dateLayer compose];
 [dateLayer show];

 currencyLayer = [[CurrencyLayer attachTo:applicationLayer] outsideOrigin:
    pt([dateLayer adjacentLeft]+1,[dateLayer adjacentBottom]+SPACING)];
 [currencyLayer parent:self];
 [currencyLayer researchWin:self];
 [currencyLayer compose];
 [currencyLayer show];
 rangeLayer = [[RangeLayer attachTo:a    cationLayer] outsideOrigin:
    pt([dateLayer adjacentLeft]+1,[currencyLayer adjacentBottom]+SPACING)];
 [rangeLayer parent:self];
 [rangeLayer researchWin:self];
 [rangeLayer compose];
 [rangeLayer show];
```

```
resultsLayer = [InsetLayer new];
[[[resultsLayer outsideExtent:pt(3*[dateLayer outsideHeight]+87,
                    3*[dateLayer outsideHeight]+87+20)]
   outsideOrigin:pt([universeLayer adjacentRight]+SPACING,
                    [universeLayer adjacentTop]+1)]
   attachTo:applicationLayer];
[resultsLayer insideColor:BM_colors.Background];

templateScrollBar = [BM_ScrollBar horizontalInterfaceFor:resultsLayer];
[templateScrollBar noPageMarkers];
[templateScrollBar outsideExtent:
   ptMinus([templateScrollBar defaultExtent],pt(2,0))];
[templateScrollBar borderColor:BM_colors.Border];
[templateScrollBar attachTo:resultsLayer
   at:pt(0,[resultsLayer height]-[templateScrollBar outsideHeight])];
[resultsLayer show];

helpLayer = [HelpLayer attachTo:applicationLayer];
[helpLayer outsideOrigin:pt([resultsLayer adjacentLeft]+1,
   [resultsLayer adjacentBottom]+SPACING)];
[helpLayer outsideWidth:[resultsLayer outsideWidth]];
[helpLayer
   updateHelp:"Select data item from list, establish time period and currency," and:
             "then press chart button to generate cha
[helpLayer show];

dataList = [[InnerWindow attachTo:applicationLayer] outsideExtent:
   pt(205,2*[dateLayer outsideHeight]+SPACING+2)];
[dataList outsideOrigin:pt([resultsLayer adjacentRight]+SPACING,
   [resultsLayer adjacentTop]+1)];
[dataList insideColor:BM_colors.Frame];
[dataList myTitle:"DATA ITEMS"];

dataCltn = [[self interpreter] dataItemList];
dataLB = [self addListBox:dataCltn
   width:[dataList outsideWidth]-2*INNERSPACING lines:14];
[[dataLB attachTo:dataList] outsideOrigin:
   pt([dataList adjacentLeft]+INNERSPACING,[dataList adjacentTop]+40)];
[[dataLB repDALayer] allowMultipleSelection:YES];
[[dataLB repDALayer] addDependent:self];
[dataList show];

userDataList = [[InnerWindow attachTo:applicationLayer] outsideExtent:
   pt(205,[dateLayer outsideHeight]-6)];
[userDataList outsideOrigin:pt([resultsLayer adjacentRight]+SPACING,
   [dataList adjacentBottom]+SPACING)];
[userDataList insideColor:BM_colors.Frame];
[userDataList myTitle:"USER DATA ITEMS"];

userDataCltn = [[self interpreter] newDataItemList];
userDataLB = [self addListBox:userDataCltn
   width:[userDataList outsideWidth]-2*INNERSPACING lines:5];
[[userDataLB attachTo:userDataList] outsideOrigin:
   pt([userDataList adjacentLeft]+INNERSPACING,[userDataList adjacentTop]+40)];
[[userDataLB repDALayer] allowMultipleSelection:YES];
[[userDataLB repDALayer] addDependent:self];
[userDataList show];

button1 = [[[PushButton str:"Bar" font:BM_fonts.Application]
   outsideExtent:pt(63,BTNHEIGHT)] color:BM_colors.Foreground];
[button1 myPicture:[BitMap readFrom   icons/bar.icon"]];
[button1 onSelector:@selector(generateChart:) onReceiver:self
   onArgument:BAR];
```

```
button4 = [[[PushButton str:"Column" font:BM_fonts.Application]
   outsideExtent:pt(94,BTNHEIGHT)] color:BM_colors.Foreground];
[button4 myPicture:[BitMap readFrom:"./icons/bar.icon"]];
[button4 onSelector:@selector(generateChart:) onReceiver:self
   onArgument:BAR];

button2 = [[[PushButton str:"Pie" font:BM_fonts.Application]
   outsideExtent:pt(63,BTNHEIGHT)] color:BM_colors.Foreground];
[button2 myPicture:[BitMap readFrom:"./icons/pie.icon"]];
[button2 onSelector:@selector(generateChart:) onReceiver:self
   onArgument:PIE];

button3 = [[[PushButton str:"Line" font:BM_fonts.Application]
   outsideExtent:pt(63,BTNHEIGHT)] color:BM_colors.Foreground];
[button3 myPicture:[BitMap readFrom:"./icons/line.icon"]];
[button3 onSelector:@selector(generateChart:) onReceiver:self
   onArgument:LINE];

button5 = [[[PushButton str:"Histogram" font:BM_fonts.Application]
   outsideExtent:pt(96,BTNHEIGHT)] color:BM_colors.Foreground];
[button5 myPicture:[BitMap readFrom:"./icons/hist.icon"]];
[button5 onSelector:@selector(generateChart:) onReceiver:self
   onArgument:HISTOGRAM];

controlLayer = [[[InsetLayer attachTo:applicationLayer] outsideOrigin:
   pt([dataList adjacentLeft]+1,[userDataList adjacentBottom]+SPACING)]
      extent:pt([dataList width],[currencyLayer height]+3)];
[controlLayer insideColor:BM_colors.Frame];

[button1 attachTo:controlLayer at:pt(SPACING,SPACING+2)];
[[button2 attachTo:controlLayer]
   outsideOrigin:pt([button1 adjacentRight]+1,[button1 adjacentTop]+1)];
[[button3 attachTo:controlLayer]
   outsideOrigin:pt([button2 adjacentRight]+1,[button1 adjacentTop]+1)];
[[button4 attachTo:controlLayer]
   outsideOrigin:pt([button1 adjacentLeft]+1,[button3 adjacentBottom]+1)];
[[button5 attachTo:controlLayer]
   outsideOrigin:pt([button4 adjacentRight]+1,[button4 adjacentTop]+1)];

saveButton = [[[PushButton str:"Save" font:BM_fonts.Application]
   outsideExtent:pt(63,BTNHEIGHT)] offColor:BM_colors.Frame];
[saveButton onSelector:@selector(saveFile:) onReceiver:self
   onArgument:template];

quitButton = [[[PushButton str:"Quit" font:BM_fonts.Application]
   outsideExtent:pt(63,BTNHEIGHT)] offColor:BM_colors.Frame];

plotButton = [[PushButton str:"Plot" font:BM_fonts.Application]
   outsideExtent:pt(63,BTNHEIGHT)];
[[[plotButton onSelector:@selector(plotChart)] onReceiver:self]
   offColor:BM_colors.Frame];

printButton = [[PushButton str:"Print" font:BM_fonts.Application]
   outsideExtent:pt(63,BTNHEIGHT)];
[[[printButton onSelector:@selector(printChart)] onReceiver:self]
   offColor:BM_colors.Frame];

printMButton = [[PushButton str:"Print VRL" font:BM_fonts.Application]
   outsideExtent:pt(126+1,BTNHEIGHT)];
[[[printMButton onSelector:@selector(printModel)] onReceiver:self]
   offColor:BM_colors.Frame];
```

```
[[plotButton attachTo:controlLayer] sideOrigin:
   pt([button1 adjacentLeft]+1,[button5 adjacentBottom]+9)];
[[printButton attachTo:controlLayer] outsideOrigin:
   pt([plotButton adjacentRight]+1,[plotButton adjacentTop]+1)];
[[printMButton attachTo:controlLayer] outsideOrigin:
   pt([button1 adjacentLeft]+1,[plotButton adjacentBottom]+1)];
[[saveButton attachTo:controlLayer] outsideOrigin:
   pt([printButton adjacentRight]+1,[plotButton adjacentTop]+1)];
[[quitButton attachTo:controlLayer] outsideOrigin:
   pt([printMButton adjacentRight]+1,[printMButton adjacentTop]+1)];

[controlLayer show];

return self;
}

=:

/*==================== DO NOT REMOVE    EDIT ============================

      This comment and the following sccsId declaration are managed
      by SCCS for you. Do not edit or remove either.

      Source file:    /users/bmw/Alpha/Research/SCCS/s.CurrLayer.m
      Latest version: 1.2
      Last mod time:  09/13/89 at 14:57:45

=====================================================================*/

static char *sccsId = "@(#)CurrLayer.m rev 1.2 created on 09/13/89 at 14:57:45";

/*==================== DO NOT REMOVE OR EDIT ==========================*/

#include "objc.h"
#include "uil.h"
#include "BMWGlobal.h"

@requires RadioButt      oBGroup,LabelButton;

= CurrencyLay          ow (BM_WorkstationMsgs, UIMESSAGES)
  {
  }

- (BOOL)leftButtonDown
  {
  [[researchWin helpLayer]
     updateHelp:"Select currency.   Local currency is specific"
          and:"to the country."];
  return YES;
  }

- activeButton
  {
  if ([button1 isActive])
     return button1;
  else if ([button2 isActive])
     return button2;
  else return nil;
  }

- compose
  {
  id lbutton1,lbutton2,lbutton3;
  id radioGroup;
```

```
    [self myTitle:"CURRENCY"];
    [super compose];

    button1=[[RadioButton str:""] extent:pt(10,10)];
    button2=[[RadioButton str:""] extent:pt(10,10)];
    button3=[[RadioButton str:""] extent:pt(10,10)];

    [button1 onSelector:@selector(doCurrencyConversion:)
       onReceiver:[researchWin interpreter] onArgument:NO];
    [button2 onSelector:@selector(doCurrencyConversion:)
       onReceiver:[researchWin interpreter] onArgument:YES];

    lbutton1=[[LabelButton new] addButton:button1 label:"Local"
       font:BM_fonts.Application color:BM_colors.Foreground];
    [lbutton1 fontColor:BM_colors.VRLText];
    lbutton2=[[LabelButton new] addButton:button2 label:"US Dollars"
    font:BM_fonts.Application color:    :olors.Foreground];
  [lbutton2 fontColor:BM_colors.VRLText];
  lbutton3=[[LabelButton new] addButton:button3 label:""
    font:BM_fonts.Application color:BM_colors.Foreground];
  [lbutton3 fontColor:BM_colors.VRLText];

  radioGroup=[RadioBGroup extent:pt(150,80)];
  [radioGroup attachTo:innerLayer at:pt(INNERSPACING,INNERSPACING)];
  [radioGroup addButton:lbutton1];
  [radioGroup addButton:lbutton2];
  [radioGroup addButton:lbutton3];
  [radioGroup format];

  [self updateMyDisplay];
  [button1 on];
  return self;
  }


=:


/*===================== DO NOT REMOV     EDIT ============================

        This comment and the following sccsId declaration are managed
        by SCCS for you. Do not edit or remove either.

        Source file:     SCCS/s.DateDB.m
        Latest version:  1.1
        Last mod time:   08/31/89 at 11:48:20

=======================================================================*/

static char *sccsId = "@(#)DateDB.m rev 1.1 created on 08/31/89 at 11:48:20";

/*===================== DO NOT REMOVE OR EDIT ==========================*/

#include "objc.h"
#include "uil.h"
#include "BMWGlobal.h"


@requires BM_StringEdit,LabelValue,ButtonGroup;

= DateDB:PermanentDialogBox(BM_WorkstationMsgs,UIMESSAGES)
  {
  id userInput;
  id parent;
```

```
char myString[30];
}


- parent:aWindow
{
parent = aWindow;
return self;
}


- parent
{
return parent;
}


- carriageReturn
{
[[self acceptButton] leftButtonDown];
}


- (STR)myString
{
strcpy(myString,"(offset: ");
strcat(myString,[userInput str]);
strcat(myString,")");
return myString;
}


- userInput
{
return userInput;
}


- userInput:(STR)aString font:aFont
{
if (userInput)
   userInput=[userInput free];
userInput = [BM_StringEdit str:aString font:aFont];
[userInput maxValueSize:15];
[userInput color:BM_colors.VRLText];

[userInput activate];
return self;
}


- assignStatement:(STR)aString
{
if (userInput)
   {
   if (strlen(aString) > [userInput maxValueSize])
      [userInput maxValueSize:strlen(aString)+50];
   [userInput assignSTR:aString];
   }
return self;
}
```

```
- accept
  {
  if ([parent updateModifierList:[self myString]])
     [self close];
  return self;
  }


- compose
  {
  id myLabel;
  id buttonGroup;

//  [self titleFont:BM_fonts.Application];
//  [self title:"Period"];
//  [self depthEffect];

  [self userInput:"" font:BM_fonts.Application];
  myLabel = [LabelValue createInterfaceFor:userInput
     labelSTR:"Enter offset: "];
  [myLabel font:BM_fonts.Application];
  [[myLabel borderWidth:1] borderColor:BM_colors.Border];
  [myLabel insideColor:BM_colors.WindowBackground];
  [myLabel attachTo:self at:pt(INNERSPACING,INNERSPACING)];

  [self acceptSelector:@selector(accept) receiver:self];
  [self cancelSelector:@selector(close) receiver:self];

  buttonGroup = [ButtonGroup attachTo:self];
  [buttonGroup addButton:cancelButton];
  [buttonGroup addButton:acceptButton];
  [buttonGroup extent:pt(162,30)];
  [buttonGroup top:[myLabel bottom]+INNERSPACING];
  [buttonGroup right:[myLabel adjacentRight]];

  return self;
  }


- initialize
  {
  [super initialize];
  [self extent:pt(330,130)];
  [self insideColor:BM_colors.Frame];
  return self;
  }


=:

/*===================== DO NOT REMOVE    DIT =============================

       This comment and the following sccsId declaration are managed
       by SCCS for you. Do not edit or remove either.*

       Source file:     SCCS/s.DateLayer.m
       Latest version:  1.1
       Last mod time:   08/31/89 at 11:48:05

==========================================================================*/

static char *sccsId = "@(#)DateLayer.m rev 1.1 created on 08/31/89 at 11:48:05";

/*===================== DO NOT REMOVE OR EDIT ============================*/
```

```
#include "objc.h"
#include "uil.h"
#include "BMWGlobal.h"

@requires RadioButton,RadioBGroup,LabelButton;
@requires BorderLayer,BM_AskDialogBox;

= DateLayer:InputWindow(BM_WorkstationMsgs,UIMESSAGES)
  {
  }


- (BOOL)leftButtonDown
  {
  [[researchWin helpLayer]
     updateHelp:"\"Current Period\" to obtain data over past year."
            and:"\"Other\" to enter an offset, from current date."];
  return YES;
  }



- compose
  {
  id lbutton1, lbutton2, lbutton3;
  id radioGroup;

  [self myTitle:"DATE"];
  [super compose];

  button1=[[RadioButton str:""] extent:pt(10,10)];
  button2=[[RadioButton str:""] extent:pt(10,10)];
  button3=[[RadioButton str:""] extent:pt(10,10)];

  [button1 onSelector:@selector(updateStatement:) onReceiver:self
     onArgument:""];
  [button2 onSelector:@selector(updateStatement:) onReceiver:self
     onArgument:"offset:1Year"];
  [button3 onSelector:@selector(inputFromUser:) onReceiver:self
     onArgument:"Enter offset -> offset:2Years: "];

  lbutton1=[[LabelButton new] addButton:button1 label:"Current Period"
     font:BM_fonts.Application color:BM_colors.Foreground];
  [lbutton1 fontColor:BM_colors.VRLText];
  lbutton2=[[LabelButton new] addButton:button2 label:"Previous Period"
     font:BM_fonts.Application color:BM_colors.Foreground];
  [lbutton2 fontColor:BM_colors.VRLText];
  lbutton3=[[LabelButton new] addButton:button3 label:""
     font:BM_fonts.Application color:BM_colors.Foreground];
  [lbutton3 fontColor:BM_colors.VRLText];
  radioGroup=[RadioBGroup extent:pt(    80)];
  [radioGroup attachTo:innerLayer at:pt(INNERSPACING,INNERSPACING)];
  [radioGroup addButton:lbutton1];
  [radioGroup addButton:lbutton2];
  [radioGroup addButton:lbutton3];
  [radioGroup format];

  [self updateMyDisplay];
  return self;
  }

=:
```

```
/*==================== DO NOT REMOVI    EDIT ============================

        This comment and the following sccsId declaration are managed
        by SCCS for you. Do not edit or remove either.

        Source file:     /users/bmw/Alpha/Research/SCCS/s.EditLayer.m
        Latest version:  1.3
        Last mod time:   09/12/89 at 18:08:17

========================================================================*/

static char *sccsId = "@(#)EditLayer.m rev 1.3 created on 09/12/89 at 18:08:17";

/*==================== DO NOT REMOVE OR EDIT ===========================*/

#include "objc.h"
#include "uil.h"
#include "BMWGlobal.h"

@requires CharString,BM_StringEdit,BorderLayer;

= EditLayer:BM_DialogBox(BM_WorkstationMsgs,UIMESSAGES)
  {
  id editStatement;
  id finalStatement;

  id statementType;
  id myStatementEditor;

  id okButton;
  }


- okButton:aButtonId
  {
  okButton = aButtonId;
  return self;
  }



- assignStatement:(STR)aString
  {
  if (editStatement)
     {
     if (strlen(aString) > [editStatement maxValueSize])
        [editStatement maxValueSize:strlen(aString)+50];

     if (![editStatement editingActive])
        [editStatement activate];

     [editStatement assignSTR:aString];
     }
  return self;
  }



- clear
  {
  [self assignStatement:""];
  return self;
  }
```

```
- statementEditor
  {
  return myStatementEditor;
  }



- statementEditor:anId
  {
  myStatementEditor = anId;
  return self;
  }



- carriageReturn
  {
  [okButton on];
  }



- returnEditStatement
  {
  return editStatement;
  }


- editStatement:(STR)aString font:aFont
  {
  editStatement = [BM_StringEdit str:aString font:aFont];
  [editStatement attachTo:self];
  [editStatement left:[self left]+SPACING];
  [editStatement centerY:[self centerY]];
  [editStatement maxValueSize:200];
  [editStatement color:BM_colors.VRLText];

  [editStatement show];
  [editStatement activate];
  return self;
  }


- statementType:(STR)aString
  {
  if (statementType)
     statementType = [statementType free];

  statementType = [CharString str:aString];
  return self;
  }



- (STR)statementType
  {
  return [statementType str];
  }



- finalStatement
  {
  if (finalStatement)
     finalStatement = [finalStatement free];
```

```
finalStatement = [CharString str:[    mentType str]];

[finalStatement concatSTR:" "];
[finalStatement concatSTR:[editStatement str]];

return finalStatement;
}

static char delimiters [] = "_:[(,<>=/+-*]) ";

- tab:aStringEdit
  {
  char *currentLine = [editStatement str];
  char *lastWord = (char *)0,
       *delimiter;
  id   completion;
  int  index;

  extern char *strrchr();

  for(index = strlen(delimiters)-1; index >= 0; index--)
     {
     delimiter = strrchr (currentLine, delimiters[index]);
     if ((lastWord == (char *)0) || ((delimiter != (char *)0) &&
        (delimiter > lastWord)))
        lastWord = delimiter;
     }
  if (lastWord == (char *)0)
     lastWord = currentLine;
  else
     lastWord++;

  if ((strlen(lastWord)) &&
      ((((!strcmp([statementType str],"For")) ||
         (!strcmp([statementType str],"SaveList"))) &&
        ((completion=[[myStatementEditor interpreter]
                          listCompletionForSTR:lastWord])!=nil)) ||
       ((strcmp([statementType str],"For")) &&
        ((completion=[[myStatementEditor interpreter]
                          itemCompletionForSTR:lastWord])!=nil))))
     {
     id  newStuff;
     int charsAlreadyTyped = _strmatchn(lastWord, [completion str],
                                        strlen(lastWord));
     if (charsAlreadyTyped == -1)
        charsAlreadyTyped = strlen(lastWord);

     newStuff = [CharString str:[completion str]+charsAlreadyTyped];
     [editStatement processString:newStuff];
     [newStuff free];
     [completion free];
     }
   return self;
   }


 - addToStatement:aListBoxOrMenuItem
   {
   id newString;
   char *paren;

   if (![editStatement editingActive])
      [editStatement activate];
```

```
  newString = [CharString str:[aListBo.OrMenuItem str]];

  if (paren = strchr ([newString str], '('))
     [newString charAt:(unsigned)(paren-[newString str]) put:0];

  [editStatement processString:newString];
  [newString free];

  return self;
  }



- compose
  {
  [self statementType:"Where"];
  [self editStatement:"" font:BM_fonts.Application];
  return self;
  }



- initialize
  {
  [super initialize];
  editStatement = finalStatement = nil;

  [[self borderWidth:1] borderColor:BM_colors.Border];
  [self height:35];
  [self insideColor:BM_colors.WindowForeground];
  return self;
  }


- terminate$
  {
  if (finalStatement)
     finalStatement = [finalStatement free];
  return [super terminate$];
  }
=:

/*==================== DO NOT REMOVE    EDIT ============================

       This comment and the following sccsId declaration are managed
       by SCCS for you. Do not edit or remove either.

       Source file:     SCCS/s.HelpLayer.m
       Latest version:  1.1
       Last mod time:   08/31/89 at 11:48:36

==========================================================================*/

static char *sccsId = "@(#)HelpLayer.m rev 1.1 created on 08/31/89 at 11:48:36";

/*==================== DO NOT REMOVE OR EDIT ============================*/

#include "objc.h"
#include "uil.h"
#include "BMWGlobal.h"

@requires InsetLayer,StringLayer;

= HelpLayer:InsetLayer(BM_WorkstationMsgs,UIMESSAGES)
  {
```

```
id help1,help2;
}



- updateHelp:aStr1 and:aStr2
{
if (help1)
   {
   [help1 erase];
   help1 = [help1 free];
   }
if (help2)
   {
   [help2 erase];
   help2 = [help2 free];
   }

help1 = [[StringLayer str:aStr1 font:BM_fonts.Application]
   attachTo:self at:pt(INNERSPACING,INNERSPACING)];
[help1 color:BM_colors.VRLText];
[help1 insideColor:BM_colors.Frame];
help2 = [[StringLayer str:aStr2 font:BM_fonts.Application]
   attachTo:self
      at:pt(INNERSPACING,INNERSPACING+[BM_fonts.Application height])];
[help2 color:BM_colors.VRLText];
[help2 insideColor:BM_colors.Frame];

[help1 show];
[help2 show];

return self;
}



- initialize
{
[super initialize];
[self outsideExtent:pt(360+SPACING,50)];
[self insideColor:BM_colors.Frame];
help1=help2=nil;
return self;
[statusMonitor normalStatus];

return (subTree);
}




- initModel
{
[statusMonitor initialization];

currentStmtId = nil;
[[[[[displayTree lastFrontLayer] bodyLayer] firstFrontLayer]
   model] isCurrent:NO];

[statusMonitor normalStatus];
return self;
}
```

```
- openModel
 {
 id modelTree;

 [Cursor push: cursors.Wait];

 if (![researchWin fileName])
    modelTree = [[researchWin interpreter] stubModel];
 else
    modelTree = [BM_ParseTreeNode readFrom:[[researchWin path] str]];
 [[researchWin interpreter] currentModel:modelTree];
 [self displayModel:modelTree];

 [Cursor pop];
 return self;
 }



- deletePlates
 {
 if (displayTree)
    {
    [statusMonitor freeing];

    [innerLayer removeFrontLayer:displayTree];
    displayTree = [displayTree delete];

    [statusMonitor normalStatus];
    }
 return self;
 }



- closeModel
 {
 id aModel;

 [Cursor push:cursors.Wait];

 if (displayTree)
    {
    aModel = [displayTree model];
    [self deletePlates];
    aModel = [aModel deleteNode];

    [researchWin fileName:nil];
    }

 [Cursor pop];
 return self;
 }



- displayModel:aTree
 {
 id myPlate;

 displayTree = [self createInterfaceFor:aTree root:nil];
 [displayTree borderWidth:0];
 [displayTree extent:pt([innerLayer width]-4,[innerLayer height]-4)];
 [displayTree attachTo:innerLayer at:pt(2,2)];
```

```
return self;
}


- displayStatement:newStmt
{
id subTree, stmtLayer, stmtList, parentLayer, tempLayer;
PT stmtOrigin;
short beginMarker, endMarker, tempY;

[Cursor push:cursors.Wait];

stmtLayer  = [[currentStmtId dependents] at:0];
parentLayer = [stmtLayer backLayer];
stmtList  = [parentLayer frontLayers];
stmtOrigin = [stmtLayer offset];
beginMarker = [stmtList offsetOf:stmtLayer];
endMarker   = [stmtList lastOffset];

subTree = [self createInterfaceFor:newStmt root:nil];
tempY = [subTree outsideHeight] + 3;

if ((statementMethod == 3) || (statementMethod == 4))
   {
   [newStmt replace:currentStmtId];
   currentStmtId=nil;

   if (statementMethod == 4)
      tempY=[subTree outsideHeight]-[stmtLayer outsideHeight];
   else
      tempY=-([stmtLayer outsideHeight]+3);

   if (stmtLayer)
      {
      [stmtLayer delete];
      --endMarker;
      }
   }

if (statementMethod==1)
   {
   stmtOrigin = ptPlus(stmtOrigin, pt(0, [stmtLayer outsideHeight]+3));
   ++beginMarker;
   }

[subTree attachTo:parentLayer at:stmtOrigin];
[subTree show];

for(; beginMarker <= endMarker; endMarker--)
   {
   tempLayer=[[stmtList at:beginMarker] removeFromBackLayer];
   [tempLayer attachTo:parentLayer];
   [tempLayer outsideOrigin:ptPlus([tempLayer outsideOrigin],pt(0,tempY))];
   }

subTree = stmtList = parentLayer = tempLayer = nil;

[Cursor pop];
return self;
}


- setCurrentStmtId:anId
{
```

```
currentStmtId = anId;
return self;
}


- currentStmtId:anId
{
id tempStmtId;

if (!(currentStmtId == anId))
   {
   tempStmtId = currentStmtId;
   currentStmtId=anId;
   if ([tempStmtId isCurrent]) [tempStmtId isCurrent:NO];
   [currentStmtId isCurrent:YES];
   }
else
   [self editStatement];

return self;
}



- currentStmtId
{
return currentStmtId;
}



- statementMethod:(short)aMethodNumber
{
statementMethod = aMethodNumber;
return self;
}


- (short)statementMethod
{
return statementMethod;
}

- editStatement
{
id editStmt;
char editStmtType[500];
char nextToken[150];
char editStmtString[1000];

editStmt = [currentStmtId listing];
sscanf([editStmt str],"%s %s",editStmtType,nextToken);

if (!_dictcmp(editStmtType,"make"))
   {
   strcpy(editStmtString,[editStmt str]+strlen(editStmtType)
      +strlen(nextToken)+2);
   strcat(editStmtType," ");
   strcat(editStmtType,nextToken);
   }
else
   strcpy(editStmtString,[editStmt str]+strlen(editStmtType)+1);

editStmtString[strlen(editStmtString)-1] = 0;
```

```
[[[self statementEditor] editLayer] statementType:editStmtType];
[[[self statementEditor] editLayer] assignStatement:editStmtString];

[editStmt free];
return self;
}



- insertAfterStatement
{
[self statementMethod:1];
[self checkFor];

if ([self parseStatement:
   [[[self statementEditor] editLayer] finalStatement]])
      [[[self statementEditor] editLayer] clear];
else
   if (![[[[self statementEditor] editLayer] returnEditStatement] editingActive])
      [[[[self statementEditor] editLayer] returnEditStatement] activate];

return self;
}


- insertBeforeStatement
{
[self statementMethod:2];
[self checkFor];

if ([self parseStatement:
   [[[self statementEditor] editLayer] finalStatement]])
      [[[self statementEditor] editLayer] clear];
else
   if (![[[[self statementEditor] editLayer] returnEditStatement] editingActive])
      [[[[self statementEditor] editLayer] returnEditStatement] activate];

return self;
}



- deleteStatement
{
[self statementMethod:3];
[self checkFor];
[self parseStatement:nil];
if (![[[[self statementEditor] editLayer] returnEditStatement] editingActive])
   [[[[self statementEditor] editLayer] returnEditStatement] activate];
return self;
}


- replaceStatement
{
id tempId;

[self statementMethod:4];
[self checkFor];

if ([self parseStatement:
   [[[self statementEditor] editLayer] finalStatement]])
      [[[self statementEditor] editLayer] clear];
```

```
  else
     if (![[[[self statementEditor] editLayer] returnEditStatement] editingActive])
        [[[[self statementEditor] editLayer] returnEditStatement] activate];

  return self;
  }


- (BOOL)parseStatement:aStatementId
  {
  return YES;
  }

=:

/*==================== DO NOT REMOVI    EDIT ============================

       This comment and the following sccsId declaration are managed
       by SCCS for you. Do not edit or remove either.

       Source file:    SCCS/s.RangeLayer.m
       Latest version: 1.1
       Last mod time:  08/31/89 at 11:46:59

======================================================================*/

static char *sccsId = "@(#)RangeLayer.m rev 1.1 created on 08/31/89 at 11:46:59";

/*==================== DO NOT REMOVE OR EDIT ==========================*/

#include "objc.h"
#include "uil.h"
#include "BMWGlobal.h"

@requires RadioButton,RadioBGroup,LabelButton;
@requires BorderLayer,BM_AskDialogBox;

= RangeLayer:InputWindow(BM_WorkstationMsgs,UIMESSAGES)
  {
  }


- (BOOL)leftButtonDown
  {
  [[researchWin helpLayer]
    updateHelp:"Enter data item range.   Note: Certain items are"
          and:"retrieved on a daily basis. eg.DailyClosePrice"];
  return YES;
  }



- compose
  {
  id lbutton1, lbutton2, lbutton3;
  id radioGroup;

  [self myTitle:"RANGE"];
  [super compose];

  button1=[[RadioButton str:""] extent:pt(10,10)];
  button2=[[RadioButton str:""] extent:pt(10,10)];
  button3=[[RadioButton str:""] extent:pt(10,10)];
```

```
[button1 onSelector:@selector(updateStatement:) onReceiver:self
   onArgument:""];
[button2 onSelector:@selector(updateStatement:) onReceiver:self
   onArgument:"over:2Years"];
[button3 onSelector:@selector(inputFromUser:) onReceiver:self
   onArgument:"Enter range -> over:3Years: "];

lbutton1=[[LabelButton new] addButton:button1 label:"1 Year / 1 Day"
   font:BM_fonts.Application color:BM_colors.Foreground];
[lbutton1 fontColor:BM_colors.VRLText];
lbutton2=[[LabelButton new] addButton:button2 label:"2 Years"
   font:BM_fonts.Application color:BM_colors.Foreground];
[lbutton2 fontColor:BM_colors.VRLText];
lbutton3=[[LabelButton new] addButton:button3 label:""
   font:BM_fonts.Application color:BM_colors.Foreground];
[lbutton3 fontColor:BM_colors.VRLText];
radioGroup=[RadioBGroup extent:pt(150,80)];
[radioGroup attachTo:innerLayer at:pt(INNERSPACING,INNERSPACING)];
[radioGroup addButton:lbutton1];
[radioGroup addButton:lbutton2];
[radioGroup addButton:lbutton3];
[radioGroup format];

[self updateMyDisplay];

return self;
}

=:

/*===================== DO NOT REMOVE    EDIT ============================

       This comment and the following sccsId declaration are managed
       by SCCS for you. Do not edit or remove either.

       Source file:     /users/bmw/Alpha/Research/SCCS/s.RepSpecsWin.m
       Latest version:  1.10
       Last mod time:   09/13/89 at 14:57:56

=======================================================================*/

static char *sccsId = "@(#)RepSpecsWin.m rev 1.10 created on 09/13/89 at 14:57:56";

/*===================== DO NOT REMOVE OR EDIT ===========================*/

#include "objc.h"
#include "uil.h"
#include "BMWGlobal.h"

#define TEMPLATEHT 280

static id _myIconImage;

@requires DateLayer,CurrencyLayer,BorderLayer,HelpLayer,RangeLayer;
@requires InsetLayer,CharString,BM_CICharString,PushButton;
@requires UniverseLayer,BM_ScrollBar;
@requires BitMap,InnerWindow,ReportSpecsTemplate,ReportSpecsEdit,Prompter;
@requires ReportWin,ReportEdit,Cursor;

= ReportSpecsWin:VRLOutputWin(BM_WorkstationMsgs,UIMESSAGES)
  {
  }
```

```
- (PT)centerErrorPrompter
{
if (templateLayer)
    return [templateLayer center];

return [self center];
}



- defaultIcon
{
if (_myIconImage == nil)
    _myIconImage = [BitMap readFrom:"icons/template.icon"];

return [_myIconImage shared$];
}


- (STR)extensionSTR
{
return ".rwr";
}



- (STR)name
{
return "Reports";
}
- (PT)defaultExtent
{
return pt(965,687);
}



- defaultTemplate
{
id dTemplate;
PT tempPageSize;

dTemplate = [ReportSpecsTemplate new];
tempPageSize = [dTemplate pageSize];
[dTemplate
    pageSize:pt(800,ptY(tempPageSize))];
[dTemplate reportBorderWidth:1];

[[dTemplate footer] leftSTR:""];
[[dTemplate footer] rightSTR:""];
[[dTemplate footer] centerSTR:"<page>"];
[[dTemplate header] leftSTR:"BFM"];
[[dTemplate header] rightSTR:"<date>"];
[[dTemplate header] centerSTR:""];
[[dTemplate header] titleSTR:"Batterymarch Investment Systems"];
[[dTemplate header] subTitleSTR:"Report"];

return dTemplate;
}



+ createInterfaceFor:aString parent:anId
{
```

```
  self = [super createInterfaceFor:aString parent:anId];
  [[self iconHandler] assignSTR:[self defaultTitleSTR]];
  return self;
  }



- generateReport
  {
  id reportItems;

  [Cursor push:cursors.Wait];
  [statusMonitor traversal];

  reportItems = [[template dataArea] reportItems];

  if ([reportItems size]>0)
    {
    id aReport;

    [self runModel];

    if (aReport=[dataTree value])
      {
      id windowLayer, reportLayer,
        aTemplate = [template copy];

      [statusMonitor graphics];

      [aReport template:aTemplate];
      windowLayer = [[[ReportWin new] attachTo:deskTop] origin:pt(700,80)];
      [deskTop installIcon:[windowl    iconHandler]];

      reportLayer = [ReportEdit createInterfaceFor:aReport
        parent:windowLayer];
      [[windowLayer applicationLayer:reportLayer] close];
      [windowLayer translateWithin:baseLayer];
      [[windowLayer iconHandler] open];
      }
    }
  else
    {
    id message = [CharString str:"No DATA ITEMS!"];
    [self displayErrorPrompter:message];
    message = [message free];
    }

  [statusMonitor normalStatus];
  [Cursor pop];
  return self;
  }

- (STR)dataFormatString:(STR)dataTitle
  {
  id temp;
  unsigned aNumber;

  temp = [BM_CICharString str:dataTitle];
  aNumber = [interpreter typeOfDataItem:temp];
  temp = [temp free];

  if (aNumber==0)
    return "#############.##";
```

```
   else if (aNumber==1)
      return "xxxxxxxxxxxxxxxxxxxxxxxx";
   else
      return "################";
   }


- addDS:aRepDALayer
   {
   short anOffset;
   STR dataTitle;
   STR dataValue;

   dataTitle = [[aRepDALayer selectionItem] str];
   dataValue = [self dataFormatString:dataTitle];
   anOffset  = [[[[templateLayer currentDA] template] titles] size];

   return [[templateLayer currentDA] addDS:anOffset title:dataTitle
      value:dataValue];
   }



- addDSFromUser
   {
   STR dataTitle;
   STR dataValue;
   short anOffset;

   if ( ([[dataLB repDALayer] selectionItem]) ||
        ([[userDataLB repDALayer] selectionItem]) )
      {
      if ([[dataLB repDALayer] selecti    em])
         dataTitle = [[[dataLB repDALayer] selectionItem] str];
      else
         dataTitle = [[[userDataLB repDALayer] selectionItem] str];

      dataValue = [self dataFormatString:dataTitle];
      anOffset = [[[[templateLayer currentDA] template] titles] size];

      return [[templateLayer currentDA] addDSFromUser:anOffset
        title:dataTitle value:dataValue dataItem:dataTitle];
      }
   return [[templateLayer currentDA] addDSFromUser];
   }


- deleteDS
   {
   id message;
   PT aPoint;

   if ([templateLayer hasSelection])
      {
      aPoint = [templateLayer getSelectionPt];
      return [[templateLayer currentDA] deleteDS:ptX(aPoint)];
      }

   message = [CharString str:"Column has not been selected on template"];
   [self displayErrorPrompter:message];
   message = [message free];
   return self;
   }
```

```
- editDS
  {
  id message;
  PT aPoint;

  if ([templateLayer hasSelection])
     {
     aPoint = [templateLayer getSelectionPt];
     return [[templateLayer currentDA] editDS:ptX(aPoint)];
     }

  message = [CharString str:"Column has not been selected on template"];
  [self displayErrorPrompter:message];
  message = [message free];

  return self;
  }



- update:anObject because:(SEL)aSelector
  {
  if (aSelector==@selector(doubleClick))
     {
     if (anObject==templateLayer)
        return [self editDS];
     else
        return [self addDS:anObject];
     }
  return [super update:anObject because:aSelector];
  }
- (short)templateLayerHeight
  {
  return (TEMPLATEHT-2*[template reportBorderWidth]);
  }


- formatTemplateLayer
  {
  PT tSize = [template pageSize];

  [templateScrollBar erase];
  [templateLayer
     extent:pt(ptX(tSize),TEMPLATEHT-2*[templateLayer borderWidth])];
  [templateLayer
     center:pt([self centerX],[applicationLayer top]+SPACING+TEMPLATEHT/2)];
  [templateScrollBar extent:[templateScrollBar defaultExtent]];
  [templateScrollBar outsideOrigin:pt([templateLayer adjacentLeft]+1,
                                  [templateLayer adjacentBottom])];

  [templateLayer show];
  [templateScrollBar show];
  return self;
  }

- compose
  {
  id dataList,userDataList;
  id saveButton,printButton,printMButton,quitButton,goButton;
  id addData,deleteData,editData;
```

```
templateLayer = [ReportSpecsEdit createInterfaceFor:template parent:self];
[templateLayer attachTo:applicationLayer];
[templateLayer addDependent:self];
[applicationLayer removeFromBackLayer];
[self barMenu:[templateLayer defaultBarMenu]];
[applicationLayer attachTo:self];
[[self barMenu] show];

templateScrollBar = [BM_ScrollBar horizontalInterfaceFor:templateLayer];
[templateScrollBar noPageMarkers];
[[templateScrollBar attachTo:applicationLayer] borderColor:BM_colors.Border];
[templateLayer format];
[self formatTemplateLayer];

universeLayer = [[UniverseLayer attachTo:applicationLayer]
   outsideOrigin:pt([applicationLayer left]+SPACING,
      [templateScrollBar adjacentBottom]+SPACING)];
[universeLayer parent:self];
[universeLayer researchWin:self];
[universeLayer compose];
[universeLayer myTitle:"UNIVERSE"];
[universeLayer show];

currencyLayer = [[CurrencyLayer attachTo:applicationLayer] outsideOrigin:
  pt([universeLayer adjacentLeft]+1,[universeLayer adjacentBottom]+SPACING)];
[currencyLayer parent:self];
[currencyLayer researchWin:self];
[currencyLayer compose];
[currencyLayer show];

dateLayer = [[DateLayer attachTo:applicationLayer] outsideOrigin:
   pt([universeLayer adjacentRight]+SPACING,[universeLayer adjacentTop]+1)];
[dateLayer parent:self];
[dateLayer researchWin:self];
[dateLayer compose];
[dateLayer show];

rangeLayer = [[RangeLayer attachTo:applicationLayer] outsideOrigin:
   pt([dateLayer adjacentLeft]+1,[dateLayer adjacentBottom]+SPACING)];
[rangeLayer parent:self];
[rangeLayer researchWin:self];
[rangeLayer compose];
[rangeLayer show];

// temporary
[[rangeLayer button1] onReceiver:nil];
[[rangeLayer button2] onReceiver:nil];
[[rangeLayer button3] onReceiver:nil];

dataList = [[InnerWindow attachTo:applicationLayer] outsideExtent:
   pt(205,2*[dateLayer outsideHeight]-50)];
[dataList outsideOrigin:
   pt([dateLayer adjacentRight]+SPACING,[dateLayer adjacentTop]+1)];
[dataList insideColor:BM_colors.Frame];
[dataList myTitle:"DATA ITEMS"];

dataCltn = [[self interpreter] dataItemList];
dataLB = [self addListBox:dataCltn
   width:[dataList outsideWidth]-2*INNERSPACING lines:11];
[[dataLB attachTo:dataList] outsideOrigin:
   pt([dataList adjacentLeft]+INNERSPACING,[dataList adjacentTop]+40)];
[[dataLB repDALayer] addDependent:self];
[dataList show];
```

```
    userDataList = [[InnerWindow attachTo:applicationLayer] outsideExtent:
      pt(205,2*[dateLayer outsideHeight]-50)];
    [userDataList outsideOrigin:
      pt([dataList adjacentRight]+SPACING,[dateLayer adjacentTop]+1)];
    [userDataList insideColor:BM_colors.Frame];
    [userDataList myTitle:"USER DATA ITEMS"];

    userDataCltn = [[self interpreter] newDataItemList];
    userDataLB = [self addListBox:userDataCltn
      width:[userDataList outsideWidth]-2*INNERSPACING lines:11];
    [[userDataLB attachTo:userDataList] outsideOrigin:
      pt([userDataList adjacentLeft]+INNERSPACING,
         [userDataList adjacentTop]+40)];
    [[userDataLB repDALayer] addDependent:self];
    [userDataList show];

    controlLayer = [[[InsetLayer attachTo:applicationLayer] outsideOrigin:
      pt([userDataList adjacentRight]+SPACING,[dataList adjacentTop]+1)]
        outsideExtent:pt([applicationLayer width]-2*[dateLayer outsideWidth]
          -2*[dataList outsideWidth]-6*SPACING,[dataList outsideHeight]+55)];
    [controlLayer insideColor:BM_colors.Frame];

    helpLayer = [HelpLayer attachTo:applicationLayer];
    [helpLayer outsideOrigin:
      pt([dataList adjacentLeft]+1,[dataList adjacentBottom]+SPACING)];
    [helpLayer outsideWidth:2*[dataList outsideWidth]+SPACING];
    [helpLayer
      updateHelp:"Add data items from list to template, establish period"
          and:"and currency,  then press \"Go\" to generate report."];
    [helpLayer show];

    addData = [[[[PushButton str:"Add" font:BM_fonts.Application]
      attachTo:controlLayer at:pt(17,INNERSPACING)]
        onSelector:@selector(addDSFromUser)] onReceiver:self];

[addData outsideExtent:pt(BTNWIDTH·    ]TNHEIGHT)];

editData = [[[[[PushButton str:"Edit" font:BM_fonts.Application]
  attachTo:controlLayer]
    origin:pt([addData left],[addData adjacentBottom]+SPACING)]
      onSelector:@selector(editDS)] onReceiver:self];
[editData outsideExtent:pt(BTNWIDTH+10,BTNHEIGHT)];

deleteData = [[[[[PushButton str:"Delete" font:BM_fonts.Application]
  attachTo:controlLayer]
    origin:pt([editData left],[editData adjacentBottom]+SPACING)]
      onSelector:@selector(deleteDS)] onReceiver:self];
[deleteData outsideExtent:pt(BTNWIDTH+10,BTNHEIGHT)];

goButton = [[[PushButton str:"Go" font:BM_fonts.Application]
  outsideExtent:pt(BTNWIDTH+10,BTNHEIGHT)] offColor:BM_colors.Frame];
[goButton myPicture:[BitMap readFrom:"./icons/start.icon"]];
[[goButton onSelector:@selector(generateReport)] onReceiver:self];
[[goButton attachTo:controlLayer]
  origin:pt([deleteData left],[deleteData adjacentBottom]+35)];

saveButton = [[[PushButton str:"Save" font:BM_fonts.Application]
  outsideExtent:pt(BTNWIDTH+10,BTNHEIGHT)] offColor:BM_colors.Frame];
[[saveButton attachTo:controlLayer]
  origin:pt([deleteData left],[goButton adjacentBottom]+SPACING)];
[saveButton onSelector:@selector(saveFile:) onReceiver:self
  onArgument:template];

printButton = [[PushButton str:"Print" font:BM_fonts.Application]
  outsideExtent:pt(BTNWIDTH+10,BTNHEIGHT)];
```

```
 [printButton offColor:BM_colors.Frame];
 [[printButton attachTo:controlLayer]
    origin:pt([saveButton left],[saveButton adjacentBottom]+SPACING)];
 [[printButton onSelector:@selector(printFromUser)] onReceiver:templateLayer];

 printMButton = [[PushButton str:"Print VRL" font:BM_fonts.Application]
    outsideExtent:pt(BTNWIDTH+10,BTNHEIGHT)];
 [printMButton offColor:BM_colors.Frame];
 [[printMButton attachTo:controlLayer]
    origin:pt([saveButton left],[printButton adjacentBottom]+SPACING)];
 [[printMButton onSelector:@selector(printModel)] onReceiver:self];

 quitButton = [[[PushButton str:"Quit" font:BM_fonts.Application]
    outsideExtent:pt(BTNWIDTH+10,BTNHEIGHT)] offColor:BM_colors.Frame];
 [[quitButton attachTo:controlLayer]
    origin:pt([printButton left],[printMButton adjacentBottom]+SPACING)];

 [controlLayer show];
 return self;
 }


=:

/*===================== DO NOT REMOVE OR EDIT ============================

        This comment and the following sccsId declaration are managed
        by SCCS for you. Do not edit or remove either.

        Source file:     /users/bmw/Alpha/Research/SCCS/s.ResearchWin.m
        Latest version:  1.4
        Last mod time:   09/12/89 at 18:09:06

=======================================================================*/

static char *sccsId = "@(#)ResearchWin.m rev 1.4 created on 09/12/89 at 18:09:06";

/*===================== DO NOT REMOVE OR EDIT ==========================*/

#include "objc.h"
#include "uil.h"
#include "BMWGlobal.h"

@requires Cursor,CriteriaLayer,Prompter,CharString;

= ResearchWin:VRLWin(BM_WorkstationMsgs,UIMESSAGES)
  {
  id universeLayer,currencyLayer,dateLayer,resultsLayer;
  id helpLayer;
  id controlLayer;
  }


 - helpLayer
   {
   return helpLayer;
   }


 - openWindow
   {
```

```
[Cursor push: cursors.Wait];
[self compose];
[Cursor pop];
return self;
}



- modelEditor
{
if (!(modelEditor))
   {
   modelEditor = [CriteriaLayer attachTo:applicationLayer];
   [modelEditor parent:self];
   [modelEditor researchWin:self];
   [modelEditor myTitle:"SCREENING CRITERIA"];
   }
return modelEditor;
}



- universeLayer
{
return universeLayer;
}


- currencyLayer
{
return currencyLayer;
}


- dateLayer
{
return dateLayer;
}



- resultsLayer
{
return resultsLayer;
}



- (BOOL)updateForStmt
{
return YES;
}


- updateUniverseLayer:aCharString
{

if (!_dictcmp([aCharString str],"companies"))
   {
   [universeLayer myStr:"companies"];
   [[universeLayer button1] on];
   }
else
   if (!_dictcmp([aCharString str],"securities"))
```

```
    {
    [universeLayer myStr:"securities"];
    [[universeLayer button2] on];
    }
  else
    {
    id tempReceiver;

    tempReceiver = [[universeLayer button3] onReceiver];
    [[universeLayer button3] onReceiver:nil];
    [[universeLayer button3] on];
    [universeLayer updateStatement:[aCharString str]];
    [universeLayer updateMyDisplay];
    [[universeLayer button3] onReceiver:tempReceiver];
    }
return self;
}



- updateDateLayer:aCharString
{
char tempString[50];

if ( (!_dictcmp([aCharString str],"0Years")) ||
    (!_dictcmp([aCharString str],"0Year")) )
  [[dateLayer button1] on];
else
  if ( (!_dictcmp([aCharString str],"1Years")) ||
      (!_dictcmp([aCharString str],"1Year")) )
    {
    [dateLayer myStr:"offset:1Year"];
    [[dateLayer button2] on];
    }
  else {
      id tempReceiver;

      strcpy(tempString,"offset:");
      strcat(tempString,[aCharString str]);
      tempString[strlen(tempString)] = 0;

      tempReceiver = [[dateLayer button3] onReceiver];
      [[dateLayer button3] onReceiver:nil];
      [[dateLayer button3] on];
      [dateLayer updateStatement:tempString];
      [dateLayer updateMyDisplay];
      [[dateLayer button3] onReceiver:tempReceiver];
      }
return self;
}



- updateWindow:aForStmtId
{
id anIdentifier,anOffset;

anIdentifier = [CharString str:[[aForStmtId leftNode] str]];
anOffset = [[aForStmtId rightNode] modifierFor:"offset"];
if (anOffset)
  anOffset = [CharString str:[anOffset str]];
else
  anOffset = nil;
```

```
[self updateUniverseLayer:anIdentifier];
anIdentifier = [anIdentifier free];

if (anOffset)
   {
   [self updateDateLayer:anOffset];
   anOffset = [anOffset free];
   }
else [[dateLayer button1] on];

return self;
}



- initialize
{
[super initialize];

universeLayer = nil;
dateLayer = nil;
currencyLayer = nil;
resultsLayer = nil;
controlLayer = nil;

[self viewBox:nil];
[self sizeLayer:NO];

return self;
}

=:

/*===================== DO NOT REMOV     EDIT ============================

       This comment and the following sccsId declaration are managed
       by SCCS for you. Do not edit or remove either.

       Source file:     SCCS/s.UnivLayer.m
       Latest version:  1.1
       Last mod time:   08/31/89 at 11:43:39

=========================================================================*/

static char *sccsId = "@(#)UnivLayer.m rev 1.1 created on 08/31/89 at 11:43:39";

/*===================== DO NOT REMOVE OR EDIT ===========================*/

#include "objc.h"
#include "uil.h"
#include "BMWGlobal.h"

@requires RadioButton,RadioBGroup,LabelButton;
@requires ButtonGroup,BM_AskDialogBox;

= UniverseLayer:InputWindow(BM_WorkstationMsgs,UIMESSAGES)
  {
  }


 - (BOOL)leftButtonDown
  {
  [[researchWin helpLayer]
```

```
  updateHelp:"Select \"All Companies\" for all companies."
        and:"Select \"Other\" to retrieve from portfolios etc."];
return YES;
}


- compose
{
id lbutton1,lbutton2,lbutton3;
id radioGroup;

[self myTitle:"INITIAL UNIVERSE"];
[super compose];

button1=[[RadioButton str:""] extent:pt(10,10)];
button2=[[RadioButton str:""] extent:pt(10,10)];
button3=[[RadioButton str:""] extent:pt(10,10)];

[button1 onSelector:@selector(updateStatement:) onReceiver:self
   onArgument:"companies"];
[button2 onSelector:@selector(updateStatement:) onReceiver:self
   onArgument:"securities"];
[button3 onSelector:@selector(inputFromUser:) onReceiver:self
   onArgument:"Enter context: "];

lbutton1=[[LabelButton new] addButton:button1 label:"All Companies"
   font:BM_fonts.Application color:BM_colors.Foreground];
[lbutton1 fontColor:BM_colors.VRLText];
lbutton2=[[LabelButton new] addButton:button2 label:"All Securities"
   font:BM_fonts.Application color:BM_colors.Foreground];
[lbutton2 fontColor:BM_colors.VRLText];
lbutton3=[[LabelButton new] addButton:button3 label:""
   font:BM_fonts.Application color:BM_colors.Foreground];
[lbutton3 fontColor:BM_colors.VRLText];
radioGroup=[RadioBGroup extent:pt(1   0)];
[radioGroup attachTo:innerLayer at:pt(INNERSPACING,INNERSPACING)];
[radioGroup addButton:lbutton1];
[radioGroup addButton:lbutton2];
[radioGroup addButton:lbutton3];
[radioGroup format];

[self updateMyDisplay];
return self;
}


=:
/*===================== DO NOT REMOVE    EDIT ============================

        This comment and the following sccsId declaration are managed
        by SCCS for you. Do not edit or remove either.

        Source file:     SCCS/s.UniverseDB.m
        Latest version:  1.1
        Last mod time:   08/31/89 at 11:43:57

=======================================================================*/

static char *sccsId = "@(#)UniverseDB.m rev 1.1 created on 08/31/89 at 11:43:57";

/*==================== DO NOT REMOVE OR EDIT ==========================*/

#include "objc.h"
```

```
#include "uil.h"
#include "BMWGlobal.h"


@requires BM_StringEdit,LabelValue,ButtonGroup;

= UniverseDB:PermanentDialogBox(BM_WorkstationMsgs,UIMESSAGES)
 {
 id userInput;
 id parent;

 char myString[30];
 }


- parent:aWindow
 {
 parent = aWindow;
 return self;
 }


- parent
 {
 return parent;
 }


- carriageReturn
 {
 [[self acceptButton] leftButtonDown];
 }


- (STR)myString
 {
 strcpy(myString,"For ");
 strcat(myString,[userInput str]);
 return myString;
 }


- userInput
 {
 return userInput;
 }


- userInput:(STR)aString font:aFont
 {
 if (userInput)
    userInput=[userInput free];
 userInput = [BM_StringEdit str:aString font:aFont];
 [userInput maxValueSize:15];
 [userInput color:BM_colors.VRLText];

 [userInput activate];
 return self;
 }


- assignStatement:(STR)aString
 {
```

```
if (userInput)
   {
   if (strlen(aString) > [userInput maxValueSize])
      [userInput maxValueSize:strlen(aString)+50];
   [userInput assignSTR:aString];
   }
return self;
}



- accept
 {
 if ([parent updateContext:[self myString]])
    [self close];
 return self;
 }


- compose
 {
 id myLabel;
 id buttonGroup;

//  [self titleFont:BM_fonts.Application];
//  [self title:"Period"];
//  [self depthEffect];

  [self userInput:"" font:BM_fonts.Application];
  myLabel = [LabelValue createInterfaceFor:userInput
     labelSTR:"Enter context: "];
  [myLabel font:BM_fonts.Application];
  [[myLabel borderWidth:1] borderColor:BM_colors.Border];
  [myLabel insideColor:BM_colors.WindowBackground];
  [myLabel attachTo:self at:pt(INNERSPACING,INNERSPACING)];

  [self acceptSelector:@selector(accept) receiver:self];
  [self cancelSelector:@selector(close) receiver:self];

  buttonGroup = [ButtonGroup attachTo:self];
  [buttonGroup addButton:cancelButton];
  [buttonGroup addButton:acceptButton];
  [buttonGroup extent:pt(162,30)];
  [buttonGroup top:[myLabel bottom]+INNERSPACING];
  [buttonGroup right:[myLabel adjacentRight]];

  return self;
  }


- initialize
  {

  [super initialize];
  [self extent:pt(330,130)];
  [self insideColor:BM_colors.Frame];
  return self;
  }


=:
```

```
/*==================== DO NOT REMOVE   EDIT ============================

        This comment and the following sccsId declaration are managed
        by SCCS for you. Do not edit or remove either.

        Source file:     /users/bmw/Alpha/Research/SCCS/s.VRLOutputWin.m
        Latest version:  1.8
        Last mod time:   09/13/89 at 14:58:22

=========================================================================*/

static char *sccsId = "@(#)VRLOutputWin.m rev 1.8 created on 09/13/89 at 14:58:22";

/*==================== DO NOT REMOVE OR EDIT ===========================*/

#include "objc.h"
#include "uil.h"
#include "BMWGlobal.h"


@requires CharString,Prompter,Cursor;
@requires Object,BM_ChoiceDialogBox;

= VRLOutputWin:ResearchWin(BM_WorkstationMsgs,UIMESSAGES)
  {
  id rangeLayer;

  id dataCltn,userDataCltn;
  id dataLB,userDataLB;

  id model;
  id forTree, dataTree;

  id template;
  id templateLayer;
  id templateScrollBar;
  }

+ createInterfaceFor:aString parent:anId
  {
  self = [super createInterfaceFor:aString parent:anId];
  [[self iconHandler] assignSTR:[self defaultTitleSTR]];
  return self;
  }



- update:anObject because:(SEL)aSelector
  {
  if ((aSelector==@selector(globalStatus:))&&([interpreter globalStatus]==0))
     return self;
  return [super update:anObject because:aSelector];
  }


- saveFile:aSpecsTemplate
  {
  [aSpecsTemplate model:[interpreter currentModel]];
  return [super saveFile:aSpecsTemplate];
  }


- runModel
```

```
{
[interpreter keepValues:NO];
[[currencyLayer activeButton] on];
[interpreter executeCurrentModel];

return self;
}


- open
{
id path;

if (!opened)
   {
   path = [self path];

   if (fileName == nil)
      template = [self defaultTemplate];
   else
      template = [Object readFrom: [path str]];

   if (template == nil )
      {
      id message = [CharString sprintf:"%s file was not found", [path str]];
      [self displayErrorPrompter:message];
      message = [message free];
      }
   else
       model = [template model];

   [path free];

   opened = YES;
   [self openWindow];
   }

return self;
}

- openModel
{
if (!model)
   {
   model = [interpreter stubModel];
   [template model:model];
   }

[interpreter currentModel:model];
forTree = [[model at:1] at:0];
dataTree = [[model at:1] at:1];
[self defaultSetting:[forTree listing]];

return self;
}


- printModel
{
id modelListing;

modelListing = [model listing];
return [self printModel:modelListing];
}
```

```
- openWindow
  {
  [Cursor push:cursors.Wait];
  [statusMonitor formatting];

  [self compose];
  [self openModel];

  [Cursor pop];
  [statusMonitor normalStatus];
  return self;
  }



- forTree
  {
  return forTree;
  }


- dataTree
  {
  return dataTree;
  }


- template
  {
  return template;
  }


- templateLayer
  {
  return templateLayer;
  }


- templateScrollBar
  {
  return templateScrollBar;
  }


- horizontalBar
  {
  return templateScrollBar;
  }


- updateRangeLayer:aCharString
  {
  char tempString[50];

  if ( (!_dictcmp([aCharString str],"2Years")) ||
       (!_dictcmp([aCharString str],"2Year")) )
     {
     [rangeLayer myStr:"over:2Years"];
     [[rangeLayer button2] on];
     }
  else
     {
```

```
    id tempReceiver;

    strcpy(tempString,"over:");
    strcat(tempString,[aCharString str]);
    tempString[strlen(tempString)] = 0;

    tempReceiver = [[rangeLayer button3] onReceiver];
    [[rangeLayer button3] onReceiver:nil];
    [[rangeLayer button3] on];
    [rangeLayer updateStatement:tempString];
    [rangeLayer updateMyDisplay];
    [[rangeLayer button3] onReceiver:tempReceiver];
    }
  }

- updateWindow:aForStmtId
  {
  id over;

  over = [[aForStmtId rightNode] modifierFor:"over"];
  if (over)
     over = [CharString str:[over str]];

  [super updateWindow:aForStmtId];
  if (over)
     {
     [self updateRangeLayer:over];
     over = [over free];
     }
  else
     [[rangeLayer button1] on];


  return self;
  }

- defaultSetting:aForStatement
  {
  if (forTree)
     {
     forTree = [[interpreter parseString:aForStatement] replace:forTree];
     [self updateWindow:forTree];
     }
  return self;
  }



// Correct this later...

- (BOOL)updateForStmt
  {
  id tempFor,tempTree,message;

  [statusMonitor formatting];

  tempFor = [CharString str:"For "];
  [tempFor concatSTR:[universeLayer myStr]];

  if ( (strcmp([dateLayer myStr],"")) || (strcmp([rangeLayer myStr],"")) )
     {
     [tempFor concatSTR:"("];
```

```
    [tempFor concatSTR:[dateLayer my    ];
    if ( (strcmp([dateLayer myStr],"")) && (strcmp([rangeLayer myStr],"")) )
       [tempFor concatSTR:","];
    [tempFor concatSTR:[rangeLayer myStr]];
    [tempFor concatSTR:")"];
    }

 if (tempTree = [[self interpreter] parseString:tempFor])
    {
    forTree = [tempTree replace:forTree];
    tempFor = [tempFor free];
    [statusMonitor normalStatus];
    return YES;
    }

 message = [CharString str:"Syntax Error! Check Statement"];
 [self displayErrorPrompter:message];
 message = [message free];

 tempFor = [tempFor free];
 [statusMonitor normalStatus];
 return NO;
 }


- (BOOL)checkForSelection:aDALayer
 {
 id selectedDataItem = [aDALayer selectionItem];

 if (!selectedDataItem)
    {
    id message;
    message = [CharString str:"Data item has not been selected from list"];
    [self displayErrorPrompter:message];
    message = [message free];
    return NO;
    }
 return YES;
 }


- parseMemoStatement:dataItems
 {
 short index;
 id tempId,memoId;

 [statusMonitor formatting];

 if ([dataItems size]>0)
    {

    if (! (strcmp([self extensionSTR],".rwr")) )
       tempId = [CharString str:"Make Report enclose("];
    else
       tempId = [CharString str:"Make Chart enclose("];

    for (index=0;index<[dataItems size]; index++)
        {
        [tempId concatSTR:[[dataItems at:index] str]];
        if (index < [dataItems size]-1)
           [tempId concatSTR:","];
        }
    [tempId concatSTR:")message(file:\"\")"];
    }
```

```
else tempId = [CharString str:"null:    "];

memoId = [interpreter parseString:tempId];
if (memoId)
   dataTree = [memoId replace:dataTree];

[statusMonitor normalStatus];
return memoId;
}



- initialize
{
[super initialize];

dataCltn = nil;
userDataCltn = nil;

model = nil;
dataTree = nil;
forTree = nil;

template = nil;
templateLayer = nil;
templateScrollBar = nil;

[self insideColor:BM_colors.Frame];
[self titleFont:BM_fonts.TitleBar];

return self;
}



- askDelete
{
id aRSTemplate;
unsigned response;

response=[BM_ChoiceDialogBox askChoiceUsingSTR:"Save chart/report specifications?"
   client:self button0STR:"No" button1STR:"Yes"];
if (response==1)
   {
   model = [[[self interpreter] currentModel] reset];
   [self saveFile:template];
   }

return [self delete];
}


- terminate$
{
if (dataCltn)
   dataCltn = [dataCltn free];
if (userDataCltn)
   userDataCltn = [userDataCltn free];
return [super terminate$];
}


=:
```

```
/*==================== DO NOT REMOV'    EDIT ===========================

      This comment and the following sccsId declaration are managed
      by SCCS for you. Do not edit or remove either.

      Source file:     /users/bmw/Alpha/Research/SCCS/s.VRLWin.m
      Latest version:  1.8
      Last mod time:   09/12/89 at 18:08:06

=====================================================================*/

static char *sccsId = "@(#)VRLWin.m rev 1.8 created on 09/12/89 at 18:08:06";

/*==================== DO NOT REMOVE OR EDIT ==========================*/

#include "objc.h"
#include "uil.h"
#include "BMWGlobal.h"
#include "BMGFXInterf.h"

@requires BM_Interpreter,BM_ChoiceDialogBox;
@requires Cursor,Menu;
@requires Prompter,CharString,BM_StringMatrix;
@requires ReportWin,ReportEdit,DataCltn,Report,BM_ListBox,BM_PCLPrinter;
@requires ChartWin,ChartEdit,Chart,ChartDataCltn;


= VRLWin:ApplicationWin(BM_WorkstationMsgs,UIMESSAGES)
  {
  id interpreter;
  id modelEditor;
  }


- (PT)centerErrorPrompter
  {
  if (modelEditor)
     return [modelEditor center];

  return [self center];
  }



- displayErrorPrompter:aMessage
  {
  [[[[[Prompter str:[aMessage str]]
     center:[self centerErrorPrompter]] insideColor:BM_colors.Prompter]
        waitForUser] free];
  return self;
  }


- update:aModel because:(SEL)aSelector
  {
  id message;

  if (aSelector == @selector(terminate$))
     [aModel removeDependent:self];
  else if (aSelector == @selector(globalStatus:))
     {
     if ([aModel globalStatus] == DATABASE_ERROR)
        message = [aModel statusMessage];
     else
```

```
    message = [stringTable VRLEr    essage:[aModel globalStatus]];
  [self displayErrorPrompter:message];
  }

return self;
}



- interpreter
{
return interpreter;
}


- buildOpList
{
return ([interpreter operatorList]);
}


- buildDataItemList
{
return([interpreter dataItemList]);
}


- buildNewDataList
{
return [interpreter newDataItemList];
}


- buildFuncList
{
return([interpreter functionList]);
}


- buildModList
{
return([interpreter modifierList]);
}


- buildQualifierList
{
return ([interpreter qualifierList]);
}


- (BOOL)knowsOrigin
{
return YES;
}
```

```
- open
  {
  [Cursor push:cursors.Wait];

  if (!opened)
    {
    opened = YES;
    [self openWindow];
    [modelEditor openModel];
    }

  [Cursor pop];
  return self;
  }


- openWindow
  {
  [Cursor push: cursors.Wait];

  [self modelEditor];

  [Cursor pop];
  return self;
  }


- printModel:modelListing
  {
  id aPrinter;

  [Cursor push: cursors.Wait];
  [statusMonitor graphics];

  aPrinter = [BM_PCLPrinter new];
  [aPrinter textWrite:[modelListing str] length:0 at:pt(0,0) font:nil
      foreground:0 background:0 rule:nil clipBy:nil];

  [statusMonitor freeing];
  [aPrinter free];
  [modelListing free];

  [statusMonitor normalStatus];
  [Cursor pop];

  return self;
  }


- printModel
  {
  id modelListing;

  modelListing = [[modelEditor model] listing];
  return [self printModel:modelListing];
  }


- runModel
  {
  [Cursor push:cursors.Wait];
  [statusMonitor traversal];
```

```
[interpreter executeCurrentModel];

[statusMonitor normalStatus];
[Cursor pop];
return self;
}


- saveModel
{
id aModel;

[Cursor push:cursors.Wait];

aModel = [interpreter currentModel];
[[[modelEditor displayTree] lastFrontLayer] saveDescription];
[self saveFile:aModel];

[Cursor pop];
return self;
}



- labelsFor:aMatrix universe:aUniverse node:aNode
{
id l;

if (l=[aNode savedLabels])
   return [l copy];
else
   if ([aUniverse size] == [aMatrix nRows])
      return ([aNode savedUniverseNames]);
   else
      return nil;
}



- generateGraphFor:aMatrix chartType:(short)aChartType node:aNode
{
if ([aMatrix isKindOf:BM_StringMatrix])
   {
   id message;
   message = [CharString str:"Values for this item cannot be graphed"];
   [self displayErrorPrompter:message];
   message = [message free];
   }
else
   {
   id gfxLayer;
   PT tempExtent;
   id outputLayer,title,temp,labels;
   id chart,dataCltn,cl;

   id oldName = [CharString str:[aMatrix nameSTR]];

   labels = [self labelsFor:aMatrix
      universe:[aNode savedUniverse] node:aNode];

   temp = [aNode listing];
   if (_dictcmp([temp str], "profile"))
      {
      title = [[aNode parent] listing];
      [aMatrix name:title];
```

```
        }

    //[title free];

    outputLayer = [[[ChartWin new] attachTo:deskTop] origin:pt(600,80)];
    [deskTop installIcon:[[outputLayer iconHandler] assignSTR:[temp str]]];

    dataCltn = [ChartDataCltn new];
    [dataCltn addSet:[aMatrix copy]];

    chart = [Chart defaultChartFor:dataCltn categoryLabels:labels
       seriesLabels:nil];
    [[[chart template] dataArea] normalSort];
    [dataCltn sortTable:(short)0 column:(short)0];
    [[[chart template] dataArea] chartType:aChartType];

    cl = [ChartEdit createInterfaceFor:chart parent:outputLayer];
    [outputLayer assignSTR:[temp str]];
    [[outputLayer applicationLayer:cl] close];

    [outputLayer translateWithin:deskTop];
    [[outputLayer iconHandler] open];

    temp = [temp free];
    }
  return self;
  }

- generateReportFor:aMatrix node:aNode
  {
  int x = 450;
  int y = x*ASPECT_RATIO_FUDGE;

  id idGFXLayer;
  id report, dataCltn;
  id outputLayer;
  id rl, title, labels, temp;

  BOOL dontSort;

  labels = [self labelsFor:aMatrix universe:[aNode savedUniverse]
     node:aNode];

  temp = [aNode listing];
  outputLayer = [[[[ReportWin new] attachTo:deskTop]
                                origin:pt(700,80)] assignSTR:[temp str]];
  [deskTop installIcon:[[outputLayer iconHandler] assignSTR:[temp str]]];

  dataCltn = [DataCltn new];
  [dataCltn addSet:labels];
  [dataCltn addSet:[aMatrix copy]];

  if (!_dictcmp([temp str], "profile"))
     {
     title = [CharString str:[aMatrix nameSTR]];
     dontSort = YES;
     }
  else
     {
     title = [[aNode parent] listing];
     dontSort = NO;
     }

  report = [Report defaultReportFor:dataCltn
```

```
    titleSTR:[title str] subTitleST    Matrix descriptionSTR]];
 if (dontSort)
    {
    [[[report template] dataArea] normalSort];
    [dataCltn sortTable:(short)0 column:(short)0];
    }

 [title free];

 rl = [ReportEdit createInterfaceFor:report parent:outputLayer];
 [[outputLayer applicationLayer:rl] close];

 [outputLayer translateWithin:deskTop];

 [[outputLayer iconHandler] open];
 temp = [temp free];

 return self;
 }


- addListBox:aStringMatrix width:(int)aWidth lines:(int)numLines
 {
 id aLBox;

 aLBox = [BM_ListBox stringMatrix:aStringMatrix lines:numLines
    client:nil font:BM_fonts.Application];
 [[aLBox borderWidth:1] borderColor:BM_colors.Border];
 [aLBox width:aWidth];

 return aLBox;
 }


- initialize
 {
 [super initialize];
 interpreter = [BM_Interpreter createInterfaceFor:databaseServer
    functionServer:functionServer withParser:YES];
 [interpreter addDependent:self];
 [self insideColor:BM_colors.Frame];
 modelEditor = nil;

 [self centerX:[deskTop centerX]];
 [self top:150];

 return self;
 }


- askDelete
 {
 id anyOldModel;
 unsigned response;

 response = [BM_ChoiceDialogBox askChoiceUsingSTR:"Save current model?"
    client:self button0STR:"No" button1STR:"Yes"];
 if (response == 1)
    {
    anyOldModel = [[[self interpreter] currentModel] reset];
    [self saveFile:anyOldModel];
    }
 return [self delete];
 }
```

```
- terminate$
  {
  if (interpreter)
     interpreter = [interpreter free];
  return [super terminate$];
  }

=:

/*===================== DO NOT REMOV    EDIT ============================

        This comment and the following sccsId declaration are managed
        by SCCS for you. Do not edit or remove either.

        Source file:      /users/bmw/Alpha/VRLDevelopment/SCCS/s.StatementLyr.m
        Latest version:   1.4
        Last mod time:    09/12/89 at 18:10:04

==========================================================================*/

static char *sccsId = "@(#)StatementLyr.m rev 1.4 created on 09/12/89 at 18:10:04";

/*===================== DO NOT REMOVE OR EDIT ===========================*/

#include <stdio.h>
#include "objc.h"
#include "uil.h"

#include "BMWGlobal.h"
#include "BMGFXInterf.h"

@requires PushButton,CharString;
@requires BM_StringEdit;


= StatementLayer:EditLayer(BM_WorkstationMsgs,UIMESSAGES)
  {
  id idStatement;
  }



- preParse
  {
  if (!([statementType compareSTR:"For"]))
     [[myStatementEditor parent] replaceStatement];
  else
     [[myStatementEditor parent] insertAfterStatement];

  return self;
  }



- carriageReturn
  {
  [idStatement on];
  }



- statementType:(STR)aStmtType
  {
  [super statementType:aStmtType];
```

```
  if (idStatement)
     {
     [idStatement setVisible:NO];
     [idStatement assignSTR:aStmtType];
     [idStatement outsideExtent:[idStatement defaultExtent]];
     [idStatement setVisible:YES];
     }
  else
     {
     idStatement = [PushButton str:aStmtType];
     [idStatement attachTo:self];
     [idStatement outsideExtent:[idStatement defaultExtent]];
     [idStatement left:[self left]+INNERSPACING];
     [idStatement centerY:[self centerY]];
     [[idStatement onReceiver:self] onSelector:@selector(preParse)];
     [self okButton:idStatement];
     }

  if (editStatement)
     {
     [editStatement origin:pt([idStatement adjacentRight]+3,
        [idStatement adjacentTop]+2)];
     [self show];
     }

  return self;
  }


- editStatement:(STR)aString font:aFont
  {
  if (editStatement)
     editStatement = [editStatement free];

  editStatement = [BM_StringEdit str:aString font:aFont];
  [editStatement attachTo:self];
  [editStatement origin:pt([idStatement adjacentRight]+3,
     [idStatement adjacentTop]+2)];
  [editStatement maxValueSize:500];
  [editStatement height:34];

  [editStatement show];
  [editStatement activate];
  return self;
  }


- compose
  {
  [self statementType:"Set"];
  [self editStatement:"" font:BM_fonts.VRLText];
  return self;
  }


- initialize
  {
  [super initialize];
  [self height:70];
  return self;
  }

=:
```

```
/*==================== DO NOT REMOV'   EDIT =============================

      This comment and the following sccsId declaration are managed
      by SCCS for you. Do not edit or remove either.

      Source file:     /users/bmw/Alpha/VRLDevelopment/SCCS/s.VRLDevWin.m
      Latest version:  1.8
      Last mod time:   09/12/89 at 18:09:53

=========================================================================*/

static char *sccsId = "@(#)VRLDevWin.m rev 1.8 created on 09/12/89 at 18:09:53";

/*==================== DO NOT REMOVE OR EDIT ===========================*/

#include <stdio.h>
#include "objc.h"
#include "uil.h"
#include "BMWGlobal.h"
#include "BMGFXInterf.h"

@requires Menu,Cursor,VRLPlateEditor,BitMap;

static id _myIconImage;

= VRLDevelopmentWin:VRLWin(BM_WorkstationMsgs,UIMESSAGES)
  {
  }

- (STR)extensionSTR
  {
  return ".vrl";
  }


- (STR)name
  {
  return "Modelling";
  }


- defaultIcon
  {
  if (_myIconImage == nil)
     _myIconImage = [BitMap readFrom:"icons/researchWin.icon"];

  return [_myIconImage shared$];
  }


- (PT)defaultExtent
  {
  return pt(925,825);
  }


- extent:(PT)aPoint
  {
  [statusMonitor formatting];

  [super extent:aPoint];
  [modelEditor outsideWidth:[applicationLayer width]-2*SPACING];
  [modelEditor outsideHeight:[applicationLayer height]-
     [[modelEditor statementEditor] outsideHeight]-3*SPACING];
```

```
[[modelEditor statementEditor] out     Width:[modelEditor outsideWidth]];

[statusMonitor normalStatus];
return self;
}



- modelEditor
{
if (!(modelEditor))
   {
   [statusMonitor formatting];

   modelEditor=[VRLPlateEditor new];
   [modelEditor researchWin:self];
   [modelEditor parent:self];

   [[modelEditor statementEditor] attachTo:applicationLayer];
   [[modelEditor statementEditor] outsideOrigin:
      pt([applicationLayer left]+SPACING,[applicationLayer top]+SPACING)];
   [[modelEditor statementEditor]
      outsideWidth:[applicationLayer width]-2*SPACING];
   [[modelEditor statementEditor] show];

   [modelEditor attachTo:applicationLayer];
   [modelEditor outsideOrigin:
      pt([applicationLayer left]+SPACING,[applicationLayer top]+
         [[modelEditor statementEditor] outsideHeight]+2*SPACING)];
   [modelEditor outsideWidth:[applicationLayer width]-2*SPACING];
   [modelEditor outsideHeight:[applicationLayer height]-
      [[modelEditor statementEditor] outsideHeight]-3*SPACING];

   [modelEditor compose];
   [modelEditor show];

   [statusMonitor normalStatus];
   }

return modelEditor;
}



- saveModel
{
id aModel;

[Cursor push:cursors.Wait];

aModel = [interpreter currentModel];
[[modelEditor plateList] elementsPerform:@selector(saveDescription)];
[self saveFile:aModel];

[Cursor pop];
return self;
}


=:
```

```
/*===================== DO NOT REMOVE    EDIT =============================

      This comment and the following sccsId declaration are managed
      by SCCS for you. Do not edit or remove either.

      Source file:     /users/bmw/Alpha/VRLDevelopment/SCCS/s.VRLPlateEdit.m
      Latest version:  1.12
      Last mod time:   09/12/89 at 18:09:28

==========================================================================*/

static char *sccsId = "@(#)VRLPlateEdit.m rev 1.12 created on 09/12/89 at 18:09:28";

/*===================== DO NOT REMOVE OR EDIT ===========================*/

#include "objc.h"
#include "uil.h"
#include "BMWGlobal.h"
#include "BMGFXInterf.h"

@requires Menu,BM_ToggleMenu,AdHocMenu,OrdCltn;
@requires BM_BarMenu,Cursor,CharString,BM_For,BM_Next;

static id _myMenu;
static id _adHocMenu;

@requires VRLStatementEditor;

= VRLPlateEditor:ModelEditor(BM_WorkstationMsgs,UIMESSAGES)
  {
  id aBarMenu;

  BOOL forMenu,nextMenu;
  id currentPlateId;
  id plateList;          //for restacking plates
  }

 - statementEditor
  {
  if (!(myStatementEditor))
     {
     [statusMonitor formatting];

     myStatementEditor = [VRLStatementEditor new];
     [myStatementEditor researchWin:[self researchWin]];
     [myStatementEditor parent:self];
     [myStatementEditor compose];
     [myStatementEditor width:[self width]-2*SPACING];

     [statusMonitor normalStatus];
     }
  return myStatementEditor;
  }


 - plateList
  {
  return plateList;
  }


 - runModel
  {
  return [researchWin runModel];
```

```
}

- printModel
{
return [researchWin printModel];
}

- saveModel
{
return [researchWin saveModel];
}

- currentStmtId:anId
{
id tempStmtId, tempPlateId;

if (!(currentStmtId == anId))
   {
   tempStmtId = currentStmtId;
   currentStmtId=anId;
   if ([tempStmtId isCurrent])
      [tempStmtId isCurrent:NO];
   [currentStmtId isCurrent:YES];

   tempPlateId = [[[[[currentStmtId dependents] at:0] backLayer]
      backLayer] model];
   if (!(tempPlateId == currentPlateId))
      [self currentPlateId:tempPlateId];
   }
else
   {
   if (!(nextMenu))
      [self editStatement];
   }

[self regularMenu];
return self;
}

- currentPlateId:anId
{
id tempId;

tempId = currentPlateId;
currentPlateId=anId;
[tempId isCurrent:NO];
[currentPlateId isCurrent:YES];

return self;
}

- currentPlateId
{
return currentPlateId;
}

- forStmt:anId
```

```
{
[self currentStmtId:anId];
[self forMenu:YES];
return self;
}


- nextStmt:anId
{
[self currentStmtId:anId];
[self nextMenu:YES];
return self;
}


- closeModel
{
[statusMonitor freeing];

if (plateList)
    plateList = [plateList free];

[statusMonitor normalStatus];

[super closeModel];

return self;
}


- displayModel:aTree
{
[Cursor push:cursors.Wait];

[super displayModel:aTree];

[displayTree insideColor:BM_colors.Frame];
[displayTree height:[displayTree height]-[aBarMenu outsideHeight]];
[displayTree top:[displayTree top]+[aBarMenu outsideHeight]];

plateList = [OrdCltn new];
[plateList addContentsOf:[displayTree frontLayers]];
currentPlateId = nil;

[self renumberPlates];

if (!([plateList size] > 1))
    [self initModel];

[displayTree show];

[Cursor pop];
return self;
}


- renumberPlates
{
id tempPlate;
PT aPos;
```

```
int aSize, index;
char pNumber[3];

[statusMonitor formatting];

aSize = [plateList size];
aPos  = ptPlus([innerLayer outsideOrigin],pt(60,88));

for (index=0; index<aSize;)
    {
    tempPlate = [plateList at:index];
    [tempPlate borderWidth:4];
    sprintf(pNumber, "%d",++index);
    [[tempPlate plateNum] assignSTR:pNumber];
    [[tempPlate  model] plateNumber:index];
    [[tempPlate moveTo:aPos] leftButtonDown];
    aPos = ptPlus(aPos,pt(25,25));
    }

[statusMonitor normalStatus];
return self;
}


- restackPlates
{
PT aPos;
int aSize, index;

[statusMonitor formatting];

aSize = [plateList size];
aPos  = ptPlus([innerLayer outsideOrigin],pt(60,88));

for (index=0; index<aSize;index++)
    {
    [[[plateList at:index] moveTo:aPos] leftButtonDown];
    aPos = ptPlus(aPos,pt(25,25));
    }

[statusMonitor normalStatus];
return self;
}


- updatePlates
{
[[[[[displayTree lastFrontLayer] bodyLayer] firstFrontLayer] aKey] on];
return self;
}


- insertAfterPlate
{
[self parsePlate:1];
return self;
}


- insertBeforePlate
{
[self parsePlate:2];
return self;
}
```

```
- deletePlate
  {
  [self parsePlate:3];
  return self;
  }


- replacePlate
  {
  [self parsePlate:4];
  return self;
  }


- displayPlate:aPlateNode
  {
  id subTree;

  [Cursor push:cursors.Wait];

  subTree = [self createInterfaceFor:aPlateNode root:nil];
  [subTree attachTo:displayTree at:pt(0,0)];
  [subTree setVisible:YES];

  [Cursor pop];
  return self;
  }



- parsePlate:(int)aMethod
              //aMethod -- 1:insertAfter 2:insertBefore 3:delete 4:replace
  {
  id newParseTree, newPlateLayer;
  short numPlates, currentPlateNum;

  [Cursor push: cursors.Wait];
  [statusMonitor formatting];
  numPlates = [[displayTree frontLayers] size];
  currentPlateNum=[currentPlateId plateNumber];

  if ((aMethod == 3) && (numPlates>1))
     {
     [currentPlateId deleteNode];
     [[plateList removeAt:(currentPlateNum-1)] delete];
     currentStmtId=currentPlateId=nil;
     }
  else
     {
     newParseTree = [[researchWin interpreter] stubPlate];
     switch (aMethod)
        {
        case 1: [newParseTree insertAfter:currentPlateId];
                [self displayPlate:newParseTree];
                [plateList at:currentPlateNum
                   insert:[displayTree lastFrontLayer]];
                [self currentStmtId:nil];
                break;
        case 2: [newParseTree insertBefore:currentPlateId];
                [self displayPlate:newParseTree];
                [plateList at:(currentPlateNum-1)
                   insert:[displayTree lastFrontLayer]];
                [self currentStmtId:nil];
                break;
```

```
        case 3:
        case 4: [newParseTree replace:currentPlateId];
                [self displayPlate:newParseTree];
                [[plateList at:(currentPlateNum-1)
                   put:[displayTree lastFrontLayer]] delete];
                currentStmtId = nil;
                currentPlateId = nil;

                break;
        }
     }
  [self renumberPlates];
  if ([plateList size] == 1)
     [self updatePlates];

  [statusMonitor normalStatus];

  [Cursor pop];
  return self;
  }

- (BOOL)parseStatement: aStmt
  {
  id  myParseTree, stmtList, plateBody, oldArea;
  short aLength;

  [Cursor push:cursors.Wait];

  if ((forMenu) && (!(forFlag)) && (statementMethod == 4))
     {
     id message;
     message = [CharString str:"Error: Context statement cannot be changed"];
     [self displayErrorPrompter:message];
     message = [message free];
     return NO;
     }

  if (forFlag && (((forMenu) && (!(statementMethod == 4))) ||
     ((!(forMenu)) && (!(statementMethod == 3))) ))
        {
        id message;
        message = [CharString str:
           "Error: Context statement cannot be duplicated."];
        [self displayErrorPrompter:message];
        message = [message free];
        return NO;
        }

  [statusMonitor formatting];

  [aStmt asSTR:aStatement maxSize:1000];
  aLength = [aStmt length];
  aStatement[aLength] = '\0';

  if (statementMethod == 3)
     myParseTree = [[researchWin interpreter]
        parseString:[CharString str:"nullStmt"]];
  else
     myParseTree = [[researchWin interpreter]
        parseString:[CharString str:aStatement]];

  if (myParseTree == nil)
     {
     id message;
     message = [CharString str:"Syntax Error! Please check statement."];
```

```
   [self displayErrorPrompter:mess
   message = [message free];
   return NO;
   }

[statusMonitor formatting];
plateBody = [[[currentPlateId dependents] at:0] bodyLayer];
oldArea = [plateBody  maxContentsArea];
        //special condition for NEXT and FOR statements
stmtList = [[[[currentStmtId dependents] at:0] backLayer] frontLayers];

if ([currentStmtId isKindOf:BM_Next])
   {
   [myParseTree insertAfter:
      [[stmtList before:[[currentStmtId dependents] at:0]] model]];
   statementMethod = 2;
   }
else
   if (statementMethod == 1)
      {
      if ([currentStmtId isKindOf:BM_For])
         [myParseTree insertBefore:[[stmtList at:1] model]];
      else
         [myParseTree insertAfter:currentStmtId];
      }
   else
      if (statementMethod == 2)
         [myParseTree insertBefore:currentStmtId];

   // statementMethod 3 and 4 implemented in -displayStatement (bad solution)
   [self displayStatement:myParseTree];
   [myParseTree isCurrent:NO];
   statementMethod = 1;                              //set default method

   if (!(ptIsEqual([oldArea extent],[[plateBody  maxContentsArea] extent])))
      [[[[currentPlateId dependents] at:0] bodyLayer]
         changed:@selector(maxContentsArea)];
   else [plateBody repaint];

   [oldArea free];
   //[[[currentPlateId dependents] at:0] leftButtonDown];
   [statusMonitor normalStatus];
   [Cursor pop];

   return YES;
   }




- forMenu:(BOOL)aFlag
   {
   if (aFlag)
      {
      [[[[self statementMenu] children] at:0] selectable:YES];
      [[[[self statementMenu] children] at:1] selectable:NO];
      [[[[self statementMenu] children] at:2] selectable:NO];
      [[[[self statementMenu] children] at:3] selectable:YES];
      [[[[self statementMenu] children] at:4] selectable:YES];
      }
   forMenu = aFlag;
   return self;
   }
```

```
- (BOOL)forMenu
  {
  return forMenu;
  }


- nextMenu:(BOOL)aFlag
  {
  if (aFlag)
     {
     [[[[self statementMenu] children] at:0] selectable:NO];
     [[[[self statementMenu] children] at:1] selectable:YES];
     [[[[self statementMenu] children] at:2] selectable:NO];
     [[[[self statementMenu] children] at:3] selectable:NO];
     [[[[self statementMenu] children] at:4] selectable:NO];
     }
  nextMenu = aFlag;
  return self;
  }


- (BOOL)nextMenu
  {
  return nextMenu;
  }


- regularMenu
  {
  [self forMenu:NO];
  [self nextMenu:NO];
  [[[[self statementMenu] children] at:0] selectable:YES];
  [[[[self statementMenu] children] at:1] selectable:YES];
  [[[[self statementMenu] children] at:2] selectable:YES];
  [[[[self statementMenu] children] at:3] selectable:YES];
  [[[[self statementMenu] children] at:4] selectable:YES];
  return self;
  }



/* doesn't work */

static char entry1 [50] = " Perform Auto Currency Conversion\0";
static char entry2 [50] = " Keep Expression Values\0";
//static id optionsMenuCltn = nil;


- makeOptionsMenu
  {
  id optionsMenuCltn = nil; /* should be static!! */

  if (optionsMenuCltn == nil)
    {
    optionsMenuCltn = [OrdCltn new];

    optionsMenuCltn = [optionsMenuCltn add:[BM_ToggleMenu str:"hello"
       selector:@selector(doCurrencyConversion:) receiver:self]];

    optionsMenuCltn = [optionsMenuCltn add:[BM_ToggleMenu str:" "
       selector:@selector(keepValues:) receiver:self]];
    }
```

```
if ([[researchWin interpreter] doCu    cyConversion])
   entry1[0] = '*';
else
   entry1[0] = ' ';

if ([[researchWin interpreter] keepValues])
   entry2[0] = '*';
else
   entry2[0] = ' ';

[[optionsMenuCltn at:0] assignSTR:entry1];
[[optionsMenuCltn at:1] assignSTR:entry2];

return optionsMenuCltn;
}


- keepValues:(BOOL)doIt
 {
 return [[researchWin interpreter] keepValues:doIt];
 }


- doCurrencyConversion:(BOOL)doIt
 {
 return [[researchWin interpreter] doCurrencyConversion:doIt];
 }


- defaultMenu
 {
 id aSubMenu;

 if (!(_myMenu))
    {
    _myMenu = [Menu str:"PlateWndw"];
    [_myMenu append:[Menu str:"Run" selector:@selector(runModel)]];
    [_myMenu append:_adHocMenu=aSubMenu=[AdHocMenu  str:"Options"]];
    [[aSubMenu childObject:self] childSelector:@selector(makeOptionsMenu)];
/*
    [aSubMenu append:[BM_ToggleMenu str:"*Perform Auto Currency Conversion"
       selector:@selector(doCurrencyConversion:) receiver:self]];
    [aSubMenu append:[BM_ToggleMenu str:"*Keep Intermediate Values"
       selector:@selector(keepValues:) receiver:self]];
*/
    [_myMenu append:aSubMenu=[Menu str:"Model"]];
//  [aSubMenu append:[Menu str:"Delete" selector:@selector(deleteModel)]];
    [aSubMenu append:[Menu str:"Save" selector:@selector(saveModel)]];
    [aSubMenu append:[Menu str:"Print" selector:@selector(printModel)]];

    [_myMenu append:aSubMenu=[Menu str:"Plate"]];
    [aSubMenu append:[Menu str:"Insert After"
       selector:@selector(insertAfterPlate)]];
    [aSubMenu append:[Menu str:"Insert Before"
       selector:@selector(insertBeforePlate)]];
    [aSubMenu append:[Menu str:"Delete"
       selector:@selector(deletePlate)]];
    [aSubMenu append:[Menu str:"Replace"
       selector:@selector(replacePlate)]];
    [aSubMenu append:[Menu str:"Restack"
       selector:@selector(restackPlates)]];

    [_myMenu append:aSubMenu=[Menu str:"Statement"]];
    [aSubMenu append:[Menu str:"Insert After"
       selector:@selector(insertAfterStatement)]];
```

```
    [aSubMenu append:[Menu str:"Inse    efore"
       selector:@selector(insertBeforestatement)]];
    [aSubMenu append:[Menu str:"Delete"
       selector:@selector(deleteStatement)]];
    [aSubMenu append:[Menu str:"Replace"
       selector:@selector(replaceStatement)]];
    [aSubMenu append:[Menu str:"Edit"
       selector:@selector(editStatement)]];
    }
  [_adHocMenu childObject:nil];
  return [_myMenu shared$];
  }


- defaultBarMenu
  {
  aBarMenu = [BM_BarMenu createInterfaceFor:[self defaultMenu] client:self];
  [aBarMenu borderWidth:2];
  [aBarMenu attachTo:innerLayer at:pt(0,0)];
  [aBarMenu outsideWidth:[innerLayer width]];
  [aBarMenu height:(short)(1.1*[aBarMenu height])];

  return self;
  }


- updateMenu
  {
  [aBarMenu receiver:self];

  if ([self nextMenu])
     [self nextMenu:YES];
  else if ([self forMenu])
     [self forMenu:YES];
  else [self regularMenu];

  [_adHocMenu childObject:self];
  return self;
  }


- statementMenu
  {
  return [[[self defaultMenu] children] lastElement];
  }


- extent:(PT)aPoint
  {
  [statusMonitor formatting];

  [super extent:aPoint];
  [aBarMenu outsideWidth:[innerLayer width]];
  if (displayTree)
     {
     [displayTree width:[innerLayer width]];
     [displayTree height:[innerLayer height]-[aBarMenu outsideHeight]];
     }

  [statusMonitor normalStatus];
  return self;
  }
```

```
- compose
  {
  [statusMonitor formatting];

  [super compose];
  [self defaultBarMenu];
  [innerLayer insideColor:BM_colors.Frame];

  [statusMonitor normalStatus];
  return self;
  }


/*
- changeFont:aMenuItem
  {
  id userFont, tempFont;

  [Cursor push: cursors.Wait];

  tempFont = BM_fonts.VRLText;
  userFont = [CharString str:[[aMenuItem menu] str]];
  [userFont concatSTR:[FontManager fontNameExtensionSTR]];

  BM_fonts.VRLText = [Font fontName:[userFont str]];
  [self displayModel:[[researchWin interpreter] currentModel]];

  //[tempFont free];
  [userFont free];

  [Cursor pop];
  return self;
  }



- defaultFontMenu
  {
  id fontMenu;
  if (!(_fontMenu))
     {
     fontMenu = [FontManager defaultFontMenu];
     [fontMenu assignSTR:"Fonts"];
     [[fontMenu children] elementsPerform:@selector(selector:)
        with:@selector(changeFont:)];
     _fontMenu = fontMenu;
     }

  return [_fontMenu shared$];
  }



- defaultPopUpMenu
  {
  if (!(_popUpMenu))
     _popUpMenu = [PopUpMenu createInterfaceFor:[self defaultFontMenu]
        button:RIGHTBUTTON];

  return [_popUpMenu shared$];
  }
```

```
- (BOOL)rightButtonDown
  {
  [[self defaultPopUpMenu] receiver:self];
  [_popUpMenu activateAt:event.origin];
  return YES;
  }

*/


=:

/*==================== DO NOT REMOVE   EDIT ============================

       This comment and the following sccsId declaration are managed
       by SCCS for you. Do not edit or remove either.

       Source file:     /users/bmw/Alpha/VRLDevelopment/SCCS/s.VRLStmtEdit.m
       Latest version:  1.9
       Last mod time:   09/12/89 at 18:09:42

==========================================================================*/

static char *sccsId = "@(#)VRLStmtEdit.m rev 1.9 created on 09/12/89 at 18:09:42";

/*==================== DO NOT REMOVE OR EDIT ===========================*/

#include "objc.h"
#include "uil.h"
#include "BMWGlobal.h"
#include "BMGFXInterf.h"

#include <string.h>

@requires CharString,Menu,AdHocMenu,OrdCltn,SortCltn;
@requires BM_BarMenu,StatementLayer;

static id _myMenu;
static id _adHocMenu;

= VRLStatementEditor:InnerWindow(BM_WorkstationMsgs,UIMESSAGES)
  {
  id aBarMenu;
  id editLayer;
  id aStatement;

  id researchWin;
  }

- interpreter
  {
  return [researchWin interpreter];
  }

- researchWin
  {
  return researchWin;
  }

- researchWin:aWindow
  {
  researchWin=aWindow;
  return self;
  }
```

```
- appendToMenu:aMenu entries:aStringMatrix
  {
  unsigned row;

  for (row = 0; row < [aStringMatrix nRows]; row++)
     [aMenu append:[Menu str:[[aStringMatrix atRow:row Col:0] str]
                    selector:@selecto   1ToStatement:)]];

  [aStringMatrix free];

  return self;
  }


- buildNewDataItemMenu
  {
  id entries = [researchWin buildNewDataList];
  id list;

  unsigned row;

  if (entries == nil)
     return nil;

  list = [OrdCltn new];

  for (row = 0; row < [entries nRows]; row++)
     [list add:[Menu str:[[entries atRow:row Col:0] str]
               selector:@selector(addToStatement:)
               receiver:self]];

  [entries free];

  return list;
  }


- defaultMenu
  {
  id aSubMenu;

  if (!(_myMenu))
     {
     _myMenu = [Menu str:"EditWindow"];

     [_myMenu append:aSubMenu=[Menu str:"Statement Type"]];
     [aSubMenu append:[Menu str:"For" selector:@selector(openStatement:)]];
     [aSubMenu append:[Menu str:"Where" selector:@selector(openStatement:)]];
     [aSubMenu append:[Menu str:"Set" selector:@selector(openStatement:)]];
     [aSubMenu append:[Menu str:"Install" selector:@selector(openStatement:)]];
     [aSubMenu append:[Menu str:"Temp" selector:@selector(openStatement:)]];
     [aSubMenu append:[Menu str:"Delete" selector:@selector(openStatement:)]];
     [aSubMenu append:[Menu str:"SaveList" selector:@selector(openStatement:)]];
     [aSubMenu append:[Menu str:"Make Report" selector:@selector(openStatement:)]];
     [aSubMenu append:[Menu str:"Make Chart" selector:@selector(openStatement:)]];

     [_myMenu append:aSubMenu=[Menu str:"Operators"]];
     [self appendToMenu:aSubMenu entries:[researchWin buildOpList]];

     [_myMenu append:aSubMenu=[Menu str:"Modifiers"]];
     [self appendToMenu:aSubMenu entries:[researchWin buildModList]];

     [_myMenu append:aSubMenu=[Menu str:"Functions"]];
     [self appendToMenu:aSubMenu entries:[researchWin buildFuncList]];
```

```
  [_myMenu append:aSubMenu=[Menu str:"Contexts"]];
  [self appendToMenu:aSubMenu entries:[researchWin buildQualifierList]];

  [_myMenu append:aSubMenu=[Menu str:"Data Items"]];
  [self appendToMenu:aSubMenu entries:[researchWin buildDataItemList]];

  [_myMenu append:_adHocMenu=aSubMenu=[AdHocMenu str:"User Data Items"]];
  [[aSubMenu childObject:self]
     childSelector:@selector(buildNewDataItemMenu)];
  }
 [_adHocMenu childObject:nil];
 return [_myMenu shared$];
 }

- updateMenu
 {
 unsigned index, numItems;

 [aBarMenu receiver:self];
 [_adHocMenu childObject:self];

 return self;
 }

- defaultBarMenu
 {
 aBarMenu = [BM_BarMenu createInterfaceFor:[self defaultMenu]
    button:LEFTBUTTON  withSubMenuFor: 20 client:self];
 [aBarMenu borderWidth:2];
 [aBarMenu attachTo:innerLayer at:pt(0,0)];
 [aBarMenu outsideWidth:[innerLayer width]];
 [aBarMenu height:(short)(1.1*[aBarMenu height])];

 return self;
 }

- addToStatement: idMenuItem
 {
 [editLayer addToStatement:[idMenuItem menu]];
 return self;
 }

- editLayer
 {
 return editLayer;
 }

- initStatement:(STR)aStatementType
 {
 editLayer = [StatementLayer attachTo:innerLayer
    at:pt(SPACING,SPACING+[aBarMenu outsideHeight])];
 [editLayer outsideWidth:[innerLayer width]-2*SPACING];
 [editLayer statementEditor:self];
 [editLayer compose];

 aStatement = [editLayer returnEditStatement];
 [editLayer show];
 return self;
 }

- openStatement:idMenuItem
 {
 [editLayer clear];
 [editLayer statementType:[[idMenuItem menu] str]];
```

```
 return self;
 }


- extent:(PT)aPoint
 {
 [super extent: aPoint];
 [aBarMenu outsideWidth:[innerLayer width]];
 [editLayer outsideWidth:[innerLayer width]-2*SPACING];

 return self;
 }


- compose
 {
 [super compose];
 [innerLayer insideColor:BM_colors.WindowBackground];
 [self defaultBarMenu];
 [self initStatement:"Set"];

 [self height:[aBarMenu outsideHeight]+[editLayer outsideHeight]
    +2*INNERSPACING+2*SPACING];
 return self;
 }


=:


/*===================== DO NOT REMOVE     DIT =============================

        This comment and the following sccsId declaration are managed
        by SCCS for you. Do not edit or remove either.

        Source file:     /users/bmw/Alpha/Screening/SCCS/s.CompULayer.m
        Latest version:  1.11
        Last mod time:   08/30/89 at 17:46:45

========================================================================*/

static char *sccsId = "@(#)CompULayer.m rev 1.11 created on 08/30/89 at 17:46:45";

/*===================== DO NOT REMOVE OR EDIT ===========================*/

#include "objc.h"
#include "uil.h"
#include "BMWGlobal.h"

@requires InsetLayer,RadioButton,LabelButton,RadioBGroup;
@requires BorderLayer;

= CompULayer: InnerWindow (BM_WorkstationMsgs, UIMESSAGES)
  {
  id button1a,button1b,button1c,button2a,button2b,button2c;
  id lbutton1a,lbutton1b,lbutton1c,lbutton2a,lbutton2b,lbutton2c;
  }

 - lbutton1a
  {
  return lbutton1a;
  }
```

```
- lbutton1b
{
return lbutton1b;
}


- compose
{
id radioGroup1,radioGroup2;
id otherLayer;

[super compose];

button1a = [[RadioButton str:""] extent:pt(10,10)];
button1b = [[RadioButton str:""] extent:pt(10,10)];
button1c = [[RadioButton str:""] extent:pt(10,10)];
button2a = [[RadioButton str:""] extent:pt(10,10)];
button2b = [[RadioButton str:""] extent:pt(10,10)];
button2c = [[RadioButton str:""] extent:pt(10,10)];

lbutton1a = [[LabelButton new] addButton:button1a label:"S&P500"
   font:BM_fonts.Application color:BM_colors.Foreground];
[lbutton1a fontColor:BM_colors.VRLText];
lbutton1b = [[LabelButton new] addButton:button1b label:"BIS5000"
   font:BM_fonts.Application color:BM_colors.Foreground];
[lbutton1b fontColor:BM_colors.VRLText];
lbutton1c = [[LabelButton new] addButton:button1c label:""
   font:BM_fonts.Application color:BM_colors.Foreground];
[lbutton1c fontColor:BM_colors.VRLText];

radioGroup1 = [RadioBGroup extent:pt(100,80)];
[radioGroup1 attachTo:innerLayer at:pt(INNERSPACING,INNERSPACING)];
[radioGroup1 addButton:lbutton1a];
[radioGroup1 addButton:lbutton1b];
[radioGroup1 addButton:lbutton1c];
[radioGroup1 format];

otherLayer = [BorderLayer attachTo:innerLayer at:pt(35,65)];
[[otherLayer borderWidth:1] borderColor:BM_colors.Border];
[otherLayer insideColor:BM_colors.Foreground];
[otherLayer extent:pt(115,17)];

lbutton2a = [[LabelButton new] addButton:button2a label:"Equal Weight"
   font:BM_fonts.Application color:BM_colors.Foreground];
[lbutton2a fontColor:BM_colors.VRLText];
lbutton2b = [[LabelButton new] addButton:button2b label:"MktCap Weight"
   font:BM_fonts.Application color:BM_colors.Foreground];
[lbutton2b fontColor:BM_colors.VRLText];
lbutton2c = [[LabelButton new] addButton:button2c label:"Holdings Weight"
   font:BM_fonts.Application color:BM_colors.Foreground];
[lbutton2c fontColor:BM_colors.VRLText];

radioGroup2 = [RadioBGroup extent:pt(150,80)];
[radioGroup2 attachTo:innerLayer at:pt(203,INNERSPACING)];
[radioGroup2 addButton:lbutton2a];
[radioGroup2 addButton:lbutton2b];
[radioGroup2 addButton:lbutton2c];
[radioGroup2 format];

[button1a on];
[button2a on];
return self;
}
```

```
- initialize
  {
  [super initialize];
  [self outsideExtent:pt(385,147)];
  return self;
  }

=:

/*==================== DO NOT REMOVE     DIT ============================

        This comment and the following sccsId declaration are managed
        by SCCS for you. Do not edit or remove either.

        Source file:     /users/bmw/Alpha/Screening/SCCS/s.CritLayer.m
        Latest version:  1.29
        Last mod time:   09/12/89 at 18:06:49

=====================================================================*/

static char *sccsId = "@(#)CritLayer.m rev 1.29 created on 09/12/89 at 18:06:49";

/*==================== DO NOT REMOVE OR EDIT ==========================*/

#include "objc.h"
#include "uil.h"
#include "BMWGlobal.h"

@requires Cursor,Prompter,CharString;
@requires RadioButton;
@requires InsetLayer;
@requires BM_Next,BM_For,BS_NullStatement,BS_SaveList,BS_Where,BS_For;
@requires BM_ParseTreeNode,BM_SaveList;


= CriteriaLayer:ModelEditor(BM_WorkstationMsgs,UIMESSAGES)
  {
  id forStmtId;
  BOOL editFocus;
  }



- update:aWindow because:(SEL)aSelector
  {
  if (aSelector == @selector(focusWindow:))
     {
     if ( (self == [aWindow focusWindow]) && !([self editFocus]))
        [self editFocus:YES];
     else
        if ( (!(self == [aWindow focusWindow])) && [self editFocus])
           [self editFocus:NO];
     }
  return self;
  }



- (BOOL)leftButtonDown
  {
  [[researchWin helpLayer]
     updateHelp:"Enter screening criteria using editor. Statement"
           and:"highlight shows input focus. Move with button."];
  return YES;
  }
```

```
- currentStmtId:anId
  {
  [self statementEditor];
  return [super currentStmtId:anId];
  }


- forStmtId
  {
  return forStmtId;
  }


- forStmtId:anId
  {
  forStmtId = anId;
  return self;
  }


- createInterfaceFor:aBM_Node root:aRootNode
  {
  id subTree;

  [statusMonitor formatting];

  subTree = [[aBM_Node interfaceClass]
     applicationInterfaceFor:aBM_Node root:nil];
  [subTree modelEditor:self];
  [subTree formatNode];
  [subTree dispNode];

  [statusMonitor normalStatus];
  return (subTree);
  }


- openModel
  {
  id modelTree;

  [Cursor push: cursors.Wait];

  if (![researchWin fileName])
     {
     id tempId;
     modelTree = [[researchWin interpreter] stubModel];
     tempId = [CharString str:"SaveList ScreenedList"];
     [[[researchWin interpreter] parseString:tempId]
        insertAfter:[[modelTree at:1] at:1]];
     tempId = [tempId free];
     }
  else
     modelTree = [BM_ParseTreeNode readFrom:[[researchWin path] str]];
  [[researchWin interpreter] currentModel:modelTree];
  [self displayModel:modelTree];

  [Cursor pop];
  return self;
  }


- initModel
  {
  short index;
  id myStatements;
```

```
[statusMonitor initialization];

currentStmtId = nil;
myStatements = [[[displayTree lastFrontLayer] bodyLayer] frontLayers];
forStmtId = [[myStatements at:0] m    ';

if ([researchWin resultsLayer])
   for (index=0;index<[myStatements size];index++)
      {
      if ( ([[myStatements at:index] isKindOf:BS_For]) ||
           ([[myStatements at:index] isKindOf:BS_Where]) )
         {
         [[[myStatements at:index] model]
            addDependent:[researchWin resultsLayer]];
         [[researchWin resultsLayer]
            addParent:[[myStatements at:index] model]];
         }
      }
            // last statement is highlighted
[[[[[displayTree lastFrontLayer] bodyLayer] lastFrontLayer] model]
   isCurrent:NO];
[self checkNextOrSave];

[statusMonitor normalStatus];
return self;
}



- displayModel:aTree
{
id myPlate;

[Cursor push:cursors.Wait];

[super displayModel:aTree];

myPlate = [displayTree lastFrontLayer];
[myPlate borderWidth:4];
[myPlate outsideOrigin:ptPlus([displayTree origin],pt(2,2))];
[myPlate outsideExtent:ptMinus([displayTree extent],pt(4,4))];

[displayTree insideColor:BM_colors.Foreground];
[displayTree show];

[self initModel];

[Cursor pop];
return self;
}



- checkNextOrSave
{
id myStatements;
short index;
BOOL found;

myStatements = [[[displayTree lastFrontLayer] bodyLayer] frontLayers];
found = NO;
for(index = [myStatements size]-1; index>0 && !found;)
   if ( (![[myStatements at:--index] isKindOf:BS_NullStatement]) &&
        (![[myStatements at:index] isKindOf:BS_SaveList]) )
```

```
		{
		found = YES;
		[[[myStatements at:index] model] isCurrent:NO];
		}

	return self;
	}

- editStatement
	{
	if (!(forStmtId == [self currentStmtId]))
	   [super editStatement];
	return self;
	}

- insertBeforeStatement
	{
	if (!(forStmtId == [self currentStmtId]))
	   [super insertBeforeStatement];
	else
	   [self insertAfterStatement];

	return self;
	}

- deleteStatement
	{
	if (!(forStmtId == [self currentStmtId]))
	   {
	   [super deleteStatement];

	   if ([currentStmtId isKindOf:BM_SaveList])
	      [self checkNextOrSave];
	   }
	return self;
	}

- replaceStatement
	{
	if (!(forStmtId == [self currentStmtId]))
	   [super replaceStatement];
	return self;
	}


- (BOOL)editFocus
	{
	return editFocus;
	}


- editFocus:(BOOL)aBoolean
	{
	editFocus = aBoolean;
	if (editFocus)
	   [[self researchWin] focusColor:BM_colors.Text];
	else
	   [[self researchWin] focusColor:BM_colors.Foreground];
	return self;
	}


- statementEditor
	{
```

```
myStatementEditor = statementEdit(

 if (!([[myStatementEditor dependents] find:self]))
    [myStatementEditor addDependent:self];

 [myStatementEditor focusWindow:self];

 [[myStatementEditor editLayer] statementType:"Where"];

 return myStatementEditor;
}


- (BOOL)parseStatement: aStatementId
{
id  myParseTree,stmtList,plateBody,oldArea;
short aLength;

[Cursor push: cursors.Wait];

[aStatementId asSTR:aStatement maxSize:1000];
aLength = [aStatementId length];
aStatement[aLength] = '\0';

if (statementMethod == 3)
   myParseTree = [[researchWin interpreter]
      parseString:[CharString str:"nullStmt"]];
else
   myParseTree = [[researchWin interpreter]
      parseString:[CharString str:aStatement]];


 if (myParseTree == nil)
   {
   id aMessage;
   aMessage = [CharString str:"Syntax Error! Check Statement"];
   [self displayErrorPrompter:aMessage];
   aMessage = [aMessage free];
   [Cursor pop];
   return NO;
   }

 if ( (forStmtId == [self currentStmtId]) && (statementMethod == 4) )
   [self forStmtId:myParseTree];

 [statusMonitor formatting];
 plateBody = [[displayTree lastFrontLayer] bodyLayer];
 oldArea = [plateBody  maxContentsArea];
 stmtList = [[[[currentStmtId dependents] at:0] backLayer] frontLayers];

          //special condition for FOR statements .
 if (statementMethod == 1)
   {
   if ([currentStmtId isKindOf:BM_For])
       [myParseTree insertBefore:[[stmtList at:1] model]];
   else
       [myParseTree insertAfter:currentStmtId];
   }
 else
   if (statementMethod == 2)
      [myParseTree insertBefore:currentStmtId];

 [self displayStatement:myParseTree];
```

```
if ([researchWin resultsLayer])
   {
   [myParseTree addDependent:[researchWin resultsLayer]];
   [[researchWin resultsLayer] addParent:myParseTree];
   }

statementMethod = 1;                //set default method

if (forStmtId != myParseTree)
   {
   [myParseTree isCurrent:NO];

   if (!(ptIsEqual([oldArea extent],[[plateBody maxContentsArea] extent])))
      [[[displayTree lastFrontLayer] bodyLayer]
         changed:@selector(maxContentsArea)];
   else [plateBody repaint];
   }
else
   [self setCurrentStmtId:forStmtId];

[oldArea free];

[statusMonitor normalStatus];
[Cursor pop];
return YES;
}


- compose
{
[statusMonitor formatting];
[super compose];
[self show];
[self openModel];
[[self researchWin] updateWindow:forStmtId];
[statusMonitor normalStatus];
return self;
}


- initialize
{
[super initialize];
[self outsideExtent:pt(570+2*SPACING,244)];
return self;
}


- terminate$
{
[myStatementEditor removeDependent:self];

if ([[myStatementEditor dependents] size]>0)
   {
   if ([myStatementEditor focusWindow] == self)
      [myStatementEditor resetFocusWindow];
   }

return [super terminate$];
}

=:
```

```
/*===================== DO NOT REMOV'   EDIT =============================

	This comment and the following sccsId declaration are managed
	by SCCS for you. Do not edit or remove either.*

	Source file:	/users/bmw/Alpha/Screening/SCCS/s.EditorWin.m
	Latest version:	1.33
	Last mod time:	09/12/89 at 18:07:05

========================================================================*/

static char *sccsId = "@(#)EditorWin.m rev 1.33 created on 09/12/89 at 18:07:05";

/*===================== DO NOT REMOVE OR EDIT ===========================*/

#include "objc.h"
#include "uil.h"
#include "BMWGlobal.h"

@requires ButtonGroup,BitMap,InnerWindow,EditLayer;
@requires PushButton,BM_ListBox,BM_Interpreter;

static id _myIconImage;

= EditorWin:WindowLayer(BM_WorkstationMsgs,UIMESSAGES)
  {
  id editLayer;
  id addAfterButton,addBeforeButton,editButton,replaceButton,deleteButton;

  id dataCltn,userDataCltn,operatorCltn,functionCltn;
  id dataLB,operatorLB,functionLB,userDataLB;
  id focusWindow;

  id interpreter;
  }

- defaultIcon
  {
  if (_myIconImage == nil)
     _myIconImage = [BitMap readFrom:"icons/EditorWin.icon"];

  return [_myIconImage shared$];
  }


-defaultMenu
  {
   id menu = [super defaultMenu];

   [[[menu children] removeLast] free];

   return menu;
  }


- (PT)defaultExtent
  {
  return pt(395,506);
  }


- (STR)name
  {
  return "Editor";
```

```
}

- (STR)defaultTitleSTR
  {
  return "Editor";
  }


- (BOOL)knowsOrigin
  {
  return YES;
  }


- interpreter
  {
  return interpreter;
  }


- resetFocusWindow
  {
  focusWindow = nil;

  if ([[self dependents] size]>0)
     [self focusWindow:[[self dependents] at:0]];

  return self;
  }


- focusWindow
  {
  return focusWindow;
  }


- focusWindow:aWindow
  {
  focusWindow = aWindow;

  [addAfterButton onReceiver:aWindow];
  [addBeforeButton onReceiver:aWindow];
  [editButton onReceiver:aWindow];
  [replaceButton onReceiver:aWindow];
  [deleteButton onReceiver:aWindow];

  [self changed:@selector(focusWindow:)];
  return self;
  }


- editLayer
  {
  return editLayer;
  }


- update:aReportDALayer because:(SEL)aSelector
  {
  if (aSelector == @selector(terminate$))
     [aReportDALayer removeDependent:self];
  else if (aSelector == @selector(doubleClick))
```

```
   [editLayer addToStatement:[aRepo    Layer selectionItem]];

 return self;
 }


- addListBox:aStringMatrix width:(int)aWidth lines:(int)numLines
 {
 id aLBox;

 aLBox = [BM_ListBox stringMatrix:aStringMatrix lines:numLines
                         client:nil font:BM_fonts.Application];
 [[aLBox borderWidth:1] borderColor:BM_colors.Border];
 [aLBox outsideWidth:aWidth];

 return aLBox;
 }


- compose
 {
 id buttonGroup;
 id dataList,operatorList,functionList,userDataList;

 editLayer = [EditLayer attachTo:applicationLayer];
 [editLayer statementEditor:self];
 [editLayer outsideWidth:[applicationLayer width]-2*SPACING+1];
 [editLayer compose];

 addAfterButton = [[PushButton str:"Add >" font:BM_fonts.Application]
    outsideExtent:pt(BTNWIDTH-4,BTNHEIGHT)];
 [addAfterButton onSelector:@selector(insertAfterStatement)];
 [editLayer okButton:addAfterButton];

 addBeforeButton = [[PushButton str:"< Add" font:BM_fonts.Application]
    outsideExtent:pt(BTNWIDTH-4,BTNHEIGHT)];
 [addBeforeButton onSelector:@selector(insertBeforeStatement)];

 editButton = [[PushButton str:"Edit" font:BM_fonts.Application]
    outsideExtent:pt(BTNWIDTH-4,BTNHEIGHT)];
 [editButton onSelector:@selector(editStatement)];

 replaceButton = [[PushButton str:"Replace" font:BM_fonts.Application]
    outsideExtent:pt(BTNWIDTH-4,BTNHEIGHT)];
 [replaceButton onSelector:@selector(replaceStatement)];

 deleteButton = [[PushButton str:"Delete" font:BM_fonts.Application]
    outsideExtent:pt(BTNWIDTH-4,BTNHEIGHT)];
 [deleteButton onSelector:@selector(deleteStatement)];

 buttonGroup = [ButtonGroup attachTo:applicationLayer
    at:pt(2,SPACING)];
 [buttonGroup addButton:addAfterButton];
 [buttonGroup addButton:addBeforeButton];
 [buttonGroup addButton:editButton];
 [buttonGroup addButton:replaceButton];
 [buttonGroup addButton:deleteButton];
 [buttonGroup extent:pt(5*(BTNWIDTH-4)+6,30)];
 [buttonGroup format];

 [buttonGroup show];
 [editLayer origin:pt([applicationLayer left]+SPACING,
    [buttonGroup adjacentBottom]+SPACING)];
 [editLayer show];
```

```
dataList = [[InnerWindow attachTo::    icationLayer]
   outsideExtent:pt(205,266)];
[dataList outsideOrigin:
   pt([editLayer left]-1,[editLayer adjacentBottom]+SPACING)];
[dataList insideColor:BM_colors.Frame];
[dataList myTitle:"DATA ITEMS"];

dataCltn = [interpreter dataItemList];
dataLB = [self addListBox:dataCltn
   width:[dataList outsideWidth]-2*INNERSPACING lines:12];
[[dataLB attachTo:dataList] outsideOrigin:
   pt([dataList adjacentLeft]+INNERSPACING,[dataList adjacentTop]+40)];
[[dataLB repDALayer] addDependent:self];
[dataList show];

userDataList = [[InnerWindow attachTo:applicationLayer]
   outsideExtent:pt(205,103)];
[userDataList outsideOrigin:pt([dataList adjacentLeft]+1,
   [dataList adjacentBottom]+SPACING)];
[userDataList insideColor:BM_colors.Frame];
[userDataList myTitle:"USER DATA ITEMS"];

userDataCltn = [interpreter newDataItemList];
userDataLB = [self addListBox:userDataCltn
   width:[userDataList outsideWidth]-2*INNERSPACING lines:3];
[[userDataLB attachTo:userDataList] outsideOrigin:
   pt([userDataList adjacentLeft]+INNERSPACING,
      [userDataList adjacentTop]+40)];
[[userDataLB repDALayer] addDependent:self];
[[userDataLB verticalBar] noPageMarkers];
[userDataList show];

operatorList = [[InnerWindow attachTo:applicationLayer] outsideOrigin:
   pt([dataList adjacentRight]+SPACING,[dataList adjacentTop]+1)];
[operatorList insideColor:BM_colors.Frame];
[operatorList outsideExtent:pt(154,176)];
[operatorList myTitle:"OPERATORS"];

operatorCltn = [interpreter operatorList];
operatorLB=[self addListBox:operatorCltn
    width:[operatorList outsideWidth]-2*INNERSPACING lines:7];
[[operatorLB attachTo:operatorList] outsideOrigin:
   pt([operatorList adjacentLeft]+INNERSPACING,
      [operatorList adjacentTop]+40)];
[[operatorLB repDALayer] addDependent:self];
[operatorList show];

functionList = [[InnerWindow attachTo:applicationLayer] outsideOrigin:
   pt([operatorList adjacentLeft]+1,[operatorList adjacentBottom]+SPACING)];
[functionList insideColor:BM_colors.Frame];
[functionList outsideExtent:pt(154,193)];
[functionList myTitle:"FUNCTIONS"];

functionCltn = [interpreter functionList];
functionLB=[self addListBox:functionCltn
   width:[functionList outsideWidth]-2*INNERSPACING lines:8];
[[functionLB attachTo:functionList] outsideOrigin:
   pt([functionList adjacentLeft]+INNERSPACING,
      [functionList adjacentTop]+40)];
[[functionLB repDALayer] addDependent:self];
[functionList show];

return self;
}
```

```
- initialize
  {
  [super initialize];

  [self viewBox:nil];
  [self sizeLayer:NO];
  [self origin:pt(807,150)];
  [self insideColor:BM_colors.Frame];
  focusWindow = nil;

  interpreter = [BM_Interpreter createInterfaceFor:databaseServer
     functionServer:functionServer withParser:YES];

  return self;
  }

- askDelete
  {
  return self;
  }

- terminate$
  {
  if (dataCltn)
     dataCltn = [dataCltn free];
  if (userDataCltn)
     userDataCltn = [userDataCltn free];
  if (functionCltn)
     functionCltn = [functionCltn free];
  if (operatorCltn)
     operatorCltn = [operatorCltn free];

  if (interpreter)
     interpreter = [interpreter free];

  return [super terminate$];
  }

=:

/*===================== DO NOT REMOVF    EDIT ============================

       This comment and the following sccsId declaration are managed
       by SCCS for you. Do not edit or remove either.*

       Source file:     /users/bmw/Alpha/Screening/SCCS/s.GraphULayer.m
       Latest version:  1.8
       Last mod time:   08/12/89 at 11:35:46

=======================================================================*/

static char *sccsId = "@(#)GraphULayer.m rev 1.8 created on 08/12/89 at 11:35:46";

/*===================== DO NOT REMOVE OR EDIT ===========================*/

#include "objc.h"
#include "uil.h"
#include "BMWGlobal.h"

@requires RectList;

= GraphULayer:BorderLayer(BM_WorkstationMsgs,UIMESSAGES)
  {
  short cellSize, graphHeight;
```

```
short barWidth,barHeight;
id lastBar;
}

- reset
{
barHeight = graphHeight;
lastBar = nil;

if ([self frontLayers])
   [self freeFrontLayers];

return self;
}


- fillGraph:(short)initialSize universeSize:(short)finalSize
{
id newLayer;
id tempRL;

tempRL = [RectList new];
[tempRL extent:pt(barWidth+2,barHeight+2)];
[tempRL origin:pt([self left]+cellSize,
   [self top]+(graphHeight-barHeight)-1)];

if (initialSize>0)
   barHeight = (short)(finalSize*graphHeight/initialSize);
else
   barHeight = 0;

if (lastBar)
   {
   [lastBar insideColor:BM_colors.LightFrameShadow];
   [tempRL height:[tempRL height]-barHeight];
   }

newLayer = [BorderLayer new];
[[newLayer borderWidth:1] borderColor:BM_colors.ButtonOn];
[newLayer extent:pt(barWidth,barHei    ];
[newLayer attachTo:self at:pt(cellSize,graphHeight-barHeight)];
[newLayer insideColor:BM_colors.ButtonOn];
[newLayer setVisible:YES];
lastBar = newLayer;

[self repaint:tempRL];
tempRL = [tempRL free];
return self;
}


- compose
{
return self;
}


- extent:(PT)aPoint
{
[super extent:aPoint];
graphHeight = [self height];
return self;
}
```

```
- initialize
  {
  [super initialize];
  cellSize = 30;
  [[self borderWidth:1] borderColor:BM_colors.Border];
  [self extent:pt(151,177)];
  [self insideColor:BM_colors.LightFrameShadow];

  graphHeight = [self height];
  barWidth = 3*cellSize;
  barHeight = graphHeight;
  lastBar = nil;

  return self;
  }

=:


/*===================== DO NOT REMOV     EDIT ============================

       This comment and the following sccsId declaration are managed
       by SCCS for you. Do not edit or remove either.

       Source file:     /users/bmw/Alpha/Screening/SCCS/s.ResultsLayer.m
       Latest version:  1.27
       Last mod time:   09/14/89 at 17:20:26

=========================================================================*/

static char *sccsId = "@(#)ResultsLayer.m rev 1.27 created on 09/14/89 at 17:20:26";

/*===================== DO NOT REMOVE OR EDIT ==========================*/

#include "objc.h"
#include "uil.h"
#include "BMWGlobal.h"
#include "BMGFXInterf.h"

@requires InsetLayer,PushButton,BorderLayer,ReportEdit;
@requires BitMap,ImageLayer,GraphULayer,StringLayer;
@requires CharString,ReportWin,Report,DataCltn;
@requires OrdCltn;

= ResultsLayer:InnerWindow(BM_WorkstationMsgs,UIMESSAGES)
  {
  id universeChart;
  id myParents;

  id initialUniverse,finalUniverse;
  short initialSize,finalSize;
  id initialLayer,finalLayer;
  id model;

  id researchWin;
  }


- researchWin:aWindow
  {
  researchWin = aWindow;
  return self;
  }
```

```
- researchWin
 {
 return researchWin;
 }


- (BOOL)leftButtonDown
 {
 [[researchWin helpLayer]
    updateHelp:"Push \"Final\" button to view screened universe."
          and:"Push \"Charts\" to generate charts."];
 return YES;
 }

- universeChart
 {
 return universeChart;
 }

- viewInitialUniverse
 {
 model = initialUniverse;
 [self generateReport:"Initial Universe"];
 return self;
 }


- viewFinalUniverse
 {
 model = finalUniverse;
 [self generateReport:"Final Universe"];
 return self;
 }


- compose
 {
 id button1,button2,button3,button4,button5;
 id iString,fString;
 id iWindow,fWindow;

 [self myTitle:"RESULTS"];
 [super compose];

 universeChart =[GraphULayer attachTo:innerLayer
    at:pt(2,2)];
 [universeChart compose];

 iWindow = [BorderLayer extent:pt(2*BTNWIDTH-1,BTNHEIGHT-1)];
 [[iWindow borderWidth:1] borderColor:BM_colors.Border];
 [[iWindow attachTo:innerLayer] insideColor:BM_colors.LightFrameShadow];
 [iWindow origin:pt([universeChart left],
    [universeChart adjacentBottom]+2)];

 button1 = [[PushButton str:"" font:BM_fonts.Application]
    outsideExtent:pt(BTNHEIGHT,BTNHEIGHT)];
 [button1 myPicture:[BitMap readFrom:"./icons/view.icon"]];
 [[button1 attachTo:iWindow] outsideOrigin:[iWindow outsideOrigin]];
 [[button1 onSelector:@selector(viewInitialUniverse)] onReceiver:self];

 iString = [StringLayer str:"INITIAL" font:BM_fonts.Application];
 [iString attachTo:iWindow];
 [iString left:[button1 right]+INNERSPACING];
```

```
[iString centerY:[button1 centerY]];
[iString insideColor:BM_colors.LightFrameShadow];
[iString color:BM_colors.VRLText];

initialLayer = [StringLayer str:"0000" font:BM_fonts.Application];
[initialLayer attachTo:iWindow];
[initialLayer origin:pt([button1 right]+90,[iString top])];
[initialLayer insideColor:BM_colors.LightFrameShadow];
[initialLayer color:BM_colors.VRLText];

fWindow = [BorderLayer extent:pt(2*BTNWIDTH-1,BTNHEIGHT-1)];
[[fWindow borderWidth:1] borderColor:BM_colors.Border];
[[fWindow attachTo:innerLayer] insideColor:BM_colors.LightFrameShadow];
[fWindow origin:pt([iWindow left],
   [iWindow adjacentBottom]+2)];

button2 = [[PushButton str:"" font:BM_fonts.Application]
   outsideExtent:pt(BTNHEIGHT,BTNHEIGHT)];
[button2 myPicture:[BitMap readFrom:"./icons/view.icon"]];
[[button2 attachTo:fWindow] outsideOrigin:[fWindow outsideOrigin]];
[[button2 onSelector:@selector(vie    alUniverse)] onReceiver:self];

fString = [StringLayer str:"FINAL" font:BM_fonts.Application];
[fString attachTo:fWindow];
[fString left:[button2 right]+INNERSPACING];
[fString centerY:[button2 centerY]];
[fString insideColor:BM_colors.LightFrameShadow];
[fString color:BM_colors.VRLText];

finalLayer = [StringLayer str:"0000" font:BM_fonts.Application];
[finalLayer attachTo:fWindow];
[finalLayer origin:pt([button2 right]+90,[fString top])];
[finalLayer insideColor:BM_colors.LightFrameShadow];
[finalLayer color:BM_colors.VRLText];

button3 = [[PushButton str:"Charts" font:BM_fonts.Application]
   outsideExtent:pt(BTNWIDTH,BTNHEIGHT)];
[button3 myPicture:[BitMap readFrom:"./icons/pie.icon"]];
[[button3 onSelector:@selector(chartWin)] onReceiver:parent];
[[button3 attachTo:innerLayer]
   outsideOrigin:pt([fWindow adjacentLeft],
      [fWindow adjacentBottom]+33)];

button4 = [[PushButton str:"Reports" font:BM_fonts.Application]
   outsideExtent:pt(BTNWIDTH+1,BTNHEIGHT)];
[button4 myPicture:[BitMap readFrom:"./icons/rep.icon"]];
[[button4 onSelector:@selector(reportWin)] onReceiver:parent];
[[button4 attachTo:innerLayer]
   origin:pt([button3 adjacentRight]+5,[button3 top])];

button5 = [[PushButton str:"Characteristics" font:BM_fonts.Application]
   outsideExtent:pt(2*BTNWIDTH+2,BTNHEIGHT)];
[button5 myPicture:[BitMap readFrom:"./icons/bar.icon"]];
[[button5 attachTo:innerLayer]
   origin:pt([button3 left],[button3 adjacentBottom]+5)];
[[button5 onSelector:@selector(charactWin)] onReceiver:parent];

return self;
}

- reset
{
finalSize = initialSize = 0;
```

```
[initialLayer assignSTR:"0000"];
[finalLayer assignSTR:"0000"];

[[self universeChart] reset];
return self;
}


- addParent:aParent
{
[myParents add:aParent];
return self;
}


- updateUniverse:aStringLayer
{
char uSize[5];

sprintf(uSize,"%d",finalSize);
[aStringLayer assignSTR:uSize];
[aStringLayer show];
return self;
}


- updateGraph:aModel
{
finalSize = [[aModel savedUniverse] size];
if (finalSize>initialSize)
   {
   initialUniverse = aModel;
   initialSize = finalSize;
   [self updateUniverse:initialLayer];
   }
[self updateUniverse:finalLayer];
[[self universeChart] fillGraph:initialSize universeSize:finalSize];
finalUniverse = aModel;
return self;
}

- update:aModel because:(SEL)aSelector
{
if (aSelector == @selector(terminate$))
   {
   [aModel  removeDependent:self];
   [myParents remove:aModel];
   initialUniverse = nil;
   finalUniverse = nil;
   }
if ( (aSelector == @selector(evaluating:)) && (!([aModel evaluating])) )
   [self updateGraph:aModel];
return self;
}

- initialize
{
[super initialize];
[self outsideExtent:pt(180,391+SPACING)];
myParents = [OrdCltn new];
finalSize = initialSize = 0;
initialLayer = finalUniverse = nil;
initialUniverse = finalUniverse = nil;
```

```
return self;
}



- terminate$
{
if (myParents)
   {
   [myParents elementsPerform:@selector(removeDependent:) with:self];
   [myParents free];
   }

return [super terminate$];
}

- generateReport:(STR)aTitle
{
id universe = [model savedUniverse];
id names = [model savedUniverseNames];

if ( (universe==nil) || ([universe size]==0) )
   {
   id message;
   if (universe==nil)
      message = [CharString
            str:"No values have yet been generated for this item."];
   else
      message = [CharString str:"Universe consists of 0 entities."];

   [researchWin displayErrorPrompter:message];
   message = [message free];
   }
else
   {
   int x = 450;
   int y = x*ASPECT_RATIO_FUDGE;
   id idGFXLayer, values;
   id report, dataCltn;
   id outputLayer;
   id rl, title;

   [statusMonitor graphics];

   outputLayer = [[[[ReportWin new] attachTo:deskTop] origin:pt(700,80)]
      assignSTR:aTitle];
   [deskTop installIcon:[[outputLayer iconHandler] assignSTR:aTitle]];

   dataCltn = [DataCltn new];
   [dataCltn addSet:names];

   title = [CharString str:"Universe Entities"];
   report = [Report defaultReportFor:dataCltn titleSTR:[title str]
      subTitleSTR:""];
   [title free];

   rl = [ReportEdit createInterfaceFor:report parent:outputLayer];
   [[outputLayer applicationLayer:rl] close];
   [outputLayer translateWithin:baseLayer];

   [[outputLayer iconHandler] open];

   [statusMonitor normalStatus];
   }
```

```
 return self;
 }

=:

#include "objc.h"
#include "uil.h"

#include "BMWGlobal.h"


= ScreeningButton : BinButton (BM_WorkstationMsgs, UIMESSAGES)
{
}


-open
  {
   [super open];

   [[statementEditor iconHandler] open];

   return self;
  }

=:
/*==================== DO NOT REMOVE    :DIT ===========================

       This comment and the following sccsId declaration are managed
       by SCCS for you. Do not edit or remove either.

       Source file:     /users/bmw/Alpha/Screening/SCCS/s.ScreeningWin.m
       Latest version:  1.38
       Last mod time:   09/13/89 at 14:58:35

========================================================================*/

static char *sccsId = "@(#)ScreeningWin.m rev 1.38 created on 09/13/89 at 14:58:35";

/*==================== DO NOT REMOVE OR EDIT ==========================*/

#include "objc.h"
#include "uil.h"
#include "BMWGlobal.h"

@requires InsetLayer,HelpLayer,ButtonGroup,EventQ;
@requires UniverseLayer,DateLayer,CurrencyLayer,ResultsLayer;
@requires ChartSpecsWin,CharactWin,ReportSpecsWin,CharString,Cursor;
@requires PushButton,BitMap;

static id _myIconImage;

= ScreeningWin:ResearchWin(BM_WorkstationMsgs,UIMESSAGES)
  {
  }

- initialize
  {
  [super initialize];

  [self left:5];

  return self;
  }
```

```
- (STR)extensionSTR
{
return ".scr";
}


- (STR)name
{
return "Screening";
}


- (BOOL)leftButtonDown
{
if (controlLayer == [self frontLayerContaining:event.origin])
   [helpLayer updateHelp:"Select initial universe, establish screening"
                     and:"criteria, then press \"Go\"."];

return [super leftButtonDown];
}


- toFront
{
[modelEditor statementEditor];



return [super toFront];
}


- defaultIcon
{
if (_myIconImage == nil)
   _myIconImage = [BitMap readFrom:"icons/screenWin.icon"];

return [_myIconImage shared$];
}



- (PT)defaultExtent
{
return pt(797,506);
}



- (BOOL)updateForStmt
{
id tempFor,tempId;
BOOL hasParen;

[statusMonitor formatting];

hasParen = NO;
tempFor = [CharString str:"For "];
[tempFor concatSTR:[universeLayer myStr]];

if (strcmp([dateLayer myStr],""))
   hasParen = YES;
```

```
if (hasParen)
   {
   [tempFor concatSTR:"("];
   [tempFor concatSTR:[dateLayer myStr]];
   [tempFor concatSTR:")"];
   }

[modelEditor statementMethod:4];
tempId = nil;

if (!([modelEditor currentStmtId]==[modelEditor forStmtId]))
   {
   tempId = [modelEditor currentStmtId];
   [modelEditor setCurrentStmtId:[modelEditor forStmtId]];
   }

if ([modelEditor parseStatement:tempFor])
   {
   tempFor = [tempFor free];
   if (tempId)
      [modelEditor setCurrentStmtId:tempId];

   [statusMonitor normalStatus];
   return YES;
   }

tempFor = [tempFor free];
if (tempId)
   [modelEditor setCurrentStmtId:tempId];

[modelEditor statementMethod:1];


 [statusMonitor normalStatus];
 return NO;
 }



- focusColor:aColor
  {
/*
  [titleBar insideColor:aColor];
  [menuBox insideColor:aColor];
  [closeBox insideColor:aColor];

  [menuBox repaint];
  [closeBox repaint];
*/

  [[self titleBar] color:aColor];
  return self;
  }



- screenedListContextStatement
  {
  id tempFor;

  tempFor  = [CharString str:"For ScreenedList"];
```

```
 if (strcmp([dateLayer myStr],""))
    {
    [tempFor concatSTR:"("];
    [tempFor concatSTR:[dateLayer myStr]];
    [tempFor concatSTR:")"];
    }
 return tempFor;
 }


- chartWin
 {
 id chartWin;

 [statusMonitor formatting];

 chartWin = [[[ChartSpecsWin new] attachTo:deskTop] assignSTR:"Untitled"];
 [deskTop installIcon:[[chartWin iconHandler] assignSTR:"Untitled"]];
 [chartWin close];
 [chartWin translateWithin:deskTop];
 [[chartWin iconHandler] open];

 [chartWin defaultSetting:[self screenedListContextStatement]];

 [statusMonitor normalStatus];
 return chartWin;
 }


- charactWin
 {
 id charactWin;

 [statusMonitor formatting];

 charactWin = [CharactWin attachTo:deskTop];

 [charactWin compose];

 [statusMonitor normalStatus];
 return charactWin;
 }


- reportWin
 {
 id reportWin;
 [statusMonitor formatting];

 reportWin = [[[ReportSpecsWin new] attachTo:deskTop] assignSTR:"Untitled"];
 [deskTop installIcon:[[reportWin iconHandler] assignSTR:"Untitled"]];
 [reportWin close];
 [reportWin translateWithin:deskTop];
 [[reportWin iconHandler] open];

 [reportWin defaultSetting:[self screenedListContextStatement]];

 [statusMonitor normalStatus];
 return reportWin;
 }
```

```
- runModel
  {
  if (resultsLayer)
     [resultsLayer reset];

  [[currencyLayer activeButton] on];
  return [super runModel];
  }


- compose
  {
  id controlGroup;
  id saveButton,printButton,quitButton,goButton;

  universeLayer = [UniverseLayer attachTo:applicationLayer
     at:pt(SPACING,SPACING)];
  [universeLayer parent:self];
  [universeLayer researchWin:self];
  [universeLayer compose];
  [universeLayer show];

  dateLayer = [[DateLayer attachTo:applicationLayer] outsideOrigin:
     pt([universeLayer adjacentRight]+SPACING, [universeLayer adjacentTop]+1)];
  [dateLayer parent:self];
  [dateLayer researchWin:self];
  [dateLayer compose];
  [dateLayer show];

  currencyLayer = [[CurrencyLayer attachTo:applicationLayer] outsideOrigin:
     pt([dateLayer adjacentRight]+SPACING, [universeLayer adjacentTop]+1)];
  [currencyLayer parent:self];
  [currencyLayer researchWin:self];
  [currencyLayer compose];
  [currencyLayer show];

  resultsLayer = [[ResultsLayer attachTo:applicationLayer] outsideOrigin:
     pt([currencyLayer adjacentRight]+SPACING,[universeLayer adjacentTop]+1)];
  [resultsLayer parent:self];
  [resultsLayer researchWin:self];
  [resultsLayer compose];
  [resultsLayer show];

  [self modelEditor];

  controlLayer = [[InsetLayer attachTo:applicationLayer] outsideExtent:
     pt([dateLayer outsideWidth]+[resultsLayer outsideWidth]+SPACING,50)];
  [controlLayer outsideOrigin:
     pt([currencyLayer adjacentLeft]+1,[resultsLayer adjacentBottom]+SPACING)];
  [controlLayer insideColor:BM_colors.Frame];

  saveButton = [[PushButton str:"Save" font:BM_fonts.Application]
     outsideExtent:pt(BTNWIDTH,BTNHEIGHT)];
  [[saveButton onSelector:@selector(saveModel)] onReceiver:self];

  quitButton = [[PushButton str:"Quit" font:BM_fonts.Application]
     outsideExtent:pt(BTNWIDTH,BTNHEIGHT)];
//  [[quitButton onSelector:@selector(askDelete)] onReceiver:self];

  printButton = [[PushButton str:"Print" font:BM_fonts.Application]
     outsideExtent:pt(BTNWIDTH,BTNHEIGHT)];
  [[printButton onSelector:@selector(printModel)] onReceiver:self];
```

```
  goButton = [[PushButton str:"Go" font:BM_fonts.Application]
     outsideExtent:pt(BTNWIDTH,BTNHEIGHT)];
  [goButton myPicture:[BitMap readFrom:"./icons/start.icon"]];
  [[goButton onSelector:@selector(runModel)] onReceiver:self];

  [saveButton offColor:BM_colors.Frame];
  [goButton offColor:BM_colors.Frame];
  [printButton offColor:BM_colors.Frame];
  [quitButton offColor:BM_colors.Frame];

  controlGroup = [[ButtonGroup extent:pt(4*BTNWIDTH+6,30)]
     attachTo:controlLayer at:pt(39,INNERSPACING-2)];
  [controlGroup addButton:saveButton];
  [controlGroup addButton:printButton];
  [controlGroup addButton:quitButton];
  [controlGroup addButton:goButton];
  [controlGroup format];
  [controlLayer show];

  helpLayer = [HelpLayer attachTo:applicationLayer];
  [helpLayer origin:pt([universeLayer left],[controlLayer top])];
  [helpLayer updateHelp:"Select initial universe, establish screening"
                   and:"criteria, then press \"Go\"."];
  [helpLayer outsideWidth:2*[dateLayer outsideWidth]+SPACING];
  [helpLayer show];

  [modelEditor outsideOrigin:pt([universeLayer adjacentLeft]+1,
     [currencyLayer adjacentBottom]+SPACING)];
  [modelEditor compose];

  return self;
  }



=:

#include "objc.h"
#include "uil.h"

#include "BMWGlobal.h"


= ApplicationsFolder: KL_Folder(BM_WorkstationMsgs,UIMESSAGES)
{
}


-(STR)name { return "Applications Folder"; }

-defaultMenu
   {
    id menu = [super defaultMenu];

    [[[menu children] removeLast] free];

    return menu;
   }


-(BOOL)mvIntoSelf:aLayer
{
   return NO;
```

```
}

-updateDir
{
    return self;
}

-open
  {
   return self;
  }

-installApplication:aWindowLayer iconFactory:anIconFactory
  {
   id iconHandler = [anIconFactory createInterfaceFor:aWindowLayer];

   [aWindowLayer newIconHandler:iconHandler];

   [deskTop install:aWindowLayer];

   [self installIcon:iconHandler];

   return self;
  }

=:

/*==================== DO NOT REMOVE    EDIT ============================

        This comment and the following sccsId declaration are managed
        by SCCS for you. Do not edit or remove either.

        Source file:     /users/bmw/Alpha/DeskTop/SCCS/s.BM_TrashCan.m
        Latest version:  1.4
        Last mod time:   09/13/89 at 12:36:28

========================================================================*/

static char *sccsId = "@(#)BM_TrashCan.m rev 1.4 created on 09/13/89 at 12:36:28";

/*==================== DO NOT REMOVE OR EDIT ==========================*/


#include "objc.h"
#include "uil.h"

#include "BMWGlobal.h"

static id _myIconImage;

@requires BitMap, CharString, Menu;

= BM_TrashCan: StandardFolder(BM_WorkstationMsgs,UIMESSAGES)
{
```

```
 BOOL deletionInProgress;
 }


-initialize
{
 [super initialize];

 deletionInProgress = NO;

 return self;
}


-(STR)extensionSTR
{
 return ".trs";
}


-(STR)name
{
 return "Trash Can";
}


-defaultFileName
  {
   return [CharString str:"Trash Can.trs"];
  }


-defaultIcon
{
    if(_myIconImage == nil)

    {
        _myIconImage = [BitMap readFrom: "icons/trash.icon"];
    }
    return [_myIconImage shared$];
}


-defaultMenu
  {
   id menu = [super defaultMenu];

   [[[menu children] removeLast] free];

   [menu append:[Menu str:"Empty" selector:@selector(emptyContents)
                               receiver:self]];

   return menu;
  }


-(BOOL)mvIntoSelf:aLayer
{
   if ([aLayer fileName] != nil)
      return [super mvIntoSelf:aLayer];
   else
      {
```

```
        [aLayer parent:self];

        [self installIcon:[aLayer iconHandler]];
       }

   return YES;
}


-createVisualInterfaceFor:aFileName
   {
    if (deletionInProgress)
       {
        [aFileName free];
        return nil;
       }
    else
       return [super createVisualInterfaceFor:aFileName];
   }


-emptyContents
   {
    id path = [self path];

    id command = [[[CharString str:"rm -r \""] concatSTR:[path str]]
                                               concatSTR:"\""];

    deletionInProgress = YES;

    system ([command str]);

    [super emptyContents];

    [path free];
    [command free];

    [self fileName:[self defaultFileName]];

    deletionInProgress = NO;

      return self;
     }

   =:


/*==================== DO NOT REMOVl    EDIT ============================

       This comment and the following sccsId declaration are managed
       by SCCS for you. Do not edit or remove either.

       Source file:     /users/bmw/Alpha/DeskTop/SCCS/s.BullBoard.m
       Latest version:  1.3
       Last mod time:   09/13/89 at 12:41:59

=======================================================================*/

static char *sccsId = "@(#)BullBoard.m rev 1.3 created on 09/13/89 at 12:41:59";

/*==================== DO NOT REMOVE OR EDIT ==========================*/
```

```
#include "objc.h"
#include "uil.h"

#include "BMWGlobal.h"


static id _myIconImage;


@requires BitMap, CharString, BM_Monitor;


= BulletinBoard: WindowLayer(BM_WorkstationMsgs,UIMESSAGES)
{
}


-initialize
  {
   id saveLayer;

   [super initialize];
   [self viewBox:nil];
   [self extent:[applicationLayer defaultExtent]];

   statusMonitor = applicationLayer;

   return self;
  }


-(STR)defaultTitleSTR
  {
   return "Status Monitor";
  }



- (STR)name
 {
 return "Status";
 }



-defaultApplicationLayer
  {
   id monitorLayer = [BM_Monitor new];
   return monitorLayer;
  }


  -defaultIcon
  {
      if(_myIconImage == nil)
      {
          _myIconImage = [BitMap readFrom: "icons/BBoard.icon"];
      }
      return [_myIconImage shared$];
  }

  =:
```

```
/*=================== DO NOT REMOVE C   )IT ===========================

        This comment and the following sccsId declaration are managed
        by SCCS for you. Do not edit or remove either.

        Source file:     %F%
        Latest version:  %I%
        Last mod time:   %H% at %U%

=========================================================================*/

static char *sccsId = "@(#)DeskTop.m work in progress by bmw";

/*==================== DO NOT REMOVE OR EDIT ===========================*/


#include "objc.h"
#include "uil.h"
#include "stdio.h"
#include "string.h"
#include "BMWGlobal.h"

@requires Cursor, SolidColor;
@requires Menu, DepMenu;
@requires CharString;

@requires IconHandler, StringLayer, ControlPanel;

@requires BM_PromptBox;
@requires AboutBox;


= DeskTop: MyBaseLayer (BM_WorkstationMsgs, UIMESSAGES)
{
    int place;
    id  titleBar;
    id  bin;
    id  controlPanel;
}

+new
{
    deskTop = self = [super new];
    return self;
}


  +(PT)defaultOrigin
    {
     int x = 50;
     int y = 50;

#ifdef SUN
#include <suntool/sunview.h>
      struct screen scrdata;
      win_screenget (open("/dev/win0",O_RDONLY), &scrdata);
      y = 0.10*((scrdata.scr_rect).r_height);
      x = 0.10*((scrdata.scr_rect).r_width);
#endif
#if XWIN
```

```
      y = 0.1*BM_XDisplayHeight ();
      x = 0.1*BM_XDisplayWidth ();
#endif

      return pt(x,y);
     }

   +(PT)defaultExtent
     {
      int displayHeight = 700;
      int displayWidth  = 700;

#ifdef SUN
#include <suntool/sunview.h>
      struct screen scrdata;
      win_screenget (open("/dev/win0",O_RDONLY), &scrdata);
      displayHeight  = (scrdata.scr_rect).r_height - 250;
      displayWidth   = (scrdata.scr_rect).r_width;
#endif
#if XWIN
      displayHeight  = 0.8*BM_XDisplayHeight ();
      displayWidth   = 0.8*BM_XDisplayWidth ();
#endif

      return pt(displayWidth,displayHeight);
     }


- defaultCursor
{
    return cursors.Normal;
}


- defaultMenu
{
    id menu, newItem;
    id move , resize;

    menu = [DepMenu str: "Research System DeskTop"];

    [menu append:[Menu str:"Redisplay DeskTop" selector: @selector(display)
        receiver: self]];

    [menu append:[Menu str:"Cleanup" selector: @selector(cleanupIcons)
        receiver: self]];

    [menu append:[Menu str:"Logout" selector: @selector(exitDesktop)
        receiver: self ]];

    [menu append:[Menu str:"About..." selector: @selector(aboutBox)
        receiver: self ]];

    return menu;
}


-displayAboutBox:(STR)aStatusMessage
  {
   id aboutBox = [[[AboutBox statusMessage:aStatusMessage]
                              attachTo:self]
                                center:[self center]];
   [aboutBox show];
```

```
    return aboutBox;
   }


 -aboutBox
   {
    id aboutBox = [self displayAboutBox:""];

    [aboutBox modalActivate];

    [aboutBox delete];

    return self;
   }


-initialize
{
   char titleBarString [100];

   controlPanel = [ControlPanel new];
   [controlPanel setColors];
   [controlPanel setFonts];

   [super initialize];

   strcpy (titleBarString, [siteName str]);
   strcat (titleBarString, ": ");
   strcat (titleBarString, [appName str]);

#ifdef HP
   titleBar = [[[[StringLayer str:titleBarString font:BM_fonts.TitleBar]
                   borderWidth:3] insideColor:BM_colors.TitleBar]
                   borderColor:BM_colors.Background] attachTo:self];
   [self borderWidth:5];
   [self borderColor:BM_colors.Background];

#endif

#ifdef XWIN
   titleBar = nil;
   BM_XSetWindowName ([currentDisplay windowId],titleBarString);
   [self borderWidth:0];
#endif

   [self insideColor:BM_colors.DeskTop];

   [cursors.Normal convertToColor:[BM_colors.Cursor colorIndex]];

   bin = nil;

   place = 0;

   return self;
}


-bin:aBin
  {
   if (bin)
      [bin delete];

   bin = aBin;
```

```
    [bin attachTo:self];

    [self format];

    return self;
   }


-format

{
    [[titleBar outsideOrigin:[self origin]] outsideWidth:[self width]];
    [[bin centerY:[self centerY]] outsideLeft:50];

    return self;
}


-display
{
 /* this would ordinarily go in -extent: */

    [self format];
    [super display];
    return self;
}


-titleBar
   {
   return titleBar;
   }



static int place = 0;

-(PT)iconPlace:ih
{
    PT bottomRight = [self bottomRight];
    PT iconOrigin  = [ih origin];
    PT iconCenter  = [ih center];
    PT closePosition;

    iconCenter = ptMinus (iconCenter, iconOrigin);

    bottomRight = ptMinus(bottomRight, pt(80,80));

    closePosition = pt(X(bottomRight)-100*(place%6),
                       Y(bottomRight)-100*(place/6));

    place += 1;

    if ((Y(closePosition) < 150) && (place%6 == 0))
       place = 0;

    return ptMinus(closePosition, iconCenter);
}


static int ordinalLayer = 0;
```

```
-(PT)layerPlace
{
    int x,y;
    x = X(extent)/4;
    y = Y(extent)/4;
    ordinalLayer++;
    ordinalLayer %= 10;

    return pt(x+24*ordinalLayer, y+18*ordinalLayer);
}


-path
  {

    return [CharString str:"."],
   }


-cleanupIcons
  {
   unsigned index;
   id       layer;

   place = 0;

   for (index = 0; index < [[self frontLayers] size]; index++)
      if ([layer = [[self frontLayers] at:index] isKindOf:IconHandler])
         [layer moveTo:[self iconPlace:layer]];

   return self;
  }


-installIcon:anIcon
  {
   if([anIcon origin] == pt(0,0))
      [anIcon origin:[self iconPlace:anIcon]];

   [[[anIcon attachTo:self] toBack] show];

   return self;
  }


-install:aWindowLayer
  {
   if (![aWindowLayer knowsOrigin])
      [aWindowLayer origin:[self layerPlace]];

   [aWindowLayer attachTo:self];

   [aWindowLayer close];

   return self;
  }


-(BOOL)mvSTRintoSelf:(STR)aFileName oldFullPath:(STR)oldFullPath
{
   BOOL result;
   id   newpath;
```

```
    newpath = [self path];

    if ([fileManager pathSTR:(STR)[newpath str] containsFileSTR:aFileName])
      {
       [BM_PromptBox askSTR:"Existing file may not be over-written."
                    client:self];
       return NO;
      }

    newpath = [newpath concatSTR:"/"];
    newpath = [newpath concatSTR:aFileName];

    result = [fileManager renameSTR:oldFullPath toSTR:[newpath str]];

    [newpath free];

    return result;
}

-(BOOL)mvIntoSelf:aLayer
{
    id   oldPath;
    BOOL success;

    if ([aLayer fileName] == nil)
       return NO;

    oldPath = [aLayer path];

    if ([self mvSTRintoSelf:[[aLayer fileName] str]
              oldFullPath:[oldPath str]])
      {
       [aLayer parent:self];

       [self installIcon:[aLayer iconHandler]];

       success = YES;
      }
    else
       success = NO;

   [oldPath free];

   return success;
}


-createVisualInterfaceFor:aFilename
  {
      PT iconOrigin, iconCenter, closePosition;

      id anInterface = nil;
      id aClass;


      if (aFilename == nil)
         return nil;

      aClass = [iconManager interfaceClassFor:aFilename];

      if (aClass != nil)
      {
```

```
            anInterface = [aClass createInterfaceFor:aFilename parent:self];

            [self installIcon:[anInterface iconHandler]];

            [self install:anInterface];
         }
      else
         [aFilename free];

   return anInterface;
}


-updateDir
{
    place = 0;

    [iconManager updateDirectoryDisplay:self];

    return self;
}
-installSTR:(STR)aFileName oldFullPath:(STR)oldFullPath
  {
   id newInterface;

   if ([self mvSTRintoSelf:aFileName oldFullPath:oldFullPath])
      {
       id string = [CharString str:aFileName];
       newInterface = [self createVisualInterfaceFor:string];

       return newInterface;
      }
   else
      return nil;
  }


-exitDesktop
{
    return [self controlTerminate];
}


=:

 id dirCltn;
 if (path == 0)
        path = ".";

 // can't even open the directory, return nil.
 if ((thisDir = opendir(path)) == 0)
        return nil;

 dirCltn = [OrdCltn new];
 while (thisEntry = readdir (thisDir)) {
        if (pattern == 0 || gmatch (thisEntry->d_name, pattern))
                [dirCltn add:[CharString str:thisEntry->d_name]];
 }

 // we probably succeeded in getting something: return it to user.
 closedir (thisDir);
 return dirCltn;
```

```
}

/* glob match subroutine
 * stolen from the shell.
 *
 * Usage:
 *      status = gmatch (string, pattern)
 *      char *string, *pattern;
 *
 *      status is 1 on match; 0 on no match.
 *      all matches are "anchored" to beginning of line.
 */

#define LOBYTE  0377
#define STRIP   0177
#define QUOTE   0200

gmatch (s, p)
register char *s,  *p;
{
        register int scc;
        char c;

        if ( scc = *s++) {
                if (  (scc &= STRIP) == 0) {
                        scc = 0200;
                }
        }
        switch ( c = *p++ ) {

        /* Open set */
        case '[':
                {
                BOOL ok; int lc;
                ok=0; lc=077777;

                while ( c = *p++) {
                        if ( c == ']') {
                                return (ok ? gmatch (s, p) : 0);
                        } else if  ( c == '-') {
                                if ( lc <= scc && scc <=  (*p++) )
                                        ok++;
                        } else {
                                if ( scc ==  (lc = (c&STRIP)) )
                                        ok++;
                        }
                }
                return (NO);
                }


/*===================== DO NOT REMO'" 'R EDIT ============================

        This comment and the following sccsId declaration are managed
        by SCCS for you. Do not edit or remove either.

        Source file:    SCCS/s.FileManager.m
        Latest version: 1.1
        Last mod time:  09/10/89 at 19:31:59

========================================================================*/
```

```
static char *sccsId = "@(#)FileManager.m rev 1.1 created on 09/10/89 at 19:31:59";

/*==================== DO NOT REMOVE OR EDIT ===========================*/


#include "objc.h"
#include <sys/types.h>
#include <sys/dir.h>

#include <stdio.h>


@requires CharString, OrdCltn;


= FileManager: Object (BM_WorkstationMsgs,Collection,Primitive)
{
}


   -(BOOL)pathSTR:(STR)aDirectoryPath containsFileSTR:(STR)aFileName
     {
      BOOL exists;
      id   fullPath;
      FILE *f;

      fullPath = [[[CharString str:aDirectoryPath] concatSTR:"/"]
                                          concatSTR:aFileName];

      if ((f = fopen ([fullPath str], "r")) != (FILE *) NULL)
         {
          exists = YES;
          fclose(f);
         }
      else
         exists = NO;

      [fullPath free];

      return exists;
     }


   -(BOOL)renameSTR:(STR)oldPath toSTR:(STR)newPath
     {
      return (rename(oldPath, newPath) == 0);
     }


id getDirectoryContents (path, pattern)
char *path;
char *pattern;
{
        DIR *thisDir;
        struct direct *thisEntry;


/* Ordinary character */
default:
        if ( (c&STRIP) != scc )
                return (NO);
```

```
        /* Any single character */
        case '?':
                return (scc ? gmatch (s, p) : 0);

        /* Any number of preceding type */
        case '*':
                if ( *p == 0 )
                        return (YES);
                --s;
                while ( *s) {
                        if ( gmatch (s++, p) )
                                return (YES);
                }
                return (NO);

        /* End of string; return match code */
        case 0:
                return (scc == 0);
        }
}



   -directoryContents:(STR)aDirectoryPath
     {
      return (id) getDirectoryContents (aDirectoryPath, (char *)0);
     }


=:



/*==================== DO NOT REMOV    EDIT ============================

        This comment and the following sccsId declaration are managed
        by SCCS for you. Do not edit or remove either.*

        Source file:     /users/bmw/Alpha/DeskTop/SCCS/s.IconManager.m
        Latest version:  1.1
        Last mod time:   09/10/89 at 19:31:54

=======================================================================*/

static char *sccsId = "@(#)IconManager.m rev 1.1 created on 09/10/89 at 19:31:54";

/*===================== DO NOT REMOVE OR EDIT ==========================*/


#include "objc.h"
#include "uil.h"

#include "BMWGlobal.h"

@requires IPSequence;

@requires CharString,ChartWin;
@requires KL_Folder,VRLDevelopmentWin,ReportWin;
@requires ControlPanel,ScreeningWin,WindowLayer;
@requires ReportSpecsWin,ChartSpecsWin,CharactWin;
@requires BM_Monitor;
```

```
= IconManager: Dictionary (BM_WorkstationMsgs, UIMESSAGES)
{
}

  +new
    {
     self = [self with:14, [CharString str:".fol"], KL_Folder,
                           [CharString str:".vrl"], VRLDevelopmentWin,
                           [CharString str:".scr"], ScreeningWin,
                           [CharString str:".rwr"], ReportSpecsWin,
                           [CharString str:".cwr"], ChartSpecsWin,
                           [CharString str:".rpt"], ReportWin,
                           [CharString str:".cht"], ChartWin];
     return self;
    }


  -interfaceClassForExtension:aCharString
    {
     return [self atKey:aCharString];
    }


  -interfaceClassFor:aFileName
    {
     id   extension, aClass;
     char *period = (char *) strrchr([aFileName str], '.');

     if (period)
       {
        extension = [CharString str:period];
        aClass = [self interfaceClassForExtension:extension];
        [extension free];
       }
     else
       aClass = nil;


      return aClass;
     }


   -updateDirectoryDisplay:client
     {
      id seq, aString, directory, path;

      path = [client path];
      directory = [fileManager directoryContents:[path str]];

      for(seq=[IPSequence over:directory];(aString=[seq next]) || [seq free];)
         [client createVisualInterfaceFor:aString];

      [path free];

      [directory free];

      return self;
     }


 =:
```

```
/*==================== DO NOT REMOVE    EDIT ============================

        This comment and the following sccsId declaration are managed
        by SCCS for you. Do not edit or remove either.*

        Source file:     /users/bmw/Alpha/DeskTop/SCCS/s.KL_Folder.m
        Latest version:  1.11
        Last mod time:   09/13/89 at 12:42:10

=========================================================================*/

static char *sccsId = "@(#)KL_Folder.m rev 1.11 created on 09/13/89 at 12:42:10";

/*==================== DO NOT REMOVE OR EDIT ===========================*/


#include "objc.h"
#include "uil.h"

#include <string.h>

#include "BMWGlobal.h"

extern id currentDisplay;
extern int gp_colorSupport;


@requires BitMap, CharString, BM_PromptBox, Menu, IconHandler;


static id _myIconImage = nil;


= KL_Folder: ApplicationWin(BM_WorkstationMsgs,UIMESSAGES)
{
    BOOL updateScrollBars;
    int  place;
}


-(STR)extensionSTR
  {
   return ".fol";
  }


- initialize {
    [super initialize];
    [self viewBox:nil];

    [self verticalBar:[self defaultVerticalBar]];
    [self horizontalBar:[self defaultHorizontalBar]];

    [self insideColor:BM_colors.Background];
    [[self applicationLayer] insideColor:BM_colors.Background];

    place = 0;

    return self;
}
```

```
-(STR)name { return "Folder"; }


-(PT)defaultExtent { return pt(620,350); }

-defaultMenu
  {
   id menu = [super defaultMenu];

   [[[menu children] removeLast] free];

   [menu append:[Menu str:"Cleanup" selector:@selector(cleanupIcons)
                                    receiver:self]];

   [menu append:[Menu str:"New Folder" selector:@selector(createNewFolder)
                                       receiver:self]];

   return menu;
  }


-defaultIcon
{
    if(_myIconImage == nil)
    {
        _myIconImage = [BitMap readFrom: "icons/Folder.icon"];
    }

    return [_myIconImage shared$];
}


-(PT)iconPlace:ih
{
    PT topLeft     = [self origin];
    PT iconOrigin  = [ih origin];
    PT iconCenter  = [ih center];
    PT closePosition;

    iconCenter = ptMinus (iconCenter, iconOrigin);

    topLeft = ptPlus(topLeft, pt(60,90));

    closePosition = pt(X(topLeft)+100*(place%6),
                       Y(topLeft)+100*(place/6));

    place += 1;

    if (place == 36)
       place = 0;

    return ptMinus(closePosition, iconCenter);
}


-cleanupIcons
  {
   unsigned index;
   id       layer;

   place = 0;
```

```
for (index = 0; index < [[applicationLayer frontLayers] size]; index++)
   if ([layer = [[applicationLayer frontLayers] at:index]
                                                        isKindOf:IconHandler])
      [layer moveTo:[self iconPlace:layer]];

[applicationLayer changed:@selector(extent:)];


    return self;
   }


-installIcon:anIcon
   {
    if([anIcon origin] == pt(0,0))
       [anIcon origin:[self iconPlace:anIcon]];

    [[anIcon attachTo:applicationLayer] toBack];

    if (updateScrollBars)
       [applicationLayer changed:@selector(extent:)];

    return self;
   }


-(BOOL)mvSTRintoSelf:(STR)aFileName oldFullPath:(STR)oldFullPath
{
    BOOL result;
    id   newpath;

    newpath = [self path];

    if ([fileManager pathSTR:(STR)[newpath str] containsFileSTR:aFileName])
       {
        [BM_PromptBox askSTR:"Existing file may not be over-written."
                     client:self];
        return NO;
       }

    newpath = [newpath concatSTR:"/"];
    newpath = [newpath concatSTR:aFileName];

    result = [fileManager renameSTR:oldFullPath toSTR:[newpath str]];

    [newpath free];

    return result;
}


-(BOOL)mvIntoSelf:aLayer
{
    id   oldPath;
    BOOL success;

    if ([aLayer fileName] == nil)
       {
        [BM_PromptBox
                askSTR:"Please save your file before moving it into a folder."
                client:self];
       return NO;
```

```
  }

oldPath = [aLayer path];

if ([self mvSTRintoSelf:[[aLayer fileName] str]
          oldFullPath:[oldPath str]])
  {
   [aLayer parent:self];

   [self installIcon:[aLayer iconHandler]];

   success = YES;

      }
    else
      success = NO;

    [oldPath free];

    return success;
 }


-createVisualInterfaceFor:aFilename
   {
      PT iconOrigin, iconCenter, closePosition;
      id anInterface = nil;

      id aClass = [iconManager interfaceClassFor:aFilename];

      if (aClass != nil)
      {
        anInterface = [aClass createInterfaceFor:aFilename parent:self];

        [self installIcon:[anInterface iconHandler]];

        [deskTop install:anInterface];
       }
     else
        [aFilename free];

   return anInterface;
 }


-updateDir
 {
    place = 0;

    updateScrollBars = NO;

    [iconManager updateDirectoryDisplay:self];

    [applicationLayer changed:@selector(extent:)];

    updateScrollBars = YES;

    return self;
 }


-installSTR:(STR)aFileName oldFullPath:(STR)oldFullPath
   {
```

```
    id newInterface;

    if ([self mvSTRintoSelf:aFileName oldFullPath:oldFullPath])
       {
        id string = [CharString str:aFileName];
        newInterface = [self createVisualInterfaceFor:string];
        [applicationLayer changed:@selector(extent:)];

        return newInterface;
       }
    else
       return nil;
  }


-createNewFolder

   {
    static char newFolderName [] = "./temp/NewFolder.fol";

    mkdir (newFolderName, 0777);
    [self installSTR:"NewFolder.fol" oldFullPath:newFolderName];

    return self;
   }


-open
{
    if(!opened)
    {
        opened = YES;

        [self updateDir];
    }
    return self;
}


-emptyContents
  {
   id layer;
   id sequence = [[applicationLayer frontLayers] eachElement];

   while (layer = [sequence next])
      if ([layer isKindOf:IconHandler])
         [layer delete];

   [sequence free];

   [self display];

   [applicationLayer changed:@selector(extent:)];

   return self;
  }

=:
```

```
/*==================== DO NOT REMOVE ! . EDIT ============================

        This comment and the following sccsId declaration are managed
        by SCCS for you. Do not edit or remove either.*

        Source file:    /users/bmw/Alpha/DeskTop/SCCS/s.MyBaseLayer.m
        Latest version: 1.9
        Last mod time:  09/13/89 at 12:42:19

========================================================================*/

static char *sccsId = "@(#)MyBaseLayer.m rev 1.9 created on 09/13/89 at 12:42:19";

/*==================== DO NOT REMOVE OR EDIT ==========================*/


#include <stdio.h>
#include <string.h>

#include "objc.h"
#include "uil.h"

#include "BMWGlobal.h"

//extern int alarmWentOff;
int alarmWentOff = 0;

@requires Confirmer, Cursor, EventQ, Quad;

= MyBaseLayer: BaseLayer (BM_WorkstationMsgs, UIMESSAGES)
{
}

- handleAvailableEvents
{
  while([EventQ eventReady])
    {
      [EventQ readEvent];
      if (![self processEvent]) [self perform: event.selector];
    }
//  if ((clockLayer != nil) && alarmWentOff) [clockLayer updateClock];
}

- controlStart
{
  [self setVisible:YES];
  [ myCursor beCursor];
  [Cursor cursorOn];

  do
    {
      keepControl = YES;
      fflush(stdout);
      [self handleAvailableEvents];

      while(keepControl)
        {
          if (BMSelect() != -1)
            {
              do
                {
                  [EventQ readEvent];
```

```
                if ((event.code == KEYBOARDEVENT) && (event.ascii == '`'))
                   PrintMemoryStatistics ();

                if ((event.code != K    ,ARDEVENT) ||
                    (keyboardFocusLayer == nil) ||
                    (![keyboardFocusLayer processEvent]))
                   if (![self processEvent])
                      [self perform: event.selector];
              }
            while([EventQ eventReady]);
          }
//        if ((clockLayer != nil) && alarmWentOff) [clockLayer updateClock];
        }
    } while (![Confirmer askSTR:"Do you really want to quit?"]);
    [ cursors.Xeq beCursor];
    [Cursor cursorOff];
    return self;
}


-initialize
   {
    keyboardFocusLayer = nil;

    return [super initialize];
   }


-grabKeyboardFocus:aLayer
   {
    id previousFocus = keyboardFocusLayer;

    if (previousFocus != nil)
       [previousFocus loseKeyboardFocus];

    keyboardFocusLayer = aLayer;

    return previousFocus;
   }

-releaseKeyboardFocus:aLayer
   {
    if (aLayer == keyboardFocusLayer)
       keyboardFocusLayer = nil;

    return self;
   }


-currentKeyboardFocus
   {
    return keyboardFocusLayer;
   }


-insideQuad
   {
   PT insideOrigin, insideExtent;

   insideExtent = [self extent];
   insideOrigin = [self origin];
```

```
insideExtent = ptMinus(insideExtent,pt(2*[self borderWidth],2*[self borderWidth]));
insideOrigin = ptPlus(insideOrigin,pt([self borderWidth],[self borderWidth]));

return ([Quad origin:insideOrigin extent:insideExtent]);

=:

/*===================== DO NOT REMOVE    :DIT =============================

        This comment and the following sccsId declaration are managed
        by SCCS for you. Do not edit or remove either.*

        Source file:     %F%
        Latest version:  %I%
        Last mod time:   %H% at %U%

========================================================================*/

static char *sccsId = "@(#)ResearchBin.m work in progress by bmw";

/*===================== DO NOT REMOVE OR EDIT ==========================*/


#include "objc.h"
#include "uil.h"

#include "BMWGlobal.h"

@requires BM_TrashCan, UserFolder, EditorWin, BulletinBoard, ScreeningWin,
          VRLDevelopmentWin, ReportSpecsWin, ChartSpecsWin, BinIcon, BinButton,
          ScreeningButton;


= ResearchBin:IconBin(BM_WorkstationMsgs,UIMESSAGES)
  {
  }


  -initialize
    {
     [super initialize];

     [self installApplication:[ScreeningWin new] iconFactory:ScreeningButton];
     [self installApplication:[VRLDevelopmentWin new] iconFactory:BinButton];
     [self installApplication:[ReportSpecsWin new] iconFactory:BinButton];
     [self installApplication:[ChartSpecsWin new] iconFactory:BinButton];
     [self installApplication:[statementEditor=[EditorWin new] compose]
                iconFactory:BinIcon];
     [self installApplication:[BM_TrashCan new] iconFactory:BinIcon];
     [self installApplication:birthPlace=[UserFolder new]
                iconFactory:BinIcon];
     [self installApplication:[BulletinBoard new] iconFactory:BinIcon];

     return self;
    }


=:

/*===================== DO NOT REMOVE    DIT =============================

        This comment and the following sccsId declaration are managed
        by SCCS for you. Do not edit or remove either.*
```

```
        Source file:     /users/bmw/Alpha/DeskTop/SCCS/s.StdFolder.m
        Latest version:  1.2
        Last mod time:   09/13/89 at 12:36:41

========================================================================*/

static char *sccsId = "@(#)StdFolder.m rev 1.2 created on 09/13/89 at 12:36:41";

/*===================== DO NOT REMOVE OR EDIT ============================*/


#include "objc.h"
#include "uil.h"
#include <stdio.h>

#include "BMWGlobal.h"


@requires BinIcon;


= StandardFolder: KL_Folder(BM_WorkstationMsgs,UIMESSAGES)
{
}


-defaultParent
  {
   return deskTop;
  }


-fileName:aFileName
  {
   id dir;

   [super fileName:aFileName];

   dir = [parent path];

   if (![fileManager pathSTR:[dir str] containsFileSTR:[fileName str]])
      mkdir ([aFileName str], 0777);

   [dir free];

   return self;
  }


-defaultIconHandler
  {
   return [BinIcon createInterfaceFor:self];
  }


=:


/*===================== DO NOT REMO\   \ EDIT ============================

        This comment and the following sccsId declaration are managed
        by SCCS for you. Do not edit or remove either.
```

```
        Source file:     /users/bmw/Alpha/DeskTop/SCCS/s.UserFolder.m
        Latest version:  1.2
        Last mod time:   09/13/89 at 12:36:35

==========================================================================*/

static char *sccsId = "@(#)UserFolder.m rev 1.2 created on 09/13/89 at 12:36:35";

/*===================== DO NOT REMOVE OR EDIT ===========================*/


#include "objc.h"
#include "uil.h"

#include "BMWGlobal.h"

@requires CharString;

= UserFolder: StandardFolder(BM_WorkstationMsgs,UIMESSAGES)
{
}


-defaultFileName
   {
    return [CharString str:"User Files.ufd"];
   }


-(STR)name
   {
    return "User Files";
   }
=:

/*===================== DO NOT REMO\    ? EDIT ============================

        This comment and the following sccsId declaration are managed
        by SCCS for you. Do not edit or remove either.*

        Source file:     %F%
        Latest version:  %I%
        Last mod time:   %H% at %U%

==========================================================================*/

static char *sccsId = "@(#)ResearchMain.m work in progress by bmw";

/*===================== DO NOT REMOVE OR EDIT ===========================*/

#include <stdio.h>

#include "objc.h"
#include "uil.h"

#include "BMWGlobal.h"

#include <malloc.h>


BOOL globalDebugFlag = YES;
```

```
*(BM_WorkstationMsgs, UserInterface, Collection, Primitive)

@requires BM_StringTable, DeskTop, IconManager, FileManager, CharString,
          BitMap, Font, BM_FunctionServer, BM_DatabaseServer, Cursor, EventQ,
          ColorMap, SolidColor, ResearchBin;


main()
   {
    id iconBin, aboutBox;

    extern BOOL allocFlag;
    allocFlag = NO;

    mallopt (M_NLBLKS,100);
    mallopt (M_MXFAST,88);


    INITIALIZE_VECTORS ();

#ifdef HP
    [ColorMap colorMapName:"system/ColorMap.hp"];
#endif

    eventQueue = EventQ;

    stringTable = [BM_StringTable readFrom:"system/BMW_StringTbl"];

    userName = [CharString str:"Demo"];
    siteName = [CharString str:"Batterymarch Financial Management"];
    appName  = [CharString str:"Research System"];

    deskTop = [DeskTop new];

    [deskTop format];
    [deskTop show];

    aboutBox = [deskTop displayAboutBox:"Database initialization in progress.  Please stand by..."];
    iconManager = [IconManager new];
    fileManager = [FileManager new];

    [cursors.Wait beCursor];
    [Cursor cursorOn];

    BM_OpenGraphicsPackage (stderr);

    databaseServer = [BM_DatabaseServer new];
    functionServer = [BM_FunctionServer new];

    [statusMonitor normalStatus];

    [deskTop bin:[[ResearchBin str:"Research"] format]];

    [aboutBox delete];

    [deskTop updateDir];

    [deskTop controlStart];

    BM_CloseGraphicsPackage ();

    [databaseServer free];
```

```
    ClearConsole ();
    exit (0);
   }

@classes (DepObject, SharObject, Display, AsciiFiler,BM_DataEntity,
Dictionary,BM_DataItem,BM_Universe,BM_ProgramStatusBlock,BM_Parser,
BM_StreamString,BytArray, BM_TableMap, BM_LabelValue,
Report, BM_CICharString, String, BM_Dictionary)
@messages ()

id stringTable,
   statusMonitor,
   databaseServer,
   functionServer,
   fileManager,
   iconManager,
   birthPlace,
   statementEditor,
   trashCan,
   deskTop,
   keyboardFocusLayer,
   eventQueue,
   userName,
   appName,
   siteName;

extern BOOL globalDebugFlag;

typedef double NUMBER;

#define NOTFOUND (unsigned) -1
#define VARIABLE_NARGS 234567
#define NUMERIC_TYPE (unsigned) 0
#define STRING_TYPE  (unsigned) 1
#define ANY_TYPE     (unsigned) 2
#define NO_ERROR 0
#define FUNC_CALL_ERROR 1
#define DATABASE_ERROR 2
#define SCREEN_ERROR 3
#define CONTEXT_ERROR 5
#define XRATE_ERROR 6
#define BREAK_FROM_USER 7
#define MEMO_ERROR 8

#define LEFT_SCANCODE  124
#define RIGHT_SCANCODE 127
#define UP_SCANCODE    126
#define DOWN_SCANCODE  125
#define SHIFT_SCANCODE 1

#define BOGUS_VALUE -987654

#define BAR          4
#define PIE          1
#define LINE         2
#define HISTOGRAM    3
#define COLUMN       0
#define SCATTER      9

#define SPACING 5
#define INNERSPACING 10
#define BTNHEIGHT 30
#define BTNWIDTH 76
```

BMWGLOBAL.H

```
#define JLEFT    0
#define JRIGHT   1
#define JCENTER  2
#define JDEFAULT 3
#define JDECIMAL 4

struct BM_COLORS
    {
    id Text;
    id DeskTop;

    id Background;
    id Foreground;
    id TitleBar;
    id Border;

    id VRLPlate;
    id VRLTextOn;
    id VRLTextOff;
    id WindowBackground;
    id WindowForeground;

    id MenuBar;

    id Prompter;
    id Cursor;

    id Frame;
    id LightFrameShadow;
    id DarkFrameShadow;
    id VRLText;
    id ButtonOn;
    id ButtonOff;
    id LightButtonShadow;
    id DarkButtonShadow;

    id TextBoxHighlight;
    id TextBox;
    } BM_colors;

struct BM_FONTS
    {
    id TitleBar;
    id MenuBar;
    id VRLText;
    id DeskTop;
    id Application;
    id ReportText;
    id DisplayText;
    id DisplayTitle;
    id SmlButtonText;
    id Icon;
    } BM_fonts;

# define WHERE 257
# define SET 258
# define IDENTIFIER 259
# define MEMO 260
# define ENCLOSE 261
# define LEFTPAREN 262
# define RIGHTPAREN 263
# define MESSAGE 264
```

• TOKENS.H

```
# define PAUSE 265
# define CONTINUE 266
# define FOR 267
# define NEXT 268
# define BEGIN 269
# define END 270
# define COMMA 271
# define COLON 272
# define STRINGLITERAL 273
# define ABSOLUTEDATECONSTANT 274
# define DATEOFFSETCONSTANT 275
# define LEFTSQUARE 276
# define RIGHTSQUARE 277
# define CONSTANT 278
# define DOLLAR 279
# define LEFTBRACKETS 280
# define RIGHTBRACKETS 281
# define MODIFIER 282
# define NULLSTATEMENT 283
# define PLS 284
# define MIN 285
# define TMS 286
# define DIV 287
# define POW 288
# define OR 289
# define AND 290
# define NOT 291
# define LT 292
# define GT 293
# define EQ 294
# define LE 295
# define GE 296
# define NE 297
# define INSTALL 298
# define TEMP 299
# define COMMENT 300
# define DELETE 301
# define SAVELIST 302
```

What is claimed is:

1. A method for enabling a user to interactively create and modify a model of an investment strategy to be appied to data items pertaining to a set of possible investment entities, comprising providing a visual representation of a sequence of statements which describe manipulations using said data in accordance with said model of said investment strategy, a first result of the execution of said sequence of statements, when applied to said data, being one or more sets of statistics, each statistic arising from a combination of two or more items of data and being different from any items of data, a second result of the execution of said sequence of statements being a selection of one or more subsets of said set of possible investment entities based on said data and said statistics, providing a visual interface enabling the user to interactively enter and manipulate said sequence of statements to create and refine said model of said investment strategy, and enabling the user to execute said sequence of statements using said data to derive said sets of statistics and select said subsets of entities.

2. The method of claim 1 wherein providing said visual interface includes organizing said statements in groups with each group being represented by a portion of a display.

3. The method of claim 2 wherein each group of statement related to a functional sub-portion of said model of said investment strategy.

4. The method of claim 2 wherein the portions of the display representing different groups are displayed in an overlaid manner and in a predefined order.

5. The method of claim 1 further comprising converting each said statement into computer executable instructions after said statement is entered and manipulated by the user.

6. The method of claim 5 wherein converting said sequence of statements into computer executable instructions comprises arranging said computer executable instructions into a first tree of instruction nodes representing said sequence of statements, and executing said sequence of statements comprises traversing the computer executable instructions in said first tree of instruction nodes and executing each computer executable instruction as it is traversed.

7. The method of claim 1 wherein said sequence of statements generates multiple said sets of statistics, and said sequence of statements includes user defined symbols, each respective user defined symbol identifying a respective said set of statistics.

8. The method of claim 7 further comprising enabling the user to review a said set of statistics identified by a user defined symbol by invoking said symbol with a pointing device via said visual representation.

9. The method of claim 8 futher comprising
storing each said set of statistics, and wherein
reviewing a said set of statistics upon invocation of a user defined symbol includes retrieving and displaying a stored set of statistics identified by the invoked symbol.

10. The method of claim 9 wherein said statistics are cached in a main memory of a computer.

11. The method of claim 2 wherein
said possible investment entities are classified into one or more claeses, and
a said group may refer to a given class of said possible investment entities such that execution of statements of said group results in selection only of possible investment entities which belong to said given class of possible investment entities.

12. The method of claim 1 wherein
said possible investment entities are classified into one or more classes, and
said statement may refer tc a given class of said possible investment entities such that execution of said statement and subsequent statements in said sequence of statements results in selection only of possible investment entities which belong to said given class of possible investment entitites.

13. The method of claim 12 wherein said possible investment entitites comprise financial investment instruments including stocks and the like, and said classes include industries and geographical areas.

14. The method of claim 6 wherein
converting said sequence of statements into computer executable instructions further comprises generating a second tree of display nodes each display node associated with a visual representation of a statement of said sequence of statements, each respective display node being linked to a respective instruction node that was converted from the same statement from which the respective display node was generated, and
execution of instructions in an instruction node causes corresponding actions with respect to the visual representation.

15. The method of claim 14 wherein execution of instructions in an instruction node causes visual accentuation of the visual representation associated with a display node linked to said instruction node.

16. The method of claim 9 wherein displaying said stored set of statistics comprises displaying a graph derived from said stored set of statistics.

* * * * *

UNITED STATES PATENT AND TRADEMARK OFFICE

CERTIFICATE OF CORRECTION

PATENT NO. : 5,220,500

DATED : June 15, 1993

INVENTOR(S) : Andrew V. Baird et al

It is certified that error appears in the above-indentified patent and that said Letters Patent is hereby corrected as shown below:

Column 5, line 46, delete "13" and insert therefor -- - --;

Column 6, line 60, delete "=count[seq13NetSales]" and insert therefor --=count[seq_NetSales]--;

Column 15, line 5, insert "∧" to the left of "exponentiate";

Column 17, line 10, delete "a" after "computers";

Column 35, line 52, delete "RSpeoCDAedit·m" and insert therefor --RSpecsDAEdit·m--;

UNITED STATES PATENT AND TRADEMARK OFFICE

CERTIFICATE OF CORRECTION

PATENT NO. : 5,220,500

DATED : June 15, 1993

INVENTOR(S) : Andrew V. Barid, et al

It is certified that error appears in the above-indentified patent and that said Letters Patent is hereby corrected as shown below:

Column 38, line 17, delete "BS_Platelist·m" and insert therefor --BS_PlateList·m--;

Column 38, line 31, delete "BM_Stmlist·m" and insert therefor --BM_StmtList·m--;

Column 38, line 32, delete "BS_StmList·m" and insert therefor --BS_StmtList·m--; and Column 40, line 10, insert "Λ" to the right of "BM_ArithROW·m".

Signed and Sealed this

Eighth Day of November, 1994

Attest:

BRUCE LEHMAN

Attesting Officer

*Commissioner of Patents and Trademarks*